(12) United States Patent
Shribman et al.

(10) Patent No.: US 12,438,956 B2
(45) Date of Patent: Oct. 7, 2025

(54) SYSTEM AND METHOD FOR IMPROVING INTERNET COMMUNICATION BY USING INTERMEDIATE NODES

(71) Applicant: BRIGHT DATA LTD., Netanya (IL)

(72) Inventors: Derry Shribman, Tel Aviv (IL); Ofer Vilenski, Moshav Hadar Am (IL)

(73) Assignee: BRIGHT DATA LTD., Netanya (IL)

( * ) Notice: Subject to any disclaimer, the term of this patent is extended or adjusted under 35 U.S.C. 154(b) by 159 days.

(21) Appl. No.: 18/378,672

(22) Filed: Oct. 11, 2023

(65) Prior Publication Data

US 2024/0040014 A1   Feb. 1, 2024

Related U.S. Application Data

(60) Continuation of application No. 17/563,751, filed on Dec. 28, 2021, which is a continuation of application
(Continued)

(51) Int. Cl.
*H04L 67/60* (2022.01)
*G06Q 40/08* (2012.01)
(Continued)

(52) U.S. Cl.
CPC ............ *H04L 67/60* (2022.05); *G06Q 40/08* (2013.01); *G06Q 50/16* (2013.01);
(Continued)

(58) Field of Classification Search
None
See application file for complete search history.

(56) References Cited

U.S. PATENT DOCUMENTS

| 3,922,494 A | 11/1975 | Cooper et al. |
| 3,962,539 A | 6/1976 | Ehrsam et al. |

(Continued)

FOREIGN PATENT DOCUMENTS

| CA | 2328548 A1 | 6/2002 |
| CA | 2353623 A1 | 1/2003 |

(Continued)

OTHER PUBLICATIONS

International Search Report of PCT/US2010/034072 dated Jul. 1, 2010.
(Continued)

*Primary Examiner* — Quang N Nguyen
(74) *Attorney, Agent, or Firm* — May Patents Ltd. c/o Dorit Shem-Tov

(57) ABSTRACT

A method for fetching a content from a web server to a client device is disclosed, using tunnel devices serving as intermediate devices. The client device accesses an acceleration server to receive a list of available tunnel devices. The requested content is partitioned into slices, and the client device sends a request for the slices to the available tunnel devices. The tunnel devices in turn fetch the slices from the data server, and send the slices to the client device, where the content is reconstructed from the received slices. A client device may also serve as a tunnel device, serving as an intermediate device to other client devices. Similarly, a tunnel device may also serve as a client device for fetching content from a data server. The selection of tunnel devices to be used by a client device may be in the acceleration server, in the client device, or in both. The partition into slices may be overlapping or non-overlapping, and the same slice (or the whole content) may be fetched via multiple tunnel devices.

49 Claims, 134 Drawing Sheets

Related U.S. Application Data

No. 16/865,362, filed on May 3, 2020, now Pat. No. 11,388,257, which is a continuation of application No. 16/140,785, filed on Sep. 25, 2018, now Pat. No. 10,659,562, which is a continuation of application No. 15/663,762, filed on Jul. 30, 2017, now Pat. No. 10,277,711, which is a continuation of application No. 14/930,894, filed on Nov. 3, 2015, now Pat. No. 9,742,866, which is a division of application No. 14/468,836, filed on Aug. 26, 2014, now Pat. No. 9,241,044.

(60) Provisional application No. 61/870,815, filed on Aug. 28, 2013.

(51) Int. Cl.

| | | |
|---|---|---|
| *G06Q 50/16* | (2012.01) | |
| *H04L 9/40* | (2022.01) | |
| *H04L 43/0864* | (2022.01) | |
| *H04L 65/612* | (2022.01) | |
| *H04L 67/02* | (2022.01) | |
| *H04L 67/06* | (2022.01) | |
| *H04L 67/141* | (2022.01) | |
| *H04L 67/567* | (2022.01) | |
| *H04L 67/59* | (2022.01) | |
| *G08B 21/04* | (2006.01) | |
| *H04L 12/28* | (2006.01) | |
| *H04L 67/52* | (2022.01) | |
| *H04N 21/462* | (2011.01) | |
| *H04W 4/029* | (2018.01) | |

(52) U.S. Cl.
CPC ........ *H04L 43/0864* (2013.01); *H04L 63/029* (2013.01); *H04L 63/0407* (2013.01); *H04L 65/612* (2022.05); *H04L 67/02* (2013.01); *H04L 67/06* (2013.01); *H04L 67/141* (2013.01); *H04L 67/567* (2022.05); *H04L 67/59* (2022.05); *G05B 2219/2642* (2013.01); *G08B 21/043* (2013.01); *H04L 12/2803* (2013.01); *H04L 67/52* (2022.05); *H04N 21/4622* (2013.01); *H04W 4/029* (2018.02)

(56) References Cited

U.S. PATENT DOCUMENTS

| | | |
|---|---|---|
| 4,347,827 A | 9/1982 | Cascio |
| 4,405,829 A | 9/1983 | Rivest et al. |
| 4,464,650 A | 8/1984 | Eastman et al. |
| 4,558,302 A | 12/1985 | Welch |
| 4,814,746 A | 3/1989 | Miller et al. |
| 4,855,894 A | 8/1989 | Asahi |
| 4,937,781 A | 6/1990 | Lee et al. |
| 5,519,693 A | 5/1996 | Galuszka |
| 5,577,243 A | 11/1996 | Sherwood et al. |
| 5,734,829 A | 3/1998 | Robinson |
| 5,758,195 A | 5/1998 | Balmer |
| 5,826,014 A | 10/1998 | Coley |
| 5,974,566 A | 10/1999 | Ault |
| 6,012,083 A | 1/2000 | Savitzky |
| 6,012,090 A | 1/2000 | Chung |
| 6,061,278 A | 5/2000 | Kato et al. |
| 6,085,193 A | 7/2000 | Malkin |
| 6,134,584 A | 10/2000 | Chang |
| 6,154,782 A | 11/2000 | Kawaguchi |
| 6,173,330 B1 | 1/2001 | Guo et al. |
| 6,185,625 B1 | 2/2001 | Tso |
| 6,236,652 B1 | 5/2001 | Preston et al. |
| 6,240,444 B1 | 5/2001 | Fin |
| 6,266,704 B1 | 7/2001 | Reed |
| 6,311,216 B1 | 10/2001 | Smith |
| 6,345,303 B1 | 2/2002 | Knauerhase et al. |
| 6,351,775 B1 | 2/2002 | Yu |
| 6,356,934 B1 | 3/2002 | Delph |
| 6,389,422 B1 | 5/2002 | Doi |
| 6,389,462 B1 | 5/2002 | Cohen |
| 6,397,259 B1 | 5/2002 | Lincke et al. |
| 6,412,008 B1 | 6/2002 | Fields et al. |
| 6,421,733 B1 | 7/2002 | Tso |
| 6,449,640 B1 | 9/2002 | Haverstock |
| 6,466,470 B1 | 10/2002 | Chang |
| 6,477,581 B1 | 11/2002 | Carpenter et al. |
| 6,484,149 B1 | 11/2002 | Jammes et al. |
| 6,513,061 B1 | 1/2003 | Ebata |
| 6,519,693 B1 | 2/2003 | Debey |
| 6,578,066 B1 | 6/2003 | Logan et al. |
| 6,601,098 B1 | 7/2003 | Case et al. |
| 6,658,463 B1 | 12/2003 | Dillon et al. |
| 6,661,799 B1 | 12/2003 | Molitor |
| 6,665,715 B1 | 12/2003 | Houri |
| 6,687,732 B1 | 2/2004 | Bector |
| 6,701,374 B2 | 3/2004 | Gupta |
| 6,785,705 B1 | 8/2004 | Kocherlakota |
| 6,792,461 B1 | 9/2004 | Hericourt |
| 6,795,848 B1 | 9/2004 | Border et al. |
| 6,820,133 B1 | 11/2004 | Grove |
| 6,829,638 B1 | 12/2004 | McBrearty |
| 6,842,463 B1 | 1/2005 | Drwiega |
| 6,868,453 B1 | 3/2005 | Watanabe |
| 6,895,011 B1 | 5/2005 | Lassers |
| 6,941,562 B2 | 9/2005 | Gao et al. |
| 6,961,783 B1 | 11/2005 | Cook |
| 6,970,913 B1 | 11/2005 | Albert et al. |
| 7,007,228 B1 | 2/2006 | Carro |
| 7,009,927 B2 | 3/2006 | Lee et al. |
| 7,010,526 B2 | 3/2006 | Denesuk et al. |
| 7,020,667 B2 | 3/2006 | Guest et al. |
| 7,027,418 B2 | 4/2006 | Gan et al. |
| 7,047,315 B1 | 5/2006 | Srivastava |
| 7,080,158 B1 | 7/2006 | Squire |
| 7,120,666 B2 | 10/2006 | McCanne et al. |
| 7,139,276 B1 | 11/2006 | Sitaraman et al. |
| 7,139,557 B2 | 11/2006 | Tang et al. |
| 7,139,579 B2 | 11/2006 | Hatano |
| 7,149,797 B1 | 12/2006 | Weller et al. |
| 7,159,234 B1 | 1/2007 | Murphy et al. |
| 7,203,741 B2 | 4/2007 | Marco et al. |
| 7,234,059 B1 | 6/2007 | Beaver |
| 7,240,100 B1 | 7/2007 | Wein et al. |
| 7,246,272 B2 | 7/2007 | Cabezas |
| 7,254,636 B1 | 8/2007 | O'Toole, Jr. et al. |
| 7,257,634 B2 | 8/2007 | Colby et al. |
| 7,353,279 B2 | 4/2008 | Durvasula et al. |
| 7,381,366 B2 | 6/2008 | Carter |
| 7,401,115 B1 | 7/2008 | Arsenault |
| 7,464,123 B2 | 12/2008 | Croker |
| 7,543,018 B2 | 6/2009 | Appelman |
| 7,558,854 B2 | 7/2009 | Nakahara et al. |
| 7,558,942 B1 | 7/2009 | Chen et al. |
| 7,603,710 B2 | 10/2009 | Harvey et al. |
| 7,620,703 B1 | 11/2009 | Shteyn |
| 7,639,682 B2 | 12/2009 | Suzuki et al. |
| 7,640,580 B1 | 12/2009 | Plotnikov et al. |
| 7,664,125 B1 | 2/2010 | Bauer et al. |
| 7,673,048 B1 | 3/2010 | O'Toole |
| 7,702,784 B2 | 4/2010 | Berstis |
| 7,706,362 B1 | 4/2010 | Senthilnathan |
| 7,719,971 B1 | 5/2010 | Issa |
| 7,734,777 B2 | 6/2010 | Raja |
| 7,742,485 B2 | 6/2010 | Zhang |
| 7,751,628 B1 | 7/2010 | Reisman |
| 7,761,500 B1 | 7/2010 | Wei et al. |
| 7,783,777 B1 | 8/2010 | Pabla |
| 7,788,378 B2 | 8/2010 | Rao |
| 7,801,824 B1 | 9/2010 | Bryar |
| 7,805,517 B2 | 9/2010 | Shim |
| 7,818,430 B2 | 10/2010 | Zuckerman |
| 7,831,720 B1 | 11/2010 | Noureddine |
| 7,840,660 B1 | 11/2010 | Johnston et al. |
| 7,853,472 B2 | 12/2010 | Al-Abdulqader |

(56) References Cited

U.S. PATENT DOCUMENTS

| | | |
|---|---|---|
| 7,860,988 B2 | 12/2010 | Aoki |
| 7,865,585 B2 | 1/2011 | Samuels et al. |
| 7,877,511 B1 | 1/2011 | Berger |
| 7,886,050 B2 | 2/2011 | Raja et al. |
| 7,890,547 B2 | 2/2011 | Hotti |
| 7,890,624 B2 | 2/2011 | Bivens |
| 7,894,431 B2 | 2/2011 | Goring |
| 7,917,755 B1 | 3/2011 | Giliyaru |
| 7,929,429 B2 | 4/2011 | Bornstein |
| 7,929,535 B2 | 4/2011 | Chen et al. |
| 7,941,525 B1 | 5/2011 | Yavilevich |
| 7,970,835 B2 | 6/2011 | St. Jacques |
| 7,984,110 B1 | 7/2011 | Raman |
| 8,014,292 B1 | 9/2011 | Breau et al. |
| 8,041,784 B1 | 10/2011 | Amidon |
| 8,078,601 B1 | 12/2011 | Egnor et al. |
| 8,108,245 B1 | 1/2012 | Hosea et al. |
| 8,108,554 B1 | 1/2012 | Masters |
| 8,135,912 B2 | 3/2012 | Shribman et al. |
| 8,144,611 B2 | 3/2012 | Agarwal |
| 8,156,275 B2 | 4/2012 | de Cesare |
| 8,156,441 B1 | 4/2012 | Bihari et al. |
| 8,171,101 B2 | 5/2012 | Gladwin et al. |
| 8,190,593 B1 | 5/2012 | Dean |
| 8,234,370 B2 | 7/2012 | Hammer et al. |
| 8,285,808 B1 | 10/2012 | Joel et al. |
| 8,302,161 B2 | 10/2012 | Burch et al. |
| 8,306,022 B1 | 11/2012 | Cranor |
| 8,307,089 B1 | 11/2012 | Rothschild |
| 8,312,075 B1 | 11/2012 | Makinson et al. |
| 8,347,405 B2 | 1/2013 | Backhouse |
| 8,375,434 B2 | 2/2013 | Cottrell |
| 8,452,901 B1 | 5/2013 | Sandstrom et al. |
| 8,453,227 B2 | 5/2013 | Aiello |
| 8,458,786 B1 | 6/2013 | Kailash |
| 8,464,350 B2 | 6/2013 | Kanevsky |
| 8,479,251 B2 | 7/2013 | Feinleib et al. |
| 8,490,059 B2 | 7/2013 | Huang et al. |
| 8,499,059 B2 | 7/2013 | Stoyanov |
| 8,514,812 B2 | 8/2013 | Tang et al. |
| 8,516,084 B1 | 8/2013 | Grieve |
| 8,527,631 B1 | 9/2013 | Liang |
| 8,527,635 B2 | 9/2013 | Jeon et al. |
| 8,527,639 B1 | 9/2013 | Liskov et al. |
| 8,533,628 B2 | 9/2013 | Rohrabaugh |
| 8,543,721 B2 | 9/2013 | White et al. |
| 8,560,604 B2 | 10/2013 | Shribman et al. |
| 8,566,452 B1 | 10/2013 | Goodwin, III et al. |
| 8,577,724 B1 | 11/2013 | Gandhi |
| 8,595,786 B2 | 11/2013 | Choi |
| 8,612,641 B1 | 12/2013 | Bozarth et al. |
| 8,627,422 B2 | 1/2014 | Hawkes |
| 8,639,630 B2 | 1/2014 | Fomenko et al. |
| 8,639,748 B2 | 1/2014 | Kazerani et al. |
| 8,655,838 B2 | 2/2014 | Wright |
| 8,655,985 B2 | 2/2014 | De |
| 8,671,221 B2 | 3/2014 | Shribman et al. |
| 8,719,430 B2 | 5/2014 | Van Ackere |
| 8,719,505 B2 | 5/2014 | Shribman et al. |
| 8,769,035 B2 | 7/2014 | Resch et al. |
| 8,793,347 B2 | 7/2014 | Chow et al. |
| 8,832,179 B2 | 9/2014 | Owen et al. |
| 8,832,260 B2 | 9/2014 | Raja et al. |
| 8,838,811 B2 | 9/2014 | Chen |
| 8,874,594 B2 | 10/2014 | Want et al. |
| 8,935,418 B2 | 1/2015 | Knouse et al. |
| 8,935,798 B1 | 1/2015 | Smith |
| 8,972,602 B2 | 3/2015 | Mithyantha |
| 8,990,357 B2 | 3/2015 | Graham-Cumming |
| 8,996,856 B2 | 3/2015 | Amit |
| 9,015,335 B1 | 4/2015 | Gigliotti |
| 9,049,247 B2 | 6/2015 | Holloway |
| 9,059,938 B1 | 6/2015 | Strand |
| 9,060,031 B1 | 6/2015 | Taylor et al. |
| 9,071,668 B2 | 6/2015 | Brueck et al. |
| 9,100,320 B2 | 8/2015 | Hsy |
| 9,122,554 B2 | 9/2015 | Callaghan |
| 9,154,557 B2 | 10/2015 | Lev-Ran |
| 9,177,157 B2 | 11/2015 | Binder |
| 9,201,808 B2 | 12/2015 | Shribman et al. |
| 9,210,094 B1 | 12/2015 | Warren et al. |
| 9,237,210 B2 | 1/2016 | Liu |
| 9,253,164 B2 | 2/2016 | Gouge |
| 9,313,100 B1 | 4/2016 | Jenkins |
| 9,374,244 B1 | 6/2016 | Reed |
| 9,378,473 B2 | 6/2016 | Wolfe |
| 9,380,028 B2 | 6/2016 | Rizzo |
| 9,380,523 B1 | 6/2016 | Mijar |
| 9,418,243 B2 | 8/2016 | Bauer |
| 9,438,564 B1 | 9/2016 | Weng et al. |
| 9,444,903 B2 | 9/2016 | Nuaimi |
| 9,503,540 B2 | 11/2016 | Athas et al. |
| 9,529,911 B2 | 12/2016 | Richard et al. |
| 9,584,529 B2 | 2/2017 | Su |
| 9,634,994 B2 | 4/2017 | Prince |
| 9,654,581 B2 | 5/2017 | Pollack et al. |
| 9,660,895 B1 | 5/2017 | Bennett |
| 9,673,996 B1 | 6/2017 | Upadhyay et al. |
| 9,705,959 B1 | 7/2017 | Strand |
| 9,742,866 B2 | 8/2017 | Shribman |
| 9,769,121 B2 | 9/2017 | Joy et al. |
| 9,838,497 B2 | 12/2017 | Lawrence |
| 9,866,655 B2 | 1/2018 | Steiner et al. |
| 9,880,881 B1 | 1/2018 | Perez et al. |
| 9,979,674 B1 | 5/2018 | Kumar |
| 9,990,295 B2 | 6/2018 | Shribman et al. |
| 9,995,586 B2 | 6/2018 | Geelen |
| 10,069,852 B2 | 9/2018 | Turgeman et al. |
| 10,104,165 B1 | 10/2018 | Killian |
| 10,110,606 B2 | 10/2018 | Mizhar |
| 10,148,735 B1 | 12/2018 | Kolam |
| 10,182,466 B2 | 1/2019 | Nirantar |
| 10,277,711 B2 | 4/2019 | Shribman |
| 10,361,911 B2 | 7/2019 | Brandwine |
| 10,375,192 B1 | 8/2019 | Lepeska |
| 10,404,791 B2 | 9/2019 | Puri |
| 10,410,244 B2 | 9/2019 | Toval |
| 10,484,337 B2 | 11/2019 | Subbarayan |
| 10,484,510 B2 | 11/2019 | Shribman |
| 10,511,630 B1 | 12/2019 | Weiss et al. |
| 10,560,509 B2 | 2/2020 | Lo |
| 10,594,660 B2 | 3/2020 | Smith |
| 10,601,948 B1 | 3/2020 | Juravicius |
| 10,601,984 B2 | 3/2020 | Olligschlaeger |
| 10,630,771 B1 | 4/2020 | Garza et al. |
| 10,637,956 B1 | 4/2020 | Juravicius |
| 10,642,738 B1 | 5/2020 | Parakh et al. |
| 10,645,654 B1 | 5/2020 | Backholm |
| 10,650,166 B1 | 5/2020 | Sundberg |
| 10,652,357 B2 | 5/2020 | Shribman et al. |
| 10,671,439 B1 * | 6/2020 | Frandzel .............. H04L 47/805 |
| 10,735,322 B2 | 8/2020 | Alstad et al. |
| 10,743,051 B2 | 8/2020 | Reed |
| 10,749,893 B1 | 8/2020 | Dahlberg |
| 10,771,524 B1 | 9/2020 | Long |
| 10,798,209 B1 | 10/2020 | Juravicius et al. |
| 10,805,181 B2 | 10/2020 | Boutros et al. |
| 10,826,931 B1 * | 11/2020 | Quan ................ H04L 63/1441 |
| 10,887,313 B2 | 1/2021 | Mitevski |
| 10,972,434 B2 | 4/2021 | Kupisiewicz et al. |
| 11,140,235 B1 | 10/2021 | Vilcinskas et al. |
| 11,258,872 B1 | 2/2022 | Gogel |
| 11,424,946 B2 | 8/2022 | Shribman et al. |
| 11,469,992 B2 | 10/2022 | Gerstel |
| 11,574,536 B2 | 2/2023 | Saurin et al. |
| 11,593,446 B2 | 2/2023 | Shribman et al. |
| 11,614,893 B2 | 3/2023 | Kannan et al. |
| 11,635,877 B2 | 4/2023 | Lopez et al. |
| 11,658,876 B2 | 5/2023 | Hooda et al. |
| 11,677,853 B2 | 6/2023 | Acharya et al. |
| 11,757,961 B2 | 9/2023 | Shribman et al. |
| 11,818,096 B2 | 11/2023 | Jain et al. |
| 11,831,532 B2 | 11/2023 | Nakamura et al. |
| 2001/0011312 A1 | 8/2001 | Chu |

(56) References Cited

U.S. PATENT DOCUMENTS

| | | |
|---|---|---|
| 2001/0033583 A1 | 10/2001 | Rabenko et al. |
| 2001/0054020 A1 | 12/2001 | Barth |
| 2002/0007413 A1 | 1/2002 | Garcia-Luna-Aceves et al. |
| 2002/0026517 A1 | 2/2002 | Watson |
| 2002/0052947 A1 | 5/2002 | Duimovich et al. |
| 2002/0055956 A1 | 5/2002 | Krasnoiarov et al. |
| 2002/0055966 A1 | 5/2002 | Border et al. |
| 2002/0059371 A1 | 5/2002 | Jamail |
| 2002/0059429 A1 | 5/2002 | Carpenter |
| 2002/0065930 A1 | 5/2002 | Rhodes |
| 2002/0069241 A1 | 6/2002 | Narlikar et al. |
| 2002/0073075 A1 | 6/2002 | Dutta |
| 2002/0073232 A1 | 6/2002 | Hong |
| 2002/0078371 A1 | 6/2002 | Heilig et al. |
| 2002/0091760 A1 | 7/2002 | Rozen |
| 2002/0099781 A1 | 7/2002 | Scheussler et al. |
| 2002/0103823 A1 | 8/2002 | Jackson |
| 2002/0112036 A1 | 8/2002 | Bohannon |
| 2002/0112152 A1 | 8/2002 | VanHeyningen |
| 2002/0120874 A1 | 8/2002 | Shu et al. |
| 2002/0123895 A1 | 9/2002 | Potekhin |
| 2002/0169818 A1 | 11/2002 | Stewart |
| 2002/0178217 A1 | 11/2002 | Nguyen |
| 2002/0194183 A1 | 12/2002 | Yoakum |
| 2002/0194292 A1 | 12/2002 | King |
| 2003/0009518 A1 | 1/2003 | Harrow et al. |
| 2003/0009583 A1 | 1/2003 | Chan et al. |
| 2003/0018705 A1 | 1/2003 | Chen |
| 2003/0018834 A1 | 1/2003 | Eilers |
| 2003/0061282 A1 | 3/2003 | Ebata et al. |
| 2003/0065745 A1 | 4/2003 | Wolfe et al. |
| 2003/0074403 A1 | 4/2003 | Harrow et al. |
| 2003/0095520 A1 | 5/2003 | Aalbers |
| 2003/0097408 A1 | 5/2003 | Kageyama |
| 2003/0115364 A1 | 6/2003 | Shu et al. |
| 2003/0120805 A1 | 6/2003 | Couts |
| 2003/0149720 A1 | 8/2003 | Goldstein |
| 2003/0163413 A1 | 8/2003 | Wiczkowski |
| 2003/0174648 A1 | 9/2003 | Wang et al. |
| 2003/0187925 A1 | 10/2003 | Inala |
| 2003/0200307 A1 | 10/2003 | Raju et al. |
| 2003/0204602 A1 | 10/2003 | Hudson et al. |
| 2003/0210694 A1 | 11/2003 | Jayaraman et al. |
| 2003/0212648 A1 | 11/2003 | Cunningham et al. |
| 2003/0217144 A1 | 11/2003 | Fu et al. |
| 2003/0229682 A1 | 12/2003 | Day |
| 2003/0229718 A1 | 12/2003 | Tock |
| 2003/0229785 A1 | 12/2003 | Daseke |
| 2004/0044731 A1 | 3/2004 | Chen |
| 2004/0052257 A1 | 3/2004 | Abdo |
| 2004/0054748 A1 | 3/2004 | Ackaouy |
| 2004/0054800 A1 | 3/2004 | Shah |
| 2004/0068579 A1 | 4/2004 | Marmigere |
| 2004/0088646 A1 | 5/2004 | Yeager et al. |
| 2004/0111529 A1 | 6/2004 | Parmar |
| 2004/0117455 A1 | 6/2004 | Kaminsky |
| 2004/0133692 A1 | 7/2004 | Blanchet |
| 2004/0136370 A1 | 7/2004 | Moore et al. |
| 2004/0143665 A1 | 7/2004 | Mace |
| 2004/0153473 A1 | 8/2004 | Hutchinson |
| 2004/0162076 A1 | 8/2004 | Chowdry et al. |
| 2004/0199623 A1 | 10/2004 | Houri |
| 2004/0199629 A1 | 10/2004 | Bomer |
| 2004/0212490 A1 | 10/2004 | Fredericks |
| 2004/0215717 A1 | 10/2004 | Seifert |
| 2004/0221207 A1 | 11/2004 | Yokota |
| 2004/0230593 A1 | 11/2004 | Rudin |
| 2004/0236962 A1 | 11/2004 | Wong |
| 2004/0254907 A1 | 12/2004 | Crow et al. |
| 2004/0257761 A1 | 12/2004 | Park |
| 2004/0263479 A1 | 12/2004 | Shkolnikov |
| 2004/0264506 A1 | 12/2004 | Furukawa |
| 2005/0015552 A1 | 1/2005 | So et al. |
| 2005/0018645 A1 | 1/2005 | Mustonen et al. |
| 2005/0022236 A1 | 1/2005 | Ito et al. |
| 2005/0025070 A1 | 2/2005 | Yamada |
| 2005/0027782 A1 | 2/2005 | Jalan |
| 2005/0027834 A1 | 2/2005 | Chen et al. |
| 2005/0050097 A1 | 3/2005 | Yeh |
| 2005/0050317 A1 | 3/2005 | Kramer et al. |
| 2005/0060542 A1 | 3/2005 | Risan |
| 2005/0086328 A1 | 4/2005 | Landram et al. |
| 2005/0091399 A1 | 4/2005 | Candan et al. |
| 2005/0091540 A1 | 4/2005 | Dick |
| 2005/0096753 A1 | 5/2005 | Arling |
| 2005/0097217 A1 | 5/2005 | Val et al. |
| 2005/0097221 A1 | 5/2005 | James |
| 2005/0097441 A1 | 5/2005 | Herbach |
| 2005/0108244 A1 | 5/2005 | Riise |
| 2005/0108551 A1 | 5/2005 | Toomey |
| 2005/0120111 A1 | 6/2005 | Bailey et al. |
| 2005/0125412 A1 | 6/2005 | Glover |
| 2005/0138426 A1 | 6/2005 | Styslinger |
| 2005/0165903 A1 | 7/2005 | Doan |
| 2005/0180319 A1 | 8/2005 | Hutnik |
| 2005/0190059 A1 | 9/2005 | Wehrenberg |
| 2005/0198309 A1 | 9/2005 | Li et al. |
| 2005/0228964 A1 | 10/2005 | Sechrest et al. |
| 2005/0235044 A1 | 10/2005 | Tazuma |
| 2005/0246442 A1 | 11/2005 | Gutjahr |
| 2005/0289648 A1 | 12/2005 | Grobman et al. |
| 2006/0015545 A1 | 1/2006 | Ezra |
| 2006/0026304 A1 | 2/2006 | Price |
| 2006/0031407 A1 | 2/2006 | Dispensa et al. |
| 2006/0036755 A1 | 2/2006 | Abdullah |
| 2006/0039352 A1 | 2/2006 | Karstens |
| 2006/0047844 A1 | 3/2006 | Deng |
| 2006/0059091 A1 | 3/2006 | Wang |
| 2006/0075114 A1 | 4/2006 | Panasyuk |
| 2006/0155995 A1 | 7/2006 | Torvinen |
| 2006/0184647 A1 | 8/2006 | Dixit |
| 2006/0187830 A1 | 8/2006 | Nam |
| 2006/0200541 A1 | 9/2006 | Wikman et al. |
| 2006/0206586 A1 | 9/2006 | Ling |
| 2006/0212542 A1 | 9/2006 | Fang |
| 2006/0212584 A1 | 9/2006 | Yu et al. |
| 2006/0218285 A1 | 9/2006 | Talwar et al. |
| 2006/0224687 A1 | 10/2006 | Popkin |
| 2006/0236083 A1 | 10/2006 | Fritsch |
| 2006/0242318 A1 | 10/2006 | Nettle |
| 2006/0256772 A1 | 11/2006 | Yarlagadda |
| 2006/0259607 A1 | 11/2006 | O'Neal et al. |
| 2006/0259728 A1 | 11/2006 | Chandrasekaran et al. |
| 2006/0271438 A1 | 11/2006 | Shotland |
| 2006/0280191 A1 | 12/2006 | Nishida |
| 2006/0287738 A1 | 12/2006 | Rizzi et al. |
| 2006/0293052 A1 | 12/2006 | Orler |
| 2007/0011674 A1 | 1/2007 | Joo |
| 2007/0042332 A1 | 2/2007 | Leem |
| 2007/0047452 A1 | 3/2007 | Lohr |
| 2007/0050522 A1 | 3/2007 | Grove |
| 2007/0061440 A1 | 3/2007 | Sundaram |
| 2007/0073878 A1 | 3/2007 | Issa |
| 2007/0088821 A1 | 4/2007 | Sankuratripati |
| 2007/0100839 A1 | 5/2007 | Kim |
| 2007/0142036 A1 | 6/2007 | Wikman |
| 2007/0156855 A1 | 7/2007 | Johnson |
| 2007/0160072 A1 | 7/2007 | Thalanany et al. |
| 2007/0171921 A1 | 7/2007 | Wookey |
| 2007/0174246 A1 | 7/2007 | Sigurdsson |
| 2007/0174442 A1 | 7/2007 | Sherman et al. |
| 2007/0177513 A1 | 8/2007 | Kuokkanen |
| 2007/0180111 A1 | 8/2007 | Chmaytelli |
| 2007/0198401 A1 | 8/2007 | Kunz |
| 2007/0204003 A1 | 8/2007 | Abramson |
| 2007/0220145 A1 | 9/2007 | Kozakura et al. |
| 2007/0226810 A1 | 9/2007 | Hotti |
| 2007/0233706 A1 | 10/2007 | Farber et al. |
| 2007/0239655 A1 | 10/2007 | Agetsuma |
| 2007/0283026 A1 | 12/2007 | Lohmar |
| 2007/0299954 A1 | 12/2007 | Fatula |
| 2008/0008089 A1 | 1/2008 | Bornstein et al. |
| 2008/0010365 A1 | 1/2008 | Schneider |
| 2008/0025506 A1 | 1/2008 | Muraoka |

(56) References Cited

U.S. PATENT DOCUMENTS

| | | |
|---|---|---|
| 2008/0034072 A1 | 2/2008 | He et al. |
| 2008/0034416 A1 | 2/2008 | Kumar |
| 2008/0037536 A1 | 2/2008 | Padmanabhan |
| 2008/0045267 A1 | 2/2008 | Hind et al. |
| 2008/0046562 A1 | 2/2008 | Butler |
| 2008/0052156 A1 | 2/2008 | Brenner |
| 2008/0062879 A1 | 3/2008 | Sivakumar et al. |
| 2008/0071907 A1 | 3/2008 | Thompson |
| 2008/0071925 A1 | 3/2008 | Leighton |
| 2008/0072178 A1 | 3/2008 | Budzisch |
| 2008/0086730 A1 | 4/2008 | Vertes |
| 2008/0091812 A1 | 4/2008 | Lev-Ran |
| 2008/0098101 A1 | 4/2008 | Black |
| 2008/0109446 A1 | 5/2008 | Wang |
| 2008/0120427 A1 | 5/2008 | Ramanathan |
| 2008/0125123 A1 | 5/2008 | Dorenbosch |
| 2008/0134258 A1 | 6/2008 | Goose et al. |
| 2008/0140868 A1 | 6/2008 | Kalayjian et al. |
| 2008/0155016 A1 | 6/2008 | Tsai |
| 2008/0162700 A1 | 7/2008 | Aborn |
| 2008/0195712 A1 | 8/2008 | Lin et al. |
| 2008/0196098 A1 | 8/2008 | Cottrell |
| 2008/0201438 A1 | 8/2008 | Mandre |
| 2008/0209028 A1 | 8/2008 | Kurup |
| 2008/0214152 A1 | 9/2008 | Ramer |
| 2008/0222244 A1 | 9/2008 | Huang |
| 2008/0222267 A1 | 9/2008 | Horn |
| 2008/0222291 A1 | 9/2008 | Weller |
| 2008/0225710 A1 | 9/2008 | Raja |
| 2008/0228537 A1 | 9/2008 | Monfried |
| 2008/0228938 A1 | 9/2008 | Plamondon |
| 2008/0235361 A1 | 9/2008 | Crosbie et al. |
| 2008/0235385 A1 | 9/2008 | Li |
| 2008/0235391 A1 | 9/2008 | Painter et al. |
| 2008/0235623 A1 | 9/2008 | Li |
| 2008/0235746 A1 | 9/2008 | Peters |
| 2008/0243735 A1 | 10/2008 | Rish |
| 2008/0256175 A1 | 10/2008 | Lee |
| 2008/0263180 A1 | 10/2008 | Hurst |
| 2008/0263193 A1 | 10/2008 | Chalemin et al. |
| 2008/0270589 A1 | 10/2008 | Hwang |
| 2008/0282112 A1 | 11/2008 | Bailey |
| 2008/0288973 A1 | 11/2008 | Carson |
| 2008/0298328 A1 | 12/2008 | Sharma |
| 2008/0320151 A1 | 12/2008 | McCanne |
| 2009/0010426 A1 | 1/2009 | Redmond |
| 2009/0016337 A1 | 1/2009 | Jorgensen |
| 2009/0037529 A1 | 2/2009 | Armon-Kest |
| 2009/0037977 A1 | 2/2009 | Gai |
| 2009/0055471 A1 | 2/2009 | Kozat |
| 2009/0055749 A1 | 2/2009 | Chatterjee |
| 2009/0070489 A1 | 3/2009 | Lu |
| 2009/0077233 A1 | 3/2009 | Kurebayashi |
| 2009/0100005 A1 | 4/2009 | Guo |
| 2009/0106551 A1 | 4/2009 | Boren |
| 2009/0117846 A1 | 5/2009 | Mavrakakis |
| 2009/0136219 A1 | 5/2009 | Kikugawa |
| 2009/0138538 A1 | 5/2009 | Klein |
| 2009/0150534 A1 | 6/2009 | Miller |
| 2009/0150930 A1 | 6/2009 | Sherwin |
| 2009/0157850 A1 | 6/2009 | Gagliardi |
| 2009/0161554 A1 | 6/2009 | Agarwal |
| 2009/0177761 A1 | 7/2009 | Meyer |
| 2009/0182843 A1 | 7/2009 | Hluchyj |
| 2009/0187654 A1 | 7/2009 | Raja |
| 2009/0193498 A1 | 7/2009 | Agarwal |
| 2009/0199000 A1 | 8/2009 | Hsu |
| 2009/0204700 A1 | 8/2009 | Sudhaka |
| 2009/0216887 A1 | 8/2009 | Hertle |
| 2009/0217122 A1 | 8/2009 | Yokokawa et al. |
| 2009/0217351 A1 | 8/2009 | Burch |
| 2009/0222515 A1 | 9/2009 | Thompson |
| 2009/0228603 A1 | 9/2009 | Ritzau et al. |
| 2009/0232003 A1 | 9/2009 | Vasseur |
| 2009/0234970 A1 | 9/2009 | Sun |
| 2009/0248793 A1 | 10/2009 | Jacobsson |
| 2009/0262724 A1 | 10/2009 | Suzuki |
| 2009/0278506 A1 | 11/2009 | Winger |
| 2009/0279559 A1 | 11/2009 | Wong et al. |
| 2009/0287641 A1 | 11/2009 | Rahm |
| 2009/0292816 A1 | 11/2009 | Etchegoyen |
| 2009/0300208 A1 | 12/2009 | Lepeska |
| 2009/0307351 A1 | 12/2009 | Raja et al. |
| 2009/0313318 A1 | 12/2009 | Dye |
| 2009/0319502 A1 | 12/2009 | Chalouhi et al. |
| 2009/0320119 A1 | 12/2009 | Hicks |
| 2009/0327489 A1 | 12/2009 | Swildens |
| 2010/0002882 A1 | 1/2010 | Rieger et al. |
| 2010/0014464 A1 | 1/2010 | Hirano et al. |
| 2010/0030839 A1 | 2/2010 | Ceragioli et al. |
| 2010/0031183 A1 | 2/2010 | Kang |
| 2010/0036954 A1 | 2/2010 | Sakata |
| 2010/0042724 A1 | 2/2010 | Jeon |
| 2010/0066808 A1 | 3/2010 | Tucker et al. |
| 2010/0067703 A1 | 3/2010 | Candelore |
| 2010/0070725 A1 | 3/2010 | Prahlad et al. |
| 2010/0082513 A1 | 4/2010 | Liu |
| 2010/0082804 A1 | 4/2010 | Patel et al. |
| 2010/0085977 A1 | 4/2010 | Khalid et al. |
| 2010/0087167 A1 | 4/2010 | Tsurutome et al. |
| 2010/0094970 A1 | 4/2010 | Zuckerman |
| 2010/0095197 A1 | 4/2010 | Klevenz et al. |
| 2010/0095208 A1 | 4/2010 | White |
| 2010/0100952 A1 | 4/2010 | Sample |
| 2010/0105443 A1 | 4/2010 | Vaisanen |
| 2010/0115063 A1 | 5/2010 | Gladwin et al. |
| 2010/0115613 A1 | 5/2010 | Ramaswami |
| 2010/0125673 A1 | 5/2010 | Richardson |
| 2010/0125675 A1 | 5/2010 | Richardson |
| 2010/0145925 A1 | 6/2010 | Flinta |
| 2010/0146569 A1 | 6/2010 | Janardhan |
| 2010/0154044 A1 | 6/2010 | Manku |
| 2010/0161752 A1 | 6/2010 | Collet |
| 2010/0161756 A1 | 6/2010 | Lewis |
| 2010/0161760 A1 | 6/2010 | Maloo |
| 2010/0161799 A1 | 6/2010 | Maloo |
| 2010/0162126 A1 | 6/2010 | Donaldson |
| 2010/0180082 A1 | 7/2010 | Sebastian |
| 2010/0197239 A1 | 8/2010 | Catovic et al. |
| 2010/0235438 A1 | 9/2010 | Narayanan |
| 2010/0235473 A1 | 9/2010 | Koren |
| 2010/0262650 A1 | 10/2010 | Chauhan |
| 2010/0293555 A1 | 11/2010 | Vepsalainen |
| 2010/0322237 A1 | 12/2010 | Raja |
| 2010/0329270 A1 | 12/2010 | Asati et al. |
| 2011/0007665 A1 | 1/2011 | Dinur |
| 2011/0022582 A1 | 1/2011 | Unnikrishnan |
| 2011/0023125 A1 | 1/2011 | Kim |
| 2011/0035503 A1 | 2/2011 | Zaid |
| 2011/0066924 A1 | 3/2011 | Dorso |
| 2011/0069675 A1 | 3/2011 | Tang et al. |
| 2011/0072129 A1 | 3/2011 | Le Pennec et al. |
| 2011/0087733 A1 | 4/2011 | Shribman |
| 2011/0099619 A1 | 4/2011 | Jewell |
| 2011/0106972 A1 | 5/2011 | Grube |
| 2011/0117938 A1 | 5/2011 | Pyo |
| 2011/0128911 A1 | 6/2011 | Shaheen |
| 2011/0137973 A1 | 6/2011 | Wei |
| 2011/0145317 A1 | 6/2011 | Serban et al. |
| 2011/0154477 A1 | 6/2011 | Parla |
| 2011/0173345 A1 | 7/2011 | Knox |
| 2011/0208732 A1 | 8/2011 | Melton et al. |
| 2011/0218866 A1 | 9/2011 | Wilson |
| 2011/0231569 A1 | 9/2011 | Luby et al. |
| 2011/0255692 A1 | 10/2011 | Soliman et al. |
| 2011/0264809 A1 | 10/2011 | Koster |
| 2011/0282997 A1 | 11/2011 | Prince |
| 2011/0296048 A1 | 12/2011 | Knox et al. |
| 2011/0314347 A1 | 12/2011 | Nakano et al. |
| 2011/0320589 A1 | 12/2011 | Hietala |
| 2012/0002815 A1 | 1/2012 | Wei et al. |
| 2012/0005334 A1 | 1/2012 | Raja et al. |
| 2012/0023155 A1 | 1/2012 | Myers et al. |
| 2012/0023212 A1 | 1/2012 | Roth |

(56) References Cited

U.S. PATENT DOCUMENTS

| | | |
|---|---|---|
| 2012/0036220 A1 | 2/2012 | Dare |
| 2012/0059934 A1 | 3/2012 | Rafiq et al. |
| 2012/0089704 A1 | 4/2012 | Trahan et al. |
| 2012/0096116 A1 | 4/2012 | Mislove |
| 2012/0099566 A1 | 4/2012 | Laine et al. |
| 2012/0117641 A1 | 5/2012 | Holloway et al. |
| 2012/0124173 A1 | 5/2012 | De et al. |
| 2012/0124239 A1 | 5/2012 | Shribman |
| 2012/0124348 A1 | 5/2012 | Dundas et al. |
| 2012/0124384 A1 | 5/2012 | Livni et al. |
| 2012/0136926 A1 | 5/2012 | Dillon |
| 2012/0144047 A1 | 6/2012 | Armstrong |
| 2012/0164980 A1 | 6/2012 | Van Phan |
| 2012/0166582 A1 | 6/2012 | Binder |
| 2012/0166611 A1 | 6/2012 | Kim |
| 2012/0185947 A1 | 7/2012 | Phillips |
| 2012/0198524 A1 | 8/2012 | Celebisoy |
| 2012/0209945 A1 | 8/2012 | Chandrasekhar |
| 2012/0239785 A1 | 9/2012 | Pazos |
| 2012/0239811 A1 | 9/2012 | Kohli |
| 2012/0246273 A1 | 9/2012 | Bornstein |
| 2012/0246338 A1 | 9/2012 | Li |
| 2012/0254370 A1 | 10/2012 | Bacher |
| 2012/0254456 A1 | 10/2012 | Visharam |
| 2012/0254960 A1 | 10/2012 | Lortz |
| 2012/0264520 A1 | 10/2012 | Marsland |
| 2012/0271823 A1 | 10/2012 | Asikainen et al. |
| 2012/0290717 A1 | 11/2012 | Luna |
| 2012/0297041 A1 | 11/2012 | Momchilov |
| 2012/0310906 A1 | 12/2012 | Miller et al. |
| 2012/0311094 A1 | 12/2012 | Biderman et al. |
| 2012/0323674 A1 | 12/2012 | Simmons |
| 2012/0324113 A1 | 12/2012 | Prince et al. |
| 2013/0007031 A1 | 1/2013 | Makino |
| 2013/0007232 A1 | 1/2013 | Wang |
| 2013/0007253 A1 | 1/2013 | Li |
| 2013/0019258 A1 | 1/2013 | Bhatia |
| 2013/0041808 A1 | 2/2013 | Pham et al. |
| 2013/0046817 A1 | 2/2013 | Isbister |
| 2013/0047020 A1 | 2/2013 | Hershko |
| 2013/0060925 A1 | 3/2013 | Nagamine et al. |
| 2013/0064370 A1 | 3/2013 | Gouge |
| 2013/0067085 A1 | 3/2013 | Hershko et al. |
| 2013/0067086 A1 | 3/2013 | Hershko |
| 2013/0072233 A1 | 3/2013 | Sandholm |
| 2013/0080498 A1 | 3/2013 | Desilva |
| 2013/0080575 A1 | 3/2013 | Prince |
| 2013/0081129 A1 | 3/2013 | Niemelä |
| 2013/0083800 A1 | 4/2013 | Lezama Bounine |
| 2013/0091273 A1 | 4/2013 | Ly |
| 2013/0095806 A1 | 4/2013 | Salkintzis et al. |
| 2013/0097236 A1 | 4/2013 | Khorashadi et al. |
| 2013/0117252 A1 | 5/2013 | Samaddar et al. |
| 2013/0117413 A1 | 5/2013 | Kaneko |
| 2013/0124683 A1 | 5/2013 | Watanabe et al. |
| 2013/0145010 A1 | 6/2013 | Luna et al. |
| 2013/0145017 A1 | 6/2013 | Luna |
| 2013/0145036 A1 | 6/2013 | Ly et al. |
| 2013/0151649 A1 | 6/2013 | Luna |
| 2013/0151709 A1 | 6/2013 | Luna |
| 2013/0157699 A1 | 6/2013 | Talwar |
| 2013/0166768 A1 | 6/2013 | Gouache et al. |
| 2013/0167045 A1 | 6/2013 | Xu |
| 2013/0171964 A1 | 7/2013 | Bhatia |
| 2013/0173756 A1 | 7/2013 | Luna |
| 2013/0201316 A1 | 8/2013 | Binder et al. |
| 2013/0212205 A1 | 8/2013 | Flockhart et al. |
| 2013/0212462 A1 | 8/2013 | Athas |
| 2013/0219281 A1 | 8/2013 | Trevelyan |
| 2013/0219458 A1 | 8/2013 | Ramanathan |
| 2013/0246643 A1 | 9/2013 | Luby et al. |
| 2013/0262696 A1 | 10/2013 | Watanabe |
| 2013/0263280 A1 | 10/2013 | Cote |
| 2013/0268357 A1 | 10/2013 | Heath |
| 2013/0272519 A1 | 10/2013 | Huang |
| 2013/0275557 A1 | 10/2013 | Myers et al. |
| 2013/0304796 A1 | 11/2013 | Jackowski |
| 2013/0326607 A1 | 12/2013 | Feng |
| 2013/0332621 A1 | 12/2013 | Keller et al. |
| 2013/0337853 A1 | 12/2013 | Korn et al. |
| 2013/0339477 A1 | 12/2013 | Majeti |
| 2013/0340031 A1 | 12/2013 | Amit |
| 2013/0346472 A1 | 12/2013 | Wheeldon |
| 2014/0006479 A1 | 1/2014 | Maloo |
| 2014/0013001 A1 | 1/2014 | Cox |
| 2014/0040035 A1 | 2/2014 | Cusack |
| 2014/0059168 A1 | 2/2014 | Ponec et al. |
| 2014/0078462 A1 | 3/2014 | Abreu |
| 2014/0079225 A1 | 3/2014 | Jarske et al. |
| 2014/0082260 A1 | 3/2014 | Oh et al. |
| 2014/0108671 A1 | 4/2014 | Watson et al. |
| 2014/0115119 A1 | 4/2014 | Padinjareveetil |
| 2014/0122580 A1 | 5/2014 | Nuaimi |
| 2014/0122865 A1 | 5/2014 | Ovsiannikov |
| 2014/0133392 A1 | 5/2014 | Das et al. |
| 2014/0189069 A1 | 7/2014 | Gero et al. |
| 2014/0189802 A1 | 7/2014 | Montgomery |
| 2014/0199044 A1 | 7/2014 | Gupta |
| 2014/0201323 A1 | 7/2014 | Fall |
| 2014/0215391 A1 | 7/2014 | Little et al. |
| 2014/0222798 A1 | 8/2014 | Want et al. |
| 2014/0222963 A1 | 8/2014 | Gangadharan |
| 2014/0222974 A1 | 8/2014 | Liu |
| 2014/0223537 A1 | 8/2014 | Islam |
| 2014/0244727 A1 | 8/2014 | Kang et al. |
| 2014/0244778 A1 | 8/2014 | Wyatt |
| 2014/0258465 A1 | 9/2014 | Li |
| 2014/0259093 A1 | 9/2014 | Narayanaswamy |
| 2014/0269279 A1 | 9/2014 | Ismail et al. |
| 2014/0273923 A1 | 9/2014 | Papakostas |
| 2014/0280884 A1 | 9/2014 | Searle et al. |
| 2014/0282784 A1 | 9/2014 | Pfeffer |
| 2014/0283068 A1 | 9/2014 | Call et al. |
| 2014/0301334 A1 | 10/2014 | Labranche |
| 2014/0310709 A1 | 10/2014 | Nirantar |
| 2014/0337308 A1 | 11/2014 | De Francisci Morales |
| 2014/0344400 A1 | 11/2014 | Varney et al. |
| 2014/0344908 A1 | 11/2014 | Rizzo |
| 2014/0359081 A1 | 12/2014 | Van Deventer |
| 2014/0372624 A1 | 12/2014 | Wang et al. |
| 2014/0372627 A1 | 12/2014 | Axelrod |
| 2014/0376403 A1 | 12/2014 | Shao |
| 2015/0006615 A1 | 1/2015 | Wainner |
| 2015/0016261 A1 | 1/2015 | Backholm |
| 2015/0020106 A1 | 1/2015 | Belyaev et al. |
| 2015/0026239 A1 | 1/2015 | Hofmann |
| 2015/0026341 A1 | 1/2015 | Blacka |
| 2015/0032803 A1 | 1/2015 | Graham-Cumming |
| 2015/0033001 A1 | 1/2015 | Ivanov |
| 2015/0036485 A1 | 2/2015 | Poulson |
| 2015/0039674 A1 | 2/2015 | Agarwal |
| 2015/0055594 A1 | 2/2015 | Nirantar et al. |
| 2015/0058488 A1 | 2/2015 | Backholm |
| 2015/0067819 A1 | 3/2015 | Shribman |
| 2015/0074266 A1 | 3/2015 | Alisawi et al. |
| 2015/0092860 A1 | 4/2015 | Benight |
| 2015/0106221 A1 | 4/2015 | Tapley et al. |
| 2015/0120863 A1 | 4/2015 | Wu |
| 2015/0134848 A1 | 5/2015 | Mutz et al. |
| 2015/0135302 A1 | 5/2015 | Cohen |
| 2015/0143456 A1 | 5/2015 | Raleigh et al. |
| 2015/0149431 A1 | 5/2015 | Trevelyan |
| 2015/0153810 A1 | 6/2015 | Sasidharan et al. |
| 2015/0156525 A1 | 6/2015 | Lemmons |
| 2015/0169620 A1 | 6/2015 | Schmidt et al. |
| 2015/0172324 A1 | 6/2015 | Calme |
| 2015/0172406 A1 | 6/2015 | Hansen |
| 2015/0180762 A1 | 6/2015 | Medved et al. |
| 2015/0189401 A1 | 7/2015 | Yi |
| 2015/0199498 A1 | 7/2015 | Liu et al. |
| 2015/0206176 A1 | 7/2015 | Toval |
| 2015/0206197 A1 | 7/2015 | Toval |
| 2015/0207894 A1 | 7/2015 | De Los Reyes et al. |
| 2015/0208352 A1 | 7/2015 | Backholm |

(56) References Cited

U.S. PATENT DOCUMENTS

| | | |
|---|---|---|
| 2015/0215426 A1 | 7/2015 | Torii et al. |
| 2015/0237155 A1 | 8/2015 | Power et al. |
| 2015/0237159 A1 | 8/2015 | Lawrence et al. |
| 2015/0244839 A1 | 8/2015 | Horn |
| 2015/0268905 A1 | 9/2015 | Chakirov |
| 2015/0281331 A1 | 10/2015 | Steiner et al. |
| 2015/0295988 A1 | 10/2015 | Goodwin |
| 2015/0317218 A1 | 11/2015 | Verde |
| 2015/0341812 A1 | 11/2015 | Dion |
| 2015/0347118 A1 | 12/2015 | Yeung |
| 2015/0350362 A1 | 12/2015 | Pollack |
| 2015/0356289 A1 | 12/2015 | Brown et al. |
| 2015/0358648 A1 | 12/2015 | Limberg |
| 2015/0372972 A1 | 12/2015 | Kennedy |
| 2016/0021215 A1 | 1/2016 | Spencer |
| 2016/0021430 A1 | 1/2016 | LaBosco et al. |
| 2016/0029402 A1 | 1/2016 | Backholm et al. |
| 2016/0035019 A1 | 2/2016 | Rosner |
| 2016/0055225 A1 | 2/2016 | Xu et al. |
| 2016/0056880 A1 | 2/2016 | Yamasaki et al. |
| 2016/0077547 A1 | 3/2016 | Aimone |
| 2016/0098049 A1 | 4/2016 | Fan |
| 2016/0104346 A1 | 4/2016 | Ovalle et al. |
| 2016/0105530 A1 | 4/2016 | Shribman |
| 2016/0112213 A1 | 4/2016 | Lee et al. |
| 2016/0140405 A1 | 5/2016 | Graumann |
| 2016/0162706 A1 | 6/2016 | Famulari et al. |
| 2016/0164992 A1 | 6/2016 | Prasad et al. |
| 2016/0170814 A1 | 6/2016 | Li |
| 2016/0173452 A1 | 6/2016 | Seo |
| 2016/0188657 A1 | 6/2016 | Montana |
| 2016/0205028 A1 | 7/2016 | Luna |
| 2016/0205557 A1 | 7/2016 | Tuupola et al. |
| 2016/0232538 A1 | 8/2016 | Papakostas et al. |
| 2016/0241664 A1 | 8/2016 | Xia |
| 2016/0248803 A1 | 8/2016 | O'Connell et al. |
| 2016/0261688 A1 | 9/2016 | Anand |
| 2016/0269369 A1 | 9/2016 | Thomson |
| 2016/0294642 A1 | 10/2016 | Hopkins et al. |
| 2016/0294956 A1 | 10/2016 | Fix |
| 2016/0316280 A1 | 10/2016 | Bulley et al. |
| 2016/0323409 A1 | 11/2016 | Kölhi |
| 2016/0330075 A1 | 11/2016 | Tiwari et al. |
| 2016/0337464 A1 | 11/2016 | Eriksson |
| 2016/0352628 A1 | 12/2016 | Reddy et al. |
| 2016/0365989 A1 | 12/2016 | Herrero |
| 2016/0366233 A1 | 12/2016 | Le |
| 2016/0380778 A1 | 12/2016 | Shen et al. |
| 2017/0006075 A1 | 1/2017 | Li |
| 2017/0041416 A1 | 2/2017 | Zhou |
| 2017/0048192 A1 | 2/2017 | Herrero |
| 2017/0063948 A1 | 3/2017 | Shroff et al. |
| 2017/0094710 A1 | 3/2017 | Nirantar |
| 2017/0103140 A1 | 4/2017 | Zhang et al. |
| 2017/0118313 A1 | 4/2017 | Aladdin et al. |
| 2017/0149781 A1 | 5/2017 | Tubi et al. |
| 2017/0155654 A1 | 6/2017 | Burke |
| 2017/0187472 A1 | 6/2017 | Chini et al. |
| 2017/0195451 A1 | 7/2017 | Backholm |
| 2017/0220651 A1 | 8/2017 | Mathew et al. |
| 2017/0221092 A1 | 8/2017 | Toval |
| 2017/0230434 A1 | 8/2017 | Wang |
| 2017/0235848 A1 | 8/2017 | Van Dusen et al. |
| 2017/0250861 A1 | 8/2017 | Gheorghe |
| 2017/0272316 A1 | 9/2017 | Johnson |
| 2017/0272530 A1 | 9/2017 | Lo et al. |
| 2017/0272543 A1 | 9/2017 | Lo et al. |
| 2017/0331869 A1 | 11/2017 | Bendahan et al. |
| 2017/0339253 A1 | 11/2017 | Pathak |
| 2017/0359349 A1 | 12/2017 | Knecht |
| 2017/0374566 A1 | 12/2017 | Backholm |
| 2018/0019909 A1 | 1/2018 | Tanabe et al. |
| 2018/0020002 A1 | 1/2018 | Duca et al. |
| 2018/0020324 A1 | 1/2018 | Beauford |
| 2018/0027112 A1 | 1/2018 | Baldassari et al. |
| 2018/0034766 A1 | 2/2018 | Chiba |
| 2018/0042067 A1 | 2/2018 | Nirantar |
| 2018/0047072 A1 | 2/2018 | Chow |
| 2018/0063228 A1 | 3/2018 | Deen |
| 2018/0070129 A1 | 3/2018 | Cholas et al. |
| 2018/0077624 A1 | 3/2018 | Jung |
| 2018/0124123 A1 | 5/2018 | Moore et al. |
| 2018/0131668 A1 | 5/2018 | Prince |
| 2018/0146378 A1 | 5/2018 | Christmas et al. |
| 2018/0167336 A1 | 6/2018 | Lawrence |
| 2018/0191764 A1 | 7/2018 | Chawla et al. |
| 2018/0213038 A1 | 7/2018 | Chung |
| 2018/0213060 A1 | 7/2018 | Koonce |
| 2018/0219830 A1 | 8/2018 | O'Brien |
| 2018/0225387 A1 | 8/2018 | Pang |
| 2018/0226760 A1 | 8/2018 | Bolouri-Saransar et al. |
| 2018/0227210 A1 | 8/2018 | Cosgrove |
| 2018/0234364 A1 | 8/2018 | Gong et al. |
| 2018/0248926 A1 | 8/2018 | Binns et al. |
| 2018/0262388 A1 | 9/2018 | Johnson |
| 2018/0302292 A1 | 10/2018 | Khurana et al. |
| 2018/0337972 A1 | 11/2018 | Lepeska et al. |
| 2018/0349354 A1 | 12/2018 | Gonzalez |
| 2018/0363572 A1 | 12/2018 | Glugla et al. |
| 2018/0367433 A1 | 12/2018 | Luna |
| 2018/0367560 A1 | 12/2018 | Mahaffey |
| 2018/0375828 A1 | 12/2018 | Rawat |
| 2018/0375896 A1 | 12/2018 | Wang |
| 2018/0375952 A1 | 12/2018 | Knecht |
| 2019/0028548 A1 | 1/2019 | Lauer |
| 2019/0033845 A1 | 1/2019 | Cella |
| 2019/0036777 A1 | 1/2019 | Frizzell |
| 2019/0037047 A1 | 1/2019 | Shribman |
| 2019/0041934 A1 | 2/2019 | Tan et al. |
| 2019/0050164 A1 | 2/2019 | Kotian |
| 2019/0058902 A1 | 2/2019 | Kipp et al. |
| 2019/0059083 A1 | 2/2019 | Backholm |
| 2019/0068740 A1 | 2/2019 | Graham-Cumming |
| 2019/0098518 A1 | 3/2019 | Luna |
| 2019/0102280 A1 | 4/2019 | Caldato |
| 2019/0110173 A1 | 4/2019 | Collier |
| 2019/0116236 A1 | 4/2019 | He |
| 2019/0124018 A1 | 4/2019 | Zhang |
| 2019/0137594 A1 | 5/2019 | Annamalai et al. |
| 2019/0138560 A1 | 5/2019 | Holloway |
| 2019/0139075 A1 | 5/2019 | Cimino et al. |
| 2019/0140467 A1 | 5/2019 | Abiri et al. |
| 2019/0155665 A1 | 5/2019 | Bott |
| 2019/0166520 A1 | 5/2019 | Luna |
| 2019/0171474 A1 | 6/2019 | Malboubi |
| 2019/0174449 A1 | 6/2019 | Shan |
| 2019/0180316 A1 | 6/2019 | Toval |
| 2019/0182034 A1 | 6/2019 | McCarthy et al. |
| 2019/0199611 A1 | 6/2019 | Kotadia |
| 2019/0230394 A1 | 7/2019 | Gates et al. |
| 2019/0238510 A1 | 8/2019 | Li |
| 2019/0239208 A1 | 8/2019 | Misawa et al. |
| 2019/0260859 A1 | 8/2019 | Patil |
| 2019/0268308 A1 | 8/2019 | Sinha |
| 2019/0334864 A1 | 10/2019 | Yin et al. |
| 2019/0342607 A1 | 11/2019 | Major |
| 2019/0372878 A1 | 12/2019 | Chakra |
| 2019/0373083 A1 | 12/2019 | Nucci |
| 2019/0379766 A1 | 12/2019 | Decenzo |
| 2019/0385057 A1 | 12/2019 | Litichever et al. |
| 2019/0387430 A1 | 12/2019 | Ingerman |
| 2020/0007494 A1 | 1/2020 | Prince |
| 2020/0083706 A1 | 3/2020 | Paskov et al. |
| 2020/0136911 A1 | 4/2020 | Assali |
| 2020/0159622 A1 | 5/2020 | Chintagunta |
| 2020/0162432 A1 | 5/2020 | Ludin |
| 2020/0169536 A1 | 5/2020 | Santelia |
| 2020/0184035 A1 | 6/2020 | Santelia |
| 2020/0186614 A1 | 6/2020 | Luna |
| 2020/0205058 A1 | 6/2020 | Yoshikawa |
| 2020/0220746 A1 | 7/2020 | Shribman et al. |
| 2020/0259893 A1 | 8/2020 | James |
| 2020/0287867 A1 | 9/2020 | Knecht |
| 2020/0296036 A1 | 9/2020 | Chu |

(56) References Cited

U.S. PATENT DOCUMENTS

| | | | |
|---|---|---|---|
| 2020/0358858 A1 | 11/2020 | Shribman | |
| 2020/0382580 A1 | 12/2020 | Devanneaux et al. | |
| 2021/0058271 A1 | 2/2021 | Sung | |
| 2021/0075860 A1 | 3/2021 | Binder et al. | |
| 2021/0097112 A1 | 4/2021 | Zhang | |
| 2021/0141843 A1 | 5/2021 | Gabdrakipov | |
| 2021/0159548 A1 | 5/2021 | Deng et al. | |
| 2021/0194986 A1 | 6/2021 | Shribman et al. | |
| 2021/0234721 A1 | 7/2021 | Shribman et al. | |
| 2022/0070216 A1 | 3/2022 | Kohavi | |
| 2022/0100808 A1 | 3/2022 | Juravicius | |
| 2022/0103523 A1 | 3/2022 | Starr et al. | |
| 2022/0164400 A1 | 5/2022 | Holloway | |
| 2022/0173924 A1 | 6/2022 | Shribman et al. | |
| 2023/0289329 A1 | 9/2023 | Luthra et al. | |
| 2023/0379531 A1 | 11/2023 | Azuolas et al. | |
| 2024/0370190 A1* | 11/2024 | Sajeepa | G06F 3/0613 |

FOREIGN PATENT DOCUMENTS

| | | |
|---|---|---|
| CN | 102314348 | 1/2012 |
| CN | 105245607 B | 1/2016 |
| CN | 106534244 A | 3/2017 |
| CN | 106547793 A | 3/2017 |
| CN | 107832355 A | 3/2018 |
| CN | 107864143 A | 3/2018 |
| CN | 108551452 | 9/2018 |
| CN | 108924199 A | 11/2018 |
| CN | 110062025 A | 7/2019 |
| CN | 110071980 A | 7/2019 |
| CN | 110147271 A | 8/2019 |
| EP | 0948176 A2 | 10/1999 |
| EP | 1035708 | 9/2000 |
| EP | 1672826 | 6/2006 |
| EP | 2501104 | 9/2012 |
| EP | 2597869 A1 | 5/2013 |
| EP | 2922275 B1 | 3/2016 |
| EP | 3272105 | 3/2016 |
| EP | 4227829 | 8/2023 |
| GB | 2418108 A | 3/2006 |
| JP | H11-355302 | 12/1999 |
| JP | 2007280388 | 10/2007 |
| KR | 1020090097034 | 9/2009 |
| WO | 97/42582 A1 | 11/1997 |
| WO | 2000/018078 A1 | 3/2000 |
| WO | 2003023639 | 3/2003 |
| WO | 2004094980 | 11/2004 |
| WO | 2004094980 A2 | 11/2004 |
| WO | 2007/136665 | 11/2007 |
| WO | 2009/086134 A1 | 7/2009 |
| WO | 2010/014747 A2 | 2/2010 |
| WO | 2010090562 A1 | 12/2010 |
| WO | 2011/005390 A2 | 1/2011 |
| WO | 2011068784 A1 | 9/2011 |
| WO | 2015034752 A1 | 3/2015 |
| WO | 2015/157646 | 10/2015 |
| WO | 2016/123293 A1 | 8/2016 |
| WO | 2016181383 | 11/2016 |
| WO | 2016/198961 A2 | 12/2016 |
| WO | 2019/043687 | 3/2019 |

OTHER PUBLICATIONS

Screen captures from YouTube video clip entitle "nVpn.net | Double your Safety and use Socks5 + nVpn" 38 pages, last accessed Nov. 20, 2018 <https://www.youtube.com/watch?v=LOHct2kSnn4>.
Screen captures from YouTube video clip entitle "Andromeda" 47 pages, publicly known and available as of at least 2011 <https://www.youtube.com/watch?v=yRRYpFLbKNU>.
Screen captures from YouTube video clip entitle "Change Your Country IP Address & Location with Easy Hide IP Software" 9 pages, publicly known and available as of at least 2011, <https://www.youtube.com/watch?=ulwkf1sOfdA and https://www.youtube.com/watch?v=iFEMT-o9DTc>.
SpyEye, https://www.symantec.com/security-center/writeup/2010-020216-0135-9; http://securesql.info/riskyclouds/spyeye-user-manual; known as of at least 2010.
CoralCDN ("CoralCDN"), https://pdos.csail.mit.edu/6.824/papers/freedman-coral.pdf (14 Pages).
International Search Report issued in PCT Application No. PCT/US2010/051881 dated Dec. 9, 2010.
Supplementary European Search Report issued in EP Application No. 10822724 dated Apr. 24, 2013.
Notice of Preliminary Rejection in KR Application No. 10-2012-7011711 dated Jul. 15, 2016.
YouTube video clip entitled "nVpn.net | Double your Safety and use Socks5 + nVpn" <https://www.youtube.com/watch?v=LOHct2kSnn4>.
YouTube video clip entitled "Andromeda" <https://www.youtube.com/watch?v=yRRYpFLbKNU>.
YouTube video clip entitled "Change Your Country IP Address & Location with Easy Hide IP Software" <https://www.youtube.com/watch?v=ulwkf1sOfdA and https://www.youtube.com/watch?v=iFEMT-p9DTc>.
RFC 2186, Internet Cache Protocol (ICP), version 2, Sep. 1997 (9 pages).
Berners-Lee et al., RFC 1945, Hypertext Transfer Protocol, HTTP/1.0 (May 1996) (60 pages).
Leech et al., RFC 1928, Socks Protocol, Version 5 (Internet Engineering Task Force, Network Working Group, Mar. 1996) (9 pages).
Wessels, "Squid: The Definitive Guide," ISBN-10: 9780596001629, ISBN-13: 978-0596001629, O'Reilly Media; 1st Ed. (Jan. 1, 2004) (468 pages).
Luotonen, "Web Proxy Servers," ISBN-10: 0136806120, ISBN-13: 978-0136806127, Prentice Hall; 1st Ed. (Dec. 30, 1997) (452 pages).
Loutonen et al., "World-Wide Web proxies," Computer Networks and ISDN Systems 27, 147-154 (Elsevier Science B. V.) (1994) (8 pages).
Cooper et al., RFC 3040, Internet Web Replication and Caching Taxonomy (Jan. 2001) (32 pages).
ISO/IEC 23009-1:2012(E), MPEG-DASH standard, Jan. 5, 2012 (133 pages).
ProxyList.net, as captured by the Wayback Machine (web.archive.org), on Jul. 17, 2011 (1 page).
Printout of VIP72 Youtube web page at https://www.youtube.com/watch?v=LOHct2kSnn4, retrieved Nov. 21, 2019 (1 page).
VIP72 Scene Images extracted from VIP72.com/nvpnnet, MPEG-4 video recording of "nVPN.net | Double your Safety and use Socks5 +nVpn", accessed from https://www.youtube.com/watch?v=LOHct2kSnn4, published Sep. 11, 2011 (221 pages).
Certification dated Nov. 8, 2019 of Anjali Shresta of Google, Proof of Date for VIP72 Youtube web page and video (4 pages).
VIP72.com home page as of 2013 from Wayback Machine (3 pages).
Case IPR2020-00167—Corrected Petition for Inter Partes Review of U.S. Pat. No. 9,742,866 (57 pages).
Case IPR2020-00166—Corrected Petition for Inter Partes Review of U.S. Pat. No. 9,241,044 (75 pages).
Michael K. Reiter and Aviel D. Rubin, "Crowds: Anonymity for Web Transactions", ACM Transactions on Information and System Security, Nov. 1998 (27 pages).
Rennhard, Marc, "MorphMix—A Peer-to-Peer based System for Anonymous Internet Access", 2004 (307 pages).
Ari Luotonen, "Web Proxy Servers," ISBN-10: 0136806120, ISBN-13: 978-0136806127, Prentice Hall; 1st Ed. 1998 (452 pages).
RFC 760, DOD Standard Internet Protocol, Jan. 1980 (46 pages).
RFC 2547, BGP/MPLS VPNs, Mar. 1999 (25 pages).
RFC 1180, A TCP/IP Tutorial, Jan. 1991 (28 pages).
RFC 1122, Requirements for Internet Hosts—Communication Layers, Oct. 1989 (116 pages).
Andrei Popescu, Google, Inc, Geolocation API Specification, W3C Working Draft Dec. 22, 2008 (8 pages).
Andrei Popescu, Google, Inc, Geolocation API Specification, W3C Recommendation Oct. 24, 2013 (10 pages).

(56) References Cited

OTHER PUBLICATIONS

Yong Wang, et al., Towards Street-Level Client-Independent IP Geolocation, 2011 (14 pages).
William R. Stanek, Introducing Microsoft Windows Vista 81, 2006 (9 pages).
IEEE Std 802-2001, IEEE Standard for Local and Metropolitan Area Networks: Overview and Architecture, Feb. 7, 2002 (47 pages).
Scott Lowe, Use Resource Monitor to monitor network performance—TechRepublic, Jul. 29, 2011 (11 pages).
Greg Shultz, Windows Vista's Task Manager: The harder-to-detect changes—TechRepublic, Feb. 21, 2007 (16 pages).
Gavin Gear, Windows 8 Task Manager In-Depth, Jun. 6, 2013 (32 pages).
Kei Suzuki, a study on Cooperative Peer Selection Method in P2P Video Delivery, vol. 109, No. 37, IEICE Technical Engineers Report, The Institute of Electronics, Information and Communication, May 14, 2009.
Third-party submission under 37 CFR 1.290 filed on Jul. 23, 2019 and entered in U.S. Appl. No. 16/140,749.
Third-party submission under 37 CFR 1.290 filed on Jul. 23, 2019 and entered in U.S. Appl. No. 16/140,785.
Third-party submission under 37 CFR 1.290 filed on Jul. 23, 2019 and entered in U.S. Appl. No. 16/214,433.
Third-party submission under 37 CFR 1.290 filed on Jul. 23, 2019 and entered in U.S. Appl. No. 16/214,451.
Third-party submission under 37 CFR 1.290 filed on Jul. 23, 2019 and entered in U.S. Appl. No. 16/214,476.
Third-party submission under 37 CFR 1.290 filed on Jul. 23, 2019 and entered in U.S. Appl. No. 16/214,496.
Third-party submission under 37 CFR 1.290 filed on Jul. 23, 2019 and entered in U.S. Appl. No. 16/292,363.
Third-party submission under 37 CFR 1.290 filed on Jul. 22, 2019 and entered in U.S. Appl. No. 16/292,364.
Third-party submission under 37 CFR 1.290 filed on Jul. 23, 2019 and entered in U.S. Appl. No. 16/292,374.
Third-party submission under 37 CFR 1.290 filed on Jul. 23, 2019 and entered in U.S. Appl. No. 16/292,382.
Third-party submission under 37 CFR 1.290 filed on Jul. 25, 2019 and entered in U.S. Appl. No. 16/365,250.
Third-party submission under 37 CFR 1.290 filed on Jul. 25, 2019 and entered in U.S. Appl. No. 16/365,315.
"Slice Embedding Solutions for Distributed Service Architectures"—Esposito et al., Boston University, Feb. 12, 2011 http://www.cs.bu.edu/techreports/pdf/2011-025-slice-embedding.pdf (Year 2011) (16 pages).
Octoparse Blog: "Top 20 Web Crawling Tools to Scrape the Websites Quickly", Aug. 23, 2019 (15 pages).
Archived Internet Society webpage for TCP Keepalive Howto, available at https://web.archive.org/web/20080611153148/https://tldp.org/HOWTO/TCP-Keepalive-HOWTO/index.html, Jun. 11, 2008 (15 pages).
R. Fielding et al., RFC 2616: Hypertext Transfer Protocol—HTTP/1.1, Jun. 1999, retrieved from the Internet http://rcf-editor.org [retrieved Apr. 15, 2002].
Syverson P., Reed M. G., Goldschlag M., "Towards an Analysis of Onion Routing Security", "Workshop on Design Issues in Anonymity and Unobservability", Berkeley, CA, Jul. 2000 (14 pages).
International Organization for Standardization, ISO 8601, "Data elements and interchange formats—Information Interchange—Representation of dates and times", 1988 (19 pages).
IETF RFC 675 "Specification of Internet Transmission Control Program", Dec. 1974 (70 pages).
IETF RFC 793 "Protocol Specification", Sep. 1981 (90 pages).
IETF RFC 791 "Protocol Specification", Sep. 1981 (50 pages).
IETF RFC 1349 "Type of Service in the Internet Protocol Suite", Jul. 1992 (28 pages).
IETF RFC 2460 "Internet Protocol, Version 6 (IPv6)", Dec. 1998 (39 pages).
IETF RFC 3315 "Dynamic Host Configuration Protocol for IPV6 (DHCPv6)", Jul. 2003 (101 pages).
IETF RFC 2131 "Dynamic Host Configuration Protocol", Mar. 1997 (45 pages).
IETF RFC 1034 "Domain Names—Concepts and Facilities", Nov. 1987 (52 pages).
IETF RFC 1035 "Domain Names—Implementation and Specification", Nov. 1987 (52 pages).
IETF RFC 792, "Internet Control Message Protocol: DARPA Internet Program Protocol Specification", Sep. 1981 (21 pages).
IETF RFC 1072, "TCP Extensions for Long-Delay Paths", Oct. 1988 (16 pages).
IETF RFC 1323, "TCP Extensions for High Performance", May 1992 (37 pages).
IETF RFC 1825, "Security Architecture for the Internet Protocol", Aug. 1995 (22 pages).
IETF RFC 2401, "Security Architecture for the Internet Protocol", Nov. 1998 (66 pages).
IETF RFC 1826, "IP Authentication Header", Aug. 1995 (13 pages).
IETF RFC 4301, "Security Architecture for the Internet Protocol", Dec. 2005 (101 pages).
IETF RFC 1827, "IP Encapsulating Security Payload (ESP)", Aug. 1995 (12 pages).
IETF RFC 1828, "IP Authentication using Keyed MD5", Aug. 1995 (6 pages).
IETF RFC 1829, "The ESP DES-CBC Transform", Aug. 1995 (11 pages).
IETF RFC 1885, "Internet Control Message Protocol (ICMPv6) for the Internet Protocol Version 6 (IPv6) Specification", Dec. 1995 (20 pages).
IETF RFC 1918, "Address Allocation for Private Internets", Feb. 1996 (9 pages).
IETF RFC 2463, "Internet Control Message Protocol (ICMPv6) for the Internet Protocol Version 6 (IPv6) Specification", Dec. 1998 (18 pages).
IETF RFC 2464, "Transmission of IPV6 Packets over Ethernet Networks", Dec. 1998 (7 pages).
IETF RFC 2547, "BGP/MPLS VPNs", Mar. 1999 (25 pages).
IETF RFC 2616, "Hypertext Transfer Protocol—HTTP/1.1", Jun. 1999 (114 pages).
IETF RFC 2914, "Congestion Control Principles", Sep. 2000 (17 pages).
IETF RFC 3207, "SMTP Service Extension for Secure SMTP over Transport Layer Security", Feb. 2002 (9 pages).
IETF RFC 3489, "STUN—Simple Traversal of User Datagram Protocol (UDP) Through Network Address Translators (NATs)", Mar. 2003 (47 pages).
IETF RFC 4026, "Provider Provisioned Virtual Private Network (VPN) Terminology", Mar. 2005 (20 pages).
IETF RFC 4309, "Using Advanced Encryption Standard (AES) CCM Mode with IPsec Encapsulating Security Payload (ESP)", Dec. 2005 (13 pages).
IETF RFC 5246, "The Transport Layer Security (TLS) Protocol Version 1.2", Aug. 2008 (104 pages).
IETF RFC 6520, "Transport Layer Security (TLS) and Datagram Transport Layer Security (DTLS) Heartbeat Extension", Feb. 2012 (9 pages).
IETF RFC 7230, "Hypertext Transfer Protocol (HTTP/1.1): Message Syntax and Routing", Jun. 2014 (89 pages).
IETF RFC 7231, "Hypertext Transfer Protocol (HTTP/1.1): Semantics and Content", Jun. 2014 (101 pages).
IETF RFC 7232, "Hypertext Transfer Protocol (HTTP/1.1): Conditional Requests", Jun. 2014 (28 pages).
IETF RFC 7233, "Hypertext Transfer Protocol (HTTP/1.1): Range Requests", Jun. 2014 (25 pages).
IETF RFC 7234, "Hypertext Transfer Protocol (HTTP/1.1): Caching", Jun. 2014 (43 pages).
IETF RFC 7235, "Hypertext Transfer Protocol (HTTP/1.1): Authentication", Jun. 2014 (19 pages).
Peter Snyder, "tmpfs: A Virtual Memory File System", Sun Microsystem Inc. date unknown, downloaded on Jul. 2014 (8 pages).
IETF RFC 2198, "RTP Payload for Redundant Audio Data", Sep. 1997 (11 pages).

(56) References Cited

OTHER PUBLICATIONS

IEEE Std. 802.3ae-2002—IEEE Standard for Information technology—Local and metropolitan area networks—Specific requirements Part 3: CSMA/CD Access Method and Physical Layer Specifications, by Electrical and Electronic Engineers, Inc. Aug. 30, 2002 (530 pages).
IEEE Std. 802.3ba-2010—IEEE Standard for Information technology—Local and metropolitan area networks—Specific requirements Part 3: CSMA/CD Access Method and Physical Layer Specifications, by LAN/MAN Standards Committee, Jun. 22, 2010 (457 pages).
University of Michigan paper "Dictionary-Based Compression for Long Time-Series Similarity", by Willis Lang, Michael Morse, and Jignesh M. Patel, downloaded from http://pages.cs.wisc.edu/ on Aug. 2014.
Carnegie Mellon University, chapter: "Introduction to Data Compression", by Guy E. Blelloch, dated Jan. 31, 2013 (55 pages).
University of Toronto, Department of Computer Science presentation "Tutorial on Socket Programming", by Amin Tootoonchian, downloaded on Aug. 2014 (27 pages).
Wiley Publishing, Inc. publication "Professional Linux Kernel Architecture", by Wofgang Mauerer published 2008 (1370 pages).
"WiFi Technology" by Telecom Regulatory Authority, published on Jul. 2003 (60 pages).
Reed et al., "Anonymous Connections and Onion Routing", Naval Research Laboratory, Mar. 1998 https://www.onion-router.net/Publications/JSAC-1998.pdf (Year: 1998).
Michael J. Freedman, Princeton University, "Experiences with CoralCDN: a five-year operational view", Proceeding NSDI'10 Proceedings of the 7th USENIX conference on Networked systems design and implementation San Jose, California—Apr. 28-30, 2010 (17 pages).
"The BitTorrent Protocol Specification", Website: https://web.archive.org/web/20120513011037/http:/www.bittorrent.org/beps/bep_0003.html describing BitTorrent dated Jan. 10, 2008 downloaded using web archive on Aug. 16, 2019 (6 pages).
"BitTorrent", Website: https://en.wikipedia.org/w/index.php?title=BitTorrent&oldid=530466721 describing BitTorrent dated Dec. 30, 2012 downloaded using Wikipedia on Aug. 16, 2019 (9 pages).
"VIP SOCKS/VPN Service", Website: http://vip72.com:80/?drgn=1 describing VIP72 proxy service dated Jan. 2010 downloaded using VIP Technologies webpage on Aug. 16, 2019 (3 pages).
"Welcome to Easy Hide IP", Website: https://web.archive.org/web/20130702093456/http://www.easy-hide-ip.com:80/ describing Easy Hide IP dated Jun. 26, 2007 downloaded using web archive on Aug. 16, 2019 (2 pages).
"You make it fun; we'll make it run", Website: https://web.archive.org/web/20130726050810/https://www.coralcdn.org describing CoralCDN dated Jan. 25, 2005 downloaded using web archive on Aug. 16, 2019 (2 pages).
"Net Transport", Website: http://www.xi-soft.com/default.htm describing Net Transport Overview dated 2005 downloaded using Net Transport webpage on Aug. 16, 2019 (2 pages).
Net Transport—Develop History, Website: http://www.xi-soft.com/download.htm describing Net Transport Download dated 2005 downloaded using Net Transport webpage on Aug. 16, 2019 (10 pages).
Net Transport FAQ, Website: http://www.xi-soft.com/faq.htm describing Net Transport FAQ dated 2005 downloaded using Net Transport webpage on Aug. 16, 2019 (4 pages).
Net Transport News, Website: http://www.xi-soft.com/news.htm describing Net Transport News dated 2005 downloaded using Net Transport webpage on Aug. 16, 2019 (5 pages).
W3C, Glossary of Terms for Device Independence, Jan. 2005 (12 pages).
RFC 1001: Protocol Standard for a NetBIOS Service on a TCP/UDP Transport: Concepts and Methods, Mar. 1987 (68 pages).
RFC 1630: Universal Resource Identifiers in WWW, Jun. 1994 (28 pages).
RFC 2960: Stream Control Transmission Protocol, Oct. 2000 (134 pages).
RFC 6520: Transport Layer Security (TLS) and Datagram Transport Layer Security (DTLS) Heartbeat Extension, Feb. 2012 (9 pages).
L.L. Peterson, B.S. Davie, Computer Networks: A Systems Approach, 4th ed., San Francisco, CA, 2007 (20 pages).
Mell et al., "Creating a Patch and Vulnerability Management Program", NIST Special Publication 800-40 Version 2.0, 2005 (76 pages).
Rowstron et al., "Pastry: Scalable, Decentralized Object Location, and Routing for Large-Scale Peer-to-Peer Systems", IFIP/ACM International Conference on Distributed Systems Platforms and Open Distributed Processing: Middleware 2001, pp. 329-350 (22 pages).
Ratnasamy, et al., "Topologically aware overlay construction and server selection", Proceedings Twenty-First Annual Joint Conference of the IEEE Computer and Communications Societies, vol. 3, pp. 1190-1199 (2002) (10 pages).
Padmanabhan et al., "An Investigation of Geographic Mapping Techniques for Internet Hosts", ACM SIGCOMM Computer Communication Review, vol. 3, No. 4, pp. 173-185 (2001) (13 pages).
Freedman et al., "Oasis: Anyeast for Any Service", Proceedings of the 3rd Conference on Networked Systems Design & Implementation, vol. 3, pp. 129-142 (2006) (14 pages).
Agarwal et al., "Matchmaking for Online Games and Other Latency-Sensitive P2P Systems", ACM SIGCOMM Computer Communication Review, vol. 39. No. 4, pp. 315-326 (2009) (12 pages).
H. Casanova, "Benefits and Drawbacks of Redundant Batch Requests", Journal of Grid Computing, vol. 5, pp. 235-250 (2007) (16 pages).
S. J. Murdoch, "New Tor distribution for testing: Tor Browser Bundle", Jan. 30, 2008 post to tor-talk mailing list (1 page).
Erich Gamma et al., Design Patterns: Elements of Reusable Object-Oriented Software (1st ed., 1994) (12 pages).
L.J Fogel et al., "Modeling the Human Operator with Finite-State Machines" NASA Contractor Report (Jul. 1968) (238 pages).
MacPherson Decl. Exh. A, IEEE 802.11-2007—Telecommunications and Information Exchange Between Systems—Local and Metropolitan Area Networks—Specific Requirements—Part 11: Wireless LAN Medium Access Control (MAC) and Physical Layer (PHY) Specifications, Revision of ANSI/IEEE Std 802.11, 1999 Edition (R2003) (1236 pages).
W. R. Stevens "TCP/IP Illustrated, vol. I: The Protocols", Addison Wesley Longman, Inc. 1994 (67 pages).
Michael J. Freedman et al., "Democratizing content publication with Coral", In Proc. 1st Symposium, Mar. 2004 (14 pages).
Andy Oram, "Peer-to-Peer: Harnessing the Power of Disruptive Technology", Chapters Accountability and Free Haven, First Edition Mar. 2001 (265 pages).
RFC 2109, HTTP State Management Mechanism, Feb. 1997 (21 pages).
HTTP Wikipedia, year 2024 retrieved from Internet Mar. 22, 2024 (21 pages).
"Private Proxy Goes Global With a Netherlands Anonymous Proxy Server" University of South Florida Feb. 22, 2008 (1 page).
RFC 3143, Known HTTP Proxy/Caching Problems, Jun. 2001 (32 pages).
Perspective Access Networks, A dissertation presented by Geoffrey Lewis Goodell, Jul. 2006 (292 pages).
Perspective Access Networks, by Geoffrey Lewis Goodell, 2006 (1 page).
Perspective access networks, by Geoffrey Lewis Goodell, Dissertation Abstracts International. vol. 67, No. 12, 2006 (2 pages).
Dissertation Abstracts International. by ProQuest, vol. 65, No. 05, Nov. 2004 (11 pages).
Roger Dingledine and Nick Mathewson, Design of a blocking-resistant anonymity system, Tor Tech Report Nov. 1, 2006 (25 pages).
Printout of 2006 capture history of afs.eecs.harvard.edu/'goodell/thesis.pdf from Internet Archive's Wayback Machine (2 pages).
Printout of 2007 capture history of afs.eecs.harvard.edu/'goodell/thesis.pdf from Internet Archive's Wayback Machine (2 pages).
Printout of capture of http://serifos.eecs.harvard.edu/cgi-bin/blossom.pl dated Sep. 5, 2006, from Internet Archive's Wayback Machine (1 page).

(56) References Cited

OTHER PUBLICATIONS

Printout of https://ethanzuckerman.com/2006/04/06/blossom-tor-and-touring-the-internets/, a blog post entitled: "Blossom, Tor and touring the internets" dated Apr. 6, 2006 (9 pages).
Printout of search on Google Scholar for "Perspective Access Networks", date unknown (1 page).
Printout of capture of http://afs.eecs.harvard.edu/'goodlell/blossom/bib/author.html dated Sep. 2, 2006, from Internet Archive's Wayback Machine (45 pages).
Printout of capture history of http://afs.eecs.harvard.edu/'goodell/blossom/bib/author.html from Internet Archive's Wayback Machine, date unknown (2 pages).
Printout of capture of http://afs.eecs.harvard.edu/'goodlell/blossom/ dated Sep. 2, 2006, from Internet Archive's Wayback Machine (2 pages).
Printout of capture of http://youtube.com/ dated Aug. 29, 2005, from Internet Archive's Wayback Machine (2 pages).
Brian Mariani, "Userland Hooking in Windows", by High-Tech Bridge SA, Aug. 3, 2011 (33 pages).
"Filter Driver Development Guide", Version 1.0a by Microsoft Corporation dated 2004 (28 pages).
Samsung Electronics Co. Ltd., presentation "Google™ Chrome OS User Guide", published 2011, version 1.00 (41 pages).
Hubert Kirrmann, "Highly Available Automation Networks Standard Redundancy Methods—Rationale behind the IEC 63429 standard suite", by ABB Switzerland Ltd., 2012 presentation, downloaded Jul. 2014 (51 pages).
IBM Corporation, International Technical Support Organization Redbook Documents No. SG24-4756-00 "Local area Network Concepts and Products: LAN Operation Systems and management", 1st Edition, May 1996 (216 pages).
Cisco Systems, Inc. publication No. 1-587005-001-3 (Jul. 1999), "Internetworking Technologies Handbook", Chapter 30: "Open System Interconnection Protocols", pp. 30-31 to 30-16 (16 pages).
Cisco Systems, Inc. publication No. 1-587005-001-3 (Jul. 1999), "Internetworking Technologies Handbook", Chapter 7: "Ethernet Technologies", pp. 7-1 to 7-38 (38 pages).
Cisco Systems, Inc. publication No. 1-587005-001-3 (Jul. 1999), "Internetworking Technologies Handbook", Chapter 32: "IPv6", pp. 32-1 to 32-6 (6 pages).
Standard Microsystems Corporation (SMSC) "LAN91C111 10/100 Non-PCI Ethernet Single Chip MAC + PHY" Data-Sheet, Rev. 15 (Feb. 20, 2004) (127 pages).
Cisco Systems, Inc. (Jul. 1999), "Internetworking Technologies Handbook", Chapter 18: "Multiservice Access Technologies", pp. 18-1 to 18-10 (10 pages).
Syverson P.; Reed M. G.; Goldschlag M., "Onion Routing for Anonymous and Private Internet Connections", Communications of the ACM, vol. 42, No. 2, Feb. 1999 (5 pages).
Cisco Systems, Inc. publication No. 1-587005-001-3 (Jun. 1999), "Internetworking Technologies Handbook", Chapter 45: "OSI Routing", pp. 45-1 to 45-8 (8 pages).
Syverson P.; Reed M. G.; Goldschlag M.: "Anonymous Connections and Onion Routing", IEEE Journal On Selected Areas in Communication Special Issue On Copyright and Privacy Protection, 1998 (15 pages).
Overlier L., Syverson P., "Improving Efficiency and Simplicity of Tor circuit establishment and hidden services", Proceedings of the 2007 Privacy Enhancing Technologies Symposium, Springer-Verlag, LNCS 4776 (20 pages).
IBM Corporation, International Technical Support Organization Redbook Document No. SG24-2580-01 "IP Network Design Guide", 2nd Edition Jun. 1999 (324 pages).
IBM Corporation, International Technical Support Organization Redbook Document No. GG24-3376-07 "TCP/IP Tutorial and Technical Overview", 8th Edition Dec. 2006 (1004 pages).
IBM Corporation, International Technical Support Organization Redbook Document No. GG24-4338-00 "Introduction to Networking Technologies", 1st Edition Apr. 1994 (220 pages).

Cisco Systems, Inc. publication No. 1-587005-001-3 (Jul. 1999), "Internetworking Technologies Handbook", Chapter 5: "Routing Basics", pp. 5-1 to 5-10 (10 pages).
Cisco Systems, Inc. publication No. 1-587005-001-3 (Jul. 1999), "Internetworking Technologies Handbook", Chapter 51: "Security", pp. 51-1 to 51-12 (12 pages).
Cisco Systems, Inc. publication No. 1-587005-001-3 (Jul. 1999), "Internetworking Technologies Handbook", Chapter 19: "Voice / Data Integration Technologies", pp. 19-1 to 19-30 (30 pages).
Alan Grosskurth; Michael W. Godfrey, "Architecture and Evolution of the Modern Web Browser", University of Waterloo in Canada, Jun. 20, 2006 (24 pages).
Information Systems Audit and Control Association (ISACA) whitepaper, "Geolocation: Risk, Issues and Strategies", 2011 (13 pages).
"Android Tutoriap", downloaded from tutorialspoint.com on Jul. 2014 (216 pages).
Anna Lewis; Graeme Benge; Gemma Hollooway: "The Practical Guide To Google Analytics For Business", 2nd Edition, published 2013, Koozai Ltd. (77 pages).
Dingledine R.; Mathewson N.; Syverson P.: "Tor: The Second-Generation Onion Router", In Proceedings of the 13th Usenix Security Symposium, Aug. 2004 (17 pages).
Brian Mariani, "Inline Hooking in Windows", by High-Tech Bridge SA, Sep. 6, 2011 (26 pages).
Chaum D.: "Untraceable electronic mail, return addresses, and digital pseudonyms", In Communications of the ACM, vol. 24, No. 2, Feb. 1981, pp. 84-88 (5 pages).
Dingledine R.; Mathewson N.: "Tor Protocol specification", downloaded Nov. 2010 from www.torproject.org (12 pages).
"Tor Directory Protocol Version 3", downloaded Nov. 2010 from www.torproject.org (29 pages).
"TC: Tor Control Protocol (Version 1)", downloaded Nov. 2010 from www.torproject.org (24 pages).
Yong Wang et al., "Towards Street-Level Client-Independent IP Geolocation", downloaded on Jul. 2014 (14 pages).
Hans Weibel, Tutorial On Parallel Redundancy Protocol (PRP), by Zurich University of Applied Sciences, date unknown, downloaded Jul. 2014 (20 pages).
Syverson P.; Reed M. G.; Goldschlag M., "Onion Routing Access Configurations, DISCEX 2000: Proceedings of the DARPA Information Survivability Conference and Exposition", vol. I Hilton Head, SC, IEEE CS Press, Jan. 2000, pp. 34-40 (7 pages).
W3C Recommendation for the geolocation API specifications draft dated Oct. 24, 2013, is available from the web-site http://www.w3.org/TR/2013/REC-geolocation-API-20131024 (10 pages).
"IOS Tutoriaf", downloaded from tutorialspoint.com on Jul. 2014 (185 pages).
Jerry Honeycutt: "Introducing Windows 8—An Overview for IT Professionals", by Microsoft Press, 2012 (168 pages).
Karn; Phil; Craig Partridge: "Improving Round-Trip Time Estimates in Reliable Transport Protocols", ACM SIGCOMM '87—Computer Communication Review, pp. 67-74.
M. Saeed: "Welcome to Version 2.0 of the Win32 API TutoriaP", published by Brook Miles downloaded from the Internet on Jul. 2014 (108 pages).
Whitepaper by E-Nor, Inc. entitled: "A 7-Step Analytics Reporting Framework—Marketing Optimization Whitepaper" by Feras Alhlou, downloaded on Aug. 2014 (13 pages).
Melekam Tsegaye; Ricahrd Foss, "A Comparison of the Linux and Windows Device Driver Architecture", Rhodes University, South-Africa, downloaded from the Internet on Jul. 2014 (26 pages).
IBM Corporation (headquartered in Armonk, New-York, U.S.A.) publication No. SC34-2597-03, "Device Drivers, Features, and Commands on Red Hat Exterprise Linux 6.3", downloaded from the Internet on Jul. 2014 (580 pages).
Mohamad (Hani) Atassy, "Microsoft Windows Driver Model (WDM)", Jan. 28, 2002 (32 pages).
Overlier L.; Syverson P.: "Valet Services: Improving Hidden Servers with a Personal Touch", Proceedings of the 2006 Privacy Enhancing Technologies Workshop, Springer-Verlag, LNCS 4285 (22 pages).

(56) References Cited

OTHER PUBLICATIONS

Peter Jay Salzman; Michael Burian; Ori Pomerantz: "The Linux Kernel Module Programming Guide", ver. 2.6.4., dated May 18, 2007 (82 pages).
Philip Koopman: "32-Bit Cyclic Redundancy Codes for Internet Applications", Carnegie Mellon University, International Conference On Dependable Systems and Networks (DSN), 2002 (10 pages).
Robert D. Doverspike; K.K. Ramakrishnan; Chris Chase: "Guide to Reliable Internet Services and Applications", Chapter 2: "Structural Overview of ISP Networks", published 2010 (ISBN: 978-1-84882-827-8) (76 pages).
"Safari Web Content Guide", Apple Inc., Mar. 10, 2014 (113 pages).
Syverson P., "Making Anonymous Communication, Generation 2 Onion Routing briefing slides, Center for High Assurance Computer Systems, Naval Research Laboratory", National Science Foundation, Jun. 8, 2004 (64 pages).
University of Michigan paper "Dictionary-Based Compression for Long Time-Series Similarity" by Willis Lang, Michael Morse, and Jignesh M. Patel, downloaded from http://pages.cs.wisc.edu/ on Aug. 2014 (14 pages).
Feigenbaum J.; Johnson J.; Syverson P.: "A Model of Onion Routing with Provable Anonymity", Financial Cryptography and Data Security '07 (FC 2007), pp. 57-71 (15 pages).
"Tunneling for Transparency: A Large-Scale Analysis of End-to-End Violations in the Internet", Taejoong Chung, David Choffnes, and Alan Mislove, all of Northeastern University, IMC 2016, Nov. 14-16, 2016, Santa Monica, CA, USA, [DOI: http://dx.doi.org/10.1145/2987443.2987455] (16 pages).
N. Gautam, "Performance Analysis and Optimization of Web Proxy Servers and Mirror Sites", European Journal Operational Research 142 (2002), 396-418 (23 pages).
Andrew Daviel et al., Geographic extensions for HTTP transactions, Dec. 7, 2007 (15 pages).
HTTPS FAQ, The HTTPS-Only Standard, Jul. 6, 2015 (3 pages).
RFC 2818, "HTTP Over TLS", May 2000 (7 pages).
RFC 1866, "Hypertext Markup Language—2.0", Nov. 1995 (77 pages).
Authors Alain Durand (IMAG) et al., "IPv6 Tunnel Broker <draft-ietf-ngtrans-broker-00.txt>", Internet Society (ISOC), Apr. 2, 1999 (14 pages).
Sophie Gastellier-Prevost et al., "Defeating pharming attacks at the client-side", Network and System Security (NSS), Sep. 6, 2011 (8 pages).
Bharat K et al. "Mirror, Mirror on the Web: a study of host pairs with replicated content", Computer Networks, Amsterdam, vol. 31, No. 11-16, May 17, 1999 (12 pages).
European Search Report of EP 20190259 dated Dec. 16, 2020.
European Search Report of EP 20195090 dated Dec. 8, 2020.
Dejuan Lukan, "Achieving Anonymity with Tor Part 2: Proxies and DNS Servers", InfoSec Resource, Aug. 16, 2012 (20 pages).
Rajkumar Buyya et al., "Content Delivery Networks" © 2008 Springer-Verlag Berlin Heidelberg (392 pages).
Request for Comments 1123, "Requirements for Internet Hosts—Application and Support", Oct. 1989 (98 pages).
Andrew S. Tanenbaum, "Computer Networks", 4th Edition, 2003 (908 pages).
Chou Chie Ming et al., "Triggering and Relay Node Selection for Self-User Relaying", IEEE Communications Letters, vol. 19, No. 11, Nov. 1, 2015 pp. 2029-2032 (4 pages).
Request for Comments 2396, "Uniform Resource Identifiers (URI): Generic Syntax", Aug. 1998 (40 pages).
Ashish Mohta, worldproxy202—Proxy that's pretty useful, available at https://web.archive.org/web/20080601050011/http://www.technospot.net/blogs/worldproxy202-proxy-that's-pretty-useful, Jun. 1, 2006 (6 pages).
Wikioedia article on "Routing", https://en.wikipedia.org/wiki/Routing Jul. 26, 2021 (8 pages).

Perino Diego et al., "ProxyTorrent: Untangling the Free HTTP(S) Proxy Ecosystem", The Web Conference 2018, Apr. 23, 2018, pp. 197-206 (10 pages).
RFC 2187, "Application of Internet Cache Protocol (ICP), version 2", Sep. 1997 (24 pages).
Duane Wessels, "ICP and the Squid Web Cache", Aug. 13, 1997 (25 pages).
RFC 1738, "Uniform Resource Locators (URL)", Dec. 1994 (25 pages).
European Search Report of EP 20195075 dated Nov. 13, 2020.
David Gourley et al, "HTTP-The-Definitive-Guide", O'Reilly Media, Inc. Sep. 27, 2002 (658).
Floss Manuals, "Circumvention Tools", Free Software Foundation Inc., May 31, 2021 (240 pages).
David Fifield et al, "Blocking resistant communication through domain fronting", Proceeding on Privacy Enhanching Technologies 2015, May 15, 2015 (19 pages).
Wang Qiyan et al., "CensorSpoofer: Asymmetric Communication with IP Spoofing for ensorship-Resistant Web Browsing", Mar. 9, 2012 (16 pages).
SAS Institute Inc. SHARE Session 5958 tutorial 'C Socket Programming Tutorial' entitled: "Writing Client / Server Programs in C Using Sockets (A Tutorial) Part I", by Greg Granger, dated Feb. of 1998 (31 pages).
IETF RFC 3467, "Role of the Domain Name System (DNS)", Feb. 2003 (31 pages).
IETF RFC 6195, "Domain Name System (DNS) IANA Considerations", Mar. 2011 (17 pages).
IETF RFC 1591, "Domain Name System Structure and Delegation", Mar. 1994 (7 pages).
IETF RFC 6323, "Sender RTT Estimate Option for the Datagram Congestion Control Protocol (DCCP)", Jul. 2011 (13 pages).
Operating Systems', Chapter 9: "Interprocess Communication", by Marko Vuskovic, 1998-2002, pp. 9-1 to 9-19 (20 pages).
"UNIX Tutorial" by tutorialspoint.com, downloaded on Jul. 2014 (152 pages).
William R. Stanek, "Inside-Out Windows Server 2012", published by Microsoft Press in 2013 (1584 pages).
Publication No. 1-587005-001-3 by Cisco Systems, Inc. (7/99), "Internetworking Technologies Handbook": Chapter 30: "Internet Protocols", pp. 30-1 to 30-16.
IETF RFC 2544, "Benchmarking Methodology for Network Interconnect Devices", Mar. 1999 (32 pages).
ITU-T Y. 1564 "Ethernet Service Activation Test Methodology", Mar. 2011 (38 pages).
ITU-T H.323 "Packet-based multimedia communication systems", Dec. 2009 (320 pages).
IETF RFC 4098, "Terminology for Benchmarking BGP Device Convergence in the Control Plane", Jun. 2005 (37 pages).
IETF RFC 3550, "RTP: A Transport Protocol for Real-Time Applications", Jul. 2003 (89 pages).
IETF RFC 3261, "SIP: Session Initiation Protocol", Jun. 2002 (269 pages).
IETF RFC 1750, " Randomness Recommendations for Security", Dec. 1994 (31 pages).
Cisco Systems, Inc., "An Introduction to IP Security (IPSec) Encryption", 1992 (28 pages).
Feigenbaum J., Johnson A., Syverson P., "Probabilistic Analysis of Onion Routing in a Black-box Model [Extended Abstract]", WPES'07: Proceedings of the 2007 ACM Workshop on Privacy in Electronic Society, ACM Press Oct. 2007, pp. 1-10 (10 pages).
"On the leakage of personally identifiable information via online social networks", Wills et al. AT&T, Apr. 2009 http://www2.research.att.com/-bala/papers/wosn09.pdf*.
Partial European Search Report for EP 14182547, dated Feb. 24, 2015.
Jesse Burstyn et al., Assignment 1-Conceptual Architecture of Google Chrome, CISC 322, Fall 2009 (18 pages).
Mark Russinovich, David A. Solomon, and Alex Ioescu, "Windows Internals—Part 1", published by Microsoft Press in 2012, 6th edition (752 pages).

(56) References Cited

OTHER PUBLICATIONS

Mark Russinovich, David A. Solomon, and Alex Ioescu, "Windows Internals—Part 2", published by Microsoft Press in 2012, 6th edition (672 pages).
European Search Report for EP 14182547.1, dated Aug. 7, 2015.
Ingmar Poese, Steve Uhlig, et al., IP Geolocation Database: Unreliable ?. date unknown, downloaded Jul. 2014 (4 pages).
Cloud Optimize your business—Windows Server 2012, published Oct. 7, 2013 by Microsoft (34 pages).
"Step by Step Tutorials for Microsoft Internet Explorer 8 Accessibility Options", Microsoft Corporation 2009 (25 pages).
Cisco Systems, Inc. (Jun. 1999), "Internetworking Technologies Handbook", Chapter 5: "Routing Basics", pp. 5-1 to 5-8 (8 pages).
Feigenbaum J.; Johnson J.; Syverson P.: "A Model of Onion Routing with Provable Anonymity", Financial Cryptography and Data Security, 11th International Conference, FC 2007, LNCS forthcoming (15 pages).
Li et at, "Toward the Identification of Anonymous Web Proxies", University of Cambridge & University of Genoa, Apr. 3, 2009 (2 pages).
"Anonymizing Proxies: What They Are and Who They Work"—Enterprise Services Mar. 2013 (Year: 2012) (2 pages).
Selected pages from the website proxifier.com as of Feb. 2008 (15 pages).
Proxychains source code (Oct. 20, 2004) (53 pages).
RFC 1918, Address Allocation for Private Internets, Feb. 1996 (9 pages).
RFC 2131, Dynamic Host Configuration Protocol, Mar. 1997 (45 pages).
RFC 4388, Dynamic Host Configuration Protocol (DHCP) Leasequery, Feb. 2006 (27 pages).
Dejan Lukan, Achieving Anonymity with Tor Part 2: Proxies and DNA Servers, INFOSEC Aug. 16, 2012 (17 pages).
Kim et al, "RAD: Recipient Anonymous Data Delivery Based on Public Routing Proxies" Computer Notworks, vol. 55, Issue 15 Elsevier, Science Direct, Oct. 27, 2011 (16 pages).
"Keep Alive"—Imperva, 2019 https://www.imperva.com/learn/performance/keep-alive (2019) (3 pages).
Third party observation filed on Jun. 21, 2019 in PCT Application No. PCT/IL2018/050910 (7 pages).
IETF named: IPv6 Tunnel Broker, Apr. 1999—First uploaded document submitted with third party observation dated Jun. 21, 2019 (13 pages).
RFC 3053 (Jan. 2001) named: IPv6 Tunnel Broker—Secod uploaded document submitted with third party observation dated Jun. 21, 2019 (13 pages).
Arndt Rachel, "How to get around Country-Specific streaming rules" Jul. 31, 2013 (2 pages).
Anonymous, "Where is located a website? Website location finder : IPVoid", Mar. 20, 2019 (1 page).
Kozierok, The TCP/IP Guide—TCP Connection Preparation, Apr. 6, 2005 (3 pages).
Jovovic, Turning your HD TV into an Android SmartTV is easier than you think!, Feb. 26, 2013 (3 pages).
Allen, A Software Developer's Guide to HTTP Part III—Connections, Jan. 26, 2012 (10 pages).
Google Scholar: MorphMix citation in Alessandro Acquisti, et al., Digital Privacy: Theory, Technologies, and Practices (2007) (2 pages).
RFC 959, File Transfer Protocol (FTP), Oct. 1985 (69 pages).
RFC 821, Jonathan B. Postel, Simple Mail Transfer Protocol, Aug. 1982 (70 pages).
RFC 918, Post Office Protocol, Oct. 1984 (5 pages).
RFC 937, Post Office Protocol—Versioin 2, Feb. 1985 (24 pages).
Roger Dingledine et al., "The Free Haven Project: Distributed Anonymous Storage Service", Dec. 17, 2000 (23 pages).
Michael Freedman et al., "Tarzan: A Peer-to-Peer Anonymizing Network Layer", Nov. 18-22, 2002 (14 pages).
RFC 1939, Post Office Protocol—Version 3, May 1996 (23 pages).

Roger Dingledine, Nick Mathewon, and Paul Syverson, Tor: The Second-Generation Onion Router, In Proceedings of the 13th conference on USENIX Security Symposium, vol. 13, 2004 (17 pages).
Goldschlag D.M., Reed M.G., Syverson P.F., Hiding Routing Information, Lecture Notes in Computer Science, vol. 1174, Springer, Berlin, Heidelberg, 1996 (14 pages).
Schneier, Anonymity and Tor Network, Schneier on Security Sep. 20, 2007, https://www.schneier.com/blog/archives/2007/09 . . . html, p. 1-22, accessed Apr. 26, 20 (22 pages).
Reed M.G., Syverson P.F. Goldschlag D.M., Protocols Using Anonymous Connections: Mobile applications, Lecture Notes in Computer Science, vol. 1361, Springer, Berlin, Heidelberg, 1997 (11 pages).
Nick Mathewon, and Roger Dingledine, Location Diversity in Anonymity Networks, In Proceedings of the 2004 ACM workshop on Privacy in the electronic society. Association for Computing Machinery, New York, NY, USA 66-67 (11 pages).
Mathew Edman and Paul Syverson, As-Awareness in Tor Path Selection, In Proceedings of the 16th ACM conference on Computer and Communication Security (CCS 09). Association for Computing Machinery, New York, NY, USA 380-389 (10 pages).
Banerjee, Priyanka, Anonymous Routing in Wireless Networks: Onion Routing, Team Project Report 2007, p. 1-16 (16 pages).
McCoy D., Bauer K., Grunwald D., Kohno T., Sicker D., Shining Light in Dark Places: Understandings the Tor Network, Lecture Notes in Computer Science, vol. 5134, Springer, Berlin, Heidelberg, 2008 (14 pages).
Harry Newton, Newton's Telecom Dictionary, Mar. 2004, CNP Books, p. 182, 183, 433, 434, 435, 437, 665, 737 (10 pages).
Chakravarty et al., Identifying Proxy Nodes in a Tor Anonymization Circuit, 2008, IEEE International Conference on Signal Image Technology and Internet Based Systems, Bali, 2008, pp. 633-639 (7 pages).
Orfali et al., Client/Server Survival Guide, 3rd ed., John Wiley and Sons Inc. 1999, p. 15 (3 pages).
Reed M.G., Syverson P.F., Goldschlag D.M., Proxies for Anonymous Routing, In Proceedings 12th Annual Computer Security Applications Conference, 1996, pp. 95-104 (10 pages).
"Slice Embedding Solutions for Distributed Service Architectures"—Esposito et al., Boston University, Computer Science Dept., Oct. 2011 http://www.cs.bu.edu/techreports/pdf/2011-025-slice-embedding.pdf.
Rob Thubron, "Opera Builds Free and Unlimited VPN Service Directly Into Its Desktop Browser", Apr. 16, 2016 (6 pages).
Anthony Caruana, "3 Ways To Sneak Past Site Blocks", Mar. 12, 2018 (7 pages).
Jack Schofield, "How Can I Access Restriced Uk Sites When I'm Overseas?", Oct. 3, 2014 (6 pages).
Huang, S. et al, "Middleboxes in the Internet: a HTTP perspective", 2017 Network Traffic Conference, IEEE, Jun. 21-23, 2017, pp. 1-9 (9 pages).
Goldbert, I. and Shostack A., "Freedom Network 1.0 Architecture and Protocols", Zero-Knowledge Systems Inc, Nov. 29, 1999 (23 pages).
Screenshot from Internet Archive demonstrating availability of Goldbert, I. and Shostack A., "Freedom Network 1.0 Architecture and Protocols" (1 page).
Fifield David et al., "Evading Censorship with Browser-Based Proxies", Privacy Enhancing Technologies 2012, vol. 7384, Berlin, Springer, 2012, pp. 239-258 (20 pages).
Skvorc, D. et al., "Performance Evaluation of Websocket Protocol for Implementation of Full-Duplex Web Streams", 37th International Convention MIPRO, IEEE, May 26-30, 2014, pp. 1003-1008 (6 pages).
Rao A. et al., "Using the Middle to Meddle with Mobile", CCIS, Dec. 2013 (14 pages).
Screenshot from Internet Archive demonstrating availability of Rao A. et al., "Using the Middle to Meddle with Mobile" (1 page).
Netronome Systems, Inc., "Examining SSL-encrypted Communications", White Paper, 2010 (8 pages).
Screenshot from Internet Archive demonstrating availability of Netronome Systems, Inc., "Examining SSL-encrypted Communications" (1 page).

(56) References Cited

OTHER PUBLICATIONS

Peterson, Larry L. and Davie, Bruce S., "Computer Networks. A Systems Approach", 2nd Ed., San Francisco, 2000, p. 610 (18 pages).
Liu, C. et al., "Managing Internet Information Services", Sebastopol, O'Reilly & Associates, 1994, pp. 497-513 (19 pages).
Tanenbaum, Andrew S. and Wetherall, David J., "Computer Networks", 5th Ed., Boston, 2011 pp. 813-822 (12 pages).
Comer, D.E., "Internetworking with TCP/IP—vol. 1: Principles, Protocols and Architectures", 5th Ed., New Jersey, 2006, pp. 249-268 (22 pages).
Krishnamurthy, B. and Rexford, J., "Web Protocols and Practice HTTP/1.1, networking protocols, caching and traffic measurement", Indianapolis, 2001, pp. 184-203 and 249-254 (29 pages).
Geosurf, "What is IP Rotation—Rotating Proxy Server", Nov. 12, 2017 (4 pages).
Bright Data, "The Ultimate Guide to Buying a Proxy Server", DataCenter Proxies, ProxyCompass Apr. 26, 2022 (23 pages).
RFC 3022, Traditional IP Network Address Translator (Traditional NAT), Jan. 2001 (16 pages).
RFC 2068, Hypertext Transfer Protocol—HTTP/1.1, Jan. 1997 (162 pages).
RFC 1919, Classical versus Transparent IP Proxies, Mar. 1996 (35 pages).
HAProxy Reference Manual, Version 1.2.18, Willy Tarreau, May 25, 2008 (40 pages).
HAProxy Architecture Guide, Version 1.2.18, Willy Tarreau, May 25, 2008 (23 pages).
RFC 2663 entitled: "IP Network Address Translator (NAT) Terminology and Considerations", Aug. 1999 (30 pages).

* cited by examiner

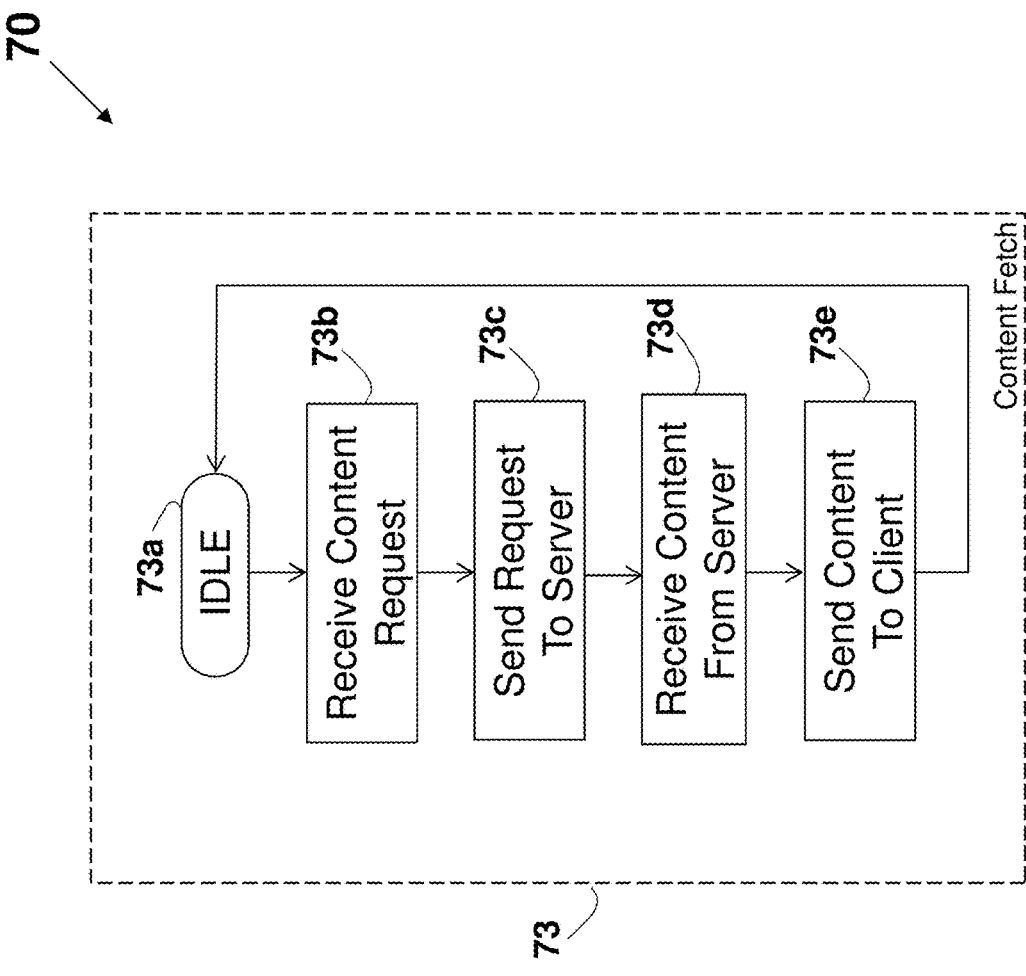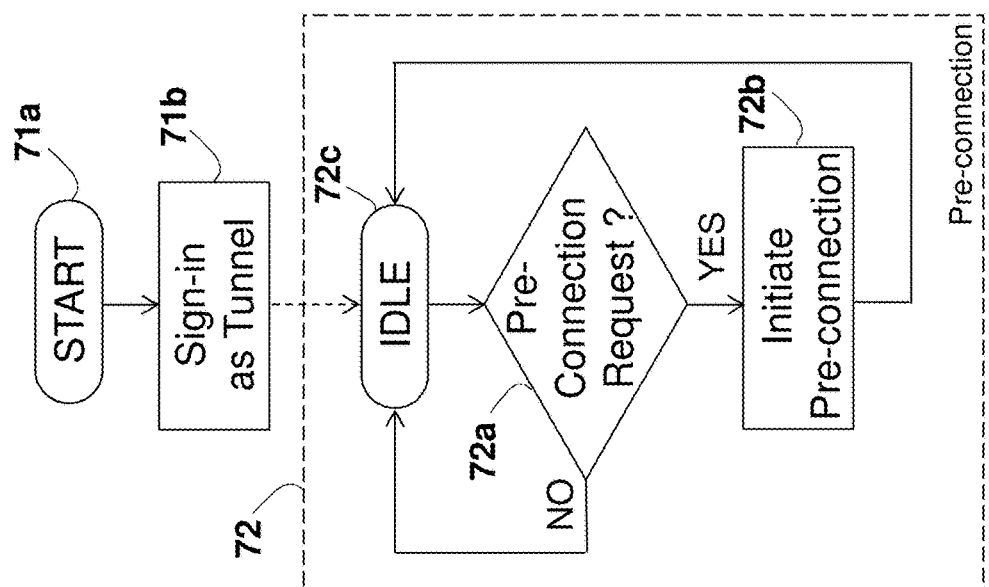
FIG. 7

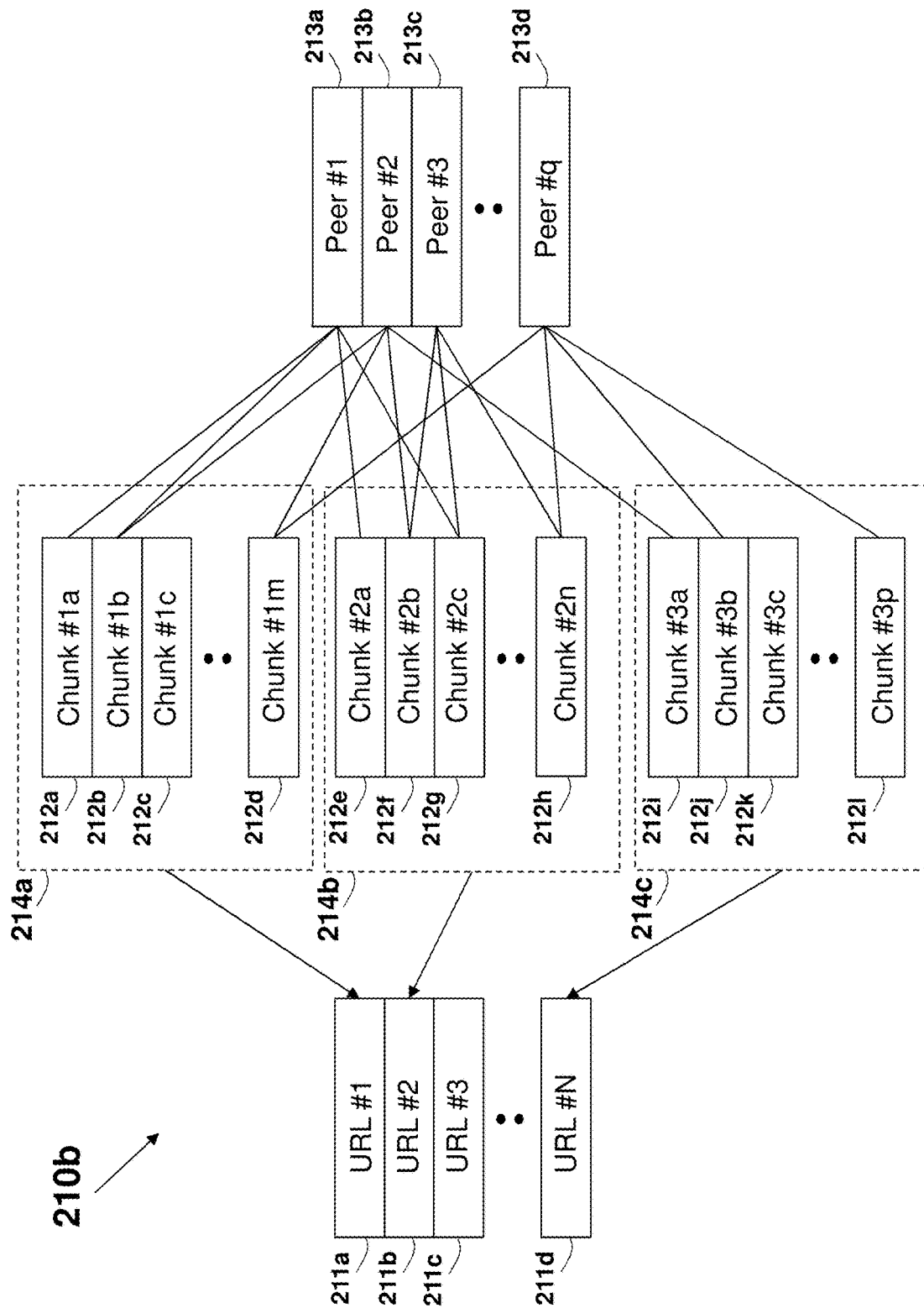

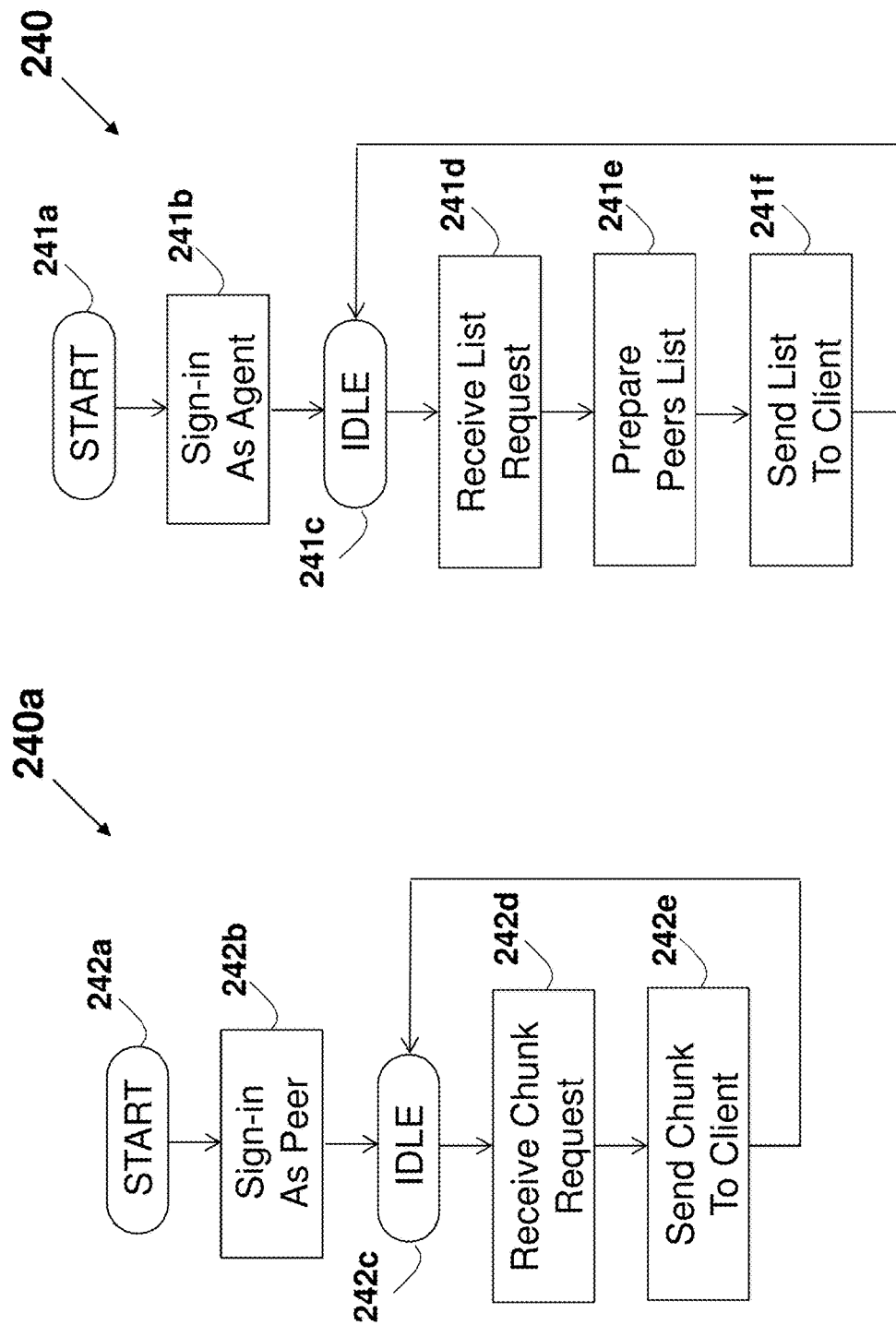

(1) Total Latency: $T = \max_i(T_i) = \max_i(RTT_i + X_i/BW_i)$ ← 292a (2) Target: Minimize (T) subject to : $X = \sum_{i=1}^{N} X_i$ ← 292b (3) $T = T_1 = T_2 = \ldots = T_N$ ← 292c (4) $X_i = BW_i * [((X + \sum_{i=1}^{N}RTT_i * BW_i)/\sum_{i=1}^{N}BW_i) - RTT_i]$ ← 292d (5) $T = T_1 = \ldots = T_N = [X + \sum_{i=1}^{N}(RTT_i * BW_i)]/\sum_{i=1}^{N}BW_i$ ← 292e

API (SIMILAR TO THE FILE API IN POSIX)

FILEDS NDCACHE_OPEN(NAME, CREATE_FLAG, TRUNCATE_FLAG)
- DESCRIPTION: OPEN AN NDCACHE CALLED NAME FOR READING OR WRITING AND RECEIVE A HANDLE (FILEDS) TO IT.
- NAME — THE NAME OF THE NDCACHE TO OPEN OR CREATE. THIS NAME CAN BE USED BETWEEN DIFFERENT PROCESSES ACCESSING THIS PAGE, SIMILAR TO HOW A FILENAME IS USED
- CREATE_FLAG — IS TURNED ON TO CREATE THE CACHE IF SUCH AN NDCACHE CALLED <NAME> DOES NOT EXIST
- TRUNCATE_FLAG — IS TURNED ON TO ERASE THE NDCACHE CALLED <NAME> IF IT ALREADY EXISTS
- RETURN VALUE — THE NDCACHE_OPEN RETURNS A FILE DESCRIPTOR (FILEDS) TO BE USED AS A HANDLE FOR THE OTHER NDCACHE APIS

6542

NDCACHE_READ(FILEDS, BUFFER, SIZE)
NDCACHE_WRITE(FILEDS, BUFFER, SIZE)
- DESCRIPTION: READ OR WRITE TO THE NDCACHE REFERENCED BY FILEDS
- FILEDS - THE FILE DESCRIPTOR OF THE OPEN NDCACHE TO READ FROM OR WRITE TO, RECEIVED FROM NDCACHE_OPEN
- BUFFER - (FOR READ) THE BUFFER TO READ THE INFORMATION IN TO, (FOR WRITE) ... TO WRITE FROM
- OFFSET - THE OFFSET WITHIN THE NDCACHE TO START THE READ OR WRITE FROM
- SIZE — THE NUMBER OF BYTES TO READ OR WRITE 6542.4

NDCACHE_CLOSE(FILEDS)
- DESCRIPTION: CLOSES THE HANDLE TO THE NDCACHE DESCRIBED BY FILEDS. AFTER ALL HANDLES TO AN NDCACHE ARE CLOSED, THE OS MAY DECIDE TO SWAP IT OUT BASED ON ITS EVICTION ALGORITHM
- FILEDS - THE FILE DESCRIPTOR OF THE OPEN NDCACHE TO CLOSE 6542.6

NDCACHE_UNLINK(FILEDS)
- DESCRIPTION: REMOVE AN NDCACHE ENTRY FROM THE PAGE TABLE
- FILEDS - THE FILE DESCRIPTOR OF THE OPEN NDCACHE TO REMOVE FROM THE PAGE TABLE 6542.8

FIG. 63

WRITING TO (AND ALLOCATING) THE NDCACHE:

```
FILEDS *FILEDS=OPEN("NDCACHE_DRIVER/NDCACHE_NAME");
/* NDCACHE_DRIVER IS THE KERNEL MODULE FOR NDCACHE EVENTS
NDCACHE_NAME IS THE NAME OF THIS NDCACHE, TO BE SHARED
BETWEEN DIFFERENT PROCESSES */

INT *P=NDCACHE_LOOKUP(NDCACHE_NAME);  // GET PTR TO THE NDCACHE

IF (!P)
(
    // NO SUCH NDCACHE EXISTS, AND THUS NEEDS TO BE CREATED

INT *P = MMAP(1MB, SHARED MEMORY, FILEDES);
    // 1MB AS AN EXMAPLE NDCACHE MEM SIZE REQUESTED
    // SHARED MEMORY SO THAT CAN BE USED BY MULTIPLE PROCESSES (INT* P)[0]++;   // INDICATES THAT THERE IS CONTENT IN THE NDCACHE
    P[N]=...;        // WRITE THE NEW CONTENT TO THE NDCACHE
)
ELSE
    DO NDCACHE_WRITE();  // THIS NDCACHE EXISTS, WRITE TO IT
```

```
NDCACHE_READ() / NDCACHE_WRITE(){

// CHECK IF THE NDCACHE STILL EXISTS (IF IT WAS SWAPPED OUT BY THE
  // OS, IT NO LONGER EXISTS).
  IF (!P[0]) RETURN MEM_NOT_FOUND;

// COULD BE THAT AT THIS POINT THE OS SWAPPED OUT THIS NDCACH, SO
  // CHECK IF THE NDCACHE STILL EXISTS, AND LOCK IT FOR THE DURATION
  // OF THE READ/WRITE.
  IF ((++P[0])==1)
  {
    P[0]--;
    RETURN MEM_NOT_FOUND;
  }

// READ/WRITE CONTENT FROM/TO THE NDCACHE
  BUF = P[N];   // FOR READ
  OR
  P[N] = ...;   // FOR WRITE

// DECREMENT THE LOCK_FLAG BY ONE (LOCK_FLAG--), INDICATING THAT
  // THE NDCACHE LOCK FOR THIS READ/WRITE IS RELEASED
  P[0]--;
  RETURN;
}
```

FIG. 70

NDCACHE KERNEL MODULE (NDCACHE_DRIVER)

EVICTION ALGORITHM – WHEN THE OS NEEDS MORE PHYSICAL MEMORY AND IS CONSIDERING WHICH PHYSICAL MEMORY TO EVICT:

FOR EACH OF THE MEMORY RANGES HANDLED BY THE NDCACHE DRIVER, WHERE LOCK_FLAG=MEM_RANGE[0]:

IF LOCK_FLAG == 0   // MEM RANGE NOT IN USE
THEN SWAP OUT THIS MEMORY RANGE

IF LOCK_FLAG == 1   // NDCACHE MEM RANGE IS IN USE, BUT NOT LOCKED
THEN PREFER NOT TO SWAP OUT THIS MEMORY RANGE

IF LOCK_FLAG > 1    // NDCACHE MEM RANGE IS IN USE AND LOCKED
DON'T SWAP OUT THIS MEMORY RANGE

ON SWAP OF THE NDCACHE MEMORY (I.E. WHEN THE OS'S EVICTION ALGORITHM DECIDES TO SWAP OUT THE NDCACHE'S PHYSICAL MEMORY ALLOCATION):

MAP THE VIRTUAL MEMORY POINTERS TO AN 'ALL ZERO' RANGE IN READ ONLY MODE (FOR EXAMPLE BY MAPPING TO DEV ZERO)

FIG. 71

NEW NDCACHE ELEMENT ALLOCATION: P = NDCACHE_CREATE(SIZE);

ALLOCATE MEMORY (P) FOR THE NDCACHE ACCORDING TO THE SIZE REQUESTED BY THE CALLER (SIZE) + SIZEOF(T) WHERE T IS THE SPACE REQUIRED FOR THE SECONDARY MANAGEMENT AREA (SIZEOF(POINTER) + SIZEOF(INT)) — 69202

→ ALLOCATE A MANAGEMENT AREA FOR THE PAGES' LOCK FLAGS (THE SIZE OF IT IS ONE INTEGER * NUMBER OF PAGES REQUIRED FOR THE NDCACHE) — 69204

→ DEFINE A MANAGEMENT AREA (T) AT THE START OF P, AND INSERT INTO IT A POINTER TO THE MANAGEMENT AREA (T-PTR) AND AN INTEGER (T->N) THAT REPRESENTS THE NUMBER OF PAGES IN THIS NDCACHE'S MEMORY RANGE — 69206

→ P=P+SIZEOF(T) – SO THAT P NOW POINTS TO THE MAIN MEMORY RANGE (RIGHT AFTER THE SECONDARY MANAGEMENT AREA) — 69208

→ RETURN (P+SIZEOF(T)) - (RETURNS A POINTER TO THE PLACE IN THE MEMORY WHERE THE NDCACHE MEMORY ITSELF STARTS (RIGHT AFTER THE SECONDARY MANAGEMENT SECTION) — 69210

FIG. 75

READING FROM OR WRITING TO THE NDCACHE ELEMENT:

USE THE SAME ALGORITHM AS IN THE FOURTH IMPLEMENTATION, WITH TWO EXCEPTIONS:

1. LOCK(P) / UNLOCK(P) –
   A. A FIRST EVALUATES THAT T->N IS NOT ZERO. IF IT IS, THEN THE NDCACHE WAS SWAPPED AND NEEDS TO RETURN MEM_NOT_FOUND
   B. IF T->N IS NOT ZERO, LOCK ALL PAGES THAT THIS NDCACHE ELEMENT SPANS BY LOCKING THE N LOCK_FLAGS STARTING AT THE T->PTR LOCK_FLAG

2. WHEN READING OR WRITING, NOT LIMITED TO ONE PAGE OF MEMORY (CAN USE THE ALLOCATED SIZE)

69902

DELETING THE ALLOCATION: NDCACHE_CLOSE (P)

FREE (P - SIZEOF(T)) – FREES THE SECONDARY MANAGEMENT AREA AS WELL AS THE MAIN MEMORY AREA ALLOCATED TO THIS NDCACHE ELEMENT

CREATE LIST OF ACCESS POINTS (AP_LIST) THAT ARE SEEN BY THE CLIENT'S WIFI DRIVER. FOR EACH AP, STORE THE FOLLOWING INFORMATION:

SIGNAL STRENGTH, AUTHENTICATION TYPE      42002

↓

ADD TO EACH OF THE ACCESS POINTS IN THE AP_LIST THE FOLLOWING INFORMATION BASED ON THE DATABASE OF PREVIOUS CONNECTIONS THAT THIS CLIENT HAS WITH THE ACCESS POINTS AROUND IT.

HAS CLIENT EVER TRIED TO CONNECT TO THIS AP? HAS THIS CLIENT SUCCEEDED IN CONNECTING TO THIS AP IN THE PAST? WAS THE INTERNET CONNECTION VERIFIED? TO WHICH AP WAS THIS CLIENT CONNECT TO LAST?, WHAT WAS THE LAST REASON FOR DISCONNECT?      42004

↓

TRY TO CONNECT TO THE APS IN THE AP_LIST ACCORDING TO THE FOLLOWING ORDER (WHERE THERE ARE SEVERAL CANDIDATES FOR EACH STAGE, SORT THEM BY SIGNAL STRENGTH):

- LOCKED ACCESS POINTS THAT THIS HOST VERIFIED CONNECTION TO INTERNET WITH TO IN THE PAST
- OPEN ACCESS POINTS THAT THIS HOST VERIFIED CONNECTION TO INTERNET WITH IN THE PAST
- OPEN ACCESS POINTS THAT THIS HOST NEVER VERIFIED WITH IN THE PAST
- OPTIONAL: LOCKED APS THAT WERE NEVER VERIFIED WITH BY THIS HOST, WITH GUESSED PASSWORD (SEE OTHER SECTION ON HOW TO GUESS)
- THE REST OF THE ACCESS POINTS IN THE LIST

42006

↓

ONCE CONNECTED AND VERIFIED, ADD INFORMATION ABOUT THIS ACCESS POINT AND ABOUT THE CONNECTION TO THE DATABASE OF PREVIOUS CONNECTIONS ON THIS HOST      42008

FIG. 80

SYSTEM AND METHOD FOR IMPROVING INTERNET COMMUNICATION BY USING INTERMEDIATE NODES

RELATED APPLICATION

This application is a continuation application of U.S. application Ser. No. 15/663,762, filed on Jul. 30, 2017, which is a continuation application of U.S. application Ser. No. 14/930,894, filed on Nov. 3, 2015 (now U.S. Pat. No. 9,742,866), which is a divisional of U.S. application Ser. No. 14/468,836, filed on Aug. 26, 2014 (now U.S. Pat. No. 9,241,044), which claims priority from U.S. Provisional Application Ser. No. 61/870,815, filed on Aug. 28, 2013, all of which are hereby incorporated herein by reference.

TECHNICAL FIELD

This disclosure relates generally to an apparatus and method for improving communication over the Internet by using intermediate nodes, and in particular, to using devices that may doubly function as an end-user and as an intermediate node.

BACKGROUND

Unless otherwise indicated herein, the materials described in this section are not prior art to the claims in this application and are not admitted to be prior art by inclusion in this section.

The Internet is a global system of interconnected computer networks that use the standardized Internet Protocol Suite (TCP/IP), including Transmission Control Protocol (TCP) and the Internet Protocol (IP), to serve billions of users worldwide. It is a network of networks that consists of millions of private, public, academic, business, and government networks, of local to global scope, that are linked by a broad array of electronic and optical networking technologies. The Internet carries a vast range of information resources and services, such as the interlinked hypertext documents on the World Wide Web (WWW) and the infrastructure to support electronic mail. The Internet backbone refers to the principal data routes between large, strategically interconnected networks and core routers in the Internet. These data routes are hosted by commercial, government, academic, and other high-capacity network centers, the Internet exchange points and network access points that interchange Internet traffic between the countries, continents and across the oceans of the world. Traffic interchange between Internet service providers (often Tier 1 networks) participating in the Internet backbone exchange traffic by privately negotiated interconnection agreements, primarily governed by the principle of settlement-free peering.

The Transmission Control Protocol (TCP) is one of the core protocols of the Internet protocol suite (IP) described in RFC 675 and RFC 793, and the entire suite is often referred to as TCP/IP. TCP provides reliable, ordered and error-checked delivery of a stream of octets between programs running on computers connected to a local area network, intranet or the public Internet. It resides at the transport layer. Web browsers typically use TCP when they connect to servers on the World Wide Web, and used to deliver email and transfer files from one location to another. HTTP, HTTPS, SMTP, POP3, IMAP, SSH, FTP, Telnet and a variety of other protocols that are typically encapsulated in TCP. As the transport layer of TCP/IP suite, the TCP provides a communication service at an intermediate level between an application program and the Internet Protocol (IP). Due to network congestion, traffic load balancing, or other unpredictable network behavior, IP packets can be lost, duplicated, or delivered out of order. TCP detects these problems, requests retransmission of lost data, rearranges out-of-order data, and even helps minimize network congestion to reduce the occurrence of the other problems. Once the TCP receiver has reassembled the sequence of octets originally transmitted, it passes them to the receiving application. Thus, TCP abstracts the application's communication from the underlying networking details. The TCP is utilized extensively by many of the Internet's most popular applications, including the World Wide Web (WWW), E-mail, File Transfer Protocol, Secure Shell, peer-to-peer file sharing, and some streaming media applications.

While IP layer handles actual delivery of the data, TCP keeps track of the individual units of data transmission, called segments, which a message is divided into for efficient routing through the network. For example, when an HTML file is sent from a web server, the TCP software layer of that server divides the sequence of octets of the file into segments and forwards them individually to the IP software layer (Internet Layer). The Internet Layer encapsulates each TCP segment into an IP packet by adding a header that includes (among other data) the destination IP address. When the client program on the destination computer receives them, the TCP layer (Transport Layer) reassembles the individual segments and ensures they are correctly ordered and error free as it streams them to an application.

The TCP protocol operations may be divided into three phases. Connections must be properly established in a multi-step handshake process (connection establishment) before entering the data transfer phase. After data transmission is completed, the connection termination closes established virtual circuits and releases all allocated resources. A TCP connection is typically managed by an operating system through a programming interface that represents the local end-point for communications, the Internet socket. During the duration of a TCP connection, the local end-point undergoes a series of state changes.

Since TCP/IP is based on the client/server model of operation, the TCP connection setup involves the client and server preparing for the connection by performing an OPEN operation. A client process initiates a TCP connection by performing an active OPEN, sending a SYN message to a server. A server process using TCP prepares for an incoming connection request by performing a passive OPEN. Both devices create for each TCP session a data structure used to hold important data related to the connection, called a Transmission Control Block (TCB).

There are two different kinds of OPEN, named 'Active OPEN' and 'Passive OPEN'. In Active OPEN the client process using TCP takes the "active role" and initiates the connection by actually sending a TCP message to start the connection (a SYN message). In Passive OPEN the server process designed to use TCP is contacting TCP and saying: "I am here, and I am waiting for clients that may wish to talk to me to send me a message on the following port number". The OPEN is called passive because aside from indicating that the process is listening, the server process does nothing. A passive OPEN can in fact specify that the server is waiting for an active OPEN from a specific client, though not all TCP/IP APIs support this capability. More commonly, a server process is willing to accept connections from all corners. Such a passive OPEN is said to be unspecified.

In passive OPEN, the TCP uses a three-way handshake, and before a client attempts to connect with a server, the server must first bind to and listen at a port to open it up for connections. Once the Passive OPEN is established, a client may initiate an Active OPEN. To establish a connection, the three-way (or 3-step) handshake occurs:
1. SYN: The active open is performed by the client sending a SYN to the server. The client sets the segment's sequence number to a random value A.
2. SYN-ACK: In response, the server replies with a SYN-ACK. The acknowledgment number is set to one more than the received sequence number, i.e. A+1, and the sequence number that the server chooses for the packet is another random number, B.
3. ACK: Finally, the client sends an ACK back to the server. The sequence number is set to the received acknowledgement value, i.e. A+1, and the acknowledgement number is set to one more than the received sequence number i.e. B+1.

At this point, both the client and server have received an acknowledgment of the connection. The steps 1, 2 establish the connection parameter (sequence number) for one direction and it is acknowledged. The steps 2, 3 establish the connection parameter (sequence number) for the other direction and it is acknowledged, and then a full-duplex communication is established.

The Internet Protocol (IP) is the principal communications protocol used for relaying datagrams (packets) across a network using the Internet Protocol Suite. Responsible for routing packets across network boundaries, it is the primary protocol that establishes the Internet. IP is the primary protocol in the Internet Layer of the Internet Protocol Suite and has the task of delivering datagrams from the source host to the destination host based on their addresses. For this purpose, IP defines addressing methods and structures for datagram encapsulation. Internet Protocol Version 4 (IPv4) is the dominant protocol of the Internet. IPv4 is described in Internet Engineering Task Force (IETF) Request for Comments (RFC) 791 and RFC 1349, and the successor, Internet Protocol Version 6 (IPv6), is currently active and in growing deployment worldwide. IPv4 uses 32-bit addresses (providing 4 billion: $4.3 \times 10^9$ addresses), while IPv6 uses 128-bit addresses (providing 340 undecillion or 3.4×1038 addresses), as described in RFC 2460.

An overview of an IP-based packet 15 is shown in FIG. 2a. The packet may be generally segmented into the IP data 16b to be carried as payload, and the IP header 16f. The IP header 16f contains the IP address of the source as Source IP Address field 16d and the Destination IP Address field 16c. In most cases, the IP header 16f and the payload 16b are further encapsulated by adding a Frame Header 16e and Frame Footer 16a used by higher layer protocols.

The Internet Protocol is responsible for addressing hosts and routing datagrams (packets) from a source host to the destination host across one or more IP networks. For this purpose the Internet Protocol defines an addressing system that has two functions. Addresses identify hosts and provide a logical location service. Each packet is tagged with a header that contains the meta-data for the purpose of delivery. This process of tagging is also called encapsulation. IP is a connectionless protocol for use in a packet-switched Link Layer network, and does not need circuit setup prior to transmission. The aspects of guaranteeing delivery, proper sequencing, avoidance of duplicate delivery, and data integrity are addressed by an upper transport layer protocol (e.g., TCP—Transmission Control Protocol and UDP—User Datagram Protocol).

The main aspects of the IP technology are IP addressing and routing. Addressing refers to how IP addresses are assigned to end hosts and how sub-networks of IP host addresses are divided and grouped together. IP routing is performed by all hosts, but most importantly by internetwork routers, which typically use either Interior Gateway Protocols (IGPs) or External Gateway Protocols (EGPs) to help make IP datagram forwarding decisions across IP connected networks. Core routers serving in the Internet backbone commonly use the Border Gateway Protocol (BGP) as per RFC 4098 or Multi-Protocol Label Switching (MPLS). Other prior art publications relating to Internet related protocols and routing include the following chapters of the publication number 1-587005-001-3 by Cisco Systems, Inc. (7/99) entitled: "*Internetworking Technologies Handbook*", which are all incorporated in their entirety for all purposes as if fully set forth herein: Chapter 5: "*Routing Basics*" (pages 5-1 to 5-10), Chapter 30: "*Internet Protocols*" (pages 30-1 to 30-16), Chapter 32: "*IPv6*" (pages 32-1 to 32-6), Chapter 45: "*OSI Routing*" (pages 45-1 to 45-8) and Chapter 51: "*Security*" (pages 51-1 to 51-12), as well as in a IBM Corporation, International Technical Support Organization Redbook Documents No. GG24-4756-00, entitled: "*Local area Network Concepts and Products: LAN Operation Systems and management*", 1st Edition May 1996, Redbook Document No. GG24-4338-00, entitled: "*Introduction to Networking Technologies*", 1$^{st}$ Edition April 1994, Redbook Document No. GG24-2580-01 "*IP Network Design Guide*", 2$^{nd}$ Edition June 1999, and Redbook Document No. GG24-3376-07 "*TCP/IP Tutorial and Technical Overview*", ISBN 0738494682 8$^{th}$ Edition December 2006, which are incorporated in their entirety for all purposes as if fully set forth herein.

An Internet packet typically includes a value of Time-to-live (TTL) for avoiding the case of packet looping endlessly. The initial TTL value is set in the header of the packet, and each router in the packet path subtracts one from the TTL field, and the packet is discarded upon the value exhaustion. Since the packets may be routed via different and disparately located routers and servers, the TTL of the packets reaching the ultimate destination computer are expected to vary.

The Internet architecture employs a client-server model, among other arrangements. The terms 'server' or 'server computer' relates herein to a device or computer (or a plurality of computers) connected to the Internet and is used for providing facilities or services to other computers or other devices (referred to in this context as 'clients') connected to the Internet. A server is commonly a host that has an IP address and executes a 'server program', and typically operates as a socket listener. Many servers have dedicated functionality such as web server, Domain Name System (DNS) server (described in RFC 1034 and RFC 1035), Dynamic Host Configuration Protocol (DHCP) server (described in RFC 2131 and RFC 3315), mail server, File Transfer Protocol (FTP) server and database server. Similarly, the term 'client' is used herein to include, but not limited to, a program or to a device or a computer (or a series of computers) executing this program, which accesses a server over the Internet for a service or a resource. Clients commonly initiate connections that a server may accept. For non-limiting example, web browsers are clients that connect to web servers for retrieving web pages, and email clients connect to mail storage servers for retrieving mails.

The Hypertext Transfer Protocol (HTTP) is an application protocol for distributed, collaborative, hypermedia information systems, commonly used for communication over the Internet. Hypertext is. HTTP is the protocol to exchange or transfer hypertext, which is a structured text that uses logical links (hyperlinks) between nodes containing text. HTTP version 1.1 was standardized as RFC 2616 (June 1999), which was replaced by a set of standards (obsoleting RFC 2616), including RFC 7230—HTTP/1.1: Message Syntax and Routing, RFC 7231—HTTP/1.1: Semantics and Content, RFC 7232—HTTP/1.1: Conditional Requests, RFC 7233—HTTP/1.1: Range Requests, RFC 7234—HTTP/1.1: Caching, and RFC 7235—HTTP/1.1: Authentication. HTTP functions as a request-response protocol in the client-server computing model. A web browser, for example, may be the client and an application running on a computer hosting a website may be the server. The client submits an HTTP request message to the server. The server, which provides resources such as HTML files and other content, or performs other functions on behalf of the client, returns a response message to the client. The response contains completion status information about the request and may also contain requested content in its message body. A web browser is an example of a user agent (UA). Other types of user agent include the indexing software used by search providers (web crawlers), voice browsers, mobile apps and other software that accesses, consumes or displays web content.

HTTP is designed to permit intermediate network elements to improve or enable communications between clients and servers. High-traffic websites often benefit from web cache servers that deliver content on behalf of upstream servers to improve response time. Web browsers cache previously accessed web resources and reuse them when possible, to reduce network traffic. HTTP proxy servers at private network boundaries can facilitate communication for clients without a globally routable address, by relaying messages with external servers. HTTP is an application layer protocol designed within the framework of the Internet Protocol Suite. Its definition presumes an underlying and reliable transport layer protocol, and Transmission Control Protocol (TCP) is commonly used. However, HTTP can use unreliable protocols such as the User Datagram Protocol (UDP), for example, in the Simple Service Discovery Protocol (SSDP). HTTP resources are identified and located on the network by Uniform Resource Identifiers (URIs) or, more specifically, Uniform Resource Locators (URLs), using the http or https URI schemes. URIs and hyperlinks in Hypertext Markup Language (HTML) documents form webs of inter-linked hypertext documents. An HTTP session is a sequence of network request-response transactions. An HTTP client initiates a request by establishing a Transmission Control Protocol (TCP) connection to a particular port on a server. An HTTP server listening on that port waits for a client's request message. Upon receiving the request, the server sends back a status line, such as "HTTP/1.1 200 OK", and a message of its own. The body of this message is typically the requested resource, although an error message or other information may also be returned. HTTP is a stateless protocol. A stateless protocol does not require the HTTP server to retain information or status HTTP persistent connection, also called HTTP keep-alive, or HTTP connection reuse, refers to using a single TCP connection to send and receive multiple HTTP requests/responses, as opposed to opening a new connection for every single request/response pair. Persistent connections provide a mechanism by which a client and a server can signal the close of a TCP connection. This signaling takes place using the Connection header field. The HTTP persistent connection is described in IETF RFC 2616, entitled: "*Hypertext Transfer Protocol—HTTP 1.1*". In HTTP 1.1, all connections are considered persistent unless declared otherwise. The HTTP persistent connections do not use separate keepalive messages, but they allow multiple requests to use a single connection. The advantages of using persistent connections involve lower CPU and memory usage (because fewer connections are open simultaneously), enabling HTTP pipelining of requests and responses, reduced network congestion (due to fewer TCP connections), and reduced latency in subsequent requests (due to minimal handshaking). Any connection herein may use, or be based on, an HTTP persistent connection.

An Operating System (OS) is software that manages computer hardware resources and provides common services for computer programs. The operating system is an essential component of any system software in a computer system, and most application programs usually require an operating system to function. For hardware functions such as input and output and memory allocation, the operating system acts as an intermediary between programs and the computer hardware, although the application code is usually executed directly by the hardware and will frequently make a system call to an OS function or be interrupted by it. Common features typically supported by operating systems include process management, interrupts handling, memory management, file system, device drivers, networking (such as TCP/IP and UDP), and Input/Output (I/O) handling. Examples of popular modem operating systems include Android, BSD, iOS, Linux, OS X, QNX, Microsoft Windows, Windows Phone, and IBM z/OS.

A server device (in server/client architecture) typically offers information resources, services, and applications to clients, and is using a server dedicated or oriented operating system. Current popular server operating systems are based on Microsoft Windows (by Microsoft Corporation, headquartered in Redmond, Washington, U.S.A.), Unix, and Linux-based solutions, such as the 'Windows Server 2012' server operating system is part of the Microsoft 'Windows Server' OS family, that was released by Microsoft on 2012, providing enterprise-class datacenter and hybrid cloud solutions that are simple to deploy, cost-effective, application-focused, and user-centric, and is described in Microsoft publication entitled: "*Inside-Out Windows Server 2012*", by William R. Stanek, published 2013 by Microsoft Press, which is incorporated in its entirety for all purposes as if fully set forth herein.

Unix operating systems are widely used in servers. Unix is a multitasking, multiuser computer operating system that exists in many variants, and is characterized by a modular design that is sometimes called the "Unix philosophy," meaning the OS provides a set of simple tools that each perform a limited, well-defined function, with a unified filesystem as the main means of communication, and a shell scripting and command language to combine the tools to perform complex workflows. Unix was designed to be portable, multi-tasking and multi-user in a time-sharing configuration, and Unix systems are characterized by various concepts: the use of plain text for storing data; a hierarchical file system; treating devices and certain types of Inter-Process Communication (IPC) as files; and the use of a large number of software tools, small programs that can be strung together through a command line interpreter using pipes, as opposed to using a single monolithic program that includes all of the same functionality. Under Unix, the operating system consists of many utilities along with the master control program, the kernel. The kernel provides services to start and stop programs, handles the file system and other common "low level" tasks that most programs share, and schedules access to avoid conflicts when programs try to access the same resource or device simultaneously. To mediate such access, the kernel has special rights, reflected in the division between user-space and kernel-space. Unix is described in a publication entitled: "UNIX Tutorial" by tutorialspoint.com, downloaded on July 2014, which is incorporated in its entirety for all purposes as if fully set forth herein.

A client device (in server/client architecture) typically receives information resources, services, and applications from servers, and is using a client dedicated or oriented operating system. Current popular server operating systems are based on Microsoft Windows (by Microsoft Corporation, headquartered in Redmond, Washington, U.S.A.), which is a series of graphical interface operating systems developed, marketed, and sold by Microsoft. Microsoft Windows is described in Microsoft publications entitled: "Windows Internals—Part 1" and "*Windows Internals—Part* 2", by Mark Russinovich, David A. Solomon, and Alex Ioescu, published by Microsoft Press in 2012, which are both incorporated in their entirety for all purposes as if fully set forth herein. Windows 8 is a personal computer operating system developed by Microsoft as part of Windows NT family of operating systems, that was released for general availability on October 2012, and is described in Microsoft Press 2012 publication entitled: "*Introducing Windows 8—An Overview for IT Professionals*" by Jerry Honeycutt, which is incorporated in its entirety for all purposes as if fully set forth herein.

Chrome OS is a Linux kernel-based operating system designed by Google Inc. out of Mountain View, California, U.S.A., to work primarily with web applications. The user interface takes a minimalist approach and consists almost entirely of just the Google Chrome web browser; since the operating system is aimed at users who spend most of their computer time on the Web, the only "native" applications on Chrome OS are a browser, media player and file manager, and hence the Chrome OS is almost a pure web thin client OS.

The Chrome OS is described as including a three-tier architecture: firmware, browser and window manager, and system-level software and userland services. The firmware contributes to fast boot time by not probing for hardware, such as floppy disk drives, that are no longer common on computers, especially netbooks. The firmware also contributes to security by verifying each step in the boot process and incorporating system recovery. The system-level software includes the Linux kernel that has been patched to improve boot performance. The userland software has been trimmed to essentials, with management by Upstart, which can launch services in parallel, re-spawn crashed jobs, and defer services in the interest of faster booting. The Chrome OS user guide is described in the Samsung Electronics Co., Ltd. presentation entitled: "*Google™ Chrome OS USER GUIDE*" published 2011, which is incorporated in its entirety for all purposes as if fully set forth herein.

A mobile operating system (also referred to as mobile OS), is an operating system that operates a smartphone, tablet, PDA, or other mobile device. Modern mobile operating systems combine the features of a personal computer operating system with other features, including a touchscreen, cellular, Bluetooth, Wi-Fi, GPS mobile navigation, camera, video camera, speech recognition, voice recorder, music player, near field communication and infrared blaster. Currently popular mobile OS are Android, Symbian, Apple iOS, BlackBerry, MeeGo, Windows Phone, and Bada. Mobile devices with mobile communications capabilities (e.g. smartphones) typically contain two mobile operating systems—the main user-facing software platform is supplemented by a second low-level proprietary real-time operating system which operates the radio and other hardware.

Android is an open source and Linux-based mobile operating system (OS) based on the Linux kernel that is currently offered by Google. With a user interface based on direct manipulation, Android is designed primarily for touchscreen mobile devices such as smartphones and tablet computers, with specialized user interfaces for televisions (Android TV), cars (Android Auto), and wrist watches (Android Wear). The OS uses touch inputs that loosely correspond to real-world actions, such as swiping, tapping, pinching, and reverse pinching to manipulate on-screen objects, and a virtual keyboard. Despite being primarily designed for touchscreen input, it also has been used in game consoles, digital cameras, and other electronics. The response to user input is designed to be immediate and provides a fluid touch interface, often using the vibration capabilities of the device to provide haptic feedback to the user. Internal hardware such as accelerometers, gyroscopes and proximity sensors are used by some applications to respond to additional user actions, for example adjusting the screen from portrait to landscape depending on how the device is oriented, or allowing the user to steer a vehicle in a racing game by rotating the device, simulating control of a steering wheel.

Android devices boot to the homescreen, the primary navigation and information point on the device, which is similar to the desktop found on PCs. Android homescreens are typically made up of app icons and widgets; app icons launch the associated app, whereas widgets display live, auto-updating content such as the weather forecast, the user's email inbox, or a news ticker directly on the homescreen. A homescreen may be made up of several pages that the user can swipe back and forth between, though Android's homescreen interface is heavily customizable, allowing the user to adjust the look and feel of the device to their tastes. Third-party apps available on Google Play and other app stores can extensively re-theme the homescreen, and even mimic the look of other operating systems, such as Windows Phone. The Android OS is described in a publication entitled: "*Android Tutorial*", downloaded from tutorialspoint.com on July 2014, which is incorporated in its entirety for all purposes as if fully set forth herein.

iOS (previously iPhone OS) from Apple Inc. (headquartered in Cupertino, California, U.S.A.) is a mobile operating system distributed exclusively for Apple hardware. The user interface of the iOS is based on the concept of direct manipulation, using multi-touch gestures. Interface control elements consist of sliders, switches, and buttons. Interaction with the OS includes gestures such as swipe, tap, pinch, and reverse pinch, all of which have specific definitions within the context of the iOS operating system and its multi-touch interface. Internal accelerometers are used by some applications to respond to shaking the device (one common result is the undo command) or rotating it in three dimensions (one common result is switching from portrait to landscape mode). The iOS is described in the publication entitled: "*IOS Tutorial*", downloaded from tutorialspoint.com on July 2014, which is incorporated in its entirety for all purposes as if fully set forth herein.

Operating Systems:

An Operating System (OS) is software that manages computer hardware resources and provides common services for computer programs. The operating system is an essential component of any system software in a computer system, and most application programs usually require an operating system to function. For hardware functions such as input and output and memory allocation, the operating system acts as an intermediary between programs and the computer hardware, although the application code is usually executed directly by the hardware and will frequently make a system call to an OS function or be interrupted by it. Common features typically supported by operating systems include process management, interrupts handling, memory management, file system, device drivers, networking (such as TCP/IP and UDP), and Input/Output (I/O) handling. Examples of popular modern operating systems include Android, BSD, iOS, Linux, OS X, QNX, Microsoft Windows, Windows Phone, and IBM z/OS.

Process Management:

The operating system provides an interface between an application program and the computer hardware, so that an application program can interact with the hardware only by obeying rules and procedures programmed into the operating system. The operating system is also a set of services which simplify development and execution of application programs. Executing an application program involves the creation of a process by the operating system kernel which assigns memory space and other resources, establishes a priority for the process in multi-tasking systems, loads program binary code into memory, and initiates execution of the application program which then interacts with the user and with hardware devices. The OS must allocate resources to processes, enable processes to share and exchange information, protect the resources of each process from other processes, and enable synchronization among processes. The OS maintains a data structure for each process, which describes the state and resource ownership of that process, and which enables the OS to exert control over each process.

In many modern operating systems, there can be more than one instance of a program loaded in memory at the same time; for example, more than one user could be executing the same program, each user having separate copies of the program loaded into memory. With some programs, known as re-entrant type, it is possible to have one copy loaded into memory, while several users have shared access to it so that they each can execute the same program-code. The processor at any instant can only be executing one instruction from one program but several processes can be sustained over a period of time by assigning each process to the processor at intervals while the remainder become temporarily inactive. A number of processes being executed over a period of time instead of at the same time is called concurrent execution. A multiprogramming or multitasking OS is a system executing many processes concurrently. A multiprogramming requires that the processor be allocated to each process for a period of time, and de-allocated at an appropriate moment. If the processor is de-allocated during the execution of a process, it must be done in such a way that it can be restarted later as easily as possible.

There are two typical ways for an OS to regain control of the processor during a program's execution in order for the OS to perform de-allocation or allocation: The process issues a system call (sometimes called a software interrupt); for example, an I/O request occurs requesting to access a file on hard disk. Alternatively, a hardware interrupt occurs; for example, a key was pressed on the keyboard, or a timer runs out (used in pre-emptive multitasking). The stopping of one process and starting (or restarting) of another process is called a context switch or context change. In many modern operating systems, processes can consist of many sub-processes. This introduces the concept of a thread. A thread may be viewed as a sub-process; that is, a separate, independent sequence of execution within the code of one process. Threads are becoming increasingly important in the design of distributed and client-server systems and in software run on multi-processor systems.

Modes:

Many contemporary processors incorporate a mode bit to define the execution capability of a program in the processor. This bit can be set to a kernel mode or a user mode. A kernel mode is also commonly referred to as supervisor mode, monitor mode or ring 0. In kernel mode, the processor can execute every instruction in its hardware repertoire, whereas in user mode, it can only execute a subset of the instructions. Instructions that can be executed only in kernel mode are called kernel, privileged or protected instructions to distinguish them from the user mode instructions. For example, I/O instructions are privileged. So, if an application program executes in user mode, it cannot perform its own I/O, and must request the OS to perform I/O on its behalf. The system may logically extend the mode bit to define areas of memory to be used when the processor is in kernel mode versus user mode. If the mode bit is set to kernel mode, the process executing in the processor can access either the kernel or user partition of the memory. However, if user mode is set, the process can reference only the user memory space, hence two classes of memory are defined, the user space and the system space (or kernel, supervisor or protected space). In general, the mode bit extends the operating system's protection rights, and is set by the user mode trap instruction, also called a supervisor call instruction. This instruction sets the mode bit, and branches to a fixed location in the system space. Since only the system code is loaded in the system space, only the system code can be invoked via a trap. When the OS has completed the supervisor call, it resets the mode bit to user mode prior to the return.

Computer operating systems provide different levels of access to resources, and these hierarchical protection domains are often referred to as 'protection rings', and are used to protect data and functionality from faults (by improving fault tolerance) and malicious behaviour (by providing computer security). A protection ring is one of two or more hierarchical levels or layers of privilege within the architecture of a computer system. These levels may be hardware-enforced by some CPU architectures that provide different CPU modes at the hardware or microcode level. Rings are arranged in a hierarchy from most privileged (most trusted, usually numbered zero) to least privileged (least trusted, usually with the highest ring number). On most operating systems, kernel mode or 'Ring 0' is the level with the most privileges and interacts most directly with the physical hardware such as the CPU and memory. Special gates between rings are provided to allow an outer ring to access an inner ring's resources in a predefined manner, as opposed to allowing arbitrary usage. Correctly gating access between rings can improve security by preventing programs from one ring or privilege level from misusing resources intended for programs in another. For example, spyware running as a user program in Ring 3 should be prevented from turning on a web camera without informing the user, since hardware access should be a Ring 1 function reserved for device drivers. Programs such as web browsers running in higher numbered rings must request access to the network, a resource restricted to a lower numbered ring.

Kernel:

With the aid of the firmware and device drivers, the kernel provides the most basic level of control over all of the computer's hardware devices. It manages memory access for programs in the RAM, it determines which programs get access to which hardware resources, it sets up or resets the CPU's operating states for optimal operation at all times, and it organizes the data for long-term non-volatile storage with file systems on such media as disks, tapes, flash memory, etc. The part of the system executing in kernel supervisor state is called the kernel, or nucleus, of the operating system. The kernel operates as trusted software, meaning that when it was designed and implemented, it was intended to implement protection mechanisms that could not be covertly changed through the actions of untrusted software executing in user space. Extensions to the OS execute in user mode, so the OS does not rely on the correctness of those parts of the system software for correct operation of the OS. Hence, a fundamental design decision for any function to be incorporated into the OS is whether it needs to be implemented in the kernel. If it is implemented in the kernel, it will execute in kernel (supervisor) space, and have access to other parts of the kernel. It will also be trusted software by the other parts of the kernel. If the function is implemented to execute in user mode, it will have no access to kernel data structures.

There are two techniques by which a program executing in user mode can request the kernel's services, namely 'System call' and 'Message passing'. Operating systems are typically with one or the other of these two facilities, but commonly not both. Assuming that a user process wishes to invoke a particular target system function, in the system call approach, the user process uses the trap instruction, so the system call should appear to be an ordinary procedure call to the application program; the OS provides a library of user functions with names corresponding to each actual system call. Each of these stub functions contains a trap to the OS function, and when the application program calls the stub, it executes the trap instruction, which switches the CPU to kernel mode, and then branches (indirectly through an OS table), to the entry point of the function which is to be invoked. When the function completes, it switches the processor to user mode and then returns control to the user process; thus simulating a normal procedure return. In the message passing approach, the user process constructs a message, that describes the desired service, and then it uses a trusted send function to pass the message to a trusted OS process. The send function serves the same purpose as the trap; that is, it carefully checks the message, switches the processor to kernel mode, and then delivers the message to a process that implements the target functions. Meanwhile, the user process waits for the result of the service request with a message receive operation. When the OS process completes the operation, it sends a message back to the user process.

Interrupts Handling:

Interrupts are central to operating systems, as they provide an efficient way for the operating system to interact with and react to its environment. Interrupts are typically handled by the operating system's kernel, and provide a computer with a way of automatically saving local register contexts, and running specific code in response to events. When an interrupt is received, the computer's hardware automatically suspends whatever program is currently running, saves its status, and runs computer code previously associated with the interrupt. When a hardware device triggers an interrupt, the operating system's kernel decides how to deal with this event, generally by running some processing code. The amount of code being run depends on the priority of the interrupt, and the processing of hardware interrupts is executed by a device driver, which may be either part of the operating system's kernel, part of another program, or both. Device drivers may then relay information to a running program by various means. A program may also trigger an interrupt to the operating system. For example, if a program wishes to access an hardware (such as a peripheral), it may interrupt the operating system's kernel, which causes control to be passed back to the kernel. The kernel will then process the request. If a program wishes additional resources (or wishes to shed resources) such as memory, it will trigger an interrupt to get the kernel's attention. Each interrupt has its own interrupt handler. The number of hardware interrupts is limited by the number of interrupt request (IRQ) lines to the processor, but there may be hundreds of different software interrupts. Interrupts are a commonly used technique for computer multitasking, especially in real-time computing systems, which are commonly referred to as interrupt-driven systems.

Memory Management:

A multiprogramming operating system kernel is responsible for managing all system memory which is currently in use by programs, ensuring that a program does not interfere with memory already in use by another program. Since programs time share, each program must have independent access to memory. Memory protection enables the kernel to limit a process' access to the computer's memory. Various methods of memory protection exist, including memory segmentation and paging. In both segmentation and paging, certain protected mode registers specify to the CPU what memory address it should allow a running program to access. Attempts to access other addresses will trigger an interrupt which will cause the CPU to re-enter supervisor mode, placing the kernel in charge. This is called a segmentation violation (or Seg-V), and the kernel will generally resort to terminating the offending program, and will report the error.

Memory management further provides ways to dynamically allocate portions of memory to programs at their request, and free it for reuse when no longer needed. This is critical for any advanced computer system where more than a single process might be underway at any time. Several methods have been devised that increase the effectiveness of memory management. Virtual memory systems separate the memory addresses used by a process from actual physical addresses, allowing separation of processes and increasing the effectively available amount of RAM using paging or swapping to secondary storage. The quality of the virtual memory manager can have an extensive effect on overall system performance.

File System:

Commonly a file system (or filesystem) is used to control how data is stored and retrieved. By separating the data into individual pieces, and giving each piece a name, the information is easily separated and identified, where each piece of data is called a "file". The structure and logic rules used to manage the groups of information and their names is called a "file system". There are many different kinds of file systems. Each one has a different structure and logic, properties of speed, flexibility, security, size and more. Some file systems have been designed to be used for specific applications. For example, the ISO 9660 file system is designed specifically for optical discs. File systems can be used on many different kinds of storage devices. Some file systems are used on local data storage devices; others provide file access via a network protocol (for example, NFS, SMB, or 9P clients). Some file systems are "virtual", in that the "files" supplied are computed on request (e.g. procfs) or are merely a mapping into a different file system used as a backing store. The file system manages access to both the content of files and the metadata about those files. It is responsible for arranging storage space; reliability, efficiency, and tuning with regard to the physical storage medium are important design considerations.

A disk file system takes advantages of the ability of disk storage media to randomly address data in a short amount of time. Additional considerations include the speed of accessing data following that initially requested and the anticipation that the following data may also be requested. This permits multiple users (or processes) access to various data on the disk without regard to the sequential location of the data. Examples include FAT (FAT12, FAT16, FAT32), exFAT, NTFS, HFS and HFS+, HPFS, UFS, ext2, ext3, ext4, XFS, btrfs, ISO 9660, Files-11, Veritas File System, VMFS, ZFS, ReiserFS and UDF. Some disk file systems are journaling file systems or versioning file systems.

TMPFS.

TMPFS (or tmpfs) is a common name for a temporary file storage facility on many Unix-like operating systems. While intended to appear as a mounted file system, it is stored in volatile memory instead of a non-volatile storage device. A similar construction is a RAM disk, which appears as a virtual disk drive and hosts a disk file system. The tmpfs is typically a file system based on SunOS virtual memory resources, which does not use traditional non-volatile media to store file data; instead, tmpfs files exist solely in virtual memory maintained by the UNIX kernel. Because tmpfs file systems do not use dedicated physical memory for file data, but instead use VM system resources and facilities, they can take advantage of kernel resource management policies. Tmpfs is designed primarily as a performance enhancement to allow short-lived files to be written and accessed without generating disk or network I/O. Tmpfs maximizes file manipulation speed while preserving UNIX file semantics. It does not require dedicated disk space for files and has no negative performance impact. The tmpfs is described in a Sun Microsystem Inc. paper entitled: "tmpfs: A Virtual Memory File System" by Peter Snyder, downloaded on 7/2014, which is incorporated in its entirety for all purposes as if fully set forth herein.

Device Drivers:

A device driver is a specific type of computer software developed to allow interaction with hardware devices. Typically, this constitutes an interface for communicating with the device, through the specific computer bus or communications subsystem that the hardware is connected to, providing commands to and/or receiving data from the device, and on the other end, the requisite interfaces to the operating system and software applications. It is a specialized hardware-dependent computer program which is also operating system specific that enables another program, typically an operating system or applications software package or computer program running under the operating system kernel, to interact transparently with a hardware device, and usually provides the requisite interrupt handling necessary for any necessary asynchronous time-dependent hardware interfacing needs.

Networking:

Most operating systems support a variety of networking protocols, hardware, and applications for using them, allowing computers running dissimilar operating systems to participate in a common network, for sharing resources such as computing, files, printers, and scanners, using either wired or wireless connections. Networking can essentially allow a computer's operating system to access the resources of a remote computer, to support the same functions as it could if those resources were connected directly to the local computer. This includes everything from simple communication, to using networked file systems, or sharing another computer's graphics or sound hardware. Some network services allow the resources of a computer to be accessed transparently, such as SSH, which allows networked users direct access to a computer's command line interface. A client/server networking allows a program on a computer, called a client, to connect via a network to another computer, called a server. Servers offer (or host) various services to other network computers and users. These services are usually provided through ports or numbered access points beyond the server's network address. Each port number is usually associated with a maximum of one running program, which is responsible for handling requests to that port. A daemon, being a user program, can in turn access the local hardware resources of that computer by passing requests to the operating system kernel.

Input/Output (I/O) Handling:

An input/output (or I/O) is the communication between an information processing system (such as a computer) and the outside world, possibly a human or other information processing system. The inputs are typically the signals or data received by the system, and the outputs are the signals or data sent from it. I/O devices may be used by a person (or other system) to communicate with a computer. For instance, a keyboard or a mouse may be an input device for a computer, while monitors and printers are considered output devices for a computer. Devices for communication between computers, such as modems and network cards, typically serve for both input and output.

User Interface:

Every computer that is to be operated by a human being requires a user interface, usually referred to as a 'shell', and is essential if human interaction is to be supported. The user interface views the directory structure and requests services from the operating system that will acquire data from input hardware devices, such as a keyboard, mouse or credit card reader, and requests operating system services to display prompts, status messages and such on output hardware devices, such as a video monitor or printer. The two most common forms of a user interface have historically been the command-line interface, where computer commands are typed out line-by-line, and the Graphical User Interface (GUI), where a visual environment (most commonly a WIMP) is present. Typically the GUI is integrated into the kernel, allowing the GUI to be more responsive by reducing the number of context switches required for the GUI to perform its output functions.

WDM.

The Windows Driver Model (WDM), also known as the Win32 Driver Model, is a standard model defining a framework for device drivers specified by Microsoft, providing unified driver models. The WDM model is based on WDM drivers that are layered in a complex hierarchy and communicate with each other via I/O Request Packets (IRPs). The WDM was introduced with Windows 98 and Windows 2000 to replace VxD which was used on older versions of Windows such as Windows 95 and Windows 3.1, as well as the Windows NT Driver Model, and WDM drivers are usable on all of Microsoft's operating systems of Windows 95 and later. The WDM is described in the publication entitled: "*Microsoft Windows Driver Model (WDM)*", by Mohamad (Hani) Atassy, submitted to Dr. Dennis R. Hafermann dated Jan. 28, 2002, and in publication entitled: "*A Comparison of the Linux and Windows Device Driver Architecture*", by Melekam Tsegaye and Richard Foss, both from Rhodes University, South-Africa, downloaded from the Internet on July 2014, both are incorporated in their entirety for all purposes as if fully set forth herein.

A general schematic view of the WDM architecture 430 is shown on FIG. 3. In the example shown, three applications designated as application #1 431*a*, application #2 431*b*, and application #3 431*c*, are accessing three peripheral hardware devices, designated as peripheral #1 439*a*, peripheral #2 439*b*, and peripheral #3 439*c*. The model involves three layers. The lower layer is the hardware layer 50*c*, which includes the hardware devices and peripherals, accessed by the processor (such as processor 27) via the hardware bus 430*d*, which may correspond to internal bus 13 shown in FIG. 1. The highest layer is a 'user space' layer 430*a*, corresponding to the user mode nd to the higher 'ring' layers such as Ring 3, and is relating to the space is the memory area where application software and some drivers execute. The kernel of the operating system provides the services as part of a 'kernel space' layer 430*b*, serving as an intermediate layer between the user space layer 430*a* and the hardware layer 430*c*. The kernel space 430*b* operates in a highly privileged hierarchical protection domain, and is strictly reserved for running privileged kernel, kernel extensions, and most device drivers, and is typically corresponding to the kernel mode and to the 'ring-0' layer (in x86 processors). The kernel mode may be supported by the processor hardware, or may be supported by a code segment level.

The user mode applications (such as application #1 431*a*, application #2 431*b*, and application #3 431*c*) access the kernel space 430*b* by the invoking of system calls respectively denoted as connections 432*a*, 432*b* and 432*c*. Typically, such system calls are processed via intermediating entity known as Windows API, such as a Win32 API 433, which access the kernel space 430*b* via a standard messaging 434. The Win32 API 433 is an example of a Windows API (informally WinAPI), which is Microsoft's core set of Application Programming Interfaces (APIs) available in the Microsoft Windows operating systems. Almost all Windows programs interact with the Windows API; on the Windows NT line of operating systems, a small number (such as programs started early in the Windows startup process) uses the Native API. Supporting for developers is in the form of the Windows Software Development Kit (SDK), providing documentation and tools necessary to build software based upon the Windows API and associated Windows interfaces. The Win32 API 433 is the 32-bit API for modem versions of Windows, and consists of functions implemented, as with Win16, in system DLLs. The core DLLs of the Win32 include the kernel32.dll, user32.dll, and gdi32.dll. The Win32 API is described in the tutorial entitled: "Welcome to Version 2.0 of the Win32 API Tutorial" by Prof M. Saeed, published by Brook Miles, downloaded from the Internet on July 2014, which is incorporated in its entirety for all purposes as if fully set forth herein.

System calls provide an essential interface between a process and the operating system. A system call is how a program requests a service from an operating system's kernel. This may include hardware related services (e.g., accessing the hard disk), creating and executing new processes, and communicating with integral kernel services (such as scheduling). A system call is typically processed in the kernel mode, which is accomplished by changing the processor execution mode to a more privileged one. The hardware sees the world in terms of the execution mode according to the processor status register, and processes are an abstraction provided by the operating system. A system call does not require a context switch to another process, it is processed in the context of whichever process invoked it. The system calls are often executed via traps or interrupts; that automatically puts the CPU into some required privilege level, and then passes control to the kernel, which determines whether the calling program should be granted the requested service. If the service is granted, the kernel executes a specific set of instructions over which the calling program has no direct control, returns the privilege level to that of the calling program, and then returns control to the calling program. Implementing system calls requires a control transfer, which involves some sort of architecture-specific feature.

System calls can be roughly grouped into five major categories: Process control, such as load, execute, create/terminate process, get/set process attributes, wait for time, wait event, and signal event; file management, such as request/release device, create/delete file, open/close file, read/write/reposition file, and get/set file attributes; device management, such as read/write/reposition device, get/set device attributes, and logically attach/detach devices; information maintenance, such as get/set time or date, get/set system data, and get/set process, file, or device attributes; and communication such as create, delete communication connection, transfer status information, and attach or detach remote devices.

The system calls are commonly handled by the I/O manager 435*b*, which allows devices to communicate with user-mode subsystems. It translates user-mode read and write commands into read or write IRPs which it passes to device drivers. It accepts file system I/O requests and translates them into device specific calls, and can incorporate low-level device drivers that directly manipulate hardware to either read input or write output. It also includes a cache manager to improve disk performance by caching read requests and write to the disk in the background. The I/O manager 435*b* may interface the power manager 435*c*, which deals with power events (power-off, stand-by, hibernate, etc.) and notifies affected drivers with special IRPs (Power IRPs).

The PnP manager 435*a* handles 'Plug and Play' and supports device detection and installation at boot time. It also has the responsibility to stop and start devices on demand, that can happen when a bus (such as USB or FireWire) gains a new device and needs to have a device driver loaded to support it. The PnP manager 435*a* may be partly implemented in user mode, in the Plug and Play Service, which handles the often complex tasks of installing the appropriate drivers, notifying services and applications of the arrival of new devices, and displaying GUI to the user.

I/O Request Packets (IRPs) are kernel mode structures that are used to communicate with each other and with the operating system. They are data structures that describe I/O requests, to a driver, all of these parameters (such as buffer address, buffer size, I/O function type, etc.) are passed via a single pointer to this persistent data structure. The IRP with all of its parameters can be put on a queue if the I/O request cannot be performed immediately. I/O completion is reported back to the I/O manager by passing its address to a routine for that purpose, IoCompleteRequest. The IRP may be repurposed as a special kernel APC object if such is required to report completion of the I/O to the requesting thread. IRPs are typically created by the I/O Manager in response to I/O requests from user mode. However, IRPs are sometimes created by the plug-and-play manager, power manager, and other system components, and can also be created by drivers and then passed to other drivers.

The WDM uses kernel-mode device drivers to enable it to interact with hardware devices, where each of the drivers has well defined system routines and internal routines that it exports to the rest of the operating system. DriverEntry is the first routine called after a driver is loaded, and is responsible for initializing the driver. All devices are seen by user mode code as a file object in the I/O manager, though to the I/O manager itself the devices are seen as device objects, which it defines as either file, device or driver objects. The drivers may be aggregated as a driver stack 436, including kernel mode drivers in three levels: highest level drivers 436a, intermediate drivers 436b, and low level drivers 436c. The highest level drivers 436a, such as file system drivers for FAT and NTFS, rely on the intermediate drivers 436b, which consist of function drivers or main driver for a device, that are optionally sandwiched between lower and higher level filter drivers. The highest level drivers typically know how files are represented on disk, but not the details of how to actually fetch the data, the intermediate level drivers process the requests from the highest level driver by breaking down a large request into a series of small chunks. The function driver commonly posseses the details relating to how the hardware of the peripheral works, typically relies on a bus driver, or a driver that services a bus controller, adapter, or bridge, which can have an optional bus filter driver that sits between itself and the function driver. For example, a PCI bus driver detects the PCI-slot plugged card or hardware, and determines the I/O-mapped or the memory-mapped connection with the host. Intermediate drivers 436b rely on the low level drivers 436c to function. The lowest level drivers 436c are either legacy device drivers that control a device directly, or can be a PnP hardware bus. These lower level drivers 436c directly control hardware and do not rely on any other drivers. The I/O manager 435c communicate with the high-level driver 436a using IRP 437a, the high-level driver 436a communicate with the intermediate level driver 436b using TRP 437b, the intermediate level driver 436b communicate with the low-level driver 436c using TRP 437c, and the low-level driver 436b communicate with the HAL 438 using IRP 437d.

WDM drivers can be classified into the following types and sub-types: Device function drivers, bus drivers, and filter drivers. A function driver is the main driver for a device. A function driver is typically written by the device vendor and is required (unless the device is being used in raw mode). A function driver can service one or more devices. Miniport drivers are a type of function drivers for interfaces such as USB, audio, SCSI and network adapters. They are hardware specific, but the control access to the hardware is through a specific bus class driver. Class drivers are a type of function drivers and can be thought of as built-in framework drivers that miniport and other class drivers can be built on top of. The class drivers provide interfaces between different levels of the WDM architecture. Common functionality between different classes of drivers can be written into the class driver and used by other class and miniport drivers. The lower edge of the class driver will have its interface exposed to the miniport driver, while the upper edge of top level class drivers is operating system specific. Class drivers can be dynamically loaded and unloaded at will. They can do class specific functions that are not hardware or bus-specific (with the exception of bus-type class drivers) and in fact sometimes only do class specific functions such as enumeration.

A bus driver services a bus controller, adapter, or bridge. Microsoft provides bus drivers for most common buses, such as Advanced configuration and Power Interface (ACPI), Peripheral Component Interconnect (PCI), PnPISA, SCSI, Universal Serial Bus (USB), and FireWire. A bus driver can service more than one bus if there is more than one bus of the same type on the machine. The ACPI bus driver interacts with the ACPI BIOS to enumerate the devices in the system and control their power use, the PCI bus driver (such as pci.sys) enumerates and configures devices connected via the PCI bus, the FireWire and the USB bus driver respectively enumerates and controls devices connected via the IEEE 1394 high speed bus and the USB. The stream class driver provides a basic processing supporting high bandwidth, time critical, and video and audio data related hardware, and uses minidrivers for interfacing the actual hardware, and hard-disk, floppies, CDs, and DVDs are interfaces using SCSI and CDROM/DVD class driver. The Human Input Device (HID) provides an abstract view of input devices, and the Still Image Architecture (SIA) class driver is used to obtain content from a scanner and a still camera, using minidrivers. For example, accessing an hard disk (such as HDD 30) involves a file system driver as high-level driver, a volume manager driver as intermediate level driver, and a disk driver as a low-level driver.

Filter drivers are optional drivers that add value to or modify the behavior of a device and may be non-device drivers. A filter driver can also service one or more devices. Upper level filter drivers sit above the primary driver for the device (the function driver), while lower level filter drivers sit below the function driver and above the bus driver. A driver service is a type of kernel-level filter driver implemented as a Windows service that enables applications to work with devices.

The Hardware Abstraction Layer 438, or HAL, is a layer between the physical hardware layer 430c of the computer and the rest of the operating system. It was designed to hide differences in hardware and therefore provide a consistent platform on which the kernel is run. The HAL 438 includes hardware-specific code that controls I/O interfaces, interrupt controllers and multiple processors. Typically the particular hardware abstraction does not involve abstracting the instruction set, which generally falls under the wider concept of portability. Abstracting the instruction set, when necessary (such as for handling the several revisions to the x86 instruction set, or emulating a missing math coprocessor), is performed by the kernel, or via platform virtualization.

Linux is a Unix-like and mostly POSIX-compliant computer operating system assembled under the model of free and open source software development and distribution. The defining component of Linux is the Linux kernel, an operating system kernel first released on 5 Oct. 1991 by Linus Torvalds. Linux was originally developed as a free operating system for Intel x86-based personal computers, but has since been ported to more computer hardware platforms than any other operating system. Linux also runs on embedded systems such as mobile phones, tablet computers, network routers, facility automation controls, televisions, and video game consoles. Android, which is a widely used operating system for mobile devices, is built on top of the Linux kernel. Typically, Linux is packaged in a format known as a Linux distribution for desktop and server use.

Linux distributions include the Linux kernel, supporting utilities and libraries and usually a large amount of application software to fulfill the distribution's intended use. A Linux-based system is a modular Unix-like operating system. Such a system uses a monolithic kernel, the Linux kernel, which handles process control, networking, and peripheral and file system access. Device drivers are either integrated directly with the kernel or added as modules loaded while the system is running. Some components of an installed Linux system are a bootloader, for example GNU GRUB or LILO, which is executed by the computer when it is first turned on, and loads the Linux kernel into memory; an init program, which is the first process launched by the Linux kernel, and is at the root of the process tree, and starts processes such as system services and login prompts (whether graphical or in terminal mode); Software libraries which contain code which can be used by running processes; and user interface programs such as command shells or windowing environments. A version of Linux is described, for example, in IBM Corporation (headquartered in Armonk, New-York, U.S.A.) publication No. SC34-2597-03 entitled: "*Device Drivers, Features, and Commands on Red Hat Exterprise Linux* 6.3", downloaded from the Internet on July 2014, which is incorporated in its entirety for all purposes as if fully set forth herein.

The general schematic Linux driver architecture 450 is shown in FIG. 3*a*, and the Linux kernel is further described in Wiley Publishing, Inc. publication entitled: "*Professional Linux Kernel Architecture*", by Wofgang Mauerer published 2008, and Linux programming is described in the book entitled: "*The Linux Kernel Module Programming Guide*" ver. 2.6.4 by Peter Jay Salzman, Michael Burian, and Ori Pomerantz, dated May 18, 2007, and in the publication entitled: "*A Comparison of the Linux and Windows Device Driver Architecture*", by Melekam Tsegaye and Richard Foss, both from Rhodes University, South-Africa, downloaded from the Internet on July 2014, which are all incorporated in their entirety for all purposes as if fully set forth herein.

Similar to the WDM 430 shown in FIG. 3, the Linux kernel involves a 'System Call Interface' 453, receiving system calls 452*a*, 452*b*, and 452*c* from the respective applications such as an application #1 431*a*, an application #2 431*b*, and an application #3 431*c*, and serves as the denomination for the entirety of all implemented and available system calls in a kernel. The Linux kernel is based on a layered modules stack 454, which may include three levels of modules, such as module #1 454*a*, module #2 454*b*, and module #3 454*c*, where the module #1 454*a* communicate over connection 455*a* with the system call interface 453, the module #2 454*b* communicates with the module #1 454*a* over connection 455*b*, the module #3 454*c* communicates over the connection 455*c* with the module #2 454*b* and over a connection 455*d* with the HAL 438.

Similar to the WDM 430 shown in FIG. 3, the Linux kernel shown as the arrangement 450 in FIG. 3*a*, is using the concept of layered architecture of a modules stack 454, which may comprise module #1 454*a*, module #2 454*b*, and module #3 454*c*, communicating using messaging mechanism, such as a connection 455*a* between the system call interface 453 and the module #1 454*a*, a connection 455*b* between the module #1 454*a* and the module #2 454*b*, a connection 455*c* between the module #2 454*b* and the module #3 454*c*, and a connection 455*d* between the module #3 454*c* and the HAL 438.

The modules in the modules stack 454, typically referred to as Loadable Kernel Modules (or LKM), are object files that contain code to extend the running Linux kernel, or so-called base kernel. LKMs are typically used to add support for new hardware and/or filesystems, or for adding system calls. When the functionality provided by a LKM is no longer required, it can be unloaded in order to free memory and other resources. Loadable kernel modules in Linux are located in /lib/modules and have had the extension '.ko' ("kernel object") since version 2.6 (previous versions used the .o extension), and are loaded (and unloaded) by the modprobe command. The lsmod command lists the loaded kernel modules. In emergency cases, when the system fails to boot (due to e.g. broken modules), specific modules can be enabled or disabled by modifying the kernel boot parameters list (for example, if using GRUB, by pressing 'e' in the GRUB start menu, then editing the kernel parameter line). Linux allows disabling module loading via sysctl option /proc/sys/kernel/modules_disabled. An initramfs system may load specific modules needed for a machine at boot and then disable module loading.

A web browser (commonly referred to as a browser) is a software application for retrieving, presenting, and traversing information resources on the World Wide Web. An information resource is identified by a Uniform Resource Identifier (URI/URL) and may be part of a web page, a web-page, an image, a video, or any other piece of content. Hyperlinks present in resources enable users easily to navigate their browsers to related resources. Although browsers are primarily intended to use the World Wide Web, they can also be used to access information provided by web servers in private networks or files in file systems. The primary purpose of a web browser is to bring information resources to the user ("retrieval" or "fetching"), allowing them to view the information ("display", "rendering"), and then access other information ("navigation", "following links"). Currently the major web browsers are known as Firefox, Internet Explorer, Google Chrome, Opera, and Safari.

The process begins when the user inputs a Uniform Resource Locator (URL), for example 'http://en.wikipedia.org/', into the browser. The prefix of the URL, the Uniform Resource Identifier or URI, determines how the URL will be interpreted. The most commonly used kind of URI starts with http: and identifies a resource to be retrieved over the Hypertext Transfer Protocol (HTTP). Many browsers also support a variety of other prefixes, such as https: for HTTPS, ftp: for the File Transfer Protocol, and file: for local files. Prefixes that the web browser cannot directly handle are often handed off to another application entirely. For example, mailto: URIs are usually passed to the user's default e-mail application, and news: URIs are passed to the user's default newsgroup reader. In the case of http, https, file, and others, once the resource has been retrieved the web browser will display it. HTML and associated content (image files, formatting information such as CSS, etc.) is passed to the browser's layout engine to be transformed from markup to an interactive document, a process known as "rendering". Aside from HTML, web browsers can generally display any kind of content that can be part of a web page. Most browsers can display images, audio, video, and XML files, and often have plug-ins to support Flash applications and Java applets. Upon encountering a file of an unsupported type or a file that is set up to be downloaded rather than displayed, the browser prompts the user to save the file to disk. Information resources may contain hyperlinks to other information resources. Each link contains the URI of a resource to go to. When a link is clicked, the browser navigates to the resource indicated by the link's target URI, and the process of bringing content to the user begins again. The architecture of a web browser is described in the publication entitled: "*Architecture and evolution of the modern web browser*" by Alan Grosskurth and Michael W. Godfrey of the University of Waterloo in Canada, dated Jun. 20, 2006, which is incorporated in its entirety for all purposes as if fully set forth herein.

A currently popular web browser is the Internet Explorer (formerly Microsoft Internet Explorer and Windows Internet Explorer, commonly abbreviated IE or MSIE) from Microsoft Corporation, headquartered in Redmond, Washington, U.S.A., which is a series of graphical web browsers developed by Microsoft and included as part of the Microsoft Windows line of operating systems. The Internet Explorer 8 is described, for example, in Microsoft 2009 publication entitled: "*Step by Step Tutorials for Microsoft Internet Explorer* 8 *Accessibility Options*", which is incorporated in its entirety for all purposes as if fully set forth herein. Another popular web browser is the Google Chrome which is a freeware web browser developed by Google, heagquartered in Googleplex, Mountain View, California, U.S.A. Google Chrome aims to be secure, fast, simple, and stable, providing strong application performance and JavaScript processing speed.

A mobile browser, also called a microbrowser, minibrowser, or Wireless Internet Browser (WIB), is a web browser designed for use on a mobile device such as a mobile phone or PDA. Mobile browsers are optimized so as to display Web content most effectively for small screens on portable devices. Mobile browser software must be small and efficient to accommodate the low memory capacity and low-bandwidth of wireless handheld devices. Some mobile browsers can handle more recent technologies like CSS 2.1, JavaScript, and Ajax. Websites designed for access from these browsers are referred to as wireless portals or collectively as the Mobile Web. They may automatically create "mobile" versions of each page, for example this one The mobile browser typically connects via cellular network, via Wireless LAN, or via other wireless networks, and are using standard HTTP over TCP/IP, and displays web pages written in HTML, XHTML Mobile Profile (WAP 2.0), or WML (which evolved from HDML). WML and HDML are stripped-down formats suitable for transmission across limited bandwidth, and wireless data connection called WAP. WAP 2.0 specifies XHTML Mobile Profile plus WAP CSS, subsets of the W3C's standard XHTML and CSS with minor mobile extensions. Some mobile browsers are full-featured Web browsers capable of HTML, CSS, ECMAScript, as well as mobile technologies such as WML, i-mode HTML, or cHTML. To accommodate small screens, some mobile browsers use Post-WIMP interfaces. An example of a mobile browser is Safari, which is a mobile web browser developed by Apple Inc. (headquartered in Apple Campus, Cupertino, California, U.S.A), included with the OS X and iOS operating systems, and described in Apple publication entitled: "*Safari Web Content Guide*", dated March 2014, which is incorporated in its entirety for all purposes as if fully set forth herein.

FIG. 1 shows a block diagram that illustrates a system 10 including a computer system 11 and the associated Internet 113 connection. Such configuration is typically used for computers (hosts) connected to the Internet 113 and executing a server or a client (or a combination) software. The system 11 may be used as a portable electronic device such as a notebook/laptop computer, a media player (e.g., MP3 based or video player), a desktop computer, a laptop computer, a cellular phone, a Personal Digital Assistant (PDA), an image processing device (e.g., a digital camera or video recorder), and/or any other handheld or fixed location computing devices, or a combination of any of these devices. Note that while FIG. 1 illustrates various components of a computer system, it is not intended to represent any particular architecture or manner of interconnecting the components; as such details are not germane. It will also be appreciated that network computers, handheld computers, cell phones and other data processing systems which have fewer components or perhaps more components may also be used. The computer system of FIG. 1 may, for example, be an Apple Macintosh computer or Power Book, or an IBM compatible PC. The computer system 11 includes a bus 13, an interconnect, or other communication mechanism for communicating information, and a processor 27, commonly in the form of an integrated circuit, coupled to the bus 13 for processing information and for executing the computer executable instructions. Computer system 11 also includes a main memory 122, such as a Random Access Memory (RAM) or other dynamic storage device, coupled to bus 13 for storing information and instructions to be executed by processor 27. Main memory 122 also may be used for storing temporary variables or other intermediate information during execution of instructions to be executed by processor 27. The computer system 11 further includes a Read Only Memory (ROM) 25*b* (or other non-volatile memory) or other static storage device coupled to the bus 13 for storing static information and instructions for the processor 27. A storage device 25*c*, such as a magnetic disk or optical disk, a hard disk drive (HDD) for reading from and writing to a hard disk, a magnetic disk drive for reading from and writing to a magnetic disk, and/or an optical disk drive (such as DVD) for reading from and writing to a removable optical disk, is coupled to bus 13 for storing information and instructions. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program modules and other data for the general purpose computing devices. Typically, the computer system 11 includes an Operating System (OS) stored in a non-volatile storage for managing the computer resources and provides the applications and programs with an access to the computer resources and interfaces. An operating system commonly processes system data and user input, and responds by allocating and managing tasks and internal system resources, such as controlling and allocating memory, prioritizing system requests, controlling input and output devices, facilitating networking and managing files. Non-limiting examples of operating systems are Microsoft Windows, Mac OS X, and Linux.

The term "processor" is used herein to include, but not limited to, any integrated circuit or other electronic device (or collection of devices) capable of performing an operation on at least one instruction, including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor.

The computer system 11 may be coupled via a bus 13 to a display 17, such as a Cathode Ray Tube (CRT), a Liquid Crystal Display (LCD), a flat screen monitor, a touch screen monitor or similar means for displaying text and graphical data to a user. The display may be connected via a video adapter for supporting the display. The display allows a user to view, enter, and/or edit information that is relevant to the operation of the system. An input device 18, including alphanumeric and other keys, is coupled to the bus 13 for communicating information and command selections to the processor 27. Another type of user input device is a cursor control 19, such as a mouse, a trackball, or cursor direction keys for communicating direction information and command selections to the processor 27 and for controlling cursor movement on the display 17. This input device typically has two degrees of freedom in two axes, a first axis (e.g., x) and a second axis (e.g., y), that allows the device to specify positions in a plane.

The computer system 11 may be used for implementing the methods and techniques described herein. According to one embodiment, those methods and techniques are performed by the computer system 11 in response to the processor 27 executing one or more sequences of one or more instructions contained in a main memory 25a. Such instructions may be read into the main memory 25a from another computer-readable medium, such as a storage device 123. Execution of the sequences of instructions contained in the main memory 25a causes the processor 27 to perform the process steps described herein. In alternative embodiments, hard-wired circuitry may be used in place of or in combination with software instructions to implement the arrangement. Thus, embodiments of the invention are not limited to any specific combination of hardware circuitry and software.

The term "computer-readable medium" (or "machine-readable medium") is used herein to include, but not limited to, any medium or any memory, that participates in providing instructions to a processor, (such as the processor 27) for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, and transmission medium. Transmission media includes coaxial cables, copper wire and fiber optics, including the wires that comprise the bus 13. Transmission media can also take the form of acoustic or light waves, such as those generated during radio-wave and infrared data communications, or other form of propagating signals (e.g., carrier waves, infrared signals, digital signals, etc.). Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 27 for execution. For example, the instructions may initially be carried on a magnetic disk of a remote computer. The remote computer can load the instructions into its dynamic memory and send the instructions over a telephone line using a modem. A modem local to the computer system 11 can receive the data on the telephone line and use an infrared transmitter to convert the data to an infrared signal. An infrared detector can receive the data carried in the infrared signal and appropriate circuitry can place the data on the bus 13. The bus 13 carries the data to the main memory 25a, from which the processor 27 retrieves and executes the instructions. The instructions received by the main memory 25a may optionally be stored on the storage device 25c either before or after execution by the processor 27.

The computer system 11 commonly includes a communication interface 29 coupled to the bus 13. The communication interface 29 provides a two-way data communication coupling to a network link 28 that is connected to a local network 14. For example, the communication interface 29 may be an Integrated Services Digital Network (ISDN) card or a modem to provide a data communication connection to a corresponding type of telephone line. As another non-limiting example, the communication interface 29 may be a local area network (LAN) card to provide a data communication connection to a compatible LAN. For example, Ethernet based connection based on IEEE802.3 standard may be used, such as 10/100 BaseT, 1000BaseT (gigabit Ethernet), 10 gigabit Ethernet (10 GE or 10 GbE or 10 GigE per IEEE Std. 802.3ae-2002as standard), 40 Gigabit Ethernet (40 GbE), or 100 Gigabit Ethernet (100 GbE as per Ethernet standard IEEE P802.3ba). These technologies are described in Cisco Systems, Inc. Publication number 1-587005-001-3 (6/99), "Internetworking Technologies Handbook", Chapter 7: "Ethernet Technologies", pages 7-1 to 7-38, which is incorporated in its entirety for all purposes as if fully set forth herein. In such a case, the communication interface 29 typically includes a LAN transceiver or a modem, such as Standard Microsystems Corporation (SMSC) LAN91C111 10/100 Ethernet transceiver, described in a Standard Microsystems Corporation (SMSC) data-sheet "*LAN91C111 10/100 Non-PCI Ethernet Single Chip MAC+PHY*" Data-Sheet, Rev. 15 (02-20-04), which is incorporated in its entirety for all purposes as if fully set forth herein.

The Internet 113 is a global system of interconnected computer networks that use the standardized Internet Protocol Suite (TCP/IP), including Transmission Control Protocol (TCP) and the Internet Protocol (IP), to serve billions of users worldwide. It is a network of networks that consists of millions of private, public, academic, business, and government networks, of local to global scope, that are linked by a broad array of electronic and optical networking technologies. The Internet carries a vast range of information resources and services, such as the interlinked hypertext documents on the World Wide Web (WWW) and the infrastructure to support electronic mail. The Internet backbone refers to the principal data routes between large, strategically interconnected networks and core routers in the Internet. These data routes are hosted by commercial, government, academic and other high-capacity network centers, the Internet exchange points and network access points that interchange Internet traffic between the countries, continents and across the oceans of the world. Traffic interchange between Internet service providers (often Tier 1 networks) participating in the Internet backbone exchange traffic by privately negotiated interconnection agreements, primarily governed by the principle of settlement-free peering.

An Internet Service Provider (ISP) 12 is an organization that provides services for accessing, using, or participating in the Internet 113. Internet Service Providers may be organized in various forms, such as commercial, community-owned, non-profit, or otherwise privately owned. Internet services typically provided by ISPs include Internet access, Internet transit, domain name registration, web hosting, and colocation. Various ISP Structures are described in Chapter 2: "*Structural Overview of ISP Networks*" of the book entitled: "*Guide to Reliable Internet Services and Applications*", by Robert D. Doverspike, K. K.

Ramakrishnan, and Chris Chase, published 2010 (ISBN: 978-1-84882-827-8), which is incorporated in its entirety for all purposes as if fully set forth herein.

A mailbox provider is an organization that provides services for hosting electronic mail domains with access to storage for mailboxes. It provides email servers to send, receive, accept, and store email for end users or other organizations. Internet hosting services provide email, webhosting, or online storage services. Other services include virtual server, cloud services, or physical server operation. A virtual ISP (VISP) is an operation that purchases services from another ISP, sometimes called a wholesale ISP in this context, which allow the VISP's customers to access the Internet using services and infrastructure owned and operated by the wholesale ISP. It is akin to mobile virtual network operators and competitive local exchange carriers for voice communications. A Wireless Internet Service Provider (WISP) is an Internet service provider with a network based on wireless networking. Technology may include commonplace Wi-Fi wireless mesh networking, or proprietary equipment designed to operate over open 900 MHz, 2.4 GHz, 4.9, 5.2, 5.4, 5.7, and 5.8 GHz bands or licensed frequencies in the UHF band (including the MMDS frequency band) and LMDS.

ISPs may engage in peering, where multiple ISPs interconnect at peering points or Internet exchange points (IXs), allowing routing of data between each network, without charging one another for the data transmitted-data that would otherwise have passed through a third upstream ISP, incurring charges from the upstream ISP. ISPs requiring no upstream and having only customers (end customers and/or peer ISPs), are referred to as Tier 1 ISPs.

A multitasking is a method where multiple tasks (also known as processes or programs) are performed during the same period of time—they are executed concurrently (in overlapping time periods, new tasks starting before others have ended) instead of sequentially (one completing before the next starts). The tasks share common processing resources, such as a CPU and main memory. Multitasking does not necessarily mean that multiple tasks are executing at exactly the same instant. In other words, multitasking does not imply parallelism, but it does mean that more than one task can be part-way through execution at the same time, and more than one task is advancing over a given period of time.

In the case of a computer with a single CPU, only one task is said to be running at any point in time, meaning that the CPU is actively executing instructions for that task. Multitasking solves the problem by scheduling which task may be the one running at any given time, and when another waiting task gets a turn. The act of reassigning a CPU from one task to another one is called a context switch. When context switches occur frequently enough, the illusion of parallelism is achieved. Even on computers with more than one CPU (called multiprocessor machines) or more than one core in a given CPU (called multicore machines), where more than one task can be executed at a given instant (one per CPU or core), multitasking allows many more tasks to be run than there are CPUs.

Operating systems may adopt one of many different scheduling strategies. In multiprogramming systems, the running task keeps running until it performs an operation that requires waiting for an external event (e.g. reading from a tape) or until the computer's scheduler forcibly swaps the running task out of the CPU. Multiprogramming systems are designed to maximize CPU usage. In time-sharing systems, the running task is required to relinquish the CPU, either voluntarily or by an external event such as a hardware interrupt. Time sharing systems are designed to allow several programs to execute apparently simultaneously. In realtime systems, some waiting tasks are guaranteed to be given the CPU when an external event occurs. Real time systems are designed to control mechanical devices such as industrial robots, which require timely processing.

Encryption based mechanisms are commonly end-to-end processes involving only the sender and the receiver, where the sender encrypts the plain text message by transforming it using an algorithm, making it unreadable to anyone, except the receiver which possesses special knowledge. The data is then sent to the receiver over a network such as the Internet, and when received the special knowledge enables the receiver to reverse the process (decrypt) to make the information readable as in the original message. The encryption process commonly involves computing resources such as processing power, storage space and requires time for executing the encryption/decryption algorithm, which may delay the delivery of the message.

Transport Layer Security (TLS) and its predecessor Secure Sockets Layer (SSL) are non-limiting examples of end-to-end cryptographic protocols, providing secured communication above the OSI Transport Layer, using keyed message authentication code and symmetric cryptography. In client/server applications, the TLS client and server negotiate a stateful connection by using a handshake procedure, during which various parameters are agreed upon, allowing a communication in a way designed to prevent eavesdropping and tampering. The TLS 1.2 is defined in RFC 5246, and several versions of the protocol are in widespread use in applications such as web browsing, electronic mail, Internet faxing, instant messaging and Voiceover-IP (VoIP). In application design, TLS is usually implemented on top of any of the Transport Layer protocols, encapsulating the application-specific protocols such as HTTP, FTP, SMTP, NNTP, and XMPP. Historically, it has been used primarily with reliable transport protocols such as the Transmission Control Protocol (TCP). However, it has also been implemented with datagram-oriented transport protocols, such as the User Datagram Protocol (UDP) and the Datagram Congestion Control Protocol (DCCP), a usage which has been standardized independently using the term Datagram Transport Layer Security (DTLS). A prominent use of TLS is for securing World Wide Web traffic carried by HTTP to form HTTPS. Notable applications are electronic commerce and asset management. Increasingly, the Simple Mail Transfer Protocol (SMTP) is also protected by TLS (RFC 3207). These applications use public key certificates to verify the identity of endpoints. Another Layer 4 (Transport Layer) and upper layers encryption-based communication protocols include SSH (Secure Shell) and SSL (Secure Socket Layer).

Layer 3 (Network Layer) and lower layer encryption based protocols include IPsec, L2TP (Layer 2 Tunneling Protocol) over IPsec, and Ethernet over IPsec. The IPsec is a protocol suite for securing IP communication by encrypting and authenticating each IP packet of a communication session. The IPsec standard is currently based on RFC 4301 and RFC 4309, and was originally described in RFCs 1825-1829, which are now obsolete, and uses the Security Parameter Index (SPI, as per RFC 2401) as an identification tag added to the header while using IPsec for tunneling the IP traffic. An IPsec overview is provided in Cisco Systems, Inc. document entitled: "*An Introduction to IP Security (IPSec) Encryption*", which is incorporated in its entirety for all purposes as if fully set forth herein.

Two common approaches to cryptography are found in U.S. Pat. No. 3,962,539 to Ehrsam et al., entitled "Product Block Cipher System for Data Security", and in U.S. Pat. No. 4,405,829 to Rivest et al., entitled "Cryptographic Communications System and Method", which are both incorporated in their entirety for all purposes as if fully set forth herein. The Ehrsam patent discloses what is commonly known as the Data Encryption Standard (DES), while the Rivest patent discloses what is commonly known as the RSA algorithm (which stands for Rivest, Shamir and Adleman who first publicly described it), which is widely used in electronic commerce protocols. The RSA involves using a public key and a private key. DES is based upon secret-key cryptography, also referred to as symmetric cryptography, and relies upon a 56-bit key for encryption. In this form of cryptography, the sender and receiver of cipher text both possess identical secret keys, which are, in an ideal world, completely unique and unknown to the world outside of the sender and receiver. By encoding plain text into cipher text using the secret key, the sender may send the cipher text to the receiver using any available public or otherwise insecure communication system. The receiver, having received the cipher text, decrypts it using the secret key to arrive at the plain text.

A proxy server is a server (a computer system or an application) that acts as an intermediary for requests from clients seeking resources from other servers. A client connects to the proxy server, requesting some service, such as a file, connection, web page, or other resource, available from a different server and the proxy server evaluates the request as a way to simplify and control its complexity. Proxies may be used to add structure and encapsulation to distributed systems. Today, most proxies are web proxies, facilitating access to content on the World Wide Web and providing anonymity. A proxy server may reside on the user's local computer, or at various points between the user's computer and destination servers on the Internet. A proxy server that passes requests and responses unmodified is usually called a gateway or sometimes a tunneling proxy. A forward proxy is an Internet-facing proxy used to retrieve from a wide range of sources (in most cases anywhere on the Internet). Forward proxies are proxies in which the client server names the target server to connect to, and are able to retrieve from a wide range of sources (in most cases anywhere on the Internet). An open proxy is a forwarding proxy server that is accessible by any Internet user, while browsing the Web or using other Internet services. There are varying degrees of anonymity, however, as well as a number of methods of 'tricking' the client into revealing itself regardless of the proxy being used. A reverse proxy is usually an Internet-facing proxy used as a front-end to control and protect access to a server on a private network. A reverse proxy commonly also performs tasks such as load-balancing, authentication, decryption or caching.

Randomness is commonly implemented by using random numbers, defined as a sequence of numbers or symbols that lack any pattern and thus appear random, are often generated by a random number generator. Randomness for security is also described in IETF RFC 1750 "Randomness Recommendations for Security" (December 1994), which is incorporated in its entirety for all purposes as if fully set forth herein. A random number generator (having either analog or digital output) can be hardware based, using a physical process such as thermal noise, shot noise, nuclear decaying radiation, photoelectric effect or other quantum phenomena. Alternatively, or in addition, the generation of the random numbers can be software based, using a processor executing an algorithm for generating pseudo-random numbers which approximates the properties of random numbers.

Onion routing (OR) is a technique for anonymous communication over the Internet or any other computer network. Messages are repeatedly encrypted and then sent through several network nodes called onion routers. Each onion router removes a layer of encryption to uncover routing instructions, and sends the message to the next router where this is repeated. This prevents these intermediary nodes from knowing the origin, destination, and contents of the message. To prevent an adversary from eavesdropping on message content, messages are encrypted between routers. The advantage of onion routing (and mix cascades in general) is that it is not necessary to trust each cooperating router; if one or more routers are compromised, anonymous communication can still be achieved. This is because each router in an OR network accepts messages, re-encrypts them, and transmits to another onion router. The idea of onion routing (OR) is to protect the privacy of the sender and the recipient of a message, while also providing protection for message content as it traverses a network. Onion routing accomplishes this according to the principle of Chaum mix cascades: messages travel from source to destination via a sequence of proxies ("onion routers"), which re-route messages in an unpredictable path.

Routing onions are data structures used to create paths through which many messages can be transmitted. To create an onion, the router at the head of a transmission selects a number of onion routers at random and generates a message for each one, providing it with symmetric keys for decrypting messages, and instructing it which router will be next in the path. Each of these messages, and the messages intended for subsequent routers, is encrypted with the corresponding router's public key. This provides a layered structure, in which it is necessary to decrypt all outer layers of the onion in order to reach an inner layer. Onion routing is described in U.S. Pat. No. 6,266,704 to Reed et al., entitled: "Onion Routing Network for Securely Moving data through Communication Networks", which is incorporated in its entirety for all purposes as if fully set forth herein. Other prior art publications relating to onion routing are the publications "*Probabilistic Analysis of Onion Routing in a Black-box Model [Extended Abstract]*" presented in WPES '07: Proceedings of the 2007 ACM Workshop on Privacy in Electronic Society, "*A Model of Onion Routing with Provable Anonymity*" presented in Proceedings of Financial Cryptography and Data Security '07, and "*A Model of Onion Routing with Provable Anonymity*", presented in the Financial Cryptography and Data Security, 11th International Conference, all by Feigenbaum J., Johnson J. and Syverson P., publications "*Improving Efficiency and Simplicity of Tor circuit establishment and hidden services*", Proceedings of the 2007 Privacy Enhancing Technologies Symposium, Springer-Verlag, LNCS 4776, publication "*Untraceable electronic mail, return addresses, and digital pseudonyms*" by Chaum D., in Communications of the ACM 24(2), February 1981, and "*Valet Services: Improving Hidden Servers with a Personal Touch*", Proceedings of the 2006 Privacy Enhancing Technologies Workshop, Springer-Verlag, LNCS 4285, both by Overlier L., Syverson P., publications "*Making Anonymous Communication*", Generation 2 Onion Routing briefing slides, Center for High Assurance Computer Systems, naval Research Laboratory, Presented at the National Science Foundation, Jun. 8, 2004 by Syverson P., publications "*Onion Routing Access Configurations, DISCEX* 2000: *Proceedings of the DARPA Information Survivability Conference and Exposition*", Volume I Hilton Head, SC, IEEE CS Press, January 2000, "Onion Routing for Anonymous and Private Internet Connections" Communications of the ACM, vol. 42, num. 2, February 1999, and "Anonymous Connections and Onion Routing" IEEE Journal on Selected Areas in Communication Special Issue on Copyright and Privacy Protection, 1998, all by Syverson P., Reed M. G., Goldschlag M., publication "Towards an Analysis of Onion Routing Security", and "Workshop on Design Issues in Anonymity and Unobservability", Berkeley, CA, July 2000 by Syverson P., Tsudik G., Reed M. G., and Landwehr C, which are incorporated in their entirety for all purposes as if fully set forth herein.

'Tor' is an anonymizing network based on the principles of 'onion routing', and involves a system which selects a randomly chosen route for each connection, via the routers present in the Tor network. The last server appears herein as an 'exit node' and sends the data to the final recipient after leaving the Tor cloud. At this point, it is no longer possible for an observer constantly watching the 'exit node' to determine who the sender of the message was. This concept and its components are known from the 'Tor' project in http://www.torproject.org. The Tor network concept is described in U.S. Patent Application Publication 2010/0002882 to Rieger et al., in the publication "Tor: The Second-Generation Onion Router", in Proceedings of the 13th USENIX Security Symposium August 2004, by Dingledine R., Mathewson N., Syverson P., in the publication "Tor Protocol specification" by Dingledine R. and Mathewson N., in the publication "Tor Directory Protocol, Version 3", and the publication "TC: A Tor Control Protocol" downloaded from the Tor web-site, which are incorporated in their entirety for all purposes as if fully set forth herein.

Computer networks may use a tunneling protocol where one network protocol (the delivery protocol) encapsulates a different payload protocol. Tunneling enables the encapsulation of a packet from one type of protocol within the datagram of a different protocol. For example, VPN uses PPTP to encapsulate IP packets over a public network, such as the Internet. A VPN solution based on Point-to-Point Tunneling Protocol (PPTP), Layer Two Tunneling Protocol (L2TP), or Secure Socket Tunneling Protocol (SSTP) can be configured. By using tunneling a payload may be carried over an incompatible delivery-network, or provide a secure path through an untrusted network. Typically, the delivery protocol operates at an equal or higher OSI layer than does the payload protocol. In one example of a network layer over a network layer, Generic Routing Encapsulation (GRE), a protocol running over IP (IP Protocol Number 47), often serves to carry IP packets, with RFC 1918 private addresses, over the Internet using delivery packets with public IP addresses. In this case, the delivery and payload protocols are compatible, but the payload addresses are incompatible with those of the delivery network. In contrast, an IP payload might believe it sees a data link layer delivery when it is carried inside the Layer 2 Tunneling Protocol (L2TP), which appears to the payload mechanism as a protocol of the data link layer. L2TP, however, actually runs over the transport layer using User Datagram Protocol (UDP) over IP. The IP in the delivery protocol could run over any data-link protocol from IEEE 802.2 over IEEE 802.3 (i.e., standards-based Ethernet) to the Point-to-Point Protocol (PPP) over a dialup modem link.

Tunneling protocols may use data encryption to transport insecure payload protocols over a public network (such as the Internet), thereby providing VPN functionality. IPsec has an end-to-end Transport Mode, but can also operate in a tunneling mode through a trusted security gateway. HTTP tunneling is a technique by which communications performed using various network protocols are encapsulated using the HTTP protocol, the network protocols in question usually belonging to the TCP/IP family of protocols. The HTTP protocol therefore acts as a wrapper for a channel that the network protocol being tunneled uses to communicate. The HTTP stream with its covert channel is termed an HTTP tunnel. HTTP tunnel software consists of client-server HTTP tunneling applications that integrate with existing application software, permitting them to be used in conditions of restricted network connectivity including firewalled networks, networks behind proxy servers, and network address translation.

Virtual Private Networks (VPNs) are point-to-point connections across a private or public network, such as the Internet. A VPN client typically uses special TCP/IP-based protocols, called tunneling protocols, to make a virtual call to a virtual port on a VPN server. In a typical VPN deployment, a client initiates a virtual point-to-point connection to a remote access server over the Internet, then the remote access server answers the call, authenticates the caller, and transfers data between the VPN client and the organization's private network. To emulate a point-to-point link, data is encapsulated, or wrapped, with a header. The header provides routing information that enables the data to traverse the shared or public network to reach its endpoint. To emulate a private link, the data being sent is encrypted for confidentiality. Packets that are intercepted on the shared or public network are indecipherable without the encryption keys. The link in which the private data is encapsulated and encrypted is known as a VPN connection. Commonly there are two types of VPN connections, referred to as Remote Access VPN and Site-to-Site VPN. Popular VPN connections use PPTP, L2TP/IPsec, or SSTP protocols. The RFC 4026 provides 'Provider Provisioned Virtual Private Network (VPN) Terminology', and RFC 2547 provides a VPN method based on MPLS (Multiprotocol Label Switching) and BGP (Border Gateway Protocol).

Remote access VPN connections enable users working at home or on the road to access a server on a private network using the infrastructure provided by a public network, such as the Internet. From the user's perspective, the VPN is a point-to-point connection between the computer (the VPN client) and an organization's server. The exact infrastructure of the shared or public network is irrelevant because it appears logically as if the data is sent over a dedicated private link.

Site-to-site VPN connections (also known as router-to-router VPN connections) enable organizations to have routed connections between separate offices or with other organizations over a public network while helping to maintain secure communications. A routed VPN connection across the Internet logically operates as a dedicated wide area network (WAN) link. When networks are connected over the Internet, a router forwards packets to another router across a VPN connection. To the routers, the VPN connection operates as a data-link layer link. A site-to-site VPN connection connects two portions of a private network. The VPN server provides a routed connection to the network to which the VPN server is attached. The calling router (the VPN client) authenticates itself to the answering router (the VPN server), and, for mutual authentication, the answering router authenticates itself to the calling router. In the site-to site VPN connection, the packets sent from either router across the VPN connection typically do not originate at the routers.

There is a growing widespread use of the Internet for carrying multimedia, such as a video and audio. Various audio services include Internet-radio stations and VoIP (Voice-over-IP). Video services over the Internet include video conferencing and IPTV (IP Television). In most cases, the multimedia service is a real-time (or near real-time) application, and thus sensitive to delays over the Internet. In particular, two-way services such a VoTP or other telephony services and video-conferencing are delay sensitive. In some cases, the delays induced by the encryption process, as well as the hardware/software costs associated with the encryption, render encryption as non-practical. Therefore, it is not easy to secure enough capacity of the Internet accessible by users to endure real-time communication applications such as Internet games, chatting, VoTP, and MoIP (Multimedia-over-IP), so there may be a data loss, delay or severe jitter in the course of communication due to the property of an Internet protocol, thereby causing inappropriate real-time video communication. The following chapters of the publication number 1-587005-001-3 by Cisco Systems, Inc. (7/99), entitled: *"Internetworking Technologies Handbook"*, relate to multimedia carried over the Internet, and are all incorporated in their entirety for all purposes as if fully set forth herein: Chapter 18: *"Multiservice Access Technologies"* (pages 18-1 to 18-10), and Chapter 19: *"Voice Data/ Integration Technologies"* (pages 19-1 to 19-30).

VoIP systems in widespread use today fall into three groups: systems using the ITU-T H.323 protocol, systems using the SIP protocol, and systems that use proprietary protocols. H.323 is a standard for teleconferencing that was developed by the International Telecommunications Union (ITU). It supports full multimedia, audio, video and data transmission between groups of two or more participants, and it is designed to support large networks. H.323 is network-independent: it can be used over networks using transport protocols other than TCP/IP. H.323 is still a very important protocol, but it has fallen out of use for consumer VoIP products due to the fact that it is difficult to make it work through firewalls that are designed to protect computers running many different applications. It is a system best suited to large organizations that possess the technical skills to overcome these problems.

Session Initiation Protocol (SIP) is an Internet Engineering Task Force (IETF) standard signaling protocol for teleconferencing, telephony, presence and event notification and instant messaging. It provides a mechanism for setting up and managing connections, but not for transporting the audio or video data. It is probably now the most widely used protocol for managing Internet telephony. Similar to the IETF protocols, SIP is defined in a number of RFCs, principally RFC 3261. A SIP-based VoIP implementation may send the encoded voice data over the network in a number of ways. Most implementations use a Real-time Transport Protocol (RTP), which is defined in RFC 3550. Both SIP and RTP are implemented on UDP, which, as a connectionless protocol, can cause difficulties with certain types of routers and firewalls. Usable SIP phones therefore also need to use Simple Traversal of UDP over NAT (STUN), a protocol defined in RFC 3489 that allows a client behind a NAT router to find out its external IP address and the type of NAT device.

FIG. 2 shows arrangement 20 of devices communicating over the Internet. Various devices such as client #1 24*a*, client #2 24*b*, client #3 24*c*, client #4 24*d*, and client #5 24*e*, may communicate over the Internet 113 for obtaining data from a data server #1 22*a* and a data server #2 22*b*. In one example, the servers are HTTP servers, sometimes known as web servers. A method describing a more efficient communication over the Internet is described in U.S. Pat. No. 8,560,604 to Shribman et al., entitled: "System and Method for Providing Faster and More Efficient Data Communication" (hereinafter the "'604 Patent'"), which is incorporated in its entirety for all purposes as if fully set forth herein. The method described in the '604 Patent uses an acceleration server 32 for managing the traffic in the network, as shown in FIG. 2. A splitting of a message or a content into slices, and transferring each of the slices over a distinct data path is described in U.S. Patent Application No. 2012/0166582 to Binder entitled: "System and Method for Routing-Based Internet Security", which is incorporated in its entirety for all purposes as if fully set forth herein.

A Cyclic Redundancy Check (CRC) is an error-detecting code commonly used in digital networks and storage devices to detect accidental changes to raw data. Blocks of data entering these systems get a short check value attached, based on the remainder of a polynomial division of their contents; on retrieval the calculation is repeated, and corrective action can be taken against presumed data corruption if the check values do not match. Ethernet commonly uses 32-bit CRC function. Specification of a CRC code requires definition of a so-called generator polynomial. The polynomial becomes a divisor in a polynomial long division, which takes the message as the dividend, and in which the quotient is discarded and the remainder becomes the result. The important caveat that the polynomial coefficients are calculated according to the arithmetic of a finite field, so the addition operation can always be performed bitwise-parallel (there is no carry between digits). The length of the remainder is always less than the length of the generator polynomial, which therefore determines how long the result can be. In practice, all commonly used CRCs employ the finite field GF(2). This is the field of two elements, usually called 0 and 1, comfortably matching computer architecture.

A CRC is referred to as an n-bit CRC when its check value is n bits. For a given n, multiple CRCs are possible, each with a different polynomial. Such a polynomial has highest degree n, which means it has n+1 terms. In other words, the polynomial has a length of n+1; its encoding requires n+1 bits. Note that most integer encodings either drop the Most Significant Bit (MSB) or Least Significant Bit (LSB), since they are always 1. The CRC and associated polynomial typically have a name of the form CRC-n-XXX. The simplest error-detection system, the parity bit, is in fact a trivial 1-bit CRC: it uses the generator polynomial x+1 (two terms), and has the name CRC-1. Computation of a cyclic redundancy check is derived from the mathematics of polynomial division, modulo two. In practice, it resembles long division of the binary message string, with a fixed number of zeroes appended, by the "generator polynomial" string except that exclusive OR operations replace subtractions. Division of this type is efficiently realised in hardware by a modified shift register and in software by a series of equivalent algorithms, starting with simple code close to the mathematics and becoming faster through byte-wise parallelism and space-time tradeoffs.

Various CRC standards extend the polynomial division algorithm by specifying an initial shift register value, a final exclusive OR step and, most critically, a bit ordering (endianness). As a result, the code seen in practice deviates confusingly from "pure" division, and the register may shift left or right. The most important attribute of the polynomial is its length (largest degree—exponent—+1 of any one term in the polynomial), because of its direct influence on the length of the computed check value. The most commonly used polynomial lengths are 9 bits (CRC-8), 17 bits (CRC-16), 33 bits (CRC-32), and 65 bits (CRC-64). A calculation of CRC-32 is described in the publication entitled: "32-*Bit Cyclic Redundancy Codes for Internet Applications*" by Philip Koopman of Carnegie Mellon University, presented at The International Conference on Dependable Systems and Networks (DSN) 2002.

A CRC is an example of a hash function, which refers to any function that can be used to map data of arbitrary size to data of fixed size, with slight differences in input data producing very big differences in an output data. Values returned by the hash function are called hash values, hash codes, hash sums, or simply hashes. Hash values are commonly used to differentiate between data. For example, in implementing a set in software, one has to avoid including an element more than once. Recent developments in internet payment networks also uses a form of 'hashing' for producing checksums, bringing additional attention to the term. Hash functions are primarily used to generate fixed-length output data that act as a shortened reference to the original data. This is useful when the original data is too cumbersome to use in its entirety. Hash functions commonly include checksums, check digits, fingerprints, randomization functions, error-correcting codes, and ciphers.

One practical use is a data structure called a hash table where the data is stored associatively. Searching linearly for a person's name in a list becomes cumbersome as the length of the list increases, but the hashed value can be used to store a reference to the original data and retrieve constant time (barring collisions). Another use is in cryptography, the science of encoding and safeguarding data. It is easy to generate hash values from input data and easy to verify that the data matches the hash, but for certain hash functions hard to 'fake' a hash value to hide malicious data. Hash functions are also frequently used to accelerate table lookup or data comparison tasks such as finding items in a database, detecting duplicated or similar records in a large file and finding similar stretches in DNA sequences. A hash function should be deterministic: when it is invoked twice on identical data (e.g. two strings containing exactly the same characters), the function should produce the same value. This is crucial to the correctness of virtually all algorithms based on hashing. In the case of a hash table, the lookup operation should look at the slot where the insertion algorithm actually stored the data that is being sought for, so it needs the same hash value.

Hash functions used to accelerate data searches typically produce smaller hash values, such as a 32 bit integer. On the other hand, cryptographic hash functions produce much larger hash value, in order to ensure the computational complexity of brute-force inversion. For example SHA-1, one of the most widely used cryptographic hash functions, produces a 160-bit value. In both cases, the hash function breaks the input data into chunks of specific size. Hash functions used for data searches use an arithmetic expression which iteratively processes those chunks (such as the characters in a string) to produce the hash value. In cryptographic hash functions, these chunks are processed by a one-way compression function, with the last chunk being padded if necessary. In this case, their size, which is called block size, is much bigger than the size of the hash value. For example, in SHA-1, the hash value is 160 bits and the block size 512 bits.

A hash table (a.k.a. Hash map) is a data structure that associates keys with values, and is commonly used to support a lookup: given a key (e.g., a person's name), find the corresponding value (e.g., that person's telephone number), thus allowing to use a number to locate a desired value in a table. Hash tables are typically used to implement an associative array, a structure that can map keys to values. A hash table uses a hash function to compute an index into an array of buckets or slots, from which the correct value can be found. The hash function may assign each key to a unique bucket, but typically hash table designs assume that hash collisions—different keys that are assigned by the hash function to the same bucket—will occur and must be accommodated in some way. In a well-dimensioned hash table, the average cost (number of instructions) for each lookup is independent of the number of elements stored in the table. Many hash table designs also allow arbitrary insertions and deletions of key-value pairs, at a constant average cost per operation. In many situations, hash tables turn out to be more efficient than search trees or any other table lookup structure, and thus are widely used in many kinds of computer software, particularly for associative arrays, database indexing, caches, and sets.

Filter driver. A filter driver is a Microsoft Windows compatible driver that extends or modifies the function of peripheral devices or supports a specialized device in a personal computer. It is a driver or program or module that is inserted into the existing driver stack to perform some specific function, while not affecting the normal working of the existing driver stack in any major way. Any number of filter drivers can be added to Windows, where upper level filter drivers sit above the primary driver for the device (the function driver), while lower level filter drivers sit below the function driver and above a bus driver. Filter drivers may work on a certain brand of device such as a mouse or keyboard, or they may perform some operation on a class of devices, such as any mouse or any keyboard. A filter driver may be developed using the guide entitled: "*Filter Driver Development Guide*" Version 1.0a by Microsoft Corporation, dated 2004, which is incorporated in its entirety for all purposes as if fully set forth herein.

Hook. A hook (also known as a hook procedure or hook function) is a mechanism by which an application can intercept events, such as messages, mouse actions, and keystrokes, and generally refers to a function provided by a software application that receives certain data before the normal or intended recipient of the data. The hook function can thus examine or modify certain data before passing on the data. Therefore, a hook function allows a software application to examine data before the data is passed to the intended recipient. A function that intercepts a particular type of event is known as a hook procedure. The hook procedure can act on each event it receives, and then modify or discard the event. The term 'hooking' is used herein to include, but not limited to, a range of techniques used to alter or augment the behavior of an operating system, of applications, or of other software components by intercepting function calls, messages, or events passed between software components. A code that handles such intercepted function calls, events or messages is called a "hook". Hooking is used for many purposes, including debugging and extending functionality. Examples might include intercepting keyboard or mouse event messages before they reach an application, or intercepting operating system calls in order to monitor behavior or modify the function of an application or other component. It is also widely used in benchmarking programs, for example frame rate measuring in 3D games, where the output and input is done through hooking. Hooking is described, for example, in the presentations by High-Tech Bridge SA and titled: "*Userland Hooking in Windows*" dated August 2011, and "*Inline Hooking in Windows*" dated September 2011, both by Brian Mariani, and both incorporated in their entirety for all purposes as if fully set forth herein.

Physical modification. An hooking may be achieved by physically modifying an executable or library before an application is running through techniques of reverse engineering. This is typically used to intercept function calls to either monitor or replace them entirely. For example, by using a disassembler, the entry point of a function within a module can be found. It can then be altered to instead dynamically load some other library module and then have it execute desired methods within that loaded library. If applicable, another related approach by which hooking can be achieved is by altering an import table of an executable. This table can be modified to load any additional library modules as well as changing what external code is invoked when a function is called by an application. An alternate method for achieving the function of hooking is by intercepting function calls through a wrapper library. When creating a wrapper, you make your own version of a library that an application loads, with all the same functionality of the original library that it will replace, so all the functions that are accessible are essentially the same between the original and the replacement. This wrapper library can be designed to call any of the functionality from the original library, or replace it with an entirely new set of logic.

Runtime modification. Operating systems and software may provide the means to easily insert event hooks at runtime, as long as the process inserting the hook is granted enough permission to do so. Microsoft Windows allows to insert hooks that can be used to process or modify system events and application events for dialogs, scrollbars, and menus, as well as other items. It also allows a hook to insert, remove, process, or modify keyboard and mouse events. Linux provides another example where hooks can be used in a similar manner to process network events within the kernel through NetFilter. When such functionality is not provided, a special form of hooking employs intercepting library function calls that are made by a process. Function hooking is implemented by changing the very first few code instructions of the target function to jump to an injected code. Alternatively on systems using the shared library concept, the interrupt vector table or the import descriptor table can be modified in memory.

A hook chain is a list of pointers to special, application-defined callback functions called hook procedures. When a message occurs that is associated with a particular type of hook, the operating system passes the message to each hook procedure referenced in the hook chain, one after the other. The action of a hook procedure can depend on the type of hook involved. For example, the hook procedures for some types of hooks can only monitor messages, others can modify the messages or stop their progress through the chain, restricting them from reaching the next hook procedure or a destination window.

Plug-in. A plug-in (or 'plugin', 'extension', or 'add-on'/ 'addon') is a software component that adds a specific feature to an existing software application, for example for enabling customization. The common examples are the plug-ins used in web browsers to add new features such as search-engines, virus scanners, or the ability to utilize a new file type such as a new video format. An 'Add-on' (or 'addon') is the general term for what enhances an application, and comprises snap-in, plug-in, theme, and skin. An extension add-on tailors the core features of an application by adding an optional module, whereas a plug-in add-on would tailor the outer layers of an application to personalize functionality. A theme or a skin add-on is a preset package containing additional or changed graphical appearance details, achieved by the use of a Graphical User Interface (GUI) that can be applied to a specific software and websites to suit the purpose, topic, or tastes of different users to customize the look and feel of a piece of computer software or an operating system front-end GUI (and window managers).

Typically, the host application provides services which the plug-in can use, including a way for plug-ins to register themselves with the host application and a protocol for the exchange of data with plug-ins. Plug-ins depend on the services provided by the host application and do not usually work by themselves. Conversely, the host application operates independently of the plug-ins, making it possible for end-users to add and update plug-ins dynamically without needing to make changes to the host application. The term 'plug-in' is used herein to include, but not limited to, a software extension, which is software that serves to extend the capabilities of, or data available to an existing software application; it becomes included in the program. Therefore, after integration, extensions can be seen as part of the browser itself, tailored from a set of optional modules.

IPC. An Inter-Process Communication (IPC) (also be referred to as inter-thread communication and inter-application communication) is a set of methods for the exchange of data between multiple threads, in one or more processes. IPC methods may use message passing, synchronization, shared memory, and Remote Procedure Calls (RPC). IPC provides an environment that allows process cooperation, and may be used for providing Information sharing, computational speedup, modularity, convenience, and privilege separation. In the Windows operating system environment, the IPC provides mechanisms for facilitating communications and data sharing between processes or applications.

Common IPC methods include file sharing, where a record (or any other information) stored on disk (or any other memory) can be accessed by name by any process; a signal which is an asynchronous notification sent to a process or to a specific thread within the same process in order to notify it of an event that occurred; a socket which is a data stream sent over a network interface, either to a different process on the same computer or to another computer, such as Internet sockets; a pipe (or pipeline) which is a two-way data stream interfaced through standard input and output and is read character by character, commonly used in Unix-like computer operating systems; message queues which are anonymous data stream similar to the pipe that stores and retrieves information in packets, providing an asynchronous communications protocol; a semaphore which is a variable or abstract data type that is used for controlling access to a common resource; a shared memory which is a memory that may be simultaneously accessed by multiple programs with an intent to provide communication among them or avoid redundant copies, such as where one process creates an area in RAM which other processes can access; and memory mapped file, where a file that is physically present on-disk, but can also be a device, shared memory object, or other resource that the operating system can reference through a file descriptor. Few IPC mechanisms are described in the Marko Vuskovic publication 'Operating Systems' in Chapter 9 entitled: "*INTERPROCESS COMMUNICATION*", which is incorporated in its entirety for all purposes as if fully set forth herein.

The Windows operating system supports IPC mechanisms such as a clipboard, where the clipboard acts as a central depository for data sharing among applications, so when a user performs a cut or copy operation in an application, the application puts the selected data on the clipboard in one or more standard or application-defined formats, and any other application can then retrieve the data from the clipboard, choosing from the available formats that it understands; using Component Object Model (COM), where applications that use Object Linking and Embedding (OLE) manage compound documents can be used to call on other applications for data editing; Using Data Copy enabling an application to send information to another application using the WM_COPYDATA message; DDE protocol that enables applications to exchange data in a variety of formats; and mailslots providing one-way communication where processes write messages to their mailslot.

Browser extension. A browser extension is a computer program that extends the functionality of a web browser in some way. Extensions can be created through use of web technologies such as HTML, JavaScript, and CSS. Browser extensions can also improve the user interface of the web browser without directly affecting viewable content of a web page, which can be achieved through a variety of add ons such as toolbars and plug-ins. Microsoft Internet Explorer started supporting extensions from version 5 released in 1999. Mozilla Firefox has supported extensions since its launch in 2004. The Opera desktop web browser supported extensions from version 10 released in 2009. Google Chrome started supporting extensions from version 4 released in 2010. The Apple Safari web browser started supporting native extensions from version 5 released in 2010. The syntax for extensions may differ from browser to browser, or at least enough different that an extension working on a browser does not work on another one.

Plug-ins add specific abilities into browsers using Application Programming Interfaces (APIs) allowing third parties to create plug-ins that interact with the browser. The original API was NPAPI, but subsequently Google introduced the PPAPI interface in Chrome. In addition, plug-ins allow browser extensions to perform tasks such as blocking ads, creating a secure online connection, and adding applications within a browser. Well-known browser plug-ins include the Adobe Flash Player, the QuickTime Player, and the Java plug-in, which can launch a user-activated Java applet on a web page to its execution a local Java virtual machine.

Sockets. A socket (a.k.a. 'network socket') is an endpoint of an IPC flow across a computer network. In the case the communications is based on IP (Internet Protocol), the network sockets are referred to as Internet sockets. A socket API is an application programming interface (API), usually provided by the operating system, that allows application programs to control and use network sockets. Internet socket APIs are usually based on the Berkeley sockets standard. A socket address is the combination of an IP address and a port number, similar to one end of a telephone connection in the combination of a phone number and a particular extension. Based on this address, internet sockets deliver incoming data packets to the appropriate application process or thread. Sockets are further described in a Universoty of Toronto, Department of Computer Science presentation entitled: "*Tutorial on Socket Programming*" by Amin Tootoonchian, downloaded on August, 2014, and in the SAS Institute Inc. SHARE Session 5958 tutorial 'C Socket Programming Tutorial' entitled: "*Writing Client Server Programs in C Using Sockets (A Tutorial) Part I*", by Greg Granger, dated February of 1998, which are both incorporated in their entirety for all purposes as if fully set forth herein.

An Internet socket is characterized by a unique combination of a Local socket address (Local IP address and port number), remote socket address (used for established TCP sockets), and the used Protocol, typically a transport protocol (e.g., TCP, UDP, raw IP, or others). Within the operating system and the application that created a socket, a socket is referred to by a unique integer value called a socket descriptor. The operating system forwards the payload of incoming IP packets to the corresponding application by extracting the socket address information from the IP and transport protocol headers and stripping the headers from the application data.

Several Internet socket types are available, such as Datagram sockets, also known as connectionless sockets, which use User Datagram Protocol (UDP), Stream sockets, also known as connection-oriented sockets, which use Transmission Control Protocol (TCP) or Stream Control Transmission Protocol (SCTP), and Raw sockets (or Raw IP sockets), typically available in routers and other network equipment. Here the transport layer is bypassed, and the packet headers are made accessible to the application. Other socket types are implemented over other transport protocols, such as Systems Network Architecture (SNA). Communicating local and remote sockets are called socket pairs. Each socket pair is described by a unique 4-tuple consisting of source and destination IP addresses and port numbers, i.e. of local and remote socket addresses. In the TCP case, each unique socket pair 4-tuple is assigned a socket number, while in the UDP case, each unique local socket address is assigned a socket number.

The socket is primarily a concept used in the Transport Layer of the Internet model. Networking equipment such as routers and switches do not require implementations of the Transport Layer, as they operate on the Link Layer level (switches) or at the Internet Layer (routers). However, stateful network firewalls, network address translators, and proxy servers keep track of active socket pairs. Also in fair queuing, layer 3 switching and quality of service (QoS) support in routers, packet flows may be identified by extracting information about the socket pairs. Raw sockets are typically available in network equipment and are used for routing protocols such as IGRP and OSPF, and in Internet Control Message Protocol (ICMP).

The amount of data transferred in a given period in commonly referred to as 'bandwidth' (BW) or 'bit-rate', which is the number of bits that are conveyed or processed per unit of time. The bit rate is quantified using the bits per second unit (symbol bit/s or b/s), often in conjunction with an SI prefix such as kilo-(1 kbit/s=1000 bit/s), mega-(1 Mbit/s=1000 kbit/s), giga-(1 Gbit/s=1000 Mbit/s) or tera-(1 Tbit/s=1000 Gbit/s). The non-standard abbreviation bps is often used to replace the standard symbol bit/s, so that, for example, "1 Mbps" (or 1 Mb/s) is used to mean one million bits per second. One byte per second (1 B/s) corresponds to 8 bit/s.

Latency is typically defined as a time interval between the stimulation and the response, or, from a more general point of view, as a time delay between the cause and the effect of some physical change in the system being observed. Network-related latency, such as in a packet-switched network, is measured either one-way (the time from the source sending a packet to the destination receiving it), or Round-Trip delay Time (RTT), referring to the one-way latency from source to destination plus the one-way latency from the destination back to the source, plus any delays at the destination, such as processing or other delays. Round-trip latency can be measured from a single point. Latency limits total bandwidth in reliable two-way communication systems as described by the bandwidth-delay product, which refers to the product of a data link's capacity (in bits per second)

and its end-to-end delay (in seconds). The result, an amount of data measured in bits (or bytes), is equivalent to the maximum amount of data on the network circuit at any given time, i.e., data that has been transmitted but not yet acknowledged. Sometimes it is calculated as the data link's capacity multiplied by its round trip time. A network with a large bandwidth-delay product is commonly known as a Long Fat Network (LFN). As defined in IETF RFC 1072, a network is considered an LFN if its bandwidth-delay product is significantly larger than 105 bits (12500 bytes).

The Round-trip Delay Time (RTD) or Round-Trip Time (RTT) is the length of time it takes for a signal to be sent and to be received and processed at the destination node, plus the length of time it takes for an acknowledgment of that signal to be received. This time delay therefore includes the propagation times between the two points of a signal. The signal is generally a data packet, and the RTT is also known as the ping time, and an internet user can determine the RTT by using the ping command. Network links with both a high bandwidth and a high RTT can have a very large amount of data (the bandwidth-delay product) "in flight" at any given time. Such "long fat pipes" require a special protocol design. One example is the TCP window scale option. The RTT was originally estimated in TCP by: RTT=($\alpha$·Old_RTT)+((1−$\alpha$)·New_Round_Trip_Sample), where $\alpha$ is a constant weighting factor (0≤$\alpha$<1). Choosing a value a close to 1 makes the weighted average immune to changes that last a short time (e.g., a single segment that encounters long delay). Choosing a value for a close to 0 makes the weighted average response to changes in delay very quickly. Once a new RTT is calculated, it is entered into the above equation to obtain an average RTT for that connection, and the procedure continues for every new calculation. The RTT may be measured as described in IETF 1323, and may be estimated by using a method described in IETF RFC 6323, which are both incorporated in their entirety for all purposes as if fully set forth herein.

An estimation of RTT for messages using TCP may use Karn's Algorithm, described by Karn, Phil and Craig Partridge in ACM SIGCOMM '87—Computer Communication Review publication, entitled: *"Improving Round-Trip Time Estimates in Reliable Transport Protocols"*, which is incorporated in its entirety for all purposes as if fully set forth herein. The round trip time is estimated as the difference between the time that a segment was sent and the time that its acknowledgment was returned to the sender, but when packets are re-transmitted there is an ambiguity: the acknowledgment may be a response to the first transmission of the segment or to a subsequent re-transmission. Karn's Algorithm ignores re-transmitted segments when updating the round trip time estimate. Round trip time estimation is based only on unambiguous acknowledgments, which are acknowledgments for segments that were sent only once.

Many software platforms provide a service called 'ping' that can be used to measure round-trip latency. Ping performs no packet processing; it merely sends a response back when it receives a packet (i.e., performs a no-op), thus it is a first rough way of measuring latency. Ping operates by sending Internet Control Message Protocol (ICMP) echo requesting packets to the target host, and waiting for an ICMP response. During this process it measures the time from transmission to reception (round-trip time) and records any packet loss. The results of the test are printed in a form of a statistical summary of the response packets received, including the minimum, maximum, and the mean round-trip times, and sometimes the standard deviation of the mean.

The Transmission Control Protocol/Internet Protocol (TCP/IP) suite normally used on the Internet has included an Internet Message Control Protocol (ICMP) that is commonly used in echo testing or ping and trace route applications. In general, the Internet standard 'ping' or 'ICMP echo' has a request/response format, wherein one device sends an ICMP echo request and another device responds to a received ICMP echo request with a transmitted ICMP echo response. Normally, IP devices are expected to implement the ICMP as part of the support for IP, to be able to use ICMP for testing. Internet RFC 792, entitled *"Internet Control Message Protocol: DARPA Internet Program Protocol Specification"*, which is incorporated in its entirety for all purposes as if fully set forth herein, at least partially describes the behavior of ICMP. The ICMP echo message has a type field, a code field, a checksum field, an identifier field, a sequence number field, and a data field. According to RFC 79: *"The data received in the echo message must be returned in the echo reply message"*. Thus, an RFC compliant ping responders or an ICMP echo reply message responders are supposed to copy the received data field in an echo request message directly into the data field of the transmitted echo response message.

A newer version of ICMP known as ICMP version 6 or ICMPv6 as described at least partially in RFCs 1885 and 2463, which are both entitled *"Internet Control Message Protocol (ICMPv6) for the Internet Protocol Version 6 (IPv6) Specification"*, which are both incorporated in their entirety for all purposes as if fully set forth herein. According to RFC 2463, *"Every [IPv6] node MUST implement an ICMPv6 Echo responder function that receives Echo Requests and sends corresponding Echo Replies. An IPv6 node SHOULD also implement an application-layer interface for sending Echo Requests and receiving Echo Replies, for diagnostic purposes."*. Thus, responding to ICMP echo requests normally is a necessary function in supporting IPv4 and/or IPv6 standards. The ICMPv6 RFCs 1885 and 2464 goes on to specify that the data field of an ICMP echo response contains the "data from the invoking Echo Request message." Therefore, both ICMP and ICMP v6 associated with IPv4 and IPv6, respectively, specify that the data field in an ICMP echo reply message is to essentially contain a copy of the data received in the corresponding ICMP echo request message.

Moreover, the ICMP echo protocol is basically a two-way echo in which one initiating device and/or process starts the communication by transmitting an echo request message, which may be then received by an echo responder process. The echo responder process, generally located on another device, receives the echo request message and responds with an echo reply back to the initiating process. Once the initiating device and/or process receives the response or times out waiting on the response, the two-way echo exchange of messages is complete. Although the echo request and echo response normally are performed between processes on two different devices, one skilled in the art will be aware that a device can ping its own IP address implying that the echo request and echo responder reply processes are on the same device. In addition, the loopback address of network 127.0.0.0 in IPv4 can be used to allow a device to the loopback outbound echo request messages back into the device's own incoming echo request responder processes. IPv6 has a loopback functionality as well.

This copying of data exactly in the ICMP echo response is somewhat wasteful because the responder generally does not convey that much (if any) information back to the ICMP echo request initiating device. Arguably the initiating device could compute bit error rate (BER) statistics on the transmitted versus the received data field in ICMP echo packets. However, such physical layer issues as BER statistics normally are not as relevant for network layer IP datagrams that already include various error control code mechanisms. Arguably the device running the responding process can communicate information to the device running the initiating process by having the device running the original responding process initiate its own echo request and wait for an echo response from the original initiating device. Such a solution results in four packets, with a first echo request from a local device responded to by a first echo response from a remote device, and with a second echo request from the remote device responded to by a second echo response from the local device.

An identifier and/or sequence number in ping packets generally has allowed the ping to be used by a device to determine the round-trip delay from the time an ICMP echo request packet is sent to the time corresponding to when an associated received ICMP echo request is received back at an initiating device. Furthermore, ping packets generally convey little or no information about the type of the device that initiated the ping. Moreover, although IPv4 has Type of Service (ToS) fields in the IP datagram, these fields have become more important as the services used over the Internet and networks using Internet technology have grown from basic computer data communication to also include real-time applications such as voice and/or video. Various Type of Service (ToS) in IPv4 and IPv6 have been used in implementing various (Quality of Service) QoS characteristics that are defined for different classes of service and/or Service Level Agreements (SLAs).

Timestamp. A timestamp is a sequence of characters or encoded information identifying when a certain event occurred, usually giving date and time of day, sometimes accurate to a small fraction of a second, and also refers to digital date and time information attached to the digital data. For example, computer files contain timestamps that tell when the file was last modified, and digital cameras add timestamps to the pictures they take, recording the date and time the picture was taken. A timestamp is typically the time at which an event is recorded by a computer, not the time of the event itself. In many cases, the difference may be inconsequential: the time at which an event is recorded by a timestamp (e.g., entered into a log file) should be close to the time of the event. Timestamps are typically used for logging events or in a Sequence of Events (SOE), in which case each event in the log or SOE is marked with a timestamp. In a file system such as a database, timestamp commonly mean the stored date/time of creation or modification of a file or a record. The ISO 8601 standard standardizes the representation of dates and times which are often used to construct timestamp values, and IETF RFC 3339 defines a date and time format for use in Internet protocols using the ISO 8601 standard representation.

Caching. A system and method for increasing cache size by performing the steps of: categorizing storage blocks within a storage device as within a first category of storage blocks if the storage blocks that are available to the system for storing data when needed; categorizing storage blocks within the storage device as within a second category of storage blocks if the storage blocks contain application data therein; and categorizing storage blocks within the storage device as within a third category of storage blocks if the storage blocks are storing cached data and are available for storing application data if no first category of storage blocks are available to the system, is described in U.S. Pat. No. 8,135,912 to Shribman et al. entitled: "System and Method of Increasing Cache Size", which is incorporated in its entirety for all purposes as if fully set forth herein. A system for resolving Domain Name System (DNS) queries that contains a communication device for resolving DNS queries, wherein the communication device further contains a memory and a processor that is configured by the memory, a cache storage for use by the communication device, and a network of authoritative domain name servers, where in a process of the communication device looking up a DNS request within the cache storage, if the communication device views an expired DNS entry within the cache storage, the communication device continues the process of looking up the DNS request in the cache storage while, in parallel, sending out a concurrent DNS request to an authoritative domain name server that the expired DNS entry belongs to, is described in U.S. Pat. No. 8,671,221 to the same inventors as this application, entitled: "Method and System for Increasing Speed of Domain Name System Resolution within a Computing Device", which is incorporated in its entirety for all purposes as if fully set forth herein.

Systems and methods of storing previously transmitted data and using it to reduce bandwidth usage and accelerate future communications, and using algorithms to identify long compression history matches. A network device that may improve compression efficiency and speed is described in U.S. Pat. No. 7,865,585 to Samuels et al., entitled: "Systems and Methods for Providing Dynamic Ad Hok Proxy-Cache Hierarchies", which is incorporated in its entirety for all purposes as if fully set forth herein. Further, a method and system for accelerating the receipt of data in a client-to-client network described in U.S. Pat. No. 7,203,741 to Marco et al., entitled: "Method and System for Accelerating Receipt of Data in a Client-to-Client Network", which is incorporated in its entirety for all purposes as if fully set forth herein.

Hearbeat. A heartbeat is a periodic signal generated by hardware or software to indicate normal operation or to synchronize other parts of a system. Usually a heartbeat is sent between machines at a regular interval of an order of seconds. If a heartbeat is not received for a time—usually a few heartbeat intervals—the machine that should have sent the heartbeat is assumed to have failed. As used herein, a heartbeat is a periodic message, such as a 'ping', generated by devices connected to the Internet to indicate being 'online' (connected to the Internet) and normal operation, and if a heartbeat is not received for a time, the device is assumed to be 'offline' (not connected to the Internet). A heartbeat protocol is generally used to negotiate and monitor the availability of a resource, such as a floating IP address. Typically, when a heartbeat starts on a machine, it will perform an election process with other machines on the network to determine which machine, if any, owns the resource. The IETF RFC 6520 describes Heartbeat operation for the Transport Layer Security (TLS), and is incorporated in its entirety for all purposes as if fully set forth herein.

Users in the Internet may desire anonymity in order not to be identified as a publisher (sender), or reader (receiver), of information. Common reasons include censorship at the local, organizational, or national level, personal privacy preferences such as preventing tracking or data mining activities, the material or its distribution is considered illegal or incriminating by possible eavesdroppers, the material may be legal but socially deplored, embarrassing, or problematic in the individual's social world, and fear of retribution (against whistleblowers, unofficial leaks, and activists who do not believe in restrictions on information nor knowledge). Full anonymity on the Internet, however, is not guaranteed since IP addresses can be tracked, allowing to identify the computer from which a certain post was made, albeit not the actual user. Anonymizing services, such as I2P—'The Anonymous Network' or Tor, address the issue of IP tracking, as their distributed technology approach may grant a higher degree of security than centralized anonymizing services where a central point exists that could disclose one's identity. An anonymous web browsing refers to browsing the World Wide Web while hiding the user's IP address and any other personally identifiable information from the websites that one is visiting. There are many ways of accomplishing anonymous web browsing. Anonymous web browsing is generally useful to internet users who want to ensure that their sessions cannot be monitored. For instance, it is used to circumvent traffic monitoring by organizations that want to find out or control which web sites employees visit. Further, since some web-sites response differently when approached from mobile devices, anonymity may allow for accessing such a web-site from a non-mobile device, posing as a mobile device.

WiFi. A device herein (such as device 11) may consist of, be part of, or include, a Personal Computer (PC), a desktop computer, a mobile computer, a laptop computer, a notebook computer, a tablet computer, a server computer, a handheld computer, a handheld device, a Personal Digital Assistant (PDA) device, or a cellular handset. Alternatively or in addition, a device may consist of, be part of, or include, a handheld PDA device, an on-board device, an off-board device, a hybrid device, a vehicular device, a non-vehicular device, a mobile device, or a portable device. A network herein (such as LAN 14), may consist of, be part of, or include, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), or a Wireless PAN (WPAN). Alternatively or in addition, a network herein may be operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards. Further, a network element (or a device) herein may consist of, be part of, or include, a cellular radio-telephone communication system, a cellular telephone, a wireless telephone, a Personal Communication Systems (PCS) device, a PDA device which incorporates a wireless communication device, or a mobile/portable Global Positioning System (GPS) device. The communication interface 29 may consist of, be part of, or include, a transceiver or modem for communication with the network, such as LAN 14. In the case of wired networks, the communication interface 29 connects to the network via a port 28 that may include a connector, and in the case of wireless network, the communication interface 29 connects to the network via a port 28 that may include an antenna.

The LAN 14 may be a Wireless LAN (WLAN) such as according to, or base on, IEEE 802.11-2012, and the WLAN port may be a WLAN antenna and the WLAN transceiver may be a WLAN modem. The WLAN may be according to, or base on, IEEE 802.11a, IEEE 802.11b, IEEE 802.11g, IEEE 802.11n, or IEEE 802.11ac. Commonly referred to as Wireless Local Area Network (WLAN), such communication makes use of the Industrial, Scientific and Medical (ISM) frequency spectrum. In the US, three of the bands within the ISM spectrum are the A-Band, 902-928 MHz; the B-Band, 2.4-2.484 GHz (a.k.a. 2.4 GHz); and the C-Band, 5.725-5.875 GHz (a.k.a. 5 GHz). Overlapping and/or similar bands are used in different regions such as Europe and Japan. In order to allow interoperability between equipment manufactured by different vendors, few WLAN standards have evolved, as part of the IEEE 802.11 standard group, branded as WiFi (www.wi-fi.org). The IEEE 802.11b standard describes a communication using the 2.4 GHz frequency band and supporting a communication rate of 11 Mb/s, IEEE 802.11a uses the 5 GHz frequency band to carry 54 MB/s, and IEEE 802.11g uses the 2.4 GHz band to support 54 Mb/s. The WiFi technology is further described in a publication entitled: "WiFi Technology" by Telecom Regulatory Authority, published on July 2003, which is incorporated in its entirety for all purposes as if fully set forth herein. The IEEE 802 defines an ad-hoc connection between two or more devices without using a wireless access point: the devices communicate directly when in range. An ad hoc network offers peer-to-peer layout and is commonly used in situations such as a quick data exchange or a multiplayer LAN game, because the setup is easy and an access point is not required.

In order to support multiple devices and using a permanent solution, a Wireless Access Point (WAP) is typically used. A Wireless Access Point (WAP, or Access Point—AP) is a device that allows wireless devices to connect to a wired network using Wi-Fi, or related standards. The WAP usually connects to a router (via a wired network) as a standalone device, but it can also be an integral component of the router itself. Using Wireless Access Point (AP) allows users to add devices that access the network with little or no cables. A WAP normally connects directly to a wired Ethernet connection and the AP then provides wireless connections using radio frequency links for other devices to utilize that wired connection. Most APs support the connection of multiple wireless devices to one wired connection. An example of using WAPs is shown in a system 20a shown in FIG. 2b, where a device 11a (corresponding to the device 11 above) may communicate, and for example, any access the Internet, via any one of a WAPs 26a, 26b, or 26c. Wireless access typically involves special security considerations, since any device within a range of the WAP can attach to the network. The most common solution is wireless traffic encryption. Modern access points come with built-in encryption such as Wired Equivalent Privacy (WEP) and Wi-Fi Protected Access (WPA), typically used with a password or a passphrase. A WAP may not be password protected, allowing free access (for example to the Internet via the WAP) to any device communicating with it, such as WAP 26a shown in system 20a. However, most WAPs, such as WAPs 26b and 26c shown in system 20a (denoted with the lock symbol), are password protected, allowing access only to specific users which can use the password.

Authentication in general, and a WAP authentication in particular, is used as the basis for authorization, which is the determination whether a privilege may be granted to a particular user or process, privacy, which keeps information from becoming known to non-participants, and non-repudiation, which is the inability to deny having done something that was authorized to be done based on the authentication. An authentication in general, and a WAP authentication in particular, may use an authentication server, that provides a network service that applications may use to authenticate the credentials, usually account names and passwords, of their users. When a client submits a valid set of credentials, it receives a cryptographic ticket that it can subsequently use to access various services. Authentication algorithms include passwords, Kerberos, and public key encryption.

Compression. Data compression, also known as source coding and bit-rate reduction, involves encoding information using fewer bits than the original representation. Compression can be either lossy or lossless. Lossless compression reduces bits by identifying and eliminating statistical redundancy, so that no information is lost in lossless compression. Lossy compression reduces bits by identifying unnecessary information and removing it. The process of reducing the size of a data file is commonly referred to as a data compression. A compression is used to reduce resource usage, such as data storage space or transmission capacity. Data compression is further described in a Carnegie Mellon University chapter entitled: "Introduction to Data Compression" by Guy E. Blelloch, dated Jan. 31, 2013, which is incorporated in its entirety for all purposes as if fully set forth herein.

In a scheme involving lossy data compression, some loss of information is acceptable. For example, dropping of a nonessential detail from a data can save storage space. Lossy data compression schemes may be informed by research on how people perceive the data involved. For example, the human eye is more sensitive to subtle variations in luminance than it is to variations in color. JPEG image compression works in part by rounding off nonessential bits of information. There is a corresponding trade-off between preserving information and reducing size. A number of popular compression formats exploit these perceptual differences, including those used in music files, images, and video.

Lossy image compression is commonly used in digital cameras, to increase storage capacities with minimal degradation of picture quality. Similarly, DVDs use the lossy MPEG-2 Video codec for video compression. In lossy audio compression, methods of psychoacoustics are used to remove non-audible (or less audible) components of the audio signal. Compression of human speech is often performed with even more specialized techniques; speech coding, or voice coding, is sometimes distinguished as a separate discipline from audio compression. Different audio and speech compression standards are listed under audio codecs. Voice compression is used in Internet telephony, for example, and audio compression is used for CD ripping and is decoded by audio player.

Lossless data compression algorithms usually exploit statistical redundancy to represent data more concisely without losing information, so that the process is reversible. Lossless compression is possible because most real-world data has statistical redundancy. The Lempel-Ziv (LZ) compression methods are among the most popular algorithms for lossless storage. DEFLATE is a variation on LZ optimized for decompression speed and compression ratio, and is used in PKZIP, Gzip and PNG. The LZW (Lempel-Ziv-Welch) method is commonly used in GIF images, and is described in IETF RFC 1951. The LZ methods use a table-based compression model where table entries are substituted for repeated strings of data. For most LZ methods, this table is generated dynamically from earlier data in the input. The table itself is often Huffman encoded (e.g., SHRI, LZX). Typical modern lossless compressors use probabilistic models, such as prediction by partial matching.

Lempel-Ziv-Welch (LZW) is an example of lossless data compression algorithm created by Abraham Lempel, Jacob Ziv, and Terry Welch. The algorithm is simple to implement, and has the potential for very high throughput in hardware implementations. It was the algorithm of the widely used Unix file compression utility compress, and is used in the GIF image format. The LZW and similar algorithms are described in U.S. Pat. No. 4,464,650 to Eastman et al. entitled: "Apparatus and Method for Compressing Data Signals and Restoring the Compressed Data Signals", in U.S. Pat. No. 4,814,746 to Miller et al. entitled: "Data Compression Method", and in U.S. Pat. No. 4,558,302 to Welch entitled: "High Speed Data Compression and Decompression Apparatus and Method", which are all incorporated in their entirety for all purposes as if fully set forth herein.

A class of lossless data compression algorithms is based on using dictionaries, and operates by searching for matches between the text to be compressed and a set of strings contained in a data structure (called the 'dictionary') maintained by the encoder. When the encoder finds such a match, it substitutes a reference to the string's position in the data structure.

Some dictionary coders use a 'static dictionary', one whose full set of strings is determined before coding begins and does not change during the coding process. This approach is most often used when the message or set of messages to be encoded is fixed and large. A dictionary is often built from redundancy extracted from a data environment (various input streams) which dictionary is then used statically to compress a further input stream. For example, a dictionary may be built from old English texts then is used to compress a book. More common are methods where the dictionary starts in some predetermined state, but the contents change during the encoding process, based on the data that has already been encoded.

Both the LZ77 and LZ78 algorithms work on this principle, where in LZ77, a circular buffer called the "sliding window" holds the last N bytes of data processed, which serves as the dictionary, effectively storing every substring that has appeared in the past N bytes as dictionary entries. Instead of a single index identifying a dictionary entry, two values are needed: the length, indicating the length of the matched text, and the offset (also called the distance), indicating that the match is found in the sliding window starting offset bytes before the current text. LZ78 uses a more explicit dictionary structure; at the beginning of the encoding process, the dictionary only needs to contain entries for the symbols of the alphabet used in the text to be compressed, but the indexes are numbered in order to leave spaces for many more entries. At each step of the encoding process, the longest entry in the dictionary that matches the text is found, and its index is written to the output; the combination of that entry and the character that followed it in the text is then added to the dictionary as a new entry. An example of a dictionary-based compression is described in an University of Michigan paper entitled: "*Dictionary-Based Compression for Long Time-Series Similarity*" by Willis Lang, Michael Morse, and Jignesh M. Patel, downloaded from http://pages.cs.wisc.edu/ on August 2014, which is incorporated in its entirety for all purposes as if fully set forth herein.

A one-way dictionary-based compression system is shown as a system 470 in FIG. 4. An encoding device 471 is shown to transmit data, such as DATA_1 to a decoding device 472 via a network 480, which may be the Internet 113. The encoding device 471 comprises an encoder 474 (also referred to as a coder, data coder, or data compressor), serving to compress DATA_1 received at an input port 475*a* into a DATA_2 (which is a lossless compression of DATA_1, preferably having a lower number of bits or lower data-rate that DATA_1) at an output port 475*b*, using the content in a shared dictionary 473a. The output DATA_2 is transmitted via the network 480, and is received at an input port 476a of a decoder 477 (also referred to as a data decoder or data decompressor) in the decoding device 472. Using a shared dictionary 473b in the decoding device 472, which preferably includes the same content as in the shared dictionary 473a of the encoding device 471, the decoder 477 reconstructs the original data DATA_1 at an output port 476b.

A two-way dictionary-based compression system is shown as a system 470a in FIG. 4a. An encoding/decoding device 471c includes the functionalities of an encoding device 471a for transmitting, and of a decoding device 472a for receiving data. Similarly, an encoding/decoding device 472c includes the functionalities of the encoding device 471a for transmitting, and of the decoding device 472a for receiving data. In addition to the functionality of the decoding device 472a, the encoding/decoding device 472c is shown to also transmit data, such as DATA_3 to the encoding/decoding device 471c via the network 480, which may be the Internet 113. The encoding/decoding device 472c comprises an encoder 474b (also referred to as a coder, data coder, or data compressor), serving to compress DATA_3 received at an input port 475c into a DATA_4 (which is a lossless compression of DATA 3, preferably having a lower number of bits or lower data-rate that DATA 3) at an output port 475d, using the content in a shared dictionary 473d. The output DATA_4 is transmitted via the network 480, and is received at an input port 476d of a decoder 477b (also referred to as a data decoder or data decompressor) in the encoding/decoding device 471c. Using the shared dictionary 473c in the encoding/decoding device 471c, which preferably includes the same content as in the shared dictionary 473d of the encoding/decoding device 472c, the decoder 477b reconstructs the original data DATA_3 at an output port 476c.

Image/video. Any content herein may consist of, be part of, or include, an image or a video content. A video content may be in a digital video format that may be based on one out of: TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. A intraframe or interframe compression may be used, and the compression may a lossy or a non-lossy (lossless) compression, that may be based on a standard compression algorithm, which may be one or more out of JPEG (Joint Photographic Experts Group) and MPEG (Moving Picture Experts Group), ITU-T H.261, ITU-T H.263, ITU-T H.264 and ITU-T CCIR 601.

Web Analytics. Web analytics typically refers to the measurement, collection, analysis, and reporting of web data for purposes of understanding and optimizing web usage. Web analytics is commonly used for measuring web traffic, and may be used as a tool for business and market research, as well as to assess and improve the effectiveness of a web site. Web analytics applications can also help companies measure the results of traditional print or broadcast advertising campaigns. For example, it helps one to estimate how traffic to a website changes after the launch of a new advertising campaign. The web analytics provide information about the number of visitors to a website and the number of page views, and helps gauge traffic and popularity trends, which may be useful for market research. Web analytics related description and methods are described in a whitepaper by E-Nor, Inc. entitled: "*A 7-Step Analytics Reporting Framework—Marketing Optimization Whitepaper*" by Feras Alhlou, downloaded on August 2014, and in U.S. Pat. No. 8,234,370 to Hammer et al., entitled: "Determining Web Analytics Information", in U.A. Patent Application Publication No. 2008/0046562 to Butler entitled: "Visual Web Page Analytics", and in U.S. Pat. No. 7,941,525 to Yavilevich entitled: "Method and System for Monitoring an Activity of a User", which are all incorporated in their entirety for all purposes as if fully set forth herein.

There are two categories of web analytics: off-site and on-site web analytics. Off-site web analytics refers to web measurement and analysis, and includes the measurement of a website's potential audience (opportunity), share of voice (visibility), and buzz (comments) that is happening on the Internet. On-site web analytics measure a visitor's behavior once on the website, and includes its drivers and conversions; for example, the degree to which different landing pages are associated with online purchases. On-site web analytics typically measures the performance of the website in a commercial context, and this data is typically compared against key performance indicators for performance, and used to improve a web site or marketing campaign's audience response. Google Analytics is a widely used on-site web analytics service; although new tools are emerging that provide additional layers of information, including heat maps and session replay.

Google Analytics is a service offered by Google that generates detailed statistics about a website's traffic and traffic sources and measures conversions and sales. The product is aimed at marketers as opposed to webmasters and technologists from which the industry of web analytics originally grew. Google Analytics can track visitors from all referrers, including search engines and social networks, direct visits and referring sites, and also tracks display advertising, pay-per-click networks, email marketing and digital collateral such as links within PDF documents. Integrated with AdWords, users can now review online campaigns by tracking landing page quality and conversions (goals). Goals might include sales, lead generation, viewing a specific page, or downloading a particular file.

Google Analytics is implemented with "page tags". A page tag, in this case called the Google Analytics Tracking Code is a snippet of JavaScript code that the website owner user adds to every page of the website. The tracking code runs in the client browser when the client browses the page (if JavaScript is enabled in the browser), and collects visitor data and sends it to a Google data collection server, as part of a request for a web beacon. The tracking code loads a larger JavaScript file from the Google webserver and then sets variables with the user's account number. The larger file (currently known as ga.js) is typically 18 KB. The file does not usually have to be loaded, though, because of browser caching. Assuming caching is enabled in the browser, it downloads ga.js only once at the start of the visit. Furthermore, as all websites that implement Google Analytics with the ga.js code use the same master file from Google, a browser that has previously visited any other website running Google Analytics will already have the file cached on their machine. In addition to transmitting information to a Google server, the tracking code sets first party cookies (If cookies are enabled in the browser) on each visitor's computer. These cookies store anonymous information, such as whether the visitor has been to the site before (new or returning visitor), the timestamp of the current visit, and the referrer site or campaign that directed the visitor to the page (e.g., search engine, keywords, banner, or email). Google Analytics is further described in an Koozai Ltd. guide entitled: "*The Practical Guide To Google Analytics For Business*", 2$^{nd}$ Edition, published 2013, by Anna Lewis, Graeme Benge, and Gemma Hollooway, which is incorporated in its entirety for all purposes as if fully set forth herein.

DHCP. The Dynamic Host Configuration Protocol (DHCP) is a standardized networking protocol used on Internet Protocol (IP) networks for dynamically distributing network configuration parameters, such as IP addresses for interfaces and services. With DHCP, network elements request IP addresses and networking parameters automatically from a DHCP server, reducing the need for a network administrator or a user to configure these settings manually.

DHCP is typically used by network elements for requesting Internet Protocol parameters, such as an IP address from a network server, and is based on the client-server model. When a network element connects to a network, its DHCP client software in the operating system sends a broadcast query requesting necessary information. Any DHCP server on the network may service the request. The DHCP server manages a pool of IP addresses and information about client configuration parameters such as default gateway, domain name, the name servers, and time servers. On receiving a request, the server may respond with specific information for each client, as previously configured by an administrator, or with a specific address and any other information valid for the entire network, and the time period for which the allocation (lease) is valid. A host typically queries for this information immediately after booting, and periodically thereafter before the expiration of the information. When an assignment is refreshed by the client computer, it initially requests the same parameter values, and may be assigned a new address from the server, based on the assignment policies set by administrators.

Depending on implementation, the DHCP server may have three methods of allocating IP-addresses: (a) Dynamic allocation, where a network administrator reserves a range of IP addresses for DHCP, and each client computer on the LAN is configured to request an IP address from the DHCP server during network initialization. The request-and-grant process uses a lease concept with a controllable time period, allowing the DHCP server to reclaim (and then reallocate) IP addresses that are not renewed. (b) Automatic allocation, where the DHCP server permanently assigns an IP address to a requesting client from the range defined by the administrator. This is similar to dynamic allocation, but the DHCP server keeps a table of past IP address assignments, so that it can preferentially assign to a client the same IP address that the client previously had. (c) Static allocation, where the DHCP server allocates an IP address based on a preconfigured mapping to each client's MAC address.

DHCP used for Internet Protocol version 4 (IPv4) is described in IETF RFC 2131, entitled "*Dynamic Host Configuration Protocol*", and DHCP for IPv6 is described IETF RFC 3315, entitled: "*Dynamic Host Configuration Protocol for IPv6 (DHCPv6)*", both incorporated in their entirety for all purposes as if fully set forth herein. While both versions serve the same purpose, the details of the protocol for IPv4 and IPv6 are sufficiently different that they may be considered separate protocols. For IPv6 operation, devices may alternatively use stateless address auto-configuration. IPv4 hosts may also use link-local addressing to achieve operation restricted to the local network link.

The DHCP protocol employs a connectionless service model, using the User Datagram Protocol (UDP). It is implemented with two UDP port numbers for its operations, which are the same as for the BOOTP protocol. The UDP port number 67 is the destination port of a server, and the UDP port number 68 is used by the client. DHCP operations fall into four phases: Server discovery, IP lease offer, IP request, and IP lease acknowledgment. These stages are often abbreviated as DORA for discovery, offer, request, and acknowledgment. The DHCP protocol operation begins with clients broadcasting a request. If the client and server are on different subnets, a DHCP Helper or DHCP Relay Agent may be used. Clients requesting renewal of an existing lease may communicate directly via an UDP unicast, since the client already has an established IP address at that point.

Redundancy. A redundancy may be used in order to improve an accuracy, reliability, or availability. The redundancy may be implemented where two or more components may be used for the same functionality. The components may be similar, substantially or fully the same, identical, different, substantially different, or distinct from each other, or any combination thereof. The redundant components may be concurrently operated, allowing for improved robustness and allowing for overcoming a Single Point Of Failure (SPOF), or alternatively one or more of the components serves as a backup. The redundancy may be a standby redundancy, which may be 'Cold Standby' and 'Hot Standby'. In the case three redundant components are used, Triple Modular Redundancy (TMR) may be used, and Quadruple Modular Redundancy (QMR) may be used in the case of four components. A 1:N Redundancy logic may be used for three or more components. A communication system employing redundancy is described in U.S. Patent Application No. 2013/0201316 to Binder et al., entitled: "System and Method for Server Based Control", and redundancy for carrying audio over the Internet is described in IETF RFC 2198 entitled: "*RTP Payload for Redundant Audio Data*", both are incorporated in their entirety for all purposes as if fully set forth herein.

Parallel Redundancy Protocol (PRP) is a data communication network standardized by the International Electrotechnical Commission (IEC) as IEC 62439-3 Clause 4, which allows systems to overcome any single network failure without affecting the data transmission by using redundancy. Under PRP, each network node has two Ethernet ports attached to two different local area networks of arbitrary, but similar topology, and the two LANs are completely separated and are assumed to be fail-independent. A source node sends simultaneously two copies of a frame, one over each port. The two frames travel through their respective LANs until they reach a destination node, in the fault-free case, with a certain time skew. The destination node accepts the first frame of a pair and discards the second, taking advantage of a sequence number in each frame that is incremented for each frame sent. Therefore, as long as one LAN is operational, the destination always receives one frame. This protocol provides a zero-time recovery and allows checking the redundancy continuously to detect lurking failures. The PRP is described in an ABB Switzerland Ltd. 2012 presentation entitled "*Highly Available Automation Networks Standard Redundancy Methods Rationale behind the IEC 63429 standard suite*", and in a Zurich University tutorial entitled: "*Tutorial on Parallel redundancy Protocol (PRP)*", by Prof Hans Weibel, downloaded July 2014, both are incorporated in their entirety for all purposes as if fully set forth herein.

Gateway. The term 'gateway' is used herein to include, but not limited to, a network element (or node) that is equipped for interfacing between networks that uses different protocols. A gateway typically contains components such as protocol translators, impedance matching devices, rate converters, fault isolators, or signal translators, as necessary to provide networking interoperability. A gateway may be a router or a proxy server that routes between networks, and may operate at any network layer. In a network for an enterprise, a computer server acting as a gateway node is often also acting as a proxy server and a firewall server. A gateway is often associated with both a router, which knows where to direct a given packet of data that arrives at the gateway, and a switch, which furnishes the actual path in and out of the gateway for a given packet.

A subnet mask is a mask used to determine what subnet belongs to an IP address. An IP address has two components, the network address and the host address. For example, consider the IP address 150.215.017.009. Assuming this is part of a Class B network, the first two numbers (150.215) represent the Class B network address, and the second two numbers (017.009) identify a particular host on this network. A subnetting enables the network administrator to further divide the host part of the address into two or more subnets. In this case, a part of the host address is reserved to identify the particular subnet. On an IP network, clients should automatically send IP packets with a destination outside a given subnet mask to a network gateway. A subnet mask defines the IP range of a private network. For example, if a private network has a base IP address of 192.168.0.0 and has a subnet mask of 255.255.255.0, then any data going to an IP address outside of 192.168.0.X will be sent to that network gateway. While forwarding an IP packet to another network, the gateway might or might not perform Network Address Translation (NAT).

Domain Name System (DNS) is a hierarchical distributed naming system for computers, services, or any resource connected to the Internet or a private network. It associates various information with domain names assigned to each of the participating entities, and translates easily memorized domain names to the numerical IP addresses needed for the purpose of locating computer services and devices worldwide. The DNS is described, for example, in the IETF RFC 3467 entitled: "*Role of the Domain Name System (DNS)*", in the IETF RFC 6195 entitled: "*Domain Name System (DNS) IANA Considerations*", and in the IETF RFC 1591 entitled: "*Domain Name System Structure and Delegation*", which are incorporated in their entirety for all purposes as if fully set forth herein.

The '404' or 'Not Found' error message is a HTTP standard response code indicating that the client was able to communicate with a given gateway or server, but the server could not find what was requested. The web site hosting server will typically generate a "404 Not Found" web page when a user attempts to follow a broken or dead link; hence, the 404 error is one of the most recognizable errors users can find on the web. When communicating via HTTP, a server is required to respond to a request, such as a web browser request for a web page, with a numeric response code and an optional, mandatory, or disallowed (based upon the status code) message. In the code 404, the first digit indicates a client error, such as a mistyped Uniform Resource Locator (URL). The following two digits indicate the specific error encountered. At the HTTP level, a 404 response code is followed by a human-readable "reason phrase". The HTTP specification suggests the phrase "Not Found" and many web servers by default issue an HTML page that includes both the 404 code and the "Not Found" phrase.

Referring to FIG. 50 showing a system 500 using a gateway #1 505*a* as an intermediate device between a LAN 503 (which may be the LAN 14 in FIG. 1) and a WAN 502 (which may be the Internet 113). The gateway #1 505*a* allows an application 506 in the network element 504 to communicate with another network element such as a server 501 via the networks. The network element 504 typically includes a memory, such as the main memory 25*a*, the storage device 25*c*, or the ROM 25*b*, storing a software 508, which typically includes the application 506, which uses the Operating System (OS) 507, which may be associated with the WDM architecture 430 shown in FIG. 3, or with the Linux architecture 450 shown in FIG. 3*a*. As part of initializing of a communication session with the network element 501, the OS 507 typically identifies the gateway 505*a* in the LAN 503, and obtains therefrom the required information such as an IP address, a DNS server IP, a subnet mask, and other information to be used before and during the communication session. The gateway #1 505*a* may consist of, include, be part of, or integrated with, a network router or a WiFi router.

In consideration of the foregoing, it would be an advancement in the art to provide an improved functionality method and system that is simple, secure, anonymous, cost-effective, load balanced, redundant, reliable, provide lower CPU and/or memory usage, enable pipelining of requests and responses, reduce network congestion, easy to use, reduce latency, faster, has a minimum part count, minimum hardware, and/or uses existing and available components, protocols, programs and applications for providing better quality of service, overload avoidance, better or optimal resources allocation, better communication and additional functionalities, and provides a better user experience.

SUMMARY

A system may comprise multiple data servers and multiple client and tunnel devices, each data server may be storing a respective content that may be fetched by the client devices via the Internet. The tunnel devices may be used as intermediate devices (or nodes). Upon initializing of the client and tunnel devices (such as upon powering up or upon launching the applicable software application), they sign-in with an acceleration server, which stores an identification (such as IP address) of each of the client and tunnel devices. A client device, which may be requesting a content from a data server, first communicates with the acceleration server to receive a list of the available tunnel devices. The client device may then select one (or more) tunnel device, and then executes a pre-connection process with the selected tunnel device. Upon determining the need for a content to be fetched from the data server, the client device sends a request to the tunnel device, which in turn fetches the required content from the data server, and sends the fetched content to the client device. Each of the devices (client or tunnel) and each of the servers (acceleration or data) may be identified in the Internet using an IP address that may be in an IPv4 or IPv6 form. Alternatively or in addition to using an intermediary device such as the tunnel device (or multiple tunnel devices), the client device may directly access and fetch content from the data server, without using any intermediate device such as a tunnel device. A device may be both a client device and a tunnel device, and the roles may be assumed one at a time, or may be employed in parallel using multitasking or multiprocessing.

The required communication of requests and content between the client device and the selected tunnel device may be preceded by a pre-connection phase used for establishing a connection between the devices, which may be later used for the required request or content transfer. The devices may communicate using VPN or TCP, and a connection may be established by performing 'Active OPEN' or 'Passive OPEN'. The content may include files, text, numbers, audio, voice, multimedia, video, images, music, computer programs or any other sequence of instructions, as well as any other form of information represented as a string of bits or bytes. In one example, the content may include, be a part of, or a whole of, a website page.

One or a plurality of tunnel devices may be used. Further, a device may directly access the data server, hence acting as its own tunnel device. The selection of a tunnel or of multiple tunnels to be used by the client device may be based on pre-set criteria. The selection may use various attributes or characteristics of the tunnel devices, its operation environment, history, and any other characteristics. The attributes associated with each tunnel device may be stored in the acceleration server, and sent to the client device as part of the available tunnel devices list, so that the client device may use these attributes for the selection process. The criteria herein may be used independently or in combination. In yet another alternative, the selection may be based on a timing, such as Time-Of-Day (TOD) or a day of the week.

The tunnel device (or devices) to be used may be randomly selected; using a random number generator may be based on a physical process, or may be software based using pseudo-random numbers. Alternatively or in addition, the tunnel device (or devices) to be used may be selected based on physical geographical location, such as based on the physical proximity to another device in the system, such as the data server. Alternatively or in addition, the tunnel device (or devices) to be used may be selected based on their IP address or addresses. Alternatively or in addition, the tunnel device (or devices) to be used may be selected based on their sign-in time, or the time of its last activity as a tunnel.

The content requested by the client device may be partitioned into multiple parts or 'slices'. Any number of slices may be used. The slicing may be in a bit, nibble (4-bits), byte (8-bits), word (multiple bytes), character, string, or a file level. The partition may be into equal length parts, or may use different length slicing. The content may be composed of inherent or identifiable parts or segments, and the partition may make use of these parts. The content may be a website content composed of multiple webpages, and each slice may include one (or few) webpages. Further, the partition may be sequential or non-sequential in the content. The partitioning may be non-overlapping or overlapping.

A method is disclosed for fetching over the Internet a first content, identified by a first content identification, by a first device, identified in the Internet by a first identifier, from a second server identified in the Internet by a third identifier via a second device identified in the Internet by a second identifier, by using a first server. The method may be comprising the steps of the second device sending the second identifier to the first server; in response to receiving the second identifier, the first server storing the second identifier; the first device sending a first request to the first server; in response to receiving the first request, the first server sending the second identifier to the first device; the first device sending a second request to the second device using the second identifier, the second request includes the first content identification and the third identifier; in response to receiving the second request, the second device sending the first content identification to the second server using the third identifier; in response to receiving the first content identification, the second server sending the first content to the second device; and in response to receiving the first content, the second device sending the first content to the first device.

The method may further comprise the following steps of the first device sending the first content identification to the second server using the third identifier; and in response to receiving the first content identification, the second server sending the first content to the first device. These steps may be performed before, after, or concurrently (using multitasking or multiprocessing) with any of the former steps.

The method may further be used with a third device identified in the Internet by a fourth identifier, and may further comprise the steps of the third device sending the fourth identifier to the first server; in response to receiving the fourth identifier, the first server storing the fourth identifier; in response to receiving the first request, the first server sending the fourth identifier to the first device; the first device sending a third request to the third device using the fourth identifier, the third request includes the first content identification and the third identifier; in response to receiving the third request, the third device sending the first content identification to the second server using the third identifier; in response to receiving the first content identification, the second server sending the first content to the third device; and in response to receiving the first content, the third device sending the first content to the first device. These steps may be performed before, after, or concurrently (using multitasking or multiprocessing) with any of the former steps.

The method may further be used with a group consisting of a plurality of devices, each associated with a respective identifier for being identified in the Internet, for each of the devices in the group the method further comprising the steps of the group device sending the associated identifier to the first server; and in response to receiving the associated identifier, the first server storing the associated identifier. Further, in response to receiving the first request, the first server may be sending the identifiers of all the devices in the group to the first device. The method may further comprise the steps of the first device sending a third request to the group device using the device associated identifier, the third request includes the first content identification and the third identifier; in response to receiving the third request, the group device sending the first content identification to the second server using the third identifier; in response to receiving the first content identification, the second server sending the first content to the group device; and in response to receiving the first content, the group device sending the first content to the first device.

The second device may be included as part of the group, and the method may further comprise a step of selecting the second device out of the devices in the group. The first server may select the second device out of the devices in the group, and in the first server may send the second identifier to the first device in response to the selection. Further, the first server may send the identifiers of all the devices in the group to the first device, followed by a step of the first device selecting the second device. Further, the method may include a step of selecting one or more devices, distinct from the second device, out of the devices in the group.

The second device may be randomly selected out of the devices in the group using one or more random numbers generated by a random number generator. The random number generator may be hardware based using thermal noise, shot noise, nuclear decaying radiation, photoelectric effect, or quantum phenomena. Alternatively or in addition, the random number generator may be software based, based on executing an algorithm for generating pseudo-random numbers. The second device may be selected based on attributes or characteristics of the device.

The second device may be selected based on the physical geographical location, and the method may comprise for each of the devices in the group the step of sending the device physical geographical location to the first server, followed by the step of the first server storing the received group device physical geographical location. The physical geographical location may include at least one out of a continent, a country, a state or province, a city, a street, a ZIP code, or a longitude and a latitude. The second device may be selected based on the physical geographical proximity to the second server.

The second device may be selected based on the second identifier, the second identifier may be an IP address, and the second device may be selected based on its IP address. Alternatively or in addition, the second device may be selected based on comparing the second identifier to the third identifier. Alternatively or in addition, the second device may be selected based on past activities, such as based on the timing of an event. The event may be a last or previous communication between the second device and the first device, the last communication between the second device and the first server, or the last communication between the second device and the second server. These steps may be performed before, after, or concurrently (using multitasking or multiprocessing) with any of the former steps.

Each of the identifiers herein may be a URL or an IP address in IPv4 or IPv6 form. Any one of the servers herein may be a web server using Hyper Text Transfer Protocol (HTTP) that responds to HTTP requests via the Internet, and any request herein may be an HTTP request. Any communication herein may be based on, or according to, TCP/IP protocol or connection, and may be preceded by the step of establishing a connection, such as an 'Active OPEN' or a 'Passive OPEN'. Alternatively or in addition, any communication herein may be based on, or use a VPN or a tunneling protocol. Any content herein may include, consist of, or comprise, part or whole of files, text, numbers, audio, voice, multimedia, video, images, music, or computer program, or may include, consists of, or comprise, a part of, or a whole of, a website page.

The method may be used for fetching over the Internet a second content, identified by a second content identification, by a third device identified in the Internet by a fourth identifier, from a third server identified in the Internet by a fifth identifier, via the first device, and may further comprising the steps of the third device sending a third request to the first server; in response to receiving the third request, the first server sending the first identifier to the third device; the third device sending a fourth request to the first device using the first identifier, the fourth request includes the second content identification and the fifth identifier; in response to receiving the fourth request, the first device sending the second content identification to the third server using the fifth identifier; in response to receiving the second content identification, the third server sending the second content to the first device; and in response to receiving the second content, the first device sending the second content to the third device. The third server may be distinct from, or the same device as, the second server. The third device may be distinct from, or the same device as, the second device. The second content may be distinct from, or the same content as, the first content.

A client device may be a first device identified in the Internet by a first identifier, executing a method for fetching over the Internet a first content, identified by a first content, from a second server identified in the Internet by a third identifier, via a second device identified in the Internet by a second identifier, using a first server. The method may include the steps of sending the first identifier to the first server; sending a first request to the first server; receiving the second identifier from the first server; sending a second request to the second device using the second identifier, the second request includes the first content identification and the third identifier; and receiving the first content from the second device. The method may further comprising of the step of sending the first content identification to the second server using the third identifier. These steps may be performed before, after, or concurrently (using multitasking or multiprocessing) with any of the former steps.

The method may further be used with a third device identified in the Internet by a fourth identifier, and may further comprise the steps of receiving the fourth identifier from the first server; sending a third request to the third device using the fourth identifier, the third request includes the first content identification and the third identifier; and receiving the first content from the third device. These steps may be performed before, after, or concurrently (using multitasking or multiprocessing) with any of the former steps.

The method may further be used with a group consisting of a plurality of devices, each device in the group may be associated with a respective identifier for being identified in the Internet, and may further comprise the steps of receiving the identifiers of the group devices from the first server; sending a third request to the group devices using their associated identifiers, the third request includes the first content identification and the third identifier; and receiving the first content from the group devices. The second device may be included in the group, and the method may further comprise a step of selecting the second device out of the devices in the group, or the step of selecting one or more devices, distinct from the second device, out of the devices in the group.

The method may further be used for fetching over the Internet a second content, identified by a second content identification, by a third device, identified in the Internet by a fourth identifier, from a third server identified in the Internet by a fifth identifier, via the first device. The method may further comprise steps of receiving a third request from the third device, the third request includes the second content identification and the fifth identifier; in response to receiving the third request, sending the second content identification to the third server using the fifth identifier; receiving the second content from the third server; and in response to receiving the second content, sending the second content to the third device using the fourth identifier. The third server may be distinct from the second server, or the third server and the second server are the same server. The second content may be distinct from the first content, or the second content and the first content may be the same content.

A tunnel device may be identified in the Internet by a second identifier execute a method for fetching over the Internet a first content, identified by a first content identification, by a first device, identified in the Internet by a first identifier, from a second server identified in the Internet by a third identifier using a first server. The method may comprise the steps of sending the second identifier to the first server; receiving a second request from the first device, the second request includes the first content identification and the third identifier; in response to receiving the second request, sending the first content identification to the second server using the third identifier; receiving the first content from the second server; and in response to receiving the first content, sending the first content to the first device using the first identification.

An acceleration server may execute a method for fetching over the Internet a first content, identified by a first content identification, by a first device identified in the Internet by a first identifier, from a second server identified in the Internet by a third identifier via a second device identified in the Internet by a second identifier. The method may comprise steps of receiving the second identifier from the second device; in response to receiving the second identifier, storing the second identifier; receiving a first request from the first device; and in response to receiving a first request, sending the second identifier to the first device. The method may further be used with a third device identified in the Internet by a fourth identifier, and may comprise the steps of receiving the fourth identifier from the third device; in response to receiving the fourth identifier, storing the fourth identifier; and in response to receiving the first request, sending the fourth identifier to the first device.

The method may further be used with a group consisting of a plurality of devices; each device in the group may be associated with a respective identifier for being identified in the Internet, for each of the group devices in the group. The method may comprise steps of receiving the associated identifier from the group device; in response to receiving the associated identifier, storing the associated identifier; and in response to receiving the first request, sending the identifier of all group devices to the first device. The second device may be included as part of the group, and the method may further comprise the step of selecting the second device out of the devices in the group, and the sending the second identifier to the first device may be in response to the selection.

A method is disclosed for fetching a content over the Internet by a first device identified in the Internet by a first identifier, from a first server identified in the Internet by a second identifier via a group of multiple devices each identified in the Internet by an associated group device identifier. The method may comprise a step of partitioning the content into a plurality of content slices, each content slice containing at least part of the content, and identified using a content slice identifier. For each of the content slices, the method may comprise steps of selecting a device from the group; the first device sending a first request to the selected device using the selected device identifier, the first request including the content slice identifier and a second identifier; in response to receiving the first request, the selected device sending a second request to the first server using the second identifier, the second request including the content slice identifier; in response to receiving the second request, the first server sending the content slice to the selected device; and in response to receiving the content slice, the selected device sending the content slice to the first device.

The content may be composed of bits, nibbles, bytes, characters, words, or strings, and the partitioning may be based on bit, nibble, byte, multi-byte, number, character, word, or string level, or may be composed of files, or programs, and the partitioning may be based on file or program level. Alternatively or in addition, the content may be a website content comprising multiple webpages, and the partitioning may be based webpages level. All the parts of the content may be included in all of the content slices. All of the content slices may be having a same size. A part of the content may be included in two or more content slices. The partitioning may be sequential or non-sequential in the content. The number of content slices may be equal to, higher than, or lower than, the number of devices in the group. A distinct device may be selected for each content slice A method to be executed by a device is disclosed for fetching a content over the Internet from a first server identified in the Internet by a second identifier via a group of multiple devices each identified in the Internet by an associated group device identifier, the method comprising a step of partitioning the content into a plurality of content slices, each content slice containing at least part of the content, and identified using a content slice identifier. For each of the content slices, the method may comprise steps of selecting a device from the group; sending a first request to the selected device using the selected device identifier, the first request including the content slice identifier and the second identifier; receiving the content slice from the selected device; and constructing the content from the received content slices.

A method is disclosed for fetching over the Internet a first content, identified by a first content identifier, by a first device, identified in the Internet by a first identifier, from a second server identified in the Internet by a third identifier via a second device identified in the Internet by a second identifier, using a first server. The method may comprise the steps of the second device sending the second identifier to the first server; in response to receiving the second identifier, the first server storing the second identifier; the first device sending a first request to the first server; in response to receiving the first request, the first server sending the second identifier to the first device; the first device sending a second request to the second device using the second identifier, the second request includes the first content identifier and the third identifier; in response to receiving the second request, the second device sending the first content identifier to the second server using the third identifier; in response to receiving the first content identifier, the second server sending the first content to the second device; and in response to receiving the first content, the second device sending the first content to the first device. Alternatively or in addition, the method may comprise the additional steps of the first device sending the first content identifier to the second server using the third identifier; and in response to receiving the first content identifier, the second server sending the first content to the first device. These additional steps may precede any of the other steps, follow any of the other steps, or may be executed simultaneously with any one of the other steps using multitasking or multiprocessing.

Alternatively or in addition, the method may be for use with a third device identified in the Internet by a fourth identifier, and may further comprising the steps of the third device sending the fourth identifier to the first server; in response to receiving the fourth identifier, the first server storing the fourth identifier; in response to receiving the first request, the first server sending the fourth identifier to the first device; the first device sending a third request to the third device using the fourth identifier, the third request includes the first content identifier and the third identifier; in response to receiving the third request, the third device sending the first content identifier to the second server using the third identifier; in response to receiving the first content identifier, the second server sending the first content to the third device; and in response to receiving the first content, the third device sending the first content to the first device.

Alternatively or in addition, the method may be for use with a group consisting of a plurality of devices, each associated with a respective identifier for being identified in the Internet, for each of the devices in the group, and the method may further comprise the steps of the group device sending the associated identifier to the first server; and in response to receiving the associated identifier, the first server storing the associated identifier. Alternatively or in addition, the method may comprise the step of in response to receiving the first request, the first server sending the identifiers of all the devices in the group to the first device. Alternatively or in addition, for each of the group devices in the group, the method may further comprise the steps of the first device sending a third request to the group device using the device associated identifier, the third request includes the first content identifier and the third identifier; in response to receiving the third request, the group device sending the first content identifier to the second server using the third identifier; in response to receiving the first content identifier, the second server sending the first content to the group device; and in response to receiving the first content, the group device sending the first content to the first device.

The second device may be included in the group, the method may further comprise the step of selecting the second device out of the devices in the group by the first server, and the first server may be sending the second identifier to the first device in response to the selection. Alternatively or in addition, the method may comprise the step of the first server may be sending the identifiers of all devices and the group to the first device, followed by a step of the first device selecting the second device. Alternatively or in addition, the method may comprise the step of selecting 2, 3, 4, 5, 6, 7, 8, 9, 10, or more than 10 devices, distinct from the second device, out of the devices in the group. The second device may be randomly selected out of the devices in the group, such as being randomly selected using one or more random numbers generated by a random number generator. The random number generator may be software based, such as based on executing an algorithm for generating pseudo-random numbers. Alternatively or in addition, the second device may be selected based on attributes or characteristics of the device, or based on the device physical geographical location. Further, for each of the devices in the group, the method may comprise the steps of sending the device physical geographical location to the first server, followed by the step of the first server storing the received group device physical geographical location. The physical geographical location may include a continent, a country, a state or province, a city, a street, a ZIP code, or longitude and latitude, and the second device may be selected based on the physical geographical proximity to the second server. The second device may be selected based on the second identifier that may be an IP address, and the second device may be selected based on its IP address, or the second device may be selected based on comparing the second identifier to the third identifier. Alternatively or in addition, the second device may be selected based on past activities, or based on the timing of an event, wherein the event may be the last communication between the second device and the first device, may be the last communication between the second device and the first server, or may be the last communication between the second device and the second server.

The method may be used for fetching over the Internet a second content, identified by a second content identifier, by a third device, identified in the Internet by a fourth identifier, from a third server identified in the Internet by a fifth identifier, via the first device, the method further comprising the steps of the third device sending a third request to the first server; in response to receiving the third request, the first server sending the first identifier to the third device; the third device sending a fourth request to the first device using the first identifier, the fourth request includes the second content identifier and the fifth identifier; in response to receiving the fourth request, the first device sending the second content identifier to the third server using the fifth identifier; in response to receiving the second content identifier, the third server sending the second content to the first device; and in response to receiving the second content, the first device sending the second content to the third device. The third server may be distinct from, or the same as, the second server, the third device may be distinct from, or the same as, the second device, and the second content may be distinct from, or the same as, the first content. The method may further comprise the steps of the first device receiving the first content from the second device; and the first device storing the first content in a memory.

Further, a method is disclosed for fetching over the Internet a first content, identified by a first content identifier, by a first device, identified in the Internet by a first identifier, from a second server identified in the Internet by a third identifier via a second device identified in the Internet by a second identifier, using a first server. The method may comprise the steps of sending the first identifier to the first server; sending a first request to the first server; receiving the second identifier from the first server; sending a second request to the second device using the second identifier, the second request includes the first content identifier and the third identifier; and receiving the first content from the second device. The method may be further for use with a third device identified in the Internet by a fourth identifier, and may further comprise the steps of receiving the fourth identifier from the first server; sending a third request to the third device using the fourth identifier, the third request includes the first content identifier and the third identifier; and receiving the first content from the third device.

The method may further for use with a group consisting of a plurality of devices, each device in the group may be associated with a respective identifier for being identified in the Internet, and may further comprise the steps of receiving the identifiers of the group devices from the first server; sending a third request to the group device using their associated identifiers, the third request includes the first content identifier and the third identifier; and receiving the first content from the group devices. The second device may be included in the group, and the method may further comprise the step of selecting the second device out of the devices in the group. Further, one or more devices, distinct from the second device, may be selected out of the devices in the group. The second device may be randomly selected out of the devices in the group, may be selected based on attributes or characteristics of the device. Alternatively or in addition, the selection may be based on a physical geographical location, such as on the physical geographical proximity to the second server. Further, the second device may be selected based on the second identifier, based on past activities, or based on the timing of an event.

Further, the method may be for fetching over the Internet a second content, identified by a second content identifier, by a third device, identified in the Internet by a fourth identifier, from a third server identified in the Internet by a fifth identifier, via the first device, the method may further comprise the steps of receiving a third request from the third device, where the third request includes the second content identifier and the fifth identifier; in response to receiving the third request, sending the second content identifier to the third server using the fifth identifier; receiving the second content from the third server; and in response to receiving the second content, sending the second content to the third device using the fourth identifier. The third server may be distinct from, or same as, the second server. The second content may be distinct from, or same as, the first content.

A method is disclosed for fetching over the Internet a first content, identified by a first content identifier, by a first device, identified in the Internet by a first identifier, from a second server identified in the Internet by a third identifier via a second device identified in the Internet by a second identifier, using a first server. The method may comprise the steps of sending the second identifier to the first server; receiving a second request from the first device, the second request includes the first content identifier and the third identifier; in response to receiving the second request, sending the first content identifier to the second server using the third identifier; receiving the first content from the second server; and in response to receiving the first content, sending the first content to the first device using the first identifier.

A method is disclosed for fetching over the Internet a first content, identified by a first content identifier, by a first device, identified in the Internet by a first identifier, from a second server identified in the Internet by a third identifier via a second device identified in the Internet by a second identifier, using a first server, the method may comprise the steps of receiving the second identifier from the second device; in response to receiving the second identifier, storing the second identifier; receiving a first request from the first device; and in response to receiving a first request, sending the second identifier to the first device. The method may for use with a third device identified in the Internet by a fourth identifier, and may further comprise the steps of receiving the fourth identifier from the third device; in response to receiving the fourth identifier, storing the fourth identifier; and in response to receiving the first request, sending the fourth identifier to the first device. The method may be used with a group consisting of a plurality of devices; each device in the group may be associated with a respective identifier for being identified in the Internet. For each of the group devices in the group, the method further comprising the steps of receiving the associated identifier from the group device; in response to receiving the associated identifier, storing the associated identifier; and in response to receiving the first request, sending the identifier of all group devices to the first device.

A method is disclosed for fetching a content over the Internet by a first device identified in the Internet by a first identifier, from a first server identified in the Internet by a second identifier ia a group of multiple devices, each identified in the Internet by an associated group device identifier, the method comprising the step of partitioning the content into a plurality of content slices, each content slice containing at least part of the content, and identified using a content slice identifier, and for each of the content slices. The method may comprise the steps of selecting a device from the group; the first device sending a first request to the selected device using the selected device identifier, the first request including the content slice identifier and the second identifier; in response to receiving the first request, the selected device sending a second request to the first server using the second identifier, the second request including the content slice identifier; in response to receiving the second request, the first server sending the content slice to the selected device; and in response to receiving the content slice, the selected device sending the content slice to the first device.

A method is disclosed for fetching a content over the Internet from a first server identified in the Internet by a second identifier via a group of multiple devices, each identified in the Internet by an associated group device identifier, the method may comprise the step of partitioning the content into a plurality of content slices, each content slice containing at least part of the content, and identified using a content slice identifier. For each of the content slices, the method may comprise the steps of selecting a device from the group; sending a first request to the selected device using the selected device identifier, the first request including the content slice identifier and the second identifier; receiving the content slice from the selected device; and constructing the content from the received content slices.

A content herein may be composed of bits, nibbles, bytes, characters, words, or strings, and the partitioning may be based on bit, nibble, byte, multi-byte, number, character, word, or string level. Alternatively or in addition, a content herein may be composed of files or programs, and the partitioning may be based on file or program level. Further, the content may be a website content comprising multiple webpages, and the partitioning may be based on webpages level. All parts of the content may be included in all of the content slices, and two or more, or all of the content slices, may be having the same size. Two or more of the content slices may include the same information. Further, the same part of the content may be included in two or more content slices. The partitioning may be sequential or non-sequential in the content, and the number of the content slices may be equal to, higher than, or lower than, the number of devices in the group. A distinct device may be selected for each content slice.

The first device may consist of, comprise, or be part of, any network element. In one example, the first device may consist of, comprise, or be part of, a client device, such as the client device #1. The first server may consist of, comprise, or be part of, any network element. In one example, the first server may consist of, comprise, or be part of, the acceleration server. The second server may consist of, comprise, or be part of, any network element. In one example, the second server may consist of, comprise, or be part of, a data server, such as the data server #1. The third server may consist of, comprise, or be part of, any network element. In one example, the third server may consist of, comprise, or be part of, a data server, such as the data server #2. The second device may consist of, comprise, or be part of, any network element. In one example, the second device may consist of, comprise, or be part of, a tunnel device, such as the tunnel device #1. The third device may consist of, comprise, or be part of, any network element. Alternatively or in addition, the third device may consist of, comprise, or be part of, a client device, such as the client device #2.

A method is disclosed for a first device fetching over the Internet a first content, identified by a first content identifier, stored in a first server that may be identified in the Internet by a first identifier, where the first content may be composed of multiple content parts, and each content part may be identified by a respective content part identifier. The method may be for use with a group of devices, each storing a copy of at least one content part and each group device may be identified in the internet by a respective group device identifier, and may be further for use with a second device identified in the Internet by a second identifier and storing the group device identifiers, and furthermore for use with a second server. The method may comprise the steps of the first device sending the first content identifier to the second server; in response to receiving the first content identifier, the second server sending the second identifier to the first device; the first device sending the first content identifier to the second device using the second identifier; and in response to receiving the first content identifier, the second device sending the group devices identifiers to the first device. Further, for each one out of the group devices identifiers, the method may comprise the steps of the first device sending a content part identifier to the group device using the group device identifier; and in response to receiving the content part identifier, the group device sending the content part identified by the content part identifier to the first device.

The first device may consist of, comprise, or be part of, any network element. In one example, the first device may consist of, comprise, or be part of, a client device, such as the client device #1. The first server may consist of, comprise, or be part of, any network element. In one example, the first server may consist of, comprise, or be part of, the acceleration server. The second server may consist of, comprise, or be part of, any network element. In one example, the second server may consist of, comprise, or be part of, a data server, such as the data server #1. The third server may consist of, comprise, or be part of, any network element. In one example, the third server may consist of, comprise, or be part of, a data server, such as the data server #2. The second device may consist of, comprise, or be part of, any network element. In one example, the second device may consist of, comprise, or be part of, a tunnel device, such as the agent device #1. Any device included in the group of devices may consist of, comprise, or be part of, any network element. Alternatively or in addition, a group device may consist of, comprise, or be part of, a peer device, such as the peer device #2.

The first server may be a web server, and the first content may be a web-site, a web-page, or a URL, and the first content identifier may be an IP address, URL, or an HTTP header. The first identifier may be the first server IP address, the second identifier may be the second IP address, and each of the group devices identifier may be an IP address or the respective group device. The first content may be composed of bits, nibbles, bytes, characters, words, or strings, and the content parts may be based on bit, nibble, byte, multi-byte, number, character, word, or string level partitioning of the first content, and the first content may include, consist of, or comprise, part or whole of files, text, numbers, audio, voice, multimedia, video, images, music, or computer program. Alternatively or in addition, the first content may include, be composed of, consist of, or comprise, a part of, or a whole of, files or programs, and the content parts may be based on file level or program level partitioning of the first content. Further, the first content may be a website content comprising multiple webpages, and the content parts may be based on webpages level partitioning of the first content. All the components of the first content may be included in all of the content parts. The method may further comprise the step of the first device reconstructing the first content from the received multiple content parts. Part of, or all of, the content parts may be having the same size, that may be 8 KB, 16 KB, 32 KB, or 64 KB. Two or more content parts may be identical and may contain the same data. A same portion of the first content may be included in two or more content parts. The content parts may be a result of a sequential, or a non-sequential, partitioning of the first content. The number of content parts may be equal to the number of group devices in the group. Each of the content part identifiers may be a hash value that may be the result of a hash function of the respective data in the content part, such as a checksum or CRC of the respective data in the content part. The CRC may be CRC-8, CRC-16. CRC-32, or CRC-64.

The method may further comprise the steps of the first device sending the first content identifier to the first server using the first identifier; and in response to receiving the first content identifier, the first server may be sending the part of, or the whole of, the first content to the first device. These steps may precede, follow, or be executed concurrently, with any one of the previously mentioned steps, using multitasking or multiprocessing The method may be for use with a second group consisting of a plurality of devices, each associated with a respective identifier for being identified in the Internet, the second group including the second device, wherein in response to receiving the first content identifier, the second server sending the identifiers of all devices in the second group to the first device, and may further comprise the step of selecting the second device from the second group. The second device may be randomly selected out of the devices in the group, using one or more random numbers generated by a random number generator. The random number generator may be hardware based, and may be using thermal noise, shot noise, nuclear decaying radiation, photoelectric effect, or quantum phenomena. Alternatively or in addition, the random number generator may be software based, and may be based on executing an algorithm for generating pseudo-random numbers. Alternatively or in addition, the second device may be selected based on attributes or characteristics of the device. Further, the second device may be selected based on the physical geographical location, and the method may further comprise for each of the devices in the second group, the steps of sending the device physical geographical location to the first device, followed by the step of the first device storing the received second group devices physical geographical location. The physical geographical location may include a continent, a country, a state or province, a city, a street, or a ZIP code, as well as longitude and latitude. Furthermore, the second device may be selected based on the physical geographical proximity to the first device.

Alternatively or in addition, the second device may be selected based on the second identifier, which may be an IP address, where the second device may be selected based on its IP address, or based on comparing the second identifier to a first device identifier. Further, the second device may be selected based on past activities, or based on the timing of an event, such as the last communication between the second device and the first device. Furthermore, the second device may be selected based on the ISP used to connect the second device to the Internet.

One or more of the group devices may be storing the first content. Alternatively or in addition, all of the group devices may be storing the first content. Alternatively or in addition, at least one of, or all of, the group devices may be storing only one content part. Each of the identifiers may be an IP address (such as in IPv4 or IPv6 form) or a URL. At least one of the servers may be a web server using HyperText Transfer Protocol (HTTP) that responds to HTTP requests (such as the first and second requests) the via the Internet. Further, the communication with the second server may be based on, or using, HTTP persistent connection. Furthermore, the communication with the first device, the second device, one of the group devices, the first server, or the second server, may be based on, or may be according to, TCP/IP protocol or connection.

The method may further comprise the step of establishing a connection between the first device and the second device in response to receiving the second identifier, and the first device may be communicating with the second device over the established connection. Further, the first device may be communicating with the second device using TCP, wherein the connection may be established by performing 'Active OPEN' or 'Passive OPEN'. Alternatively or in addition, the first device may be communicating with the second device using a VPN or a tunneling protocol, and the connection may be established using authentication. Further, the method may comprise the step of of establishing a connection between the first device and at least one of the group devices in response to receiving the group devices identifiers. The first device may be communicating with at least one of, or all of, the group devices over established connections. The first device may be communicating with at least one of the group devices using TCP, and the connection may be established by performing 'Active OPEN' or 'Passive OPEN'. Alternatively or in addition, the first device may be communicating with at least one of the group devices using a VPN or using a tunneling protocol. Any of the connections may be using authentication.

The method according may further used with a fourth device fetching over the Internet a second content, identified by a second content identifier, stored in a second server that may be identified in the Internet by a fifth identifier, the second content may be composed of multiple second content parts, each second content part may be identified by a respective second content part identifier, and may be for use with a second group of devices each storing a copy of at least one second content part and each second group device may be identified in the internet by a respective second group device identifier, where the first device may be identified in the Internet by a third identifier. The method may further comprise the steps of the fourth device sending the second content identifier to the second server; in response to receiving the second content identifier, the second server sending the third identifier to the fourth device; the fourth device sending the second content identifier to the first device using the third identifier; and in response to receiving the second content identifier, the first device sending the second group devices identifiers to the fourth device.

The method may further be used with a fourth device fetching over the Internet a second content, identified by a second content identifier, stored in a second server that may be identified in the Internet by a fifth identifier, the second content may be composed of multiple second content parts, each second content part may be identified by a respective second content part identifier, and may be further for use with a second group of devices each storing a copy of at least one second content part and each second group device is identified in the internet by a respective second group device identifier where the first device may be identified in the Internet by a third identifier and may be storing at least one of the second content parts, and may be for use with a fifth device fetching identified in the Internet by a fifth identifier and storing the third identifier. The method may further comprise the steps of the fourth device sending the second content identifier to the second server; in response to receiving the second content identifier, the second server sending the fifth identifier to the fourth device; the fourth device sending the second content identifier to the fifth device using the fifth identifier; in response to receiving the second content identifier, the fourth device sending the third identifier to the fourth device; the fourth device sending the identifier of the at least one second content part stored in the first device to the first device using the third identifier; and in response to receiving the identifier of the at least one second content part, the first device sending the at least one second content part to the fourth device.

The fourth device may consist of, comprise, or be part of, any network element. In one example, the first device may consist of, comprise, or be part of, a client device, such as the client device #1. In one example, the second server may consist of, comprise, or be part of, a data server, such as the data server #2. The fourth device and the second device may be the same device or distinct devices, and the fourth device may be the same as one of the group devices. The fifth device may consist of, comprise, or be part of, any network element. In one example, the fifth device may consist of, comprise, or be part of, an agent device, such as the agent device #2.

The fourth device and the second device may be the same device or distinct devices. The fourth device may be the same as one of the group devices. Further, the fifth device and the second device may be the same device. Alternatively or in addition, the fifth device and the one of the group devices may be the same device.

A method is disclosed for fetching over the Internet a first content, identified by a first content identifier, stored in a first server that may be identified in the Internet by a first identifier, the first content may be composed of multiple content parts, each content part may be identified by a respective content part identifier. The method may be used with a group of devices each storing a copy of at least one content part and each group device may be identified in the internet by a respective group device identifier, may be for use with a second device identified in the Internet by a second identifier and storing the group device identifiers, and may be used with a second server. The method may comprise the steps of sending the first content identifier to the second server; receiving the second identifier from the second server; sending the first content identifier to the second device using the second identifier; and receiving the group devices identifiers from the second device. For each one out of the group devices identifiers, the method may further comprise the steps of sending a content part identifier to the group device using the group device identifier; and receiving from the group device the content part identified by the content part identifier. The method may further comprise the steps of sending the first content identifier to the first server using the first identifier; and receiving the part of, or the whole of, the first content, from the first server.

A method is disclosed for a first device fetching over the Internet a first content, identified by a first content identifier, stored in a first server that may be identified in the Internet by a first identifier, the first content may be composed of multiple content parts, each content part may be identified by a respective content part identifier, for use with a group of devices each storing a copy of at least one content part and each group device may be identified in the internet by a respective group device identifier. The method may be used with a second device identified in the Internet by a second identifier and storing the group device identifiers, and may further be for use with a second server. The method may comprise the steps of receiving the first content identifier from the first device; and sending the group devices identifiers to the first device.

A method for a first device fetching over the Internet a first content, identified by a first content identifier, stored in a first server that may be identified in the Internet by a first identifier, the first content may be composed of multiple content parts, where each content part may be identified by a respective content part identifier, is disclosed. The method may comprise the steps of storing a content part identified by a content part identifier; receiving from the first device sending the content part identifier; and in response to receiving the content part identifier sending the content part identified by the content part identifier to the first device.

A method and system using an internet-connected device designated as a tunnel device is disclosed. A tunnel device may receive from a client device a request for content from a data server. Upon receiving such a request, the tunnel device fetches the requested content from the data server and sends the retrieved content to the client device. The request may specify a range of, or any portion of, the content, and then only the specified portion or range is retrieved from the data server and sent to the requesting client device. A tunnel device may open multiple connections when fetching the requested content from the data server. In a case where more connections may be opened for higher loading bandwidth, the client device may send a request to the tunnel device to open more connection with the data server.

The client device may use multiple tunnel devices, and may specify different or the same ranges or portions for each one of the tunnel devices. In a case where the requested content is locally stored in the tunnel device, such as in a local memory, such as a cache, the content is fetched from the local (internal) memory. Multiple tunnel devices, such as 5 tunnel devices, may be selected to be used by the client device, and the client device may request each of the tunnel devices to open more connections to the data server, up to the maximum allowable number of connections. The selection may be based on their proximity to the data server, such as selecting those tunnel devices that are the closest to the data server, based on their geolocation, IP distance, physical location, or the data communication characteristics.

A first network element may request content stored in a second network element over a communication link being part of a network. A time period for fetching the content may be estimated by the first network element by estimating the Bandwidth (BW) and the Round Trip Time (RTT) associated with the content fetching transaction. The estimation of the BW and RTT may use a database that contains information relating to previous interactions with the second network elements. Alternatively or in addition, the estimation of the BW and RTT may use a database that contains information relating to previous interactions with a first group of network elements that are associated with an IP distance lower than, and with a second group of network elements that is associated with an IP distance higher than, the second network element, such as by calculating the average IP distance between the two groups.

A system may comprise a central server and network elements, each of the network elements may be in an 'online' or an 'offline' state. When in the online' state, each of the network elements periodically transmits a message (such as a 'ping') to the central server. In response to receiving the message, the central server determines that the network element from which a message was received in a defined past period is in an 'online' state, and further determines that network elements, from which a message was not received in the defined past period, are in an 'offline' state.

An operating system may send data from an application to network elements using sockets. A method may queue the data to be sent, and transfer the data to a socket that is available for immediate data transfer. The queue may be dynamic and may be part of an added layer to the OS. The added layer may further continuously check the sockets and queues, and upon detecting a queued data and a ready-to-send data socket, the data is un-queued from its dynamic queue and sent through the socket ready for sending. In a case where the application cancels the data sending, data is removed from the respective socket and the respective queue.

In a network element that is connected to a network and includes an operating system and applications, a method by which a program on the network element may provide the communication configuration to the operating system, instead of the operating system getting it from a gateway on the network. The program may communicate with the external gateway to get the configuration information so that it can communicate with other network elements, and provides separate configuration information to the operating system, thereby having the operating system communicate with the program, and the program communicating with the external network elements.

In a scenario where a communication of content between two network elements may use two or more data paths (routes), the content may be concurrently transmitted and received over multiple data paths. In one scenario, one or both of the network elements may connect only via a single data path. A reliability proxy server that is capable of concurrently communicating with one (or both) of the network elements over multiple data paths, may be used. The reliability proxy server serves as a proxy server, and communicate the content with one (or both) of the network elements over multiple data paths, A timeout period (such as 5 ms, or any period substantially shorter than the defined typical) may be defined for completing a DHCP request. A DHCP request is repeatedly retransmitted to a DHCP server upon each timeout expiration, until a response is received, or until the typical timeout period expires.

A data may be transferred from a first network element to a second network element may involve transporting of a low priority, such as less time critical, meta data. Such meta data may be delayed by the first network element and be sent to the second network element only after higher priority, or more time sensitive, data was sent.

For use with devices such as WiFi access points that requires authentication such as being password protected, a user may try to connect a network element to a device that its password is unknown. The connection may automatically guess passwords for the connection, such as passwords that were used to connect to other devices, passwords that are common in the geographical location, or passwords that are common to similar devices from this same manufacturer. A central server (or servers) may store a list of known devices, such as WiFi access points, and their associated authentication methods, and may further store social connections between users. A user connecting to the devices may be prompted to update the central server the authentication information regarding the device and the device associated sharing level with others. A sharing-approved user may fetch the authentication information from the central server for connecting to a device.

A network element may use a hierarchical structure, whereby some of the graphical elements are sons or parents of other elements, for a user interface. If a user drags an object beyond the borders of a parent object, the dragging may be performed by carrying over (inheriting) the dragging to the parent object, and so recursively until reaching a parent that allows the dragging.

A method is disclosed for dictionary-based compression scheme, that may be used with a first device storing a first content in a first memory, and a second device storing a second content in a second memory, and for use with communicating a third content stored in the first device over a network. The method comprising the steps of the first device partitioning at least part of the first content into a plurality of first content slices according to a partitioning scheme; the first device associating a distinct slice identifier to each of the first content slices according to a rule; the second device partitioning at least part of the second content into a plurality of second content slices according to a partitioning scheme; the second device associating a distinct slice identifier to each of the second content slices according to the rule; the first device partitioning at least part of the third content into a plurality of third content slices according to a partitioning scheme. For each one of the third content slices, the method may further comprise the steps of the first device comparing the data in the third content slice to the data in the plurality of the first content slices; the first device sending to the second device over the network the slice identifier of the first content slice that includes the same data as the third content slice; the second device receiving the slice identifiers sent from the first device over the network; and the second device associating second content slices associated with the received slice identifiers. Two of, or all of, the slices may have the same the same size. Two of, or all of, the slices may be the same. The partitioning may be sequential in the respective content.

A method for attribute-based selecting devices by a first device located in a first geographical location, from a group of multiple Internet-connected devices is disclosed, where each of the group devices may be addressable in the Internet by a respective IP address. The method comprising the steps of obtaining a list of the IP addresses of the devices of the group; determining the geographical location of each of the group devices based on the IP address; associating a value of the attribute for each of the geographical location of each of the group devices; associating a first value of the attribute for the first geographical location; and selecting one or more devices from the group based on comparing the values of the group devices to the first value. A single device or multiple devices may be selected, associated with the first value or having a value close to the first value. The geographical location may consist of, or comprise, a continent, a country, a region, a city, a street, a ZIP code, or a timezone. The determining of the geographical location of each of the group devices may be based on a geolocation, such as based on W3C Geolocation API.

The method may be used with a database associating IP addresses to geographical locations, wherein the determining of the geographical location of each of the group devices based on the IP address may be using the database. The database may be stored in the first device or may be stored in a server accessible via the Internet, where the geographical location may be determined by the first device sending the IP addresses of the group devices to the server over the Internet; in response to receiving the IP addresses, the server sending the database associated physical locations to the first device; and the first device receiving the physical locations from the server. The attribute may relate to people or society, such as language, sport, demographics, or religion, or may be demographic based, such as culture, race, ethnicity, population, age structure, population growth rate, death rate, birth rate, migration rate, sex ratio, life expectancy, or health expenditures. The attribute may be economy related, such as Gross Domestic Product (GDP), GDP per capita (PPP), gross national saving, agriculture products, industry types, labor force, unemployment rate, household income or consumption by percentage share, Government budget, taxes and other revenues, inflation rate (consumer prices), export/import of goods and services, household consumption, government consumption, or investment in fixed capital. The attribute may relate to geography, such as climate, coastline, terrain, natural resources, and environment.

A method is disclosed for a first device fetching over the Internet a first content having a size X and identified by a first content identification, the first content may be stored in a second device that is identified in the Internet by a second identifier. The first device may be identified in the Internet by a first identifier, and the method may comprise the steps of the first device sending the first identifier and the first content identification to the second device; in response to receiving the first identifier and the first content identification, the second device sending the first content to the first device using the first identifier; the first device starting to receive the first content from the second device; the first device ending to receive the first content from the second device; the first device measuring an Round Trip Time (RTT) as a first time interval between the sending of the first identifier and the starting to receive the first content from the second device; the first device measuring a second time interval (T) between the starting and the ending of receiving the first content from the second device; and the first device calculating the bandwidth (BW) as X/T.

The method may further comprise the step of the first device storing in a memory the RTT and the BW, or the step of the first device sending the RTT and the BW to the second device. The method may be used with a second content having a size Y identified by a second content identification stored in the second device, and the method may further comprise the step of estimating a third time interval between a sending of the first identifier to the second device and an ending to receive the second content from the second device, where the third time interval may be estimated to be RTT+Y/BW.

A method is disclosed for a first device fetching over the Internet a first content having a size X identified by a first content identification, for use with a group of group devices, each of the group devices storing the first content and each identified in the Internet by a respective group device identifier. Each of the group devices may be associated with a respective Round Trip Time (RTT) and a respective bandwidth (BW), and the method may comprise the steps of for each one of the group devices, estimating the time interval for fetching the first content from the group device using the RTT and BW; selecting the group device having the lowest estimated time interval; the first device sending the first identifier and the first content identification to the selected group device; and in response to receiving the first identifier and the first content identification, the selected group device sending the first content to the first device using the first identifier. The method may further comprise the steps of the first device starting to receive the first content from the selected group device; the first device ending to receive the first content from the selected group device; the first device measuring an Round Trip Time (RTT) as a first time interval between the sending of the first identifier and the starting to receive the first content from the selected group device; the first device measuring a second time interval (T) between the starting and the ending of receiving the first content from the selected group device; and the first device calculating the bandwidth (BW) as X/T. Further, the method may further comprise the step of associating the measured RTT and the calculated BW with the selected group device, and the step of the first device storing in a memory the measured RTT and the calculated BW. Alternatively or in addition, the method may further comprising the step of the first device sending the measured RTT and the calculated BW to the selected group device, wherein the time interval for each group device is estimated using the RTT and the BW associated with the group device, and is calculated as RTT+X/BW.

A method is disclosed for fetching to a first device a content having a size X from N multiple locations each storing a copy of a part of, or the entire of, the content. The method may comprise for each location designated as i ($1 \leq i \leq N$) the steps of obtaining the Round Trip Time (RTTi), wherein the RTTi is the time interval between a sending of a request to the i location and a starting to receive part of the first content from the i location; obtaining the Bandwidth (BWi), wherein the BWi is the rate of receiving data after the starting to receive from the i location; and designating Ti as Ti=RTTi+Xi/BWi, wherein Xi is the size of part of the content fetched from the i location. The method may further comprise the steps of non-overlapping partitioning of the content into N partitions, wherein the size of each partition is designated as Xi, so that for i=1 to N, $\Sigma Xi=X$; the first device fetching the partitions from the N locations; and the first device assembling the content from the received partitions. The content may be stored in a device in each location, and the first device and the location devices may be interconnected via a digital network, such as the Internet.

The partitioning may be based on the RTTi values, may be based on BWi, or may be based on both BWi and RTTi of all of the locations. The partitioning may be based on calculating the maximum or minimum value of Ti for all locations. Alternatively or in addition, the partitioning may be based on minimizing the maximum value of Ti for all locations, and may be calculated at the first device according to: $Xi=BWi*[(X+\Sigma RTTi*BWi)/(\Sigma BWi)-RTTi]$. The RTTi and the BWi values may be stored in the first device, and may be based on previous communication with the locations. A non-transitory computer readable medium containing computer instructions that, when executed by a computer processor, cause the processor to perform at least part of, or all of, the above steps.

The first device may consist of, comprise, or be part of, any network element. In one example, the first device may consist of, comprise, or be part of, a client device, such as the client device #1. The second device, or each of the group devices, may consist of, comprise, or be part of, any network element. In one example, the second device, or each of the group devices, may consist of, comprise, or be part of, a tunnel device, such as the tunnel device #1 or the tunnel device #2.

A method for improving the fetching of a content from a first server over the Internet, for use with a second server distinct from the first server identified in the Internet by an identifier, is described. The method may comprise the steps of the application sending a first message to the second server; intercepting the first message to the second server; obtaining a second message based on the first message and on the identifier; returning the second message to the application; and in response to receiving the second message, the application sending a request for the content to the first server. The interception may be by hooking to the application, may be in a filter driver form, or may use an Inter-Process Communication (IPC). The IPC may use, or be based on, a file sharing, a signal, a socket, a pipe, a message queue, a shared memory, a semaphore, memory mapped file, a clipboard, a Component Object Model (COM), a data copy, a DDE protocol, or mailslots.

The application may be a web browser that consists of, comprises, or may be based on, Microsoft Internet Explorer, Google Chrome, Opera™, or Mozilla Firefox®. The web browser may be a mobile web browser, which consists of, comprises of, or may be based on, Safari, Opera Mini™, or Android web browser. The identifiers may be an IP address (in IPv4 or IPv6 form), or a URL.

The first message may be a web analytic related message, and the second server may be a web analytic server, such as Google Analytics server. The second message may be the same as, or based on, a response to the first message from the web analytic server. The method may use a database storing a list of typical responses from a web analytic server, and the second message may be obtained from the database. The method may comprise the step of blocking the sending of the first message to the second server, and the step of receiving a response from the second server. The method may use a database storing a list of typical responses from a web analytic server, and may further comprise the step of storing the response from the second server in the database.

A system is disclosed comprising multiple Internet-connected network elements, designated as peer devices, where each of the peer devices may store only a portion of a file (or other content) ('chunks') in its cache memory. Network elements, designated as client devices, may use the peer devices for fetching the portions of the file therefrom, and reconstructing the entire file. The system may consist, may include, may be based on, or may be part of, the system described in the '604 Patent. A same portion or the file may be stored in two or more peer devices, each may be associated with a BW and RTT (where BW is the bandwidth of a peer device to the client device connection and RTT is the round trip time from a peer device to the client and back), and the peer device associated with the highest BW/RTT may be selected to provide the portion of the file. Alternatively or in addition, the number of portions allocated to be fetched from a peer device is based on, or pro-rata to, the respective peer device BW/RTT.

The system may further comprise multiple Internet-connected network elements, designated as agent devices, which store in their memory information regarding which peer devices are storing which portions of the file, and further store which client devices requested which files, so that client devices may serve as peer devices for providing the portions of file that they have fetched. After a client device completes the fetching of a file, it may update network elements, such as the agent devices used, regarding the files availability in each of the used peer devices.

An agent device may provide a client device a list of peer devices that may be used for sourcing a part of, or an entire of, the file, and the client device may select five (5) or any other number of peer devices from the list, to fetch data therefrom. The agent device may store a first list of peer devices that may be available for use and storing a part of, or an entire of, the file, and may select from the first list a second list of peer devices to be sent to the client device. The second list may be selected based on the BW/RTT ratio associated with the communication of the respective peer device with the client device, such as selecting the peer devices having the highest ration of BW/RTT. Alternatively or in addition, the second list may be selected based on recent transaction between these peer devices and other client devices, such as selecting only peer devices that completed a successful data transfer. Alternatively or in addition, the second list may be selected based on the geographical distance to the client device.

The number of chunks allocated to the peer devices, to be fetched by a client device from the peer devices, may be set to a same number for all the peer devices. Alternatively or in addition, the number of chunks allocated to the peer devices may be determined by the latency in transporting the chunks to the client device, such as based on estimating the BW/RTT between the peer devices to the client device.

A client device may send out the request for a list of agent devices also to other network elements that the client device has communicated with in the past, so that if these elements have knowledge of any agent devices that may provide the information about the applicable peer devices, such an agent devices list will be sent to the client device. If these network elements themselves have knowledge of peer devices (including themselves) that might provide portions of the data required by the client device, they might provide themselves as an agent devices to the client device. Further, the client device may fetch information from a peer device regarding available agent devices, such as agent devices that were previously used with the data server. Alternatively or in addition, the client device may request a list of agent devices from an acceleration server.

A client device may request a list of peer devices from an agent device. If the requested data or file, in part or in whole, is stored in the agent device, the agent device may provide that data or file directly to the client device, instead of providing the meta data about the file to the client device. Alternatively or in addition, the agent device may provide that data or file directly to the client device only when the file is below a certain size, such as 16 KB. In a case where a client device fetches the required file from any other source, and that file is below that certain size, the client device may update and send the file to be stored in the agent devices, so that the data may be later provided to a client device.

A client device may receive and use a list of agent devices for a specific transaction, and when the network is idle, the client device may update the acceleration server regarding the used agent devices, allowing the acceleration server to later recommend or use these agent devices. The updating of the acceleration server may include the IP address of each of the agent devices, the communication session information such as RTT, BW and speed, the ports used in the communication sessions, the latency and speed for each of the connection phases, and whether the required file or data was stored in each of the agent devices. The acceleration server may use this information to decide which agent devices to recommend and include in a future agent devices list requested by client devices. A client device may receive and use a list of peer devices for a specific transaction (such as from an agent device), and when the network is idle, the client device may update the acceleration server, agent devices, or both, regarding the used peer devices, allowing the acceleration server or the agent devices to later recommend or use these peer devices. The updating of the acceleration server or the agent devices may include the IP address of each of the peer devices, the communication session information such as RTT, BW and speed, the ports used in the communication sessions, the latency and speed for each of the connection phases, and whether the required file or data was stored in each of the peer devices. The acceleration server or the agent devices may use this information to decide which peer devices to recommend and include in future peer devices list requested, such as by client devices. In a case where an agent device does not store a required information, such as a peer devices list, the client device or the acceleration server may update the agent device with that information after it was obtained. Further, the client device or the acceleration server may update all of the agent devices that were used in a transaction. Such an update may be performed only when the communication is idling.

The acceleration server may periodically review the load of each of the network elements (such as agent devices), and if two network elements are used below a certain threshold of load, it merges the range responsibilities of these network elements. The responsibilities may be the peer devices that the agent device is responsible for serving, or may be the data servers that the agent device is responsible for serving. A network element may log network elements that are accessing it, or may only log a portion of the requests according to a certain algorithm, by which the list of accessing network elements may be representative of all of the requests. The algorithm may be based on logging only the past several requests (such as a last 1000 requests or the requests in the past 5 minutes), or may be based on logging a logarithmically reducing list of random requests.

Upon fetching requested chunks from various sources (such as peer devices) by a client device, some chunks may be larger than a pre-set minimum size. The client device may estimate that one of the sources will complete providing its last chunk much later than all other chunks from the other sources. In such a case, this chunk may be split into smaller sized chunks, such as into half of the original size, and re-distributed between the various sources. The splitting may be only performed if the last chunk is expected to delay the entire file loading by 10% or 50%. A back end module may be used that is based on applying criteria to a request received by a client device. Only requests that meet the criteria may be handled using a handling method associated with the criteria. The criteria may be based on the URL requested, the domain requested, the IP address of the request defined data server, the type of the requested file, the request timing, or the client device geographical location.

Two or more data path may be available for fetching a content. The selection of which data path to use may be based on estimating the time for completing the content fetching for each data path, and may be based on historical data regarding the performance and timing of each stage of part connections of each of the data paths. The times used for each stage may be the top percentile under which most samples fall (e.g., using a sample that is larger than 95% of the other samples). A watermark system may be used to determine a threshold used to prefer and select one scheme over the other. If both data paths estimated performance are below a threshold, both data paths may be simultaneously used.

In a case where either a peers-using scheme (system or method) or a tunnels-using scheme may be used, the scheme to be used may be selected based on an evaluating the time to completely receive the information using the scheme. The evaluation may be based on data from previous interactions with peer devices and tunnel devices associated with, or in the vicinity of, the available peer devices and tunnel devices. Once the desired scheme is chosen, a timer is set for the expected time to complete the transaction, and if that time plus a margin has passed, both schemes may be selected to operate concurrently. In such a case of simultaneous activation of both schemes, upon receiving the first piece of data by one of the schemes, and if the other scheme is still active, that other scheme is terminated. Alternatively or in addition, upon receiving the last piece by one of the schemes, if the other scheme is still active, it is terminated. Further, upon fetching all requested data, information about all of the participating network elements, including response times for one or more of their functions, is stored for future use, and may further be sent to other network elements in the network for future use.

A method for managing congestion within a group of network elements is disclosed; where a central load-balancing server may identify that an element is congested. If over a certain amount of the network elements within the group are congested, a new network element is added to the group, and if over a certain amount of the network elements has not signaled being congested (such as by sending a message from the congested network elements), the server removes one or more of the network elements from the group. Alternatively or in addition, the signaling to the central load-balancing server may be performed by communication devices that are trying to connect or to use these network elements. The signaling to the central load-balancing server may be performed by the network elements whenever their own resources (such as storage capacity, I/O activity, CPU utilization, or available communication bandwidth) are used over a certain threshold. The central load-balancing server may send a request to the network elements and may mark them as congested, if they do not respond within a determined timeframe to a status request.

Each of the identifiers herein may be an IP address (in IPv4 or IPv6 form) or a URL. Each of the servers may be a web server using HyperText Transfer Protocol (HTTP) that responds to HTTP requests via the Internet, and the first and second requests may be HTTP requests. Each communication with a server may be based on, or using, HTTP persistent connection.

Any communication with a network element, such as with the first device, the second device, the first server, or the second server, may be based on, or be according to, TCP/IP protocol or connection, and may be preceded by the step of establishing a connection. Further, communication between any two network elements, such as between the first device and the second device, may be over the established connection. Any communication between any two network elements may use TCP, and wherein the connection may be established by performing 'Active OPEN' or 'Passive OPEN', may use a VPN, or may use a tunneling protocol. Any content herein, such as the first content, may include, consist of, or comprise, a part or whole of files, text, numbers, audio, voice, multimedia, video, images, music, web-site page, or computer program.

Each of the network elements herein, such as the first, second, and third servers, may store, operate, or use, a server operating system, that may be based on, comprise, or use, Microsoft Windows Server®, Linux, or UNIX, such as Microsoft Windows Server® 2003 R2, 2008, 2008 R2, 2012, or 2012 R2 variant, Linux™ or GNU/Linux based Debian GNU/Linux, Debian GNU/kFreeBSD, Debian GNU/Hurd, Fedora™, Gentoo™, Linspire™, Mandriva, Red Hat® Linux, SuSE, and Ubuntu®, UNIX® variant Solaris™, AIX®, Mac™ OS X, FreeBSD®, OpenBSD, and NetBSD®. Each of the network elements herein, such as the first, second, and third devices, may store, operate, or use, a client operating system, that may consist or, comprise of, or may be based on, Microsoft Windows 7, Microsoft Windows XP, Microsoft Windows 8, Microsoft Windows 8.1, Linux, or Google Chrome OS. The client operating system may be a mobile operating system, such as Android version 2.2 (Froyo), Android version 2.3 (Gingerbread), Android version 4.0 (Ice Cream Sandwich), Android Version 4.2 (Jelly Bean), Android version 4.4 (KitKat)), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system.

Any method herein may further comprise the step of intercepting a request for a content by a network element, such as the intercepting of the request for the first content by the first device. The request may be initiated in an application (that may be a communications application such as a TCP/IP or HTTP handling application) in a network element such as the first device. The interception may be in the form of a plug-in or an extension of the application, may be by hooking to the application, may be in a filter driver form, or may be using Inter-Process Communication (IPC). The IPC may be using a file sharing, a signal, a socket, a pipe, a message queue, a shared memory, a semaphore, memory mapped file, a clipboard, a Component Object Model (COM), a data copy, a DDE protocol, or mailslots. The application may be a web browser that may be consisting of, comprising of, or may be based on, Microsoft Internet Explorer, Google Chrome, Opera™, or Mozilla Firefox®. Alternatively or in addition, the web browser may be a mobile web browser, that consist of, comprise of, or may be based on, Safari, Opera Mini™, or Android web browser.

Any system or method herein may implement redundancy, where the system or method may include one or more additional identical, similar, or different element, such as using two or more identical or similar slices or any other content parts, using two or more identical or similar network elements performing identical or similar functionalities, using two or more identical or similar hardware pieces performing identical or similar functionalities, or using two or more data-paths transporting identical or similar information. The redundancy may be based on Dual Modular Redundancy (DMR), Triple Modular Redundancy (TMR), Quadruple Modular Redundancy (QMR), 1:N Redundancy, 'Cold Standby', or 'Hot Standby'.

The steps described herein may be sequential, and performed in the described order. For example, in a case where a step is performed in response to another step, or upon completion of another step, the steps are executed one after the other. However, in case where two or more steps are not explicitly described as being sequentially executed, these steps may be executed in any order, or may be simultaneously performed. Two or more steps may be executed by two different network elements, or in the same network element, and may be executed in parallel using multiprocessing or multitasking.

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions causes the processor to perform the one or more of the methods or steps described herein.

Any communication or connection herein, such as the connection of peripherals in general, and memories in particular to a processor, and between any two network elements, may use a bus. A communication link (such as Ethernet, or any other LAN, PAN or WAN communication links may also be regarded as buses herein. A bus may be an internal bus, an external bus or both. A bus may be a parallel or a bit-serial bus. A bus may be based on a single or on multiple serial links or lanes. A bus medium may be electrical conductors based such as wires or cables, or may be based on a fiber-optic cable. A bus topology may use point-to-point, multi-drop (electrical parallel) and daisy-chain, and may be based on hubs or switches. A point-to-point bus may be full-duplex, or half-duplex. Further, a bus may use proprietary specifications, or may be based on, similar to, substantially or fully compliant to an industry standard (or any variant thereof), and may be hot-pluggable. A bus may be defined to carry only digital data signals, or may also defined to carry a power signal (commonly DC voltages), either in separated and dedicated cables and connectors, or may carry the power and digital data together over the same cable. A bus may support master/slave configuration. A bus may carry a separated and dedicated timing signal or may use self-clocking line-code.

The networks or the data paths may be similar, identical or different geographical scale or coverage types and data rates, such as NFCs, PANs, LANs, MANs, or WANs, or any combination thereof. The networks or the data paths may be similar, identical or different types of modulation, such as Amplitude Modulation (AM), a Frequency Modulation (FM), or a Phase Modulation (PM), or any combination thereof. The networks or the data paths may be similar, identical or different types of duplexing such half- or full-duplex, or any combination thereof. The networks or the data paths may be based on similar, identical or different types of switching such as circuit-switched or packet-switched, or any combination thereof. The networks or the data paths may have similar, identical or different ownership or operation, such as private or public networks, or any combination thereof.

Any selection of devices herein, such as the selection of tunnel devices to be used either by a client device or by an acceleration sever, or the selection of agent devices either by a client device or by an acceleration sever, or the selection of peer devices, either by a client device or by an agent device, may be based on one or more of the following: Content URL, such as specific files on the Internet (e.g., "Wikipedia.org/contact.html"), domain name such as specific web sites (e.g., "Wikipedia.org"), data server IP such as specific servers (e.g., server having IP address of "208.80.152.201"), type of file such as specific file types (e.g., ".fly files"), time of day such as specific handling of all files or a group of files during certain hours of the day (e.g., "all files between 11 pm to 4 am"), or geography of the client such as specific handling according to a location of the client device (e.g., "for all Clients in Germany").

The above summary is not an exhaustive list of all aspects of the present invention. Indeed, it is contemplated that the invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

The invention is herein described, by way of non-limiting examples only, with reference to the accompanying drawings, wherein like designations denote like elements. Understanding that these drawings only provide information concerning typical embodiments of the invention and are not therefore to be considered limiting in scope:

FIG. 7 illustrates schematically a simplified flowchart of a method relating to a tunnel device;

FIG. 21b depicts schematically the relations of content in peer devices to content of URLs;

FIG. 24 illustrates schematically a simplified flowchart relating to an agent device;

FIG. 24a illustrates schematically a simplified flowchart relating to a peer device;

FIG. 63 illustrates schematically a simplified block diagram of an NDCACHE API;

FIG. 68 illustrates schematically a first part of a simplified block diagram of a high-level implementation of NDCACHE;

FIG. 70 illustrates schematically a second part of a simplified block diagram of a high-level implementation of NDCACHE;

FIG. 71 illustrates schematically a third part of a simplified block diagram of a high-level implementation of NDCACHE;

FIG. 75 illustrates schematically a first part of a simplified block diagram of a high-level implementation of an improved NDCACHE;

FIG. 76 illustrates schematically a second part of a simplified block diagram of a high-level implementation of an improved NDCACHE;

FIG. 80 illustrates schematically a simplified flowchart of an improved selection of a WAP;

FIG. 85 illustrates schematically two network elements connected over multiple unreliable connections;

FIG. 86 illustrates schematically two network elements connected over multiple unreliable connections using a reliability proxy server;

FIG. 87 illustrates schematically two network elements connected over multiple unreliable connections using two reliability proxy servers;

FIG. 88 illustrates schematically a simplified flowchart for using a reliability proxy network server;

FIG. 89 illustrates schematically a simplified flowchart for carrying packets over multiple routes;

FIG. 90 illustrates schematically a simplified flowchart for minimizing disconnect times when using multiple routes;

FIG. 91 illustrates schematically a table containing IP related BW and RTT values;

FIG. 92 illustrates schematically a simplified flowchart for estimating BW and RTT values relating to network elements;

FIG. 93 illustrates schematically a simplified flowchart for reading or storing BW and RTT values relating to network elements; and FIG. 94 illustrates schematically a simplified flowchart for estimating BW and RTT values relating to network elements.

DETAILED DESCRIPTION

Figure 1:
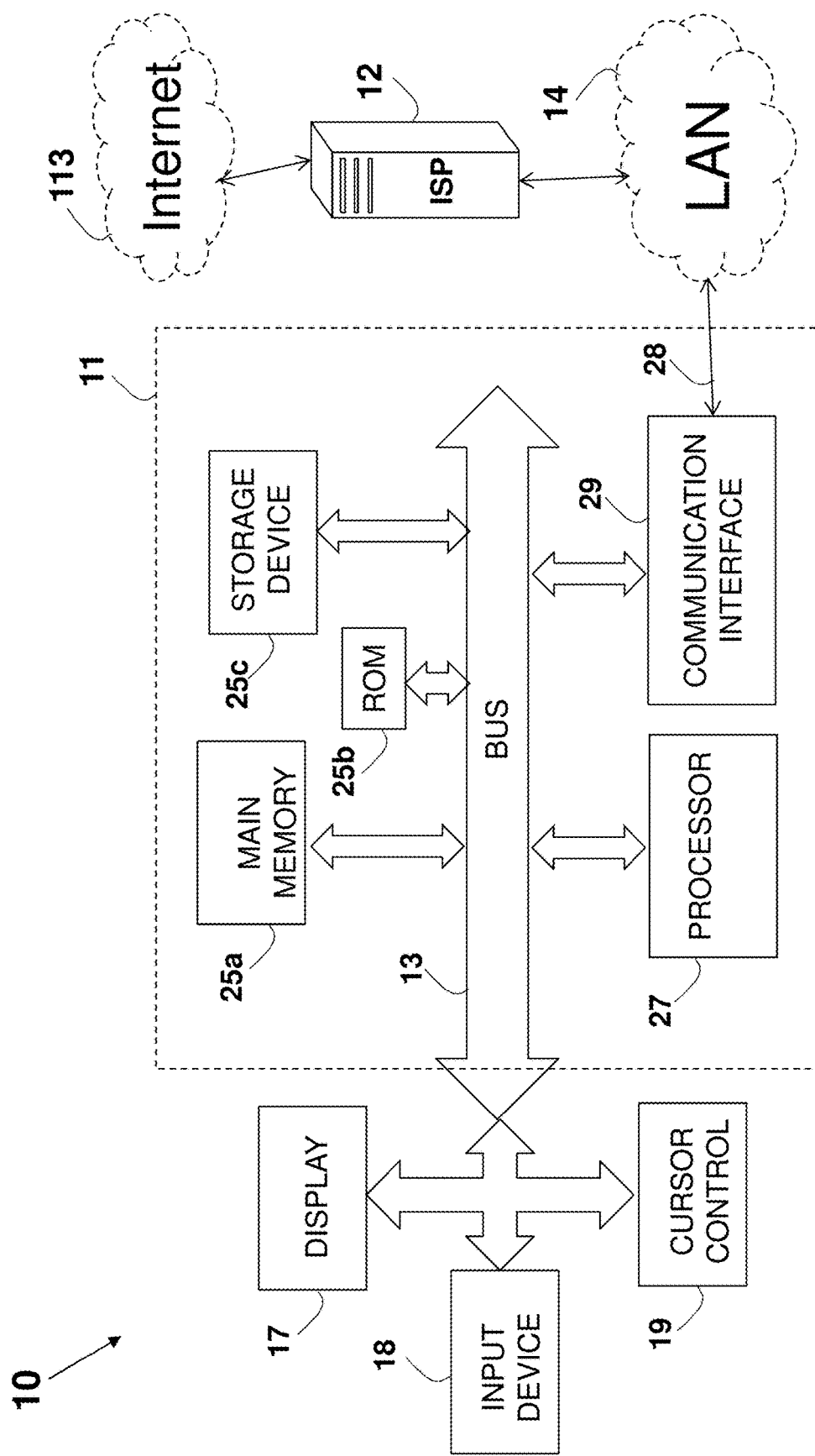
FIG. 1 illustrates schematically a block diagram of a computer connected to the Internet.

The principles and operation of an apparatus or a method according to the present invention may be understood with reference to the figures and the accompanying description wherein identical or similar components (either hardware or software) appearing in different figures are denoted by identical reference numerals. The drawings and descriptions are conceptual only. In actual practice, a single component can implement one or more functions; alternatively or in addition, each function can be implemented by a plurality of components and devices. In the figures and descriptions, identical reference numerals indicate those components that are common to different embodiments or configurations. Identical numerical references (in some cases, even in the case of using different suffix, such as 5, 5a, 5b and 5c) refer to functions or actual devices that are either identical, substantially similar, similar, or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention. It is to be understood that the singular forms "a," "an," and "the" herein include plural referents unless the context clearly dictates otherwise. Thus, for example, reference to "a component surface" includes reference to one or more of such surfaces. By the term "substantially" it is meant that the recited characteristic, parameter, or value need not be achieved exactly, but that deviations or variations, including, for example, tolerances, measurement error, measurement accuracy limitations and other factors known to those of skill in the art, may occur in amounts that do not preclude the effect the characteristic was intended to provide.

Each of devices herein may consist of, include, be part of, or be based on, a part of, or the whole of, the computer 11 or the system 100 shown in FIG. 1. Each of the servers herein may consist of, may include, or may be based on, a part or a whole of the functionalities or structure (such as software) of any server described in the '604 Patent, such as the web server, the proxy server, or the acceleration server. Each of the clients or devices herein may consist of, may include, or may be based on, a part or a whole of the functionalities or structure (such as software) of any client or device described in the '604 Patent, such as the peer, client, or agent devices.

Figure 5:
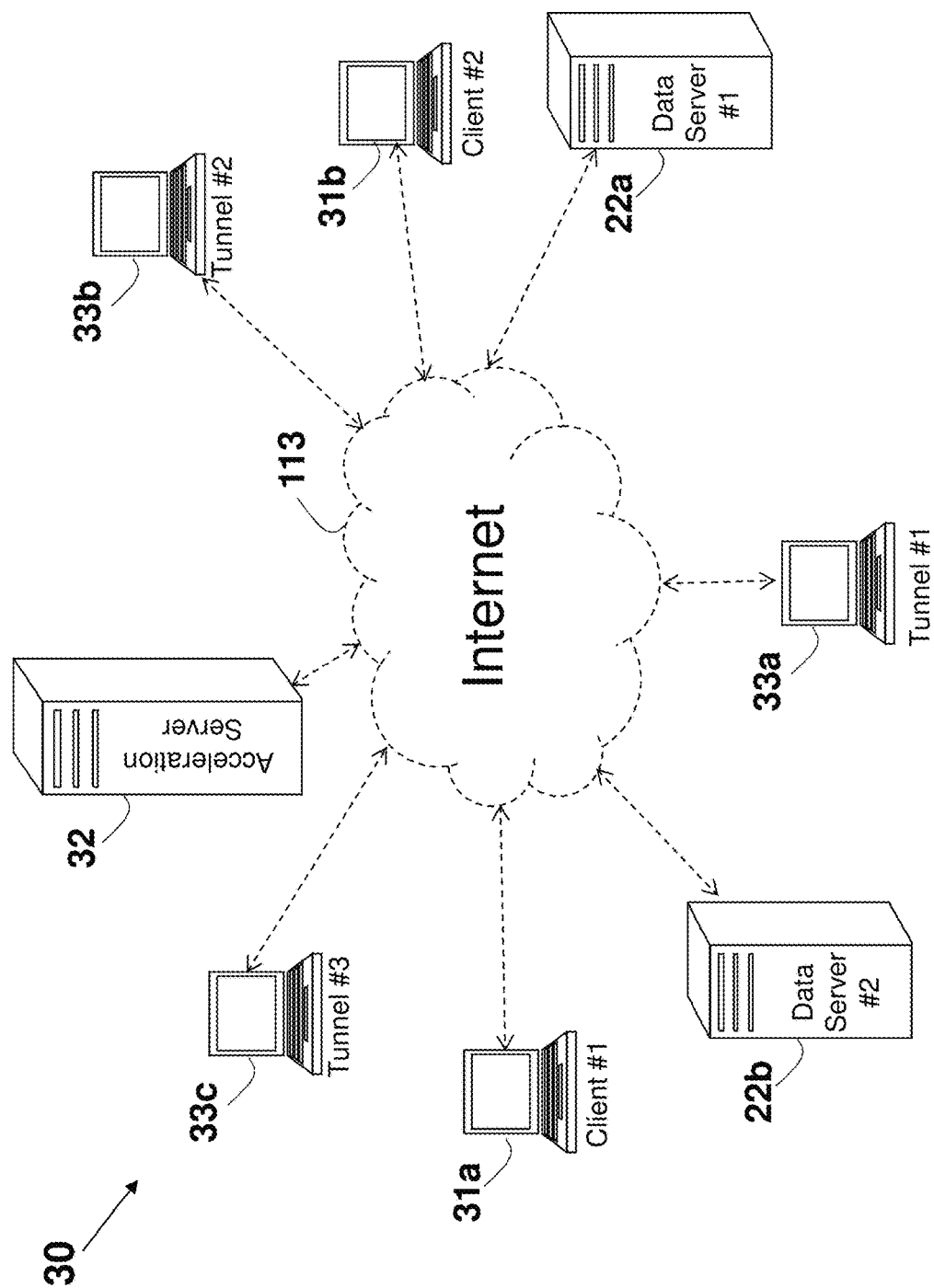
FIG. 5 depicts schematically client devices, tunnel devices, and servers connected to the Internet.

In one example, an accessing to a data server is improved by using an intermediate device referred to as 'tunnel' device, that is executing a 'tunnel' flowchart. FIG. 5 shows a system 30 including two client devices, a client device #1 31*a* and a client device #2 31*b*, that may access the data servers 22*a* and 22*b* using one or more of a tunnel device #1 33*a*, a tunnel device #2 33*b*, and a tunnel device #3 33*c*, under the management and control of an acceleration server 32. These network elements communicates with each other using the Internet 113.

Figure 5A:
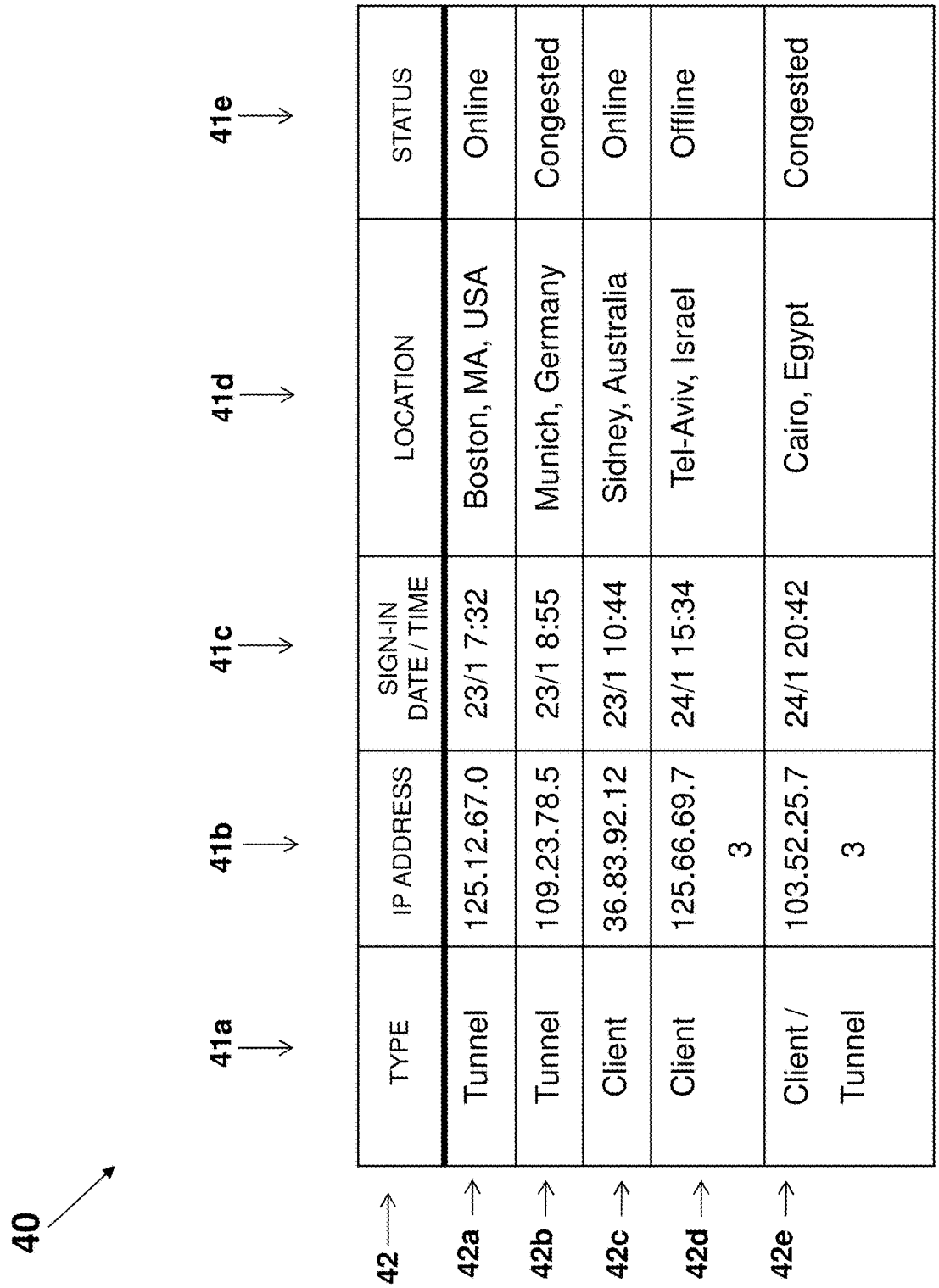
FIG. 5a illustrates schematically a table of data stored in a server.
Figure 5B:
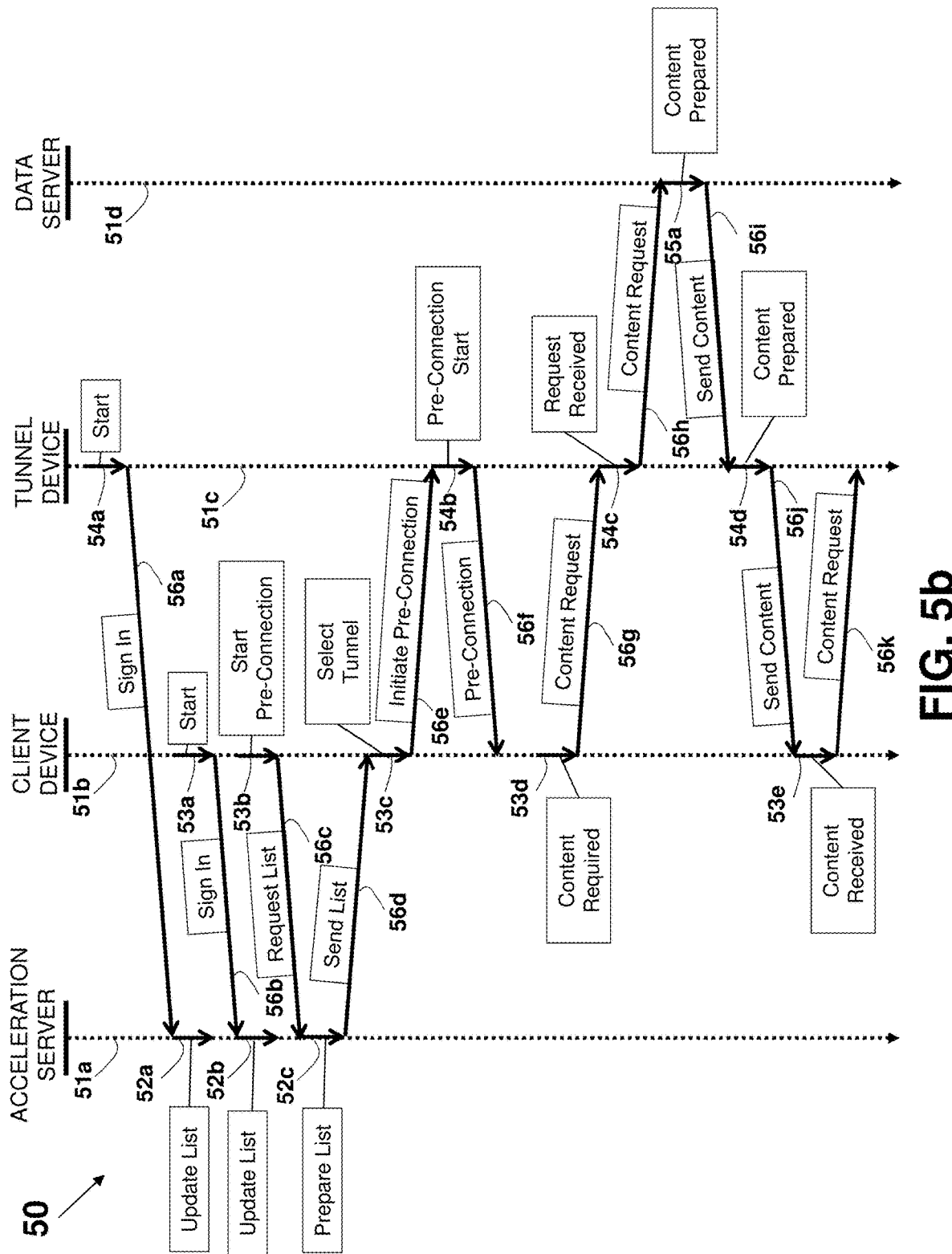
FIG. 5b illustrates schematically a timing chart of messages and states associated with messages exchanged over the Internet in a system using tunnel devices.
Figure 6:
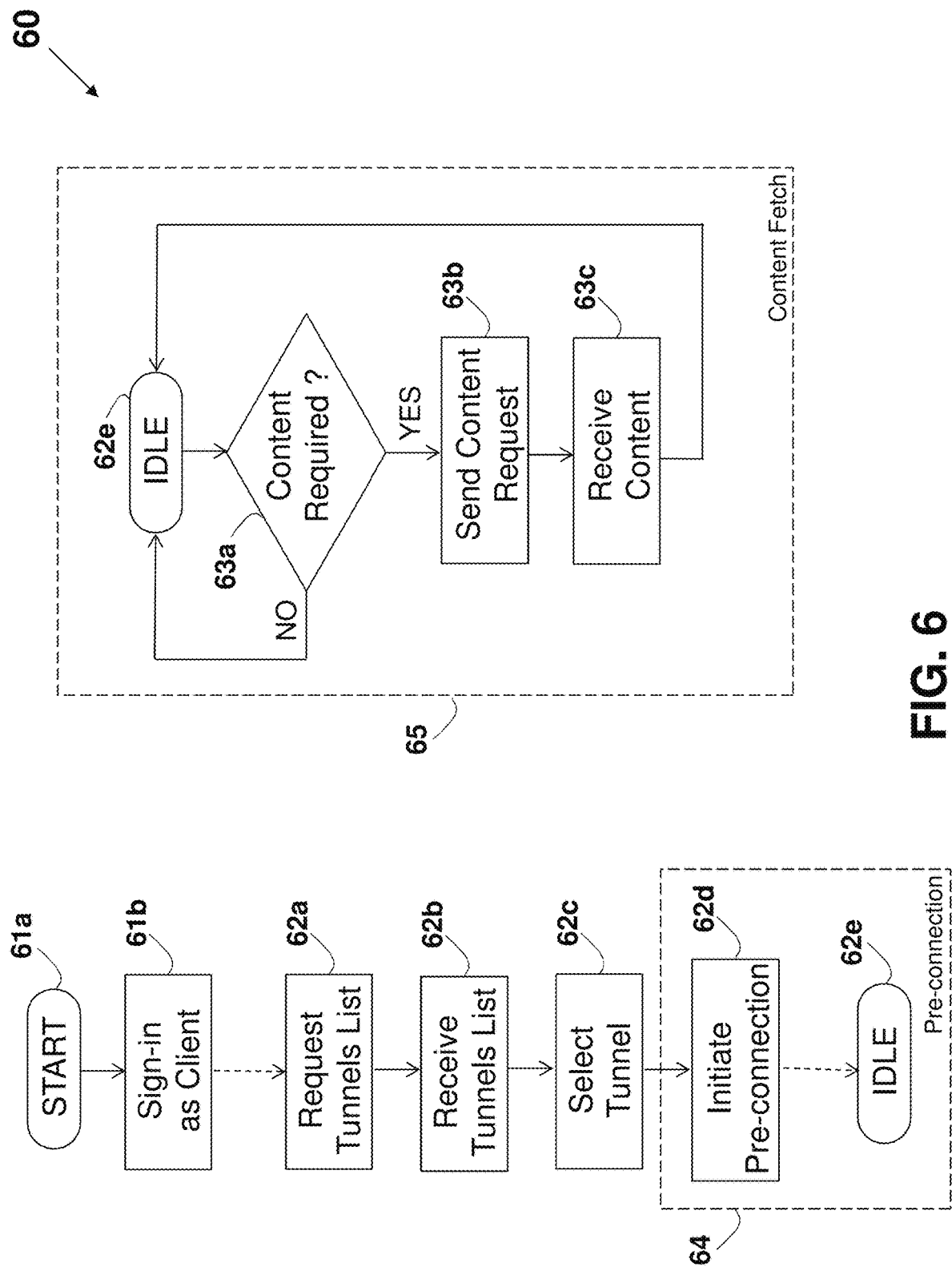
FIG. 6 illustrates schematically a simplified flowchart of a method relating to a client device using a single tunnel device.

The method of using a tunnel device is described below, based on a database 40 shown in FIG. 5*a* describing a list stored in the acceleration server 32, a flowchart 60 shown in FIG. 6 describing a client device (such as the client device #1 31*a*) operation, a flow chart 70 shown in FIG. 7 describing a tunnel device (such as the tunnel device #1 33*a*) operation, and a messaging and states timing chart 50 shown in FIG. 5*b*. The chart 50 shows the messaging and related timing associated with the operation of the acceleration server 32 (corresponding to a dashed line 51*a*), a client device such as the client device #1 31*a* (corresponding to a dashed line 51*b*), a tunnel device such as the tunnel device #1 33*a* (corresponding to a dashed line 51*c*), and a data server such as the data server #1 22*a* (corresponding to a dashed line 51*d*). The flowchart 60 comprises a flowchart 64 relating to a pre-connection phase, and a flowchart 65 describing a content fetch phase, of the client device. Similarly, a flowchart 70 comprises a flowchart 72 relating to the pre-connection phase, and a flowchart 73 describing the content fetch phase, of the tunnel device. The database 40 shown in FIG. 5*a* is illustrated as a table, wherein a first column 41*a* (designated as 'TYPE') relates to a device functionality, such as tunnel or client, a second column 41*b* (designated as 'IP ADDRESS') relates to the respective device IP address, a third column 41*c* (designated as 'SIGN-IN DATE/TIME') relates to a timestamping including a date (in DD/MM format) and a time when a respective device signed in with the acceleration server, and a fourth column 41*d*, relating to the device physical geographical location. A top row 42 in the table refers to the field designations. First 42*a*, second 42*b*, third 42*c*, fourth 42*d*, and fifth 42*e* rows in the table, respectively relate to first, second, third, fourth, and fifth devices that signed in with the acceleration server 32. For example, the second device shown in the row 42*b* has signed in as a tunnel device as shown in the column 41*a*, timestamped as January 23$^{rd}$ at 8:55 as shown in the third column 41*c*, and can be addressed over the Internet using the IP address 109.23.78.5 as shown in the second column 41*b*.

The process starts upon initializing a tunnel application in a tunnel device, schematically shown as a step 'START' 71*a* in the flowchart 70, corresponding to a state 54*a* 'Start' in the chart 50. Such initialization may be executed upon the device powering up process, or upon a user request. Then the tunnel device #1 33*a* sign in with the acceleration server 32 in a step 'Sign-in as Tunnel' 71*b*, which corresponds to a message 'Sign In' 56*a* in the chart 50. The message comprises the device functionality as 'tunnel', and the device 33*a* identification on the Internet 113, such as its IP address (for example 125.12.67.0). The message 'Sign In' is received as the acceleration server 32, which updates the database of the signed-in devices in a state 'Update List' 52*a*, as shown in a first row 42*a* in the table 40. The acceleration server 32 further log to the database the date and time of the signing in, such as 23/1 as the date and 7:32 as the time, as shown in the third column 41*c* of the table 40. The acceleration server 32 further adds rows to the table per each added tunnel device in a case of multiple tunnel devices, such as the addition of the tunnel device #2 33*b*, that its signing-in details are shown in the second row 42*b*, as addressed by the IP address 109.23.78.5 and having signed in at 23/1 at 8:55.

Similarly, the client device #1 31*a* starts and sign in with the acceleration server 32. The process starts upon initializing a client application in a client device, schematically shown as a step 'START' 61*a* in the flowchart 60, corresponding to a state 53*a* 'Start' in the chart 50. Such initialization may be executed upon the device powering up process, or upon a user request. Then the client device #1 31*a* sign in with the acceleration server 32 in a step 'Sign-in as Client' 61*b*, which corresponds to a message 'Sign In' 56*b* in the chart 50. The message comprises the device functionality as 'client', and the device 31*a* identification on the Internet 113, such as its IP address (for example 36.83.92.12). The message 'Sign In' is received as the acceleration server 32, which updates the database of the signed-in devices in a state 'Update List' 52*b*, as shown in the third row 42*c* in the table 40. The acceleration server 32 further logs to the database the date and time of the signing in, such as 23/1 as the date and 10:44 as the time, as shown in the third column 41*c* of the table 40. The acceleration server 32 further adds to the table an additional row per each newly signed client device in a case of multiple client devices, such as the addition of the client device #2 31*b*, that its signing-in details are shown in the second row 42*d*, as addressed by the IP address 125.66.69.73 and having signed in at 24/1 on 15:34.

In order to make the communication between a client device and a tunnel device faster and more efficient, a pre-connection phase is defined, where a preparation for communication such as a TCP connection is established, allowing for quick data transfer afterwards. The pre-connection phase starts at a 'Start Pre-Connection' state 53*b* in the chart 50, followed by the 'Request List' message 56*c* (corresponding to the 'Request Tunnels List' step 62 in the flowchart 60), being part of the Pre-connection client flowchart 64, where the client 31*a* requests the list of the available tunnels that may be used, from the acceleration server 32. The tunnel device #1 33*a* at this point is idling in an 'IDLE' step 72*c* shown in the flowchart 70, being part of the Pre-connection tunnel flowchart 72. In response to the client device 31a request, the acceleration server 32 prepares in a step 'Prepare List' 52b the list of current available tunnels, and sends the list as a 'Send List' message 56d to the client device 31a, which in turn receives the list as part of a 'Receive Tunnels List' step 62b.

Based on pre-set criteria, a tunnel device (or multiple tunnel devices) is selected by the client device #1 31a in a 'Tunnel Select' step 53c (corresponding to a 'Select Tunnel' step 62c in the flowchart 60). For example, the tunnel device #1 33a may be selected. Then, pre-connection is initiated in an 'Initiate Pre-Connection' step 62d, where an 'Initiate Pre-Connection' message 56e is sent to the tunnel device #1 33a, which starts the pre-connection in a 'Pre-Connection Start' state 54b, and replies the 'Pre-Connection' message 56f to the client device 31a, thus completing the pre-connection phase.

The pre-connection process involves establishing a connection (directly or via a server) between the client device #1 31a (executing the flowchart 64) and the tunnel device #1 33a (executing the flowchart 72). The handshaking between the two devices at this stage involves forming the connection by exchanging communication-related information. The formed connection may be used later for efficiently exchange data between the devices. In one example, the communication between the devices uses TCP, and the pre-connection is used for establishing a connection by forming 'passive open', involving exchanging SYN, SYN-ACK, and ACK messages. In one example, the message 'Initiate Pre-Connection' message 56e includes a SYN message, and the 'Pre-Connection' message 56f includes an ACK message.

In another example, a VPN is formed between the devices, and the tunneling or the VPN establishment is performed as part of the pre-connection phase. The tunnel endpoints are authenticated before secure VPN tunnels can be established. User-created remote-access VPNs may use passwords, biometrics, two-factor authentication, or any other cryptographic methods. Network-to-network tunnels often use passwords or digital certificates, and permanently stores the key in order to allow a tunnel to establish automatically, without intervention from a user.

As long as the client device #1 31a is not requiring any content from a data server as described in a 'Content Required ?' step 63a, the device is idling in an 'IDLE' step 62e. Once the client device #1 31a determines that external content from a data server is required, as shown in a 'Content Required' state 53d, a 'Content Request' message 56g (shown in the messaging chart 50) is sent (corresponding to a 'Send Content Request' step 63b in the flowchart 60) to the selected tunnel device #1 33a. The request is received at the tunnel device #1 33a at a 'Request Received' state 54c, corresponding to a 'Receive Content Request' 73b in the flowchart 70). In response, the tunnel device 33a sends a 'Content Request' message 56h to the data server #1 22a (corresponding to a 'Send Request To Server' step 73c), requesting the content that was requested by the client device #1 31a. The data server #1 22a receives the request and prepares the requested content in a 'Content Prepared' state 55a, and sends the requested content back to the tunnel device #1 33a in a 'Send Content' message 56i, received by the tunnel device #1 33a in a 'Receive Content from Server' step 73d. The received content is prepared in a 'Content Prepared' state 54d, and then sent, in a 'Send Content' message 56j (corresponding to a 'Send Content To Client' step 73e), to the client device #1 31a. The tunnel device 33a may then revert to idling in the 'IDLE' step 73a, until a new request is received. The requested content is received in a 'Content Received' state 53e in the timing chart 50, corresponding to a 'Receive Content' step 63c shown in the flowchart 60. The client device 31a may then revert to idling in the 'IDLE' step 62e, until a new content is required.

When such new content is required as determined as part of the 'Content Required ?' step 63a, the process repeats by sending a 'Content Request' message 56k, corresponding to the 'Send Content Request' step 63b. In one example, the 'Content Fetch' flowchart 73 executed by the tunnel device #1 33a may be a typical HTTP session for accessing a content from a web-server.

The content herein may consist of, or comprise, data such as files, text, numbers, audio, voice, multimedia, video, images, music, computer programs or any other sequence of instructions, as well as any other form of information represented as a string of bits, bytes, or characters. In one example, the content may include, be a part of, or a whole of, a URL or a website page.

Figure 8:
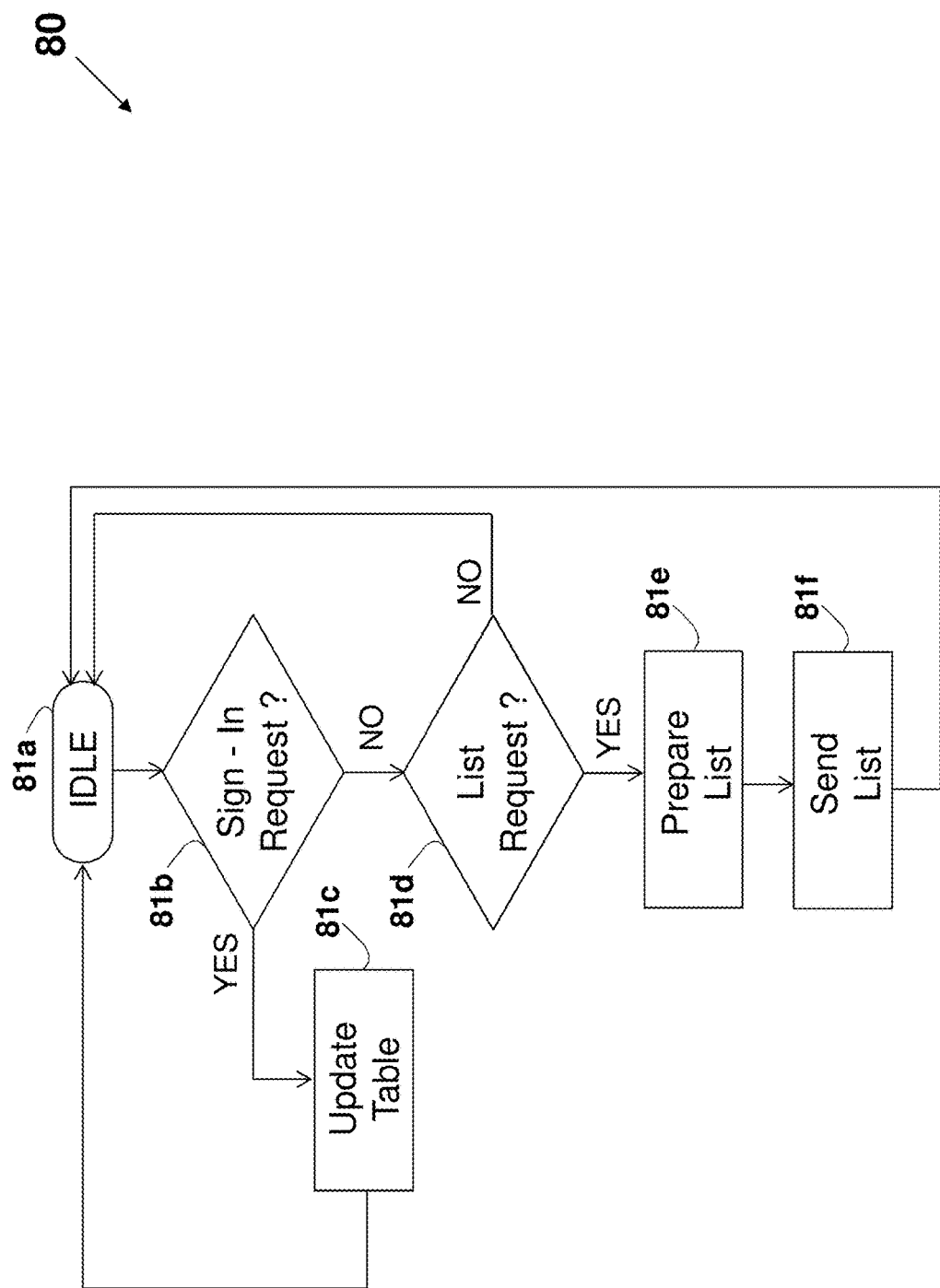
FIG. 8 illustrates schematically a simplified flowchart relating to an acceleration server in a tunnel-device based system.

The acceleration server 32 generally executes a flowchart 80 shown in FIG. 8. The server 32 is idling in an 'IDLE' step 81a until a request is received from one of the devices in the network. The request may be a sign-in request, as checked in a 'Sign—In Request ?' step 81b, which may be the result of a signing in of the client device #1 31a as part of the 'Sign-in as Client' step 61b in the client flowchart 60, or may be the result of a signing in of the tunnel device #1 33a as part of the 'Sign-in as Tunnel' step 71b in the tunnel flowchart 70. In the case of signing in, the server 32 update the database such as the table 40 shown in FIG. 5a in an 'Update Table' step 81c, corresponding to an 'Update List' state 52a for tunnel signing-in and an 'Update List' state 52b for the client signing-in in the timing chart 50. In a 'List Request ?' step 81d the acceleration server 32 checks for receiving a request from the client device #1 31a as part of a 'Request Tunnels List' step 62a, corresponding to the message 'Request List' 56c in the timing chart 50. In response to such request, the server 32 compiles a list of tunnels that can be used by the client device #1 31a to serve the received request, as part of a 'Prepare List' step 81e (corresponding to a 'Prepare List' state 52c in the timing chart 50). The compiled list is sent to the client device 31a as part of a 'Send List' step 81f, corresponding to a 'Send List' message 56d in the timing chart 50. After completing the signing-in or sending list processes, the server 32 reverts to idling in the 'IDLE' step 81a.

Data servers (such as the data server #1 22a) typically limit the number of concurrent active connections with connected devices (hosts). In many cases, a web page content may include multiple URLs, and it is beneficial to open many concurrent connections, each for one or more of the URLs, to accelerate the fetching of the web site content. In one example, the maximum number of connections permitted by the data server from which the content is to be fetched is sent to a tunnel device, such as the tunnel device #1 33a, as part of the 'Pre-connection Tunnel #1' step 64a or the 'Content Fetch Tunnel #1' step 65a, shown as part of the flowchart 100 in FIG. 10. In response, the tunnel device #1 33a as part of the 'Send Request To Server' step 73c, opens the requested number of connections with the respective data server. For example, the client may request, based on stored information in the client device (such as based on former interaction with the respective data server received from a tunnel device as part of a 'Notify Client' step 74c), sends the tunnel device a request to open 8 connections, which is known to be the maximum available (or allowable) number of connections relating to the specific data server. The client device may request all the tunnel devices used to use the maximum number of connections. For example, assuming 3 tunnel devices are used, and the maximum connections per host (device) is limited (by the data server) to 10 connections per host, each tunnel device may open the maximum 10 connections available. Hence, such scenario results in total open connections (for fetching the requested content) to be 10*3=30, which is 3 times better than using a single tunnel device, or when compared to a direct content fetching by the single client device from the data server. In another example, assuming the limitation of the data server is 8 connections, and wherein the client device sets the optimal number of total of 15 connections, the client device may request one tunnel device to use 8 connection and another tunnel device to use 7 connections, thus obtaining the optimal 8+7=15 connections.

Figure 7A:
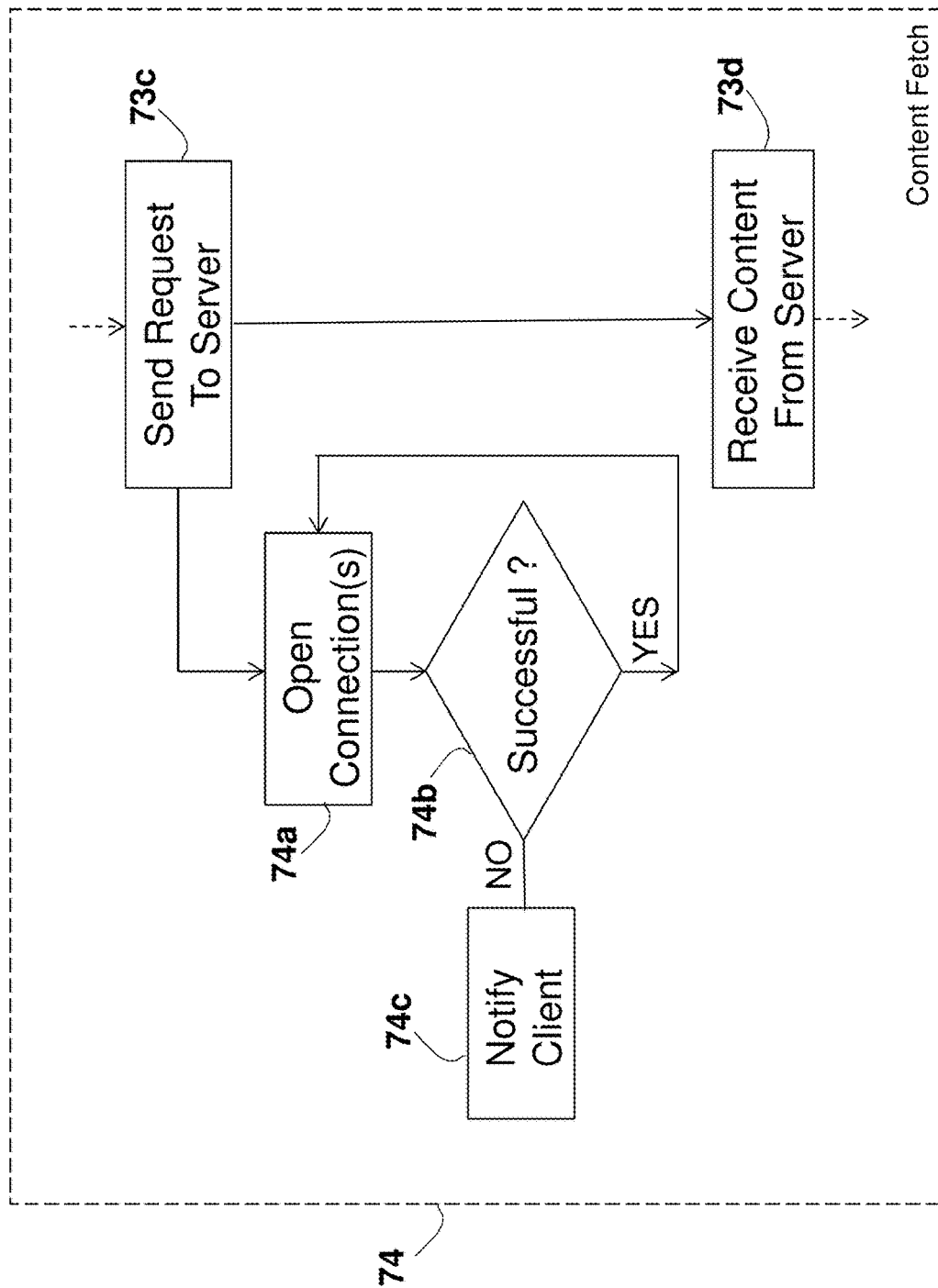
FIG. 7a illustrates schematically a simplified flowchart for increasing a number of connections to a server.

Alternatively or in addition, a tunnel device may try to open as many connections as available, as described in a flowchart 74 shown in FIG. 7a. The flowchart 74 corresponds to the flowchart 73 shown in FIG. 7. In parallel to starting the content fetching from the data server in the 'Send Request To Server' step 73c and starting the reception of content from the data server in the 'Receive Content From Server' step 73d, the tunnel device tries to open an additional connection (or multiple additional connections) to those already in use in a 'Open Connection(s)' step 74a. In the case the additional connection was properly established, as is checked in a 'Successful ?' step 74b, the tunnel device reverts to try to open an additional connection in the 'Open Connection(s)' step 74a. In the case no additional connection can be established, typically because the limit set by the data server was reached, the tunnel device notifies the client device in the 'Notify Client' step 74c of the maximum number of connections available for this data server. This notification allows the client device to use such information for use with other tunnel devices communicating with this data server or for future use with the data server.

Figure 7B:
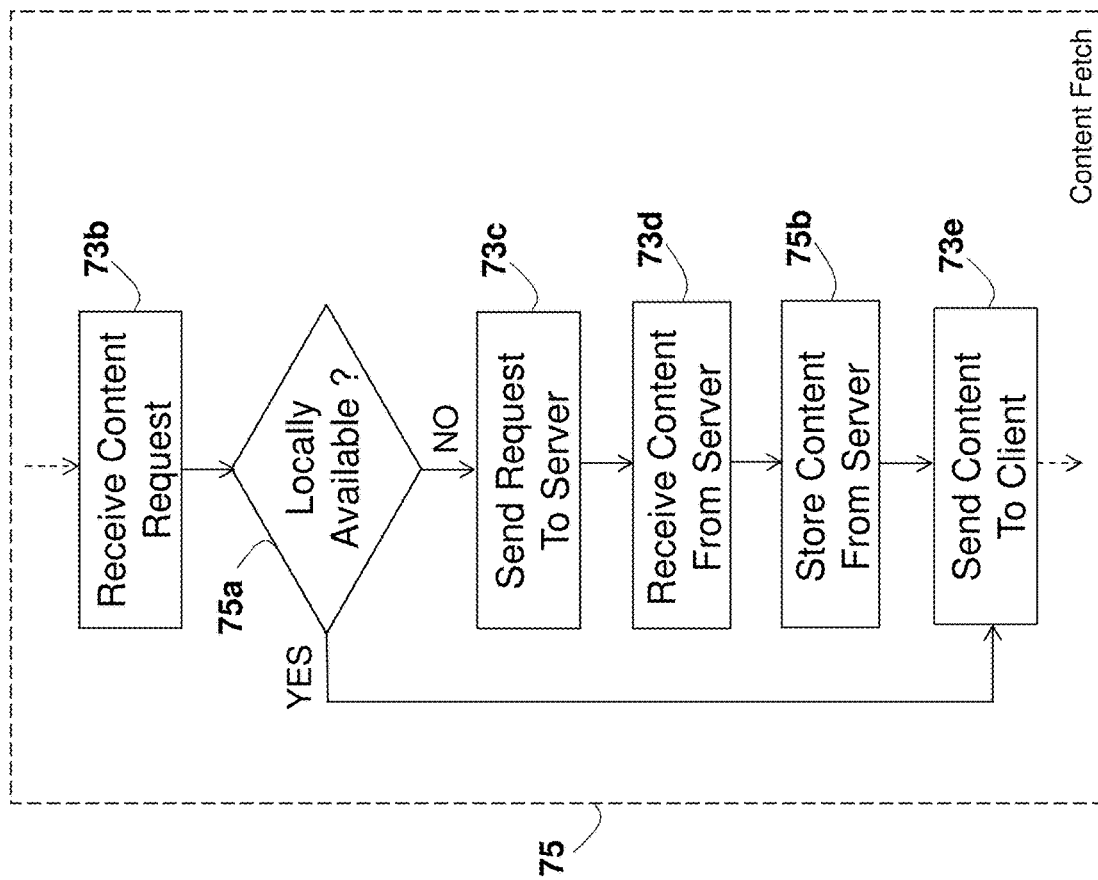
FIG. 7b illustrates schematically a simplified flowchart involving locally fetching of a content.

Alternatively or in addition, a tunnel device may be used to store a content to be provided to a client device, as described in a flowchart 75 shown in FIG. 7b, which corresponds to the flowchart 73 shown in FIG. 7. Upon receiving a request for content from a client device, a tunnel device (such as the tunnel device #1 33a) first checks if the requested content is stored locally (in the tunnel device itself), such as in its cache memory, in a 'Locally Available ?' step 75a. The requested content may be stored in the tunnel device as a result of a former accessing the respective data server, for example by a web browser (or any other application) that is part of the tunnel device. Alternatively or in addition, the content may be stored as part of a 'Store Content From Server' step 75b in a past fetching of content, for this client device or for another client device. If the content is available locally in the tunnel device, the overhead, time, and resources, of accessing the respective data server are obviated, and the locally stored requested content is sent to the client device in the 'Send Content To Client' step 73e. In the case the requested content is not locally available, the tunnel device continues as described in the flowchart 73 to fetch the content from the data server. Alternatively or in addition, upon receiving the requested content from the data server in the 'Receive Content From Server' step 73d, the receive content may be stored locally in the tunnel device for future use, in the 'Store Content From Server' step 75b. Storing of the received content may be executed before, after, or in parallel to sending the content to the requesting client device in the 'Send Content To Client' step 73e.

Since the data server #1 22a is accessed by, and sends information only to, tunnel devices (such as the tunnel device #1 33a), and is not aware of the final content destination being the client device #1 31a, the identity (such as the IP address) of the client device #1 31a is concealed from the data server #1 22a, thus providing anonymity and untraceability. Further, in a case where the data server #1 22a is a web server, the method and system described may provide for an anonymous web browsing. Further, the system and method provide an Internet traffic route for the content delivery that is distinct from the typical approach where the client device #1 31a access the data server #1 22a directly over the Internet, hence may alleviates bottlenecks and conserve bandwidth. Furthermore, since multiple parts of the content stored in a data server (such as the data server #1 22a) are loaded in parallel to a client device (such as the client device #1 31a) using multiple distinct paths, the content is fetched faster and using more effectively the network resources.

Figure 11:
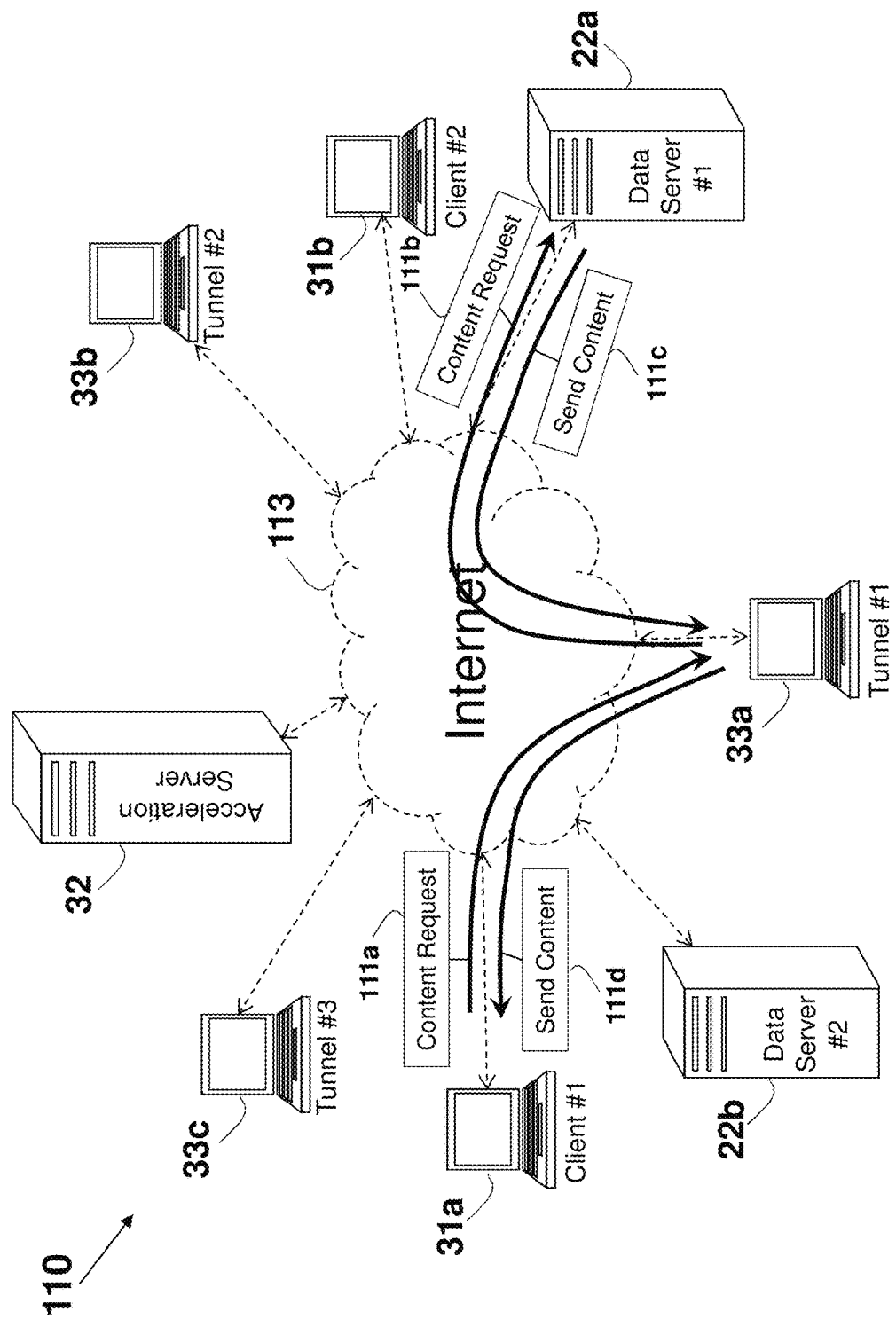
FIGS. 11, 11a, and 11b depict schematically messages exchanged over the Internet between a client device and a data server, using different tunnel devices.

A schematic messaging flow diagram 110 describing the client device #1 31a related 'content fetch' flowchart 65 and the tunnel device #1 33a related flowchart 73 is shown in FIG. 11. A 'Content Request' message 111a (corresponding to the 'Content Request' message 56g in the timing chart 50) is first sent from the client device #1 31a to the selected tunnel device #1 33a, which responds by forwarding the request to the data server #1 22a using a 'Content Request' message 111b (corresponding to the 'Content Request' message 56h in the timing chart 50). In turn the data server #1 replies and sends the content in a 'Send Content' message 111c (corresponding to the 'Send Content' message 56i in the timing chart 50) to the requesting tunnel device #1 33a, which in turn forward the fetched content to the asking client device #1 31a using a 'Send Content' message 111d (corresponding to the 'Send Content' message 56j in the timing chart 50).

While accessing the data server #1 22a was exampled above using the tunnel device #1 33a as an intermediary device, the system and the client #1 31a may use multiple tunnel devices in order to fetch the content from the same data server #1 22a. Two, three, four, or any other number of tunnel devices, serving as intermediary devices having the same or similar role as the tunnel device #1 33a, may be equally used. In one example, three tunnel devices may be used, such as adding the tunnel device #2 33b and the tunnel device #3 33c, shown in system 30 in FIG. 5. Each of the tunnel devices may execute the flow chart 70 shown in FIG. 7.

Figure 10:
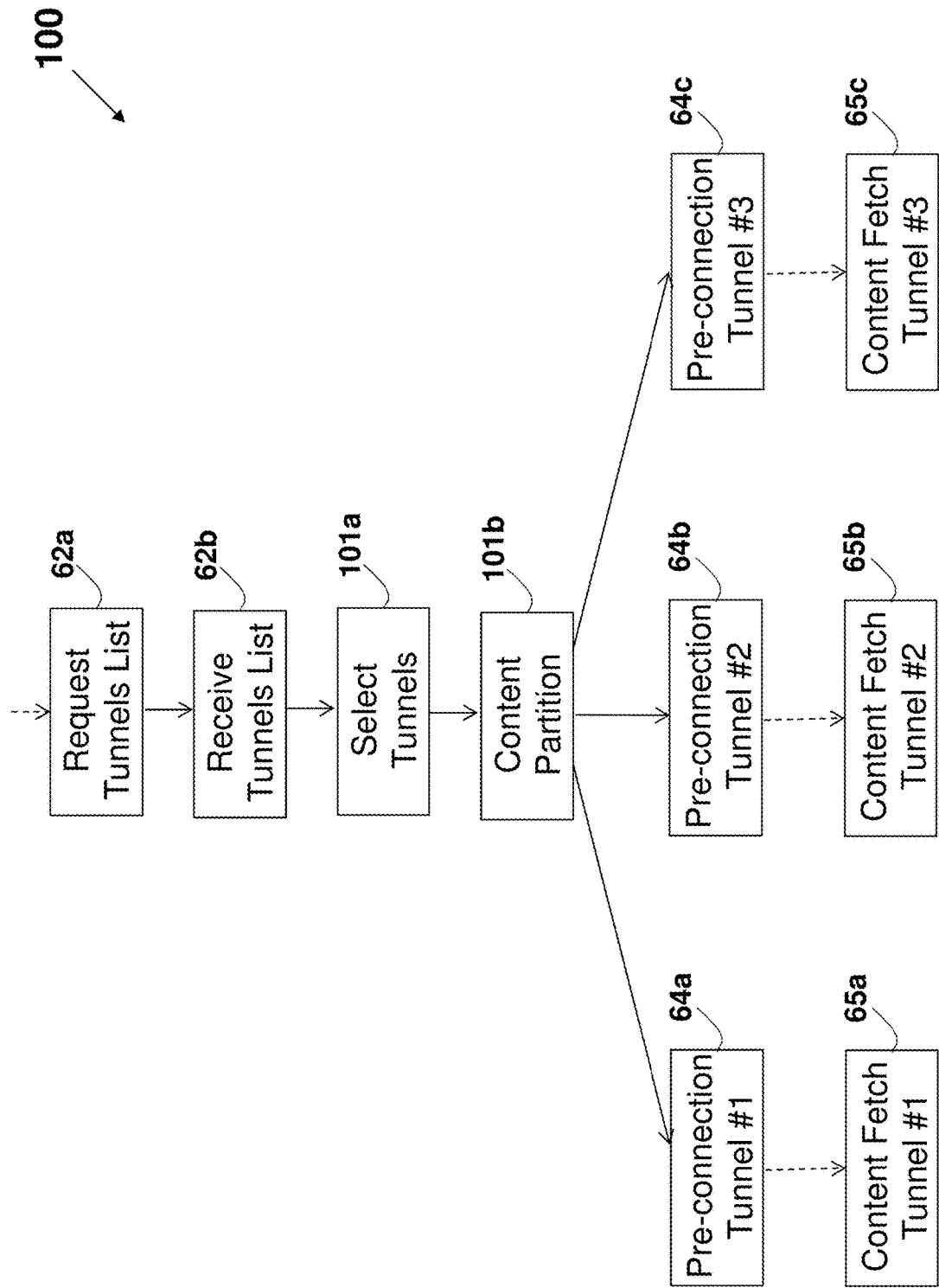
FIG. 10 illustrates schematically a simplified flowchart of a method relating to a client device using multiple tunnel devices.

A flowchart 100 relating to the client device #1 31a when employing three tunnel devices is shown in FIG. 10, based on the flowchart 60 described above. Upon receiving a list of available tunnel in a 'Receive Tunnels List' step 62b from the Acceleration server 32, the client device #1 31a selects multiple tunnels from the received list, rather than selecting a single tunnel as described in the 'Select Tunnel' step 62c described above. In the described example, three distinct tunnel devices are selected from the list, such as the tunnel device #1 33a (as before), the tunnel device #2 33b, and the tunnel device #3 33c. The client device 31a executes three pre-connection processes in a 'Pre-Connection Tunnel #1' step 64a, a 'Pre-Connection Tunnel #2' step 64b, and a 'Pre-Connection Tunnel #3' step 64c (each corresponding to the 'Pre-connection' flow chart 64 above), followed by a 'Content Fetch Tunnel #1' step 65a, a 'Content Fetch Tunnel #2' step 65b, and a 'Content Fetch Tunnel #3' step 65c, respectively (each corresponding to the 'Content Fetch' flow chart 65 above).

Figure 11A:
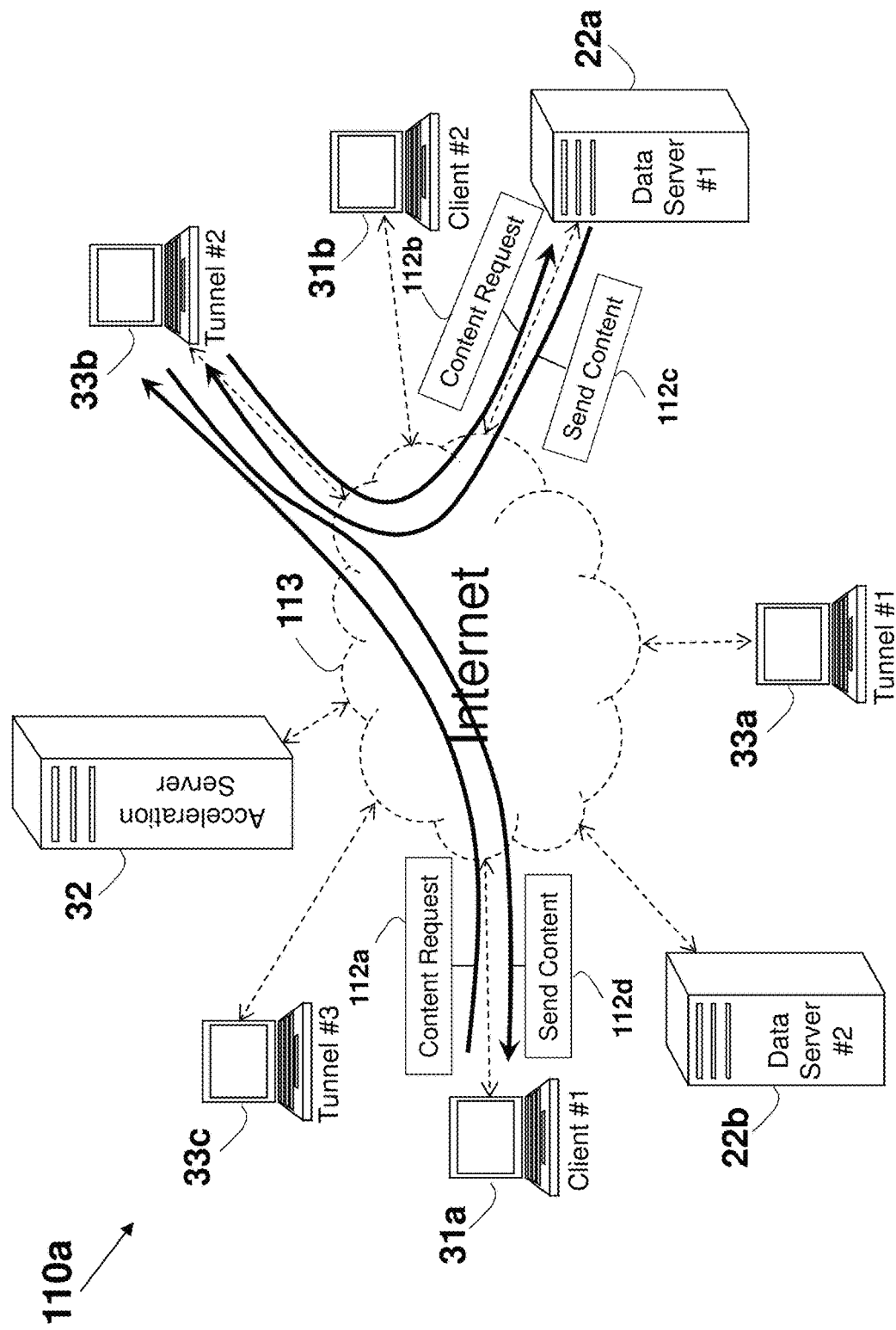
Figure 11B:
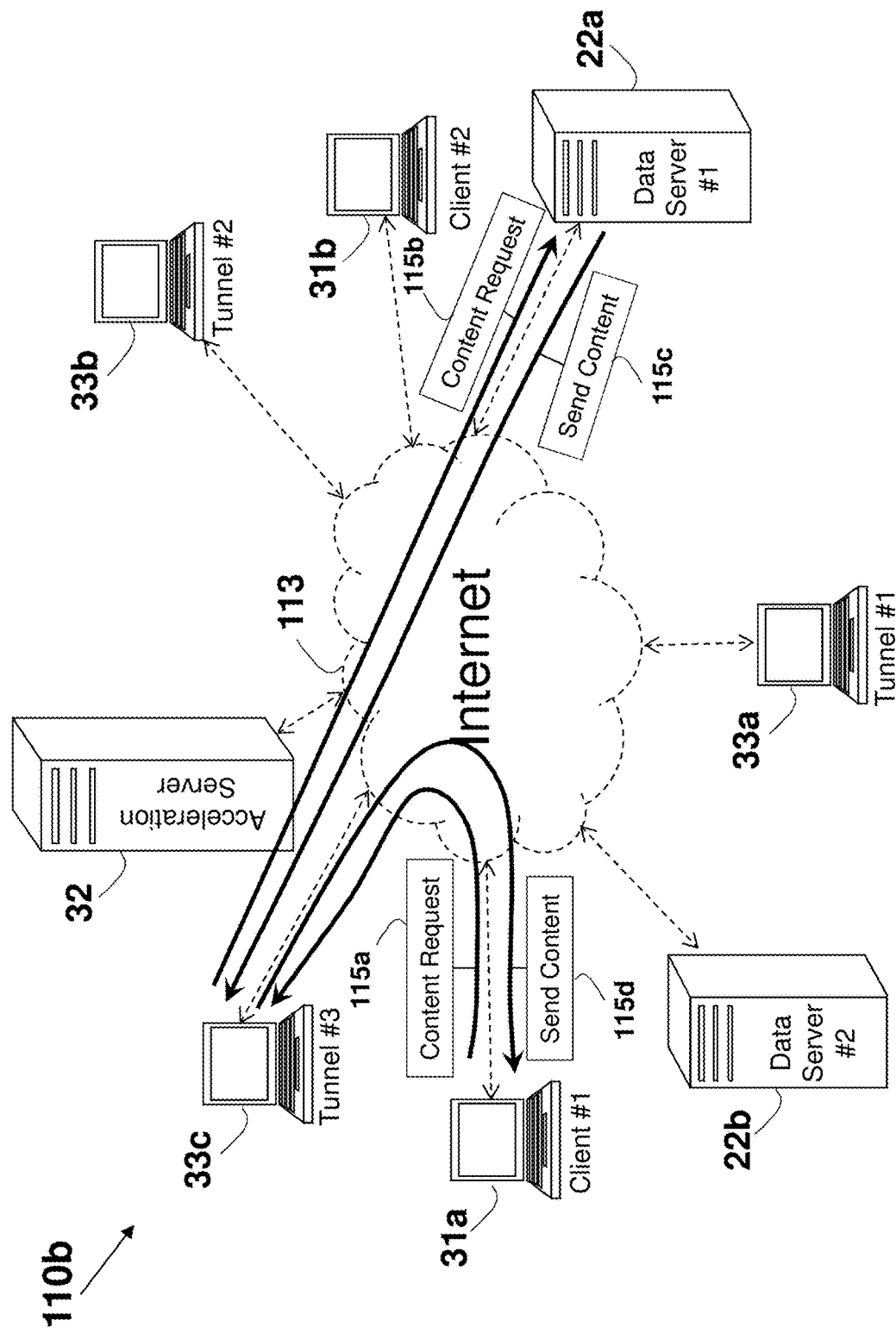

In such a configuration, three distinct data paths are involved in the content fetching. In addition to the messaging data path 110, a messaging flow 110a shown in FIG. 11a describes the usage of the tunnel device #2 33b as an intermediary device, relating to the client device #1 31a 'content fetch' related flowchart 65b and the tunnel device #2 33b related flowchart 73. A 'Content Request' message 112a (corresponding to the 'Content Request' message 56g in the timing chart 50) is first sent from the client device #1 31a to the selected tunnel device #2 33b, which responds by forwarding the request to the data server #1 22a using a 'Content Request' message 112b (corresponding to the 'Content Request' message 56h in the timing chart 50). In turn the data server #1 replies and sends the content in a 'Send Content' message 112c (corresponding to the 'Send Content' 56i in the timing chart 50) to the requesting tunnel device #2 33b, which in turn forward the fetched content to the asking client device #1 31a using a 'Send Content' message 112d (corresponding to the 'Send Content' message 56j in the timing chart 50). Similarly, a messaging flow 110b shown in FIG. 11b describes the usage of the tunnel device #3 33c as an intermediary device, relating to the client device #1 31a associated with 'content fetch' in the flowchart 65c and with the tunnel device #2 33b in the flowchart 73. The 'Content Request' message 115a (corresponding to the 'Content Request' message 56g in the timing chart 50) is first sent from the client device #1 31a to the selected tunnel device #3 33c, which responds by forwarding the request to the data server #1 22a using the 'Content Request' message 115b (corresponding to 'Content Request' message 56h in the timing chart 50). In turn the data server #1 22a replies and sends the content in the 'Send Content' message 115c (corresponding to the 'Send Content' message 56i in the timing chart 50) to the requesting tunnel device #3 33c, which in turn forward the fetched content to the asking client device #1 31a using the 'Send Content' message 115d (corresponding to the 'Send Content' message 56j in the timing chart 50).

Figure 10A:
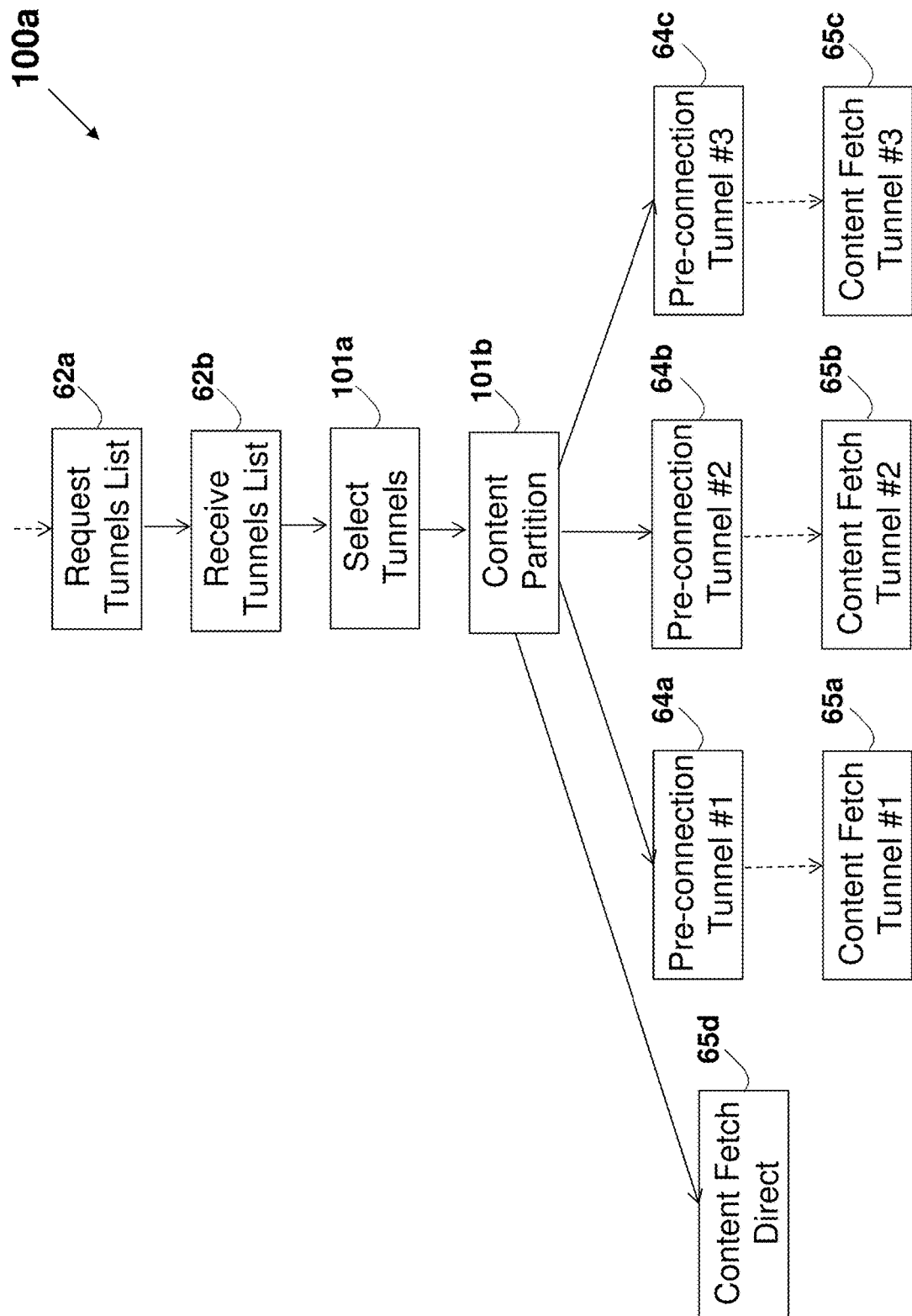
FIG. 10a illustrates schematically a simplified flowchart of a method relating to a client device using multiple tunnel devices and direct access.
Figure 11C:
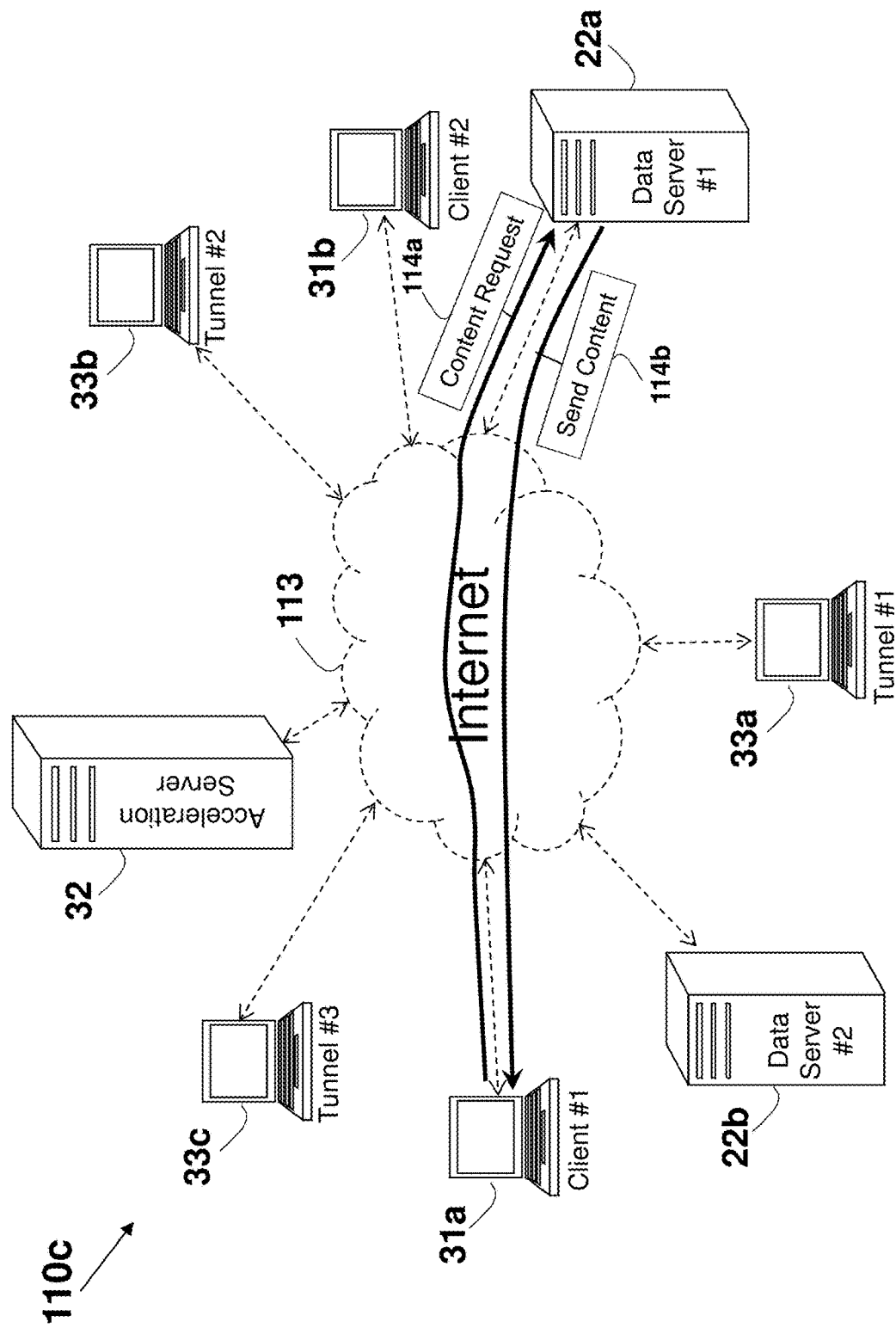
FIG. 11c depicts schematically messages exchanged over the Internet between a client device and a data server using a direct access.

Alternatively or in addition to accessing the data server #1 22a via intermediary devices such as one or more tunnel devices as described herein, the client device #1 31a may also directly access the data server #1 22a for fetching the content therefrom. Such a flowchart 100a is shown in FIG. 10a, where a 'Content Fetch Direct' step 65d is added. In this step 65d, the client device #1 31a directly accesses the data server #1 22a, as typically known, and in the same way, or in a similar way, the tunnel devices are accessing the data server #1 22a for fetching content therefrom. Such direct access is shown in messaging flow 110c shown in FIG. 11c, where no intermediary device is used. The 'Content Request' message 114a (which may be corresponding to the 'Content Request' message 56g in the timing chart 50) is first sent from the client device #1 31a to the data server #1 22a. In turn the data server #1 22a replies and sends the content in the 'Send Content' message 114b (which may be corresponding to the 'Send Content' message 56i in the timing chart 50) to the client device #1 31a. As used herein, a direct access by a client device, such as the client device #1 31a, is considered as if the client device itself serves as a tunnel device for itself.

In one example, the same content (from the same data server #1 22a) is requested by the client device #1 31a, from all the selected tunnel devices. In such a case, the same content is requested and fetched in the 'Content Fetch' flowcharts. In the example of three tunnel devices shown in a flowchart 100, the same content may be defined to be requested (and later fetched) in the 'Content Fetch Tunnel #1' step 65a, the 'Content Fetch Tunnel #2' step 65b, and the 'Content Fetch Tunnel #3' step 65c. Such configuration may be advantageous, for example, in the case where one or multiple data paths are unstable or unreliable, or provide intermittent connection. In the case wherein multiple redundant tunnels and data paths are used, there is a higher probability to fetch the required content, even if one or more of the data paths are problematic or non-functioning. For example, in the case where the tunnel device #1 33a and the tunnel device #3 33c are not fully functioning or having a momentary (or continuous) problem fetching the requested content, still the tunnel device #2 33b may provide the content. Further, such redundant operation may allow for quicker and faster content fetching, since the client device #1 31a may use the content first to be received, hence using the faster content fetching route. For example, in case of the tunnel device #1 33a replying and providing the content after 12 milliseconds, the tunnel device #2 33b replying and providing the content after 23 milliseconds, and the tunnel device #3 33c replying and providing the content after 5 milliseconds, the content is available at the client device #1 31a after 5 milliseconds, and there is no need to wait for the other tunnels to reply. Similarly, in case of a direct access, the client device #1 31a direct access is added as a redundant content fetching path to the tunnels-associated data paths.

The tasks relating to the different data paths, such as shown in a flowchart 100a, relating to communicating with the multiple tunnel devices and/or direct access, may be executed sequentially or in parallel. Further, each of the messages transferred shown in the messaging charts and data paths, such as in the diagrams 110, 110a, 110b, and 110c, may be executed, or may occur, sequentially or in parallel. For example, in case of multiple pre-connection processes, the client device #1 31a may execute the processes sequentially, meaning initiating a new pre-connection only after a former pre-connection is completed (or only upon being successfully completed). For example, relating to the flowchart 100a, the client device first executes the 'Pre-connection Tunnel #1' step 64a, and only upon completion of this step initiates the 'Pre-connection Tunnel #2' step 64b, and only upon completion of the latter step initiates the 'Pre-connection Tunnel #3' step 64c. Alternatively or in addition, the processes may be executed in parallel, using a multitasking.

Similarly, in case of multiple connect fetching processes, the client device #1 31a may execute the processes sequentially, meaning initiating a new content fetching only after a former content fetching is completed (or only upon being successfully completed). For example, relating to the flowchart 100a, the client device first executes the 'Content Fetch Direct' step 65d, and only upon completion of this step initiates the 'Content Fetch Tunnel #1' step 65a, and only upon completion of the latter step initiates the 'Content Fetch Tunnel #2' step 65b. Alternatively or in addition, the processes may be executed in parallel, using a multitasking.

The client device 31a may select a single tunnel device to be used as an intermediary device as described above relating to the 'Select Tunnel' step 62c. Alternatively or addition, the client device 31a may select a plurality of tunnel devices (including itself as described in the 'Content Fetch Direct' step 65d) to be used as an intermediary device as described above relating to the 'Select Tunnels' step 101a. The selection of a tunnel or of multiple tunnels may be based on pre-set criteria. The selection may use various attributes or characteristics of the tunnel devices, its operation environment, history, and any other characteristics. The attributes associated with each tunnel device may be stored in the acceleration server 23, and sent to the client device #1 31a as part of the available tunnel devices list, so that the client device #1 31a may use these attributes for the selection process. The criteria herein may be used independently or in combination. In yet another alternative, the selection is based on timing measurement, such as Time-of-Day (TOD). For example, one selection scheme may be used on a daily basis from 2.00 AM to 3.00 AM, a different selection from 3.00 AM to 4.00 AM and so on, cycling in a 24-hour day. Similarly, each day of the week may use different selection. Any combination of the schemes described herein may be equally used. Any number of tunnel devices may be selected. The number of tunnel devices that are selected in the 'Select Tunnels' step 101a may be 1 (one) (corresponding to the 'Select Tunnel' step 62c). Alternatively, a small number of tunnel devices may be selected, such as 2 or 3. Alternatively, 4, 5, 6, 7, 8, 9, or 10 tunnel devices may be selected. Further, more than 10 tunnel devices may be selected, such as 10, 20, 30, 40, or 50.

Figure 9:
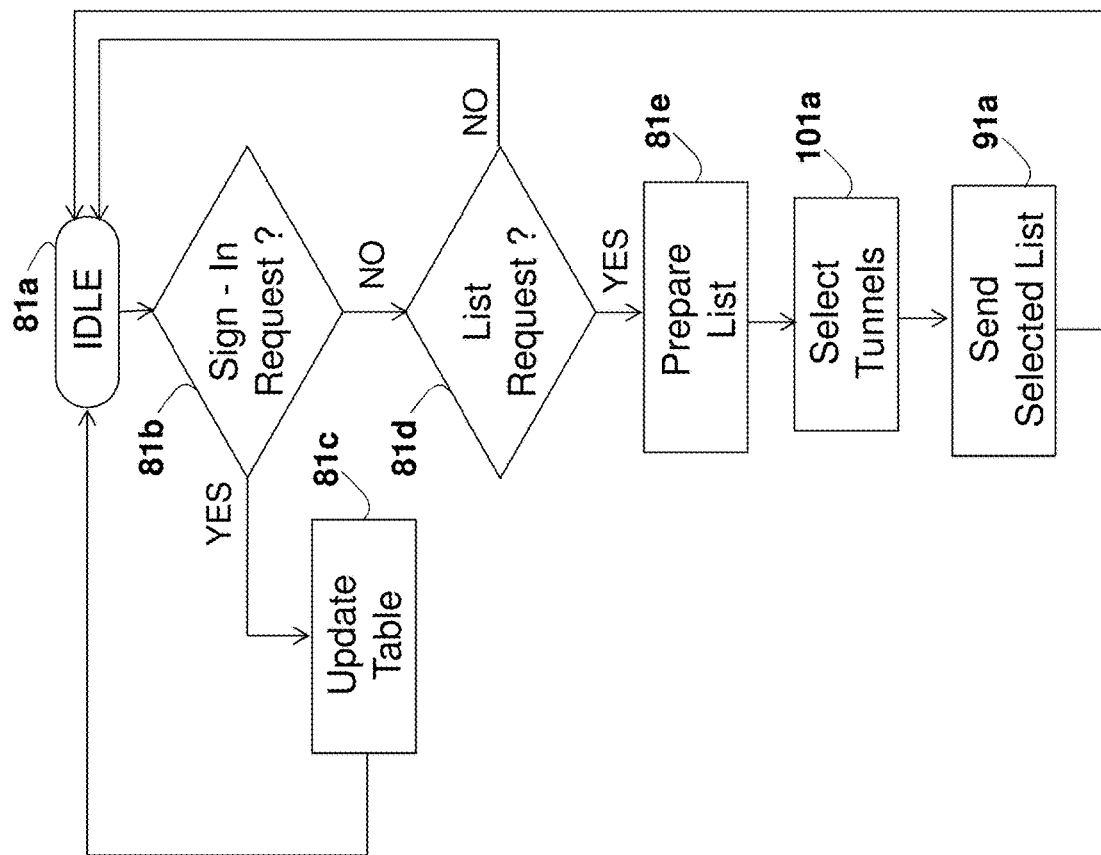
FIG. 9 illustrates schematically a simplified flowchart relating to an acceleration server that also selects the tunnels to be used.

The client device 31a may select a single tunnel device to be used as an intermediary device as described above relating to the 'Select Tunnel' step 62c. Alternatively or addition, the client device #1 31a may select a plurality of tunnel devices (including itself as described in the 'Content Fetch Direct' step 65d) to be used as an intermediary device as described above relating to the 'Select Tunnels' step 101a. Alternatively or in addition, the tunnel devices to be used may be selected by the acceleration server 32, and the tunnel list sent to the client device #1 31a (in the 'Send List' step 81f and received by the client device #1 31a in the 'Receive Tunnels List' step 62b) may include only the identification (e.g., IP address) of the tunnel devices to be used as intermediary devices to the client device #1 31a. Such a flowchart 90 to be executed by the acceleration server 32 is shown in FIG. 9. After preparing a list of available or potential tunnel devices that may be used in the 'Prepare List' step 81e, the acceleration server 32 itself selects in a 'Select Tunnels' step 101a the tunnel devices that are to be used by the client device #1 31a, and sends only these tunnel devices list to the client device #1 31a in a 'Send Selected List' step 91a.

Alternatively or in addition, the tunnel devices to be used may be selected by both the client device #1 31a and the acceleration server 32 working in cooperation. In one example, the acceleration server 32 (for example, as part of the 'Select Tunnels' step 101a in the flow chart 90) may select a subgroup of suggested, offered, or recommended tunnel devices that can be used, while the client device #1 31a (for example, as part of the 'Select Tunnels' step 101a in the flow chart 100) further selects and uses a subset of the tunnel devices from the list of offered suggested tunnel devices. Alternatively or in addition, the tunnel devices to be used may be selected by the acceleration server 32, based on rules or criteria set by, or requested from, the client device #1 31a. For example, as part of the requesting of tunnel devices list in the 'Request Tunnels List' step 62a, the client device #1 31a may send to the acceleration server 32 a set or rules or criteria, relating to the tunnel devices that are to be used by this client, which may relate to various attributes or characteristics of the available tunnel devices. In one example, the criteria may be the geographical location of the tunnel devices. The client device #1 31a may ask for tunnel devices only in a specific location, such as a specific country, and in response the acceleration server 32 may select tunnel devices only in the specified country (for example, in the 'Select Tunnel' step 101a in the flowchart 90) and send only this list (for example in the 'Send Selected List' step 91a) to the client device #1 31a. For example, relating to the example of the table 40 shown in FIG. 5a, in the case the client device #1 31a asks for tunnels only in Germany (or Europe), only the second listed tunnel device in the row 42b may be included in the list, being the only one located in Germany.

The selection of the tunnel device (or devices) to be used, or the priorities assigned to them, may be based on the available communication attributes or their history. For example, based on the costs associated with the usage of a network, the higher cost network may have lower priority and less used than lower cost or free network. In another example, a high quality network, such as having a higher available bandwidth or throughput, lower communication errors or packet loss, lower hops to destination, or lower transfer delay time, is having higher priority that a lower quality network. The system may use Bit Error Rate (BER), Received Signal Strength Indicator (RSSI), Packet Loss Ratio (PLR), Cyclic Redundancy Check (CRC) and other indicators or measures associated with the communication channel associated with a network interface, and may be based on, use, or include the methodology and schemes described in RFC 2544 entitled: "*Benchmarking Methodology for Network Interconnect Devices*", and ITU-T Y.1564 entitled: "*Ethernet Service Activation Test Methodology*", which are both incorporated in their entirety for all purposes as if fully set forth herein. The network quality grade may be affected by the history of using such a network, for example during a pre-set period before the process of selection of a network interface. In one example, the network interface where the last proper packet was received from may be selected as the interface to be used for the next packet to be transmitted. The system may further use, or be based on, the schemes and technologies described in U.S. Pat. No. 7,027,418 to Gan et al. entitled: "Approach for Selecting Communications Channels Based on Performance", which is incorporated in its entirety for all purposes as if fully set forth herein.

Random:

In one example, the tunnel device (or devices) to be used are randomly selected. Randomness is commonly implemented by using random numbers, defined as a sequence of numbers or symbols that lack any pattern and thus appear random, are often generated by a random number generator. Randomness is described, for example, in IETF RFC 1750 "Randomness Recommendations for Security" (December 1994), which is incorporated in its entirety for all purposes as if fully set forth herein. A random number generator (having either analog or digital output) can be hardware based, using a physical process such as thermal noise, shot noise, nuclear decaying radiation, photoelectric effect or other quantum phenomena. Alternatively, or in addition, the generation of the random numbers can be software based, using a processor executing an algorithm for generating pseudo-random numbers which approximates the properties of random numbers.

Physical Location:

In one example, the selection criterion is based on physical geographical location of a tunnel device. For example, a tunnel device, which is geographically the closest to the data server #1 22a from which a content is to be requested, will be the first to be selected. The second nearest tunnel device will be the second to be selected, and so on. In this scheme, tunnel devices which are in the same city as the data server #1 22a, will have highest priority than other tunnel devices in the same country, then in the same continent and so forth. Alternatively or in addition, the criterion may be based on the physical distance between a tunnel device and the acceleration server 32 location, or on the physical distance between a tunnel device and the client device #1 31*a*. In one example, the tunnel devices may be selected based on being in a location, which is the most distant from the data server #1 22*a*, the acceleration server 32, or the client device #1 31*a*. The information about the tunnel device locations may be obtained, for example, from the tunnel devices themselves during the signing-up process. In such a scheme, the tunnel device sends its physical geographical location (which may include country, state or province, city, street address, or ZIP code) as part of the sign-in process, and the location is stored in the acceleration server as part of the tunnels related database. The table 40 in FIG. 5*a* shows various devices in the system listed with associated cities and countries in the fourth column 41*d*. In the example shown, the first row 42*a* relates to a tunnel device located in Boston, Massachusetts, in the United States, the second row 42*b* relates to a tunnel device located in Munich in Germany, the third row 42*c* relates to a client device located in Sidney in Australia, the fourth row 42*d* relates to a client device located at Tel-Aviv in Israel, and the fifth row 42*e* relates to a device located at Cairo in Egypt. In the case wherein the criterion involved relates to the node closest to the data server #1 22*a*, which for example is located in London in the United-Kingdom, the first (or only) tunnel device to be selected may be the second tunnel device associated with the second row 42*b*, being in Europe and thus the geographically closest device. In one example, the device location may be obtained using its built-in Global Positioning System (GPS), and may include the latitude, longitude, and timezone of the device location.

IP Address:

In one example, the IP address is used as a measure to determine 'closeness'. For example, an IP address that is numerically close to another IP, may be considered as 'geographically' close. In this context, 192.166.3.103 is closer to 192.166.3.212 than to 192.167.3.104. Alternatively or in addition, devices that share the same ISP are considered as 'close', since it is likely that better and faster communication is provided, since the need to communicate via the Internet is obviated.

Timing:

In one example, the timing of an event or activity of a tunnel device affects its selection. The timing of a tunnel device signing up with the acceleration server 32 may be used for the selection criterion. The first available tunnel device that signed in may be first selected, then the second in line. In the example of the table 40 shown in FIG. 5*a*, the tunnel device associated with the first row 42*a* will be first to be selected, having the earliest sign-in time (23/1, 7:32), while the following tunnel device to sign in (shown in the row 42*b*) will be selected next. Alternatively or in addition, the latest signed-in tunnel device will be the first to be selected.

Alternatively or in addition, the time of the last usage as the tunnel device may be used as a criterion. For example, a tunnel device that was most recently used will have the highest priority to be reselected. Alternatively, a 'fairness' rule will be applied in order to uniformly use all available channels, where a tunnel device will be selected if it was not used the most time.

The content requested by the client device #1 31*a* may be partitioned into multiple parts or 'slices'. Any number of slices may be used. The slicing may be in a bit, nibble (4-bits), byte (8-bits), word (multiple bytes), character, string, or file level. For example, in a case wherein the content includes 240 bytes designated byte #1 to byte #240, using a byte level partitioning into two slices results in a first slice (slice #1) including byte #1 to byte #120, and a second slice (slice #2) including byte #121 to byte #240. In the case of byte-level partitioning into three slices (referred as slice #1, slice #2, and slice #3), a first slice (slice #1) may be including byte #1 to byte #80, a second slice (slice #2) may be including byte #81 to byte #160, and a third slice (slice #3) may be including byte #161 to byte #240. Similarly, in a case wherein the content include 3 bytes designated byte #1 to byte #3 representing 24 bits, using a bit-level partitioning into four slices results in a slice #1 including the first 6 bits, slice #2 including the next 6 bits, slice #3 including the next 6 bits, and slice #4 including the last 6 bits. The partition may be into equal length parts. Alternatively or in addition, a different length slicing may be applied. For example, in the case of a 240 bytes content and using byte-level partitioning into three slices (referred as slice #1, slice #2, and slice #3), a first slice (slice #1) may be including byte #1 to byte #20 (20-byte length), a second slice (slice #2) may be including byte #21 to byte #100 (80-byte length), and a third slice (slice #3) may be including byte #101 to byte #240 (140-byte length). In one example, the content itself is made of inherent or identifiable parts or segments, and the partition may make use of these parts. In one example, the content may be a website content composed of multiple webpages, and thus the partition may be such that each slice includes one (or few) webpages. Further, the partitioning may be sequential or non-sequential in the content.

The partitioning may be non-overlapping, wherein each slice includes a distinct part of the content, as is exampled above in a case wherein the content includes 240 bytes designated byte #1 to byte #240, where using a byte level partitioning into three slices (referred as slice #1, slice #2, and slice #3), results in a first slice (slice #1) including byte #1 to byte #80, a second slice (slice #2) including byte #81 to byte #160, and a third slice (slice #3) including byte #161 to byte #240. Alternatively or in addition, an overlapping partitioning may be applied, where the same part of the content is included in multiple slices. For example, in a case above where the content includes 240 bytes designated byte #1 to byte #240, and using a byte level partitioning into three slices (referred as slice #1, slice #2, and slice #3), a first slice (slice #1) may include byte #1 to byte #160, a second slice (slice #2) may include byte #81 to byte #240, and a third slice (slice #3) may include byte #1 to byte #80 in addition to byte #161 to byte #240. In such a case, byte #1 to byte #80 are part of both slice #1 and slice #3, byte #81 to byte #160 are part of both slice #1 and slice #2, and byte #161 to byte #240 are part of both slice #2 and slice #3. It is noted that in such a partition, the content may be fully reconstructed from any two of the slices, hence providing a degree of redundancy. For example, in case of carrying the three slices over the Internet and a failure to receive one of the slices, the remaining two slices may be used to fully reconstruct the whole content.

The same content may be requested and fetched using multiple tunnel devices as exampled above. Alternatively or in addition, the content may be partitioned into multiple slices (overlapping or non-overlapping), where each slice is requested and fetched using a distinct tunnel device (or via the client device serving as its own tunnel). The content is partitioned into slices in a 'Content Partition' step 101*b* shown in the flowchart 100. In one example, each of the slices is allocated to a different tunnel device, and fetched via that tunnel device as explained herein. For example, in the case of partitioning into 3 slices, where slice #1 may be fetched via the tunnel device #1 33*a* in a 'Content Fetch Tunnel #1' step 65*a*, slice #2 may be fetched via the tunnel device #2 33*b* in a 'Content Fetch Tunnel #2' step 65*b*, and slice #2 may be fetched via the tunnel device #3 33*c* in a 'Content Fetch Tunnel #3' step 65*c*. Alternatively or in addition, a slice (or multiple slices) may be requested and fetched via two or more tunnel devices. Such scheme provides redundancy and may further accelerate the content fetch. For example, in the case of partitioning into 2 slices, where slice #1 may be fetched via the tunnel device #1 33*a* in the 'Content Fetch Tunnel #1' step 65*a* and in parallel slice #1 may also be fetched via the tunnel device #2 33*b* in the 'Content Fetch Tunnel #2' step 65*b*, while slice #2 may be fetched via the tunnel device #3 33*c* in the 'Content Fetch Tunnel #3' step 65*c*.

Figure 12:
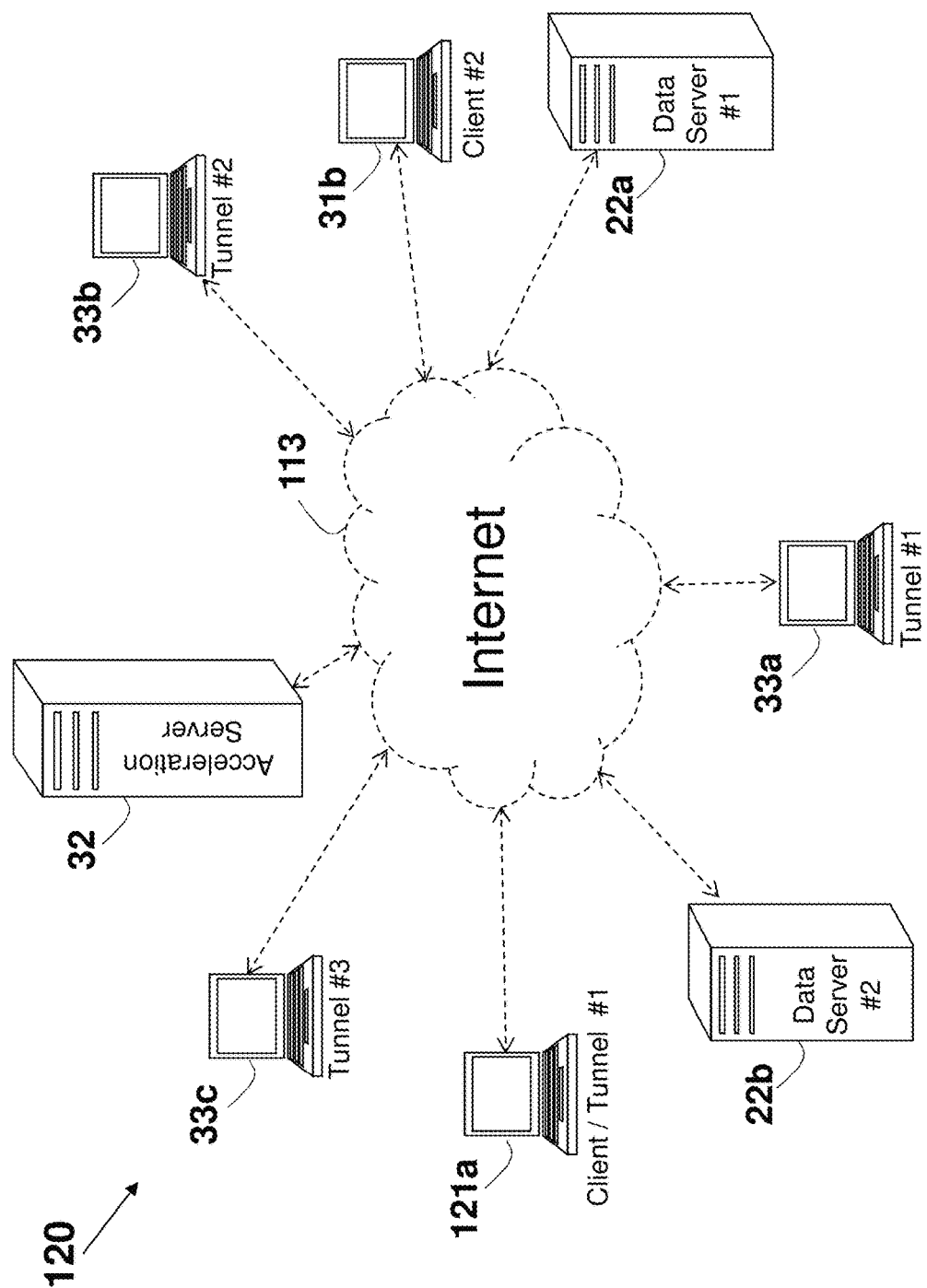
FIG. 12 depicts schematically client devices, tunnel devices, servers, and client/tunnel device connected to the Internet.

The system was exampled above where a device may be a client device (such as the client device #1 31*a*) executing, for example, the flowchart 60, the flowchart 100, or the flowchart 100*a*. Similarly, a device may be a tunnel device (such as the tunnel device #1 33*a*) executing, for example, the flowchart 70. It is appreciated that a device may serve as both a client device and as a tunnel device, executing both a client device flowchart (such as the flowchart 100*a*) and a tunnel device flowchart (such as the flowchart 70). The two roles may be performed sequentially, where one role is assumed at a time, or may be used in parallel using multi-tasking or multiprocessing. For example, the client device #1 31*a* may also serve as a tunnel device, referred to as Client/Tunnel device #1 a1*a* as shown in system 120 in FIG. 12. For example, the table 40 shown in FIG. 5*a* shows in the fifth row 42*e* such a client/tunnel device after signing in. A system may include client—only devices using tunnel-only devices. Alternatively or in addition, a part of, or all the devices in a system may be client/tunnel devices, capable of assuming both roles of client and tunnel devices.

Figure 12A:
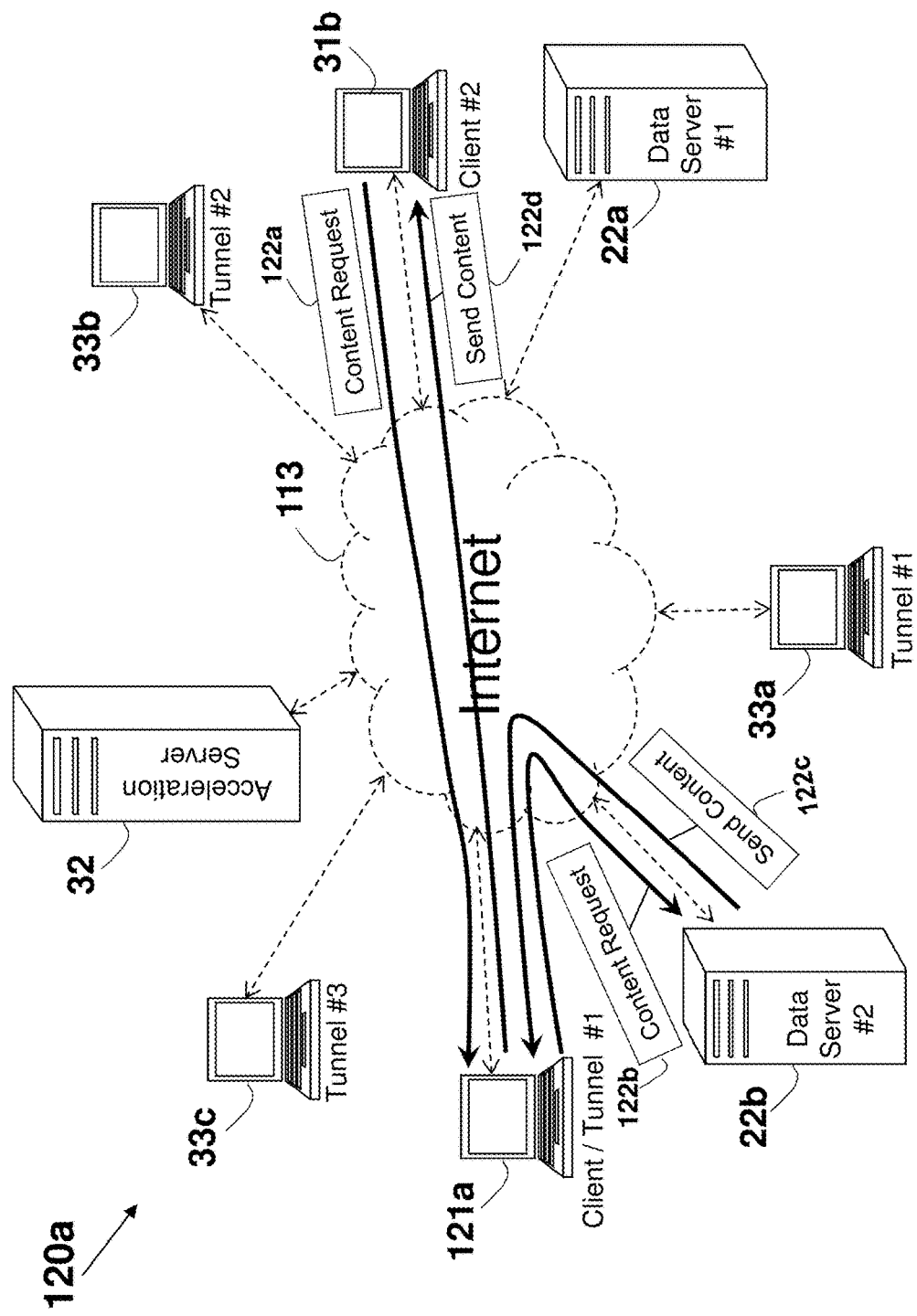
FIG. 12a depicts schematically messages exchanged over the Internet between a client device and a data server using a client/tunnel device.

In one example shown as a messaging flow 120*a* in FIG. 12*a*, the client/tunnel #1 device 121*a* is serving as a tunnel device (in addition to being the client device #1 31*a* as described above) serving as an intermediary device for the client device #2 31*b* for fetching content from the data server #2 22*b*. The 'Content Request' message 122*a* (corresponding to the 'Content Request' message 56*g* in the timing chart 50) is first sent from the client device #2 31*b* to the client/tunnel device #1 121*a*, which responds by forwarding the request to the data server #2 22*b* using the 'Content Request' message 122*b* (corresponding to the 'Content Request' message 56*h* in the timing chart 50). In turn the data server #2 22*b* replies and sends the content in 'Send Content' message 122*c* (corresponding to the 'Send Content' message 56*i* in the timing chart 50) to the requesting client/tunnel device #1 121*a* now serving as a tunnel device, which in turn forward the fetched content to the asking client device #2 31*b* using the 'Send Content' message 122*d* (corresponding to the 'Send Content' message 56*j* in the timing chart 50).

Any device referred to herein as a 'tunnel device', such as the tunnel device #1 33*a*, the tunnel device #2 33*b*, or the tunnel device #3 33*c*, may be implemented as a computer serving as a client device in the server/client sense, and may execute client applications or software. In particular, such a tunnel device may execute a web browser application. Similarly, any tunnel device may be implemented as a computer serving as a server device in the server/client sense. Similarly, any device referred to herein as a 'client device', such as client device #1 31*a*, client device #2 31*b*, and client device #3 31*c*, may be implemented as a computer serving as a client device in the server/client sense, and may be executing client applications or software. In particular, such a client device may execute a web browser application. Similarly, any client device may be implemented as a computer serving as a server device in the server/client sense.

Figure 13:
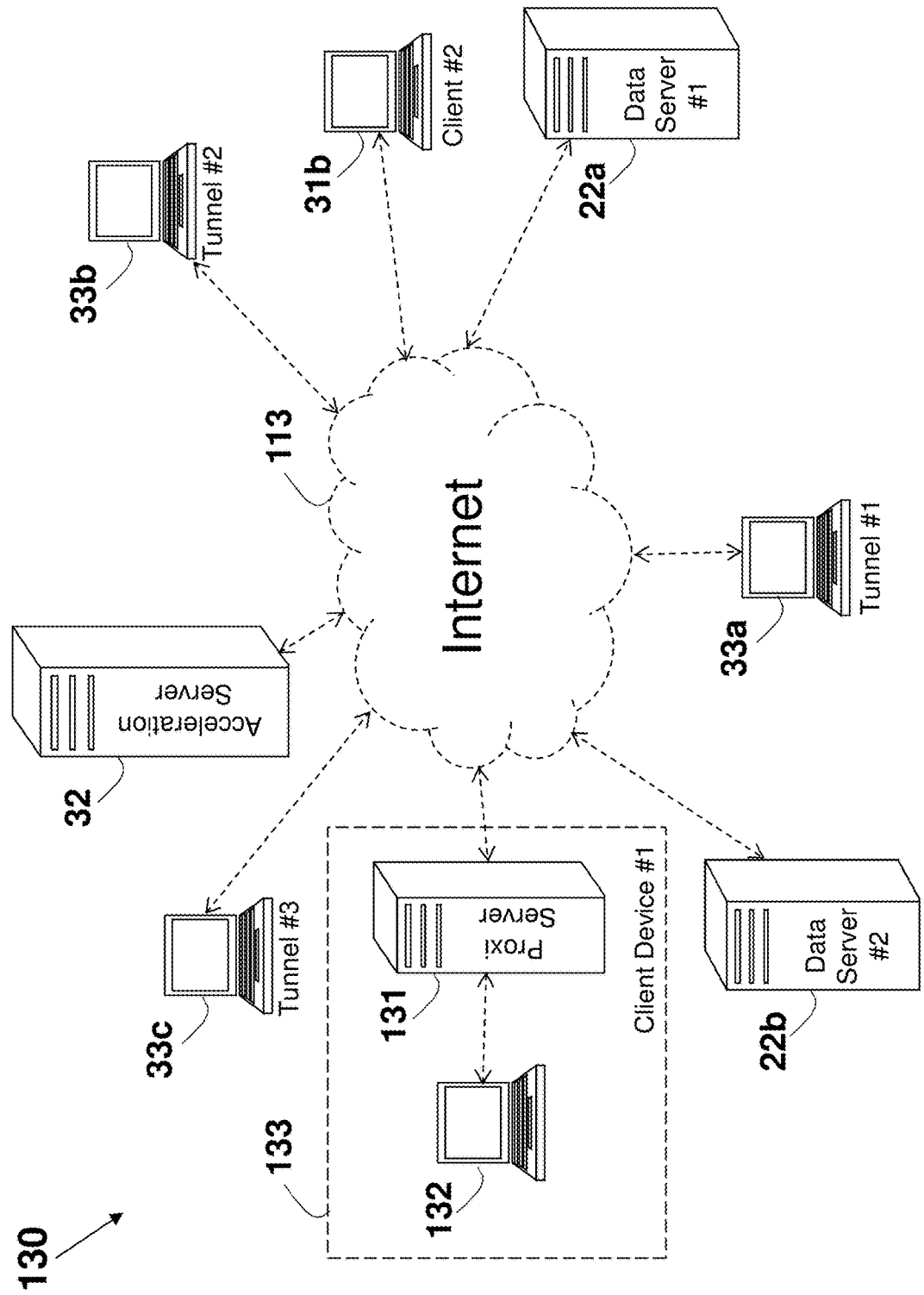
FIG. 13 depicts schematically client devices, tunnel devices, and servers connected to the Internet, where the client device is implemented using a proxy server.

Further, the functionality of any device herein may be implemented using multiple physical devices. In one example shown as a system 130 in FIG. 13, the client device #1 31*a* functionality is implemented in as client device #1 system 133, comprising a computer 132 (may be used for GUI or as a client), is communicating with a proxy server 131. The client device #1 31*a* functionality may be split between the computer 132 and the proxy server 131.

In one example, the acceleration server 32 (together with the tunnel devices) forms a system that may be used to provide a service to a client device. The service allows the client device (such as client device #1 31*a*) to quickly and anonymously fetch content from the data server #1 22*a*. The service level may be measured, or the service may be billed for, if applicable, for example, using the following parameters (individually or combined):

Content amount. In this example, the amount of data relating to the content fetched from a data server (such as the data server #1 22*a*) is measured and logged. In such a scheme, the tunnel devices may send to the acceleration server the amount of data flowing through from the data server to the client device. Alternatively or in addition, the client device may log or send the amount of content fetched to the acceleration server 32.

Number of tunnels. The number of tunnels that were available to a client device, or the number of tunnel devices that were actually used, may be used as an indication to the service level.

Location. The service level may be measured or billed based the country the data server, from which the content is fetched, is located. Similarly, the service level may be measured or billed based the country the client device, to which the content is fetched, is located.

While the pre-connection process was described above regarding the communication between a client device (such as the client device #1 31*a*) and a tunnel device (such as the tunnel device #1 33*a*), described as the client device pre-connection flowchart 64 and the tunnel device pre-connection flowchart 72, a pre-connection may be established between any two devices in the system 30, such as between a client device and the acceleration server 32, between two client devices, or between a client device and a data server (such as the data server #1 22*a*). Similarly, a pre-connection may be established between a tunnel device and the acceleration server 32, between two tunnel devices, or between a tunnel device and a data server (such as the data server #1 22*a*).

Figure 14:
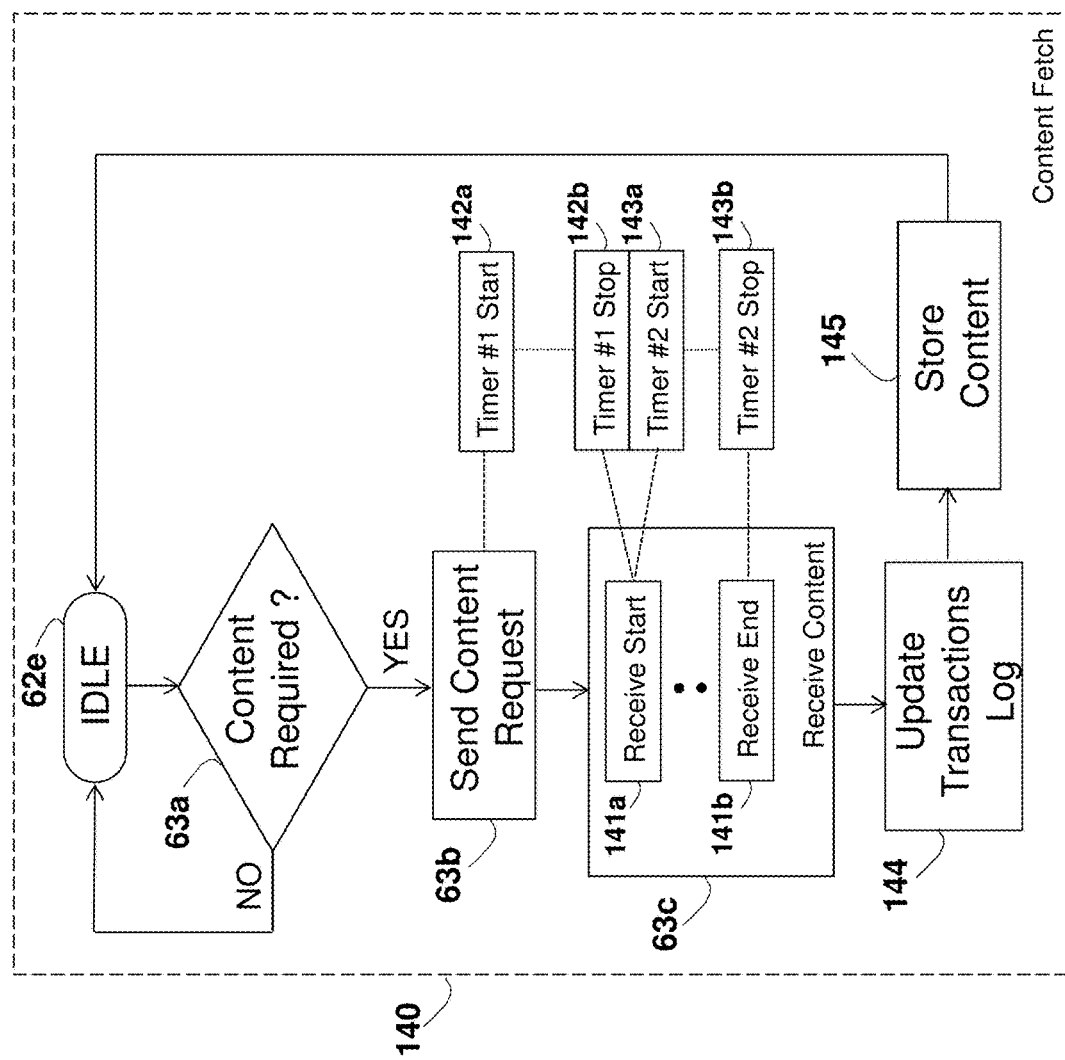
FIG. 14 illustrates schematically a simplified flowchart of a method relating to a client device measuring and logging a communication with a tunnel device.

The performance of the method and system described herein may be based on the latency involved in fetching a required content. The flowchart 65 in FIG. 6 describes the steps involved in fetching content from a tunnel device, and a flowchart 140 in FIG. 14 provides further detailed operation of a client device, such as the client device #1 31*a*. The 'receive Content' step 63*c* may be partitioned into two or more steps, as shown in the flowchart 270 in FIG. 27, such as a 'Receive Start' step 141*a*, relating to the starting of receiving data from a tunnel device, upon starting or completing the reception of the first byte of the data, for example, and a 'Receive End' step 141*b*, relating to the ending of receiving data from a tunnel device, for example upon starting or completing the reception of the end byte of the data.

As part of the 'Send Content Request' step 63b, a timer #1 is started in 'Timer #1 Start' step 142a, and the timer #1 is stopped in a 'Timer #1 Stop' step 142b at the beginning of the receiving the data from the tunnel device in the 'Receive Start' step 141a. Hence, the timer #1 is used to measure the Round Trip Time (RTT), relating to the time interval measured from sending the request to a tunnel device until the requested data is starting to be received. Similarly, as part of the 'Receive Start' step 143a a timer #2 is started, and the timer #2 is stopped in a 'Timer #2 Stop' step 143b at the end of the receiving the data from the tunnel device in a 'Receive End' step 141b. Hence, the timer #2 is used to measure the time interval required to receive the content itself from the tunnel. For example, in case the time interval is 50 milliseconds (ms), this is the time interval measured from starting to ending of the data reception from the tunnel device. In the case the content size is X bits, the BW can be calculated as the X bits divided by the timer #2 measured time interval. For example, in the case the received content from the tunnel device is about the size of 50,000 bits (50 Kbits) received during 100 milliseconds (ms), the effective (or average) BW is BW=50,000/0.1=500,000 bits/second=500 Kb/s=62.5 Kbytes/s=62.5 KB/s. The total latency affecting the performance is the combination of both the time interval measured by timer #1 and the time interval measured by timer #2. Using the above examples where the timer #1 measured an RTT of 50 ms and the timer #2 measured 100 ms, the total latency, measured from sending the request to the tunnel in the 'Send Content Request' step 63b to the end of the content reception in the 'Receive End' step 141b, is 150 ms (50+100=150).

After a transaction involving fetching a content from a tunnel is completed, it is beneficial to store the fetched content for future use, as shown in a 'Store Content' step 145 in the flowchart 140. The fetched content may be stored in the client device in any volatile or non-volatile memory, or may be stored in a local cache as described in U.S. Pat. No. 8,135,912 to the same inventors as this application, entitled: "System and Method of Increasing Cache Size", which is incorporated in its entirety for all purposes as if fully set forth herein. The content is stored with its related metadata or any other identifiers, so it can be easily detected and fetched when later required. For example, the stored content may be used when the same content is required at any later stage by the same client, or may be used when the client device also serves as a peer device, such as the peer device #1 102a as shown in system 260. In the latter case, the fetched content (such as a URL content) may be arranged and stored as chunks, as described herein.

After a transaction involving fetching a content from a tunnel is completed, it is beneficial to store the transaction related information for future use, such as for future analysis. An example of a table relating to transactions log, that may be part of a database, is shown as table 150 in FIG. 15. The table is updated in the 'Update Transactions Log' step 144 as part of the flowchart 140 shown in FIG. 14. A top row 152 provides the titles of the various columns, where each of the rows provides information regarding a specific transaction, where a first transaction information is shown in a first row 152a, the second transaction information is shown in a second row 152b, the third transaction information is shown in a third row 152c, and so forth. The first column 151a shows the date and time (in DD/MM HH/MM format) when the transaction occurred, such as the start or end of the transaction. For example, the first transaction related information is in the first row 152a shows that the transaction was completed (or started) at March 13, on 9:23. Similarly, the second transaction information is in the second row 152b shows that the transaction was completed (or started) on March 13, at 9:46, and the third transaction information is in the third row 152b shows that the transaction was completed (or started) at April 16, on 11:22. The second column 151b includes an identifier such as the IP address of the tunnel device that was used in the transaction to fetch the content from the data server, which identifier (such as its IP address) is included in the third column 151c. In the example of the first transaction shown in the first row 152a, the IP address of the tunnel device used is 229.155.81.168, and it was used to fetch content stored in a data server having an IP address of 128.164.35.35.142. Similarly, in the example of the second transaction shown in the second row 152b, the IP address of the tunnel device used is 248.107.109.10, and it was used to fetch content stored in a data server having an IP address of 49.154.2.5, and in the example of the third transaction shown in the third row 152c, the IP address of the tunnel device used is 158.217.19.195, and it was used to fetch content stored in a data server having an IP address of 72.251.238.51. The fourth column 151d describes the identifier of the content that was fetched during this transaction, such as IP address, URL, web-site or web-page, where the first transaction content (in the first row 152a) relates to the URL www.111.com/22.mgp, the second transaction content (in the second row 152b) relates to the URL www.xxx.com/hy.avi, the third transaction content (in the third row 152c) relates to the URL www.yyy.com/t6.php, and so forth.

A fifth column 151e logs the BW calculated in a respective transaction, based on timer #2 time interval measurement as described above. In the first transaction (in the first row 152a) the calculated BW is logged as 1000 Kb/s (=1 Mb/s=125 KB/s), in the second transaction (in the second row 152b) the calculated BW is logged as 350 Kb/s (=0.35 Mb/s), and in the third transaction (in the third row 152c) the calculated BW is logged as 2500 Kb/s (=2.5 Mb/s). A sixth column 151f logs the RTT measured in the transaction, based on timer #1 time interval measurement as described above. In the first transaction (in the first row 152a) the measured RTT is logged as 30 ms (=0.03 seconds=0.03 s), in the second transaction (in the second row 152b) the measured RTT is logged as 70 ms, and in the third transaction (in the third row 152c) the measured RTT is logged as 540 ms (=0.54 second).

The transaction log, such as table 150, may be prepared by a client device, such as client device #1 31a, and stored in the client device for future use. Alternatively or in addition, the transaction log may be sent, after each transaction or after multiple transactions, such as per a time period (e.g., hourly, daily, weekly, monthly), to other entities in the system, to be stored in the entities for future use by them or by other entities in the network. In one example, the transaction log is sent to the acceleration server 32. Alternatively or in addition, the transactions log may be sent to the tunnel devices, such as the tunnel device #1 33a, the tunnel device #2 33b, or the tunnel device #3 33c, that were involved in the content fetching transaction.

Figure 15:
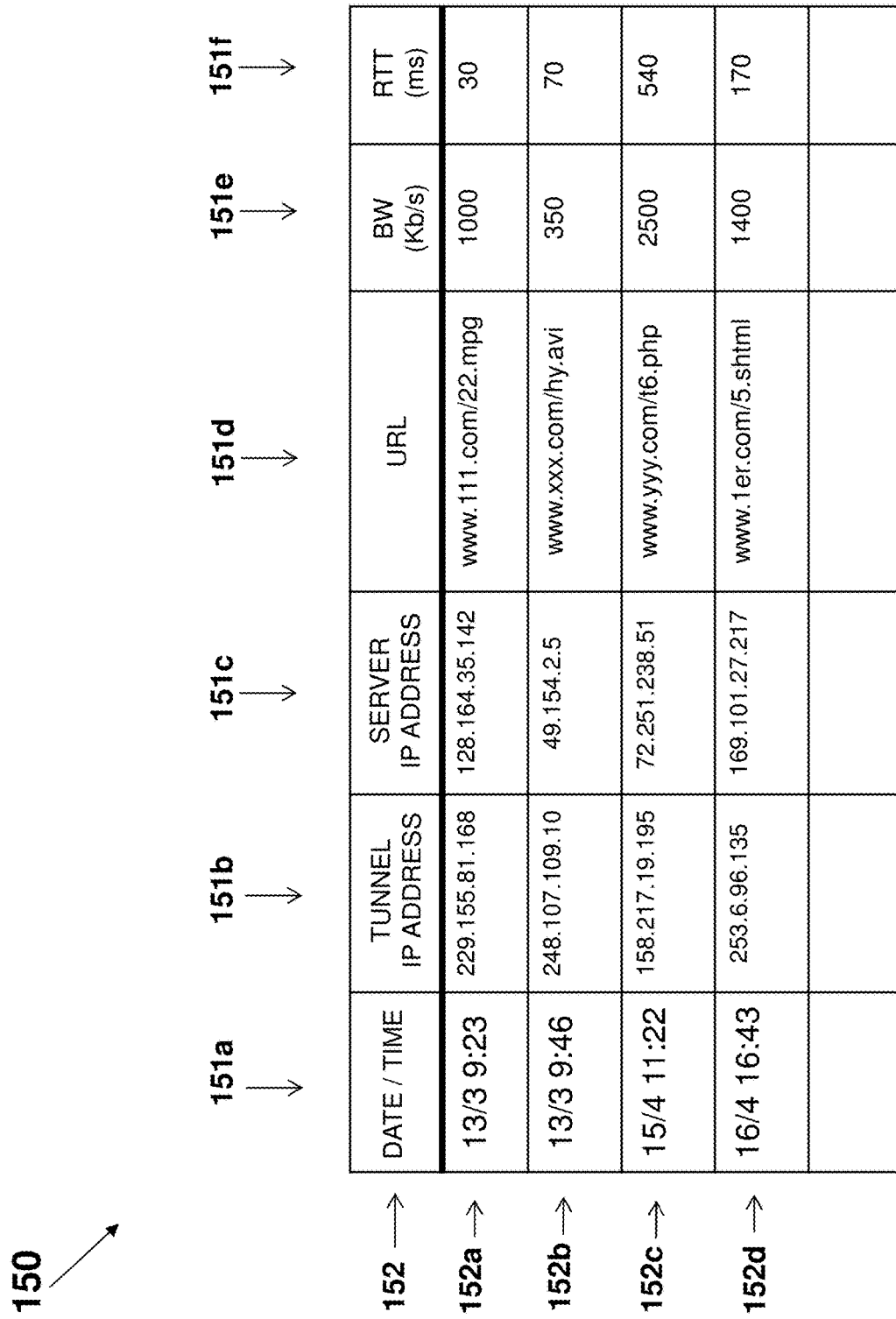
FIG. 15 illustrates schematically a table of a log of transactions of a client.
Figure 15A:
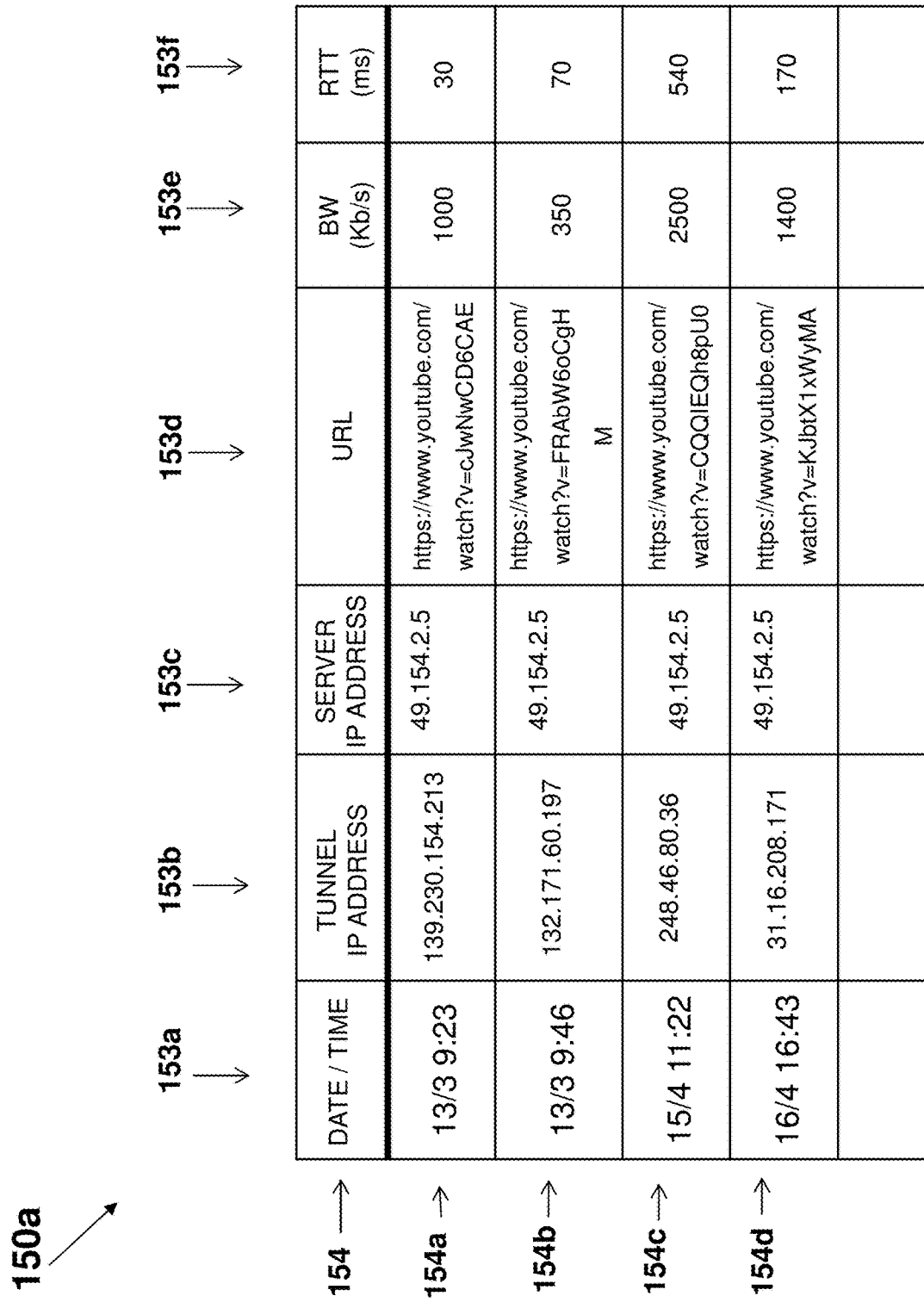
FIG. 15a illustrates schematically a table of a log of transactions of a client relating to content fetching from a single data server.

Similar to table 150 shown in FIG. 15, a table 150a shown in FIG. 15a shows a table relating to four tunnel devices used for fetching different content from the same data server (such as the data server #1 22a), thus the same server IP address is shown in the third column 153c. The IP addresses the tunnel devices are shown in the second column 153b, the URL fetched is shown in the fourth column 153d, the date and time of the transaction are logged in the first column 153a, the BW is shown in the fifth column 153e, and the measured RTT is shown in the sixth column 153f. The first transaction (logged in a first row 154a) is using a first tunnel device having IP address of 139.230.154.213, the second transaction (logged in a second row 154b) is using a second tunnel device having IP address of 132.171.60.197, the third transaction (logged in a third row 154c) is using a third tunnel device having IP address of 248.46.80.36, and the fourth transaction (logged in a fourth row 154d) is using a fourth tunnel device having IP address of 31.16.208.171.

The tunnel devices to be used when content is to be fetched from a data server (such as the data server 22a) may be selected by a client device (such as the client device #1 31a) in the 'Select Tunnel' step 62c in the flowchart 60, or in the 'Select Tunnels' step 101b in the flowchart 100. Alternatively or in addition, the tunnel devices may be selected by the acceleration server 32, as part of the 'Select Tunnels' step 101a in the flowchart 90. The selection may be based on a past performance of the tunnel devices, such as information relating to former transactions involving these tunnel devices. In one example, the transactions log may be used to evaluate and select which tunnel devices to use in a specific transaction to be executed, or in multiple transactions.

In the example of the transaction log table 150a shown in FIG. 15a and relating to a client device, the client device may need to fetch content from the same data server shown in the table 150a (having an IP address of 49.154.2.5), and thus may use the table content as an indication of the performance of the various tunnel devices. In one example, the criterion to select a single tunnel device to be used for fetching content from the data server may be based on having higher BW, assuming that the higher BW has not changed and thus will result in faster content fetching, and hence the tunnel device used in the third logged transaction (having an IP address of 248.46.80.36) will be selected for this transaction, having the highest recorded BW of 2500 Kb/s. In the case two tunnel devices are to be selected, the second tunnel device to be selected is the tunnel device used in the fourth logged transaction (having an IP address of 31.16.208.171) will be selected for this transaction, being associated with the second highest BW in the table. Similarly, the tunnel device associated with the first logged transaction will be the next to be selected.

Alternatively or in addition, the criterion to select a single tunnel to be used for fetching content from the data server may be based on having lower RTT, assuming that the lower RTT has not changed and thus will result in faster content fetching, and hence the tunnel device used in the first logged transaction (having an IP address of 139.230.154.213) will be selected for this transaction, having the lowest recorded RTT of 30 ms. In the case two tunnel devices are to be selected, the second tunnel device to be selected is the tunnel device used in the second logged transaction (having an IP address of 132.171.60.197) will be selected for this transaction, being associated with the second lowest RTT in the table (70 ms). Similarly, the tunnel device associated with the fourth logged transaction will be the next to be selected.

Alternatively or in addition, both the RTT and the BW are used as criteria for selecting tunnel devices. In one example, the expected total latency is calculated, based on both the former BW and the former RTT, and the tunnel device offering the lowest estimated total latency will be selected. In one example, assuming the content to be fetched is estimated (or known to be) having the size of 100 Kb (100 kilobits). The tunnel device used in the first logged transaction (in the first row 154a) is associated with past performance (with the same data server) of BW=1000 Kb/s and RTT=30 ms. In such a case, the total latency is calculated and estimated as 30+100/1000=130 ms. The tunnel device used in the second logged transaction (in the second row 154b) is associated with past performance (with the same data server) of BW=350 Kb/s and RTT=70 ms, and thus the total latency is calculated and estimated as 70+100/350=355.7 ms. Similarly, the estimated total latency of using the tunnel device used in the third logged transaction (in the third row 154c) is 580 ms, and the estimated total latency of using the tunnel device used in the fourth logged transaction (in the fourth row 154d) is 241.4 ms. Having the lowest estimated total latency, the tunnel device used in the first logged transaction (in the first row 154a) will be selected first as having the lowest expected total latency, the tunnel device used in the fourth logged transaction (in the fourth row 154d) will be selected second, the tunnel device used in the second logged transaction (in the second row 154b) will be selected third, and the tunnel device used in the third logged transaction (in the third row 154c) will be selected last.

However, assuming the content to be fetched is estimated (or known to be) having the size of 1000 Kb (1000 kilobits=1 Mb). The tunnel device used in the first logged transaction (in the first row 154a) is associated with past performance (with the same data server) of BW=1000 Kb/s and RTT=30 ms. In such a case, the total latency is calculated and estimated as 30+1000/1000=1030 ms (1.03 s). The tunnel device used in the second logged transaction (in the second row 154b) is associated with past performance (with the same data server) of BW=350 Kb/s and RTT=70 ms, and thus the total latency is calculated and estimated as 70+1000/350=2927.1 ms. Similarly, the estimated total latency of using the tunnel device used in the third logged transaction (in the third row 154c) is 940 ms, and the estimated total latency of using the tunnel device used in the fourth logged transaction (in the fourth row 154d) is 884.2 ms. Having the lowest estimated total latency, the tunnel device used in the fourth logged transaction (in the fourth row 154d) will be selected first as having the lowest expected total latency, the tunnel device used in the third logged transaction (in the third row 154c) will be selected second, the tunnel device used in the first logged transaction (in the first row 154a) will be selected third, and the tunnel device used in the second logged transaction (in the second row 154b) will be selected last.

Figure 16:
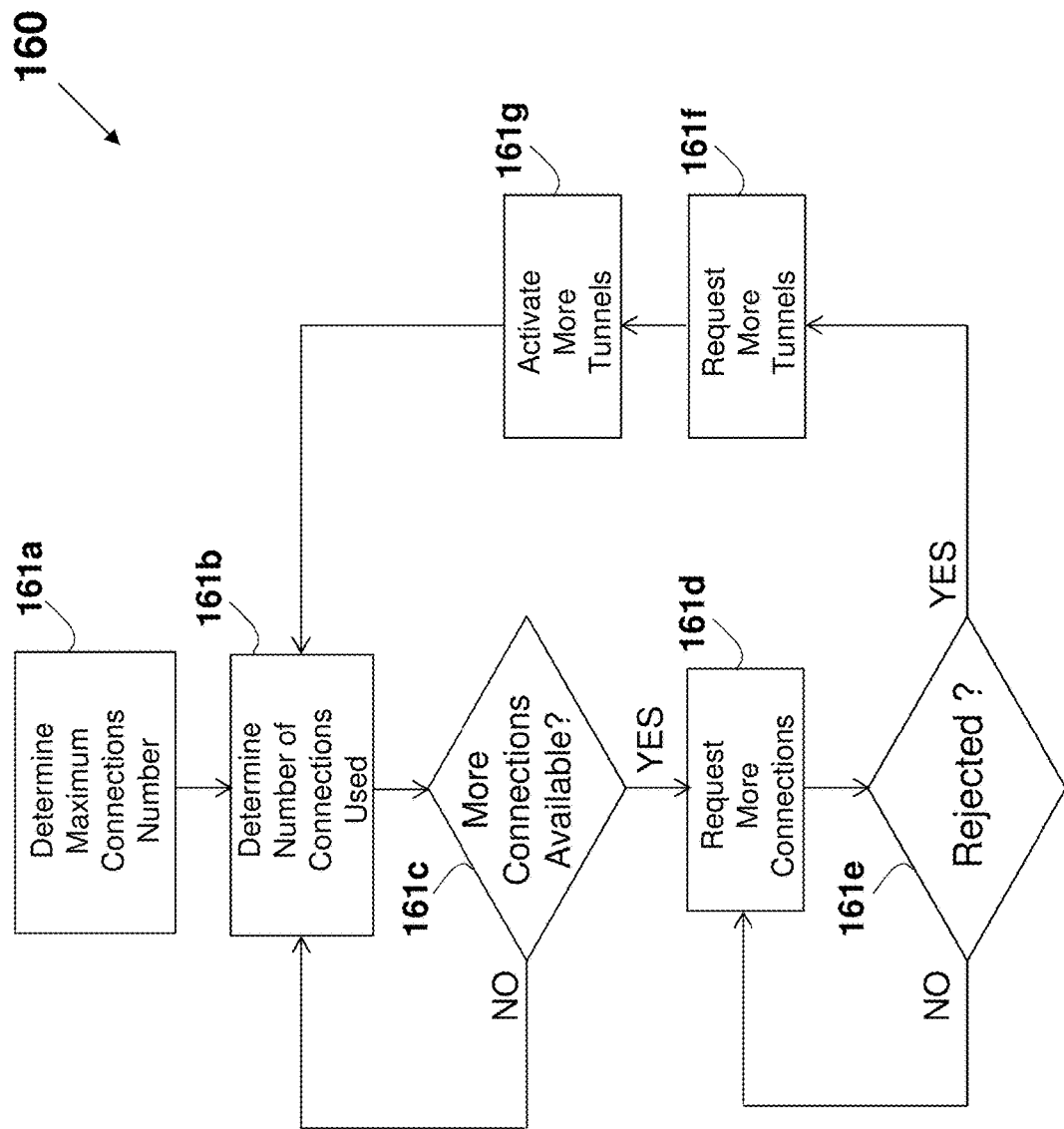
FIG. 16 illustrates schematically a simplified flowchart of managing a number of connections to a server by a client device.

The flowchart 74 in FIG. 7a describes a method to be executed by a tunnel device, such as the tunnel device #1 33a (or any other network element), for independently increasing the number of connections to a data server (such as the data server #1 22a), in order to allow faster fetching of content from the data server. Alternatively or in addition, the client device may manage the number of connections used per tunnel device, as described in a flowchart 160 shown in FIG. 16, which describes a method that may be executed by a client device, such as the client device #1 31a (or any other network), in element order to set more connection to the data server. The maximum number of connections available to the data server is determined in a 'Determine Maximum Connections Number' step 161a. This maximum value may be obtained from previous interactions with this data server, received from a tunnel device in a 'Notify Client' step 74c in the flowchart 74, or using a known default number. The actual number of connections that are in use at a specific time is determined in a 'Determine Number of Connections Used' step 161b. The actual connections used for each tunnel device may be obtained, for example, from the tunnel devices. In one example, more connection may be used, as checked in a 'More Connections Available?' step 161c. For example, the data server may provide up to 8 connections per tunnel device, while one of tunnel devices only uses 5 connections. In such a case, the client device may send a request to this tunnel device to increase the number of connections, for example by adding a single connection, as part of a 'Request More Connections' step 161d. In the case where the request for adding one or more connections is successful, as checked in a 'Rejected ?' step 161e, the device may repeat the request for additional connections. However, in one example, no additional connections may be opened, since the tunnel device has reached the maximum number of allowable connections with the data server. If no additional connections are to be opened, the client device may increase the effective bandwidth of content fetching from the data server by requesting the usage of more tunnel devices from an acceleration server (such as the acceleration server 32) as part of a 'Request More Tunnels' step 161f, corresponding to the 'Request Tunnels List' step 62a in the flowchart 60, followed by activating selected tunnel devices from the received tunnel devices list received from the acceleration server 32, as part of an 'Activate More Tunnels' step 161g, corresponding to the 'Content Fetch' flowchart 65. The client device may further repeat the process for maximizing the number of connections for the newly activated tunnel devices.

Web analysis is used by many web sites in order to measure the usage statistics, such as counting of web pages views, checking an average time between various web pages, and other usage statistics ('usage stats'). In many cases, the web analysis is based on embedding a code in the web-browser, which sends an update or request to an analytics server, such as Google Analytics Server, which is used to measure and log the required web analysis. A flowchart 170 shown in FIG. 17 describes the scheme of interacting with the analytics server. An application, such as a web browser, may identify a content (such as by a URL) to be fetched via the Internet in a 'URL Identified' step 171a. Alternatively or in addition, the content may be identified by the IP of the data server, or using any other identification. Before accessing the URL-associated data server for fetching the required content, the application first sends information to the analytics server for logging and gathering statistics, in an 'Update Analytics Server' step 171b. The applications then waits until the update is completed, as acknowledged by receiving the analytics server response in an 'Analytics Server Response' step 171c. Only upon receiving the analytics server response, the application requests the content from the respective data server in a 'Request to Data Server' step 171d. The access to the analytics server, as described in the 'Update Analytics Server' step 171b and waiting for the server to respond in the 'Analytics Server Response' step 171c, consumes time and resources, and makes the process of fetching the required content slower.

Each of the analytic servers that are commonly used typically uses a unified response to an update request in the 'Analytics Server Response' step 171c. In one example, a database is built, including typical responses of analytic servers. Such information regarding typical responses may be obtained from previous interactions with analytic servers, either by the device executing the requesting application, or from other network elements.

Figure 17:
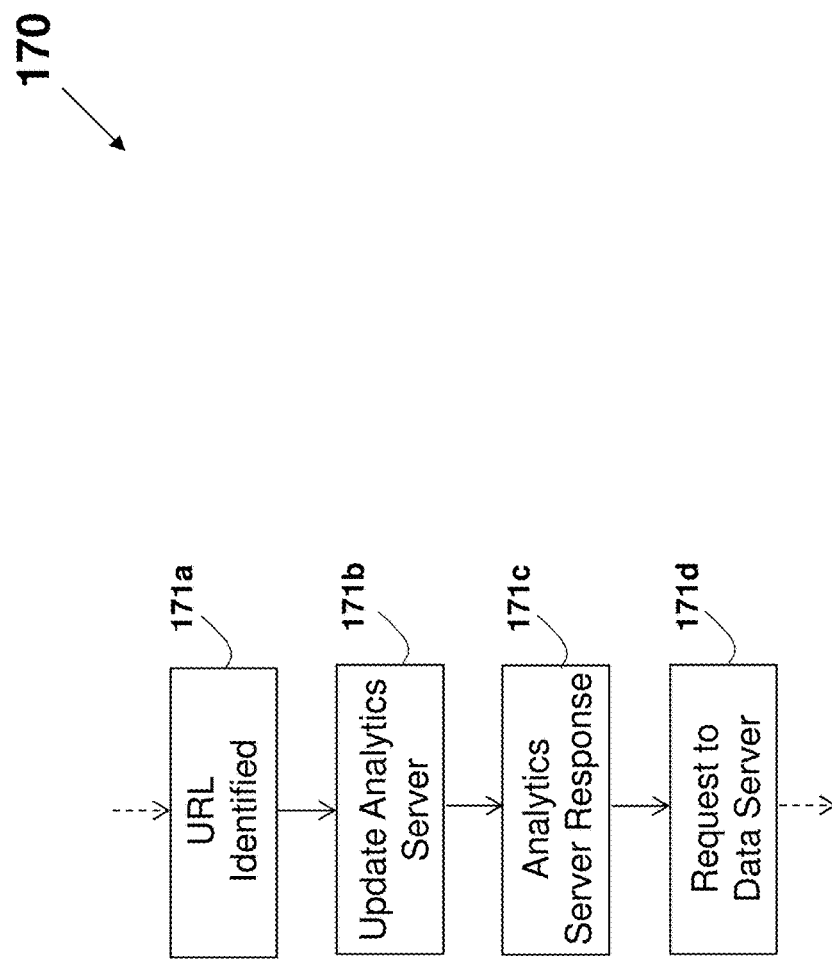
FIG. 17 illustrates schematically a simplified flowchart of an accessing of an analytics server.
Figure 17A:
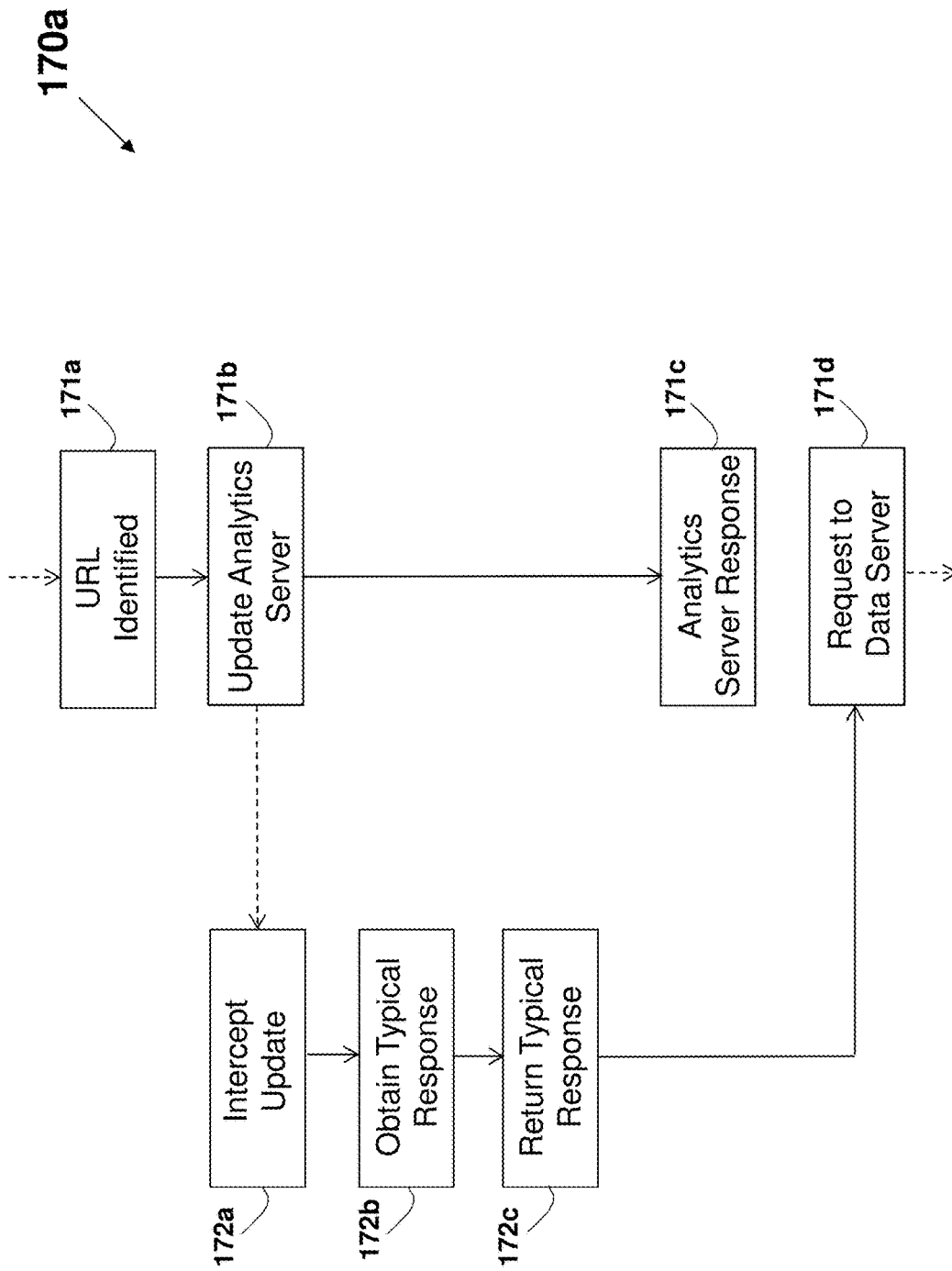
FIG. 17a illustrates schematically a simplified flowchart of an intercepting and simulating access to an analytics server.

The database containing the typical responses may be used to accelerate the flow of the requesting application, as described in a flowchart 170a shown in FIG. 17a, which corresponds to a flowchart 170 shown in FIG. 17. The Upon detecting a communication request targeting the analytics server as part of the 'Update Analytics Server' step 171b, the request is intercepted in an 'Intercept Update' step 172b. Such interception may be in the form of a filter driver (or any other intermediate driver), enabling the interception as part of the OS kernel. Alternatively or in addition, the interception may be in the form of an extension or a plug-in of the requesting application, such as a browser plug-in or a browser extension in the case where the application is a web browser. Alternatively or in addition, the interception of the request may use hooking of the requesting application or of the communication-related application. Alternatively or in addition, the application and the steps described herein may communicate using an Inter-Process Communication (IPC), such as a file sharing, a signal, a socket, a pipe, a message queue, a shared memory, a semaphore, or memory mapped file. In Windows environment, the IPC may be based on a clipboard, a Component Object Model (COM), a data copy, a DDE protocol, or mailslots.

The typical response database is used as a look-up table, associating to the update request intercepted a simulated artificial typical response, that is expected to be the same or similar to the response expected from the analytics server, as part of an 'Obtain Typical Response' step 172b. The artificial response is then returned to the requesting application, in a 'Return Typical Response' step 172c, so the requesting application may continue its operation in the 'Request to Data Server' step 171d, without the need to wait first for the actual response from the analytics server as part of the 'Analytics Server Response' step 171c. In such a scheme, the latency involved with waiting to the analytics server response is obviated.

The actual response received from the analytics server as part of the 'Analytics Server Response' step 171c may be ignored in general, and in particular by the requesting application, as it was substituted by the simulated response in the 'Return Typical Response' step 172c. Alternatively or in addition, the response is stored as part of the typical response database, to be used for forming simulated responses in future interactions with the same analytics server. Further, in order to save resources such as bandwidth and processing power, the update request to the analytics server may not be actually transmitted, and replaced only with the simulated response. Alternatively or in addition, such update request may be stored and transmitted at a later stage, for example, when the network element is idle.

Figure 18:
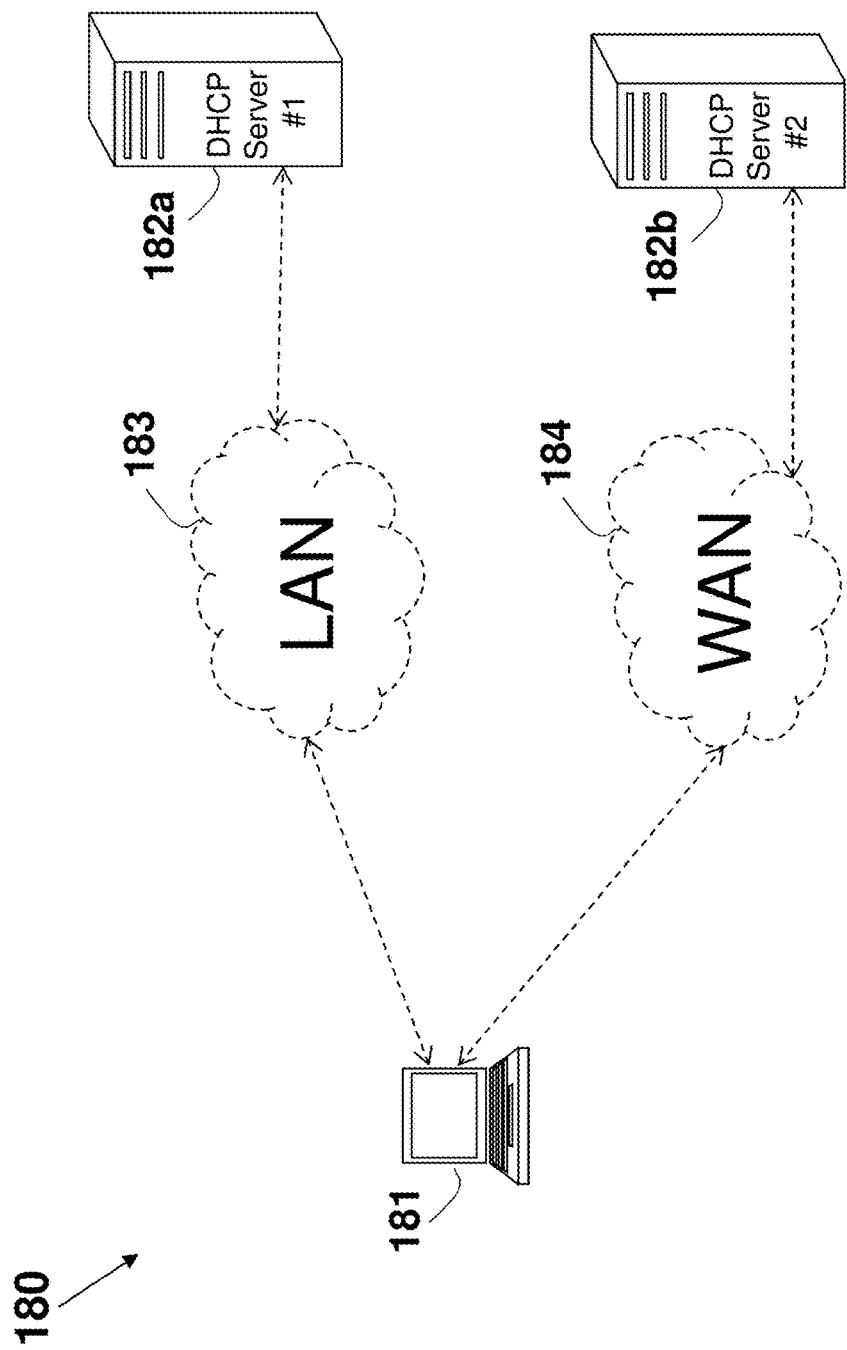
FIG. 18 depicts schematically a computerized device accessing DHCP servers.

The elements involved in a DHCP process are illustrated in a system 180 shown in FIG. 18. A device 181 (which may be any network element) may connect to a DHCP server #1 182a via a LAN 183, or may use a DHCP server #2 182b connected via a WAN 184. Typically, a DHCP process is completed in less than 5 milliseconds (ms) when communicating over the LAN 183, such as LAN 183, and is completed in less than 20 ms when communicating with the DHCP server #2 182b over the WAN 184. The DHCP process performed by the device 181 is described as a flowchart 180a in FIG. 18a. Upon sending to the DHCP server (such as DHCP server #1 182a or DHCP server #2 182b) a DHCP request in a 'Send DHCP Request' step 185a, the device 181 starts a timer #1 in a 'Start Timer #1) step 185b. Commonly, such a countdown timer is set to 5 seconds, notifying a timeout period after the 5 seconds expire. In a 'Response Received ?' step 185c, it is checked if a response was received, and the DHCP has been completed, so that the device may continue other activities, as part of a 'Return Response' step 185d. The device 181 checks continuously and waits for a response from a DHCP server for completing the DHCP process as long as the timer #1 has not expired in a 'Timer #1 Expired ?' step 185*e*. In the case where the timer #1 has expired, and no connection was made with the DHCP server or the DHCP has not been completed, then a failure of the DHCP process is declared in a "Return 'No Response'" step 185*f*.

While the common DHCP resolving period is under 5 ms in a LAN environment, and under 20 ms in a WAN environment, the timer #1 typical setting is of 5 seconds (or any other number of seconds), which is many orders of magnitude longer than required. Further, in some case a short or an intermittent communication problem, may cause a transiently drop of a packet, causing the DHCP process to fail and not be completed. Such failure will be detected only after the full 5 seconds has been expired, leading to a long delay in responding to, and fixing the problem (e.g, by repeating the DHCP process).

Figure 18A:
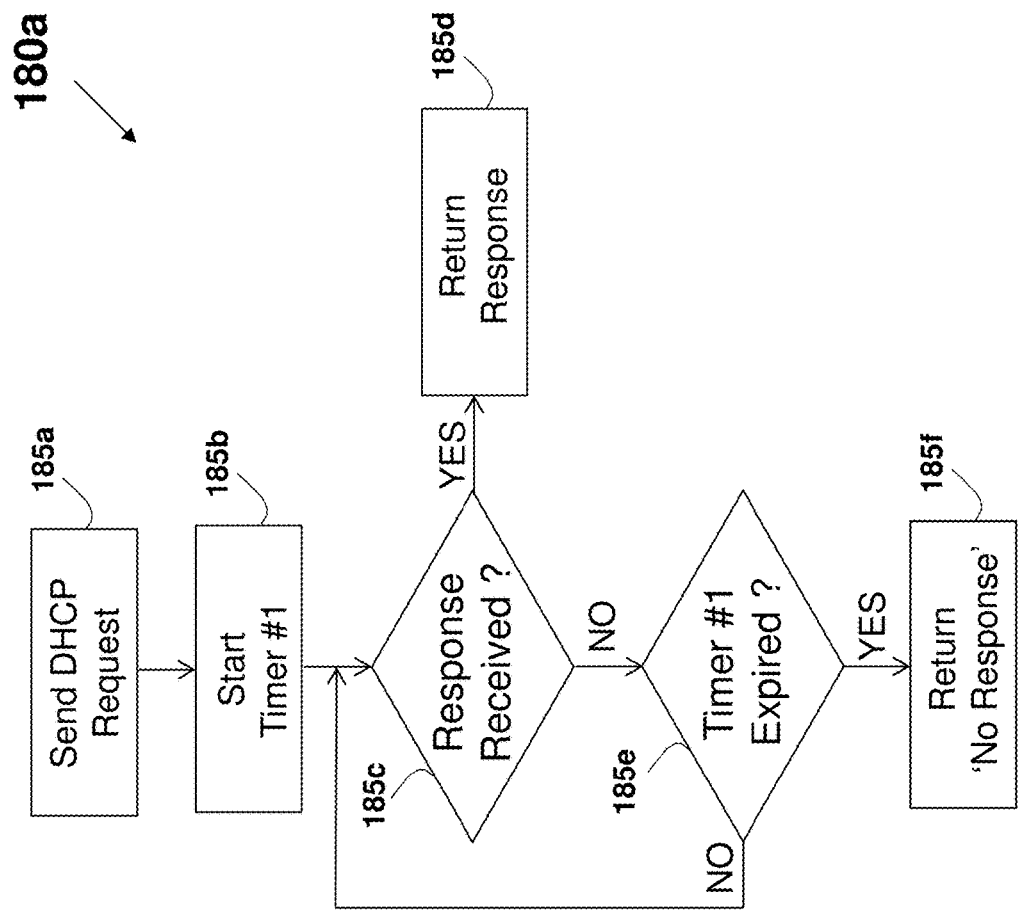
FIG. 18a illustrates schematically a simplified flowchart of accessing of a DHCP server.
Figure 19:
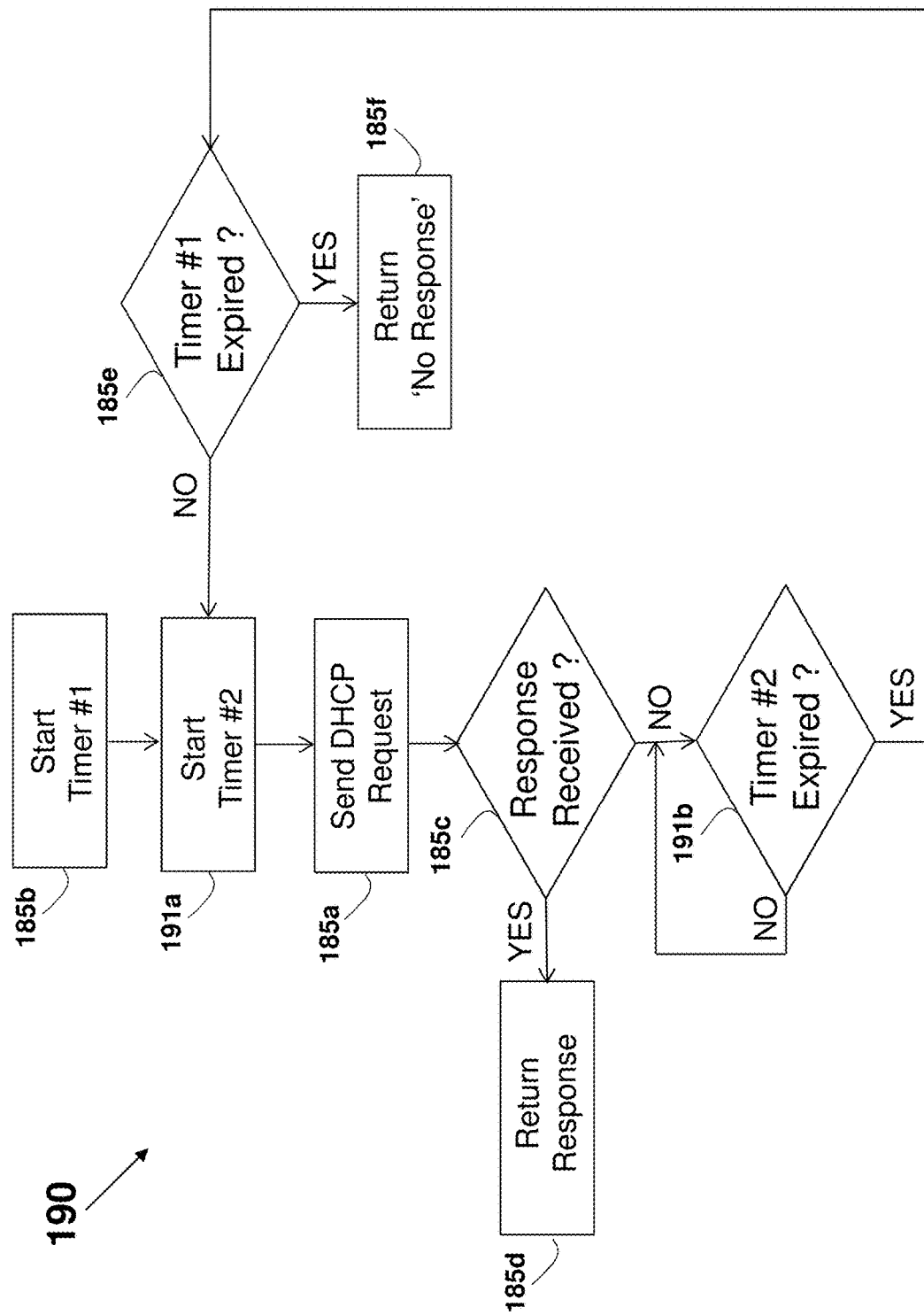
FIG. 19 illustrates schematically a simplified flowchart of improving an accessing of a DHCP server.

An improved DHCP timing scheme is shown as a flowchart 190 in FIG. 19, which may be executed by the device 181, and is based on the flowchart 180*a* in FIG. 18*a*. In addition to the prior-art timer #1 that is commonly set for a few seconds, an additional timer #2 is added, which is set to a much lower period, such as 100 or 200 ms, which allows for faster reconnection in case of a failure. The timer #2 starts with a 'Start Timer #2' step 191*a*. In the case the timer #2 expires before a successful DHCP process is completed, as checked in a 'Timer #2 Expired ?' step 191*b*, and as long as the timer #1 has not expired, the timer #2 is restarted in the 'Start Timer #2' step 191*a*, and the DHCP process is re-initialized in the 'Send DHCP Request' step 185*a*. Hence, in the case of a brief communication problem, the DHCP process initialization will be repeated, and as such will be recovered and completed in one of the cycles. In the case of a dysfunctional DHCP server, the problem will still be determined after timer #1 expiration, as in the prior-art scheme.

Figure 20:
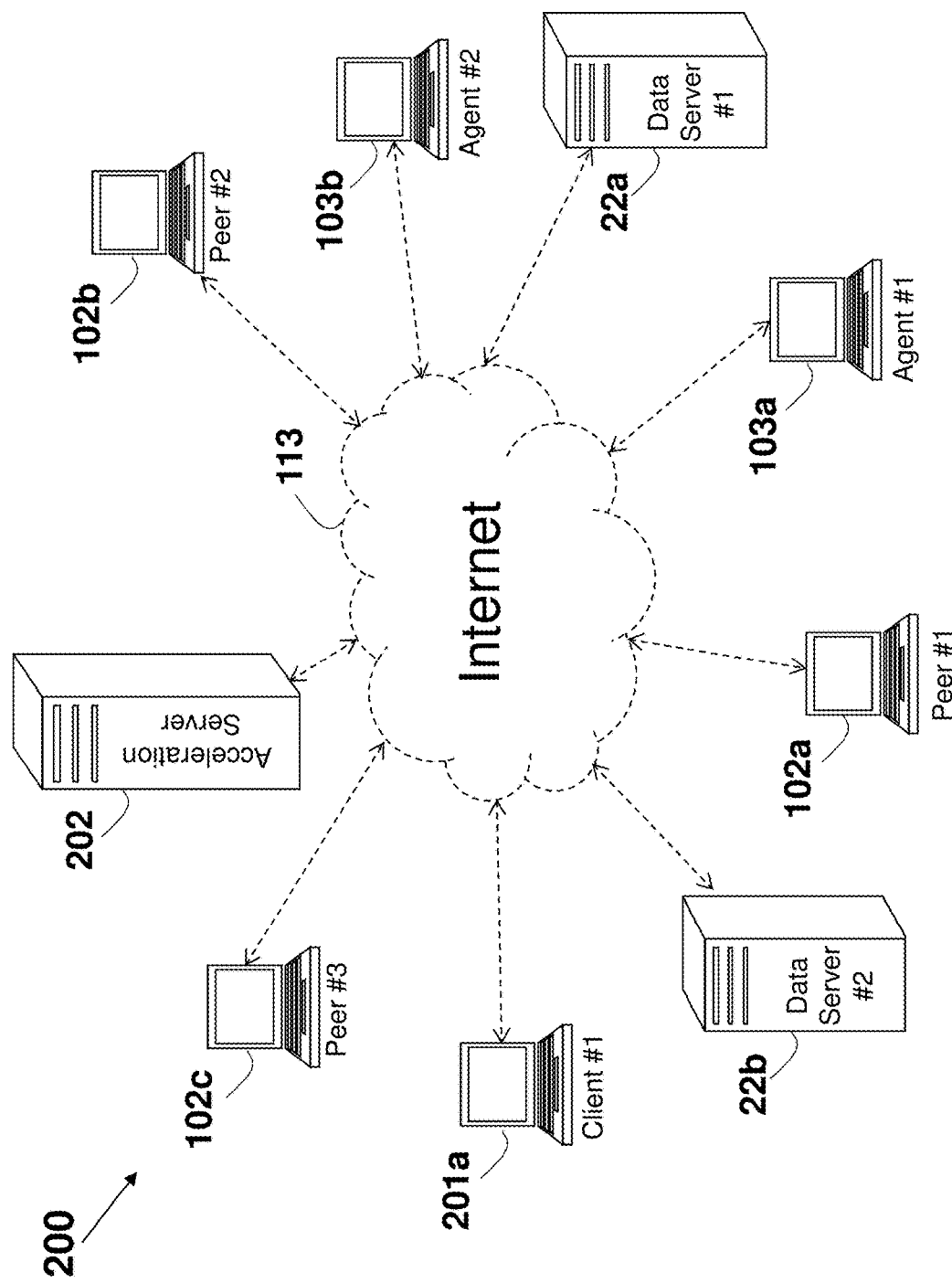
FIG. 20 depicts schematically client devices, agent devices, peer devices, and server devices connected to the Internet.

In one example, accessing a data server is improved by using an intermediate device referred to as 'peer' and 'agent' devices, respectfully executing a 'peer' and 'agent' flowchart. FIG. 20 shows a system 200 including a client device 201*a*, which may be the same device as the client device #1 31*a* described above or a distinct device, that may access the data servers 22*a* and 22*b* using one or more of the peer device #1 102*a*, the peer device #2 102*b*, and the peer device #3 102*c*, under the management and control of the acceleration server 202, and using agent devices such as the agent device #1 103*a* and the agent device #2 103*b*. The acceleration server 202 may be the same server as the acceleration server 32 in the system 30 described above, or may be a distinct or a dedicated server. Similarly, a data server, such as the data server #1 22*a* or data server #2 22*b*, may be the same as the same servers described above in system 30, or may be distinct or dedicated servers. While two agent devices are shown, any number of agent devices may be used. Similarly, while three peer devices are shown, any number of peer devices may be used.

The content stored in a data server, such as the data server #1 22*a*, which may be requested by a client device such as the client device #1 201*a*, may be partitioned into multiple parts or 'slices'. Any number of slices may be used. The slicing may be in a bit, nibble (4-bits), byte (8-bits), word (multiple bytes), character, string, or file level. For example, in a case wherein the content includes 240 bytes designated byte #1 to byte #240, using a byte level partitioning into two slices results in a first slice (slice #1) including byte #1 to byte #120, and a second slice (slice #2) including byte #121 to byte #240. In the case of byte-level partitioning into three slices (referred as slice #1, slice #2, and slice #3), a first slice (slice #1) may be including byte #1 to byte #80, a second slice (slice #2) may be including byte #81 to byte #160, and a third slice (slice #3) may be including byte #161 to byte #240. Similarly, in a case wherein the content include 3 bytes designated byte #1 to byte #3 representing 24 bits, using a bit-level partitioning into four slices results in a slice #1 including the first 6 bits, slice #2 including the next 6 bits, slice #3 including the next 6 bits, and slice #4 including the last 6 bits. The partition may be into equal length parts. Alternatively or in addition, a different length slicing may be applied. For example, in the case of a 240 bytes content and using byte-level partitioning into three slices (referred as slice #1, slice #2, and slice #3), a first slice (slice #1) may be including byte #1 to byte #20 (20-byte length), a second slice (slice #2) may be including byte #21 to byte #100 (80-byte length), and a third slice (slice #3) may be including byte #101 to byte #240 (140-byte length). In one example, the content itself is made of inherent or identifiable parts or segments, and the partition may make use of these parts. In one example, the content may be a website content composed of multiple webpages, and thus the partition may be such that each slice includes one (or few) webpages. Further, the partitioning may be sequential or non-sequential in the content.

The partitioning may be non-overlapping, wherein each slice includes a distinct part of the content, as exampled above in the case wherein the content includes 240 bytes designated byte #1 to byte #240, where using a byte level partitioning into three slices (referred as slice #1, slice #2, and slice #3), results in a first slice (slice #1) including byte #1 to byte #80, a second slice (slice #2) including byte #81 to byte #160, and a third slice (slice #3) including byte #161 to byte #240. Alternatively or in addition, an overlapping partitioning may be applied, where the same part of the content is included in multiple slices. For example, in a case above where the content includes 240 bytes designated byte #1 to byte #240, and using a byte level partitioning into three slices (referred as slice #1, slice #2, and slice #3), a first slice (slice #1) may include byte #1 to byte #160, a second slice (slice #2) may include byte #81 to byte #240, and a third slice (slice #3) may include byte #1 to byte #80 in addition to byte #161 to byte #240. In such a case, byte #1 to byte #80 are part of both slice #1 and slice #3, byte #81 to byte #160 are part of both slice #1 and slice #2, and byte #161 to byte #240 are part of both slice #2 and slice #3. It is noted that in such a partition, the content may be fully reconstructed from any two of the slices, hence providing a degree of redundancy. For example, in case of carrying the three slices over the Internet and a failure to receive one of the slices, the remaining two slices may be used to fully reconstruct the whole content.

In one example, the content is a website or a webpage, or may be identified as a URL, and consists of, or comprises, non-overlapping and equally-sized parts, referred to as chunks. For example, multiple chunks may be combined to reconstruct the original content, such as website or content. A chunk size may be 16 KB (Kilo-Bytes), and in the case the content to be partitioned is not an exact multiple of 16 KB, the 'last' chunk will padded and filled with 'space' characters (or any other no content data).

Figure 21:
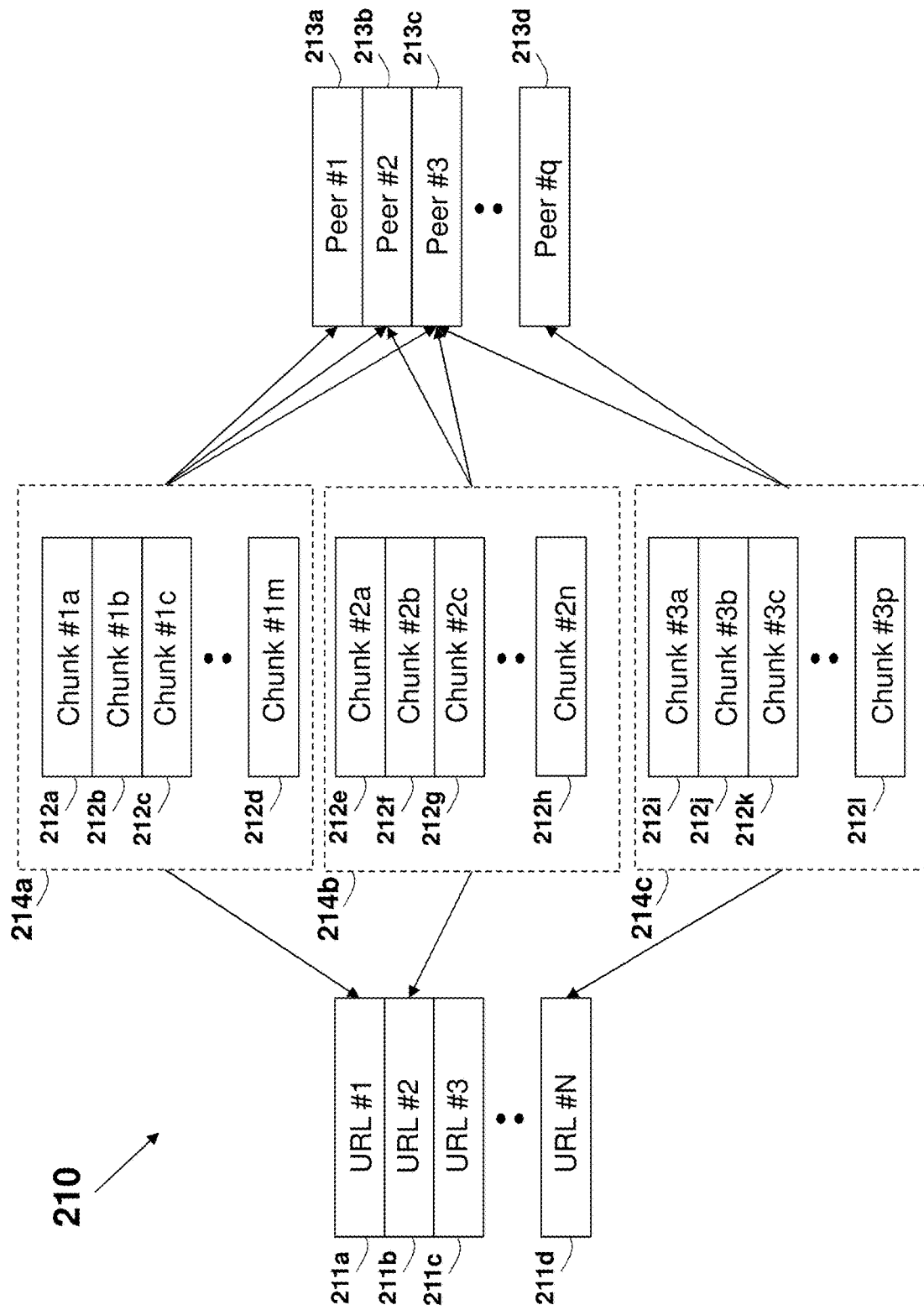
FIG. 21 depicts schematically the relations of chunks relating to URLs and peer devices.

For example, multiple chunks may be combined to reconstruct the original content, such as website or content, as schematically shown in an arrangement 210 shown in FIG. 21. The data servers may include content addressed by various IP addresses or URLs, such as URL #1 211*a*, URL

2 211b, URL #3 211c, and URL #N 211d. While exampled using URLs, any other type of content may equally apply. Each URL may be associated with the URL associated HTTP headers. A content of the URL #1 211a consists of multiple chunks stack 214a consisting of m chunks, designated chunk #1a 212a, chunk #1b 212b, chunk #1c 212c, up to chunk #1m 212d. Similarly, a content of the URL #2 211b consists of multiple chunks stack 214b consisting of n chunks (n=m or n m), designated chunk #2a 212e, chunk #2b 212f, chunk #2c 212g, up to chunk #2n 212h, and a content of the URL #N 211d consists of multiple chunks stack 214c consisting of n chunks (p=m, p=n, p n or p m), designated chunk #3a 212i, chunk #3b 212j, chunk #3c 212k, up to chunk #3p 212l. Similarly, the URL #3 211c may be partitioned into chunks (not shown).

Each of the content in the chunks is identified by a chunk identifier, where each chunk identifier is associated with one, and only one, chunk. In one example, preferably used in sequential partitioning scheme, a chunk is identified by the identifier of the content and the location of the chunk in the sequence of the partitioning. For example, a chunk may be identified by the content (e.g., URL, web-site, or web-page), and a number such as the number '23', meaning that this chunk is the $23^{rd}$ slice in sequential partitioning of the content. Alternatively or in addition, the CRC of the content of the chunk is calculated, and used as the chunk identifier. For example, CRC-32 may be used, allowing each chunk (such as 16 KB size) to be identified by 33-bit identifier. Alternatively or in addition, a chunk identifier is based on a hash function of the chunk content.

Figure 21A:
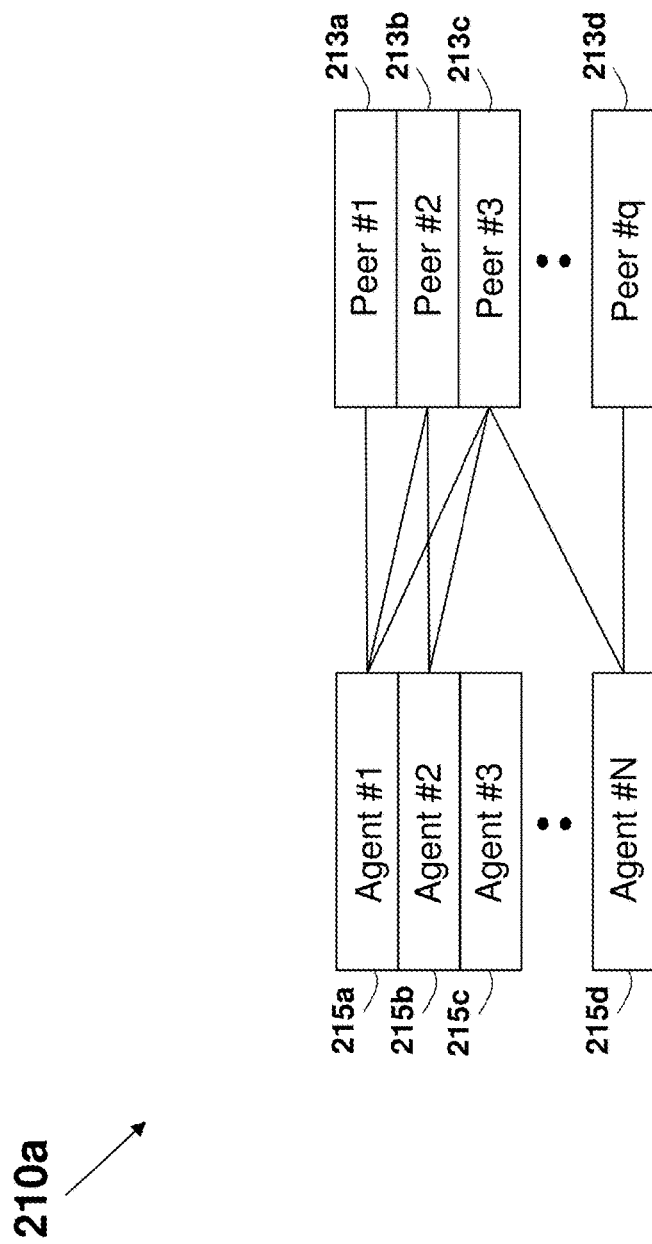
FIG. 21a depicts schematically the relations of content in peer devices to content in agent devices.

A peer device may include a part of, or the entire stack of a single URL. Alternatively or in addition, a peer device may include a part of, or the entire stack of multiple URLs. In one example, a peer device may store all of the chunks included in a URL (or any other content). As shown in the arrangement 210, the peer device #1 213a stores the stack 214a of the entire chunks relating to the single URL #1 211a, the peer device #2 213b stores the stacks of 2 URLs: The stack 214a of the URL #1 211a and the stack 214b of the URL #2 211b. Similarly, the peer device #3 213c stores the stacks of 3 URLs: The stack 214a of the URL #1 211a, the stack 214b of the URL #2 211b, and the stack 214c of the URL #N 211d. Similar to peer device #1 213a, the peer device #d 213q stores the stack 214c of the entire chunks relating to the single URL #N 211d. The agent devices serve as pointers to the peer devices, based on the requested content. As shown in an arrangement 210a in FIG. 21a, an agent device #1 215a stores information regarding the location of content relating to URL #1 211a, and thus stores the identifiers of the peer device #1 213a, the peer device #2 213b, and the peer device #3 213c, since all these peer devices store the content of URL #1 211a. An agent device #2 215b stores information regarding the location of content relating to URL #2 211b, and thus stores the identifiers of the peer device #2 213b and the peer device #3 213c, since these peer devices store the content of URL #2 211b. Similarly, an agent device #N 215d stores information regarding the location of content relating to URL #N 211d, and thus stores the identifiers of the peer device #q 213d and the peer device #3 213c, since these peer devices store the content of URL #N 211d. While exampled where each agent device stores information about a single URL, an agent device may equally store information regarding the location of multiple URLs.

A peer device, such as the peer device #1 102a, the peer device #2 102b, and the peer device #3 102c, may store one or more chunks (or any part of the entire content), as a copy of the chunk content as part of the whole content, stored as in a data server. The availability of such content or chunks may be the result of a past loading of the content in the chunk from the appropriate data server. Each of the chunk content is stored in a memory of the associated peer device, and the memory may be referred to herein as a cache memory. As shown in scheme 210b in FIG. 21b, the peer device #1 213a (corresponding for example to the peer device #1 102a) stores in its cache memory the chunk #1a 212a, the chunk #1b 212b, the chunk #2a 212e, and the chunk #2c 212g. Similarly, the peer device #2 213b (corresponding for example to the peer device #2 102b) stores in its cache memory the chunk #1b 212b, the chunk #1m 212d, the chunk #2b 212f, and the chunk #3a 212i; the peer device #3 213c (corresponding for example to the peer device #3 102c) stores in its cache memory the chunk #2b 212f, the chunk #2c 212g, and the chunk #2n 212h; and the peer device #q 213d stores in its cache memory the chunk #1m 212d, the chunk #2n 212h, the chunk #3b 212j, and the chunk #3p 212l. A chunk may not be associated with any peer device, such as the chunk #3c 212k, which is shown in scheme 210 as not being stored in any of the peer devices. Alternatively or in addition, a chunk may be stored in multiple peer devices, such as the chunk #1b 212b which is shown to be stored in both the peer device #1 213a and the peer device #2 213b. Further, a peer device may store chunks which are part of multiple URLs, such as peer #q 213d shown to store the chunk #1m 212d which is part of URL #1 211a, the chunk #2n 212h which is part of URL #2 211b, and the chunk #3b 212j which is part of URL #N 211d.

Figure 21C:
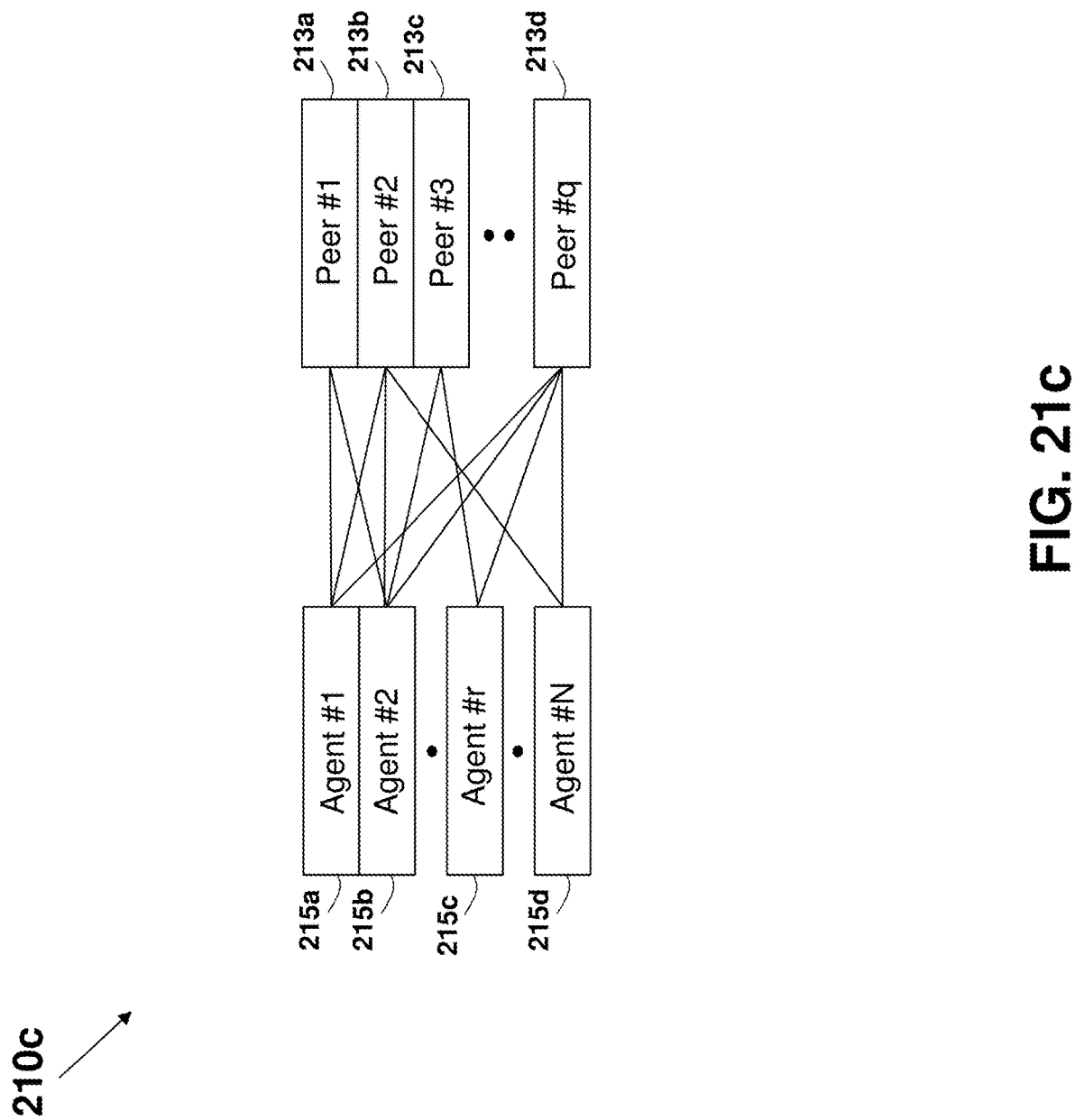
FIG. 21c depicts schematically the relations of content in peer devices to content in agent devices.

An agent device, such as the agent device #1 103a or the agent device #2 103b, may include a list of peers, for example peers that store chunks relating to, or retrieve from, the same data server or URL. In the example shown as a scheme 210c in FIG. 21c, the agent device #1 215a (corresponding for example to the agent device #1 103a) stores a list of chunks location of URL #1 211a, including the peer device #1 213a (storing Chunk #1a 212a and Chunk #1b 212b), the peer #2 213b (storing Chunk #1b 212b and Chunk #1m 212d), and the peer #3 213c (storing Chunk #1m 212d). Similarly, the agent device #2 215b (corresponding for example to the agent device #2 103b) stores a list of chunks location of URL #2 211b, including the peer device #1 213a (storing Chunk #2b 212f and Chunk #2c 212g), the peer device #2 213b (storing Chunk #2b 212f), the peer device #3 213c (storing Chunk #2b 212f, Chunk #2c 212g, and Chunk #2n 212h), and the peer device #q 213d (storing Chunk #2n 212h); and the agent devices #r 215c and Agent #N 215d, both storing a list of chunks location of URL #N 211d, both stores a list including the peer #2 213b (storing Chunk #3a 212i) and the peer device #q 213d (storing Chunk #3b 212j and Chunk #3p 212l). An agent may store an empty list having no peers. Further, a peer may not be stored in any agent. The peer and agent devices may be identified by their respective IP address, or by any other mechanism allowing addressing over the Internet.

In one example, accessing a data server may be obviated by accessing copies of the data server content stored as chunks in 'peer' devices, each executing a 'peer' flowchart. The peer devices for a content (such as a URL, web-page, web-site, or IP address) are identified by 'agent' devices, each executing an 'agent' flowchart.

Figure 23:
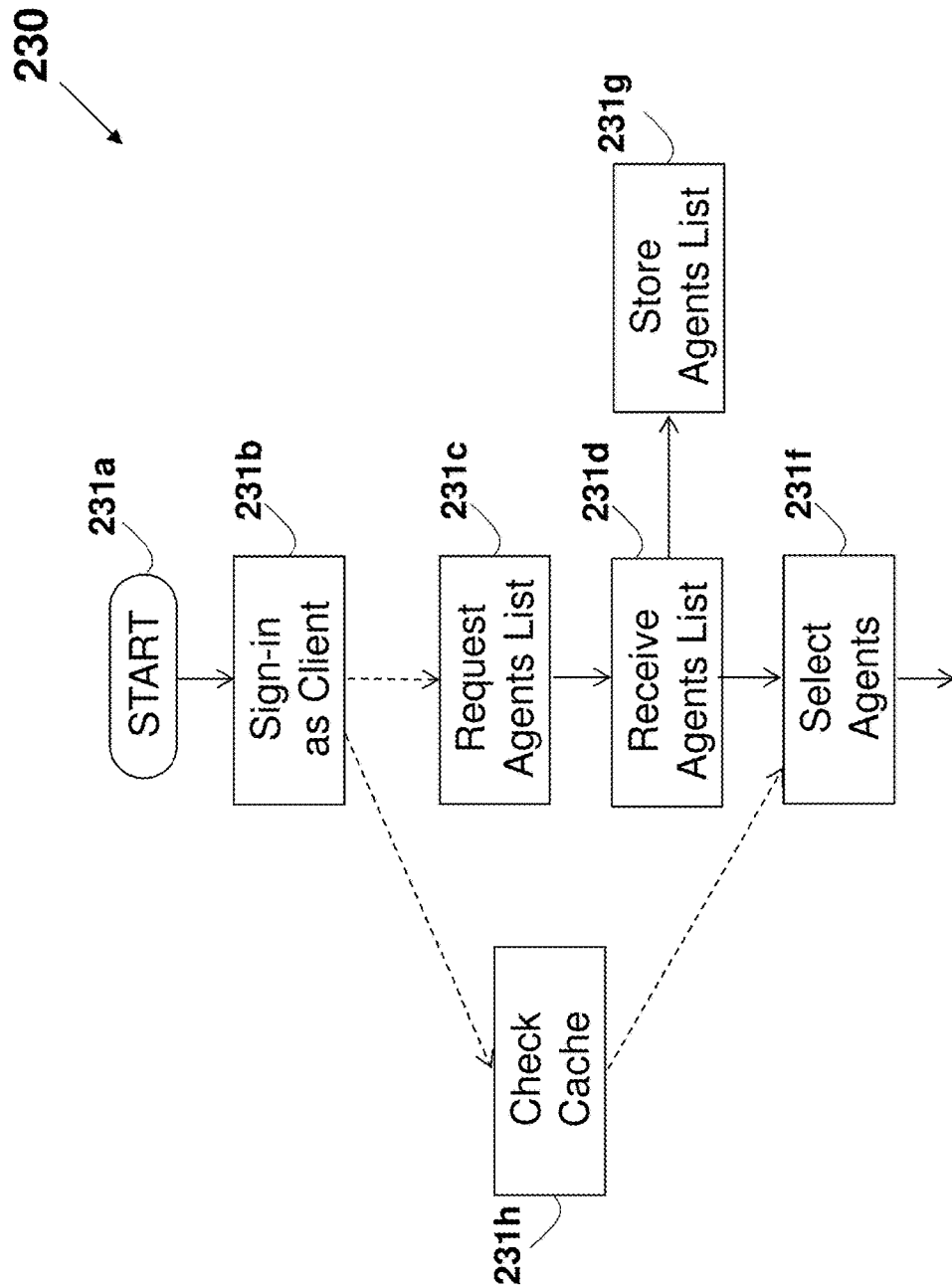
FIGS. 23, 23a, and 23b illustrate schematically a simplified flowchart relating to a client device using agent and peer devices.
Figure 25:
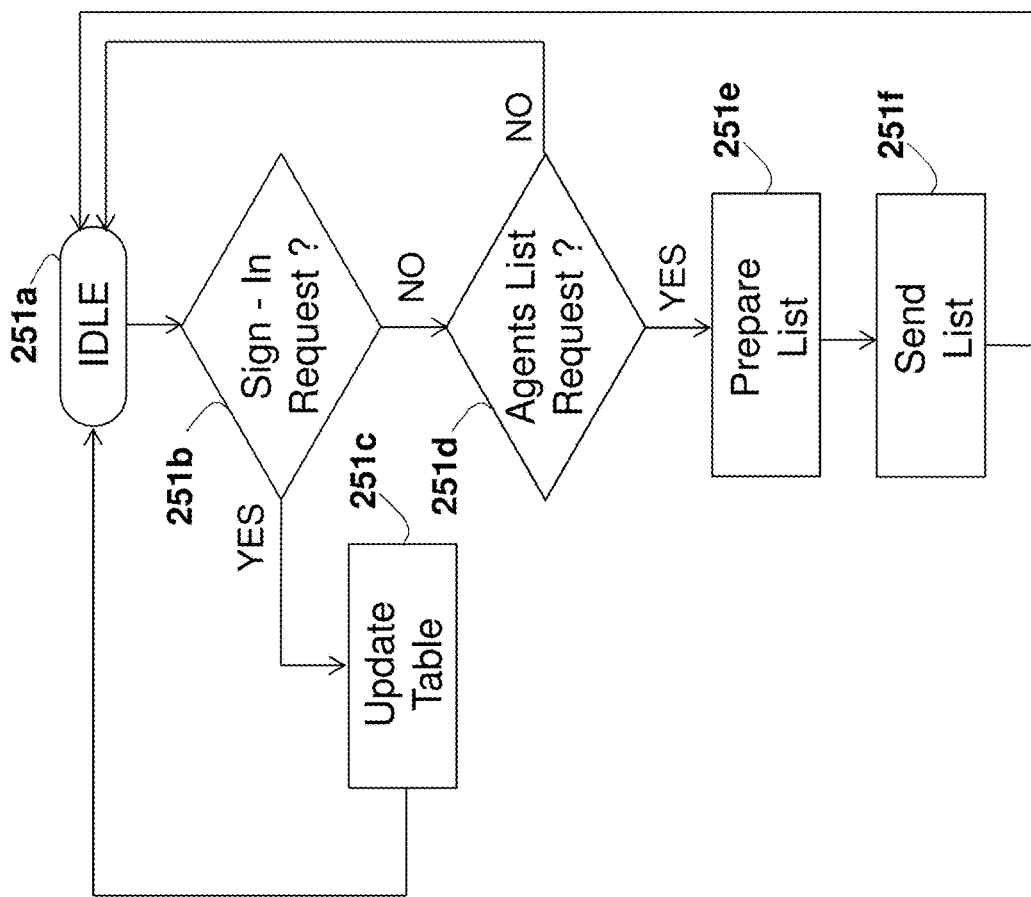
FIG. 25 illustrates schematically a simplified flowchart relating to an acceleration server in a peer and agent devices system.
Figure 25A:
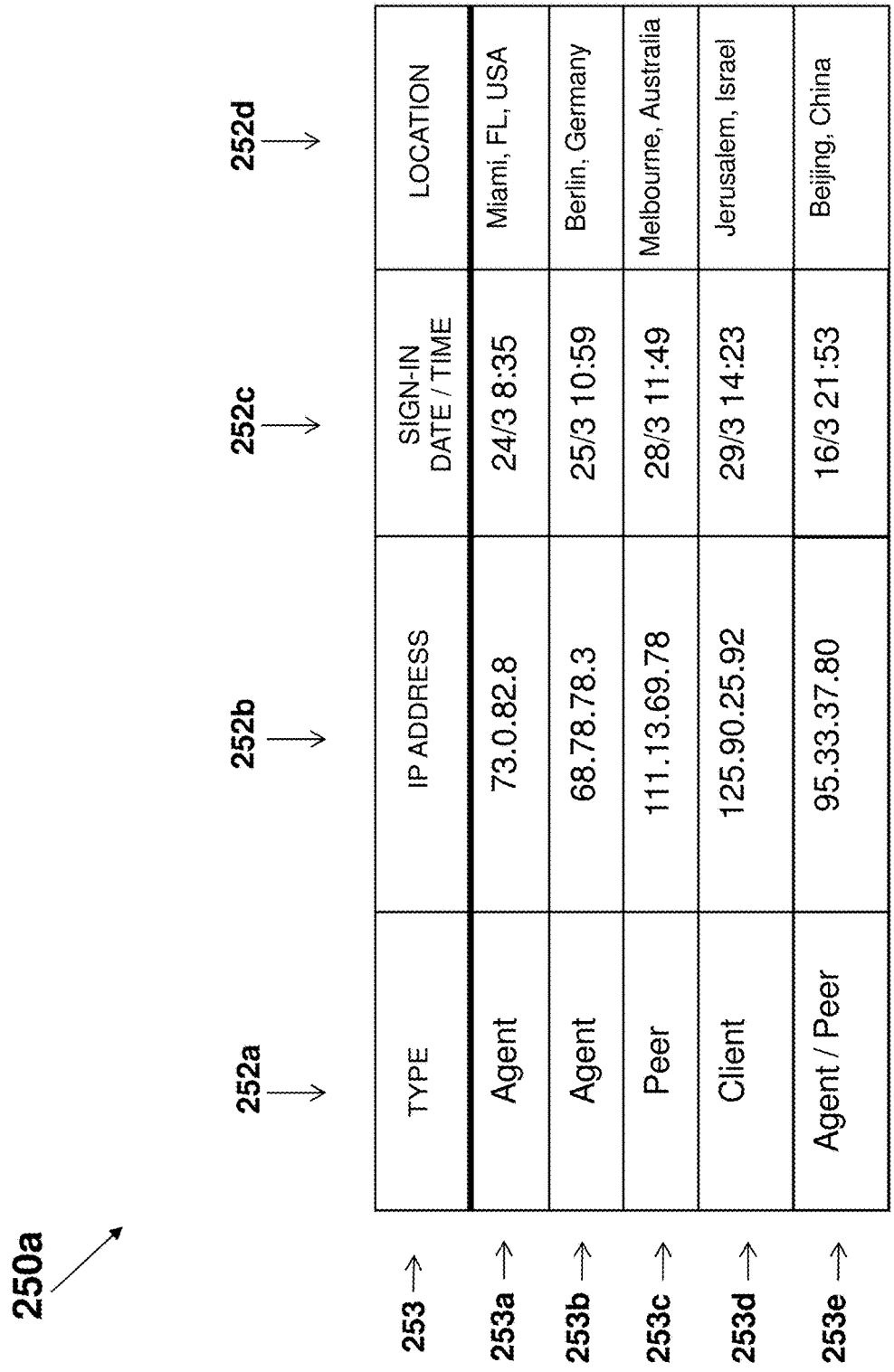
FIG. 25a illustrates schematically a table of data stored in an acceleration server.

The method of retrieving chunks from peer devices is described below, based on the database 250a shown in FIG. 25 describing the list stored in the acceleration server 202, a flowcharts 230, 230a, and 230b respectively shown in FIGS. 23, 23a, and 23b describing a client device (such as the client device #1 201a) operation, a flow chart 240 shown in FIG. 24 describing an agent device (such as the agent device #1 103a) operation, a flow chart 240a shown in FIG. 24a describing a peer device (such as the peer device #1 102a) operation, and a messaging and states timing chart 220 shown in FIG. 20. The chart 220 shows the messaging and related timing associated with the operation of the acceleration server 202 (corresponding to a dashed line 221a), a client device such as the client device #1 201a (corresponding to a dashed line 221b), an agent device such as the agent device #1 103a (corresponding to a dashed line 221c), and a peer device such as the peer device #1 102a (corresponding to a dashed line 221d). The flowchart 230a comprises a flowchart 239 relating to the chunks retrieving from peer devices. The database 250a shown in FIG. 25a is illustrated as a table, wherein a first column 252a (designated as 'TYPE') relates to a device functionality, such as a agent, peer, or client, a second column 252b (designated as 'IP ADDRESS') relates to the device IP address, a third column 252c (designated as 'SIGN-IN DATE/TIME') relates to the date (in DD/MM format) and the time (in HH:MM—Hour:Minute format) when the device signed in with the acceleration server, and a fourth column 252d, relating to the physical geographical location of the device. The top row 253 in the table refers to the field designations. The first 253a, second 253b, third 253c, fourth 253d, and fifth 253e rows in the table 250a respectively relate to first, second, third, fourth, and fifth devices that signed in with the acceleration server 202. For example, the device shown in the first row 253a has signed in as an agent device as shown in the first column 252a, on March 24 at 8:35 as shown in the third column 252c, and can be addressed over the Internet using the IP address 73.0.82.8 as shown in the second column 252b. Similarly, the device shown in the third row 253c has signed in as a peer device as shown in the column 252a, on March 28 at 11:49 as shown in the third column 252c, and can be addressed over the Internet using the IP address 111.13.69.78 as shown in the second column 252b.

As shown in the messaging and timing chart 220, the process starts upon initializing an agent application in an agent device, schematically shown as a 'START' step 224a in the chart 220, corresponding to the state 241a 'START' in chart 240. Such initialization may be executed upon the device powering up process, or upon a user request. Then the agent device #1 103a (as an example of an agent device) signs in with the acceleration server 202 in the 'Sign-in as Agent' step 241b, which corresponds to a message 'Sign In' 226a in the chart 220. The message comprises the device functionality as 'agent', and the agent device 103a identification on the Internet 113, such as its IP address (for example 73.0.82.8). The acceleration server 202 is in an 'IDLE' step 251a, until the message 'Sign In' 226a is received at the acceleration server 202 at a 'Sign-In Request' step 251b, which initiate an update of the database of the signed-in devices in a state 'Update Table' 251c (corresponding to an 'Update List' state 222a in the chart 220), as shown, for example, in the first row 253a in table 250a. The acceleration server 202 further logs into the database the date and time of the signing in, such as 24/3 as a date and 8:35 as the time, as shown in the first column 252a of the table 250a. The acceleration server 202 further adds rows to the table per each agent device, in the case of multiple agent devices, such as the addition of the agent device #2 103b, that its signing-in details are shown in the second row 253b, as addressed by IP address 68.78.78.3 and having signed in at 25/3 at 10:59.

Similarly, the peer device #1 102a starts and sign in with the acceleration server 202. The process starts upon initializing a peer application in a peer device, schematically shown as a 'START' step 225a in the chart 220, corresponding to the state 'Start' 242a in chart 240a, followed by the 'Sign In' message (shown as dashed-line) 226b in the chart 220, corresponding to the 'Sign-in As Peer' step 242b in the flowchart 240a. The acceleration server 202 adds the agent device #2 103b and the signing-in details to the table 250a in the 'Update Table' step 251, as shown in the third row 253c, as addressed by IP address 111.13.69.78 and having signed in at 28/3 on 11:49. Such initialization may be executed upon the device powering up process, or upon a user request. Alternatively or in addition, the peer device #1 102a may sign-in with the associated agent device, such as the agent device #1 103a, shown as a 'Sign In' message (shown as dashed-line) 226c in the chart 220. In the latter case, the agent device #1 103a updates its list of peer devices by adding the newly signed-in peer device #1 102a, as shown in an 'Update List' state 224b in the chart 220.

Similarly, the client device #1 201a starts and sign in with the acceleration server 202. The process starts upon initializing a client application in a client device, schematically shown as a 'START' step 231a in the flowchart 230, corresponding to a state 223a 'Start' in the chart 220. Such initialization may be executed upon the device powering up process, or upon a user request. Then the client device #1 201a sign in with the acceleration server 202 in the 'Sign-in as Client' step 231b, which corresponds to the message 'Sign In' 226d in the chart 220. The message comprises the device functionality as 'client', and the client device #1 201a identification on the Internet 113, such as its IP address (for example 125.90.25.92). The message 'Sign In' is received as the acceleration server 202, which update the database of the signed-in devices in state 'Update Table' 251c (corresponding to a state 'Update List' 222b in the chart 220), as shown in the fourth row 253d in table 250a. The acceleration server 202 further logs to the database the date and time of the signing in, such as 29/3 as a date and 14:23 as the sign-in time, as shown in the fourth column 253d of the table 250a. The acceleration server 202 further add to the table rows per each client device, in the case of multiple client devices. In one example, a device may be assigned to have multiple roles, such as functioning as both a client and an agent, as both an agent and a peer, as both a client and a peer, or as an agent, a client, and a peer. Multiple roles may be implemented at different times, or simultaneously using multiprocessing or multitasking. For example, a device may sign-in as both an agent and a peer, as shown in the fifth row 253e of the table 250a, addressed by its IP address 95.33.37.80 and signing in at 16/3 on 21:53.

While the pre-connection process was described above regarding the communication between a client device (such as the client device #1 31a) and a tunnel device (such as the tunnel device #1 33a), described as the client device pre-connection flowchart 64 and the tunnel device pre-connection flowchart 72, a pre-connection may be equally established between any two devices in the system 200, such as between a client device (such as the client device #1 201a) and the acceleration server 202, between two client devices, between a client device (such as the client device #1 201a) and an agent device (such as the agent device #1 103a), between a client device (such as the client device #1 201a) and a peer device (such as the peer device #1 102a), or between a client device and a data server (such as the data server #1 22a). Similarly, a pre-connection may be established between an agent device (such as the agent device #1

103a) and the acceleration server 202, between two agent devices, between an agent device (such as the agent device #1 103a) and a peer device (such as the peer device #1 102a), or between an agent device and a data server (such as the data server #1 22a). Further, a pre-connection may be established between a peer device (such as the peer device #1 102a) and the acceleration server 202, between two peer devices, or between a peer device and a data server (such as the data server #1 22a).

A content, such as an URL (or a web-page, or a web-site) which is typically stored in a data server, such as the data server #1 22a, may be requested by the client device, such as the client device 201a, as shown in a state 'Content Needed' 223b in the chart 220. The client device sends a 'Request List' message 226e to the acceleration server 202, corresponding to a 'Request Agents List' step 231c in the flowchart 230. This request includes the URL or any other identifier of the requested content. The request is received at the acceleration server 202 in the 'Agent List Request ?' step 251d in the flowchart 250, which corresponds to the request by preparing a list of the agent devices which are associated with the required content, in the 'Prepare List' state 222c in the chart 220, corresponding to the 'Prepare List' step 251e in the flowchart 250. For example, the list may include identifiers of all agent devices that are related to the data server #1 22a, or the identifiers of all the agent devices, which may have information about the location of the chunks relating to the requested content. The list of agents (including the identifiers of the agent devices) is then sent, in a 'Send List' step 251f in the flowchart 250 (corresponding to a message 'Send List' 226 in the chart 220), to the requesting client device #1 201a, that receives the list in a 'Receive Agents List' step 231d in the flowchart 230. In the case no appropriate agent devices were found, the client device #1 may choose other schemes for fetching the required content, such as using tunnels as described above, or direct access to the data server #1 22a in a 'Content Fetch Direct' step 233 shown as part of the flowchart 230a in FIG. 23a. In the case the list received at the client device #1 201a include multiple agents, the client device #1 201a may select one, two, three, or any other number of agent devices from the list, in a 'Select Agents' step 231f in the flowcharts 230 and 230a, corresponding to a 'Select Agent' state 223c in the chart 220 illustrating selection of a single agent. Alternatively, all of the agent devices in the list may be selected.

After receiving the agent devices list in the 'Receive Agents List' step 231d, the client device #1 201a may store the list in its storage, such as a cache memory. In a 'Store Agents List' step 231g. Further, a list of agent devices may be obtained from other elements in the system. Preferably, the list may include information about each agent device and transaction history relating to each agent device, such as the connection parameters (e.g., RTT and BW), the results quality, the resolved Domain Name System (DNS), and any other relevant information that may be used in the future. Alternatively or in addition to accessing the acceleration server 202 for obtaining a list of the available agent devices in the 'Request Agents List' step 231c, the client device #1 201a may obtain a list of relevant agent devices locally from a storage or cache memory. For example, the client device #1 201a may use a list of agent devices that were previously stored as part of the 'Store Agents List' step 231g.

Any number of agent devices may be selected. The number of agent devices that are selected in the 'Select Agents' step 231f may be 1 (one). Alternatively, a small number of agent devices may be selected, such as two (2) or three (3). Further, 4, 5, 6, 7, 8, 9, or 10 agent devices may be selected. Further, more than 10 agent devices may be selected, such as 10, 20, 30, 40, or 50.

Figure 26:
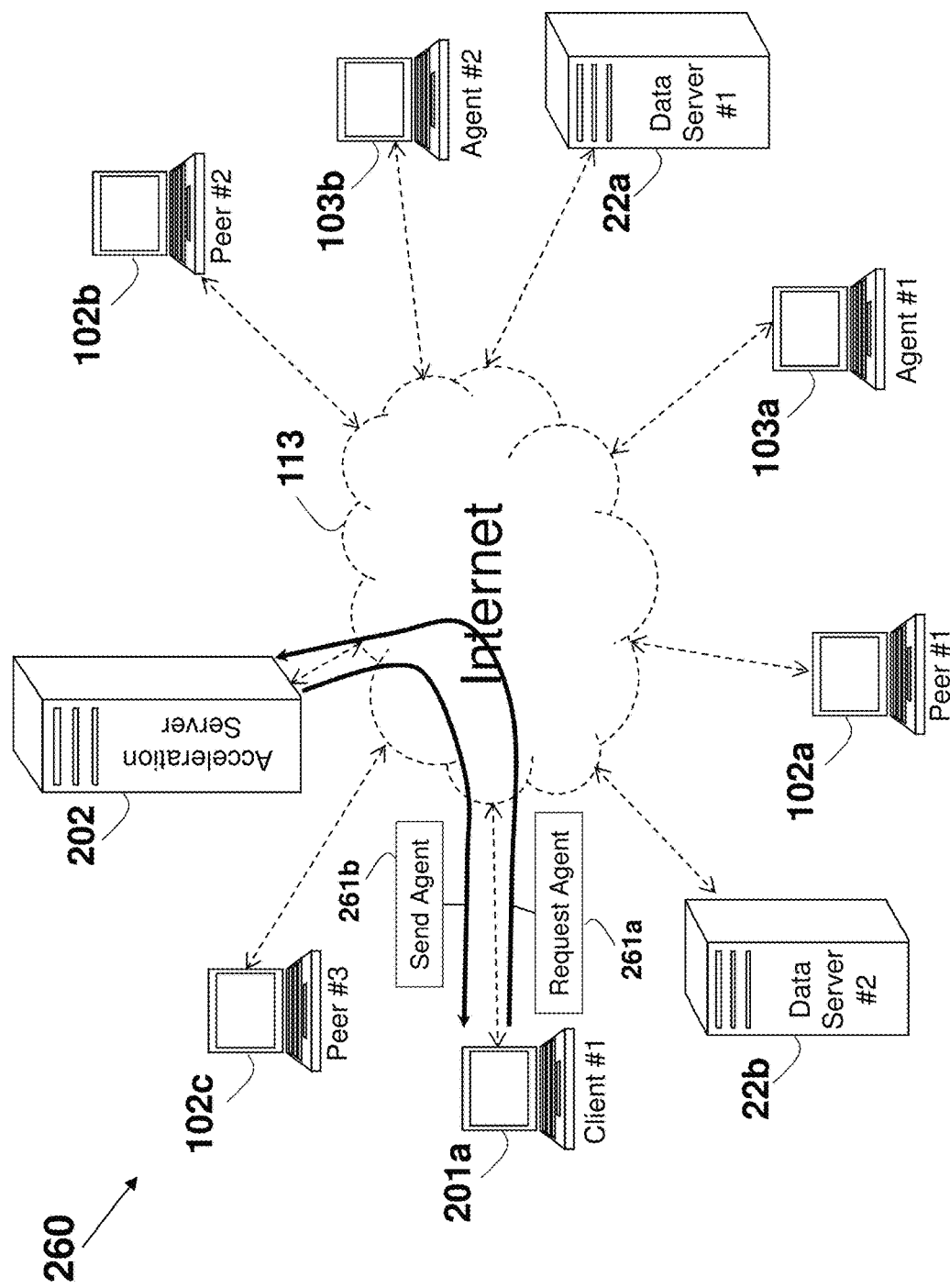
FIG. 26 depicts schematically messages exchanged over the Internet between a client device and an acceleration server.

A schematic messaging flow diagram 260 describing the client device #1 31a related steps of fetching the agent devices list from the acceleration server 202 is shown in FIG. 26. The 'Request Agent' message 261a (corresponding to the 'Request Agents List' step 231c in the flowchart 230) is first sent from the client device #1 31a to the acceleration server 202, which responds by sending the agents list using the 'Send Agent' message 261b (corresponding to the 'Receive Agents List' step 231d in the flowchart 230).

Figure 23A:
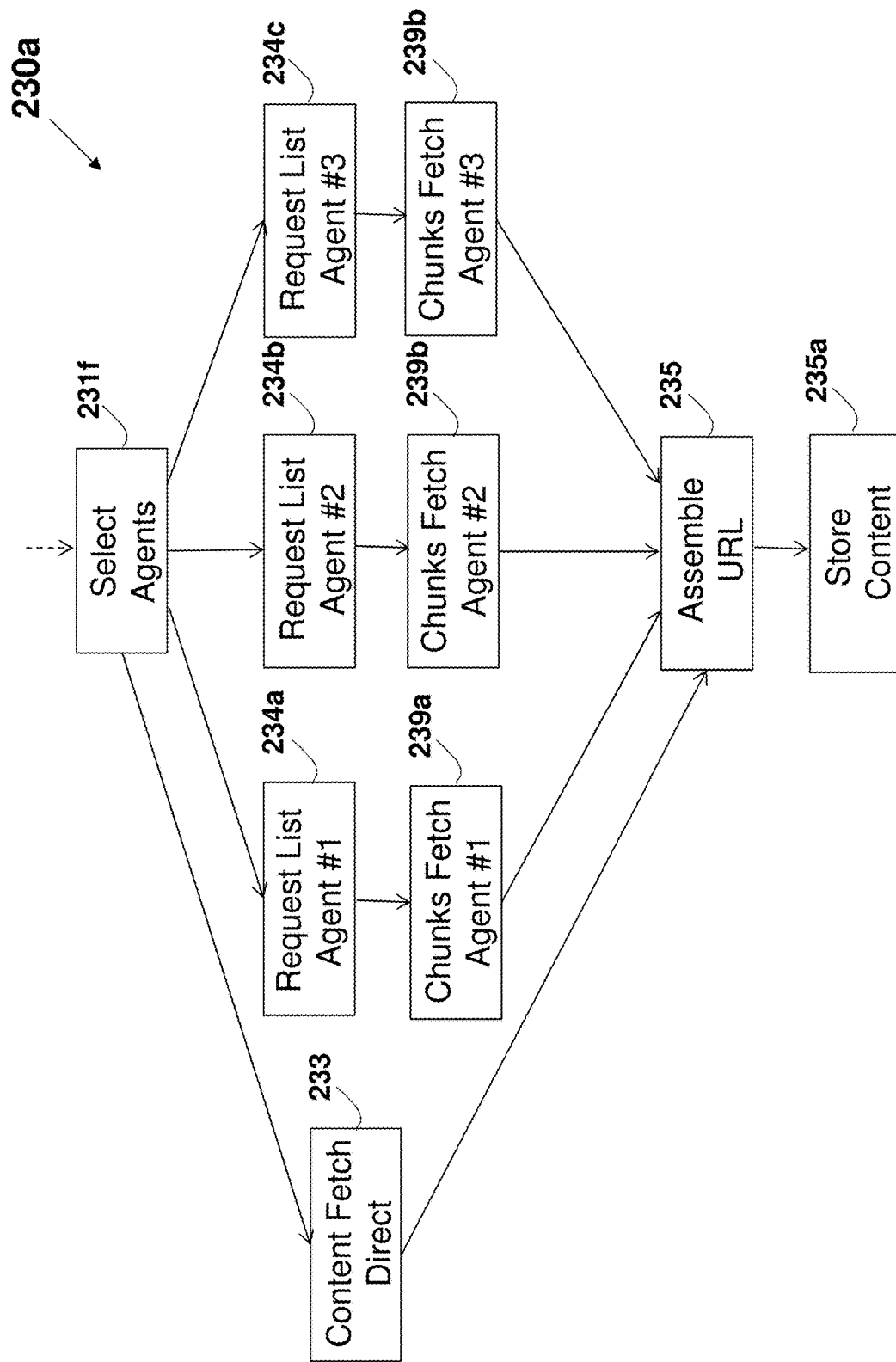

A flowchart 230a in FIG. 23a shows an example where three agents are selected by the client device, designated as an agent device #1 (such as the agent device #1 103a), an agent device #2 (such as the agent device #2 103b), and an agent device #3, while the timing and messaging chart 220 illustrates the usage of a single agent device. In a 'Request List Agent #1' step 234a in the flowchart 230a, the client device #1 201a send to the agent device #1 103a (using its identifier from the list received from the acceleration server 202) a request for a list of peers associated the requested content identifier (such as a URL), such as these peer devices that are known or expected to store chunks of the requested content (or any part of it), corresponding to the 'Request List' message 226g in the chart 220. The agent device #1 103a, which may be idling in an 'IDLE' step 241c, receives the request from the client device #1 201a in a 'Receive List Request' step 241d. In response to the request, in a 'Prepare Peers List' step 241e (corresponding to a state 'Prepare List' 224c in the chart 220), the agent device #1 103a prepares a list of the peer devices that it believes store chunks of the requested content, and in a 'Send List To Client' step 241f, corresponding to a 'Send List' message 226h in the chart 220, sends the list of identifiers of the relevant peer devices back to the requesting client device #1 201a. For each of the selected agent devices, the client device #1 201a selects one, two, or all of the peers in the list, and then retrieves the relevant chunks from the each of the selected peer devices as shown in a 'Chunks Fetch' flowchart 239, shown in FIG. 23b. The peers list is requested from agent device #1 in a 'Request List Agent #1' step 234a, and the chunks are fetched from the peer devices in the list in a 'Chunks Fetch Agent #1' step 239a. Similarly, the peers list is requested from agent device #2 in a 'Request List Agent #2' step 234b, and the chunks are fetched from the peer devices in the list in a 'Chunks Fetch Agent #2' step 239b, which follows the same 'Chunks Fetch' flow in the flowchart 239, and the peers list is requested from agent #3 in a 'Request List Agent #3' step 234c, and the chunks are fetched from the peer devices in the list in a 'Chunks Fetch Agent #3' step 239c, which also follows the same 'Chunks Fetch' flowchart 239.

Figure 26A:
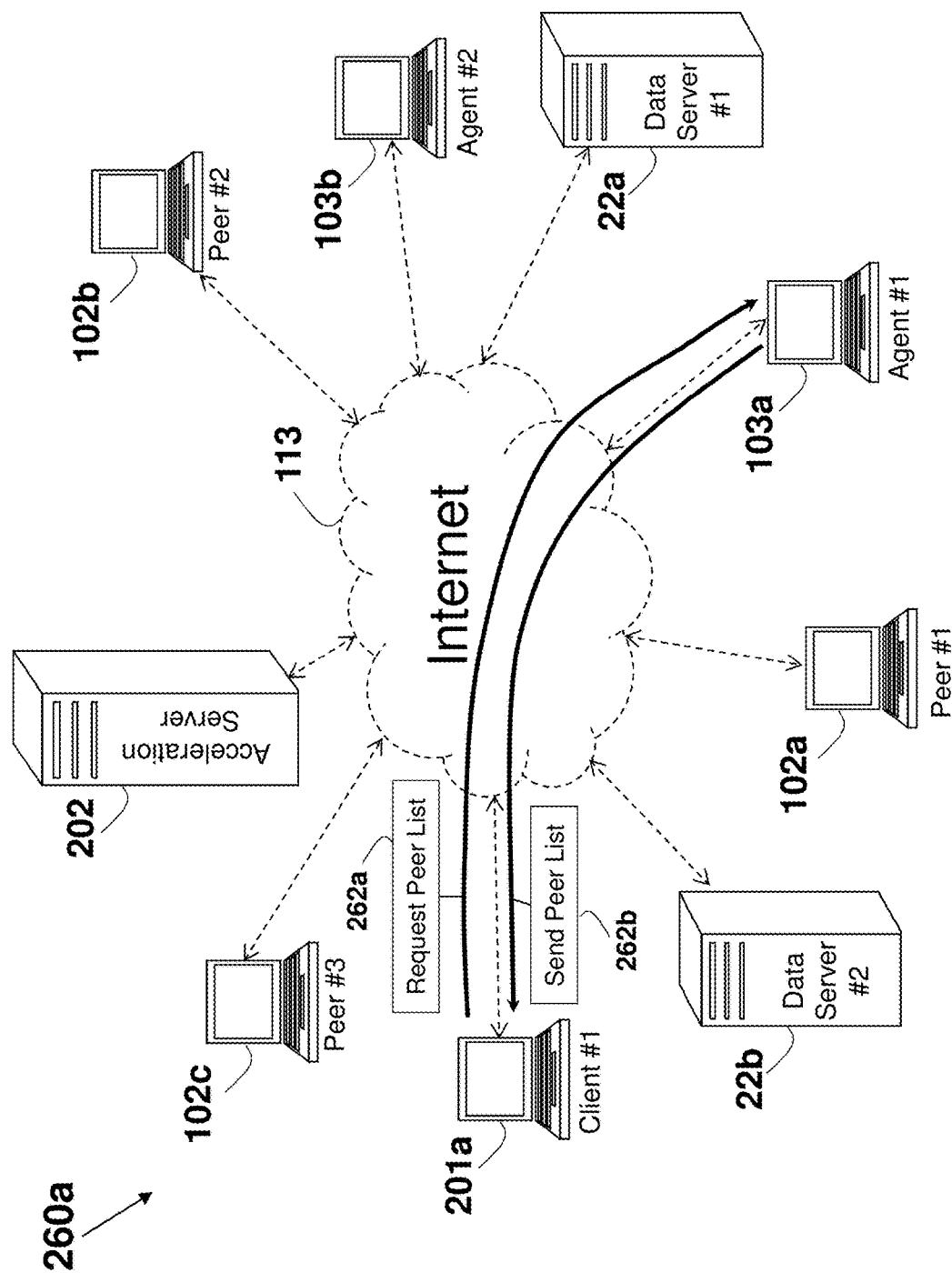
FIG. 26a depicts schematically messages exchanged over the Internet between a client device and an agent device.

A schematic visual messaging flow diagram 260a describing the client device #1 31a related steps of fetching the peer devices list from the agent device #1 103a is shown in FIG. 26a. The 'Request Peer List' message 262a (corresponding to the 'Request List Agent #1' step 234a in the flowchart 230b) is first sent from the client device #1 31a to the agent device #1 103a, which responds by sending the peer list using a 'Send Peer List' message 262b (corresponding to a 'Receive Peers List' step 238 in the flowchart 230b).

Figure 23B:
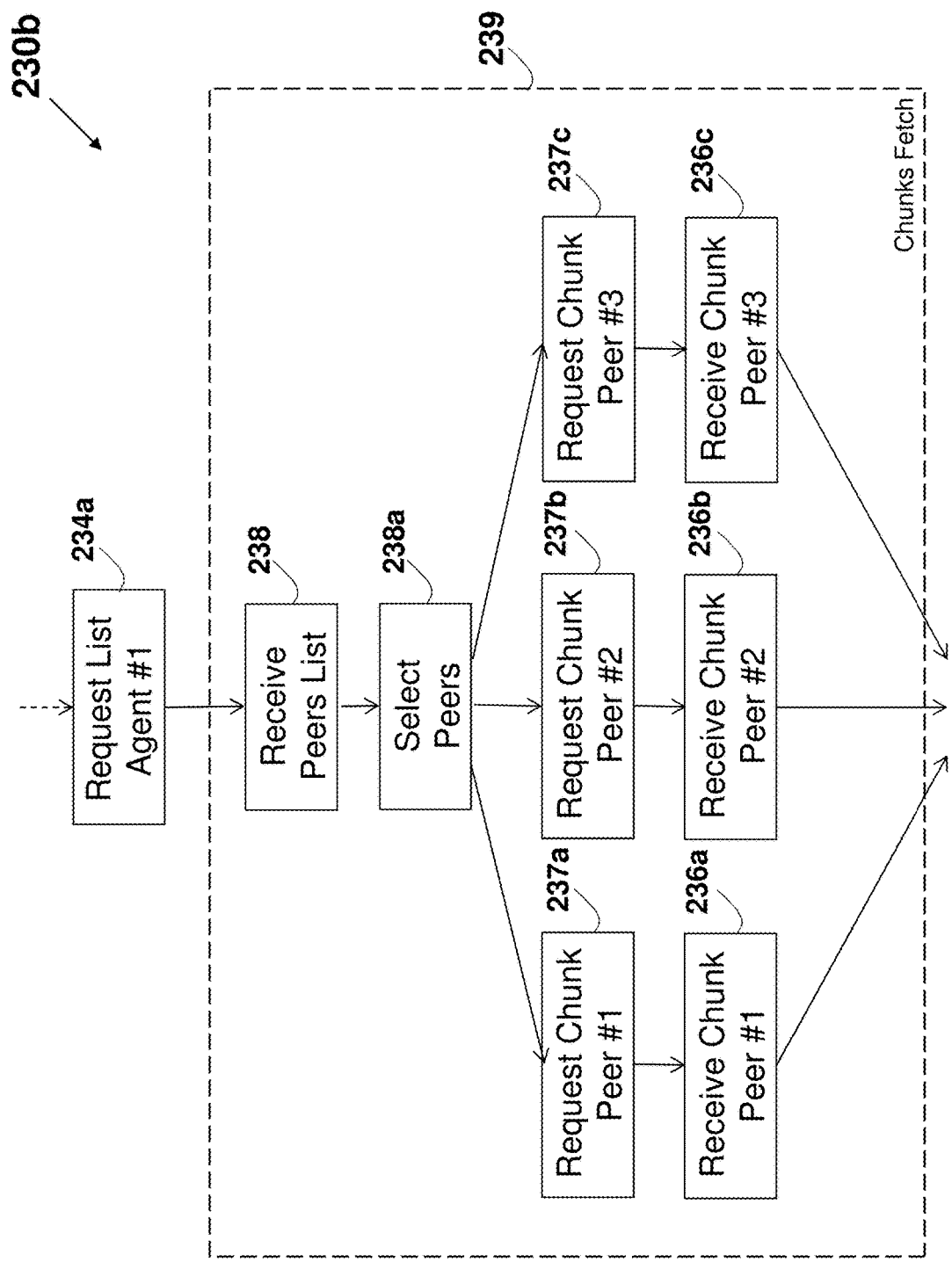

The flowchart 239 in FIG. 23b is an example of a handling of the list received from the agent device #1 103a. The list of the peer devices identifiers is received at the client device in a 'Receive Peers List' step 238, followed by a 'Select Peers' step 238a (corresponding to a 'Select Peers' state 223d shown in the chart 220), where the client device #1

Figure 26B:
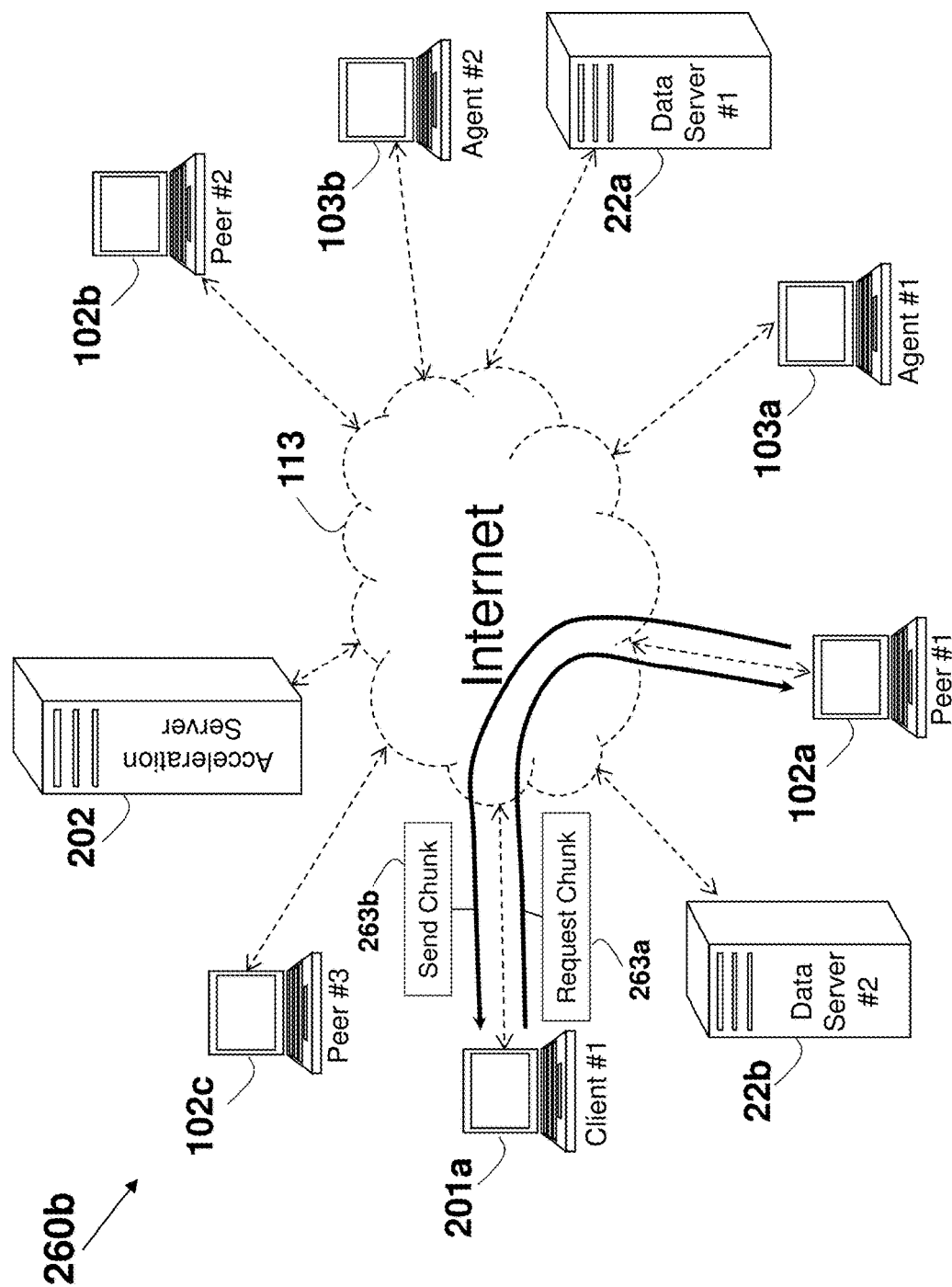
FIGS. 26b, 26c, and 26d depict schematically messages exchanged over the Internet between a client device and a peer device.

201a selects which peer devices out of the list are to be used. The client device may select one, two, three, or any other number out of the listed peer identifiers, or may use all the peer devices in the list. In the example shown in the flowchart 239, three peer devices are used, designated as peer #1, peer #2, and peer #3. For each selected peer device, such as the peer device #1 102a, the client device #1 201a in the 'Request Chunk Peer #1' step 237a which corresponds to a 'Chunk Request' message 226i in the chart 220, send a request to the selected peer device asking for a chunk (or multiple chunks) that is stored (or expected to be stored) thereof. The peer device, such as the peer device #1 102a is in general idling in an 'IDLE' step 242c in the flowchart 240a. Upon receiving the request from the client device #1 201a in a 'Receive Chunk Request' step 242d in the flowchart 240a, the peer device #1 102a fetches the requested chunk (or chunks) as denoted in 'Fetch Chunk' state 225b in the chart 220, and send it to the requesting client device #1 201a, in a 'Send Chunk To Client' step 242e in the flowchart 240a, which corresponds to a 'Send Chunk' message 226j shown in the chart 220. The sent chunk is received at the client device #1 201a in the 'Receive Chunk Peer #1' step 236a. A schematic visual messaging flow diagram 260b describing the client device #1 31a related steps of fetching chunks from the peer device #1 102a is shown in FIG. 26b. The 'Request Chunk' message 263a (corresponding to the 'Request Chunk Peer #1' step 237a in the flowchart 230b) is first sent from the client device #1 31a to the peer device #1 102a, which responds by sending the requested chunks in the 'Send Chunk' message 263b (corresponding to the 'Receive Chunk Peer #1' step 236a in the flowchart 230b).

Figure 26C:
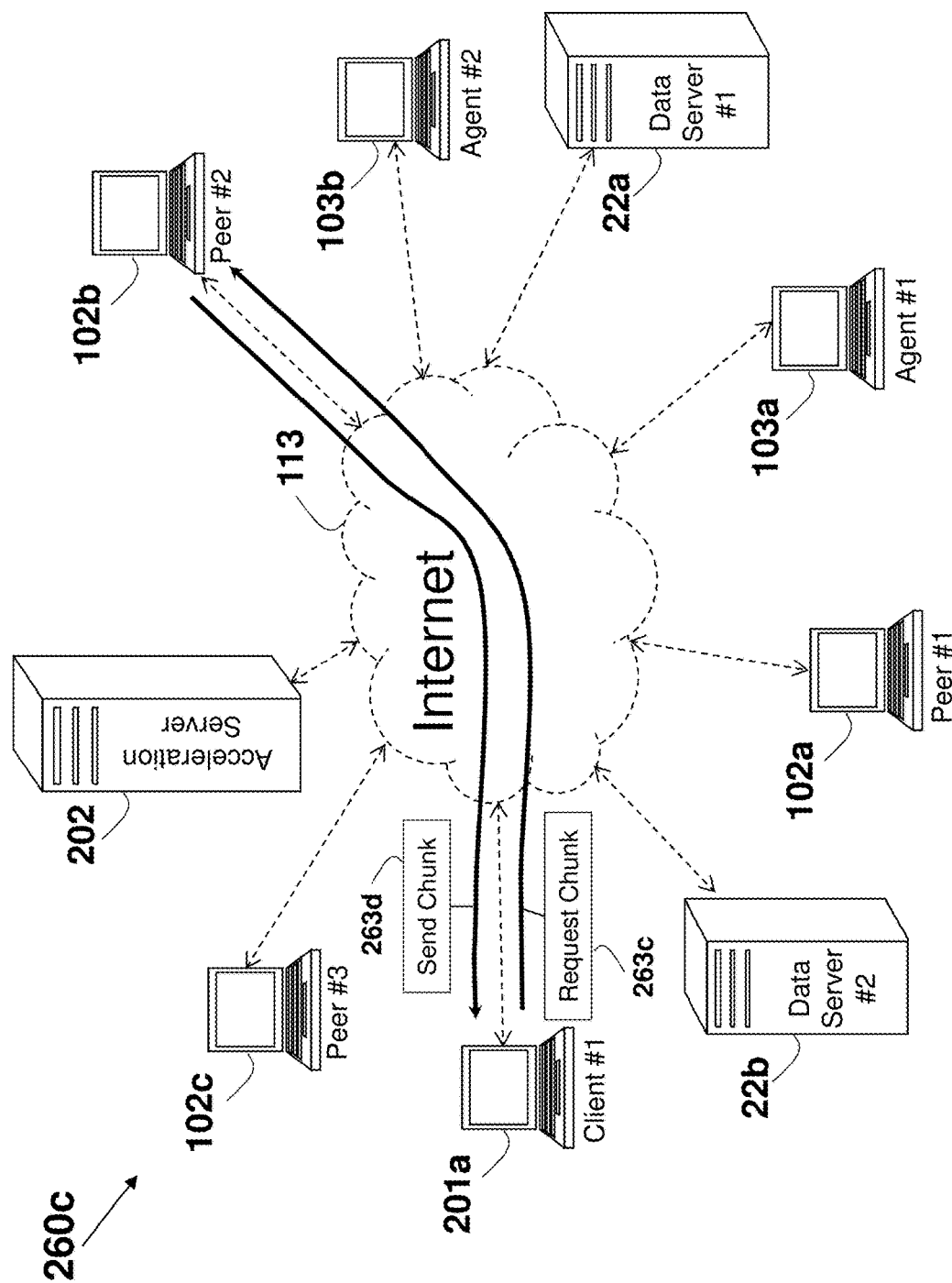
Figure 26D:
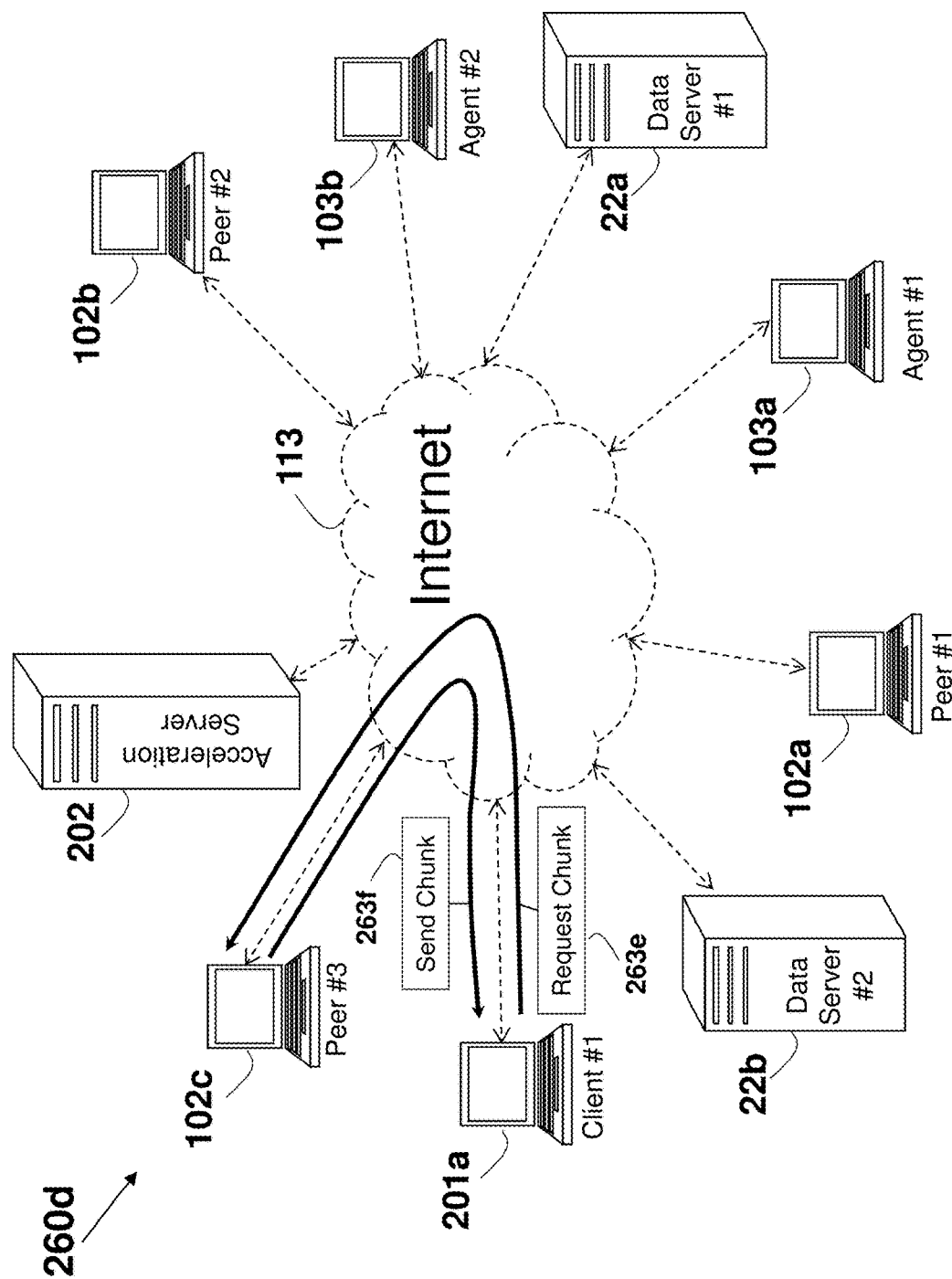

Similarly, the chunks from peer #2 are requested (in parallel or sequentially to peer #1 chunks fetching 239a operation) in a 'Request Chunk Peer #2' step 237b, and are received in a 'Receive Chunk Peer #2' step 236b, and the chunks from the peer device #3 102c are requested (in parallel or sequentially to peer device #1 chunks fetching 239a operation) in a 'Request Chunk Peer #3' step 237b, and are received in a 'Receive Chunk Peer #3' step 236c. A schematic visual messaging flow diagram 260c describing the client device #1 31a related steps of fetching chunks from the peer device #2 102b is shown in FIG. 26c. A 'Request Chunk' message 263c (corresponding to the 'Request Chunk Peer #2' step 237b in the flowchart 230b) is first sent from the client device #1 31a to the peer device #2 102b, which responds by sending the requested chunks in the 'Send Chunk' message 263d (corresponding to the 'Receive Chunk Peer #2' step 236b in the flowchart 230b). Similarly, a schematic visual messaging flow diagram 260d describing the client device #1 31a related steps of fetching chunks from the peer device #3 102c is shown in FIG. 26d. The 'Request Chunk' message 263e (corresponding to the 'Request Chunk Peer #3' step 237c in the flowchart 230b) is first sent from the client device #1 31a to the peer device #3 102c, which responds by sending the requested chunks in the 'Send Chunk' message 263f (corresponding to the 'Receive Chunk Peer #3' step 236c in the flowchart 230b).

Upon receiving part of, or all of, the requested chunks, the client device #1 201a assembles the chunks to render a reconstructed content (in part or in full), such as the requested URL, in an 'Assemble URL' step 235, corresponding to a 'Whole Content Received' state 223e in the chart 220. In the case part of the content is still missing, the client device #1 201a may directly approach the data server #1 22a in a 'Content Fetch Direct' step 233, or use other schemes, such as using tunnel devices as described above to fetch the remaining part of the content.

Any number of peer devices may be selected. The number of peer devices that are selected in the 'Select Peers' step 238a may be 1. Alternatively, a small number of peer devices may be selected, such as 2 or 3. Further, 4, 5, 6, 7, 8, 9, or 10 peer devices may be selected. Further, more than 10 peer devices may be selected, such as 10, 20, 30, 40, or 50.

After a transaction involving fetching a content from all peer devices is completed, it is beneficial to store the fetched content for future use, as shown in a 'Store Content' step 235a in the flowchart 230a. The fetched content may be stored in the client device in any volatile or non-volatile memory, or may be stored in a local cache as described in U.S. Pat. No. 8,135,912 to the Shribman et al., entitled: "System and Method of Increasing Cache Size", which is incorporated in its entirety for all purposes as if fully set forth herein. The content is stored with its related metadata or any other identifiers, so it can be easily detected and fetched when later required. For example, the stored content may be used when the same content is required at any later stage by the same client, or may be used when the client device also serves as a peer device, such as the peer device #1 102a as shown in system 260. In the latter case, the fetched content (such as a URL content) may be arranged and stored as chunks, as described herein.

The selection of the agent devices to be used in the 'Select Agents' step 231f may use any of the selection rules or criteria described above regarding to selecting tunnel devices in the 'Select Tunnel' step 62c or the 'Select Tunnels' step 101a described above. Further, the selection of peer devices to be used in the 'Select Peers' step 238a may use any of the selection rules or criteria described above regarding to selecting tunnel devices in the 'Select Tunnel' step 62c or the 'Select Tunnels' step 101a described above.

The performance of the method and system described herein may be based on the latency involved in fetching a required content. The flowchart 230a in FIG. 23a describes the steps involved in fetching content from a peer device, and a flowchart 239 in FIG. 23b provides further detailed operation of a client device, such as the client device #1 201a. The 'Receive Chunk Peer #1' step 236a (as an example for all equivalent steps such as the 'Receive Chunk #2' step 236b and the 'Receive Chunk #3' step 236c) may be partitioned into two or more steps, as shown in a flowchart 270 in FIG. 27, such as a 'Receive Start' step 271a, relating to the starting of receiving data from a peer device, upon starting or completing the reception of the first byte of the data, for example, and a 'Receive End' step 271b, relating to the ending of receiving data from a tunnel, for example upon starting or completing the reception of the end byte of the data.

As part of the 'Request Chunk Peer #1' step 237a, a timer #1 is started in a 'Timer #1 Start' step 272a, and the timer #1 is stopped in a 'Timer #1 Stop' step 272b at the beginning of the receiving the data from the peer device in a 'Receive Start' step 271a. Hence, timer #1 is used to measure the Round Trip Time (RTT), relating to the time interval measured from sending the request to a peer device until the requested data is starting to be received. Similarly, as part of a 'Receive Start' step 273a a timer #2 is started, and the timer #2 is stopped in a 'Timer #2 Stop' step 273b at the end of the receiving the data from the peer device in a 'Receive End' step 271b. Hence, timer #2 is used to measure the time interval required to receive the content itself from the peer device. For example, in case the time interval is 50 milliseconds (ms), this is the time interval measured from starting to end of the data reception from the peer device. In the case the content size is X bits, the BW can be calculated as the X bits divided by the timer #2 measured time interval. For example, in the case the received content from the peer device is about the size of 50,000 bits (50 Kbits) received during 100 milliseconds (ms), the effective (or average) BW is BW=50,000/0.1=500,000 bits/second=500 Kb/s=62.5 Kbytes/s=62.5 KB/s. The total latency affecting the performance is the combination of both the time interval measured by timer #1 and the time interval measured by timer #2. Using the above examples where the timer #1 measured an RTT of 50 ms and the timer #2 measured 100 ms, the total latency, measured from sending the request to the peer device in the 'Request Chunk Peer #1' step 237a to the end of the content reception in the 'Receive End' step 271b, is 150 ms (50+100=150).

After a transaction involving fetching a content from a peer is completed, it is beneficial to store the transaction related information for future use, such as for future analysis. An example of a table relating to transactions log, that may be part of a database, is shown as a table 280 in FIG. 28.

Figure 27:
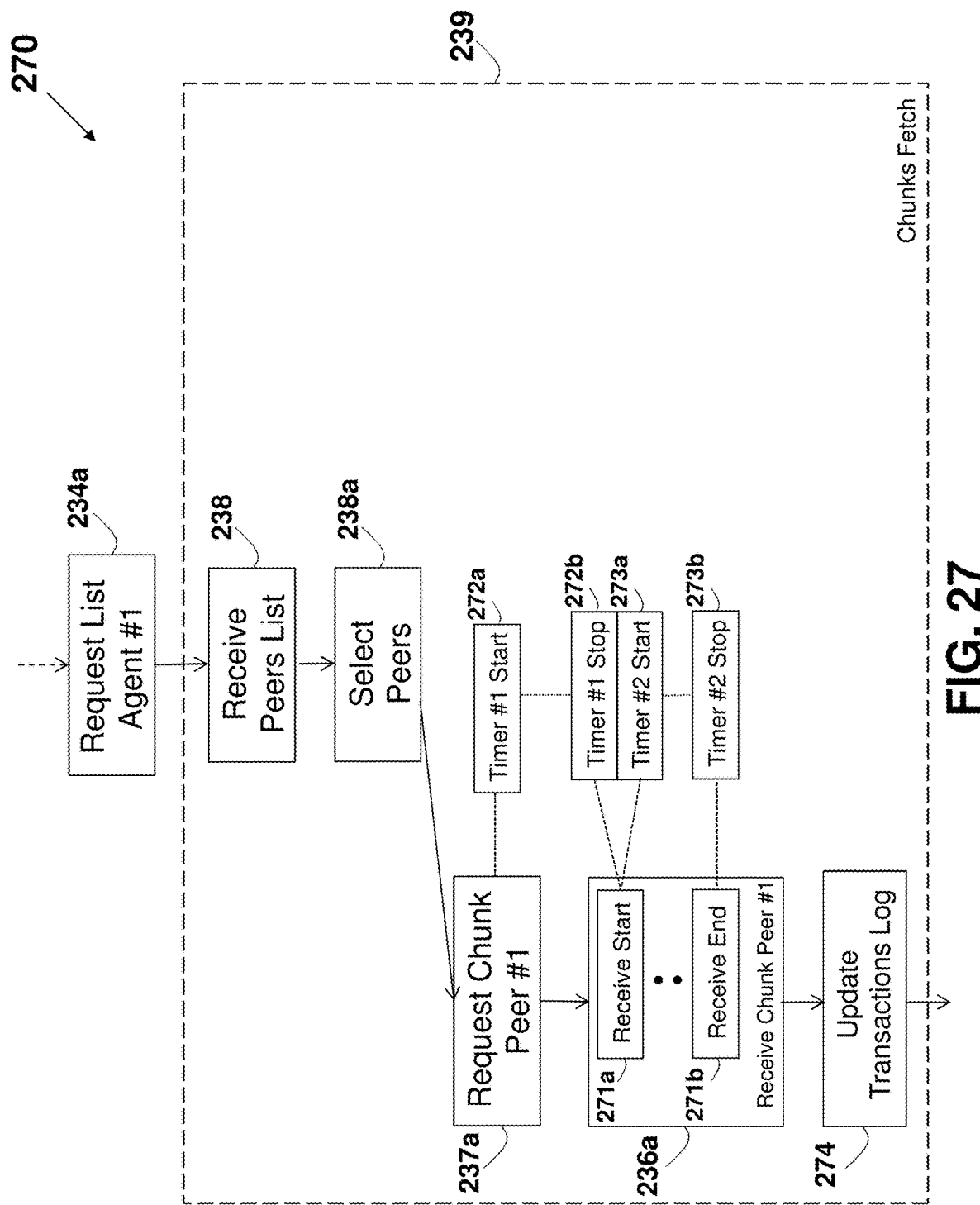
FIG. 27 illustrates schematically a simplified flowchart relating to a client device measuring and logging a communication with a peer device.

The table is updated in the 'Update Transactions Log' step 274 as part of the flowchart 270 shown in FIG. 27. A top row 282 provides the titles of the various columns, where each of the rows provides information regarding a specific transaction, where a first transaction information is shown in a first row 282a, the second transaction information is shown in a second row 282b, the third transaction information is shown in a third row 282c, and so forth. A first column 281a shows the date and time (in DD/MM HH/MM format) when the transaction occurred, such as the start or end of the transaction. For example, the first transaction related information is in the first row 282a shows that the transaction was completed (or started) at March 13, at 9:23. Similarly, the second transaction information is in the second row 282b shows that the transaction was completed (or started) at March 13, at 9:46, and the third transaction information is in the third row 282b shows that the transaction was completed (or started) at April 16, on 11:22. A second column 281b includes an identifier such as the IP address of the peer device that was used in the transaction to fetch the content from the data server, which identifier (such as its IP address) is included in a third column 281c. In the example of the first transaction shown in first row 282a, the IP address of the peer device used is 229.155.81.168, and it was used to fetch content stored in a data server having an IP address of 128.164.35.35.142. Similarly, in the example of the second transaction shown in second row 282b, the IP address of the peer device used is 248.107.109.10, and it was used to fetch content stored in a data server having an IP address of 49.154.2.5, and in the example of the third transaction shown in third row 282c, the IP address of the peer device used is 158.217.19.195, and it was used to fetch content stored in a data server having an IP address of 72.251.238.51. A fourth column 281d describes the identifier of the content that was fetched during this transaction, such as IP address, URL, web-site or web-page, where the first transaction content (in the first row 282a) relates to the URL www.111.com/22.mpg, the second transaction content (in the second row 282b) relates to the URL www.xxx.com/hy.avi, the third transaction content (in the third row 282c) relates to the URL www.yyy.com/t6.php, and so forth.

A fifth column 281e logs the BW calculated in a respective transaction, based on timer #2 time interval measurement as described above. In the first transaction (in the first row 282a) the calculated BW is logged as 1000 Kb/s (=1 Mb/s=125 KB/s), in the second transaction (in the second row 282b) the calculated BW is logged as 350 Kb/s (=0.35 Mb/s), and in the third transaction (in the third row 282c) the calculated BW is logged as 2500 Kb/s (=2.5 Mb/s). A sixth column 281f logs the RTT measured in the transaction, based on timer #1 time interval measurement as described above. In the first transaction (in the first row 282a) the measured RTT is logged as 30 ms (=0.03 seconds=0.03 s), in the second transaction (in the second row 282b) the measured RTT is logged as 70 ms, and in the third transaction (in the third row 282c) the measured RTT is logged as 540 ms (=0.54 second).

The transaction log, such as table 150, may be prepared by a client device, such as client device #1 201a, and stored in the client device for future use. Alternatively or in addition, the transaction log may be sent, after each transaction or after multiple transactions, such as per a time period (e.g., hourly, daily, weekly, monthly), to other entities in the system, to be stored in the entities for future use by them or by other entities in the network. In one example, the transaction log is sent to the acceleration server 202. Alternatively or in addition, the transactions log may be sent to the relevant agent devices, such as the agent device #1 103a or the agent device #2 103b, or any other agent device associated with the relevant peer device or devices involved in the transaction.

Figure 28:
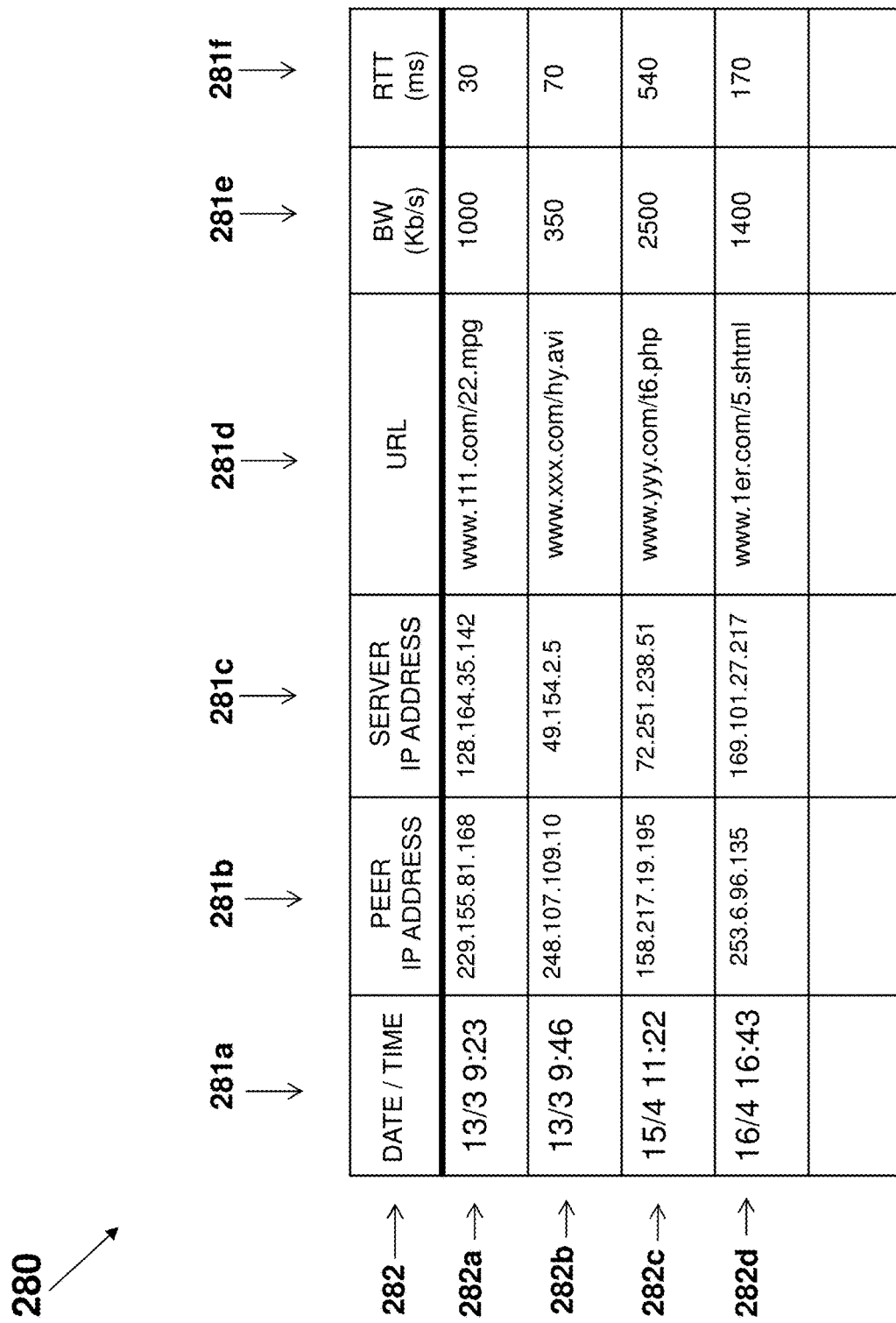
FIG. 28 illustrates schematically a table representing a log of transactions of a client device.
Figure 28A:
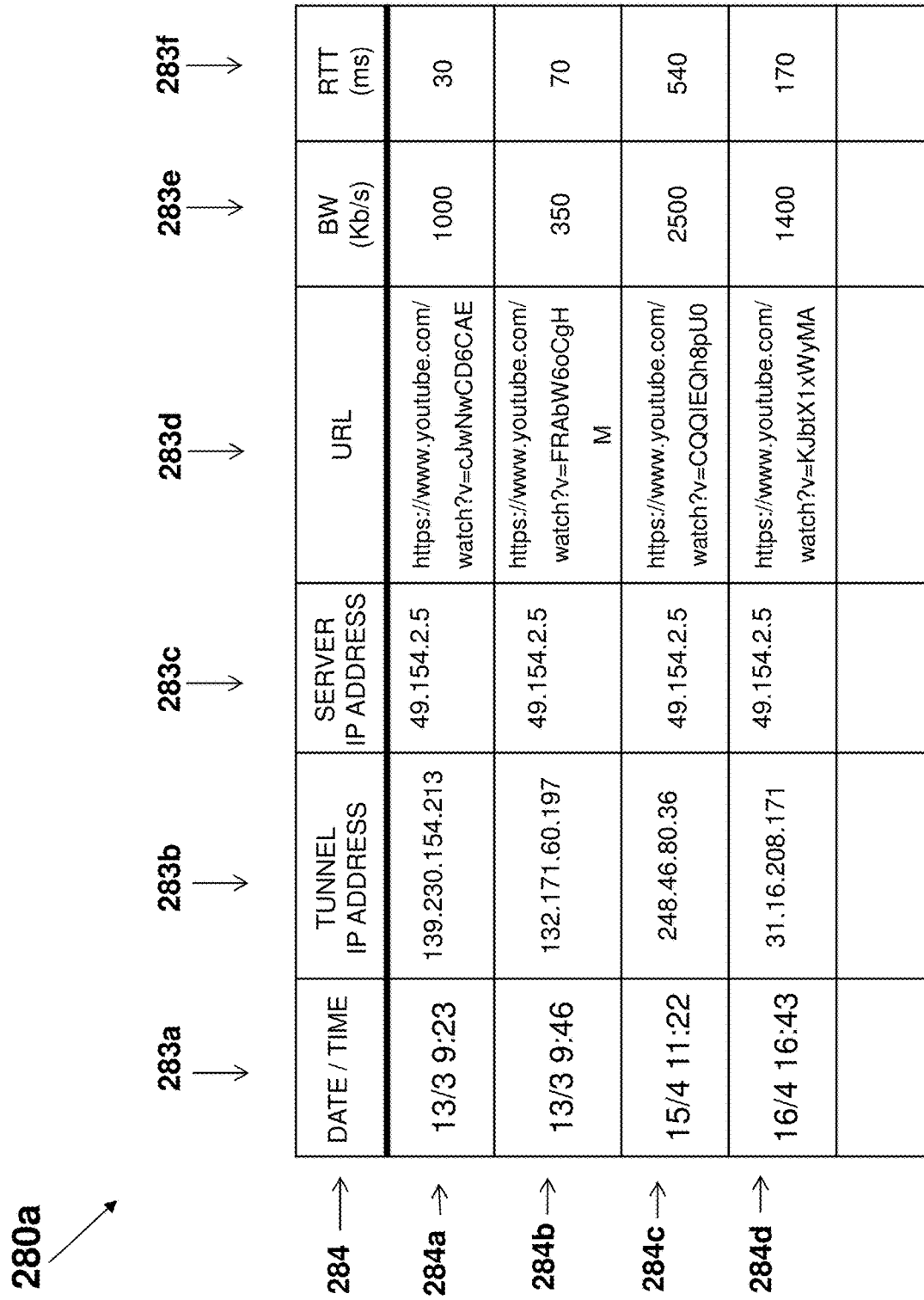
FIG. 28a illustrates schematically a table representing a log of transactions of a client device relating to content fetching from a single data server.

Similar to table 280 shown in FIG. 28, a table 280a shown in FIG. 28a shows a table relating to four peer devices used for fetching different content from the same data server (such as the data server #1 22a), thus the same server IP address is shown in the third column 283c. The IP addresses of the peer devices are shown in the second column 283b, the URL fetched is shown in the fourth column 283d, the date and time of the transaction are logged in the first column 283a, the BW is shown in the fifth column 283e, and the measured RTT is shown in the sixth column 283f. The first transaction (logged in a first row 284a) is using a first peer device having IP address of 139.230.154.213, the second transaction (logged in a second row 284b) is using a second peer device having IP address of 132.171.60.197, the third transaction (logged in a third row 282c) is using a third peer device having IP address of 248.46.80.36, and the fourth transaction (logged in a fourth row 154d) is using a fourth peer device having IP address of 31.16.208.171.

The peer devices to be used when content is to be fetched from a data server (such as the data server 22a) may be selected by a client device (such as the client device #1 201a) in the 'Select Peers' step 238a in the flowchart 230b or by the agent devices in the 'Prepare Peers List' step 241e in the flowchart 240. Alternatively or in addition, the peer devices may be selected by the acceleration server 202. Similarly, the agent devices to be used may be selected by a client device (such as the client device #1 201a) in the 'Select Agents' step 231f in the flowchart 230, or may be selected by the acceleration server 202 in the 'Prepare List' step 251e in the flowchart 250. The selection may be based on a past performance of the peer devices, such as on any information relating to former transactions involving these peers. In one example, the transactions log may be used to evaluate and select which peer devices to use in a specific transaction to be executed, or in multiple transactions.

In the example of the transaction log table 280a shown in FIG. 28a and relating to a client device, the client device may need to fetch content from the same data server shown in the table 280a (having an IP address of 49.154.2.5), and thus may use the table content as an indication of the performance of the various peer devices. In one example, the criterion to select a single peer (or agent) device to be used for fetching content from the data server may be based on having higher BW, assuming that the higher BW has not changed and thus will result in faster content fetching, and hence the peer device used in the third logged transaction (having an IP address of 248.46.80.36) will be selected for this transaction, having the highest recorded BW of 2500 Kb/s. In the case two peer devices are to be selected, the second peer device to be selected is the peer device used in the fourth logged transaction (having an IP address of 31.16.208.171) will be selected for this transaction, being associated with the second highest BW in the table. Similarly, the peer device associated with the first logged transaction will be the next to be selected.

Alternatively or in addition, the criterion to select a single peer (or an agent) device to be used for fetching content from the data server may be based on having lower RTT, assuming that the lower RTT has not changed and thus will result in faster content fetching. Hence the peer device used in the first logged transaction (having an IP address of 139.230.154.213) will be selected for this transaction, having the lowest recorded RTT of 30 ms. In the case two peer devices are to be selected, the second peer device to be selected is the peer device used in the second logged transaction (having an IP address of 132.171.60.197) will be selected for this transaction, being associated with the second lowest RTT in the table (70 ms). Similarly, the peer device associated with the fourth logged transaction will be the next to be selected.

Alternatively or in addition, both the RTT and the BW are used as criteria for selecting peer (or agent) devices. In one example, the expected total latency is calculated, based on both the former BW and the former RTT, and the peer device offering the lowest estimated total latency will be selected. In one example, assuming the content to be fetched is estimated (or known to be) having the size of 100 Kb (100 kilobits). The peer device used in the first logged transaction (in the first row 284a) is associated with past performance (with the same data server) of BW=1000 Kb/s and RTT=30 ms. In such a case, the total latency is calculated and estimated as 30+100/1000=130 ms. The peer device used in the second logged transaction (in the second row 284b) is associated with past performance (with the same data server) of BW=350 Kb/s and RTT=70 ms, and thus the total latency is calculated and estimated as 70+100/350=355.7 ms. Similarly, the estimated total latency of using the peer device used in the third logged transaction (in the third row 284c) is 580 ms, and the estimated total latency of using the peer device used in the fourth logged transaction (in the fourth row 284d) is 241.4 ms. Having the lowest estimated total latency, the peer device used in the first logged transaction (in the first row 284a) will be selected first as having the lowest expected total latency, the peer device used in the fourth logged transaction (in the fourth row 284d) will be selected second, the peer device used in the second logged transaction (in the second row 284b) will be selected third, and the peer device used in the third logged transaction (in the third row 284c) will be selected last.

However, assuming the content to be fetched is estimated (or known to be) having the size of 1000 Kb (1000 kilobits=1 Mb). The peer device used in the first logged transaction (the first row 284a) is associated with past performance (with the same data server) of BW=1000 Kb/s and RTT=30 ms. In such a case, the total latency is calculated and estimated as 30+1000/1000=1030 ms (1.03 s). The peer device used in the second logged transaction (in the second row 284b) is associated with past performance (with the same data server) of BW=350 Kb/s and RTT=70 ms, and thus the total latency is calculated and estimated as 70+1000/350=2927.1 ms. Similarly, the estimated total latency of using the peer device used in the third logged transaction (in the third row 284c) is 940 ms, and the estimated total latency of using the peer device used in the fourth logged transaction (in the fourth row 284d) is 884.2 ms. Having the lowest estimated total latency, the peer device used in the fourth logged transaction (in the fourth row 284d) will be selected first as having the lowest expected total latency, the peer device used in the third logged transaction (in the third row 284c) will be selected second, the peer device used in the first logged transaction (in the first row 284a) will be selected third, and the peer device used in the second logged transaction (in the second row 284b) will be selected last.

In the general case, there may be N peer devices that may be used, designated i=1, 2, . . . N, and that the total content size is X. Assuming non-overlapping partition, each of the peer devices (i) will be assigned part of the total content Xi, where X=ΣXi. The latency (Ti) in each path (i) relating to a peer device (i) is calculated as Ti=RTTi+Xi/BWi, where RTTi is the RTT associated with peer device (i) and BWi is the BW associated with the peer device (i). Since typically the latency relating to complete the fetching of the whole of the content (T) is determined by the longest latency of the individual latency Ti, then T=max(Ti), hence it is beneficial to minimize the maximum Ti, designated as min(max(Ti)) =min(max(RTTi+Xi/BWi)). Such a minimum is obtained when all Ti's are equal to each other, so that T=Ti=T$_1$=T$_2$=T$_3$= . . . =T$_N$, which is resulted when the partition Xi is: Xi=BWi*[(X+ΣRTTi*BWi)/(ΣBWi)−RTTi], and the latency in such a case is T=(X+Σ(RTTi*BWi))/(ΣBWi). In the example of using two peer devices (N=2), then X$_1$=BW$_1$*[X+BW$_2$*(RTT$_2$−RTT$_1$)]/(BW$_1$+BW$_2$) and X$_2$=BW2*[X+BW$_1$*(RTT$_1$−RTT$_2$)]/(BW$_1$+BW$_2$), while the resulting latency is T=Ti=T$_2$=(RTT$_1$*BW$_1$+RTT$_2$*BW$_2$+X)/(BW$_1$+BW$_2$).

Figure 29:
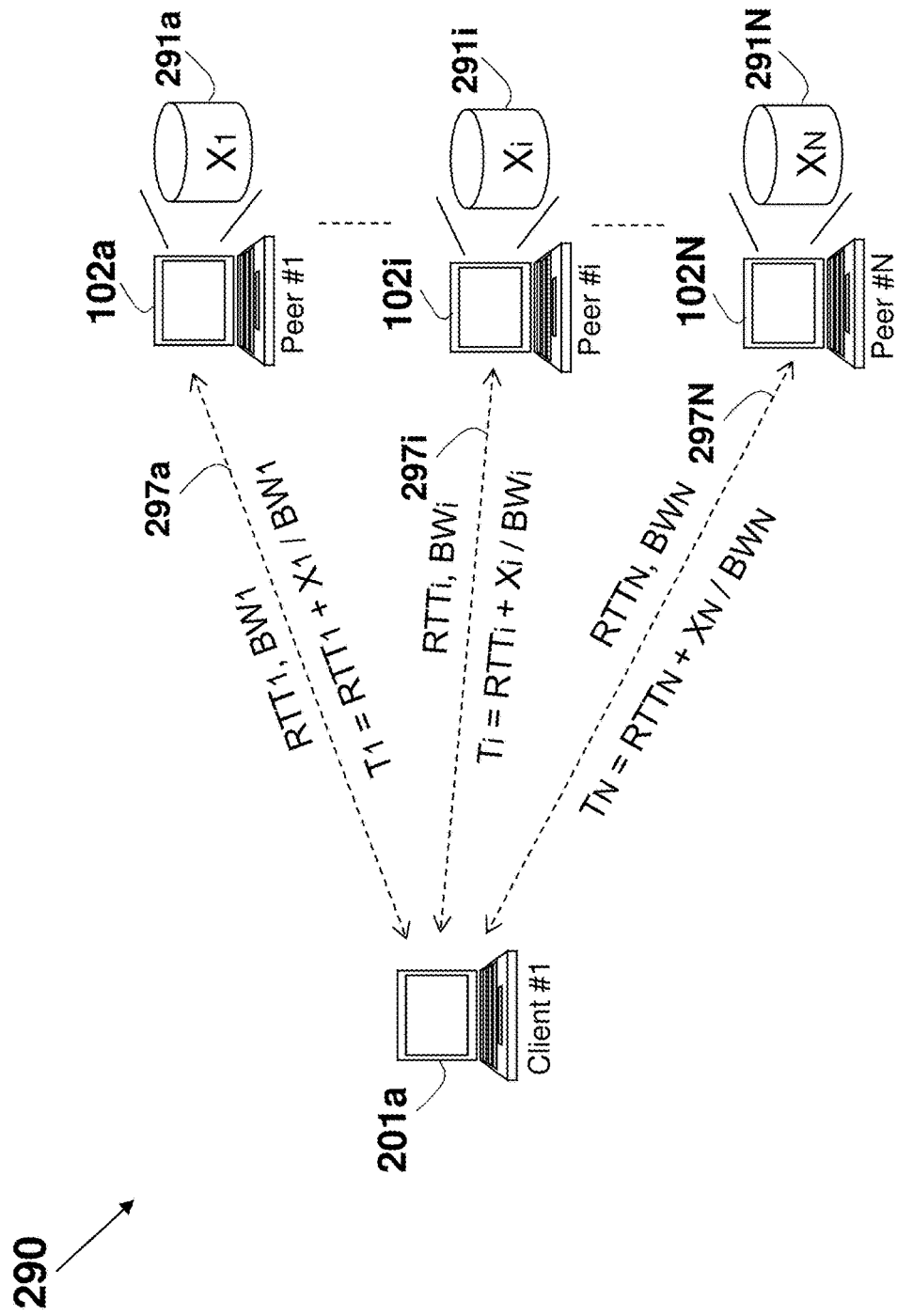
FIG. 29 depicts schematically timing considerations involving a client device and peer devices.

Referring now to a system 290 shown in FIG. 29, schematically showing a general peer device #i 102i, which stores in a database 291i the entire content required (or a part of it), or at least part X$_i$ (which may be chunks-based) of the content that is required by the client device #1 201a. The peer device #i 102i communicates with the client device #1 201a over a data path 297i, characterized by an RTTi and BWi, so that the latency can be estimated to be T$_i$=RTT$_i$+X$_i$/BW$_i$. Similarly, a peer device #1 102a, which stores in a database 291a the entire content required, or at least part X$_1$ (which may be chunks-based) of the content that is required by the client device #1 201a. The peer device #1 102a communicates with the client device #1 201a over a data path 297a, characterized by an RTT$_1$ and BW$_1$, so that the latency can be estimated to be T$_1$=RTT$_1$+X$_1$/BW$_1$. Assuming that there are N peer devices, a peer device #N 102$_N$ is shown, which stores in a database 291$_N$ the entire content required, or at least part X$_N$ (which may be chunks-based) of the content that is required by the client device #1 201a. The peer device #$_N$ 102$_N$ communicates with the client device #1 201a over a data path 297$_N$, characterized by an RTT$_N$ and BW$_N$, so that the latency over this data path can be estimated to be T$_N$=RTT$_N$+X$_N$/BW$_N$.

Figure 29A:
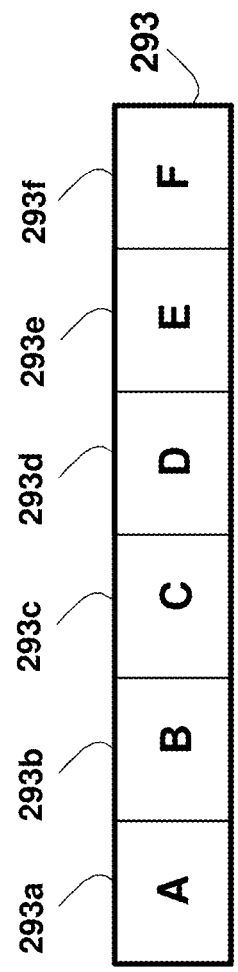
FIG. 29a depicts schematically the calculations involving optimal timing considerations of a system involving a client device and peer devices.

An analysis of the system 290 is shown as a view 290a in FIG. 29a. The total latency expression is based on the arrival of the last piece (or last chunk) of a requested content to the client device #1 201a, and hence T=Max (T$_i$) as shown in an expression (1) 292a, and in order to obtain fastest load time, the target is to minimize the total latency T, based on a partition X$_i$ of the total content X, as shown in an expression (2) 292*b*. Such minimum is obtained where the latency is the same (T) in all the data paths, as shown in an expression (3) 292*c*. An expression (4) 292*d* provides the optimal partition $X_i$ for minimum latency, and an expression (5) 292*e* provides the obtained latency. It is apparent that in the case wherein a fixed-fixed chunks are used in the system, the calculation of $X_i$ may result in a non-integer number of chunks. In such a case, a chunk may be further partitioned into smaller chunks. Alternatively or in addition, the resulting sizes may be round to the nearest integer value, allowing for keeping the scheme of only using fixed-size chunks.

The allocation of the parts of the requested content to the available peer devices to be fetched therefrom, may be part of the 'Select Peers' step 238*a*. While exampled above regarding the allocation of content and the partitioning in a peer/agent based system, the method and the analysis are equally applicable for any system or arrangement where multiple data paths are used, each relating to the allocated parts of the content. For example, such a method may be used when the content is fetched using agents, such as in the 'Content Partition' step 101*b* in the flowchart 100 (or the flowchart 100*a*) above, where the partition may be based on the expression (4) 292*d* shown in the view 290*a*.

FIG. 29 further shows an example of a content 293, composed of 6 (six) non-overlapping fixed-sized chunks designated as 'A' 293*a*, 'B' 293*b*, 'C' 293*c*, 'D' 293*d*, 'E' 293*e*, and 'F' 293*f*. In one example, assuming three (3) peer devices are used (N=3 in the system 290), the allocation determined is shown in view 295*a* in FIG. 29*b*, where three chunks including the chunks 'A' 293*a*, 'B' 293*b*, and 'C' 293*c*, are allocated to be fetched from a first peer device (such as the peer device #1 102*a*), a single chunk 'D' 293*d* is allocated to be fetched from a second peer device (such as the peer device #i 102*i*), and the two chunks 'E' 293*e* and 'F' 293*f*, are allocated to be fetched from a third peer device (such as the peer device #N 102N). At time t=0, the content fetching from the three peer devices is started. A client device (such as the client device #1 201*a*) prepares a memory 294 for storing the requested content 293 upon obtaining it.

The allocations of the content chunks into the available peer devices may be based on estimation RTT, BW, as well as other parameters relating to each of the peer devices, as well as on the communication characteristics associated with each peer device, and known to the client device. Such an estimation may be found to be inaccurate or not updated. The client device may measure and update the BW, RTT, and other relevant information as part of the actual content fetching. For example, an actual RTT and BW may be measured per each of the peer devices as described in the flowchart 140 in FIG. 14, added to other updated information gathered throughout the content fetching process. Further, the allocation of chunks to peer devices may be re-evaluated according to the updated parameters, and changed during the content fetching process. The re-evaluating of the allocation may be executed continuously and simultaneously with the content fetching, or preferably at specified time intervals.

Figure 29B:
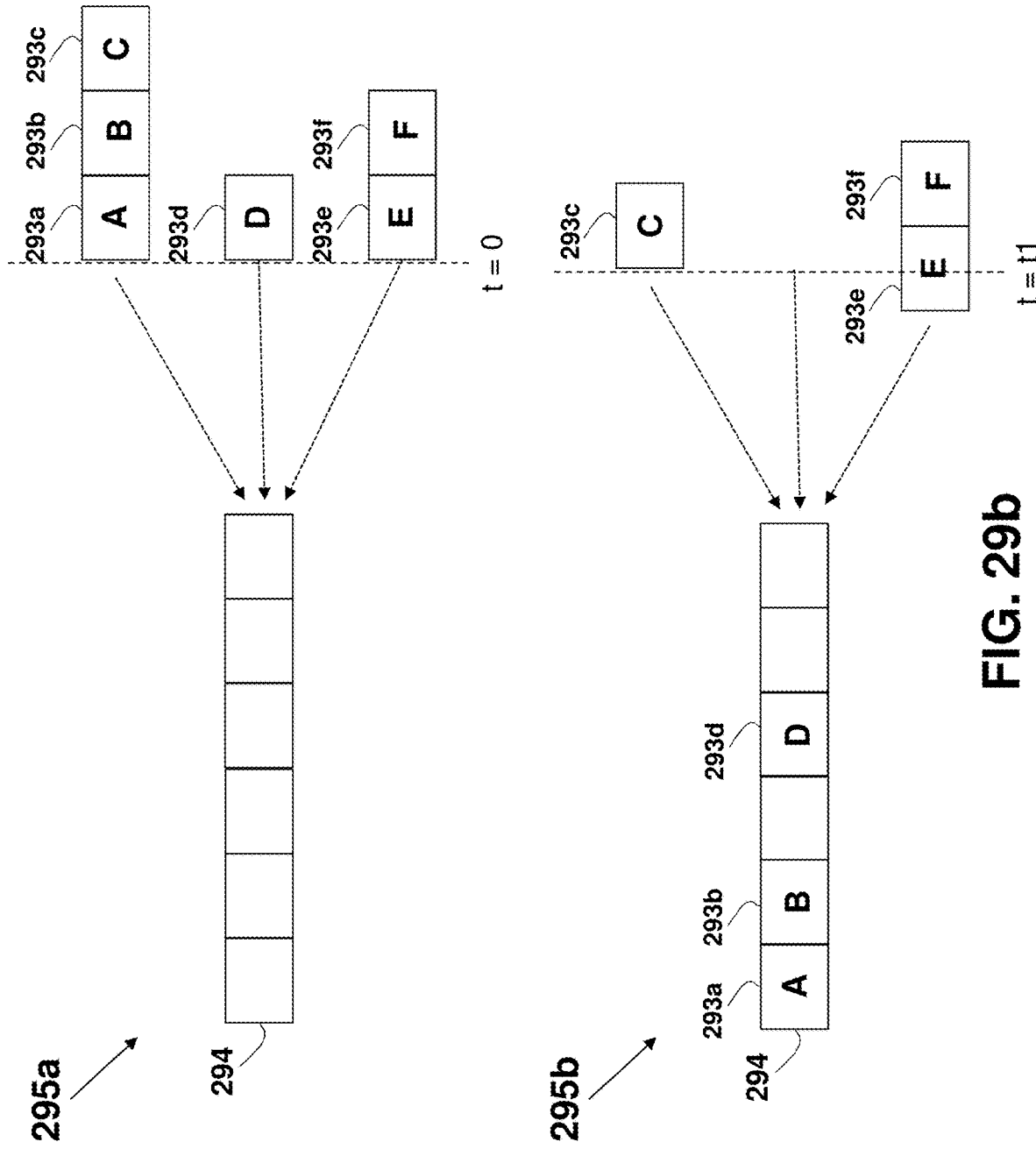
FIG. 29b depicts schematically a chunks flow in a system involving a client device and peer devices.
Figure 29C:
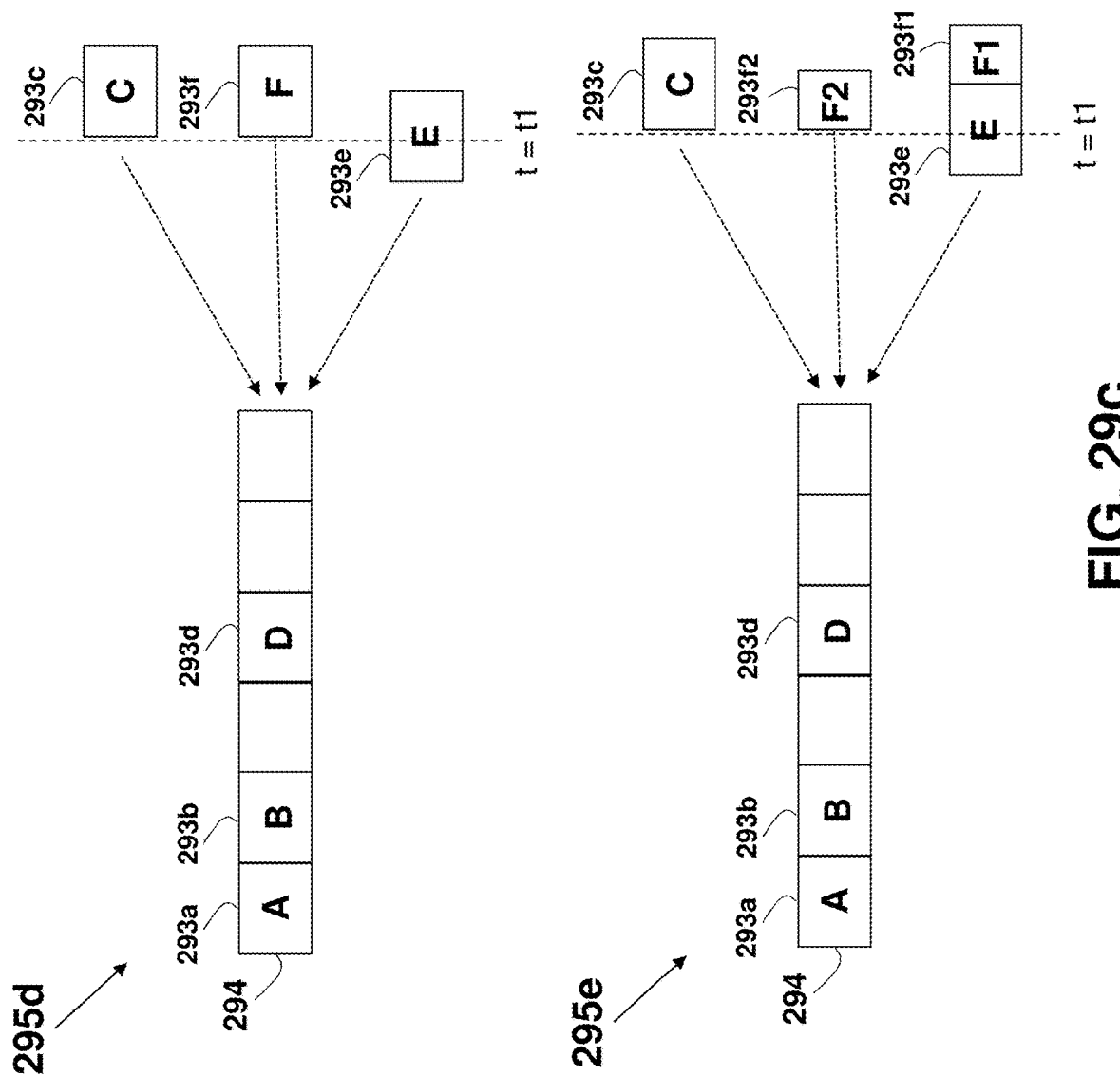
FIG. 29c depicts schematically an improved chunks flow in a system involving a client device and peer devices.

In one example shown as view 295*b* in FIG. 29*b*, at a time t=t1 after the content fetching activity has initiated, the client device checks the status of the fetching, to find that the chunks 'A' 193*a*, 'B' 293*b*, and 'D' 293*d* have been completely fetched and loaded into the client device memory 294. Further, the chunk 'C' 293*c* is about to start to be fetched from the first peer device, and a chunk 'E' 293*e* is in the process of being fetched. It is noted that the chunk 'F' 293*f* has not yet been fetched, and is expected to be the last chunk to be fully fetched, and hence determines and affects the total time required for the fetching of the entire requested content 293. In one example, shown as a view 295*d* in FIG. 29*c*, the client device may decide, in order to reduce the total fetching time, to recalculate the allocation, and for example to reallocate the fetching of the chunk 'F' 293*f* (being the 'bottleneck' chunk) to another peer device, such as the second peer device. Alternatively or in addition, in order to improve efficiency and reduce the content fetching latency, the last to receive the chunk 'F' 293*f* is split into two equal-sized chunks 'F1' 293*f*1 and 'F2' 293*f*2. It is apparent that splitting into non-equally sized chunks, or splitting into more than two chunks, may be equally applicable. Each of the newly formed chunks may now be allocated to a peer device, using any allocation scheme or criteria. In one example shown in view 295*e* in FIG. 29*c*, one of the new chunks 'F1' 293*f*1 is allocated to the third peer device, while the other chunk 'F2' 293*f*2 is allocated now to the second peer device.

Figure 29D:
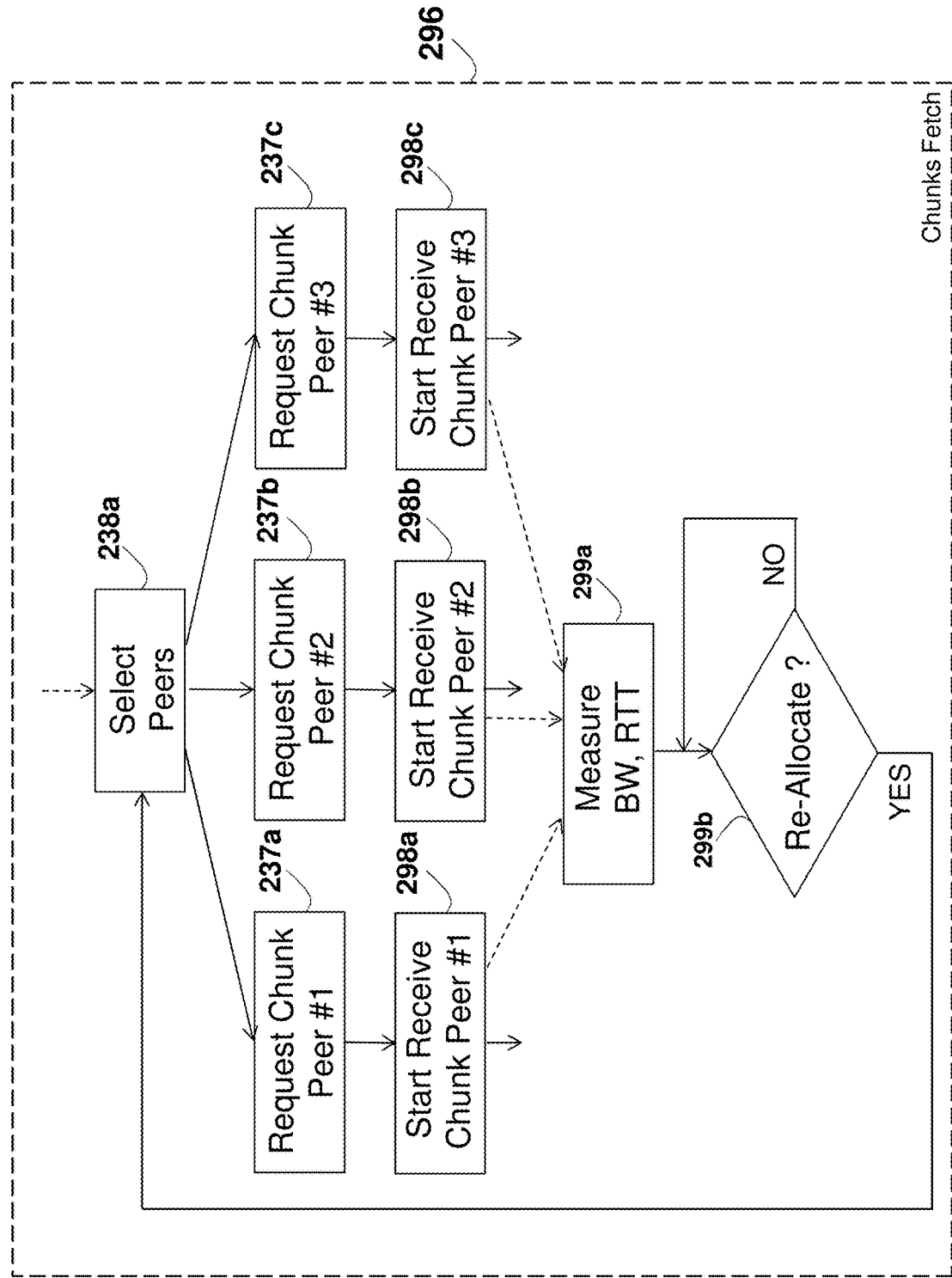
FIG. 29d illustrates schematically a simplified flowchart for an improved flow of chunks in a system involving a client device and peer devices.

The flowchart 296 shown in FIG. 29*d*, corresponds to the flowchart 239 shown in FIG. 23*b*, describes an example of a method involving real-time re-allocation of chunks to peer devices. The initial allocation of chunks to peer devices, based on criteria and scheme known before the content fetch initiation, is part of the 'Select Peers' step 238*a*. The fetching of the peer device #1 allocated chunks starts in a 'Start Receive Chunk Peer #1' step 298*a*, being part of the 'Receive Chunk Peer #1' step 236*a* shown in the flowchart 239 in FIG. 23*b*. Similarly, the fetching of the peer device #2 allocated chunks starts in a 'Start Receive Chunk Peer #2' step 298*b*, being part of the 'Receive Chunk Peer #2' step 236*b* in the flowchart 239 in FIG. 23*b*, and the fetching of the peer device #3 allocated chunks starts in a 'Start Receive Chunk Peer #3' step 298*c*, being part of the 'Receive Chunk Peer #3' step 236*c* in the flowchart 239 in FIG. 23*b*. In parallel to the process of fetching the various chunks from the allocated peer devices, the client device, continuously or periodically, measures the various communication related characteristics for each communication with a peer device, such as BW and RTT, as part of a 'Measure BW, RTT' step 299*a*. The new measured parameters are used for recalculation of the allocation, for example according to the expression (4) 292*d* in FIG. 29*a*. In a 'Re-Allocate ?' step 299*b*, the need for changing the former allocation is determined. In some cases, there may be no need to change the initial or former allocation. If there a need for re-allocation, the 'Select Peers' step 238*a* is resumed, and new allocation is affected.

Figure 29E:
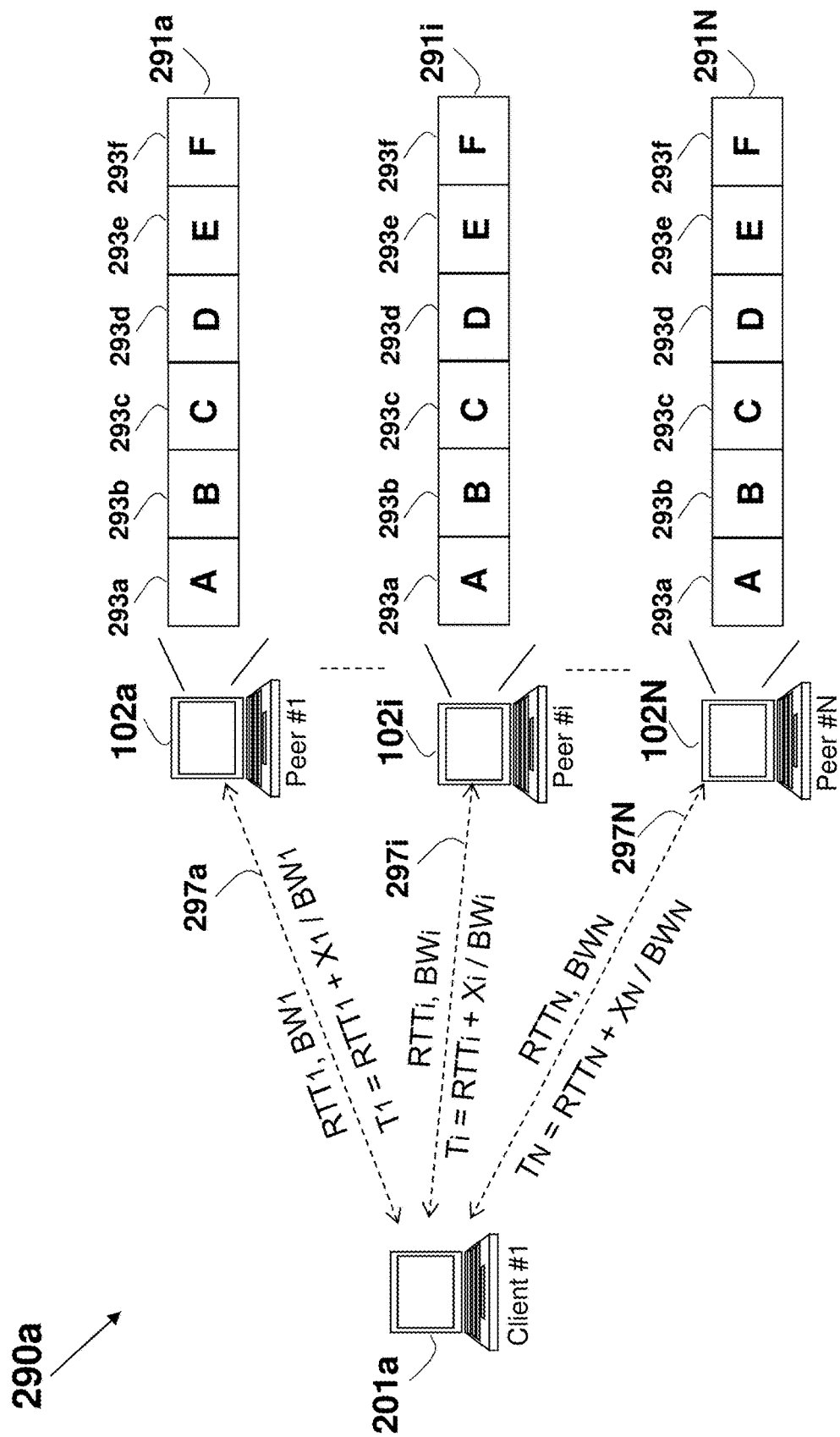
FIG. 29e depicts schematically a flow of chunks in a system involving a client device and peer devices.
Figure 29F:
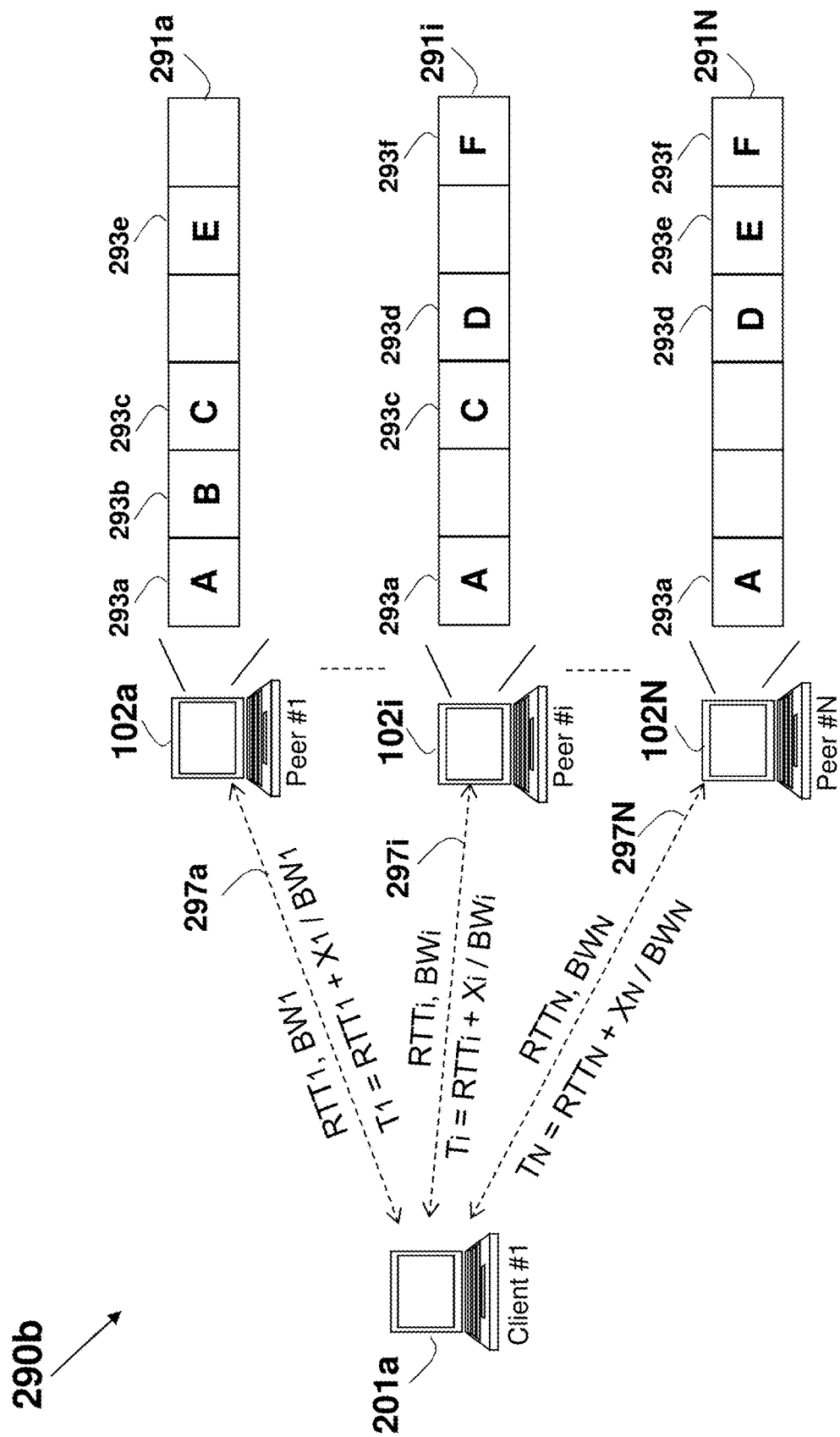
FIG. 29f depicts schematically an improved chunks flow in a system involving a client device and peer devices.

In one example shown as arrangement 290*a* in FIG. 29*e*, each of the peer devices stored all of the chunks composing the entire content 293. The peer device #1 102*a* is shown to store the entire content in its memory as content 291*a*. Similarly, the peer device #i 102*i* stores the entire content in its memory as content 291*i*, and the peer device #N 102N stores the entire content in its memory as content 291N. In such a case, the client device 201*a* may choose any peer device for any chunk of the content 293, or may even choose a single peer device (such as the peer device #1 102*a*) to fetch the entire content therefrom. Alternatively or in addition, each of the peer devices may store only part of the chunks composing the content 293, as shown in an arrangement 290*b* in FIG. 29*f*. The peer device #1 102*a* is shown to store only chunks 'A' 293*a*, 'B' 293*b*, 'C' 293*c*, and 'E' 293*e*, in its memory as content 291*a*, while the peer device #i 102*i* stores only chunks 'A' 293*a*, 'C' 293*c*, 'D' 293*d*, and 'F' 293*f*, in its memory as content 291*i*, and the peer device #N 102N stores only chunks 'A' 293*a*, 'D' 293*d*, 'E' 293*e*, and 'F' 293*f*, in its memory as content 291N. It is noted that such storing of portions of the content 293 may not affect the system operation described in views 295*a*, 295*b*, 295*c*, and 295*d*, since the chunks required from each of the peer devices are indeed stored in these peer devices. In such a configuration, the agent devices and the client device should consider the actual content portion in each of the peer device, in addition to the size of the content portion that is optimal to be fetched from them.

Each of the devices denoted herein as servers, such as the acceleration server 32, the data server #1 22*a*, the data server #2 22*b*, and the acceleration server 202, may typically function as a server in the meaning of client/server architecture, providing services, functionalities, and resources, to other devices (clients), commonly in response to the clients' request. Each of the server devices may further employ, store, integrate, or operate a server-oriented operating system, such as the Microsoft Windows Server® (2003 R2, 2008, 2008 R2, 2012, or 2012 R2 variant), Linux™ (or GNU/Linux) variants (such as Debian based: Debian GNU/Linux, Debian GNU/kFreeBSD, or Debian GNU/Hurd, Fedora™, Gentoo™, Linspire™, Mandriva, Red Hat® Linux available from Red Hat, Inc. headquartered in Raleigh, North Carolina, U.S.A., Slackware®, SuSE, or Ubuntu®), or UNIX®, including commercial UNIX® variants such as Solaris™ (available from Oracle Corporation headquartered in Redwood City, California, U.S.A.), AIX® (available from IBM Corporation headquartered in Armonk, New York, U.S.A.), or Mac™ OS X (available from Apple Inc. headquartered in Cupertino, California, U.S.A.), or free variants such as FreeBSD®, OpenBSD, and NetBSD®. Alternatively or in addition, each of the devices denoted herein as servers, may equally function as a client in the meaning of client/server architecture.

Devices that are not denoted herein as servers, such as client devices (such as the client device #1 31*a*, the client device #2 31*b*, or the client device #1 201*a*), tunnel devices (such as the tunnel device #1 33*a* or the tunnel device #2 33*b*), agent devices (such as the agent device #1 103*a* or the agent device #2 103*b*), or peer devices (such as the peer device #1 102*a* or the peer device #2 102*b*), may typically function as a client in the meaning of client/server architecture, commonly initiating requests for receiving services, functionalities, and resources, from other devices (servers or clients). Each of the these devices may further employ, store, integrate, or operate a client-oriented (or end-point dedicated) operating system, such as Microsoft Windows® (including the variants: Windows 7, Windows XP, Windows 8, and Windows 8.1, available from Microsoft Corporation, headquartered in Redmond, Washington, U.S.A.), Linux, and Google Chrome OS available from Google Inc. headquartered in Mountain View, California, U.S.A. Further, each of the these devices may further employ, store, integrate, or operate a mobile operating system such as Android (available from Google Inc. and includes variants such as version 2.2 (Froyo), version 2.3 (Gingerbread), version 4.0 (Ice Cream Sandwich), Version 4.2 (Jelly Bean), and version 4.4 (KitKat)), iOS (available from Apple Inc., and includes variants such as versions 3-7), Windows® Phone (available from Microsoft Corporation and includes variants such as version 7, version 8, or version 9), or Blackberry® operating system (available from BlackBerry Ltd., headquartered in Waterloo, Ontario, Canada). Alternatively or in addition, each of the devices that are not denoted herein as servers, may equally function as a server in the meaning of client/server architecture.

The method and system described herein allows for a client device (such as Client device #1 31*a* in FIG. 5 or the client device #1 201*a* in FIG. 20) to effectively fetch content from a data server (such as the data server #1 22*a*). The method and system may be used by the client device for supporting an application, such as a web browser application, when the application is requesting a content from the Internet in general, and from a data server in particular. The request for Internet-related content may be intercepted by the 'client' application and process, initiating the client flowchart 60 shown in FIG. 6, the flowchart 100 shown in FIG. 10, or the flowchart 230 shown in FIG. 23. In one example, the client device uses a communication-related application to be used by the application when no 'client' application is present, such as HTTP stack handling application. The request from the requesting application to the communication-related application is intercepted and routed to be handled as part of the 'client' application or process. Such interception may be in the form of a filter driver (or any other intermediate driver), enabling the interception as part of the OS kernel. Alternatively or in addition, the interception may be in the form of extension or a plug-in of the requesting application, such as a browser plug-in or a browser extension in the case where the application is a web browser. Alternatively or in addition, the interception of the request may use hooking of the requesting application or of the communication-related application. Alternatively or in addition, the application and the steps described herein may communicate using an Inter-Process Communication (IPC), such as a file sharing, a signal, a socket, a pipe, a message queue, a shared memory, a semaphore, or memory mapped file. In Windows environment, the IPC may be based on a clipboard, a Component Object Model (COM), a data copy, a DDE protocol, or mailslots.

Examples of web browsers include Microsoft Internet Explorer (available from Microsoft Corporation, headquartered in Redmond, Washington, U.S.A.), Google Chrome which is a freeware web browser (developed by Google, headquartered in Googleplex, Mountain View, California, U.S.A.), Opera™ (developed by Opera Software ASA, headquartered in Oslo, Norway), and Mozilla Firefox® (developed by Mozilla Corporation headquartered in Mountain View, California, U.S.A.). The web-browser may be a mobile browser, such as Safari (developed by Apple Inc. headquartered in Apple Campus, Cupertino, California, U.S.A), Opera Mini™ (developed by Opera Software ASA, headquartered in Oslo, Norway), and Android web browser.

Figure 30:
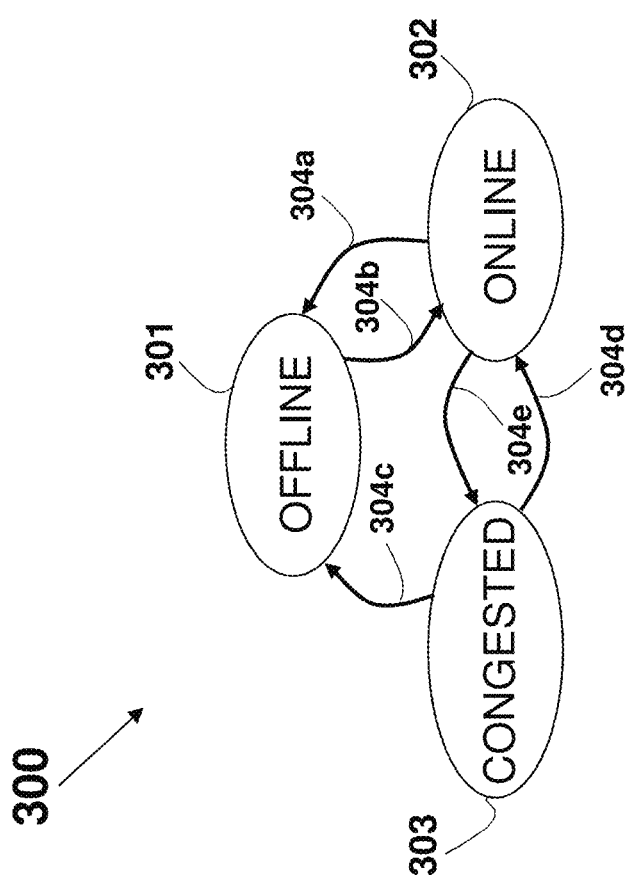
FIG. 30 illustrates schematically a state diagram of a network element.

Any network element, or any device that is herein that is connectable to the Internet, may be in one of the states in a state diagram 300 shown in FIG. 30. A device may be in an 'OFFLINE' state 301, where the device cannot access, and cannot be accessed via, the Internet. For example, the device may be not powered, or may not be connected to the Internet due to a faulty or non-operative communication interface, or due to the lack of Internet connectivity in the vicinity of the device. In normal operation, the device is in an 'ONLINE' state 302, where the device is connected to the Internet, and may receive messages from, and send messages to, the Internet. Further, a resource (or few resources) in the device may in time become congested in a 'CONGESTED' state 303. The device monitors its resources and performance, and upon detecting a resource utilization that is above a set threshold, declares itself as congested. The congestion detection scheme serves as a mechanism to measure the device performance and quality of service, and may be used to alert other devices in the system that the device may not be capable to handle additional tasks or services. The detection of congestion may be further used for load balancing, such as for distributing workloads across multiple computing resources, such as computers, a computer cluster, network links, central processing units, or disk drives, for optimizing resource use, maximizing throughput, minimizing response time, and avoiding overload of any one of the resources. Further, using multiple components in a device with load balancing instead of a single component may increase reliability through redundancy. Similarly, using multiple devices in a system or network with load balancing instead of a single (or few) device may increase reliability through redundancy.

Upon power up and being operative, the device shifts from the 'OFFLINE' state 301 to the 'ONLINE' state 302 as depicted by an arrow 304b in the states chart 300. If for any reason the device is not capable to access the Internet or to be operative as required, such as upon powering the device power off or a faulty Internet connection, the device is considered to shift to the 'OFFLINE' state 301 as depicted by an arrow 304a. In the case a congestion is detected, the device shifts to the 'CONGESTED' state 303, as depicted by an arrow 304e. Upon detecting that the detected congestion has elapsed, the device may resume to normal operation in the 'ONLINE' state 302, as depicted by an arrow 304d. The device may also shift from the 'CONGESTED' state 303 to the 'OFFLINE' state 301, as depicted by an arrow 304c.

In one example, the congestion decision may be based on a CPU utilization, where CPU time or CPU usage is reported either for each thread, for each process, or for the entire system. The CPU utilization relates to the relative time that the CPU is not idling (for example, the amount of time it not executing a system idle process). In the case the CPU utilization is above a predetermined threshold, such as 80%, the device declares itself as congested. Alternatively or in addition, a congestion state may be based on memory utilization. In the case wherein the memory locations that are in use are above a predetermined threshold, for example, when additional memory requirements may not be satisfied, the device may declare itself as congested. Alternatively or in addition, a congestion state may be the result of detecting of low availability of communication bandwidth (for example, for accessing the Internet), or input/output resources limitations. The congestion in Internet related communication is described in IETF RFC 2914 entitled: "*Congestion Control Principles*", which is incorporated in its entirety for all purposes as if fully set forth herein.

Figure 31:
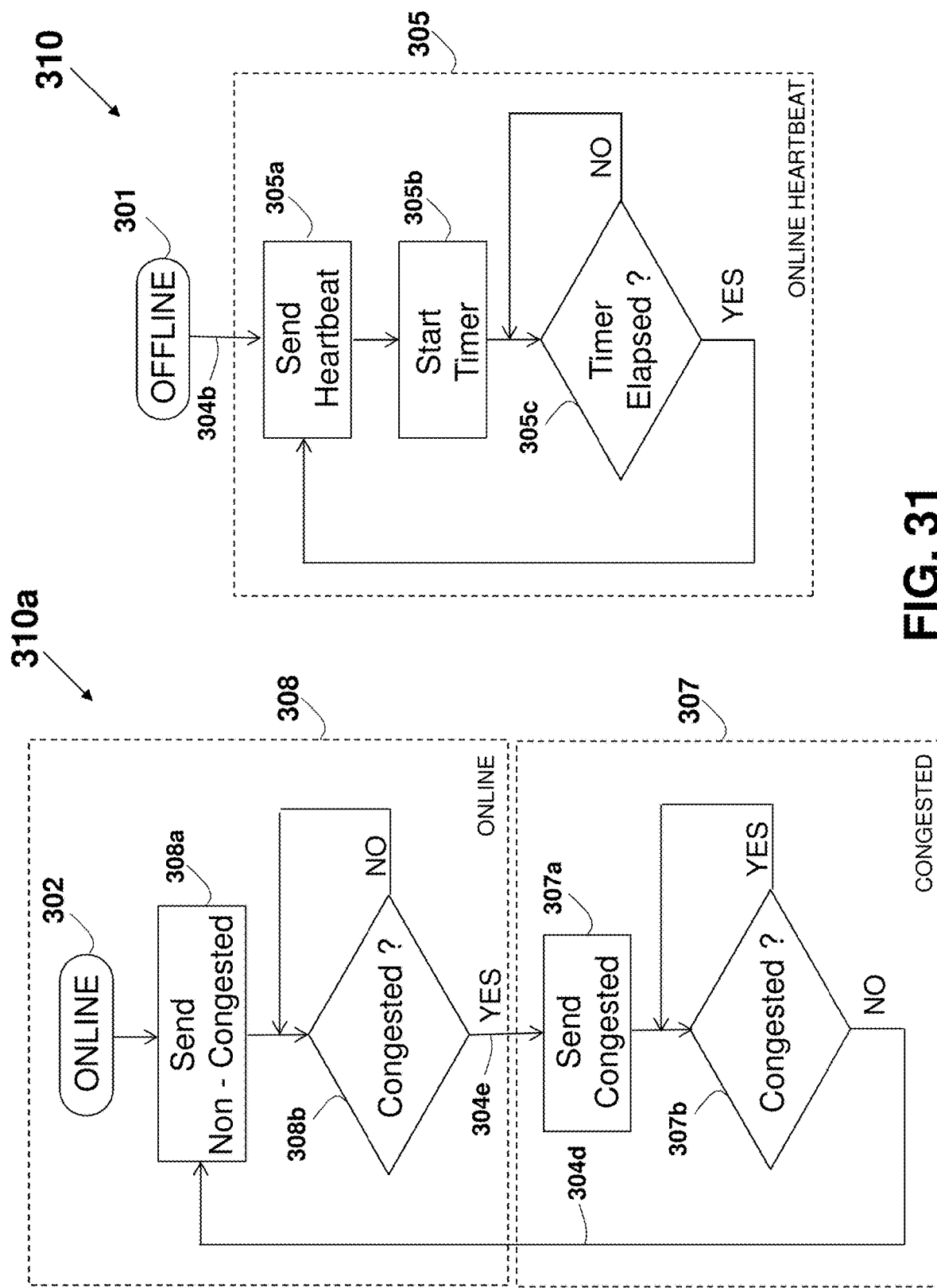
FIG. 31 illustrates schematically a simplified flowchart for determining a network element status.

A heartbeat mechanism may be used in order to allow devices to sense the status of other devices in the system. A 'ONLINE HEARTBEAT' flow chart 305 is shown in FIG. 31 as part of the flowchart 310, may be executed by any device herein. The device may be in an 'OFFLINE' step 301, corresponding to the 'OFFLINE' state in the state diagram 300. When in the 'ONLINE' state 302 and the 'CONGESTED' state 303, the device executes the flow chart 'ONLINE HEARTBEAT' 305, which starts at a 'Send Heartbeat' step 305a, where the device sends a 'ping' or any other message, thus notifying its availability over the Internet, and being in normal operation, and capable of providing services to other devices if required. The message sent in this step may be a dedicated heartbeat related message. Alternatively or in addition, any message which is sent as part of the device functionality, may as well be used as a 'heartbeat' message, corresponding to the 'Send Heartbeat' step 305a. For example, the 'Sign-in as Client' step 61b in the client device flowchart 60, the 'Request Tunnel List' step 62a, the 'Request Agents List' step 231c in the client flowchart 230, and the 'Send Chunk to Client' step 242d in the peer flowchart 240a, may serve also as a heartbeat message, corresponding to the 'Send Hearbeat' step 305a. A timer set to a predetermined time interval is started in a 'Start Timer' step 305b. The time period set by the timer is used to determine the frequency of the heartbeat 'pulse', where high frequency resulting short time periods allows for frequent updating of the device status. The time period between 'heartbeat pulses' may be in the order of milliseconds, such as every 10, 20, 30, 50, or 100 milliseconds, may be in the order of seconds, such as every 1, 2, 3, 5, or 10 seconds, may be in the order of tens of seconds, such as every 10, 20, 30, 50, or 100 seconds, or may be in the order of minutes, such as every 1, 2, 3, 5, or 10 minutes. The device remains as long as the timer has not lapsed in a 'Timer Elapsed ?' step 305c. Upon an expiration of the timer, the device reverts to the 'Send Heartbeat' step 305a, and the process is resumed.

The congestion related activities of a device is shown in a flowchart 310a in FIG. 31, showing the flowchart 308, including the 'ONLINE' flowchart 308, describing to the device activity while in the 'ONLINE' state 302, and the 'CONGESTED' flowchart 307 describing the device activity while in the 'CONGESTED' state 303. The congestion related mechanism may also use heartbeat scheme, where the congestion state is periodically checked and reported. Upon entering the 'ONLINE' step 302 (corresponding to the 'ONLINE' state 302 in the state diagram 300), the device sends a message regarding its availability in a 'Send Non-Congested' step 308a. The device remains in a 'Congested ?' step 308b, as long as no congestion is detected. Upon detecting a congestion state, the device shifts to 'CONGESTED' state 303 and executes a 'CONGESTED' flowchart 307, starting with notifying its status as congested, in a 'Send Congested' step 307a. As long as the congestion condition is detected, the device stays in a 'Congested ?' step 307b. When the congestion criterion is not met anymore, the device reverts to normal operation in the "ONLINE' state 302 and executes the 'Send Non-Congested' step 308a.

Figure 32:
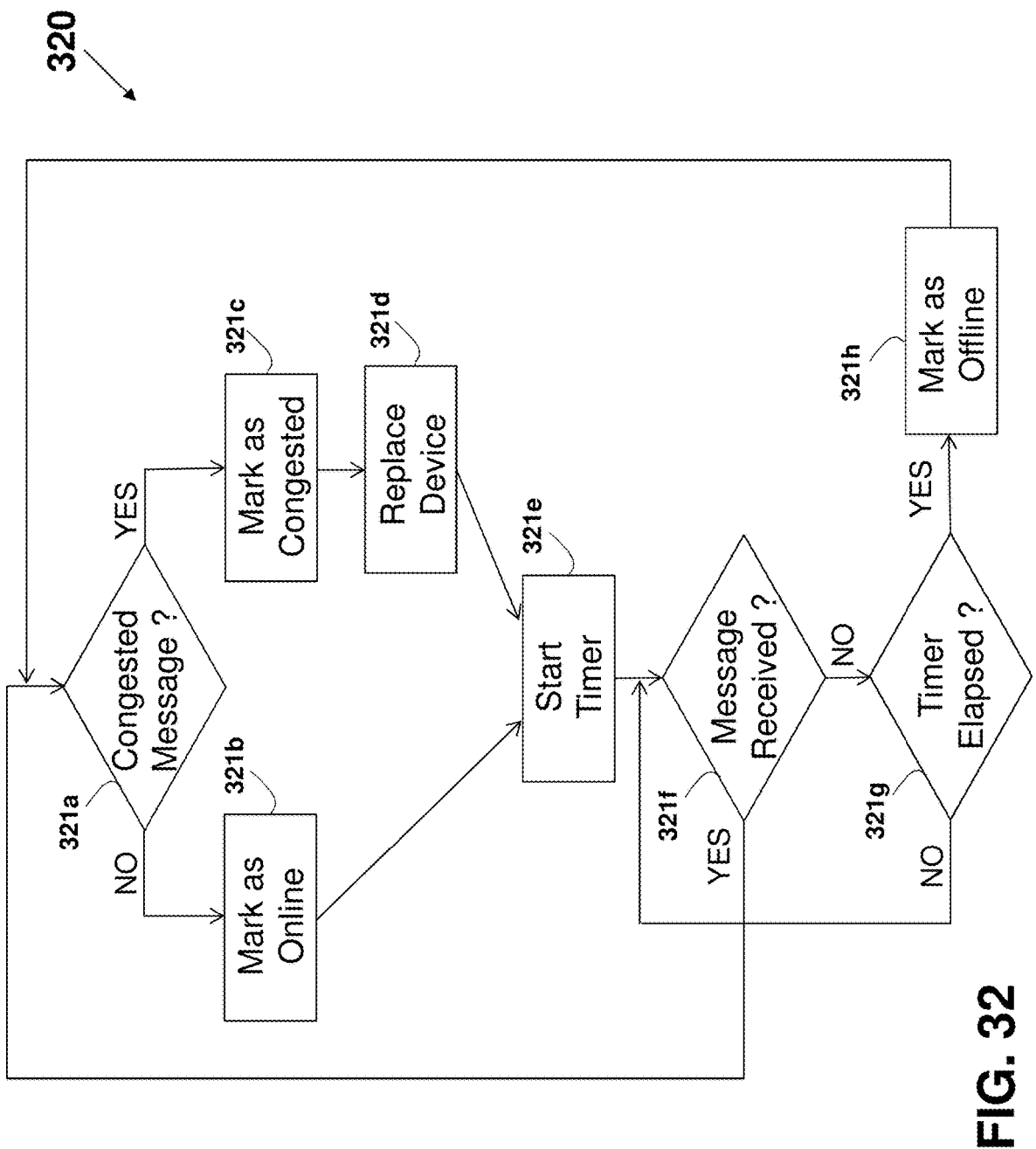
FIG. 32 illustrates schematically a simplified flowchart for determining a network element status of a connected device.

A device that monitors or tracks the status a tracked device (that executes the flowchart 310 and the flowchart 310a) may execute the flowchart 320 shown in FIG. 32. In a 'Message Received ?' step 321f the tracking device checks for receiving any message from the tracked device, which may be following the flowchart 310 and the flowchart 310a in FIG. 31. In a 'Congested Message?' step 321a, the received message type is checked. The received message may indicate that the tracked device is congested, for example, send the 'congested' message in the 'Send Congested' step 307a in the flowchart 307. In such a case, the tracked device status is marked as 'congested' in a 'Mark as Congested' step 321c, and the system or the tracking device may hold any further workload, or request for any service, relating to the tracked device. The received message may indicate that the tracked device is online, for example initiated as part of a 'Send Heartbeat' step 305a, as part of the 'Send Non-Congested' step 308a, or any other message indicating proper operation of the tracked device. In such a case, the tracked device status is marked as 'online' in a 'Mark as Online' step 321b, and the tracked device is assumed available to provide services, receive messages, or response to requests. In a 'Start Timer' step 321e, a timer configured to respond after a time interval has elapsed is triggered, similar to the timer described in the flowchart 305 in FIG. 31. In one example, the time interval measured by the timer starting at the 'Start Timer' step 321e may be the same as the time interval measured by the timer operated in the flowchart 305. Alternatively, the tracking device timer may be used to measure longer time interval, such as 5%, 10%, or 120% longer than the tracked device timer, allowing for an error margin. In the case a message is received in the 'Message Received ?' step 321*f*, the message is checked and the tracked device status is validated as described above. In the case no message is received from the tracked device, as noted in the 'Timer Elapsed ?' step 321*g*, it is assumed that the heartbeat mechanism of the tracked device shows as the flowchart 305 is inoperative, hence in a 'Mark as Offline' step 321*h* the tracked device is assumed to be inoperative, and thus not available for any services or requests.

In one example, all the devices herein (including server devices) in the system are tracked and are executing the tracked device flowchart 310 and the flowchart 310*a* in FIG. 31. Alternatively or in addition, all the devices in a system (including server devices) are tracking other devices and execute the tracking device flowcharts 320 in FIG. 32. In one example, the client devices, such as client device #1 31*a* and the client device #2 31*b* are the tracked devices, and thus execute the tracked device flowchart 310 and the flowchart 310*a* in FIG. 31, and the tracking devices are the tunnel devices (such as the tunnel device #1 33*a*, the tunnel device #2 33*b*, and the tunnel device #3 33*c*) and the acceleration server 32, each executing the tracking device flowcharts 320 in FIG. 32. Alternatively or in addition, the tunnel devices (such as the tunnel device #1 33*a*, the tunnel device #2 33*b*, and the tunnel device #3 33*c*) are the tracked devices, and thus execute the tracked device flowchart 310 and the flowchart 310*a* in FIG. 31, and the tracking devices are the client devices (such as client device #1 31*a* and the client device #2 31*b*) and the acceleration server 32, each executing the tracking device flowcharts 320 in FIG. 32. An example of the acceleration server 32 keeping a status of client devices and tunnel devices is shown as a column 'status' 41*e* in the table 40 in FIG. 5*a*, where the first row 42*a* entry shows that the associated tunnel is in an 'online' state, the second row 42*b* entry shows that the associated tunnel is in a 'congested' state, the third row 42*c* entry shows that the associated client is in an 'online' state, the fourth row 42*d* entry shows that the associated client is in an 'offline' state, and the fifth row 42*e* entry shows that the associated client/tunnel is in a 'congested' state. When the acceleration server 32 prepares a list of tunnel devices to be used as part of the 'Prepare List' step 81*e* in the flowchart 80, tunnel devices that are 'offline' and tunnel devices that are congested (such as the tunnel device associated with the entry of the second row 42*b* in the table 40) are not used, and are not included is the tunnel devices list sent to the requesting client device as part of the 'Send List' step 81*f* in the flowchart 80.

In one example, the client devices, such as client device #1 201*a* is the tracked devices, and thus execute the tracked device flowchart 310 and the flowchart 310*a* in FIG. 31, and the tracking devices are the agent devices (such as the agent device #1 103*a*, the agent device #2 103*b*, and the agent device #3 103*c*), the peer devices (such as the peer device #1 102*a*, the peer device #2 102*b*, and the peer device #3 102*c*), and the acceleration server 202, each executing the tracking device flowcharts 320 in FIG. 32. Alternatively or in addition, the agent devices (such as the agent device #1 103*a*, the agent device #2 103*b*, and the agent device #3 103*c*) are the tracked devices, and thus execute the tracked device flowchart 310 and the flowchart 310*a* in FIG. 31, and the tracking devices are the client devices (such as client device #1 201*a*), the peer devices (such as the peer device #1 102*a*, the peer device #2 102*b*, and the peer device #3 102*c*), and the acceleration server 202, each executing the tracking device flowchart 320 in FIG. 32. Alternatively or in addition, the peer devices (such as the peer device #1 102*a*, the peer device #2 102*b*, and the peer device #3 102*c*) are the tracked devices, and thus execute the tracked device flowchart 310 and the flowchart 310*a* in FIG. 31, and the tracking devices are the client devices (such as client device #1 201*a*), the agent devices (such as the agent device #1 103*a*, the agent device #2 103*b*, and the agent device #3 103*c*), and the acceleration server 202, each executing the tracking device flowchart 320 in FIG. 32. In such a system, an agent device or a peer device, that is either congested or offline, is not selected to provide a service to a client device. For example non-online agent devices are not selected as part of the 'Select Agents' step 231*f* in the flowchart 230, and non-online peer devices are not selected as part of the 'Select Peers' step 238*a* in the flowchart 230.

A device may be selected to provide a service, such as a tunnel device that may be selected (alone or as part of a group) by a client device as part of the 'Select Tunnels' step 101*a* in the flowchart 100. The selected tunnel device may shift to the 'offline' state 301 or to the 'congested' state 303, and thus respectively becomes unavailable or less effective to use. In such a case, a new tunnel device, that was not formerly selected, may be now selected as a substitute for the 'offline' or 'congested' tunnel device as part of a 'Replace Device' step 321*d*. Similarly, an agent device may be selected (alone or as part of a group) by a client device as part of the 'Select Agents' step 231*f* in the flowchart 230. The selected agent device may shift to the 'offline' state 301 or to the 'congested' state 303, and thus respectively becomes unavailable or less effective to use. In such a case, a new agent device, that was not formerly selected, may be now selected as a substitute for the 'offline' or 'congested' agent device as part of a 'Replace Device' step 321*d*. Alternatively or in addition, a peer device may be selected (alone or as part of a group) by a client device as part of the 'Select Peers' step 238*a* in the flowchart 230*b*. The selected peer device may shift to the 'offline' state 301 or to the 'congested' state 303, and thus respectively becomes unavailable or less effective to use. In such a case, a new peer device, that was not formerly selected, may be now selected as a substitute for the 'offline' or 'congested' peer device as part of a 'Replace Device' step 321*d*.

Alternatively or in addition, in the case where multiple devices are selected to provide a service, such as a group of multiple tunnel devices, a group of multiple agent devices, or a group of multiple peer devices, the unavailability of a single device or multiple devices in the group (due to shifting to 'offline' state 301 or to 'congested' state 303), may not be handled or corrected, as long as a performance criterion or a threshold is not crossed. For example, assume 5 tunnel devices are assigned to a client device in the 'Select Tunnels' step 101*a*, where the system set a criterion of a minimum of 3 operative tunnel devices. Hence, as long as at least 3 tunnel devices are available and operational, no corrective action will be taken, and no devices will be replaced as part of the 'Replace Device' step 321*d*. Hence, even in the case of two tunnel devices becoming unavailable or congested, no new tunnel devices will be provided to fetch content for the applicable client device. However, in such a case, if 3 tunnel devices become unavailable rendering only 2 in operational (online) state, at least one new tunnel device will be selected (according to any criterion described herein) and will be used as a replacement as part of the 'Replace Device' step 321*d*.

The system 30 shown in FIG. 5 above describes the components involved in fetching content using tunnel devices. The system 30 comprises the acceleration server 32, which may execute a part of, or the whole of, the acceleration server tunnel-related flowcharts, such as the flowchart 80 shown in FIG. 8 or the flowchart 90 shown in FIG. 9. Further, the system 30 comprises client devices such as the client device #1 31*a* and the client device #2 31*b*, each of which may execute a part of, or the whole of, the client device related flowcharts, such as the flowchart 60 shown in FIG. 6, the flowchart 100 shown in FIG. 10, or the flowchart 100*a* shown in FIG. 10*a*. In addition, the system 30 comprises tunnel devices such as the tunnel device #1 33*a*, the tunnel device #2 33*b*, and the tunnel device #3 33*c*, each of which may execute a part of, or the whole of, the tunnel device related flowcharts, such as the flowchart 70 shown in FIG. 7.

Similarly, the system 200 shown in FIG. 20 above describes the components involved in fetching content using agent and peer devices. The system 200 comprises the acceleration server 202, which may execute a part of, or the whole of, the acceleration server agent/peer related flowcharts, such as the flowchart 250 shown in FIG. 25. Further, the system 200 comprises client devices such as the client device #1 201*a*, which may execute a part of, or the whole of, the client device related flowcharts, such as the flowchart 230 shown in FIG. 23, the flowchart 230*a* shown in FIG. 23*a*, or the flowchart 230*b* shown in FIG. 23*b*. In addition, the system 200 comprises agent devices such as the agent device #1 103*a* and the agent device #2 103*b*, each of which may execute a part of, or the whole of, the agent device related flowcharts, such as the flowchart 240 shown in FIG. 24. Furthermore, the system 200 comprises peer devices such as the peer device #1 102*a*, the peer device #2 103*b*, and the peer device #3 103*c*, each of which may execute a part of, or the whole of, the agent device related flowcharts, such as the flowchart 240*a* shown in FIG. 24*a*.

Any network element in the system may be a dedicated device that assumes only a single role, and thus being only a client (using tunnels), a tunnel, a client (using agents/peers), an agent, or a peer device. Alternatively or in addition, a network element may be capable of assuming two or more roles, either at different times or simultaneously, from the list of roles including a client (using tunnels), a tunnel, a client (using agents/peers), an agent, or a peer device. Alternatively or in addition, a device may be capable of assuming all of the above roles. Further, the same server may be both the tunnels-related acceleration server 32 and the peer/agent related acceleration server 202, either simultaneously or at different times. Alternately, two (or more) distinct servers may be used.

Figure 22:
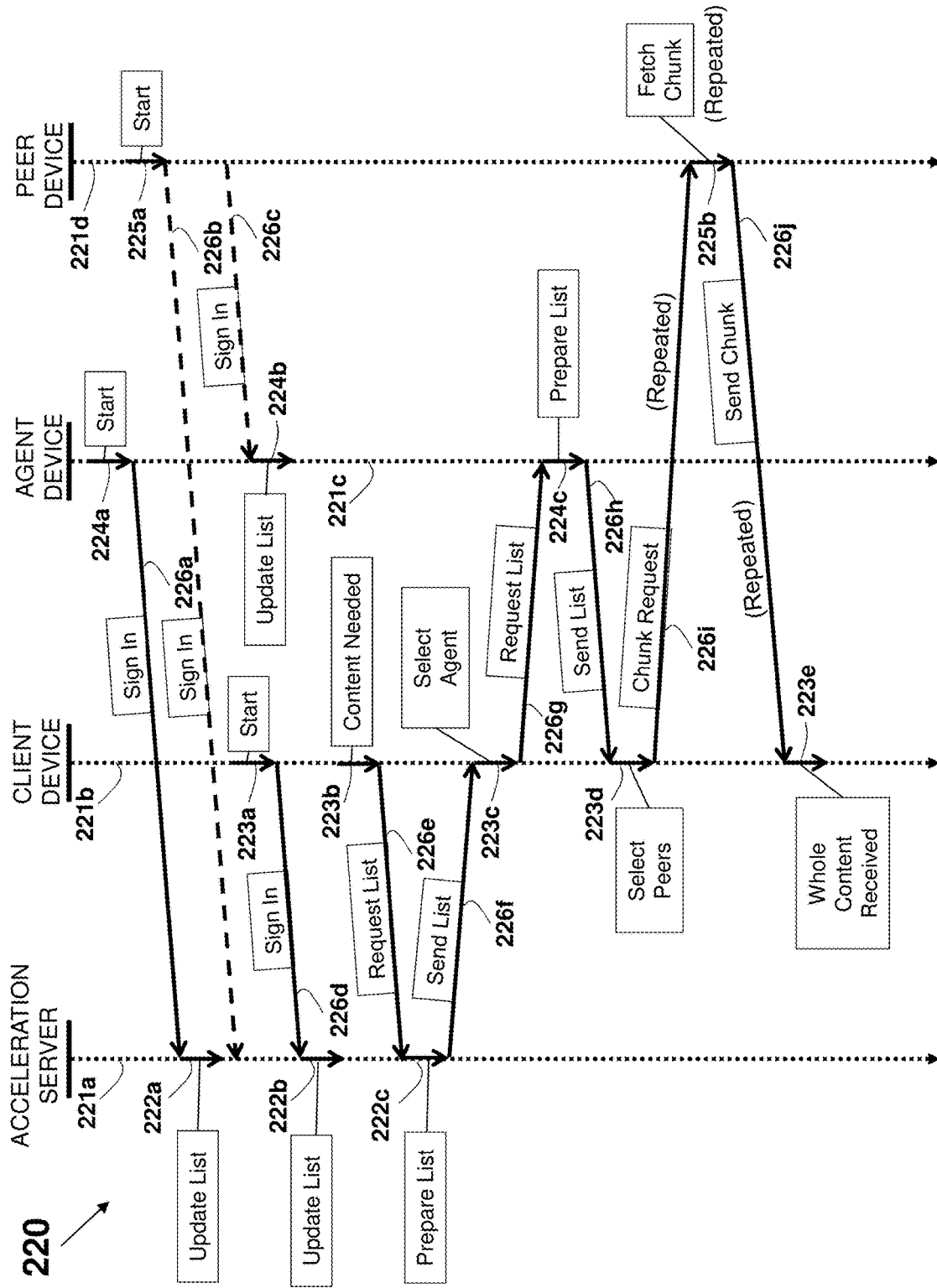
FIG. 22 illustrates schematically a timing chart of messages and states associated with messages exchanged over the Internet in a system using peer and agent devices.
Figure 33:
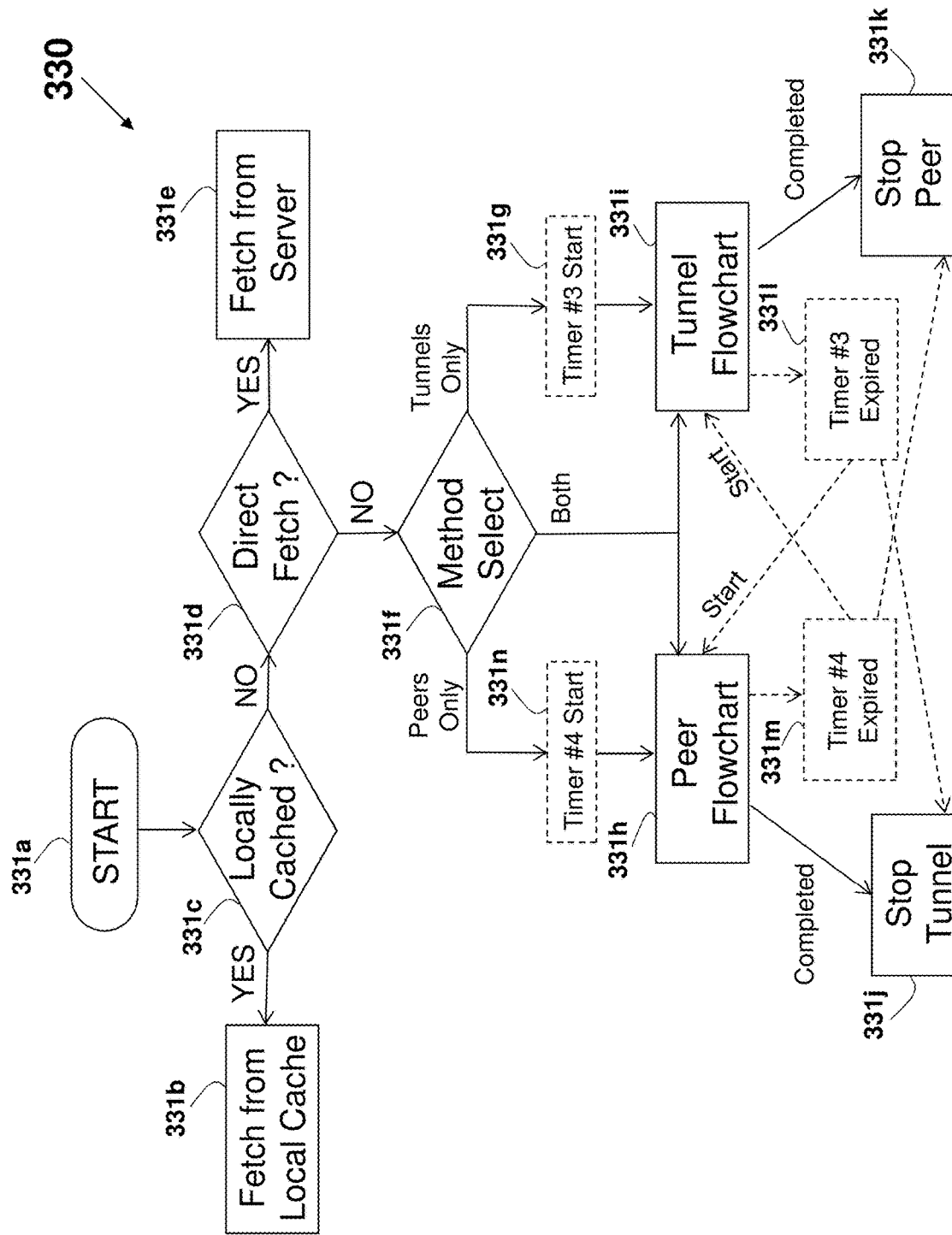
FIG. 33 illustrates schematically a simplified flowchart for determining by a client the content fetching method.
Figure 34:
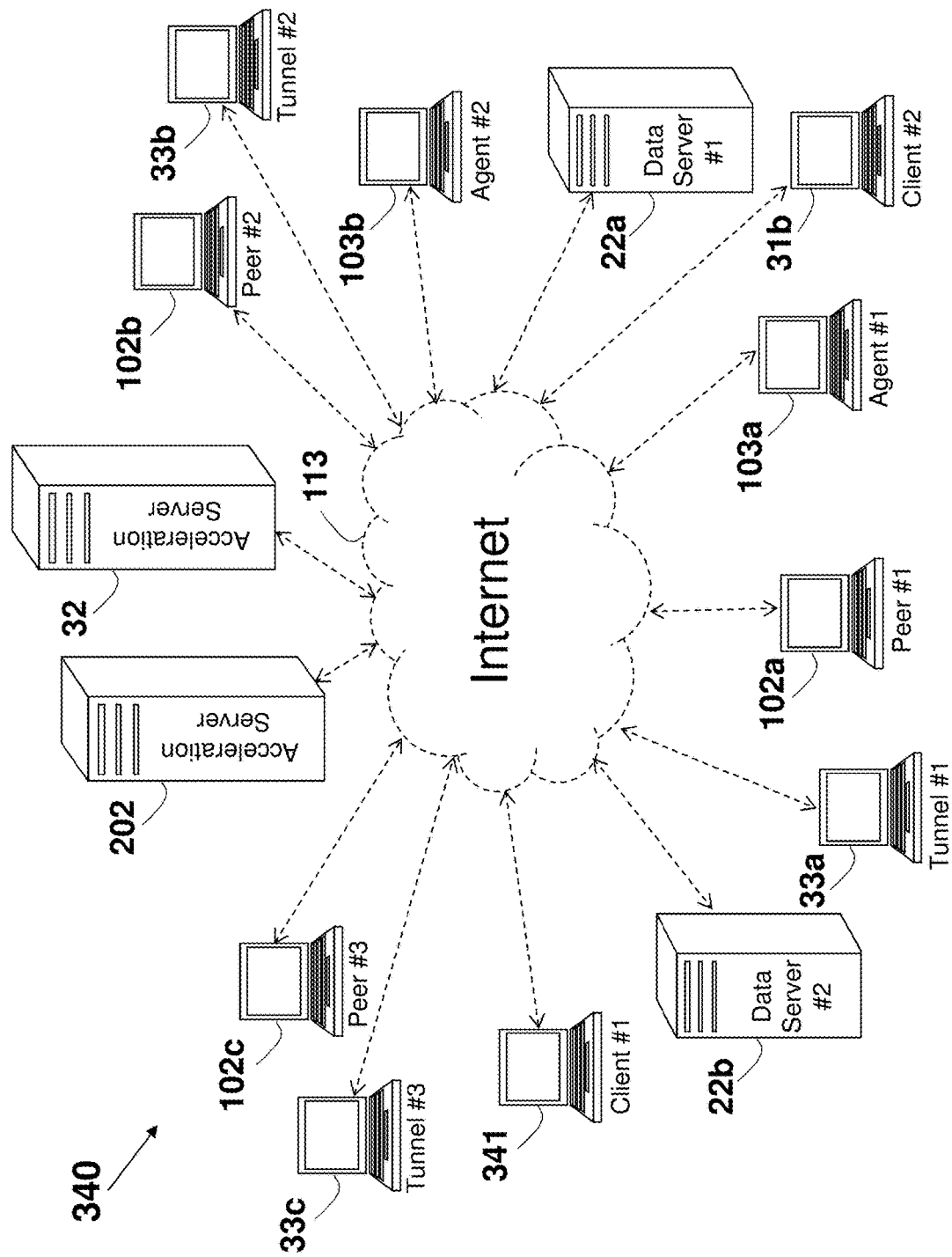
FIG. 34 depicts schematically client devices, tunnel devices, agent devices, peer devices, and servers connected to the Internet.

Referring to a system 340 shown in FIG. 34, integrating both the system 30 shown in FIG. 5 and the system 200 shown in FIG. 20. Using such a system, content may be fetched using either tunnel devices, as described, for example, in the timing and messaging chart 50 shown in FIG. 5*b*, or using agent and peer devices as described, for example, in the timing and messaging chart 220 shown in FIG. 22, or both methods together. A client device such as a client device #1 341 may assume the role of the tunnel-using client device #1 31*a*, the role of the agent/peers-using client device #1 201*a*, or both. Such a dual-function client device may execute the flowchart 330 shown in FIG. 33, which is based on using one of the methods described herein, or both.

The client device 341 in the system 340 may use tunnel devices and assume the role of the client device #1 31*a*, may use peer/agent devices and assume the role of the client device #1 201*a*, or may use both methods, as shown in a flow chart 330 shown in FIG. 33. Upon a content request, the method starts in a 'START' step 331*a*. First, it is checked in a 'Locally Cached ?' step 331*c* if the requested content is available in the client device #1 341 itself, for example in its cache or any available storage. In one example, the content may be available in the cache memory, since the content was fetched in a past transaction and stored in the device, such as in 'Store Content' step 145 as a part of the flowchart 140 in FIG. 14, or in a 'Store Content' step 235*a* as a part of the flowchart 230*a*. In the case of locally available content, the content is fetched from the cache (or any other storage) as part of a 'Fetch from Local cache' step 331*b*. In the case the requested content is not locally available at the device, the client device #1 341 may check in a 'Direct Fetch ?' step 331*d* the possibility of directly accessing a data server (such as the data server #1 22*a*) storing the content. In one example, such directly approaching the data server without using any intermediate devices such as using tunnel devices, or fetching the content from peer devices, may result in less overhead and handling, and sometimes may be faster. In the case of direct fetching, the client device #1 341 accesses and fetch the requested content directly from the data server in a 'Fetch from Server' step 331*e*.

If the direct fetching is not selected, then in a 'Method Select' step 331*f*, the device selects which content fetching method to use. The selection of which method to use may be based on estimation of the latency associated with each method until the content is fully fetched. In one example, a method may be selected when the estimated latency using the other method is substantially longer. The client device #1 341 may select to only use tunnel devices ('Tunnels Only'), and in this scenario, it will execute the tunnels-using client device flowchart (such as the flowchart 60 in FIG. 6) as part of a 'Tunnel Flowchart' step 331*i*. In one example, the estimated latency using the tunnel-based method may not apply in reality, and may be much longer than estimated. In such a case, it may be beneficial to revert to the other method, which may be faster. Hence, a timer may be used in order to assess in real-time the latency associated with a method, in order to reconsider which method to use. Such a Timer #3 is set to the estimated latency expected in the tunnels-using method, preferably with an additional margin to allow for estimation errors or inaccuracies. The Timer #3 starts in a 'Timer #3 Start' step 331*g*, before or in parallel the starting of the tunnel-using method in the 'Tunnel Flowchart' step 331*i*. In the case the content fetching in the 'Tunnel Flowchart' step 331*i* is completed before the timer #3 expiration, the selected method has succeeded to fetch the content in full and the process is completed. In the case where the Timer #3 expires in a 'Timer #3 Expired' step 331*l* before content fetching completion, the tunnel-based method in the 'Tunnel Flowchart' step 331*i* may be stopped in 'Stop Tunnel' step 331*j* in order to save resources (such as processing power), and the 'Peer Flowchart' step 331*h* is initiated, executing the alternate method for fetching the content.

Alternatively, the client device #1 341 may select to only use peer/agent devices ('Peers Only'), and in this scenario, it will execute the peers/agents-using client device flowchart (such as the flowchart 230 in FIG. 23 and the flowchart 230*a* in FIG. 23*a*) as part of a 'Peer Flowchart' step 331*h*. In one example, the estimated latency using the tunnel-based method may not apply in reality, and may be much longer than estimated. In such a case, it may be beneficial to revert to the other method, which may be faster. Hence, a timer may be used in order to assess in real-time the latency associated with a method, in order to reconsider which method to use. Such a Timer #4 is set to the estimated latency expected in the peers/agents-using method, preferably with an additional margin to allow for estimation errors or inaccuracies. The Timer #4 starts in a 'Timer #4 Start' step 331n, before or in parallel to the starting of the peers/agents-using method in the 'Peers Flowchart' step 331h. In the case the content fetching in the 'Peer Flowchart' step 331h is completed before the timer #4 expiration, the selected method has succeeded to fetch the content in full and the process is completed. In the case where the Timer #4 expires in a 'Timer #4 Expired' step 331m before content fetching completion, the peers/agents-based method in the 'Peer Flowchart' step 331h may be stopped in a 'Stop Peer' step 331k in order to save resources (such as processing power), and the 'Tunnel Flowchart' step 331i is initiated, executing the alternate method for fetching the content.

Alternatively or in addition, the client device #1 341 may select to use both methods ('Both'), and such to simultaneously execute both the tunnels-using client device flowchart (such as the flowchart 60 in FIG. 6) as part of the 'Tunnel Flowchart' step 331i, and the peers/agents-using client device flowchart (such as the flowchart 230 in FIG. 23 and the flowchart 230a in FIG. 23a) as part of the 'Peer Flowchart' step 331h. The two methods are executed in parallel, and one of them is completed before the other. In the case using of tunnels is faster than using peer/agent devices, the content will be fetched in full using this method, and the 'Tunnel Flowchart' step 331i will be completed first. In such a case, in a 'Stop Peer' step 331k the peer/agent using method executed as part of the 'Peer Flowchart' step 331h is not needed anymore (since the content was fetched in full) and is stopped, in order to save processing power and bandwidth. Similarly, In the case the using peers/agents is faster than using tunnel devices, the content will be fetched in full using this method, and the 'Peer Flowchart' step 331h will be completed first. In such a case, in a 'Stop Tunnel' step 331j the tunnels-using method executed as part of the 'Tunnel Flowchart' step 331i is not needed anymore (since the content was fetched in full) and is stopped, in order to save processing power and bandwidth.

A content fetched or sent by a network element may consist of, or include, video data. Video data fetched via the Internet are typically identified by a set of characters, including three fields, relating to a URL domain name, a specific video identifier, and offset, relating to the viewing point in the video data itself. For example, in a video identifier such as https://www.youtube.com/watch?v=9mSb3P7cZIE?ST=1:48, the field 'https://www.youtube.com' is the URL domain, which identify the server from which the video can be fetched, the part '9mSb3P7cZIE' identifies the video data (such as a movie) as a whole, and the offset '1:48' part in the video starting point, in this example after 1 minute and 48 seconds after the video start point. The offset may be presented (as part of the video identifier) in time using another format such as #T=3M54S (denoting starting point after 3 minutes and 54 seconds) is bytes (such as B=10344, denoting a starting point after 10344 bytes), relative offset (such as in %, such as R=54.3, denoting that the starting point is after 54.3% of the total video length, such as byte 543 out of 100 bytes sized video content)), and various other methods. In the case the content to be fetched is a video data, while the video content may be located in other network elements, it may be identified differently than the requested URL or content identifier, and as such may not be easily fetched. In one example, in order to form a common method for identification of a video-related URL, the offset is detected (e.g., by the '/' symbol, or by the identifying the offset format, or both), and the URL is stored (such as in a cache) identified as the domain name and the video data identifier only, where the offset is stored as additional separate attribute. In one example, the offset presentation is normalized to a common format, which is understood by all of the network elements.

Figure 43:
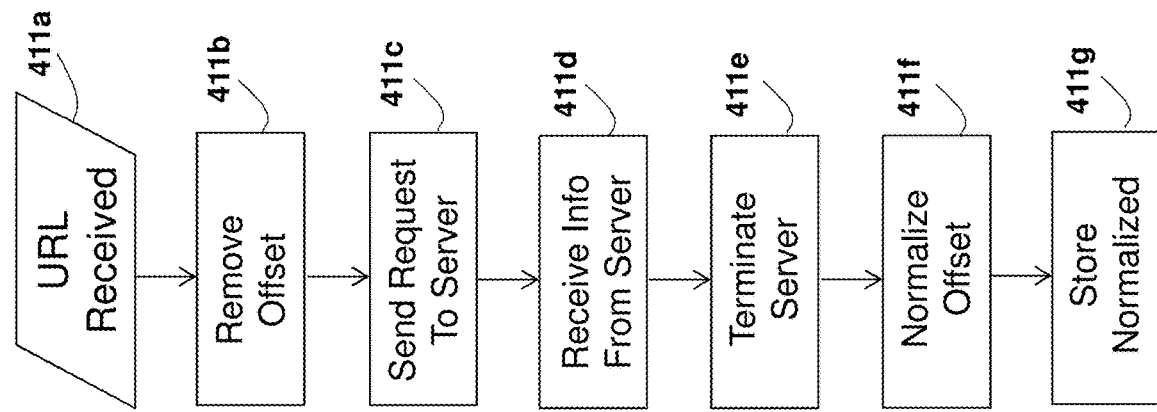
FIG. 43 illustrates schematically a simplified flowchart relating to the normalizing reference of a video content.

A flowchart 410 shown in FIG. 43 describes a method for forming a unified identifying scheme for video content. The video-related content is received (or requested) by a network element in a 'URL Received' step 411a. In a 'Remove Offset' step 411b, the offset part of the URL is detected and removed, such as by detecting the '/' symbol, or by the identifying the offset format, or both. A direct request for the video content is sent to a respective data server (such as the data server #1 22a) in a 'Send Request To Server' step 411c. Typically, the initial part of the data server response includes meta-data information, including the content length, in a form of time (such as hours, minutes, and seconds) or size (such as in bytes). Once the content size or length information is received, there is no need for any communication with the data server, and the communication session is terminated in a 'Terminate Server' step 411e. The content size or length information is used for unifying the form of the video identifier in a 'Normalize Offset' step 411f. For example, a unified scheme may include relating offset, so a video file that start at byte 345 out of 1000 total bytes will be identified as 34.5% (345/1000), and a video file that starts after 1 minute 30 second (1:30) out of a total of 10 minutes will be identified as 15%. Similarly, files that do not end at the video end may also be accordingly identified. For example, a video file that starts after 2 minutes and ends after 7 minutes, will be identified as 20-70%. In such a unified scheme, a network element may store (such as in a cache), or request, parts of a video file by using the common identification scheme. For example, a network element that stores the range from 1 minute to 22 minutes out of a video file, may respond to a request asking for the range of minute 15 to minute 17.

IP-based geolocation (commonly known as geolocation) is a mapping of an IP address (or MAC address) to the real-world geographic location of a computing device or a mobile device connected to the Internet. The IP address based location data may include information such as country, region, city, postal/zip code, latitude, longitude, or Timezone. Deeper data sets can determine other parameters such as domain name, connection speed, ISP, language, proxies, company name, US DMA/MSA, NAICS codes, and home/business classification. The geolocation is further described in the publication entitled: "*Towards Street-Level Client-Independent IP Geolocation*" by Yong Wang et al., downloaded from the Internet on July 2014, and in an Information Systems Audit and Control Association (ISACA) 2011 white-paper entitled: "*Geolocation: Risk, Issues and Strategies*", which are both incorporated in their entirety for all purposes as if fully set forth herein. There are a number of commercially available geolocation databases, such as a web-site http://www.ip2location.com operated by Ip2location.com headquartered in Penang, Malaysia, offering IP geolocation software applications, and geolocation databases may be obtained from IpInfoDB operating website http://ipinfodb.com, and by Max Mind, Inc., based in Waltham, Massachusetts, U.S.A, operating the web-site https://www.maxmind.com/en/home.

Further, the W3C Geolocation API is an effort by the World Wide Web Consortium (W3C) to standardize an interface to retrieve the geographical location information for a client-side device. It defines a set of objects, ECMA Script standard compliant, that executing in the client application give the client's device location through the consulting of Location Information Servers, which are transparent for the Application Programming Interface (API). The most common sources of location information are IP address, Wi-Fi and Bluetooth MAC address, radio-frequency identification (RFID), Wi-Fi connection location, or device Global Positioning System (GPS) and GSM/CDMA cell IDs. The location is returned with a given accuracy depending on the best location information source available. The W3C Recommendation for the geolocation API specifications draft dated Oct. 24, 2013, is available from the web-site http://www.w3.org/TR/2013/REC-geolocation-API-20131024.
Geolocation-based addressing is described in U.S. Pat. No. 7,929,535 to Chen et al., entitled: "Geolocation-based Addressing Method for IPv6 Addresses", and in U.S. Pat. No. 6,236,652 to Preston et al., entitled: "Geo-spacial Internet Protocol Addressing", and in U.S. Patent Application Publication No. 2005/0018645 to Mustonen et al., entitled: "Utilization of Geographic Location Information in IP Addressing", which are all incorporated in their entirety for all purposes as if fully set forth herein.

Geolocation may be used by any network element. The peer devices described above as storing a content (chunks) that is required by a client device, and thus the client device fetches the content from the peer devices rather than directly from the web server (or in addition to it). In some cases, multiple devices are available storing unknown content which may be the content required by a client device. The geolocation may be used to determine which available devices may be, or are expected to be, storing the content that is requested. In this context, two Internet-connected devices, each identified by a respective IP address, for example, are considered as being 'close' if there is a likelihood that the same content is stored in both, or that both devices fetched the same content from a data server. Similarly, two devices are considered closer than the other two devices if there is a higher likelihood that they store the same content (from the same data server).

Figure 35:
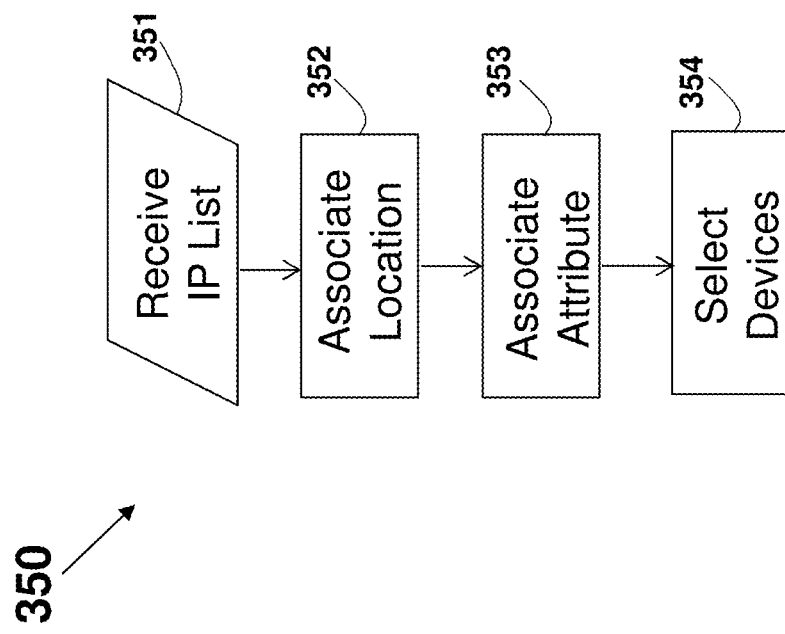
FIG. 35 illustrates schematically a simplified flowchart relating to selecting devices based on an attribute relating to their geographical location.

Referring now to FIG. 35 showing a flowchart 350, which may be executed by any network element, describing a method for selecting devices based on a geolocation and on location-specific attributes, for use by a requesting device, interested in obtaining a content from a data server. In a 'Receive IP List' step 351 a list of devices available to select from is obtained. In one example, the devices may be identified by their respective IP addresses. In an 'Associate Location' step 352, the IP address of each of the devices is used to obtain the physical geographical location of the device using any geolocation schemes, such as looking up a local database stored in the requesting device, or using a remote database via the Internet. The physical geographical location may include a country, region (such as state or county), city, postal/zip code, latitude, longitude, or timezone. In a 'Select Devices' step 354, one or more devices are selected from the list.

In one example, the selection is based only on the obtained the geographical location. In one example, such selection may be based on the physical geographical location of the requesting device (obtained locally at the requesting device or by using a geolocation), a physical geographical location of the data server storing a content that is requested (obtained locally or by using geolocation), or relating to physical geographical location of IP addressable, Internet connected device. In one example, the devices may be selected based on being in the same location, such as in the same continent, country, region, city, street, or timezone. The devices may be selected from the list based on the physical geographical distance, where 'closeness' is defined as based on actual geographical distance between devices, where shorter distance indicates closer devices. For example, is the case where the latitude and the longitude are obtained, the physical distance between each device in the list and the requesting device (or the data server or another device) may be calculated, and the nearest device will be first selected, then the second nearest device, and so on. Alternatively or in addition, devices in the same city (or street) as the requesting device are considered as the closest and may be first selected, then the devices that are in the same region or country may be considered as close and may be selected next.

In one example, an attribute is used as a basis for defining 'closeness' in the 'Select Devices' step 354, and each device is associated with an attribute value based on its geographical physical location, in an 'Associate Attribute' step 353. The information relating to the various attributes can be obtained from a database that is local to the requesting device, or may be publicly available via the Internet, using city, region, or country based databases. In one example, country based information may be obtained via the Internet, such as 'The World Factbook' website by the U.S. Central Intelligence Agency (CIA) having a URL: "https://www.cia.gov/library/publications/the-world-factbook/docs/notesanddefs.html?fieldkey=2113&alphaletter=G&term=Geography—note", and the United Nations Statistics Division website: https://data.un.org.

One example of such an attribute is the language that is widely spoken (or is the formal language) in a geographical location, such as in a country. In this aspect, while Portugal is geographically closer to Germany than to Brazil, using the language as the selection attribute suggest that Portugal is 'closer' to Brazil, since the Portuguese language is popular in both these countries, and Portuguese—speaking Portugal is language-wise distant from German-speaking Germany. Similarly, Arabic-spoken countries are close to each other, regardless of the actual geographical distance. Such 'closeness' definition is supported, since a web-site or URL having a content (such as text, audio or video) in Portuguese language, is likely to be accessed by users from Brazil and Portugal, and less likely to be accessed by users located in Germany.

Another example of an attribute is the popular sport type in the geographical location. For example, soccer is most popular in Brazil and in Germany, while American football is popular in the U.S. Regarding this aspect, Brazil is considered to be closer to Germany than to the U.S., as it is expected that web-sites associated with soccer will be more popular with users in Germany and Brazil rather than with user in North-America. Another example of an attribute is the religion popular in a region or a country. In this aspect, Turkey and Egypt, both being Islamic countries, are religion-wise closer than Turkey and Greece, having different dominant religion, in spite of their geographical proximity. For example, web-site offering Islamic-related content are likely to be more popular in Turkey and Egypt, rather than in Greece.

Other attributes relating to people and society may include race and ethnic groups, and demographic or social characteristics, such as population, age structure, population growth rate, death rate, birth rate, migration rate, sex ratio, life expectancy, and health expenditures. Other attributes may include economical-related characteristics (of a location or a country), such as Gross Domestic Product (GDP), GDP per capita (PPP), gross national saving, agriculture products, industry types, labor force, unemployment rate, household income or consumption by percentage share, Government budget, taxes and other revenues, inflation rate (consumer prices), export/import of goods and services, household consumption, government consumption, and investment in fixed capital.

Another example of an attribute is the weather in a location or a country. Countries or locations associated with cold weather are being considered weather-wise closer than locations having distinct and different weather. For example, web-sites relating to ski resorts or snow related equipment are likely to be more popular in cold weather countries than countries having a desert climate. Similarly, web-sites relating to cooling equipment (such as air conditioners) are likely to be more popular in warm weather locations and countries. In addition to climate, other geographical related characteristics include having a coastline, terrain, natural resources, and environment.

In one example, the following demographic attributes or categories can be used: Gender, such as male or female; age, such as the age groups 0-11, 12-17, 18-20, 21-24, 25-34, 35-49, 50-54, 55-64, and 65-99; income (in US $, for example) such as 0-24,999, 25,000-49,999, 50,000-74,999, 75,000-99,999, 100,000-149,000, and 150,000 and up; education such as some High School, High School Graduate, Home College, Associates Degree, Bachelor's Degree, and Post Graduate; occupation such as administrative or Clerical, Craftsman, Educators, Executive, Laborer, Homemaker, Military, Professional, Sales, Service, Student, Technical, Self-employed, and Retired; race such as Hispanic, Non-Hispanic, African American, Caucasian, Asian, and Native American. Alternatively or in addition, the following psychographic categories may be used: Travel, such as Air, Car Rental, Lodging; Reservations; and Maps; Finance/Investments such as Banking Brokers, Quotes, Insurance, and Mortgage; sports, such as Auto Racing, Baseball, Basketball, Fantasy Sports, Football, Hockey, Soccer, Golf, and Tennis; recreation & hobbies such as Cycling, Golf, Hiking, Sailing, Snow, Sports, Surfing, Tennis, Home & Garden, Pets, Genealogy, Photography, Games, and Toys; entertainment such as Movies/Film, Music, Theater, TV/Video, Sci-Fi, Humor, Games, and Toys; auto such as Trucks, SUV, and Sports car; news and information such as Magazines and Weather; politics such as Democrat and Republican; E-shopping such as Groceries, Furniture, Auctions, Cards/Gifts, Apparel, Books, Music, TV/Video; Software such as E-purchasing and Computers; Science; Employment; health & fitness; Medical; Pharmacy; Dating/Single; Advice; Beauty; Weddings; Maternity; or Spirituality/Religion such as Astrology. An example of profiling web users is described in U.S. Pat. No. 8,108,245 to Hosea et al., entitled: "Method and System for Web User Profiling and Selectivve Content Delivery", which is incorporated in its entirety for all purposes as if fully set forth herein.

A bitmap (a.k.a. bit array or bitmap index) is a mapping from some domain (for example, a range of integers) to bits (values that are zero or one). In computer graphics, when the domain is a rectangle (indexed by two coordinates) a bitmap gives a way to store a binary image, that is, an image in which each pixel is either black or white (or any two colors). More generally, the term 'bitmap' is used herein to include, but not limited to, a pixmap, which refers to a map of pixels, where each one may store more than two colors, thus using more than one bit per pixel. A bitmap is a type of memory organization or image file format used to store digital images.

In typical uncompressed bitmaps, image pixels are generally stored with a color depth of 1, 4, 8, 16, 24, 32, 48, or 64 bits per pixel. Pixels of 8 bits and fewer can represent either grayscale or indexed color. An alpha channel (for transparency) may be stored in a separate bitmap, where it is similar to a grayscale bitmap, or in a fourth channel that, for example, converts 24-bit images to 32 bits per pixel. The bits representing the bitmap pixels may be packed or unpacked (spaced out to byte or word boundaries), depending on the format or device requirements. Depending on the color depth, a pixel in the picture will occupy at least n/8 bytes, where n is the bit depth. For an uncompressed, packed within rows, bitmap, such as is stored in Microsoft DIB or BMP file format, or in uncompressed TIFF format, a lower bound on storage size for a n-bit-per-pixel (2n colors) bitmap, in bytes, can be calculated as: size=width·height·n/8, where height and width are given in pixels. In the formula above, header size and color palette size, if any, are not included.

The BMP file format, also known as bitmap image file or Device Independent Bitmap (DIB) file format or simply a bitmap, is a raster graphics image file format used to store bitmap digital images, independently of the display device (such as a graphics adapter), especially on Microsoft Windows and OS/2 operating systems. The BMP file format is capable of storing 2D digital images of arbitrary width, height, and resolution, both monochrome and color, in various color depths, and optionally with data compression, alpha channels, and color profiles. The Windows Metafile (WMF) specification covers the BMP file format.

An image scaling is the process of resizing a digital image. Scaling is a non-trivial process that involves a trade-off between efficiency, smoothness and sharpness. With bitmap graphics, as the size of an image is reduced or enlarged, the pixels that form the image become increasingly visible, making the image appear "soft" if pixels are averaged, or jagged if not. With vector graphics, the trade-off may be in processing power for re-rendering the image, which may be noticeable as slow re-rendering with still graphics, or slower frame rate and frame skipping in computer animation.

Apart from fitting a smaller display area, image size is most commonly decreased (or subsampled or downsampled) in order to produce thumbnails. Enlarging an image (upsampling or interpolating) is generally common for making smaller imagery fit a bigger screen in fullscreen mode, for example. In "zooming" a bitmap image, it is not possible to discover any more information in the image than already exists, and image quality inevitably suffers. However, there are several methods of increasing the number of pixels that an image contains, which evens out the appearance of the original pixels. Typically scaling of an image, such as enlarging or reducing the image, involves manipulation of one or more pixels of the original image into one or more pixels in the target image. In many applications, image scaling is required to be executed in real-time, requiring processing power. Scaling or resizing of an image is typically measured as the ratio (in %, for example) of the number of pixels of the resulting image relative to the number of pixels in the original image. Some image scaling schemes are simple and may be quickly and efficiently processed, such as the examples shown in FIG. 36a. An original image is shown in grid 362a, including an exemplary pixel 363, and the image after image scaling of 400% is shown as grid 362b, where the single pixel 363 is manipulated into four pixels 363a, 363b, 363c, and 363d arranged as a 2×2 square matrix. Similarly, each of the pixels in the original image is converted into 4 pixels arranged as a square, where all the newly generated pixels have the same bit value ('0' or '1') in a bitmap, or the color value in case of multiple bits per pixel. Similarly, an original image is shown in grid 365*a*, including an exemplary pixel 364, and the image after image scaling of 900% is shown as grid 365*b*, where the single pixel 364 is manipulated into nine pixels 364*a*, 364*b*, 364*c*, 364*d*, 364*e*, 364*f*, 364*g*, 364*h*, and 364*i* arranged as a 3×3 square. Similarly, each of the pixels in the original image is converted into 9 pixels arranged as a square, where all the newly generated pixels have the same bit value ('0' or '1') in a bitmap, or the color value in case of multiple bits per pixel.

Figure 36:
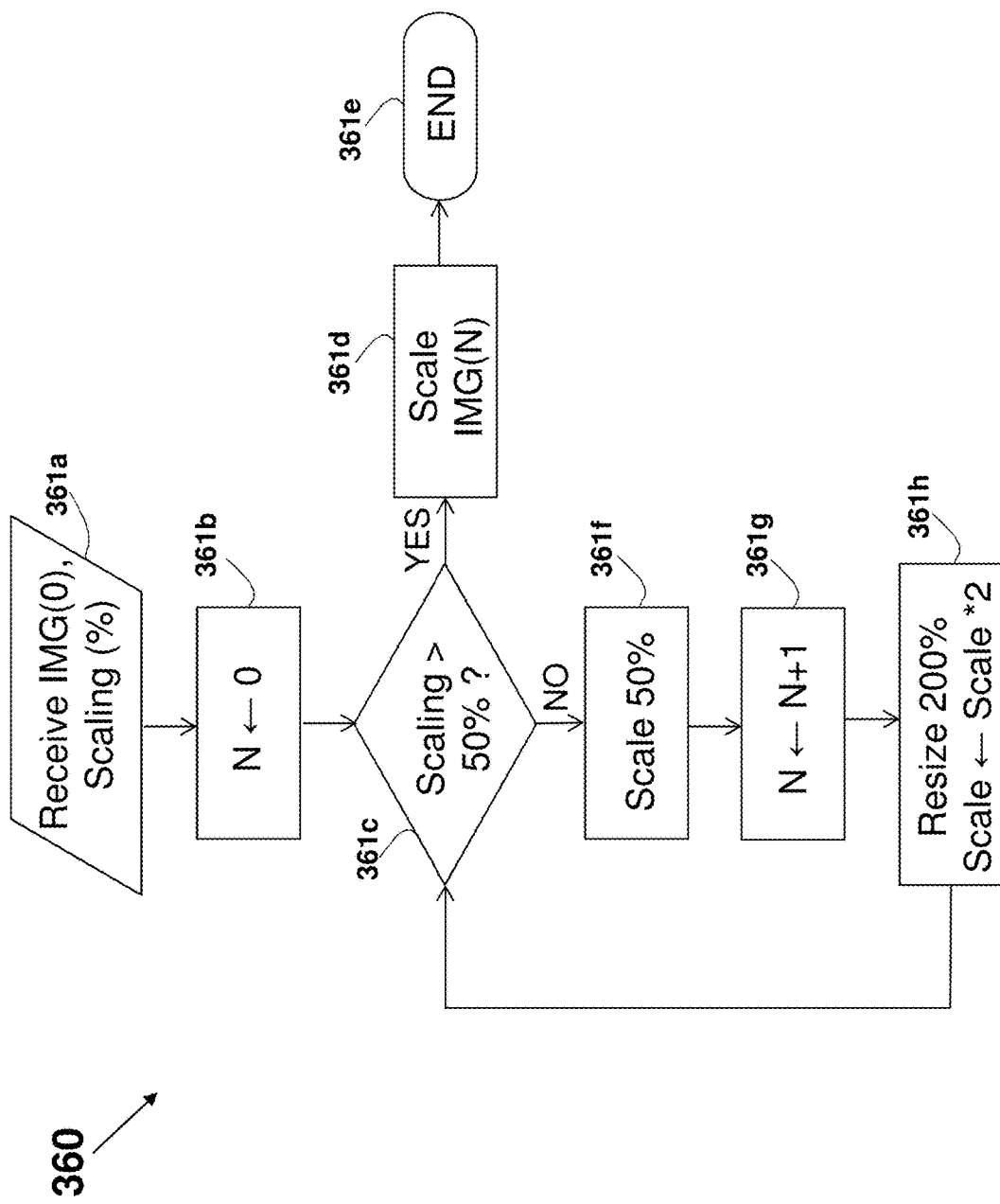
FIG. 36 illustrates schematically a simplified flowchart relating to scaling an image.
Figure 36A:
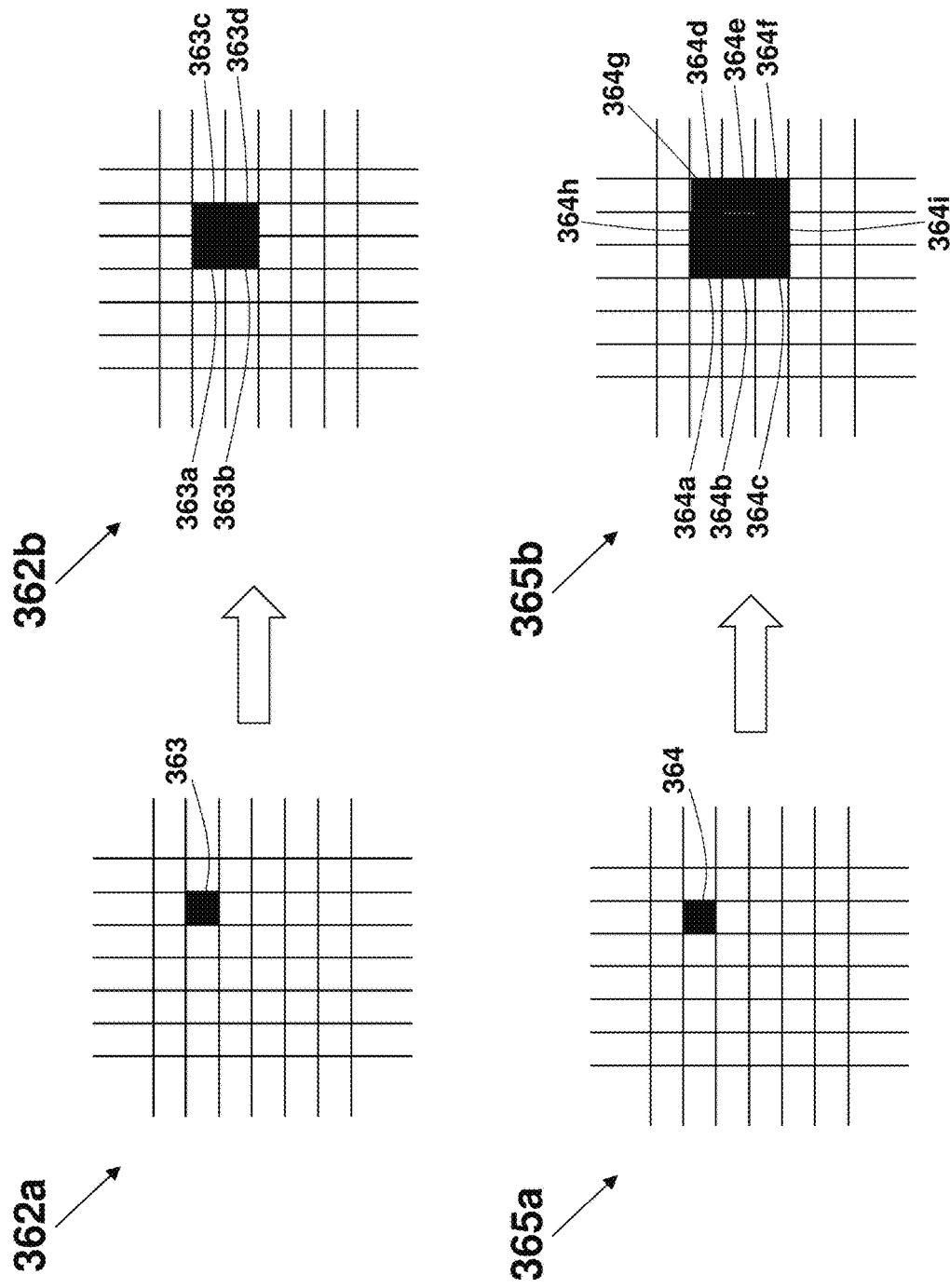
FIG. 36a depicts schematically a part of a prior art image upscaling.
Figure 36B:
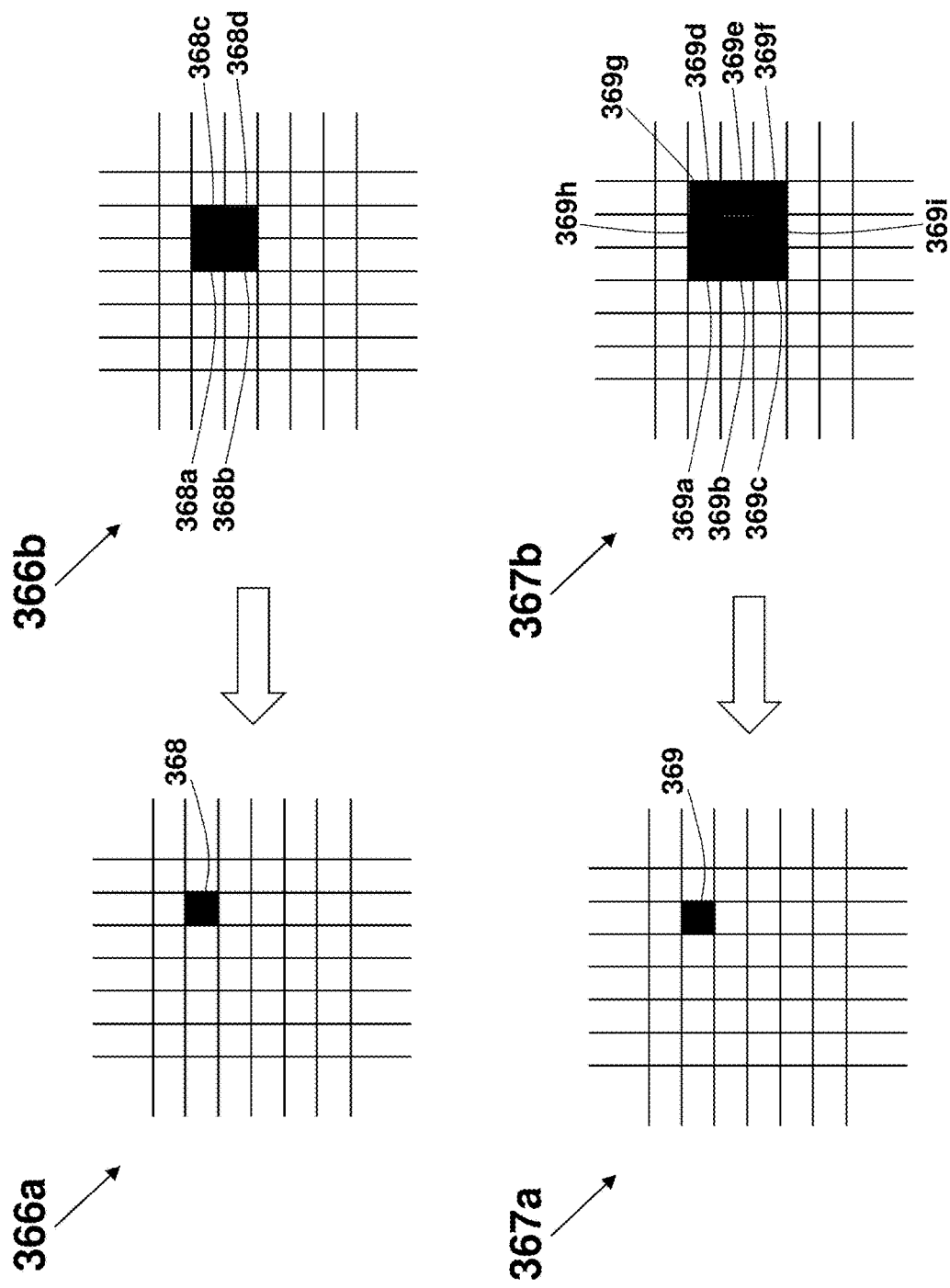
FIG. 36b depicts schematically a part of a prior art image downscaling.

Some image reduction schemes are simple and may be quickly and efficiently processed, such as the examples shown in FIG. 36*b*. An original image is shown in grid 366*b*, including an exemplary 4 pixels 368*a*, 368*b*, 368*c*, and 369*d* arranged as a 2×2 square, and the image after image downscaling of 25% is shown as grid 366*a*, where a single pixel 368 is represents the four pixels. Similarly, each group of 2×2 pixels in the original image is converted into a single pixel, where all the newly generated pixels are an average of the original 4 pixels value ('0' or '1' in a bitmap, or the color value in case of multiple bits per pixel). Similarly, an original image is shown in a grid 367*b*, including an exemplary 9 pixels 369*a*, 369*b*, 369*c*, 369*d*, 369*e*, 369*f*, 369*g*, 369*h*, and 369*i*, arranged as a 3×3 square, and the image after image downscaling of 1/9 (11.11%) is shown as a single pixel 369 in the grid 367*a*, where the single pixel 369 represents the 9 pixels. Similarly, each 3×3 pixels matrix in the original image is converted into a single pixel, where all the newly generated pixel is an average of the original 9 pixel value ('0' or '1' in a bitmap, or the color value in case of multiple bits per pixel).

Referring now to a flowchart 360 in FIG. 36, which may be executed by any network element, describing a method for combining quick scaling schemes with another scaling scheme, for achieving quicker and more efficient downscaling scheme. The original image, designated as IMG(0) and the scaling requested (in %) is obtained in a 'Receive IMG(0), Scaling (%)' step 361*a*. The parameter N is zeroed in an 'N←0' step 361*b*, denoting the flowchart initial state. If the scaling required is above 50% as is checked in a 'Scaling >50% ?' step 361*c*, then the current image in the N-th cycle designated as IMG(N), is scaled using any scaling or resizing method in a 'Scale IMG(N)' step 361*d*, and the method ends in an 'END' step 361*e*. In the case the scaling required is below 50%, a 50% scaling is executed using a quick and simple scaling scheme as described above, in a 'Scale 50%' step 361*f*. The cycle counter N is raised by 1 in a 'N←N+1' step 361*g*, and then the image is scaled 200% and the requested scaling (received in the initial 'Receive IMG(0), Scaling (%)' step 361*a*) is doubled, in a 'Resize 200%, Scale←Scale*2' step 361*h*, and the process is repeated until the scaling is above 50%. In such a scheme, in case a scaling of 30% is required, a scaling of 50% will be followed by another scaling of 60% (30%*2), resulting a total of scaling of 30% as originally required.

Figure 37:
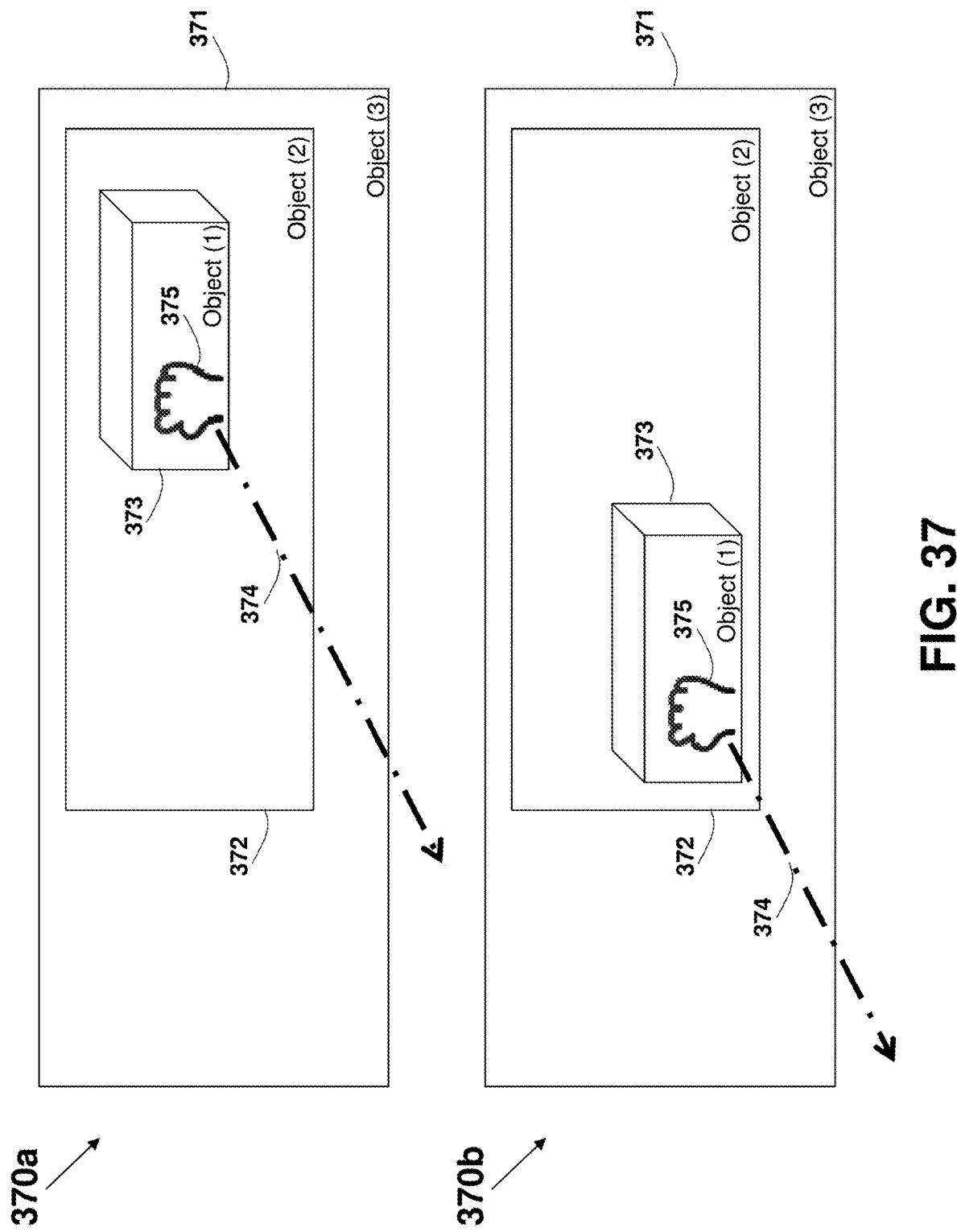
FIG. 37 depicts schematically a prior art limited object movement on a screen.
Figure 37A:
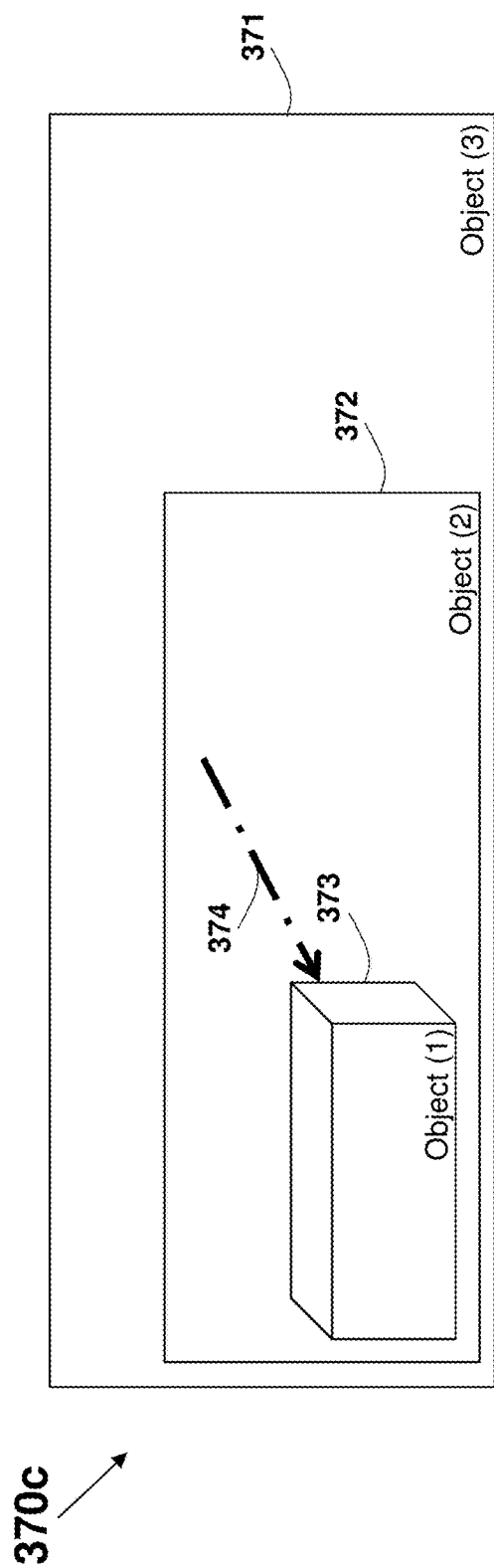
FIG. 37a depicts schematically an unlimited movement of an object on a screen.

When using a graphics-based human interface, when an element is dragged from a location to another location on a screen, the dragging is typically limited by the outer limits of the parent object, as schematically shown in views 370*a* and 370*b* in FIG. 37. In the view 370*a*, a box-shaped object (1) 373 is located within the area of a parent object (2) 372, which in turn is within the area of its parent object (3) 371. A user may attempt to drag the object (1) 373 to a left bottom corner of the screen, as illustrated by the hand 375 and the dashed line 374, to a location which is external to the object (3) 371 defined area. In many cases, the dragging of the object (1) 373 may not exceed its parent object (2) 372 periphery, and thus the dragging is limited to the left bottom limit of the object (2) 372 as shown in view 370*b*. It may be beneficial to allow the object (1) 373 to be dragged as requested by the user along the dragging line 374 to the left bottom corner as shown by view 370*c* in FIG. 37*a*. In one example, such dragging external to a limited low-level object area may be executed by transferring (or 'inheriting') the dragging request to higher level objects (such as object (2) 372 and object (3) 371, where such dragging is allowed.

Figure 38:
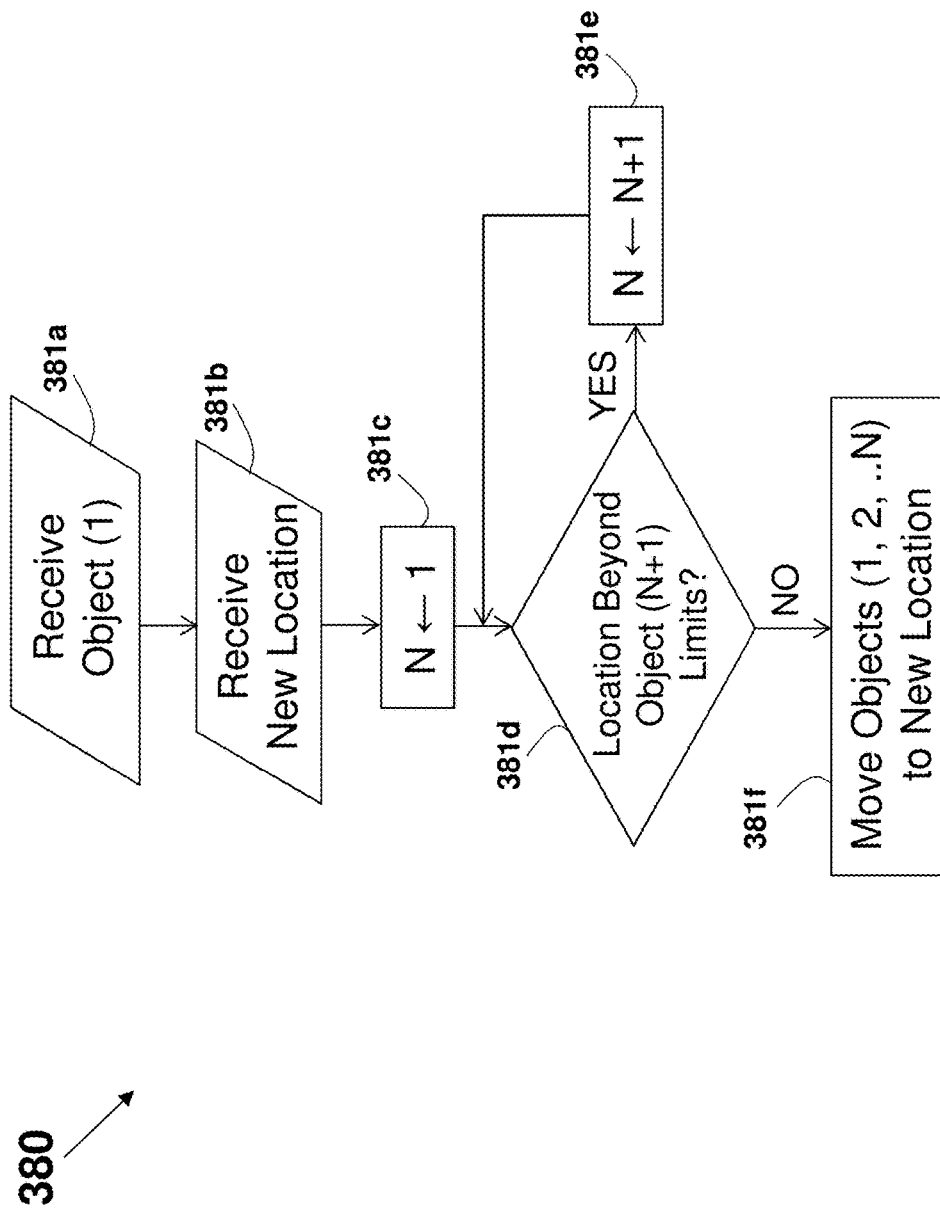
FIG. 38 illustrates schematically a simplified flowchart relating to unlimited moving object on a screen.

Referring now to a flowchart 380 shown in FIG. 38, which may be executed by any network element, and is schematically describing the transfer of a dragging request to higher levels until such dragging is allowed. The element to be dragged is identified as an object (1) in a 'Receive Object (1)' step 381*a*, located in a current located designated as (current X, current Y), denoting the (x,y) coordinated on the screen. For example, object (1) 373 (shown in views 370*a* and 370*b*) and its associated current coordinates are identified. The new location coordinates, designated as (new_X, new_Y) to which the object (1) is to be dragged (such as the drag line 374), is received in a 'Receive New Location' step 381*b*, hence a requested movement can be calculated as (new_X−current_X, new_Y−current_+Y). The cycles of the flowchart 380 are monitored by a cycle counter N, which is set to 1 at a 'N←1' step 381*c*.

In a 'Location Beyond Object (N+1) Limits?' step 381*d* the requested new location (new_X, new_Y) is checked to be within the limits of the parent (object (N+1)) of the current object (N). For example, the object (1) 373 new location is checked to be within the limits of object (2) 372. In the case where the requested new location exceeds the limits of the parent (object (N+1)), the counter N in raised by 1 in a 'N←N+1' step 381*e*, and the check is repeated with the new object in a 'Location Beyond Object (N+1) Limits?' step 381*d*. In the example shown in view 370*a*, the required new location is outside the area of an object (2) 372, hence the counter will be increased, and the new location will now be checked versus the object (3) 371. In a case where the new location (new_X, new_Y) is found to be within the limits of the parent (object (N+1)), then in a 'Move Objects (1, 2, . . . N) to New Location' step 381*f* the object (1), as well as all its parent objects, such as object (2), object (3), . . . object (N), are shifted according to dragging requested (new_X−current_X, new_Y−current_+Y), so that the object (1) reaches the required new location (new_X, new_Y). Such movement is exampled in a view 370*c*, where the object (1) 373 is shown in its new location, and where the object (2) 372 is shown also after being moved as required in order to allow for the object (1) 373 movement.

Figure 2:
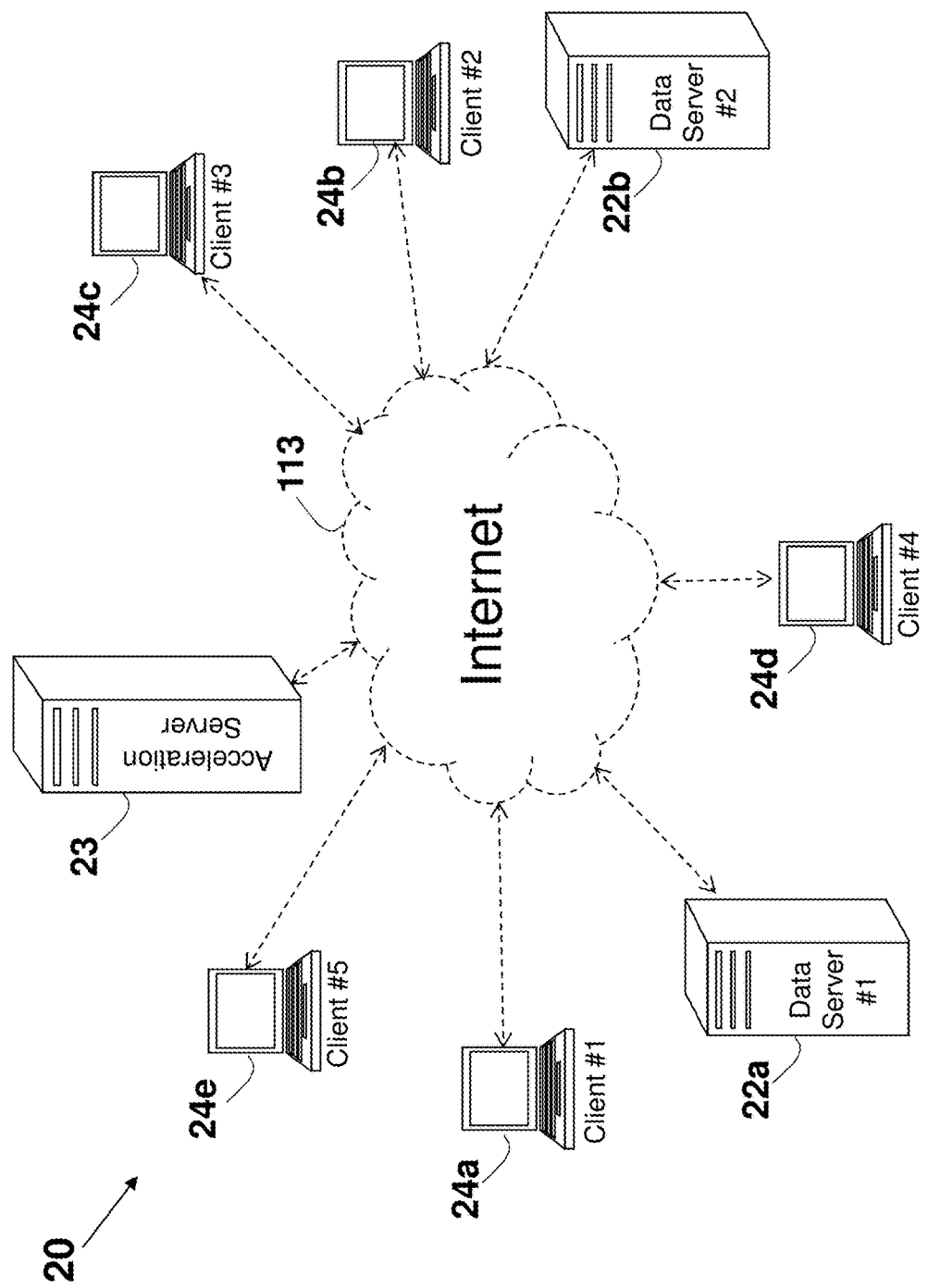
FIG. 2 depicts schematically the Internet and computers connected to the Internet.
Figure 2A:
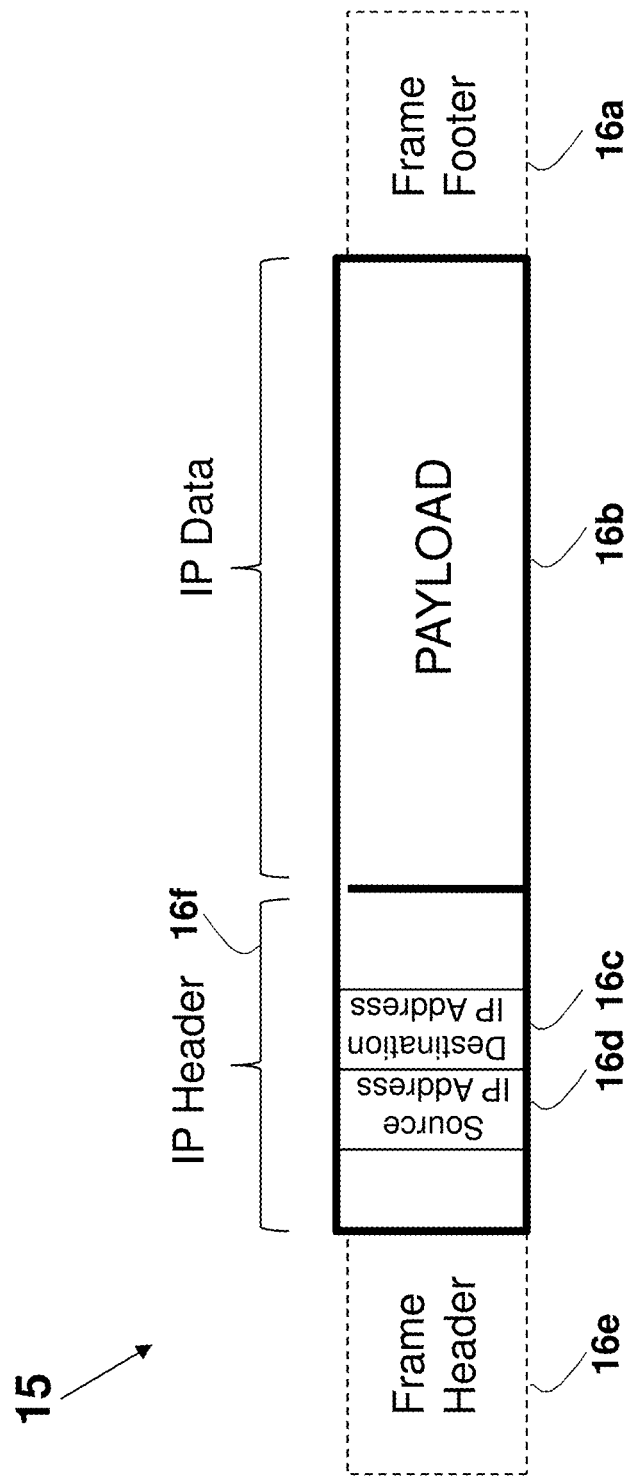
FIG. 2a illustrates schematically a structure of an IP-based packet.
Figure 2B:
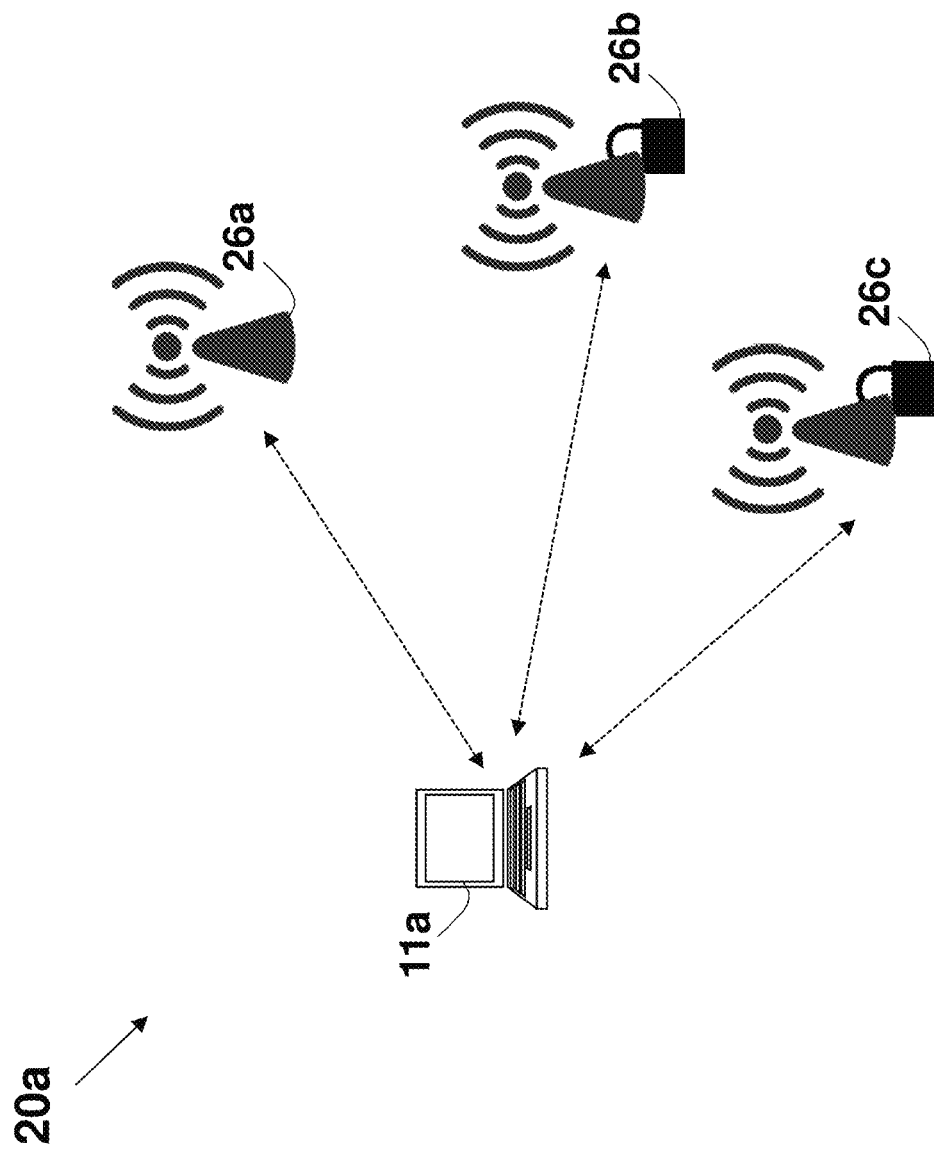
FIG. 2b depicts schematically a computerized device communicating with WAPs.

Any device herein may be connected to the Internet using a wireless access, such as via a WLAN, such as the device 11*a* shown in an arrangement 20*a* in FIG. 2*b*. In one example shown in an arrangement 390 in FIG. 39, a device 391 (which may correspond to any device or network element herein) may be in the range of 3 WAPs 26*b*, 26*c* and 26*d*, which are all password protected, and each of the WAPs is allowing connection to the Internet. In a case where the user of the device 391 is not aware of the password, no connection to the Internet is easily available. In an emergency, where no other communication means are available, there may be an urgent need to communicate via one of the WAPs, such as to the Internet, for example in order to call for help. In such a case, it may be beneficial to guess a password used by one (or more) of the WAPs, in order to be able to communicate over the Internet (or any other network backbone). The device 391 may include locally (such as in storage memory 25c), or be connected to, a database 392, which may comprise a list of passwords that may be suitable for use with the WAPs. The database 392 may be periodically updated by the device 391, or may be updated by accessing and fetching passwords from other databases over the Internet.

Figure 39:
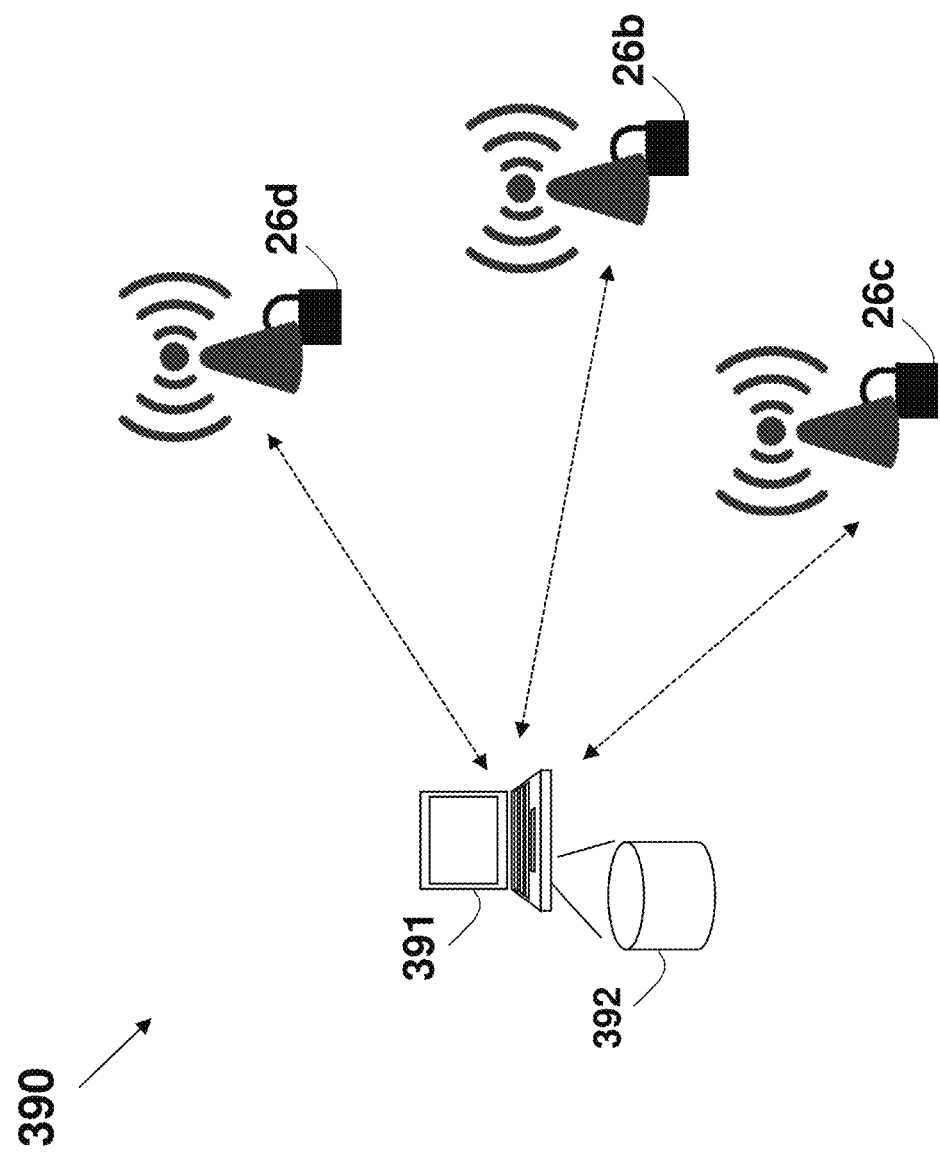
FIG. 39 depicts schematically a computerized device communicating with locked WAPs.
Figure 40:
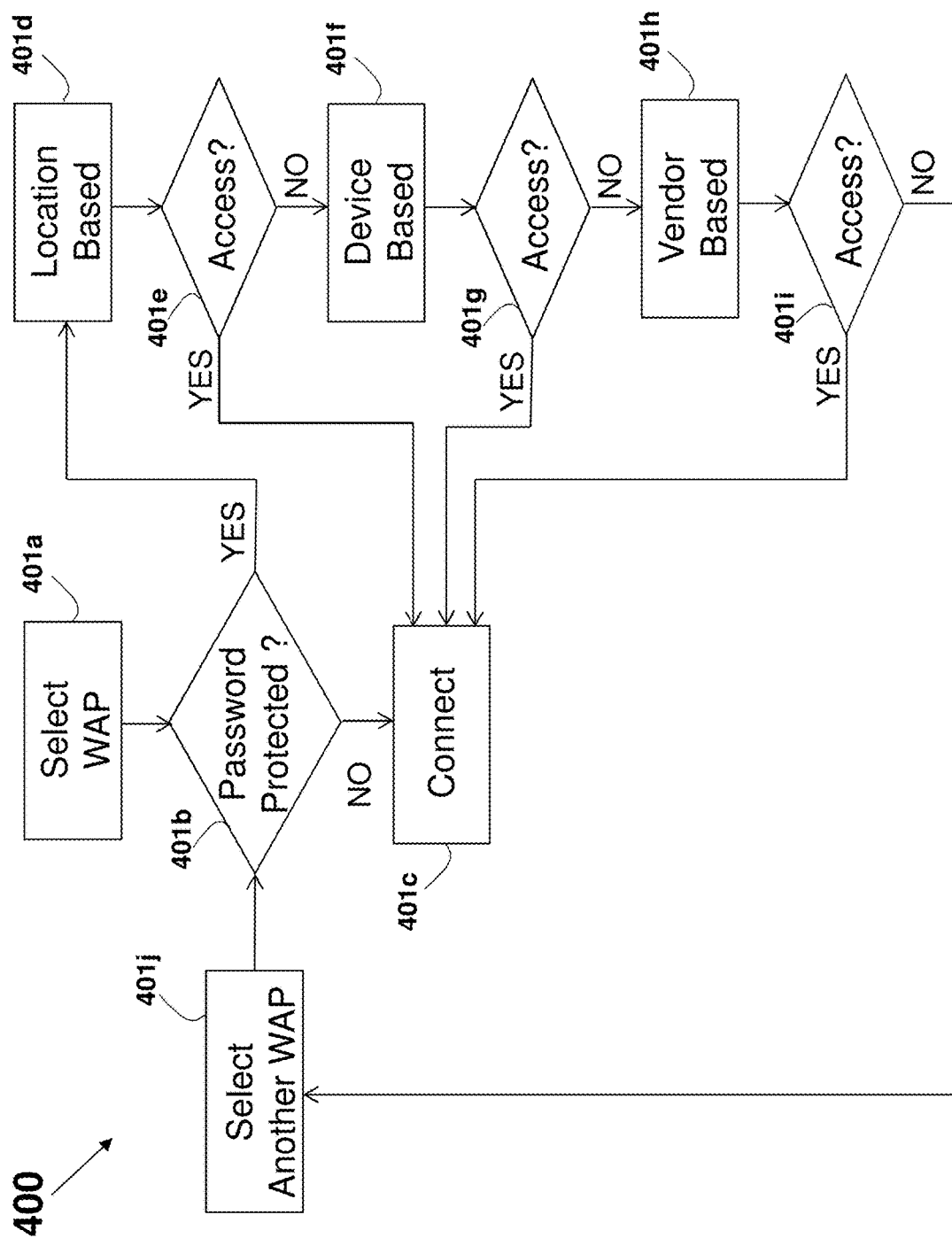
FIG. 40 illustrates schematically a simplified flowchart relating to guessing passwords in a WiFi environment.

A flowchart 400 in FIG. 40, which may be executed by any network element, describes a method for guessing passwords, for example to be used for communicating via WAPs, based on a geographical location, a user history, or a WAP vendor. Starting in a 'Select WAP' step 401a, one of the WAPs is selected. In the case of a presence of a single WAP, it is the one to select. If few WAPs are available, such as in the system 390 shown in FIG. 39, one of the WAPs is selected, such as WAP 26b, randomly or according to set criteria. The selected WAP is then checked to be password protected in a 'Password Protected ?' step 401b. Upon detecting that the WAP is not 'locked' and no password is thus not required, a connection with the selected WAP is established in a 'Connect' step 401c, and the device (such as the device 391) may then communicate via the selected WAP (such as the WAP 26b) over the Internet.

Commonly users or devices in a certain geographical location (such as city or country) are more likely to use certain passwords, due to the tendency of the local population (having similar demographics, for example), to choose similar or same words. Hence, in a case wherein the selected WAP is password-protected, the device 391 fetches from the database 392 and tries various passwords associated with the local geographical location in a 'Location Based' step 401d. If one of the tried guessed password is indeed successful, and a connectivity is achieved with the selected WAP, as checked in an 'Access?' step 401e, then a connection to the selected WAP is established in a 'Connect' step 401c, and the device (such as device 391) may then communicate via the selected WAP (such as WAP 26b) over the Internet. In order to simplify remembering and handling multiple passwords, users commonly use the same password or a minimal set of correlated passwords for many purposes. Hence, in the case none of the location based guessed passwords was found suitable, the device 391 fetches from database 392 a list of passwords that were previously used, even if used for another WAP. If one of the tried guessed password is indeed successful, and connectivity is achieved with the selected WAP, as checked in an 'Access?' step 401g, a connection with the selected WAP is established in a 'Connect' step 401c, and the device (such as device 391) may then communicate via the selected WAP (such as WAP 26b) over the Internet. Typically WAPs are manufactured and shipped having a default (vendor set) password. In many cases, the user of a WAP does not change the default password, and the database 392 may store a list of such default passwords, associated with various manufacturers and WAP types. Typically, as part of communicating with a WAP, the WAP type (e.g., model number) or the WAP manufacturer identifier or name (or both), are exchanged as part of the handshaking process. In a 'Vendor Based' step 401h, the device 391 tries a list of passwords based on the WAP type or vendor, or based on a list of all known manufacturers default values. If one of the tried guessed password is indeed successful, and connectivity is achieved with the selected WAP, as checked in an 'Access?' step 401i, a connection with the selected WAP is established in a 'Connect' step 401c, and the device (such as the device 391) may then communicate via the selected WAP (such as the WAP 26b) over the Internet. If none of the former password guessing techniques is successful, and in case other WAPs are available, the device 391 may select another WAP, such as WAP 26c in system 390, in a 'Select Another WAP' step 401j, and repeat the passwords guessing with the newly selected WAP.

Figure 41:
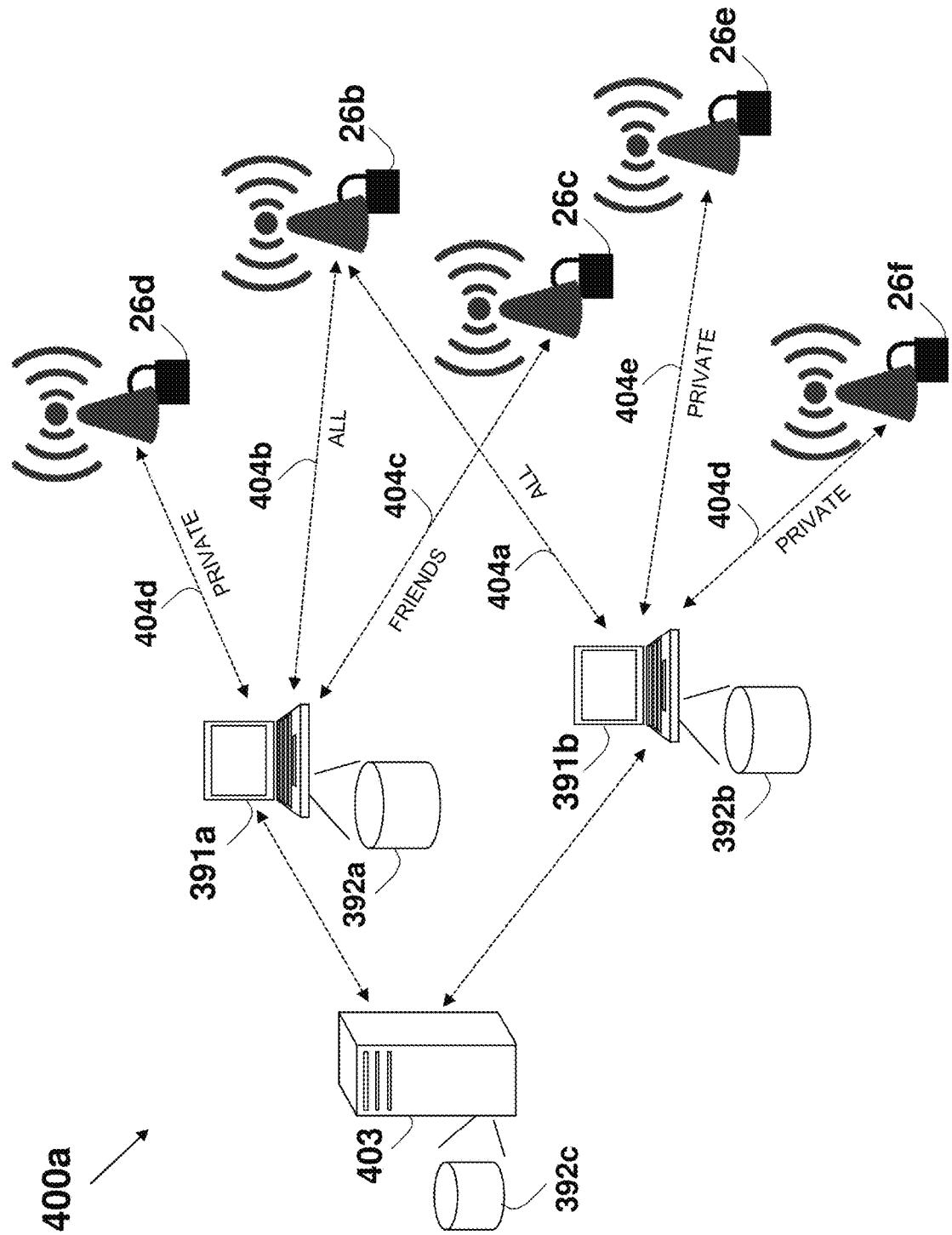
FIG. 41 depicts schematically computerized devices communicating with locked WAPs.

Referring to FIG. 41 showing a system 400a, which is based on the system 390 shown in FIG. 39, comprising also a locked WAP 26e and a locked WAP 26f. The system is shown to include two devices, a device #1 391a (which may correspond to device 391 in the system 390) having a password database 392a in the memory, and a device #2 391b (which may also correspond to device 391 in the system 390) having a password database 392b in the memory. The device #1 391a is located in the range of the WAP 26d, and may communicate with this WAP over a WiFi communication link 404d, is located in the range of the WAP 26b, and may communicate with this WAP over a WiFi communication link 404b, and is located in the range of WAP 26c, and may communicate with this WAP over a WiFi communication link 404c. Similarly, the device #2 391b is located in the range of the WAP 26b, and may communicate with this WAP over a WiFi communication link 404a, is located in the range of the WAP 26c, and may communicate with this WAP over a WiFi communication link 404g, is located in the range of the WAP 26e, and may communicate with this WAP over a WiFi communication link 404e, and is located in the range of the WAP 26f, and may communicate with this WAP over a WiFi communication link 404f. Hence, both two devices 391a and 391b may communicate with the WAPs 26b and 26c. The two devices may share information about the authentication with these WAPs. Furthermore, an authentication server 403 may include a database 392c storing passwords (and other authentication means), and may share the database 392c with the two devices 391a and 391b.

For each of the communication links, a device may assign a level of sharing, associated with the intention of a user of the device to share the passwords, stored in the local database or stored in the database 392c of the authentication server 403, with other users or devices. For example, the device #1 391a may assign a level of 'Private' to the communication link 404d with the WAP 26d, denoting that the password (or other credentials) associated with this connection is not to be shared with others, for example, since the WAP 26d is the user private network at home. Similarly, the user of the device #2 391b may assign a level of 'Private' to the communication links 404e and 404f. Alternatively or in addition, a device (such as the device #1 391a or the device #2 391b) may assign a level of 'Friends' to a password, associated with an intention to share the available password with a limited number of devices or users ('friends'), as shown regarding to communication links 404c and 404g in the system 400a. Further, a device (such as the device #1 391a or the device #2 391b) may assign a level of 'All' to a password, associated with an intention to share the available password with any device or user, as shown regarding to communication links 404a and 404b in the system 400a. The user and authentication database 392c keeps the connection levels between the users of the system (i.e., who is friends with who). The clients update this central database 392c when new authentication information about a WAP is acquired, such as when the authentication information no longer works, or when updated or new authentication information is known. Once deployed in large numbers, the size of the authentication database 392c becomes significant and large. Thus the update from the central database 392c to the clients can be done in parts, such as loading only the information that a device is most likely to require, for example, to limit the size of the database to local geography, and/or by getting all access points located in close proximity to all (or popular) points of entries in various countries. For example, a device may periodically connect to the central database 392c, and may fetch therefrom an update of list of relevant passwords, and store these passwords in the local database, such as the database 392a or 392b. Further, the device may also update the central database 392c of any new information it has acquired regarding authentication methods (such as passwords) regarding to various WAPs. The size of the information that is loaded into the device may be limited, and the device may get an update on authentication information only regarding to WAPs that may be of interest to that device.

Figure 42:
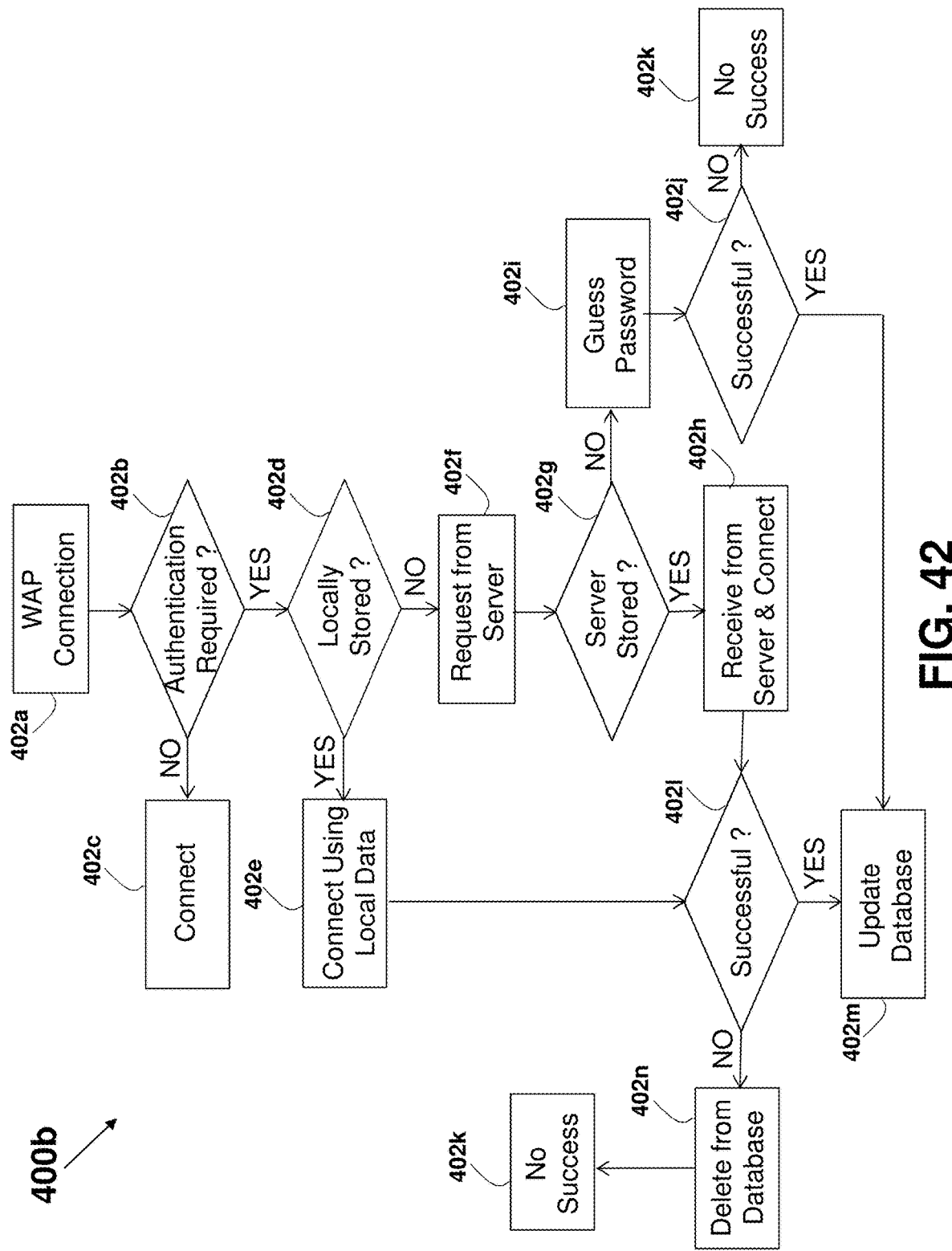
FIG. 42 illustrates schematically a simplified flowchart relating to sharing passwords in a WiFi environment.

A flowchart 400b shown in FIG. 42 describes an example of the system 400a operation. In a 'WAP connection' step 402a, a request from a device (such as the device #1 391a or the device #2 391b) to connect to a WAP (such as the WAP 26d or the WAP 26f) is intercepted, typically in order to access the Internet. First, using a protocol handshake or any other scheme, the device checks if authentication is required by the specific WAP, as part of an 'Authentication Required ?' step 402b. If no authentication is required, the device may connect to the WAP in a 'Connect' step 402c. In the case the WAP required authentication for connecting to, the device checks the local authentication database (such as the database 391a or the database 391b), as part of a 'Locally Stored ?' step 402d. If the relevant authentication information is locally available, the device may connect using this information in a 'Connect Using Local Data' step 402e. In the case of successful connection to the WAP, as checked in a 'Successful ?' step 402i, the device may send an update to the central database 392c in the authentication server 403, notifying or updating it regarding the validity and regarding the authentication information associated with the WAP.

In the case there is no locally available password regarding the respective WAP, the device may connect to the authentication server 403 for fetching authentication information from the central database 392c. The server 403 checks the availability of the requested password in a 'Server Stored ?' step 402g. If no authentication information is found to be stored in the central database 392c, the authentication server 403 accordingly replies to the requesting device. Upon receiving of the server 403 response, the device may be prompted that no authentication information is available for the WAP, in a 'No Success' step 402k. The user then may select another WAP (if available), and repeat the process (with the newly selected WAP) as part of the 'WAP Connection' step 402a.

Alternatively or in addition, the device may try the password of the WAP in a 'Guess Password' step 402i, and such guessing scheme may consist of, include, or be based on, the guessing method described in the flowchart 400 in FIG. 40. If the password guessing in the 'Guess Password' step 402i is successful, as checked in a 'Successful ?' step 402j, the device may send the successfully guessed password to the server 403 to be stored in the database 392c, as part of an 'Update Database' step 402m, so this password may be used by other devices (if allowed) when connecting to this WAP. In the case wherein a password is stored in the central database 392c for this WAP, the authentication server 403 fetches the stored password, and sends it to the requesting device, which then uses this password for connecting to the WAP, in a 'Receive from Server & Connect' step 402h. If the connection is successful, as checked in a 'Successful ?' step 402l, the device may send a message to the server 403, notifying it that the password fetched is indeed valid. However, if the connection is not successful, for example, since the password was changed or is otherwise not valid, the device may send this information to the server 403, allowing it to delete the non-valid password from the central database 392c, in a 'Delete from database' step 402n.

As part of sending the authentication server 403 a new password, such as in 'Update Database' step 402m, the sending device may associate a level of sharing with such password, such as 'Private' (i.e., don't share with anyone), Friends' (i.e., only share with friends), 'Family' (i.e. only share with family), or 'All'. When fetching a password from the central database 392c, such as in 'Request from Server' step 402f, the server 403 returns the stored password only if the requesting device is authorized to receive this information. For example, if the password is marked as 'Friends', only devices (or users) that are identified as 'friends' may fetch the stored password.

Figure 3:
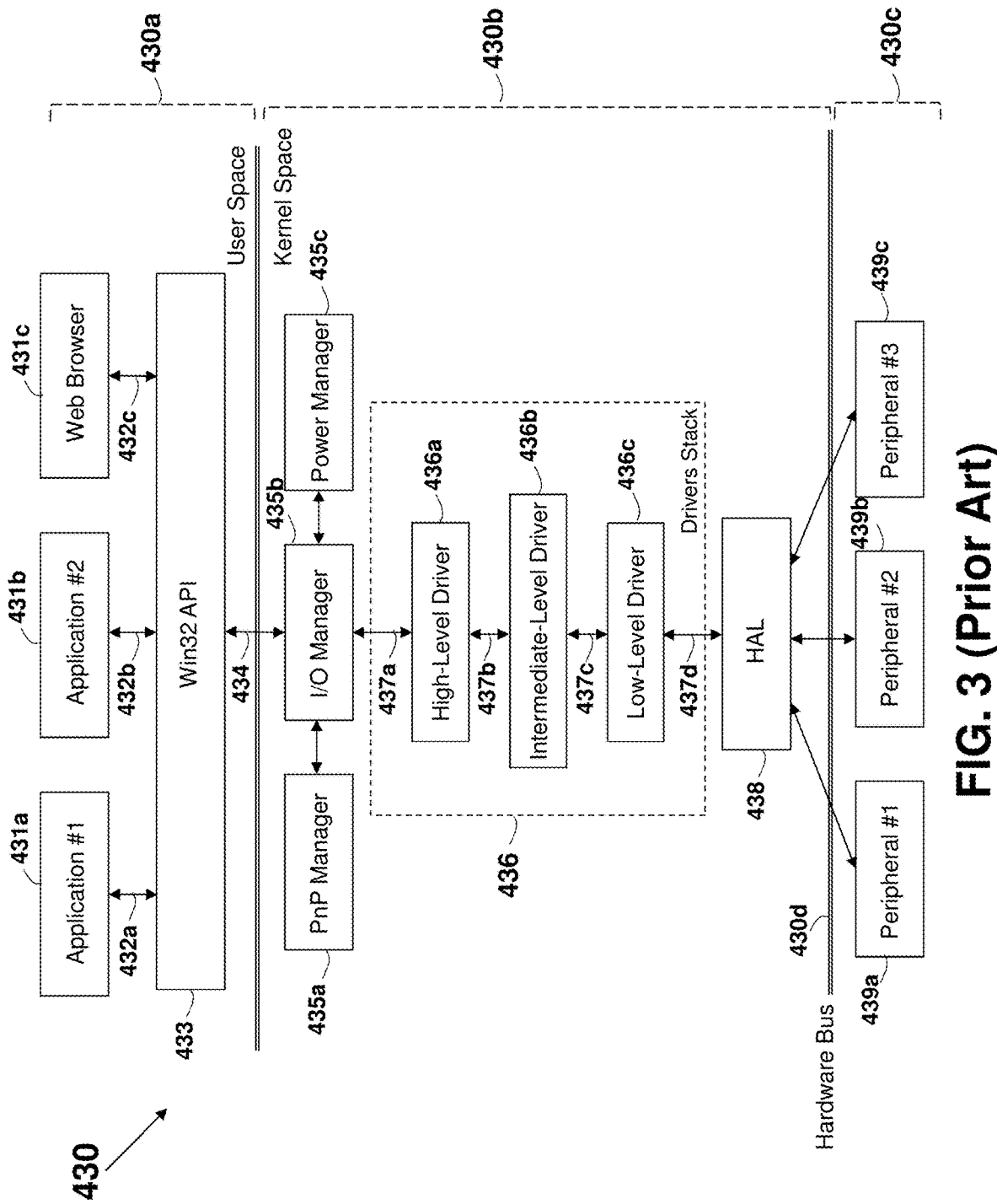
FIG. 3 illustrates schematically a simplified flowchart in a WDM architecture.
Figure 3A:
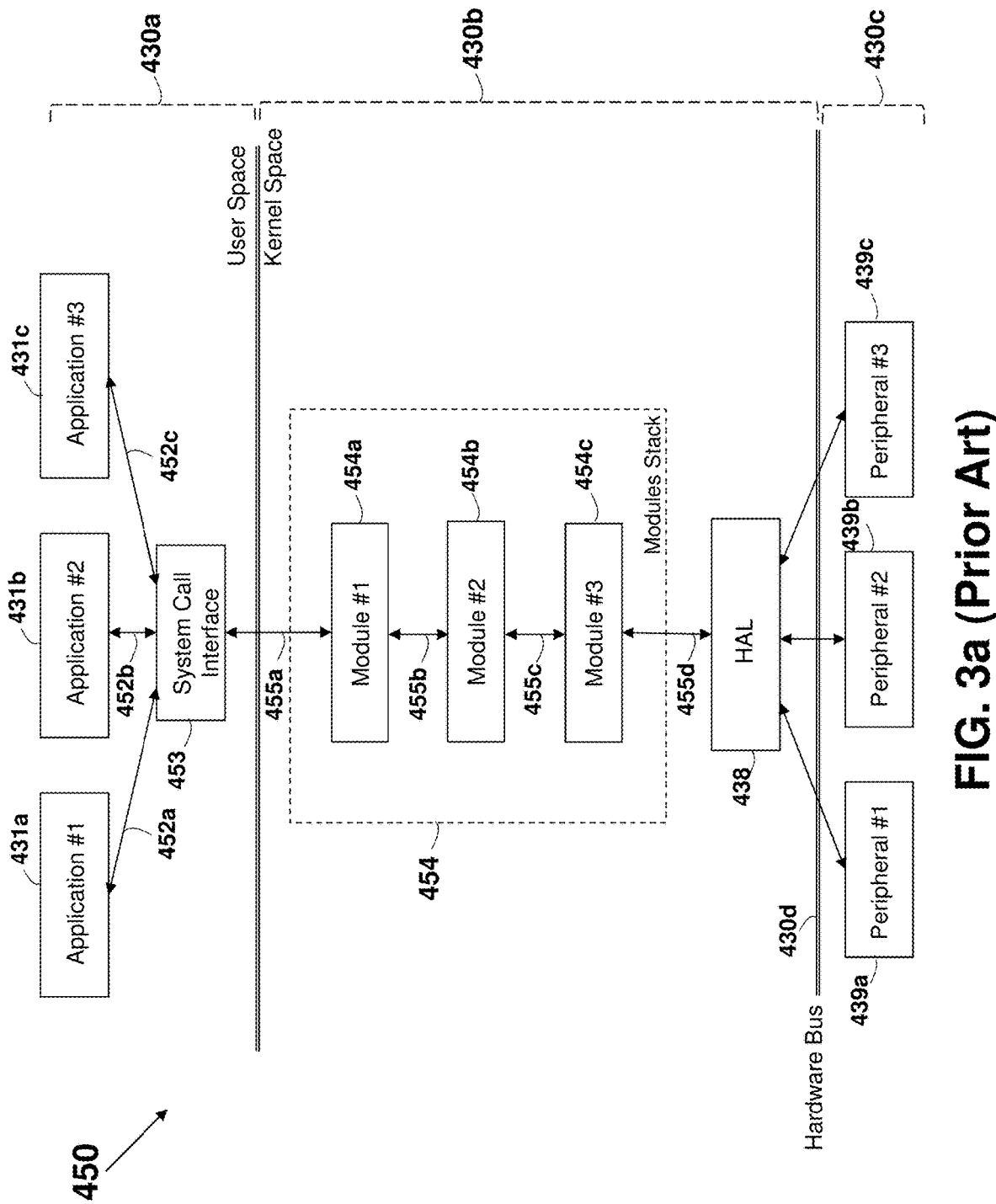
FIG. 3a illustrates schematically a simplified flowchart in a Linux architecture.
Figure 44:
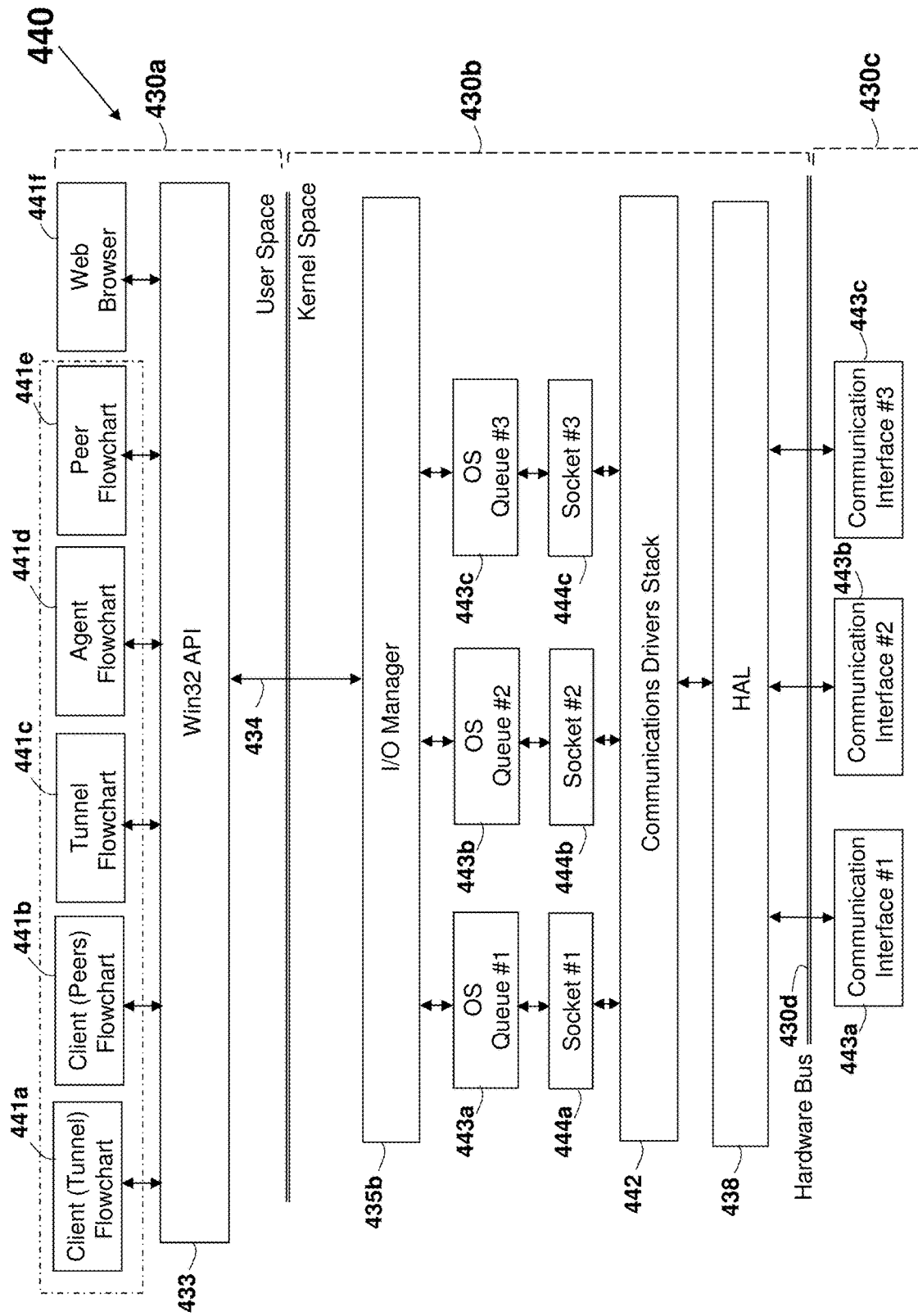
FIG. 44 illustrates schematically a block diagram relating to queueing schemes in a WDM architecture.

Referring to an architecture 440 shown in FIG. 44, which is based on the architecture 430 shown in FIG. 3, describing an example of a software and hardware interface in a WDM-based operating system, which may be part of any device (or server) described herein. In the arrangement 440, the device may assume the role of a tunnels-using client device (such as the client device #1 31a or the client device #2 31b) and thus executes a 'Client (Tunnel) Flowchart' 441a, which may be a part of, or the whole of, the client device related flowcharts, such as the flowchart 60 shown in FIG. 6, the flowchart 100 shown in FIG. 10, or the flowchart 100a shown in FIG. 10a. Alternatively or in addition, the device may assume the role of a Peers/Agents-using client device (such as the client device #1 201a) and thus executes a 'Client (Peers) Flowchart' 441a, which may be a part of, or the whole of, the client device related flowcharts, such as the flowcharts 230, 230a, and 230b, respectively shown in FIGS. 23, 23a, and 23b. Alternatively or in addition, the device may assume the role of a tunnel device (such as the tunnel device #1 33a, the tunnel device #2 33b, or the tunnel device #3 33c), and thus executes a 'Tunnel Flowchart' 441c, which may be a part of, or the whole of, the tunnel device related flowcharts, such as the flowchart 70 shown in FIG. 7. Alternatively or in addition, the device may assume the role of an agent device (such as the agent device #1 103a, the agent device #2 103b, or the agent device #3 103c), and thus executes an 'Agent Flowchart' 441d, which may be a part of, or the whole of, the agent device related flowcharts, such as the flowchart 240 shown in FIG. 24. Alternatively or in addition, the device may assume the role of a peer device (such as the peer device #1 102a, the peer device #2 102b, or the peer device #3 102c), and thus executes a 'Peer Flowchart' 441e, which may be a part of, or the whole of, the agent device related flowcharts, such as the flowchart 240a shown in FIG. 24a. Similarly, the device may execute a web browser application 441f, that may use the acceleration applications above for faster operation.

While the arrangement 10 shown in FIG. 1 includes a single communication interface 29 connecting to a LAN 14, currently many computerized devices and systems include multiple communication interfaces, such as Communication Interface #1 443a, Communication Interface #2 443b, and Communication Interface #3 443c, shown as part of the architecture 440 (corresponding to the peripherals #1 439a, #2 439b, and #3 439c, shown as part of the architecture 430 in FIG. 3). While three (3) interfaces are shown, any number of such interfaces may be equally used. Typically, each communication interface enables communication over a distinct network type, so that the multiple communication interfaces allow for concurrent communication over multiple networks. Each network may be a wired network, which is based on conductive medium, such as a coaxial cable, twisted-pair, powerlines, or telephone lines, or may be a wireless network which is based on a non-conductive medium, and is using RF, light, or sound guided, or any other over-the-air propagation. Further, a network may be NFC, PAN, LAN, MAN, WAN, WPAN, WLAN (such as WiFi), WMAN, or WWAN. Further, the communication may be based on a cellular communication. A network may be half-duplex, full-duplex, or unidirectional, and may use modulation such as AM, FM, or PM. Furthermore, a network may be packet-based or circuit-switched. The various communication interfaces and the respective protocols are serviced by the kernel space 430*b* Communications Drivers Stack 442 (corresponding to the drivers stack 436 shown in the architecture 430). The data to be sent or received via the communication interfaces is transferred via applicable queues serving to buffer the transferred data, such as an OS Queue #1 443*a*, an OS Queue #2 443*b*, and an OS Queue #3 443*c*, using underlying sockets such as a Socket #1 444*a* serving OS Queue #1 443*a*, a Socket #2 444*b* serving OS Queue #2 443*b*, and a Socket #3 444*c* serving OS Queue #3 443*c*. A queue (such as queue #1 443*a*) may be loaded with data, such as data to be sent, and next data that may use the same queue may need to wait until the former data in that queue is vacated, and only then the newly introduced data will be handled. In one example, the allocation of data to the queues may be static, and not changing in time. Alternatively or in addition, the allocation to the various OS queues may be adaptive. For example, at the same time the first data is handled, another queue (such as queue #2 443*b*) may be empty, and thus may be used for faster handling of the new data. An adaptive queue mechanism is described, for example, in U.S. Patent Application No. 2006/0187830 to Nam, entitled: "Adaptive Queue Mechanism for Efficient Realtime Packet Transfer and Adaptive Queue Establishment System thereof", and improved technique for handling events in a multipathing system employing event queueing is described in U.S. Pat. No. 8,452,901 to Sandstrom et al., entitled: "Ordered Kernel Queue for Multipathing Events", which are all incorporated in their entirety for all purposes as if fully set forth herein.

Figure 45:
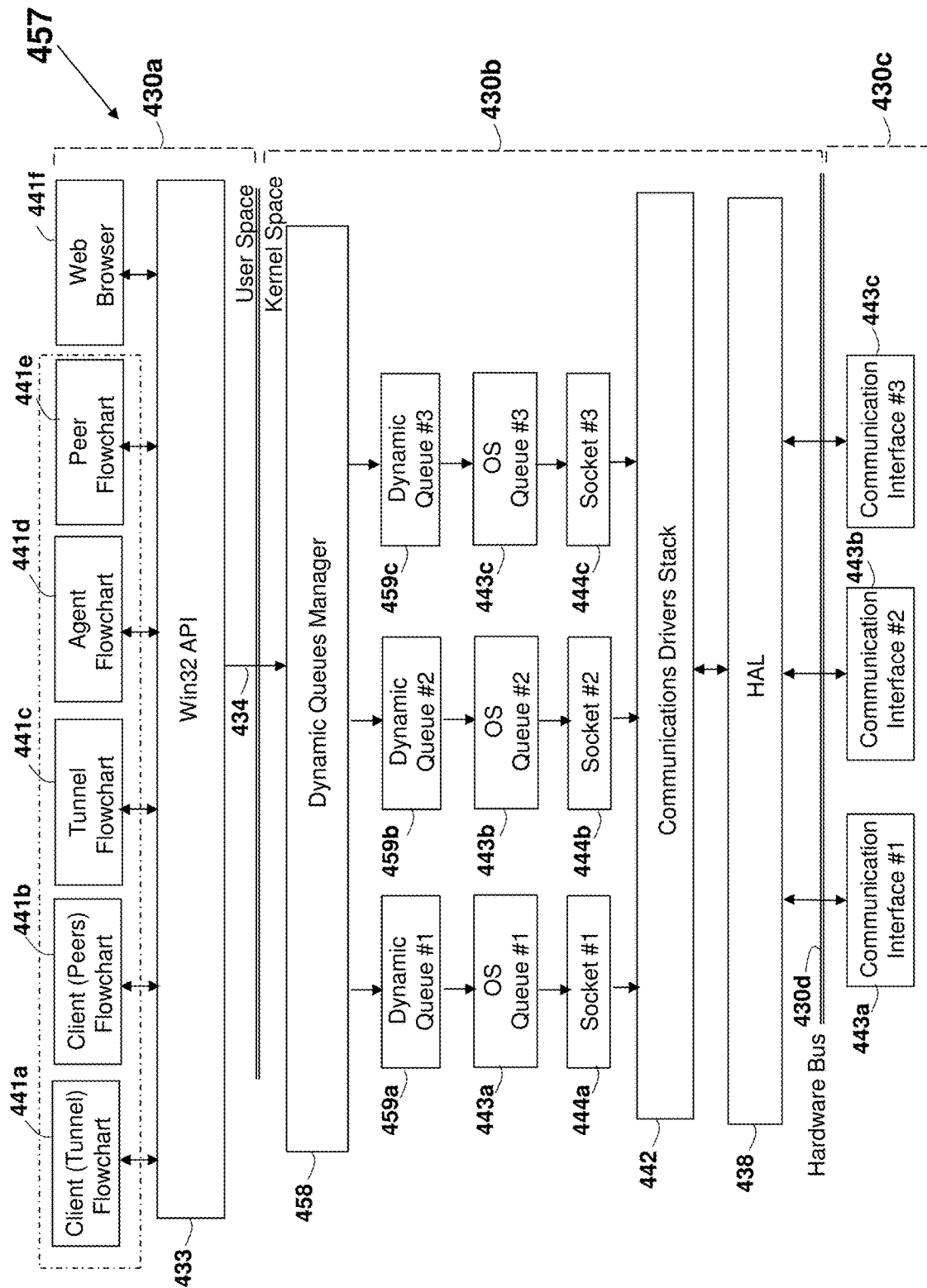
FIG. 45 illustrates schematically a block diagram relating to an improved dynamic queueing scheme in a WDM architecture.
Figure 46:
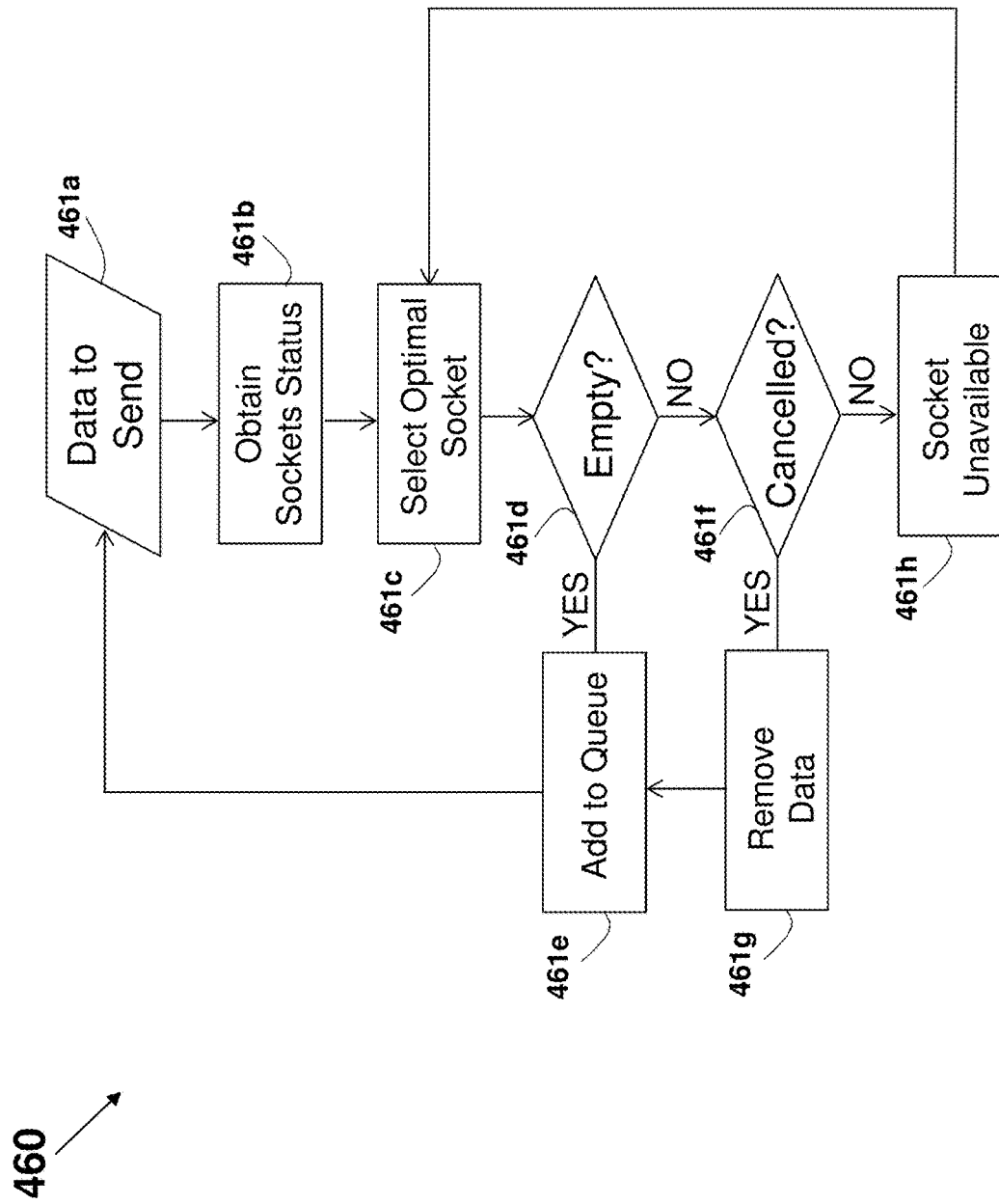
FIG. 46 illustrates schematically a simplified flowchart relating to implementing an improved dynamic queueing scheme.

An adaptive system involving real-time moving data between sockets and queues upon their availability is shown as an architecture 457 in FIG. 45, which may be part of any network element. Dynamic queues are added to the transmit data path, from an application (in the User Space) and the communication interfaces, allowing better usage of the system resources, in particular the various sockets and OS queues. A Dynamic Queue #1 459*a* is added to cooperated with the OS queue #1 443*a* and the socket #1 444*a*, a Dynamic Queue #2 459*b* is added to cooperated with the OS queue #2 443*b* and the socket #2 444*b*, and a Dynamic Queue #3 459*c* is added to cooperated with the OS queue #3 443*c* and the socket #3 444*c*. The dynamic queues are data allocated, managed, and supervised by a Dynamic Queues Manager 458 added software module, which may execute a flowchart 460 shown in FIG. 46. The dynamic queues manager 458 checks the status of the queues and sockets in the system, and shifts the data to be transmitted between the various queues and sockets to obtain higher system efficiency. For example, in a case one queue is loaded while another queue is empty, the manager 458 may remove data from a loaded queue and shifts the data to the empty one.

The flowchart 460, which may be executed by any network element, starts at a 'Data to Send' step 461*a*, where data to be sent from the device is intercepted from an application. In a 'Obtain Sockets Status' step 461*b*, the status of all sockets (and related queues) is checked. For example, if the data was already loaded into one of the queues relating to a socket, the waiting time for the socket to transmit all loaded data is estimated. Further, the characteristics of the socket and its underlying communication interface, such as BW and RTT (based on previous transactions), is also fetched. Based on the obtained information in the 'Obtain Sockets Status' step 461*b*, one of the sockets is selected as the optimal one, in a 'Select Optimal Socket' step 461*c*. The optimal socket (and related queues) may be selected based on the time it is estimated that the data will be fully transmitted from the device and the applicable queues will be rendered empty. The selected optimal socket route queues are then checked in an 'Empty ?' step 461*d* to be empty. In the case the optimal socket is empty, the data is routed to the selected socket, such as to the OS queue #1 443*a*, to be queued for being sent via the socket #1 444*a* and a respective communication interface, in an 'Add to Queue' step 461*e*. In the case the selected route via the socket (e.g., socket #1 444*a*) is not empty, the manager 458 checks in a 'Cancelled ?' step 461*f* whether the data that is currently stored in that route has been cancelled by the application that requested this data transfer, or whether it was previously cancelled by the manager 458. In the case the data transmitting was indeed cancelled, the respective cancelled operation is cancelled and the data is removed from the queues in a 'Remove Data' step 461*g*, and the new data to be sent is loaded to be transmitted via this route, in the 'Add to Queue' step 461*e*. In the case the data transmitting process has not been cancelled, the socket (and its respective queues) is declared as unavailable in a 'Socket Unavailable' step 461*h*, and another optimal socket (different from the last selected one) is selected in the 'Select Optimal Socket' step 461*c*.

Any transfer of data between any two network elements, may use, or be based on, a compression scheme (which may be any compression scheme), such as the communication between a client device (such as the client device #1 31*a*) and the acceleration server 32, that is a part of the illustrated messaging chart 50, such as the 'Sign in' 56*b*, 'Request List' 56*c*, 'Send List' 56*d*, or any other communications between these elements. Alternatively or in addition, the same or other compression scheme may be used in the communication between a tunnel device (such as the tunnel device #1 33*a*) and the acceleration server 32, that is a part of the illustrated messaging chart 50, such as the 'Sign in' 56*a* or any other communications between these elements. Alternatively or in addition, the same or other compression scheme may be used in the communication between a client device (such as the client device #1 31*a*) and a tunnel device (such as the tunnel device #1 33*a*), that is a part of the illustrated messaging in the timing chart 50, such as the 'Initiate Pre-Connection' 56*e*, 'Pre-Connection' 56*f*, 'Content Request' 56*g*, 'Send Content' 56*j*, or any other communications between these elements. Alternatively or in addition, the same or other compression scheme may be used in the communication between a tunnel device (such as the tunnel device #1 33*a*) and a data server (such as the data server #1 22*a*), that is a part of the illustrated messaging chart 50, such as the 'Content Request' 56*h*, 'Send Content' 56*i*, or any other communications between these elements.

Alternatively or in addition, the same or other compression scheme may be used in the communication between an agent device (such as the agent device #1 103*a*) and the acceleration server 202, that is a part of the illustrated messaging chart 220, such as the 'Sign In' 226*a*, or any other communications between these elements. Alternatively or in addition, the same or other compression scheme may be used in the communication between a client device (such as the client device #1 210a) and the acceleration server 202, that is a part of the illustrated messaging chart 220, such as the 'Sign In' 226d, 'Request List' 226e, 'Send List' 226f, or any other communications between these elements. Alternatively or in addition, the same or other compression scheme may be used in the communication between a client device (such as the client device #1 210a) and an agent device (such as the agent device #1 103a), that is a part of the illustrated messaging chart 220, such as the 'Request List' 226g, 'Send List' 226h, or any other communications between these elements. Alternatively or in addition, the same or other compression scheme may be used in the communication between a client device (such as the client device #1 210a) and a peer device (such as the peer device #1 102a), that is a part of the illustrated messaging chart 220, such as the 'Chunk Request' 226i, 'Send Chunk' 226j, or any other communications between these elements.

The same compression scheme may be used in all of the above communications. Alternatively or in addition, no compression or different compression scheme may be used in each of the above communication. A compression scheme used may be lossy or lossless (non-lossy). Further, a compression scheme may be a dictionary-based scheme. Furthermore, the compression may be according to, or based on, a standard compression algorithm which may be JPEG (Joint Photographic Experts Group) and MPEG (Moving Picture Experts Group), ITU-T H.261, ITU-T H.263, ITU-T H.264, or ITU-T CCIR 601. Further, the compression scheme may be according to, or based on, Lempel-Ziv (LZ) or Huffman encoding (or both) compression methods, such as LZ, DEFLATE, SHRI, LZX, or LZW. Further, a dictionary-based compression scheme may be used that is according to, or based on, a local dictionary as described herein. In the case wherein the data transferred consists of, or include, m video data, the compression scheme may be an intraframe or interframe compression.

Devices communicating over a network, such as over the Internet 113, may include the same software components or applications, such as the same operating system or the same web browser, and may further retrieve and store the same or similar content from the Internet 113. Such stored content similarities may be used in order to build a dictionary to use in a lossless compression scheme.

Figure 4:
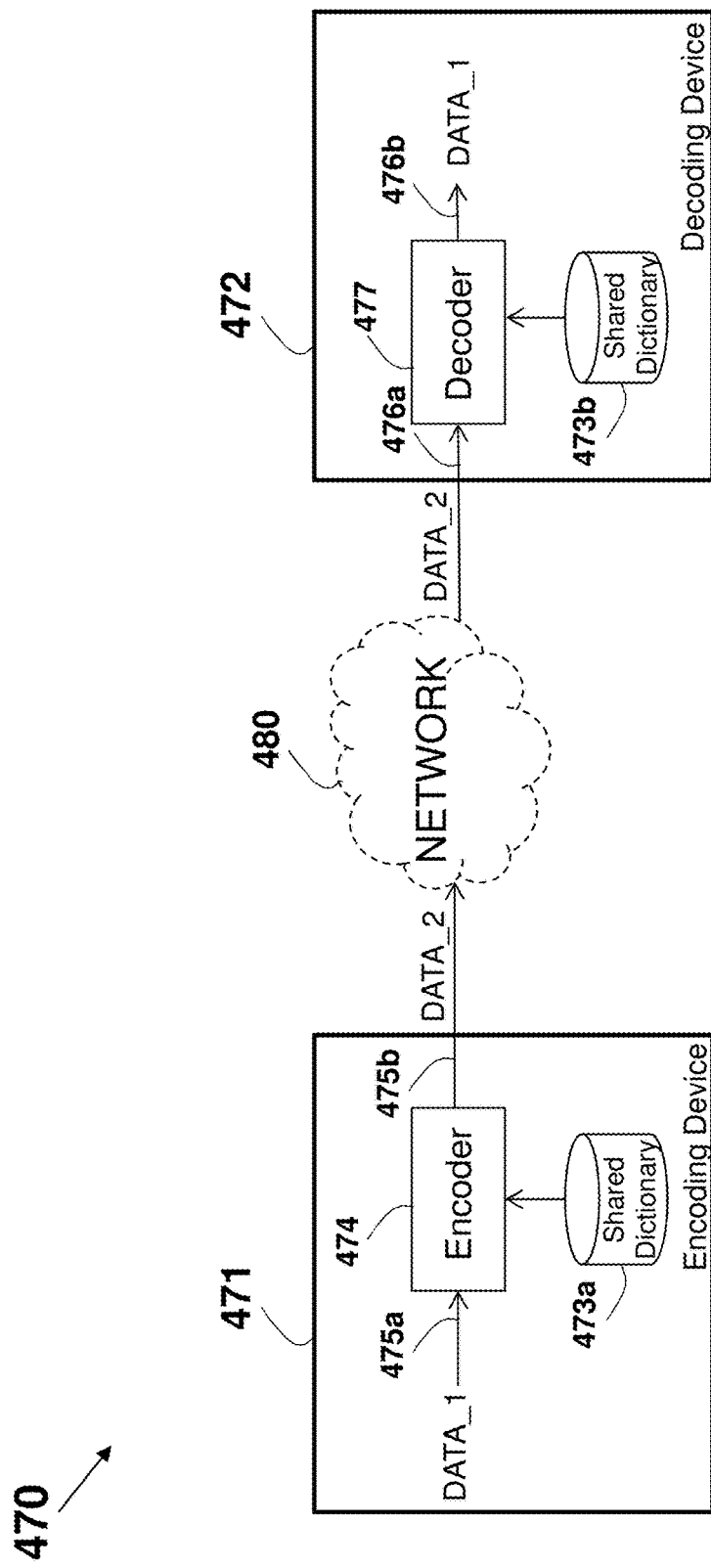
FIG. 4 illustrates schematically a block diagram of a one-way compression-based communication.
Figure 4A:
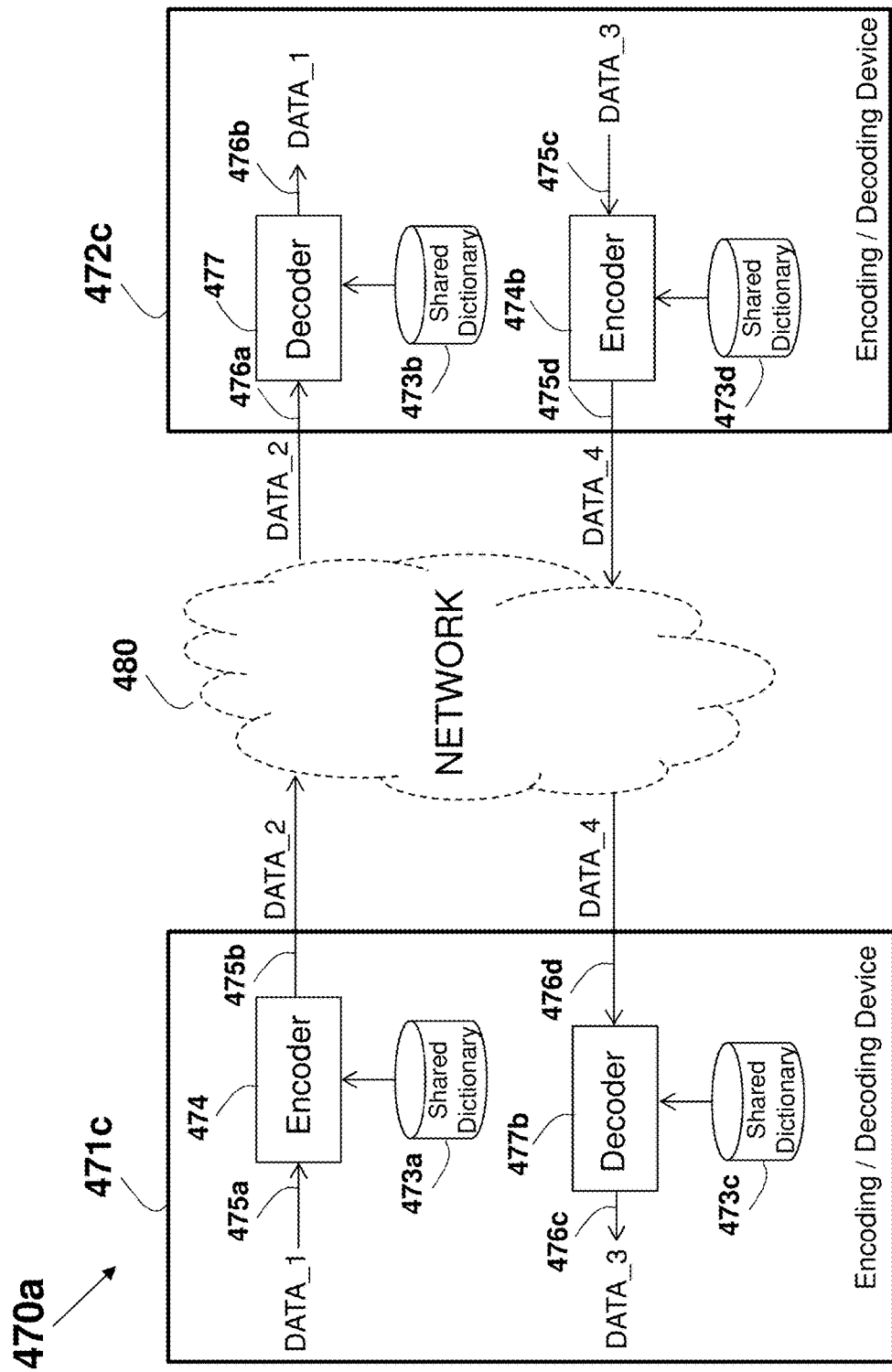
FIG. 4a illustrates schematically a block diagram of a two-way compression-based communication.
Figure 47:
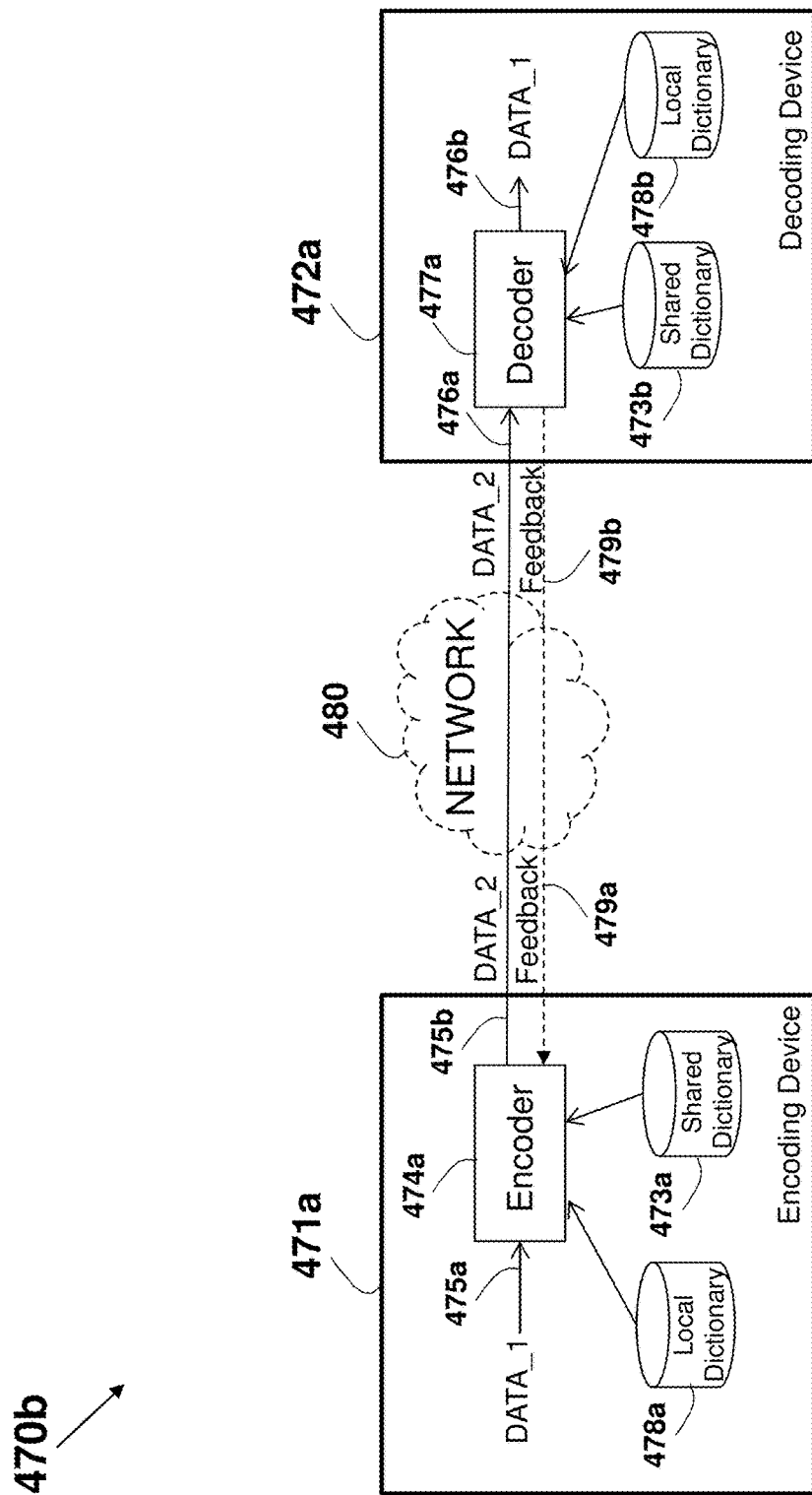
FIG. 47 illustrates schematically a block diagram relating to a one-way compression using a local dictionary.

Referring now to a lossless dictionary-based system 470b shown in FIG. 47, which is based on the system 470 shown in FIG. 4. In addition to the shared dictionary 473a, the encoder 474a (corresponding to the encoder 474) shown as part of the encoding device 471a (corresponding to the encoding device 471) which may be part of any network element, is using also a local dictionary 478a. The compression may use only the shared dictionary 473a, only the local dictionary 478a, or both. Similarly, the decoder 477a (corresponding to the encoding device 471a) shown as part of the decoding device 472a (corresponding to the decoding device 472) which may be part of any network element, is using also a local dictionary 478b. Further, the decoding device 472a which is the receiving device, may transmit feedback over connection 479b of the decoding device 472a, communicating over the network 480 to the connection 479a of the encoding device 471a.

Figure 48:
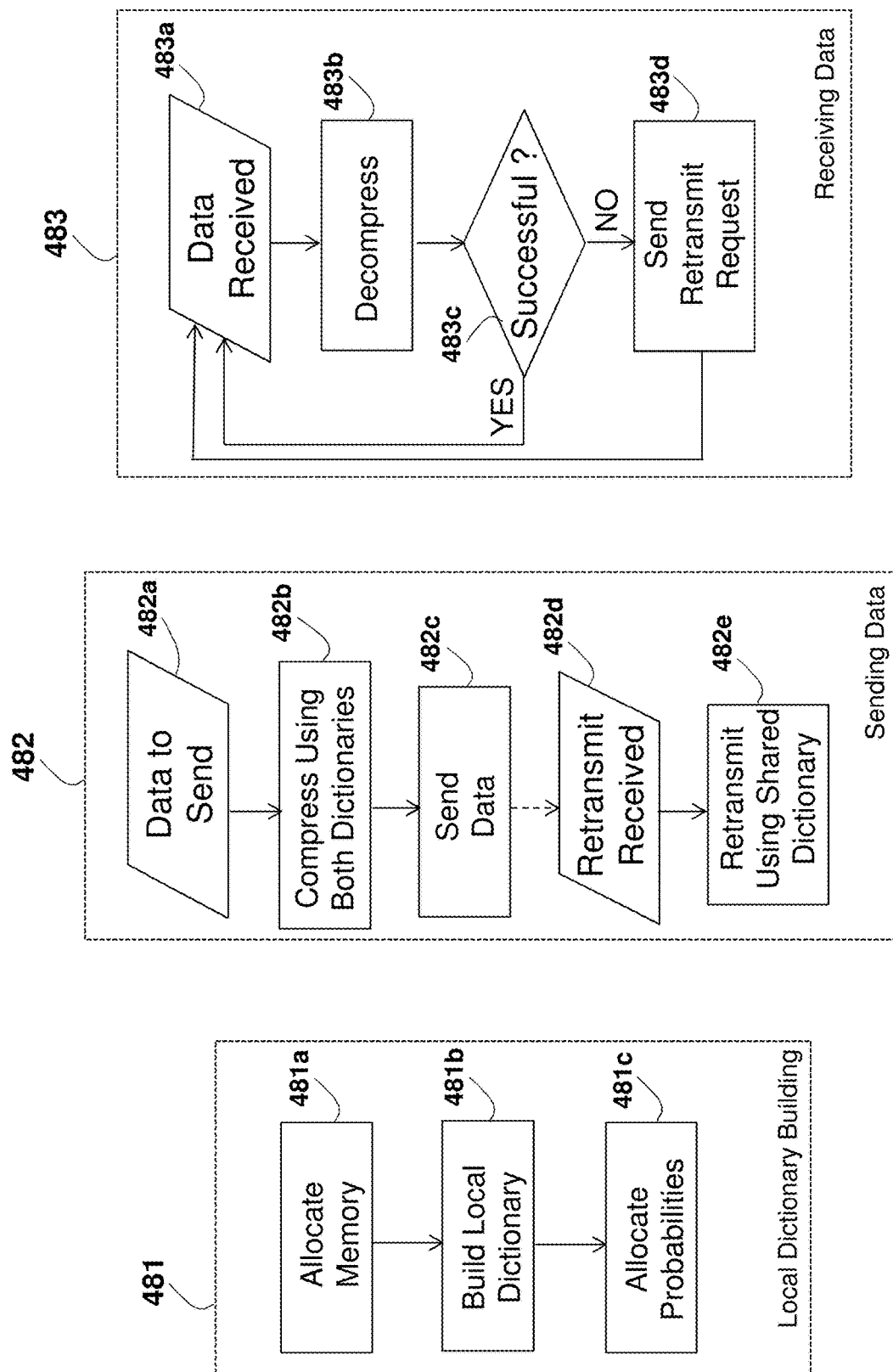
FIG. 48 illustrates schematically a simplified flowchart relating to implementing a one-way compression using a local dictionary.

The building of the local dictionaries 478a and 478b in the respective encoding device 471a and the decoding device 472a is shown as a 'Local Dictionary Building' flowchart 481 in FIG. 48, which may be executed by any network element. In the first step (such as upon a device power-up or upon launching the respective application), the device allocates a storage space in its memory (such as in its storage device 25c) for the local dictionary in an 'Allocate Memory' step 481a. For example, a buffer of the size of 1 GB may be allocated for serving as a dictionary. Alternatively or in addition, a portion of an available hard-disk storage area may be allocated. Next, a local dictionary (such as dictionaries 478a and 478b) is built in each of the devices in a 'Build Local Dictionary' step 481b. The device (such as the encoding device 471a or the decoding device 472a) scans the content stored in all its storage devices, such as the storage device 25c, the main memory 25a, and the ROM 25b, and partition it into chunks. The partition into chunks may involve the chunks being non-overlapping, equally-sized parts. In one example, a chunk size may be 2 KB (Kilo-Bytes), and in the case the content to be partitioned is not an exact multiple of 2 KB, the 'last' chunk will padded and filled with 'space' characters (or any other no content data). Each of the content in the chunks is identified by a chunk identifier, where each chunk identifier is associated with one, and only one, chunk, and the local dictionary stores the identifiers for the chunks. The identifiers of the chunks may be their calculated checksum, or the CRC of the content of the chunk is calculated, and used as the chunk identifier. For example, CRC-32 may be used, allowing each chunk (such as 16 KB size) to be identified by 33-bit identifier. Alternatively or in addition, a chunk identifier is based on a hash function of the chunk content. Since the same rules regarding partitioning into chunks and identifying the chunks are used by both the encoding device 471a and the decoding device 472a, and since it is assumed that some identical content is stored in both devices, the resulting local dictionaries 478a and 478b will have many common entries, that can be used for dictionary-based lossless compression.

Since the storage area allocated in the 'Allocate Memory' step 481a may be limited and may not store all the chunks' identifiers, priorities may be assigned to parts of the partitioned content, and only identifiers of chunks associated with a high priority content will be stored as part of the local dictionary. Such probabilities are allocated as part of an 'Allocate Probabilities' step 481c, and may involve assigning higher probability, leading to higher priority for being included in the local dictionary, to files and data that are likely to be stored in both devices. For example, files of the operating system may be assigned higher probability since they are likely to be stored in both devices, while locally generated data may be associated with a lower probability.

The encoding device 471a may execute a 'Sending Data' flowchart 482 shown in FIG. 48, which may be executed by any network element. Upon receiving data to send in a 'Data to Send' step 482a, such as receiving DATA_1 in input port 475a of the encoder 474a, the encoder 474a compresses the received data in a 'Compress Using Both Dictionaries' step 482b. The compression scheme may use either the local dictionary 478a, or the shared dictionary 473a, or both, where chunks to be transmitted are replaced with their identifiers as stored in one of these dictionaries. In one example, the local dictionary 478a is first fetched for a chunk identifier, and only if such identifier do not exist in that dictionary, the shared dictionary is used according to any compression scheme. The compressed data DATA_2 at encoder 474a output port 475b is then sent via the network 480 to the decoding device 472a.

Upon receiving data, such as the DATA_2 from the network 480, the decoding device executes a 'Receiving Data' flowchart 483, shown in FIG. 48, which may be executed by any network element. The data is received at the decoder (or decompressor) 477a input port 476a, in a 'Data Received' step 483a. The decoder 477a decompress the received data in a 'Decompress' step 483b, such as by replacing the received identifiers with the actual chunks for reconstructing the original data DATA_1, and outputting it at the port 476b. However, a received chunk identifier (or multiple identifiers) may not be found in the local dictionary 478b, as checked in a 'Successful ?' step 483c. In the case an identifier is not located, the decoder 477a sends via the Feedback connection 479b, a retransmit request over the network 480, in a 'Send Retransmit Request' step 483d. In the case the decompression was successful, or after sending the retransmit request, the decoder 477a handles the next received chunk (if exists) by reverting to the 'Data Received' step 483a.

The retransmit request is received at the connection 479a of the encoder 474a, and is handled as part of a 'Retransmit Request' step 482d. The encoder 474a retransmits the chunk for which an identifier was not found in the decoding device 472a. The encoder 474a may send the chunk in an uncompressed form. Alternatively or in addition, if the unidentifiable chunk was compressed using the local dictionary 478a, the encoder may now retransmit the chunk using the shared dictionary 473a. The shared dictionaries 473a and 473b may be built and used using any known dictionary-based compression scheme. Alternatively or in addition, the shared dictionaries 473a and 473b may be based on content and dictionaries received from other network elements.

Using a compression scheme allows for reducing the time interval required in order to transfer a content from an encoding device (such as the encoding device 471a) to a decoding device (such as the encoding device 472a), by reducing the number of bits that are actually transferred, while allowing to fully reconstruct the entire content. For example, in a case where the content to be transferred is about the size of 100 Kb, using lossless compression may allow for transmitting and receiving only 80 Kb, while allowing the reconstruction of the whole 100 Kb size content, hence saving 20% of the total content size. Assuming the content is transferred over a communication medium (such as the network 480) that is associated with $RTT_1$ and $BW_1$, the time saved due to the compression can be calculated to be BITS_REDUCED/$BW_1$, where BITS_REDUCED denotes the size of the saved content that is not transmitted over the network due to the compression, such as 20 Kb (100 Kb-80 Kb) in the above example. In one example, assuming the saved part of the content is transmitted separately and hence the $RTT_1$ is associated with its transmission, the time saved may be calculated to be $RTT_1$+BITS_REDUCED/$BW_1$. It is noted that in a case wherein the processing time due to the compression and decompression is not negligible (denoted COMPRESS_TIME), the added time associated with these activities may be reduced from the calculated saved time above, to be SAVED_TIME=$RTT_1$+BITS_REDUCED/$BW_1$-COMPRESS-TIME.

In the case wherein a retransmission is required, there is time-consuming overhead added to the total transfer time, relating to the retransmission request from the decoding device to the encoding device, such as the 'Send Retransmit Request' step 483d, the 'Retransmit Received' step 482d, and the 'Retransmit Using Shared Dictionary' step 482b, and the associated overhead of handling these steps, and the actual retransmission process. Assuming the communication medium (such as the network 480) used to send the retransmitted message from the decoding device to the encoding device is associated with $RTT_2$ and $BW_2$, the added time period for the sending of the retransmitted message (the 'penalty') can be calculated to be $RTT_2$+MESSAGE_SIZE/$BW_2$, where the MESSAGE_SIZE relates to the size of the retransmitted message. Further, the retransmission itself of the content part that was not successfully compressed when first transmitted, causes a delay of $RTT_1$+RETRANSMIT_SIZE/$BW_1$, hence the total delay associated with retransmission may be calculated to be $RTT_2$+MESSAGE_SIZE/$BW_2$+$RTT_1$+RETRANSMIT_SIZE/$BW_1$. It is noted that in a case wherein the processing time due to the retransmission, the re-compression and the re-decompression (assuming another compression scheme is used) is not negligible (denoted RECOMPRESS_TIME), the added time associated with these activities may be added to the calculated added time above, so that the retransmission total added time ('penalty') may be PENALTY=RECOMPRESS_TIME+$RTT_2$+RETRANSMIT_SIZE/$BW_2$+$RTT_1$+MESSAGE_SIZE/$BW_1$. Hence, while the net time saved as part of a compression scheme may be calculated to be the saved time period, deducting the total retransmission related time period, and thus the actual time saving, denoted as an ACTUAL_SAVE and equal to SAVED_TIME−PENALTY, may be calculated as ACTUAL_SAVE=($RTT_1$+BITS_REDUCED/$BW_1$−COMPRESS-TIME)−(RECOMPRESS_TIME+$RTT_2$+MESSAGE_SIZE/$BW_2$+$RTT_1$+RETRANSMIT_SIZE/$BW_1$). In the case the ACTUAL_SAVE is negative (ACTUAL_SAVE <0), the using of the compression scheme is not efficient, as there is no actual saving of any latency in the effective total content transmission time.

The need for retransmission may be estimated, and thus the time saving in using a compression scheme may be estimated, and used for deciding to use a compression scheme, or what compression scheme to use. In one example, a probability of retransmission is allocated to each content (or a part thereof). The probability may be estimated based on the probability that a random device may store such content, based on former communication sessions, based on a receiving device characteristics (such as being a laptop, a desktop, a smartphone, or a mobile device), based on the receiving device operating system (such as Windows or Android), or based on the receiving device IP address. Based on the assigned retransmission probability, the estimated time savings using various compression schemes may be estimated, and the estimation may be used in order to select between compression schemes. Assuming a probability P for a successful compression, the probability for a retransmission is 1−P, and hence the estimated time saving (EST_ACTUAL_SAVE) can be calculated as EST_ACTUAL_SAVE=SAVED_TIME−(1−P)*PENALTY, hence in the case of P=1 (successful compression, no retransmission), the saved time will be the SAVED_TIME, and in case of P=0 (retransmission guaranteed), the estimated saved time is SAVED_TIME−PENALTY. In the case the EST_ACTUAL_SAVE is negative (or zero), whereby no actual time saving is expected to be achieved, an alternative (or none) compression scheme should be used.

Figure 48A:
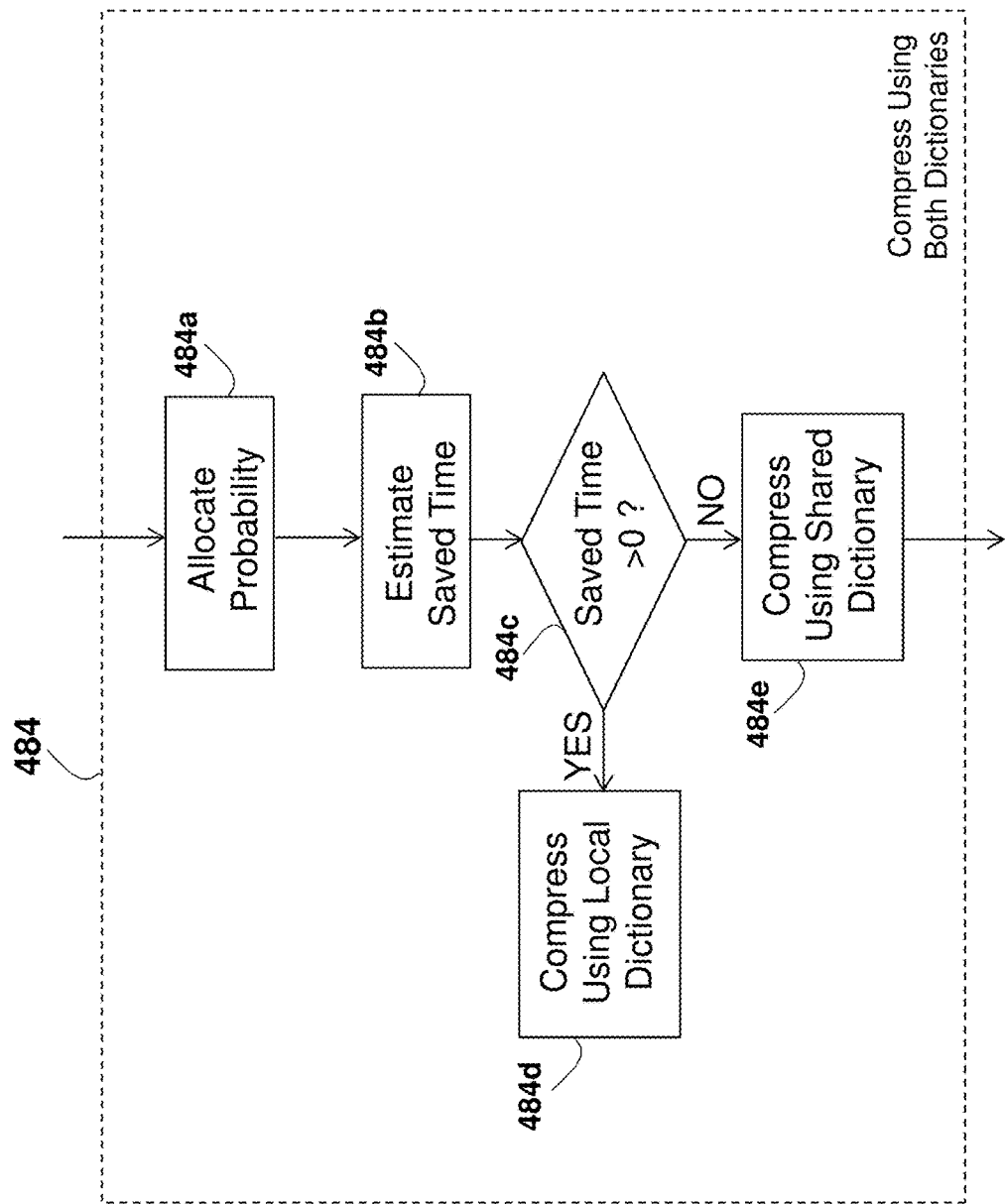
FIG. 48a illustrates schematically a simplified flowchart relating to implementing a compression using both dictionaries.

Referring now to a flowchart 484 shown in FIG. 48a, which may be part of the 'Compress Using Both Dictionaries' step 482b of the flowchart 482. The content or data to be compressed before transmission is checked, and a probability of successful compression using a local dictionary (such as the dictionary 478a), defined as a compression where no retransmission is required, is allocated as part of an 'Allocate Probability' step 484a. Using the allocated probability, the saved time is estimated in an 'Estimate Saved Time' step 484*b*, for example based on the expression EST_ACTUAL_SAVE=SAVED_TIME−(1−P)*PENALTY described above. The actual estimated time saving (such as EST_ACTUAL_SAVE) is checked in a 'Saved Time >0 ?' step 484*c*. In a case where the estimated time is positive, suggesting that there is a latency reduction by using a compression based on the local dictionary 478*a* method, a compression based on the local dictionary 478*a* follows in a 'Compress Using Local Dictionary' step 484*d*. In a case where the estimated saved time is negative, suggesting that no time is saved using a local dictionary based compression scheme, a compression based on the shared dictionary 478*a* (or sending the data uncompressed) follows in a 'Compress Using Shared Dictionary' step 484*e*.

Figure 49:
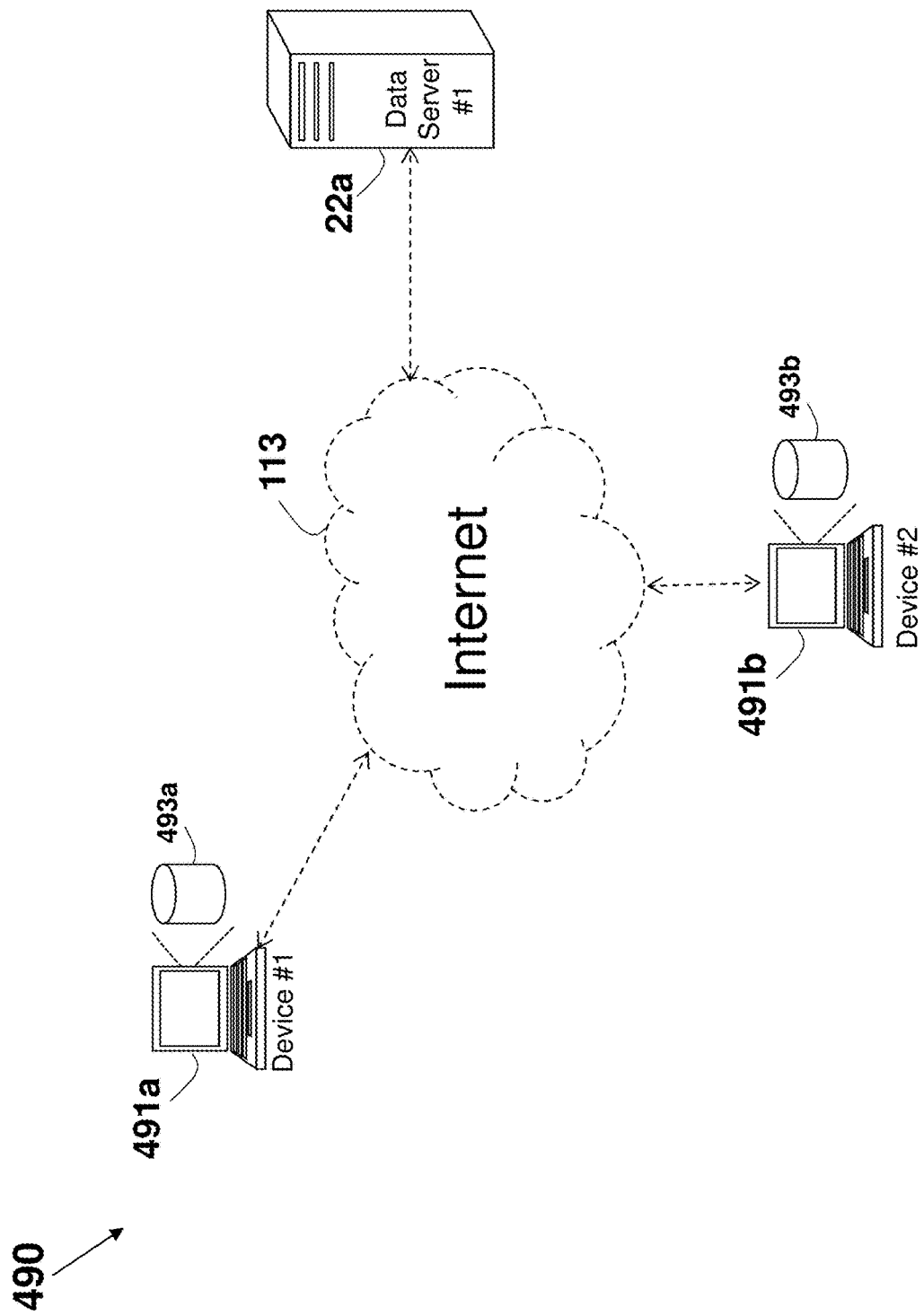
FIG. 49 illustrates schematically a block diagram relating to multiple copies of the same content.

Referring to a system 490 shown in FIG. 49, showing a device #1 491*a*, which may consist of, comprise of, or is included in, a tunnel-based client device (such as the client device #1 31*a*), a peer-based client device (such as the client device #1 31*a*), or any other network element, a device #2 491*b*, which may consist of, comprise of, or is included in, a tunnel device (such as the tunnel device #1 33*a*), a peer device (such as the peer device #1 102*a*), or any other network element, and the data server #1 22*a*, connected for exchanging information over the Internet 113. The data server #1 22*a* may store a content that is identified by a URL (or by any other identifier type). Further copies of the content may be stored in a memory 493*a* being part of the device #1 491*a*, and in a memory 493*b* being part of the device #2 491*b*. The copies of the content stored in the devices may be the result of fetching it from the data server #1 22*a* as part of previous interactions. In one example, an application in the device #1 491*a* requests the same content. As described in the 'Locally cached ?' step 331*c* in the flowchart 330, it is more efficient to retrieve the requested content from the local memory (such as the memory 493*a*) as described in the 'Fetch from Local cache' step 331*b* in the flowchart 330, than to spend resources in order to again fetch the same content from the data server #1 22*a*.

However, while identified by the same identifier (such as a URL), the content in the data server #1 22*a* may have been changed or updated since it was fetched by the device #1 493*a* or by the device #2 491*b*, thus the copies stored in these devices may not anymore be valid or updated. In such a scenario, the locally stored non-valid stored copy should be ignored and discarded, and not used anymore, and hence a fresh content relating to the URL needs to be fetched from the data server #1 22*a*, or from another location. Further, a validity period may be associated with a content or its copy, where the content is ensured to be valid until the validity period expires. In one example, the validity of a copy of a content is verified by comparing a part of a validated (or original) content, to the respective part of the checked copy. In the case the two parts are the same, the copy is declared as valid, assuming the rest of the copy of the content is the same as the updated content.

Figure 49A:
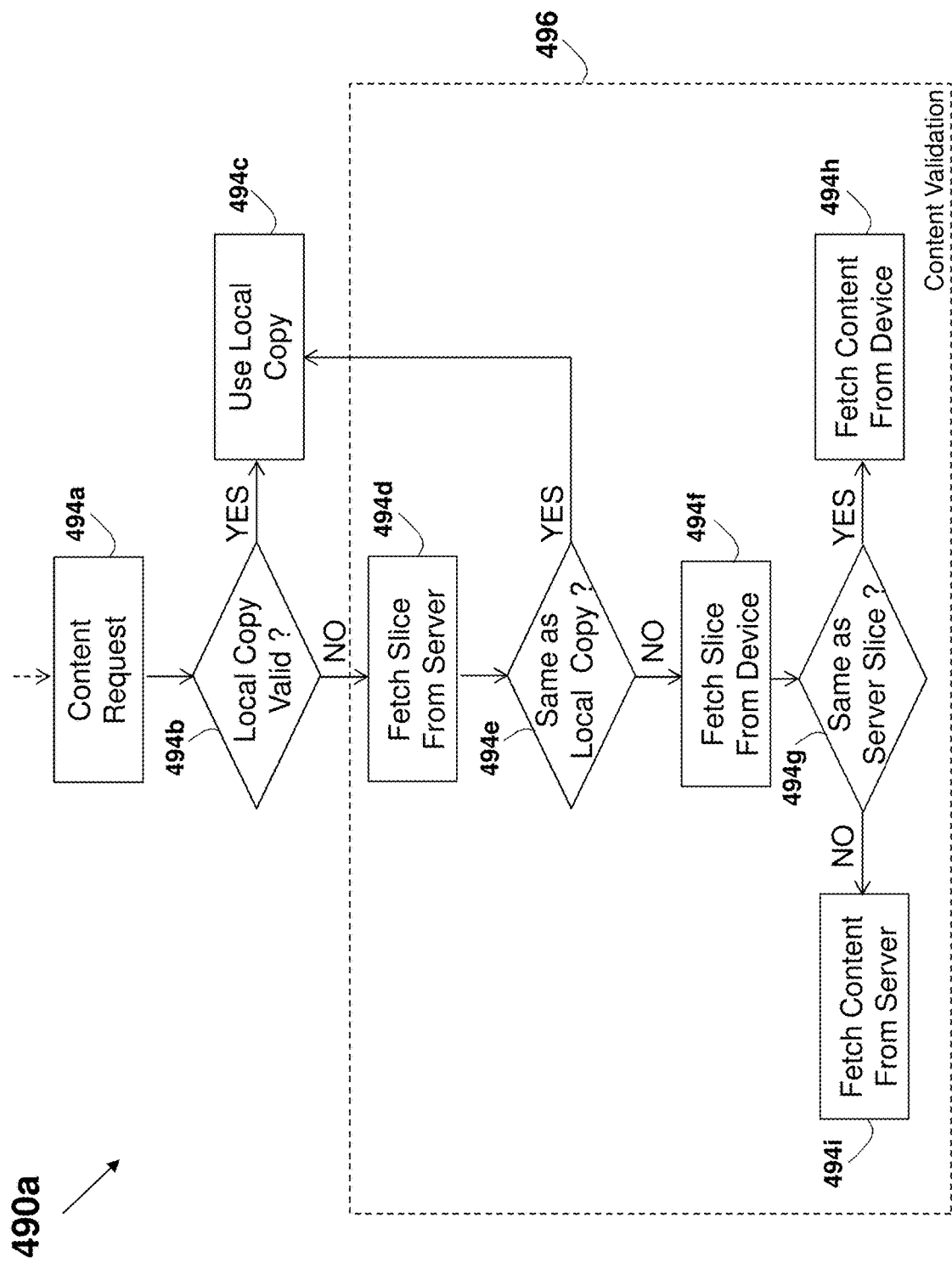
FIG. 49a illustrates schematically a simplified flowchart relating to comparing multiple copies of the same content.

Referring to a flowchart 490*a* shown in FIG. 49*a*, describing a method for validating a copy of a content. The request for the content (such as by using a URL or any other content identifier) is obtained in an 'Obtain Content Request' step 494*a*. In a 'Local Copy Valid' step 494*b* (which may be part of the 'Locally Cached' step 331*c*) the validity of the content, if known (such as by checking that the associated period has not yet expired), is checked. In the case the locally stored copy (such as in the memory 493*a* of the device #1 491*a*) is determined to be valid, the locally stored content is used in a 'Use Local Copy' step 494*c*, which corresponds to the 'Fetch from Local Cache' step 331*b* in the flowchart 330. In the case the validity of the locally stored copy is suspected, a part of the content (preferably a small part) is fetched from the data server #1 22*a* in a 'Fetch Slice From Server' step 494*d*. The requested and fetched part of the content may be a slice or chunk, as described herein. Alternatively or in addition, a fixed number of bytes may be used. Further, the size of the fetched part may be 5% or 10% of the total size of the content. The part of the content may be the first part, the last part, or any other part of the content.

In a 'Same as Local Copy ?' step 494*e*, the fetched part of the content is compared with the respective part of the locally stored copy of the content. In the case the two checked parts are found to consist of the same information, the locally cached content is determined to be valid, and is used as a response to the content request in the 'Content Request' step 494*a* as part of the 'Use Local Copy' step 494*c*. In the case where the two checked parts are different, the locally cached content is determined to be non-valid. Next, a slice of a copy of the content is requested and fetched from another network element, such as from the device #2 491*b* in a 'Fetch Slice From Device' step 494*f*, and the fetched slice is checked in a 'same as Server Slice ?' step 494*g*, and compared versus the slice that was fetched from the data server #1 22*a* in the 'Fetch Slice From Server' step 494*d*. In the case where the two checked parts are found to consist of the same information, the cached content in the network element (such as in the memory 493*b* of the device #2 491*b*) is determined to be valid, and the device #1 491*a* may fetch the content therefrom in a 'Fetch Content From Device' step 494*h*. In one example, such fetching may use any of the methods described herein, for example, the device #2 491*b* may be used as a peer device. Alternatively or in addition, the device #1 491*a* may fetch the updated content from the data server #1 22*a* itself, corresponding to the 'Fetch from Server' step 331*e* in the flowchart 330. In the case where the two checked parts are different, the cached content in the network element (such as in the memory 493*b* of the device #2 491*b*) is determined to be non-valid, and thus the device #1 491*a* can only fetch the updated content from the data server #1 22*a*, as part of a 'Fetch Content From Server' 494*i*, corresponding to the 'Fetch from Server' step 331*e* in the flowchart 330.

The steps involved in the actual validating of the local content copy are considered part of a 'Content Validation' flowchart 496, that is part of the flowchart 490*a* in FIG. 49*a*. In a 'Same as Local Copy' step 494*e* and a 'Same as Server Slice' step 494*f*, two parts of the content are compared. The actual information in the compared parts may be compared in a bit-by-bit (or byte-by-byte) level. Alternatively or in addition, the checksums, the CRCs (or any other hash function), HTTP headers, or any other information representative of the parts information may be used for determining of the parts are the same.

Figure 49B:
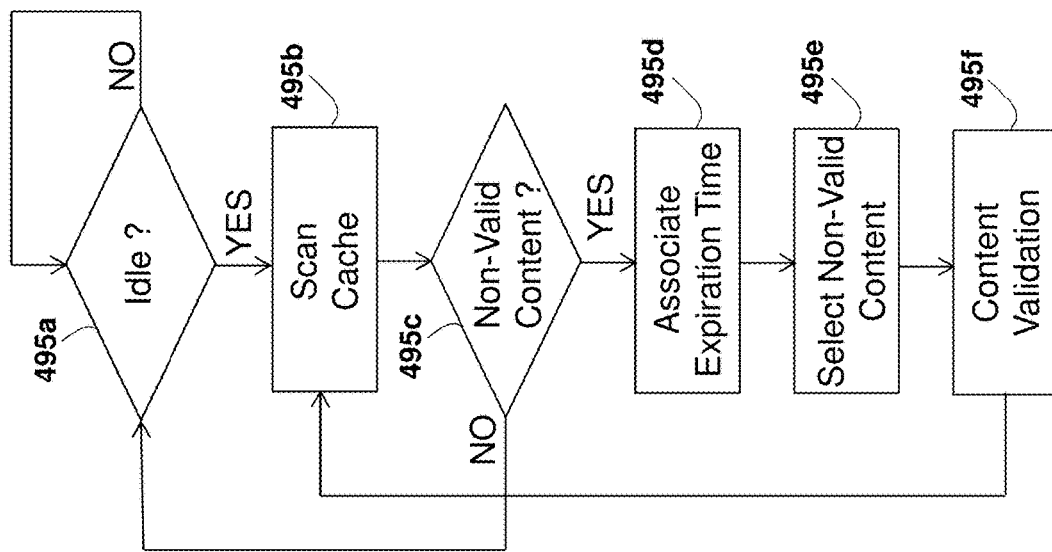
FIG. 49b illustrates schematically a simplified flowchart relating to validating a copy of a content.

In one example, a network element (device) periodically checks and validates the content stored in it. Hence, when the content is required, local copy may be used for either local use or as a peer device, allowing for faster response to a request for the locally stored content. A network element may thus execute a flowchart 490*b* shown in FIG. 49*b*. The validation process is considered as a low-priority task, so in an 'Idle ?' step 495*a*, the activity of the network element is checked, such as checking the CPU utilization, the available storage size, or the available communication bandwidth. In the case the activity is above a set threshold, the higher-priority activities are given precedence, and the validation activity is not activated, and the element remains in the 'Idle ?' step 495*a*. Upon availability of enough resources and determination that no other more important tasks are to be activated, the device scans the local memory (or cache) in a 'Scan Cache' step 495*b*, and the entries of the various content copies are checked for validity. In the case where all the content parts are found to be valid in a 'Non-Valid Content ?' step 495*c*, the device resumes to the idling of the validation process in the 'Idle ?' step 495*a*, since no validation activity is required. For each of all content entries that are found to be non-valid, the time left until its validity expiration is checked, and is associated with the respective content entry, in an 'Associate Expiration Time' step 495*d*. It is noted that some content entries may be determined to be not important, and thus will not be part of the validation process. Out of the content entries that are considered as important, the device selects the content entry that is the first to expire, in a 'Select Non-Valid Content' step 495*e*. The selected content is then validated in a 'Content Validation' step 495*f*, which corresponds to the 'Content Validation' flowchart 496 shown as part of the flowchart 490*a* in FIG. 49*a*. After validating the selected content, the memory is re-scanned for non-valid content in the 'Scan Cache' step 495*b*, and the validating process is until all important and non-valid content entries are validated.

Figure 50:
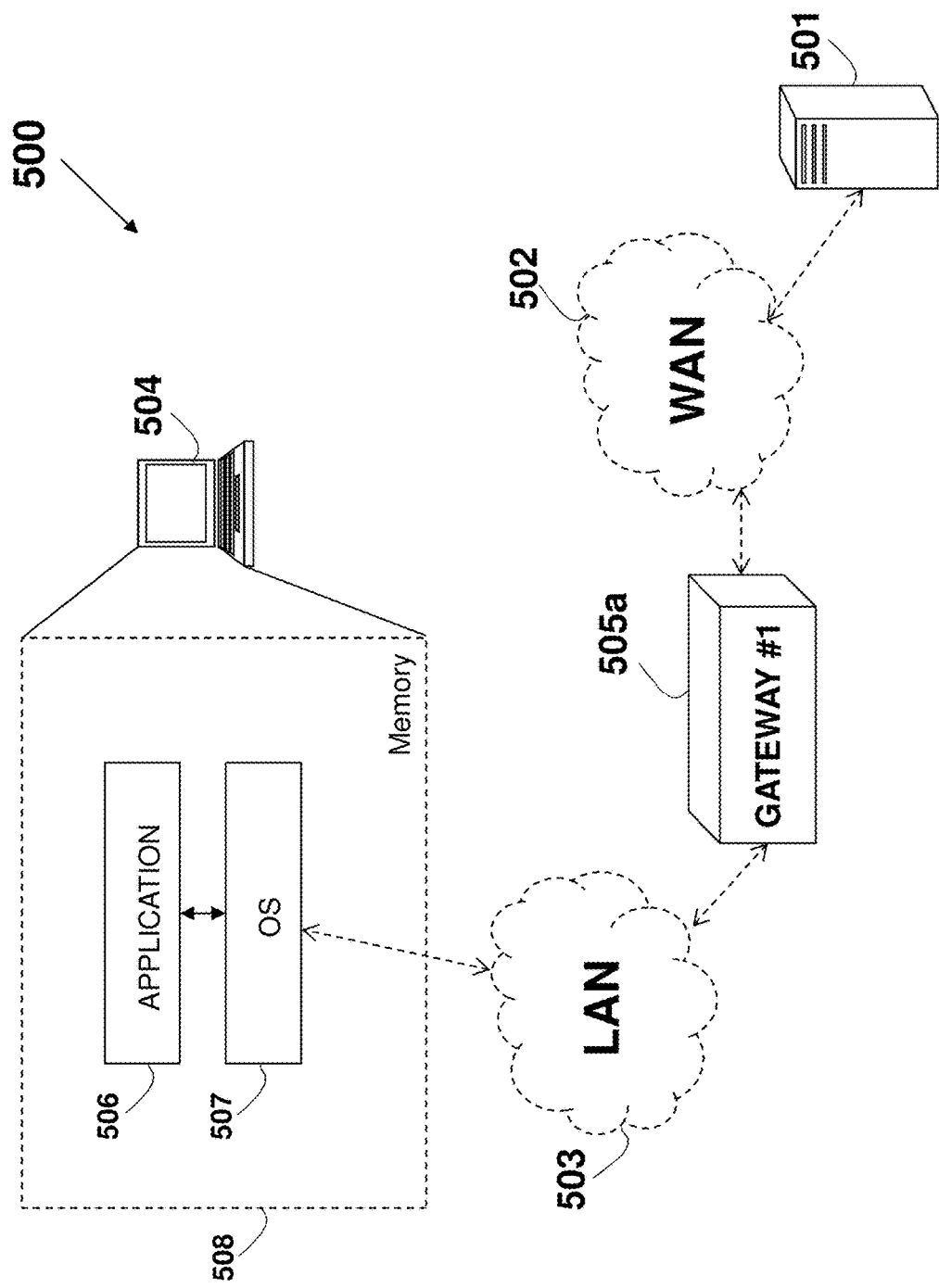
FIG. 50 illustrates schematically a gateway connecting network elements over a WAN and a LAN.

As shown in the system 500 in FIG. 50, a network element 504 may connect to another network element 501 via the gateway #1 505*a*. Due to many reasons, the network element 504 may disconnect for a short time from the gateway #1 505*a*, and then may re-connect to the same gateway 505*a* or to another gateway. In such a case, the application 506 detects the connection disruption with the gateway 505*a*, and lose the connectivity during the time there is no connection to any gateway. In a case where the application is a web browser, such short loss of connectivity may cause service disruption, such as the "404 page not found" message to a user. Further, recovering from such loss of connection may be time consuming and employs valuable resources.

Figure 51:
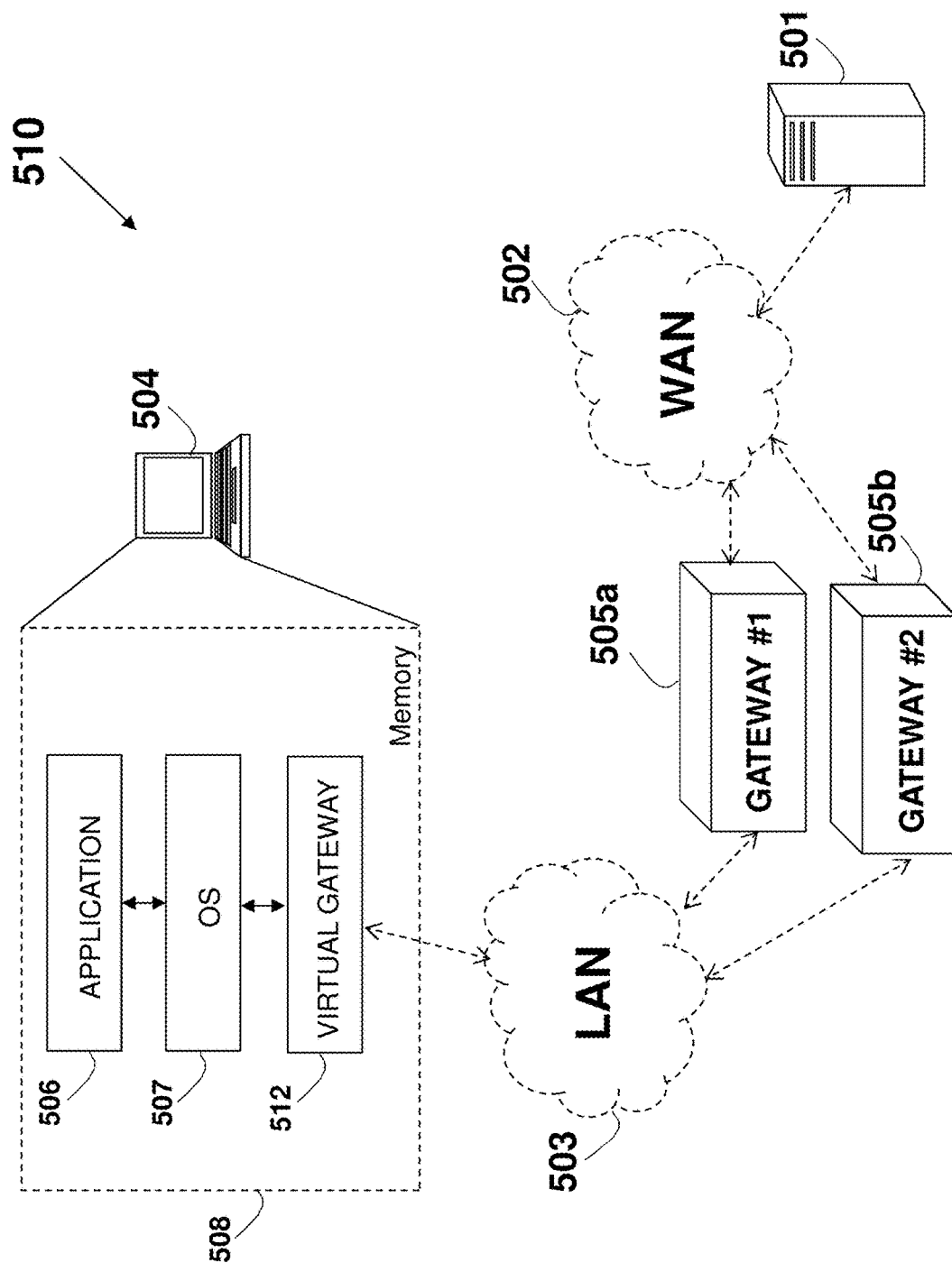
FIG. 51 illustrates schematically using a VGS for communicating with a gateway connecting network elements over a WAN and a LAN.

A Virtual Gateway Service 512 (VGS) may be used to reduce the period of re-connection, and to reduce the harmful impact on the network element 504 operations, as shown in a system 510 in FIG. 51. The network element 504 may use either the gateway #1 505*a* or a gateway #2 505*b* for connecting to the network element 501. The VGS 512 is a software stored in the network element 504 memory 508, and operating as an intermediate level between the OS 507 and the physical layer connecting to the LAN 503. The VGS 512 intercepts requests from the operating system 507 to the network for receiving configuration information, and receives on the configuration information from the gateway #1 505*a*. This information is fed back to the OS 507, hence serving as a proxy (or an agent) for a configuration information between the OS 507 and the gateway #1 505*a*. Alternatively or in addition, an intercepted request from the OS 507 may be responding directly by the VGS 512. For example, in a case of an intercepted IP request, the VGS may locally provide an IP address.

In one example, the network element 504 may disconnect from the gateway #1 505*a*, and may connect to the gateway #2 505*b* shortly after. The VGS 512 may simulate to the operating system 507 a gateway response, so that the OS 507 may not detect the disconnection from gateway #1 505*a*, and as such may not report an error or a change of a status. When the re-connection to the new gateway #2 505*b* has been done, the VGS 512 may request new configuration information, while not notifying or changing the operating system 507 status. Thus, from the perspective of the operating system 507, it is continuously connected to a gateway and a network, and the actual disconnection is not sensed by the OS 507. However, in a case of a long disconnection (from a network or a gateway), the VGS 512 senses such a disconnection (such as longer than pre-defined time period), and accordingly notifies the operating system 507, thus providing the operating system 507 and the application 506 the ability to correctly respond correctly to the situation, such as to notify the user.

Figure 51A:
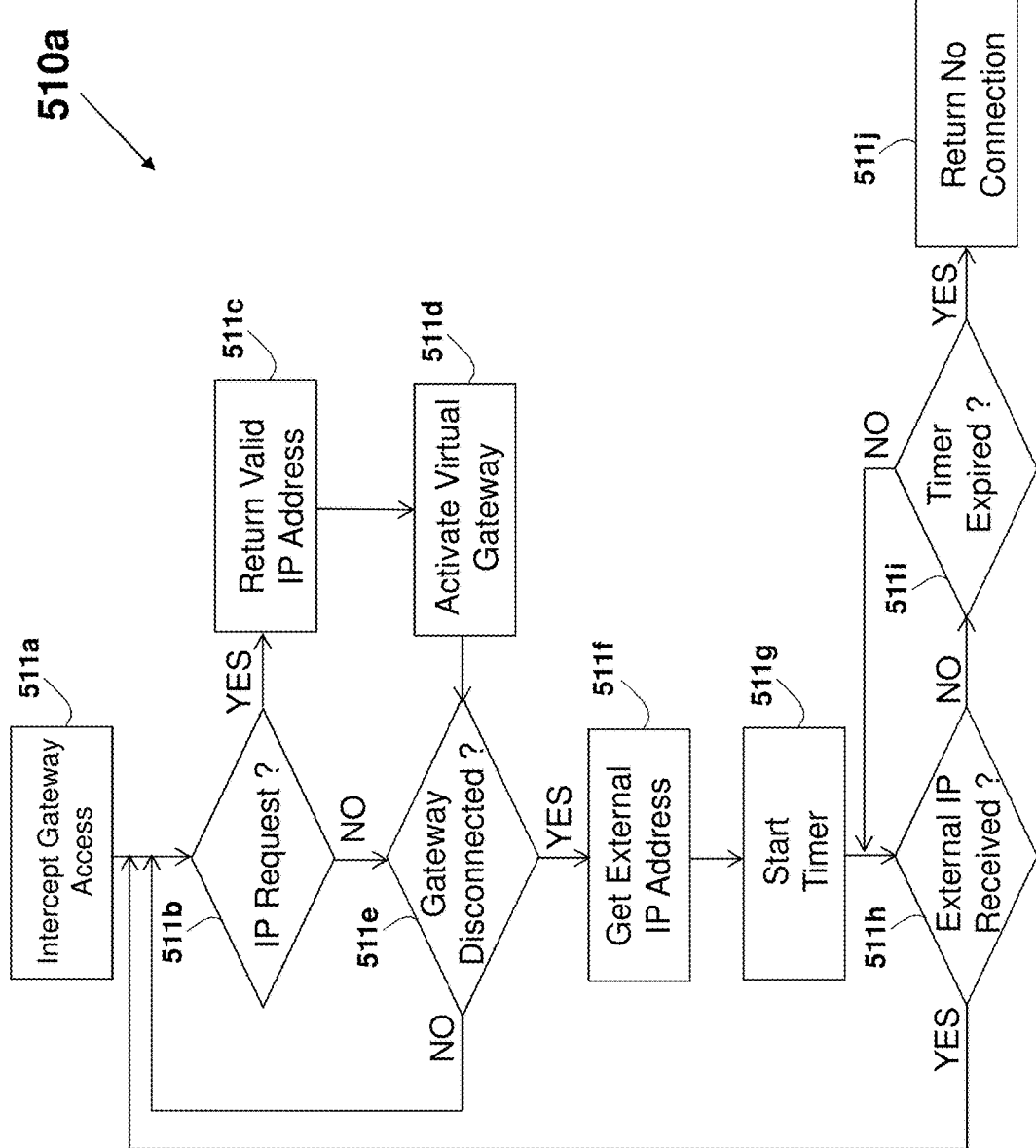
FIG. 51a illustrates schematically a simplified flowchart of a VGS.

The VGS 512 may execute a flowchart 510*a* shown in FIG. 51*a*. Upon connecting to a network such as the LAN 503, the OS 507 (via the VGS 512) sends an IP request to the gateway 505*a* identified on the network 503. During such initialization process, the VGS 512 is transparent, and allows the OS 507 to complete the regular process of initializing of a communication session. Afterwards, any request for IP address, for any configuration information, or any other initialization access, to the gateway 505*a* is intercepted as part of an 'Intercept Gateway Access' step 511*a*. In a case where the intercepted (or trapped) request is an IP request, as detected in an 'IP Request ?' step 511*b*, the VGS 512 serves effectively as a NAT, and provides an IP address for the OS 507 to use, as part of a 'Return Valid IP Address' step 511*c*. The VGS 512 continues to serve (from the OS 507 point of view) as an external proxy/NAT or simulates a connection with a gateway as part of an 'Activate Virtual Gateway' step 511*d*. In a 'Gateway Disconnected ?' step 511*e*, the VGS 512 checks the status of the actual connection to the gateway, such as the gateway #1 505*a*. If no actual disconnection is detected, the VGS 512 idles until a new IP request is intercepted as part of the 'IP Request ?' step 511*b*. If the actual connection to the gateway #1 505*a* is not available, the VGS 512 tries to get an actual externally-sourced IP address, such as from the gateway #1 505*a*, in a 'Get External IP Address' step 511*f*. If no network connection is available, the VGS 512 may skip this step. In parallel, a timer set to a time period (such as X milliseconds) is started in a 'Start Timer' step 511*g*, for measuring the disconnection related time. As long as the timer has not expired, the VGS 512 checks if an external IP address was obtained in an 'External IP Received ?' step 511*h*, as a response to the request sent in the 'Get External IP Address' step 511*f*. If an actual IP address was received before the timer expiration, as checked in a 'Timer Expired ?' step 511*i*, such as from an alternative gateway that may be the gateway #2 505*b*, the received IP address is returned for the use of the OS 507, allowing for a quick switchover between the gateways, and for normal NAT/proxy service to the OS 507. However, if the timer has expired and no IP address was obtained, the VGS 512 notifies the OS 507 that the connection was lost, allowing for the operating system 507 to react to the disconnect state in the way it was programmed to.

Figure 52:
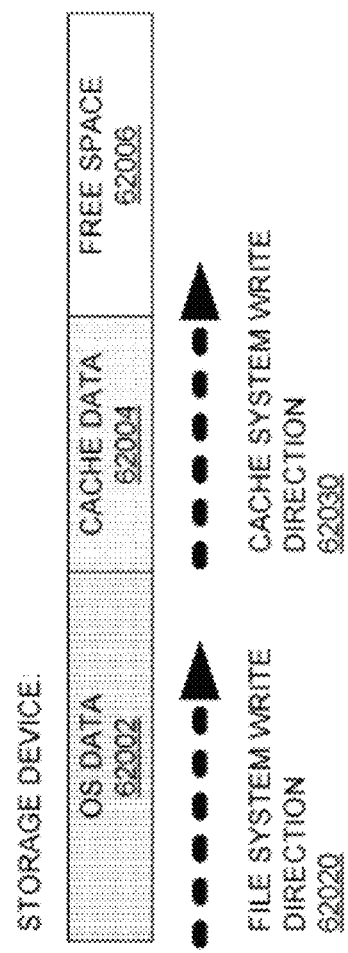
FIG. 52 depicts schematically a prior art of a cache arrangement in a memory.
Figure 53:
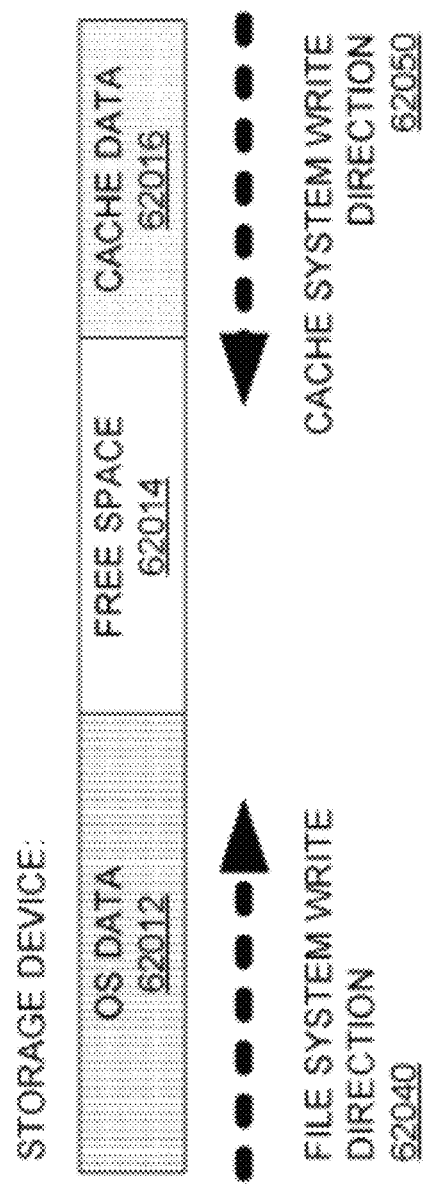
FIG. 53 depicts schematically a cache arrangement in a memory using overwrite reduction.

A concept of writing cache data to the free portion of the memory is introduced in U.S. Pat. No. 8,135,912 to Shribman et al., entitled: "System and Method of Increasing Cache Size". The stored information is transparent to the operating system, and thus more cache size is available without degrading the amount of memory that is available for the user to use. The memory arrangement in such a prior art system is shown in FIG. 52, where the file system first writes the OS data 62002, after which the cache data 62004 is written, followed by a not-used (free) space 62006. The problem with this memory management approach is that when the file system overwrites the cache data when adding data to the OS data 62002. In such a system where the free space 62006 is still available, it would be beneficial to have a system where such further OS writes would not overwrite the cached data while free space is available. Such a memory arrangement is shown in FIG. 53. The OS data 62012 is first stored, whereas the cache data 62016 is stored on the other side of the memory, starting at the furthest position from the start of the writing of the OS data 62012, so that the OS data 62012 overwrites the cache data only when a free space 62014 is completely used. It may also be desirable to have a system that cleans up the cache data, so that data that is no longer needed is removed, to maintain the free space and avoid the cache data being overwritten.

Figure 54:
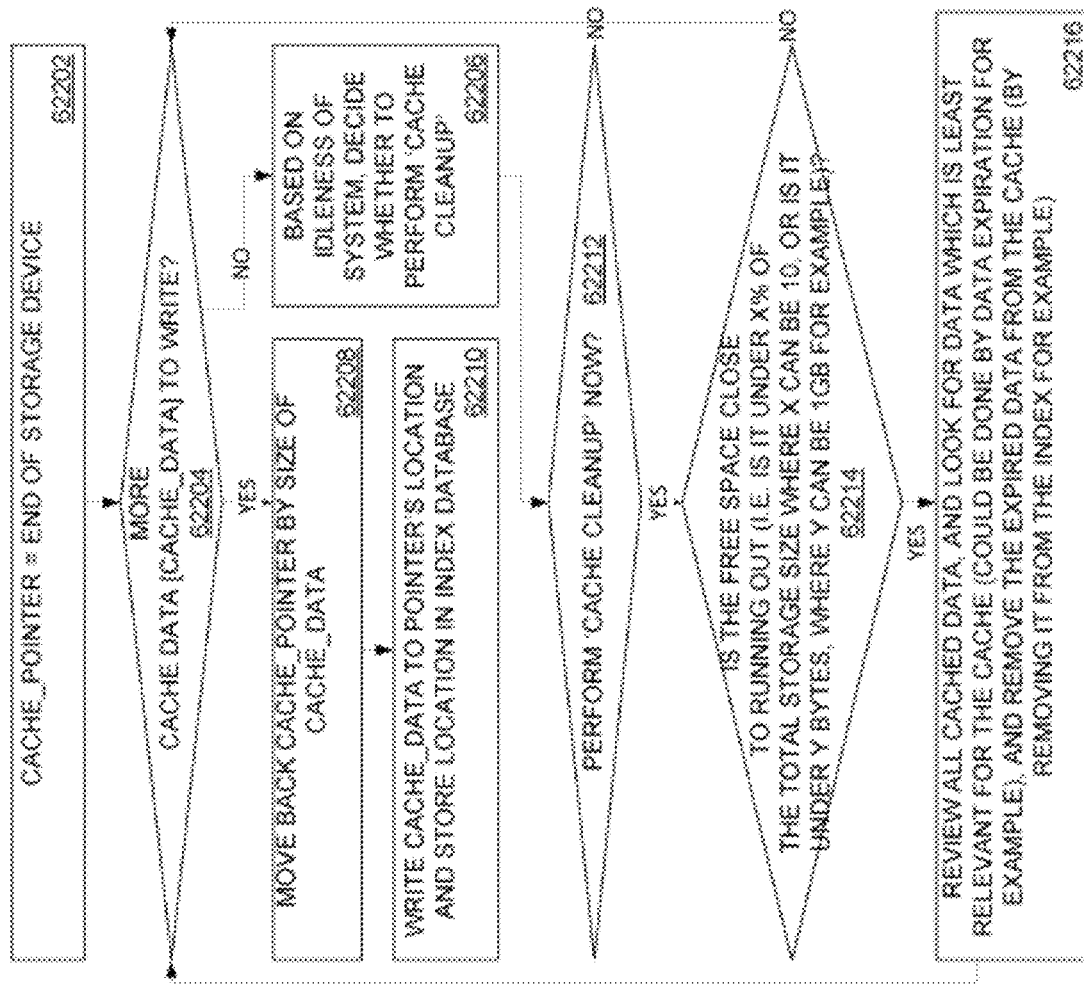
FIG. 54 illustrates schematically a simplified flowchart for cache overwrite reduction and cleanup.

FIG. 54 is a flowchart of a system for writing cached data in this modified method, as well as for cleaning up the cache periodically to allow for a free space in the system and thus less data overwrites. In a step 62202 the cache_pointer is set to the point on the storage location that is furthest from the starting point of where the OS data is written to when the storage device is empty. In a step 62204, it is checked whether cache data (cache_data) need to be written to the storage device. If not, then in a step 62206 it is checked whether system resources are idle enough to warrant a cache cleanup to be performed. If there is more cache to write, then in a step 62208 the cache_pointer is moved back (i.e., 'towards' the OS data) by the size of cache_data, and then in a step 62210 the cache_data is written to the storage device as the referenced patent instructs how to do (i.e., without notifying the operating system so that this space is still viewed as empty by the OS). This moving back of the pointer is novel, since it creates a situation where the data is written in a 'forward' direction (in the same direction to which the OS data is written to), which is typically the faster writing direction for storage devices, as they are optimized for writing OS data.

When the cleanup is performed, then in a step 62214 it is checked whether the free space is close to running out (e.g., is it under x % of the total available storage size, where x can be 10%, or under y Bytes free where Y is 1 GB for example). If this threshold has been reached, then in a step 62216 the least relevant cache is searched for to be removed. The criteria for less relevant could be in that it has expired, or that it is accessed the least, or any of other prior art cache purge methods. This cache item is removed.

A cache system such as that described in U.S. Pat. No. 8,135,912 to Shribman et al. entitled: "System and Method of Increasing Cache Size", creates a very large cache size (cache_size) but at the expense of the reliability of reading the cache back after writing it, where the probability for a cache miss (i.e., to try to read back the cached element and to fail) at a certain point in time would be P, where P<1.

Figure 55:
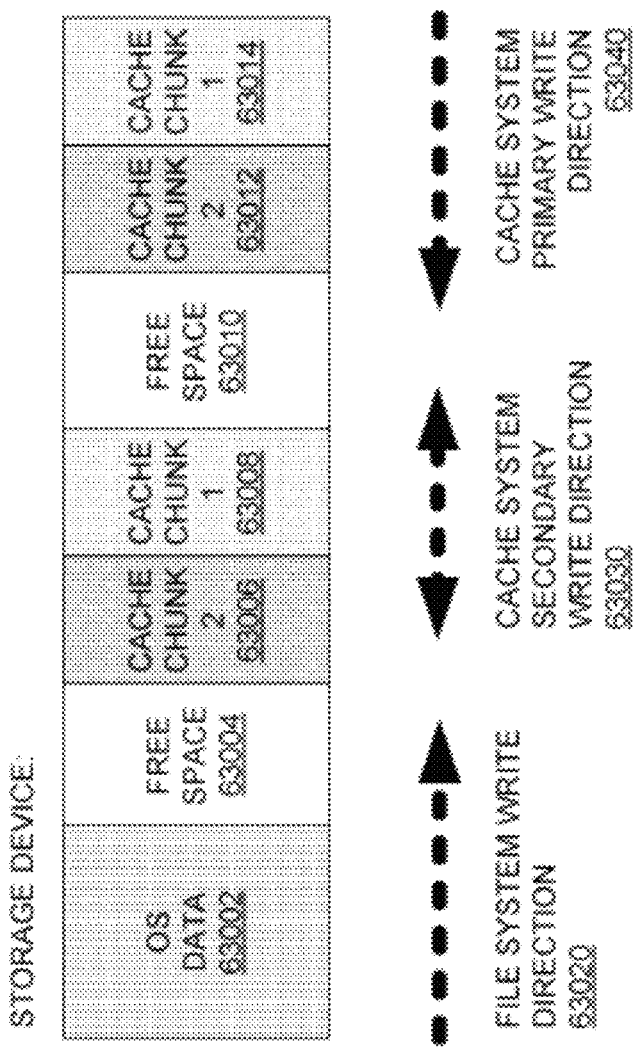
FIG. 55 depicts schematically a cache arrangement in a memory using redundancy with overwrite reduction.

In some cases, the cache_size is significantly bigger than required for the system operation. In such a case, FIG. 55 is a diagram of how P can be increased (i.e., reliability can be increased) at the cost of the cache_size. FIG. 55 offers to create two zones of writing the cache data in the storage device, where each element in the cache is written once to each zone. This way, the cache_size is reduced by half (since each element is written twice), and P would be reduced to P^2, since the probability of not reading back P would be to miss it in both of the zones. Thus, while the size of the cache is reduced linearly (cut in half), the probability of getting a cache miss is reduced exponentially (P^2).

Figure 56:
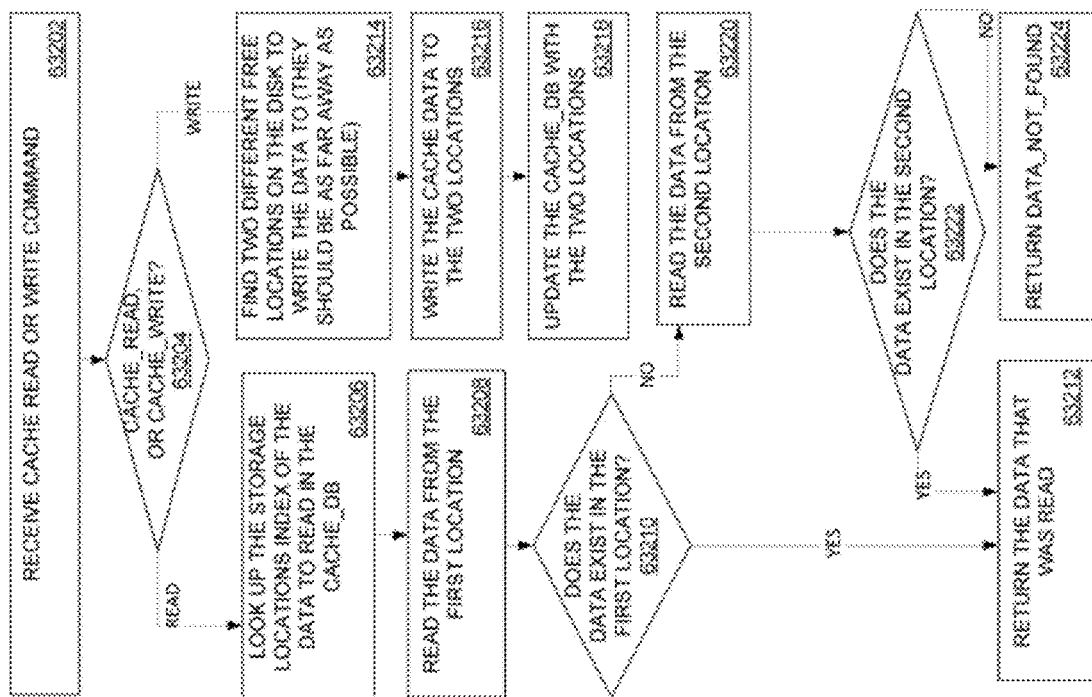
FIG. 56 illustrates schematically a simplified flowchart for cache overwrite reduction.
Figure 57:
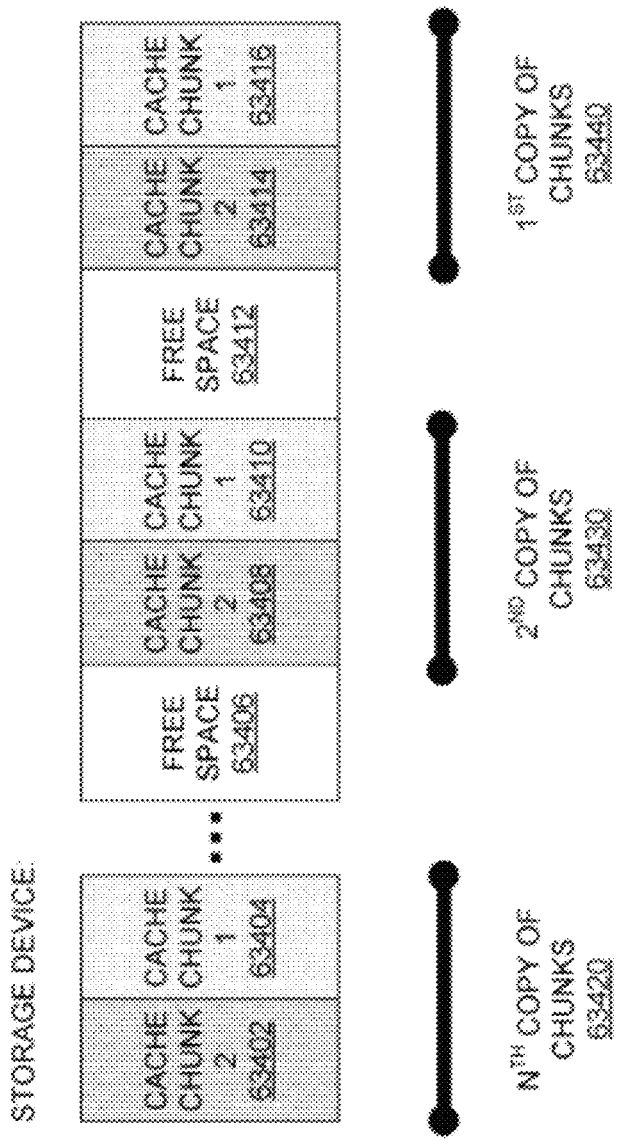
FIG. 57 depicts schematically a cache arrangement in a memory using overwrite reduction and having multiple chunk copies.

FIG. 56 is a flowchart for how this could be implemented. In a step 63202, a 'cache read' or a 'cache write' command is received by the module, and in a step 63204, it checks if it is a read command or a write command. If it is a read command, then in a step 63206 the module looks up in the cache index to find the two locations to which the cache was written, and in a step 63208 attempts to read the cache entry from the first location. A step 63210 checks if the cache entry was found in that read. If it was, then return a step 63212 the data that was read. If it was not found, then in a step 63220 read the cache entry from the second location and return it if found in the step 63212 or return data_not_found if not found in the second location as well. In the case of a write command, two different free locations are identified in a step 63214 and the cache data is written to those two locations in a step 63216. The cache index is updated with these two locations so that the cache entry can be found in future writes. FIG. 57 shows that in a similar manner, the amount of times that a cache element is written to the storage device can be increased from 2 as shown in FIGS. 55 and 56, to any number N, where in such a case the available cache size is reduced from (cache_size) to (cache_size/N), and the probability of a cache miss is reduced from (P) to (P^N).

(NDCACHE–Non-Deterministic volatile memory CACHE). In a computing device, the Random Access Memory (RAM) is a limited resource. When the operating system uses the RAM, it typically increases the speed of the application. However, excessive use of the RAM for an application limits the use of the RAM by other applications and thus limits their speed. One such use of the RAM is for caching information in order to speed up the speed of the program's operation. Such cached data may be data retrieved from the network, or be the result of a complicated operation, etc. Operating systems make use of the RAM for caching purposes, and typically leave some of the RAM free to be used later. If this free RAM, memory could be used to store additional cache without significantly affecting system performance in other ways that would be beneficial.

Figure 58:
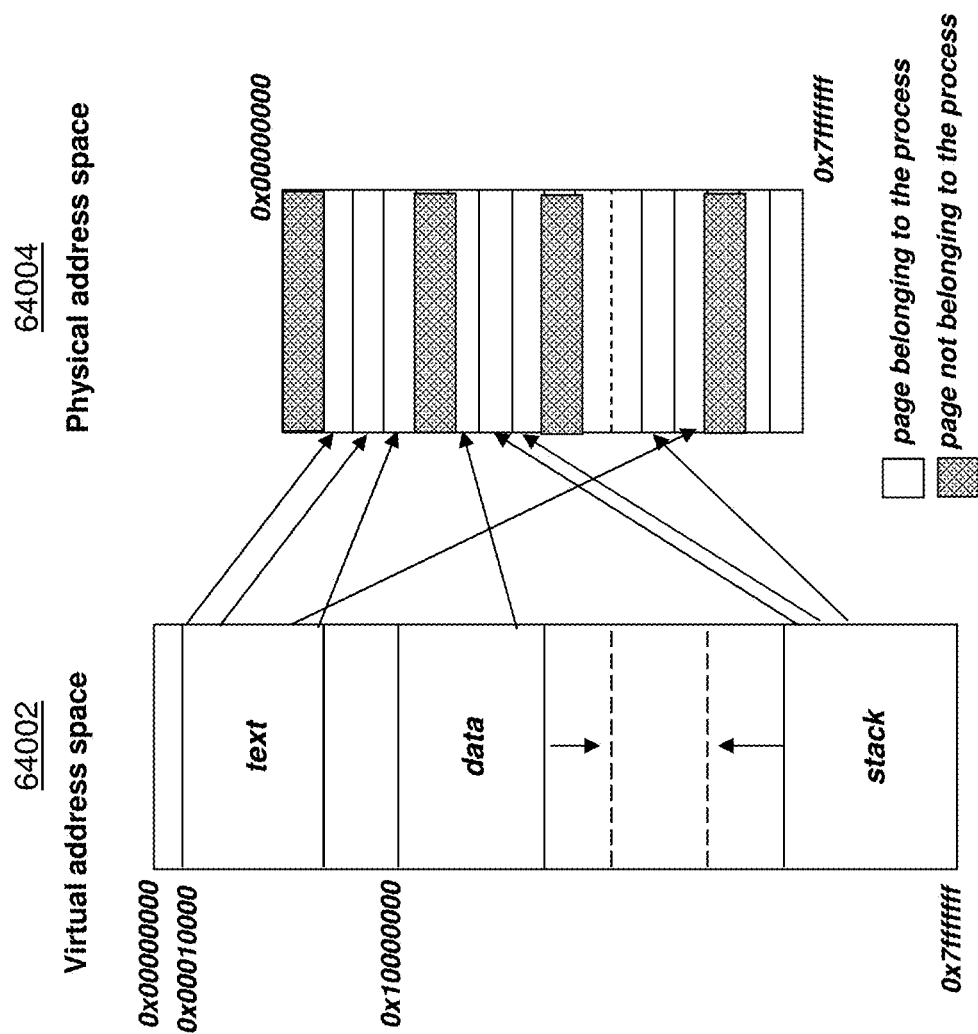
FIG. 58 depicts schematically a prior-art association of physical addresses to virtual addresses.

FIG. 58 is a diagram of the state of the art implementation of address space mapping. A physical address 64004 is a memory address that is represented in the form of a binary number on the address bus circuitry in order to enable the data bus to access a particular storage cell of main memory, or a register of memory mapped I/O device. In a computer with a virtual memory 64002, the term physical address is used mostly to differentiate from a virtual address. In particular, in computers utilizing Memory Management Unit (MNU) to translate memory addresses, the virtual and physical addresses refer to an address before and after MMU translation respectively.

Figure 59:
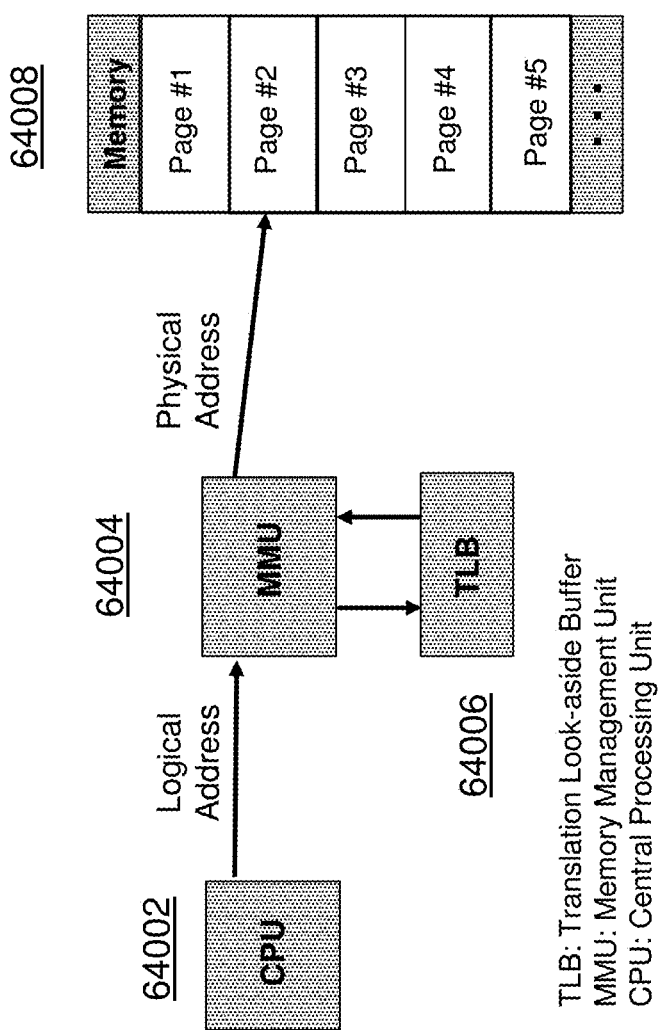
FIG. 59 illustrates schematically a simplified block diagram of a memory management unit for translating between physical addresses and virtual addresses.

FIG. 59 is a diagram of a prior art MMU and TLB, in which the CPU 64002 requires a translation of a logical address into a physical address 64008 in order to read or write to it. For the translation, it sends the logical address to the MMU 64004, which uses a cache called a Translation Lookaside Buffer (TLB) 64006 to map the virtual address to a physical address 64008. Modern MMUs 64004 typically divide the virtual address space into pages, each having a size which is a power of 2, usually a few kilobytes, but they may be much larger. The bottom n bits of the address (the offset within a page) are left unchanged. The upper address bits are the (virtual) page number. The MMU 64004 normally translates virtual page numbers to physical page numbers via an associative cache called TLB 64006. When the TLB 64006 lacks a translation, a slower mechanism involving hardware-specific data structures or software assistance is used. The data found in such data structures are typically called page table entries (PTEs), and the data structure itself is typically called a page table. The physical page number is combined with the page offset to give the complete physical address.

Sometimes, a TLB 64006 entry or PTE prohibits access to a virtual page, perhaps because no physical random access memory has been allocated to that virtual page. In this case, the MMU 64004 signals a page fault to the CPU 64002. The operating system (OS) then handles the situation, perhaps by trying to find a spare frame of RAM and set up a new PTE to map it to the requested virtual address. If no RAM is free, it may be necessary to choose an existing page (known as a victim), using some replacement algorithm or 'eviction algorithm', and save it to another form of storage (e.g., hard disk)—typically known as "paging".

Figure 60:
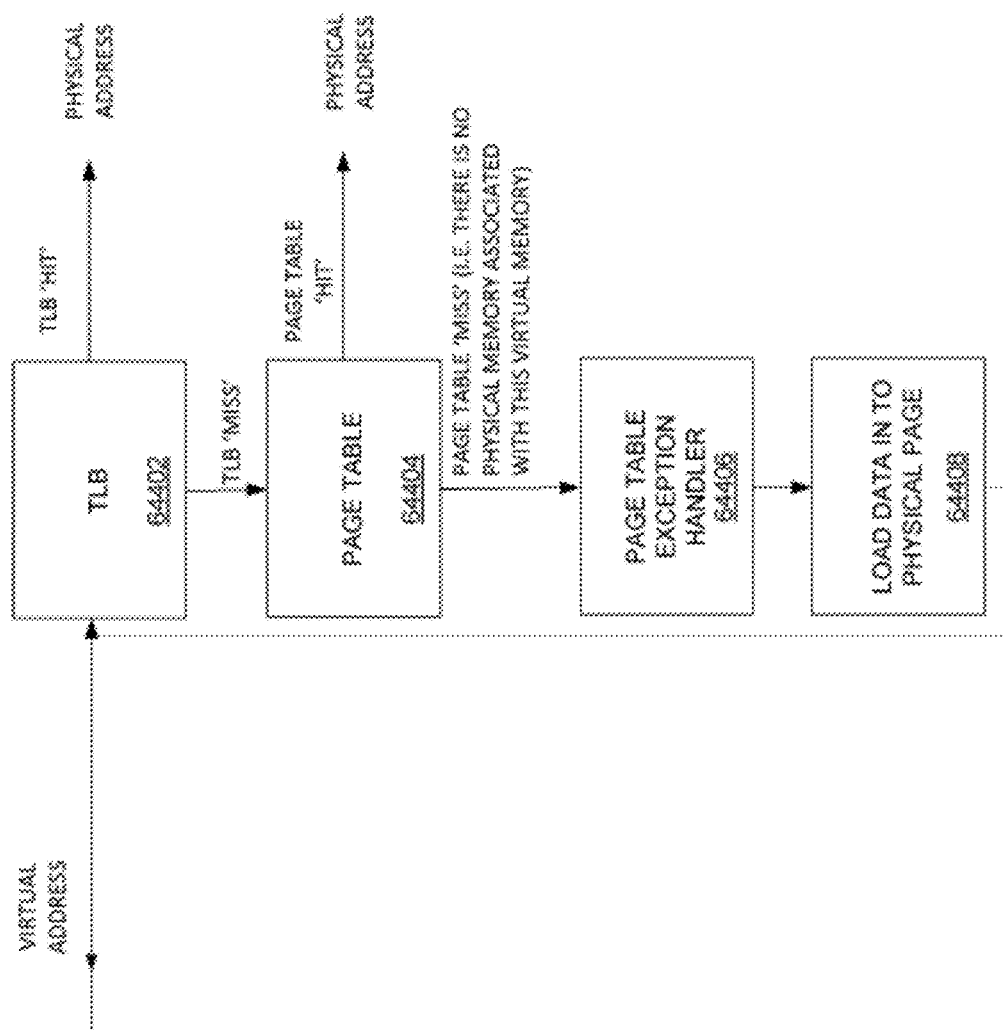
FIG. 60 illustrates schematically a simplified block diagram of a prior-art memory management unit operation.

FIG. 60 is a diagram of prior art on how an MMU works. The TLB 64402 receives a virtual address from the CPU. If it finds the associated physical memory within the TLB 64402, then it returns the Physical address associated with this virtual memory, to the CPU. If it does not find the address in the TLB 64402, then it looks it up in the Page Table 64404. If there is an association there, then the physical address associated with the virtual address is returned. If there is no such association, then the Page Table Exception Handler 64406 is activated. It uses a database and a set of drivers to figure out how to map the virtual memory to physical memory (often by allocating new memory, loading information on to that memory from disk, and mapping it to a virtual memory). The data is then loaded into the physical page in 64408, and the physical address is returned to the CPU.

Figure 61:
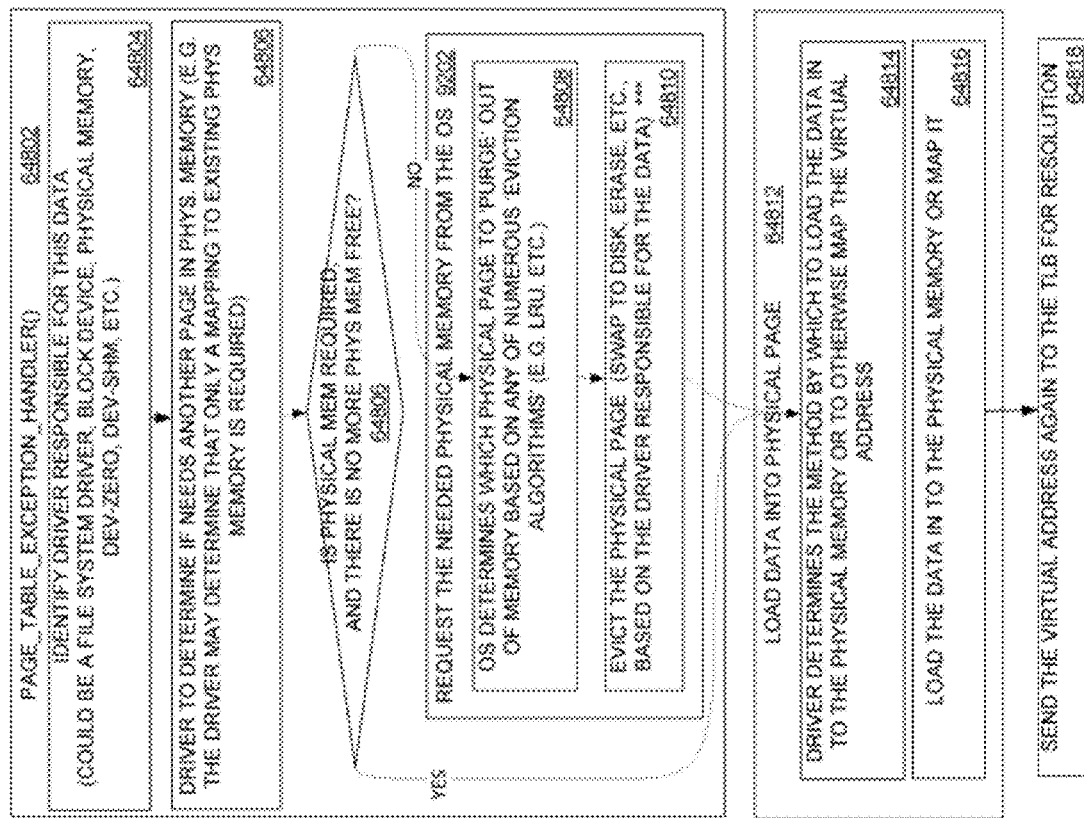
FIG. 61 illustrates schematically a simplified flowchart of a prior-art method of an exception handler.

FIG. 61 is a diagram of prior art on how the MMU's page table exception handler works. When a page table exception occurs, the page table exception handler is invoked, as per FIG. 59. The page table exception handler 64802 first identifies in a step 64804 the driver responsible for this data segment. This is typically stored in the page table. For example, the driver for a specific virtual memory segment may determine that this part of the virtual memory should be mapped to real physical memory, or it may determine that it is mapped to an IO device such as a camera and the contents should be read from the camera's sensors. Then, the driver assigned determines whether a new physical memory segment needs to be assigned to this virtual address space or not. If more physical memory is required, then in a step 64808 the OS determines whether there is such physical memory available to the system. If there isn't free physical memory, then in the step 64808 the OS determines which physical page to 'purge' out of memory based on any number of 'eviction algorithms' (e.g., least recently used is discarded). The driver assigned to this memory space determines in which manner this information is purged—i.e., is it simply discarded, or saved to disk, etc. The MMU then evicts in a step 64810 the physical page by either swapping it to disk, erasing it, or whatever method the driver associated with it determined. If in a step 64806 it is determined that there is enough free physical memory to create the new page, then the driver determines in a step 64814 the method by which to load the data into the physical memory or to otherwise map the virtual address to an IO device, etc., and then loads in a step 64816 the data into the physical memory or maps it as required. The virtual memory map to the physical address is then sent to the TLB 64818, and the request is resolved for the CPU.

The prior art memory management can be described as deterministic, because information that is stored in the physical memory by the application is always retrievable, even in case that physical memory is purged, since the driver for that memory segment that is purged typically saves the data before discarding it. There is a 'cost' to this determinism, in that there is a load and purge time to the physical memory, since when purging this physical memory it needs to be written to a different medium, and then loaded back from the medium before it can be read. In cases where an application wishes to store cache data in the volatile memory in order to save time in re-calculating an algorithm, or in order to not load it again from the web, or in other cases, it does not need the determinism offered by the state of the art memory management systems, but it does need high access speeds, since if the speeds are not high, then it may be more beneficial to the system to re-calculate the algorithm or to re-fetch the information from the web, and not to do a page fault which is costly in time. In addition, the more physical memory available for the cache, the faster that the applications can run. However, the more physical memory allocated to cache of one application, the less is available for other uses, and thus the system performance may be degraded. Therefore, it is beneficial to design a system that can gain from higher speeds associated with non-determinism in the memory management, and that can use the maximum possible physical memory without deteriorating the performance of other applications.

Figure 62:
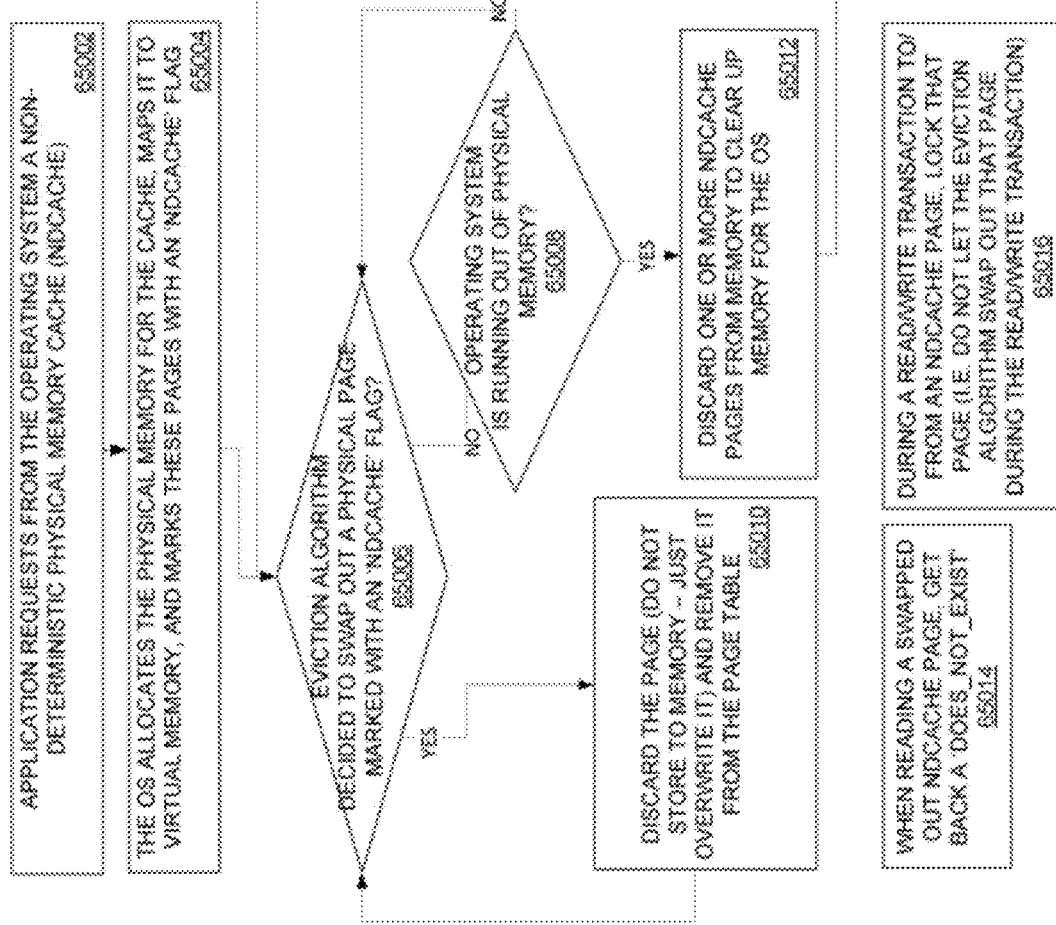
FIG. 62 illustrates schematically a simplified flowchart of an NDCACHE operation.

FIG. 62 is a flowchart of how a non-deterministic physical memory caching system may be implemented. In a step 65002 an application requests from the operating system a non-deterministic physical memory cache (NDCACHE). The OS allocates in a step 65004 the physical memory for the cache, and maps it to virtual memory, and marks these pages with an 'NDCACHE' flag. If the eviction algorithm of the OS decides to swap out in a step 65006 a physical page which is marked with an 'NDCACHE' flag, then that page is discarded in a step 65010 without being stored back to non volatile memory—it is simply removed from the page table, and will be allocated to a new page and the new data will overwrite the old. If the OS is running out in a step 65008 of physical memory (this may be determined via a variety of ways that will be described later on in the document), then the OS discards one or more NDCACHE pages from memory to clear up memory for the OS. For example, it may clear up four pages, check if that is enough for the OS, and clear more if needed. When the application wishes to read in a step 65014 a virtual memory that was requested as an NDCACHE memory, and is now a regular memory (since the NDCACHE memory was swapped out and thus discarded), it receives back a 'DOES NOT EXIST' message to indicate that this memory was lost and thus the cache data requested no longer exists. During a read or write transaction to or from an NDCACHE page in a step 65016, that page is locked so that the eviction algorithm does not purge it during that action.

FIG. 63 is a suggested Application Programming Interface (API) for an NDCACHE implementation. This suggested API is similar to the file system API (http://en.wikipedia.org/wiki/File_system_API) in POSIX (http://en.wikipedia.org/wiki/POSIX). To start a new NDCACHE type cache, an application first will call the function NDCACHE_OPEN 6504, which returns a handle to the NDCACHE (FILEDS) that is referenced by NAME. The NAME that is passed to the function is a unique name for that cache that is used between different processes accessing this page, similar to how a filename is used in the file system POSIX API. If the NDCACHE specified by NAME exists, then the function simply returns a handle to the existing cache. If it does not exist, then NULL is returned by the function. However, if the CREATE_FLAG passed to the function is turned on, then upon opening an NDCACHE specified by NAME that does not yet exist, such an NDCACHE is created and the function returns the handle to that NDCACHE. If such a cache already exists and the TRUNCATE_FLAG is set, then that cache is erased, and a handle to this empty cache is returned by the function.

NDCACHE_READ and NDCACHE_WRITE 65404 are the functions used to read from the NDCACHE and write to the NDCACHE (respectively) that is referenced by the FILEDS that was initially received from the NDCACHE_OPEN function. The BUFFER is an allocated memory that the application can use to read the information to (in case of NDCACHE_READ) or to write from (in case of NDCACHE_WRITE). The OFFSET is the offset (in bytes, for example) within the NDCACHE referenced, to start the read, or to start the write, from. SIZE is the number of bytes to read or to write. NDCACHE_CLOSE 65406 is called to close the handle to the NDCACHE referenced by FILEDS. After all handles to an NDCACHE are closed, the OS may decide to swap it out based on its eviction algorithms. NDCACHE_UNLINK 6508 is called to remove the NDCACHE entry referenced by FILEDS from the operating system's page table, thus effectively deleting this NDCACHE.

A file system is a means to organize data by providing procedures to store, retrieve and update data, as well as manage the available space on the device(s) which contain it. A file system is tuned to the specific characteristics of the device. There is usually a tight coupling between the operating system and the file system. Some filesystems provide mechanisms to control access to the data and metadata. Ensuring reliability is a major responsibility of a filesystem. Some filesystems provide a means for multiple programs to update data in the same file at nearly the same time.

File systems are used on data storage devices such as hard disk drives, floppy disks, optical discs, memory storage devices, remote servers, etc. File systems may provide access to data on a file server by acting as clients for a network protocol (e.g. NFS or SMB clients), or they may be virtual and exist only as an access method for virtual data (e.g. procfs). This is distinguished from a directory service and registry. A File system is implemented in a file system driver which implements a standard file system API for using it, and is coupled to a storage device or other storage strategy (like mapping to existing memory).

Figure 64:
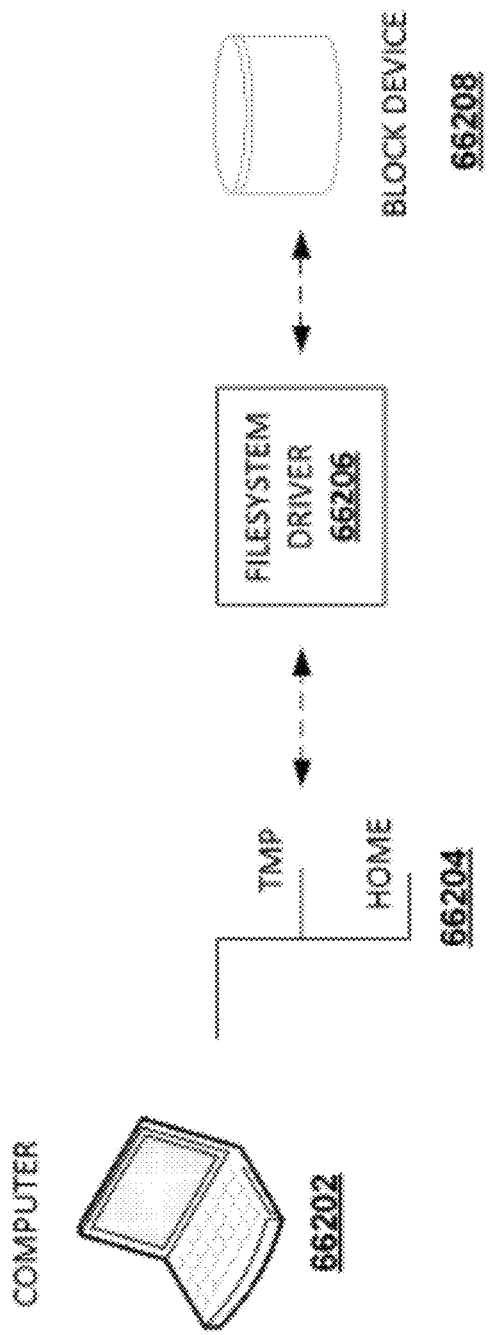
FIG. 64 illustrates schematically a simplified block diagram of mounting a filesystem.

FIG. 64 shows the prior art method of mounting a file system. A computer 66202 has a file system directory structure 66204, which in various directories represent space on various storage devices. The block device 66208 is such a storage device on which data may be stored. The file system driver 66206 links between the block device 66208 and a certain directory in the file system 66204. The file system driver is configured to be called by the OS on a specific point in the OS directory structure (in this example in "/tmp"). Every file call to that directory initiates a call to the File System Driver 66206, which may use a memory device such as the block device 66208 to store & retrieve information. This linking of a storage device to a directory is called 'mounting a file system'.

Figure 65:
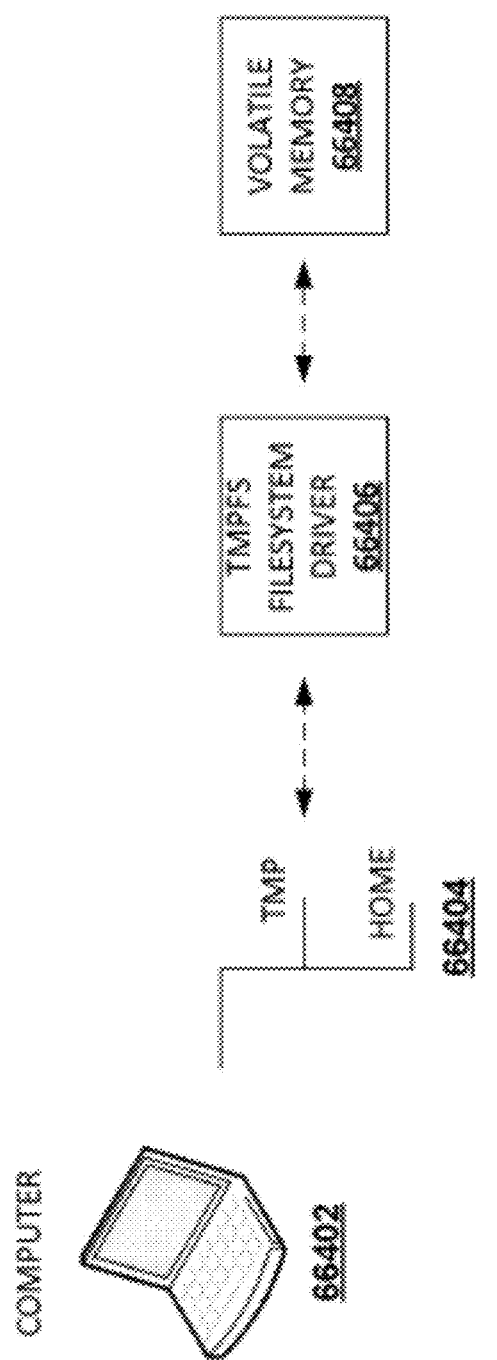
FIG. 65 illustrates schematically a simplified block diagram of mounting a TMPFS filesystem.

FIG. 65 is a prior art diagram of the TMPFS file system. TMPFS is a common name for a temporary file storage facility on many Unix-like operating systems. It is intended to appear as a mounted file system, but stored in volatile memory instead of a persistent storage device. A similar construction is a RAM disk, which appears as a virtual disk drive and hosts a disk file system. The computer 66402 has a directory structure 66404 in which the TMP directory is mapped to the TMPFS file system driver 66406, such that when file system calls are made on files within the TMP directory, they are performed on data that is stored in a volatile memory 66408.

A secondary implementation of an NDCACHE may use simple file system mounting. This implementation is simple in that it does not require kernel mode modifications, or some minimal modifications to the TMPFS file storage facility that is available on many unix-like operating systems.

Figure 66:
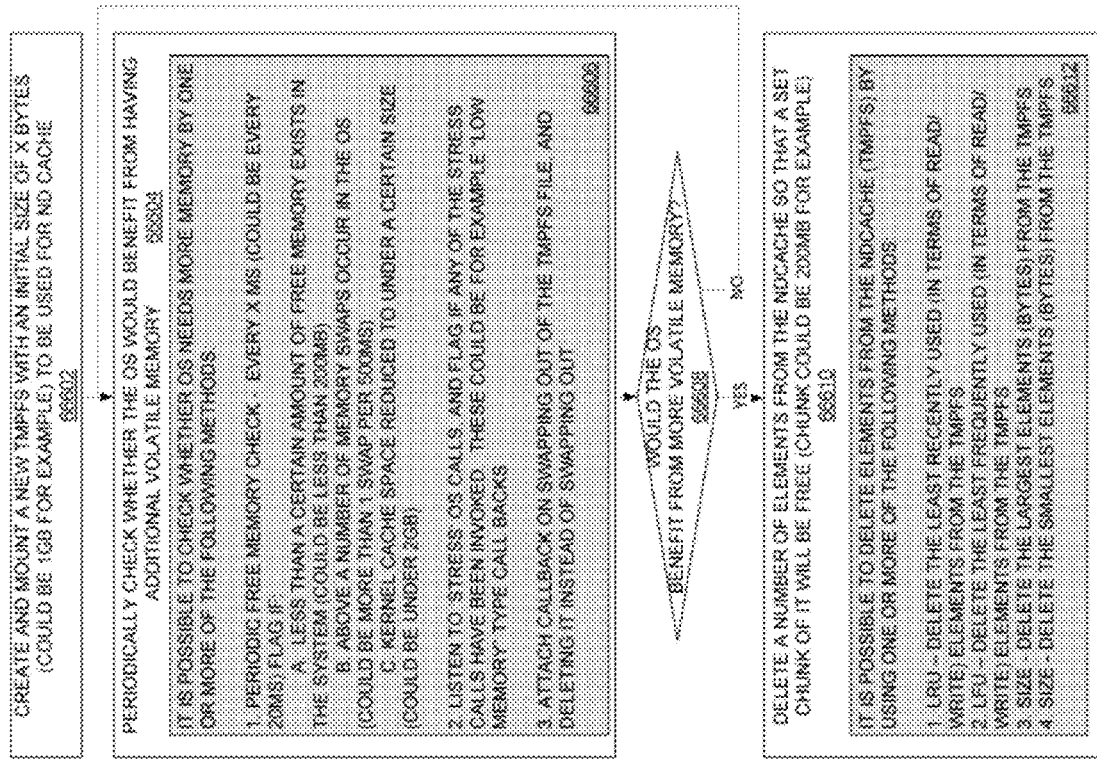
FIG. 66 illustrates schematically a simplified flowchart of an NDCACHE operation using FS mounting.

FIG. 66 is a flowchart of a possible implementation of an NDCACHE by using a TMPFS file system. In a step 66602 a TMPFS is created and mounted, with an initial size of X bytes, where X can be 1 GB for example, to be used for the NDCACHE. In a step 66604, the system checks whether the operating system would benefit from having additional volatile memory. This can be done in various methods known to those in the art. For example, this can be done by checking every Y ms (for example every 20 ms) if less than a certain amount of free memory exists in the system (could be less than 200 MB for example), or if above a certain amount of memory swaps occurred recently (could be more than 2 swaps per second for example), or if the kernel cache space is reduced to under a certain size (could be under 2 GB for example). This can also be done by listening to 'stress' operating system calls such as "low memory" type calls—if these are called then the operating system probably would benefit from having additional volatile memory. This could also be checked by attaching a callback on the swapping out of memory of the TMPFS file and deleting it instead of swapping it out.

If any of the above events in a step 66606 occurred, then the OS would benefit from having more volatile memory. This is checked in a step 66608. If the OS would not benefit from more memory, then continue to the step 66604. If it would, then in a step 66610 the NDCACHE is reduced by deleting a number of elements from it, so that its size is reduced by Z bytes (for example by 200 MB). In a step 66612 shows various strategies by which elements may be reduced from the NDCACHE: delete the least recently used (LRU), the least frequently used (LFU), the largest elements by bytes, or the smallest elements by size. This TMPFS size reduction thus frees space for the operating system. This system described in FIG. 66 thus describes an implementation of an NDCACHE, since the application gains a physical memory cache, that is swapped out (partially or completely) as the operating system requires more physical memory for its operation.

Hence, a method of increasing the size of the memory (which is a physical memory) available to applications by which an application may request memory which is specially marked, is disclosed, where the application is able to read and write to this physical memory, and where if the operating system needs more memory then this specially marked memory is discarded. If the specially marked memory space is swapped by the operating system, then it is simply discarded. If the operating system would benefit by having more memory available to it, it reduces the size of the memory allocated to the specially marked cache. The method may be implemented by a TMPFS system that allocates physical memory to this special cache, where if the operating system would benefit by having more memory available to it, it reduces the size of the TMPFS allocated to this specially marked cache The second implementation of the NDCACHE—the calls to TMPFS are from user mode to kernel mode, and thus may take thousands of CPU cycles to complete. It is thus desirable to avoid calls between user mode and kernel mode if possible, to improve a performance of the system to get minimum cycles per an NDCACHE call.

Figure 67:
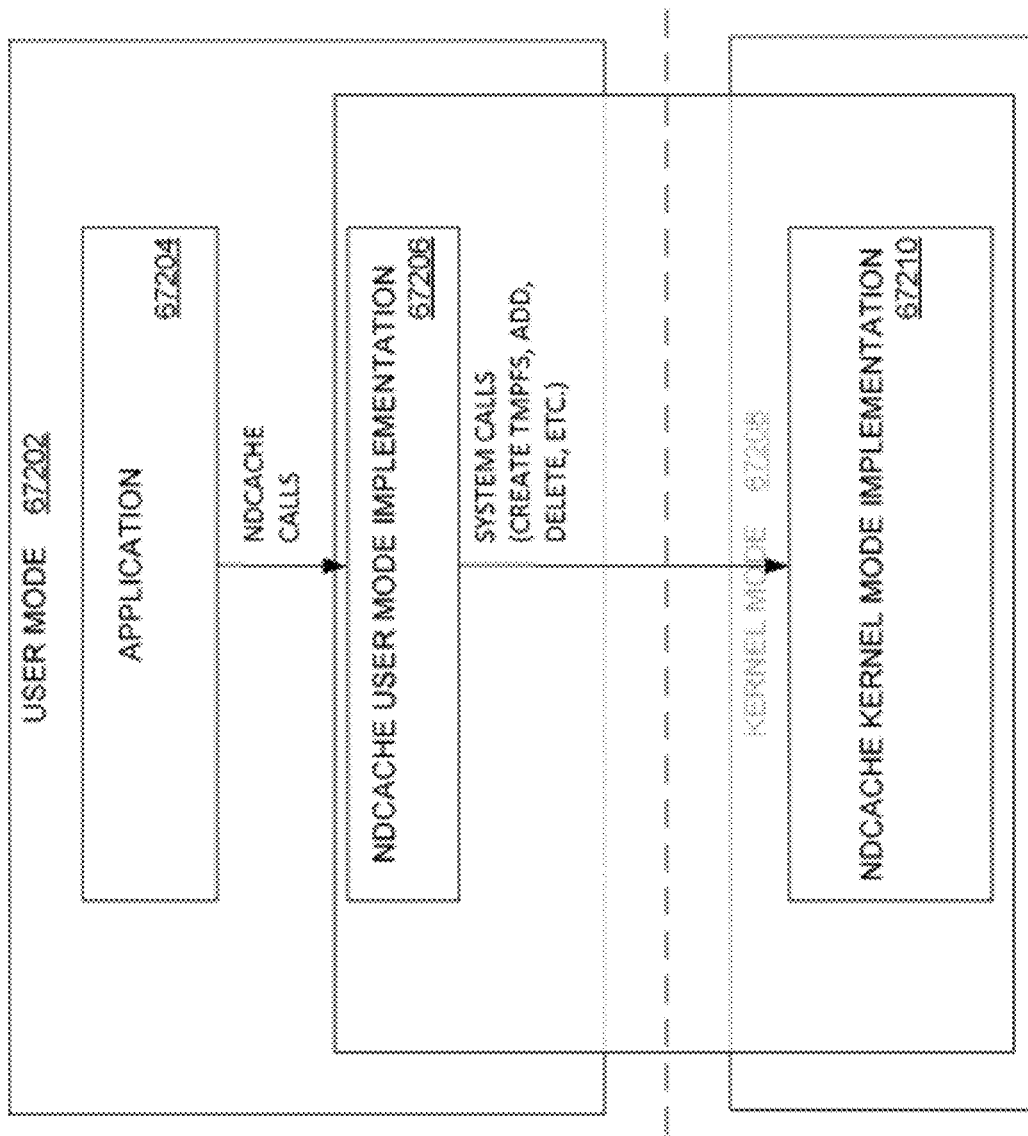
FIG. 67 illustrates schematically a simplified flowchart of an NDCACHE operation using user and kernel mode.

A system with higher performance can be achieved by implementing the NDCACHE as a user mode module that communicates with an NDCACHE kernel module, as described in FIG. 67. Block 67202 is the user mode space of the computing device, and block 67208 is the kernel space. The application 67204 is running in the user mode block 67202 and using an API (NDCACHE calls) that is implemented in an NDCACHE user mode implementation 67206. It uses system calls to communicate with the NDCACHE kernel mode implementation 67210.

FIG. 68 is a description of the API relating to a third implementation method of the NDCACHE. The block 67402 is pseudo code that describes how an NDCACHE would be allocated and written to. First, a FILEDS handle is created by opening a file that is handled by the NDCACHE_DRIVER, which is the kernel module for NDCACHE events, along with the NDCACHE_NAME, which is the specific name of the NDCACHE that is being accessed. Then, a pointer directly to the NDCACHE memory is received by doing an NDCACHE_LOOKUP on the NDCACHE_NAME. This lookup returns a pointer to the memory of the specific NDCACHE, and if such a cache does not exist, P is assigned NULL. If indeed no such NDCACHE exists, then it needs to be created. In such a case, the pointer P is assigned a memory map of a certain size (in this specific implementation it is 1 MB, but this could be other sizes), where this memory is declared as shared memory so that it may be used by multiple processes.

Then the first memory position in P (P[0]) is increased (so that if this was a new assignment of memory, then P is now 1), to indicate that there is content in this NDCACHE. Then the program continues by writing the data to P, starting at P[1]. If the cache exists (i.e. was not allocated by this call), then do the NDCACHE_WRITE( ) function.

Figure 69:
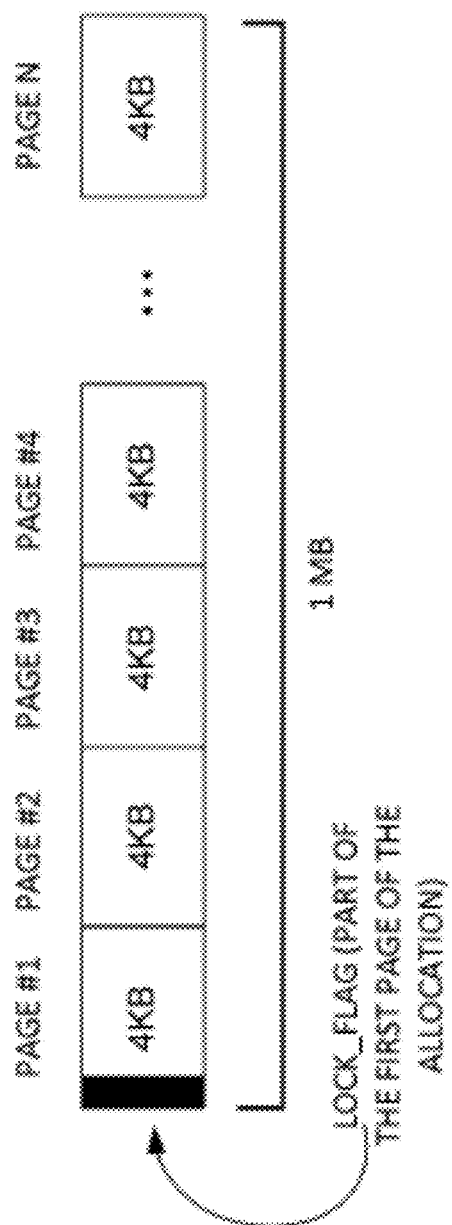
FIG. 69 depicts schematically an arrangement in a memory of NDCACHE pages and using a lock flag.

FIG. 69 shows how such an allocation would look like—the first byte of the allocation is the lock flag (P[0] in the above code), which indicates that there is content within this NDCACHE of 1 MB that was allocated, and the 1 MB is comprised of a series of 4 KB allocations. FIG. 70 is an implementation of the NDCACHE_READ( ) and NDCACHE_WRITE( ). First, it is checked whether the cache still exists, by checking the first byte of the NDCACHE range. If it is zero, then that NDCACHE was swapped out, and thus the program returns to the application MEM_NOT_FOUND. Then the program increments the first byte of the NDCACHE range. If it equals '1', then it was zero when incremented—i.e., the NDCACHE range was swapped out and cannot be used. The program then returns the first byte to zero, and returns MEM_NOT_FOUND to the application. Now the NDCACHE range is locked (because the first byte is non-zero), and the range is read in to buffer or written from the buffer to the range, as the case may be for NDCACHE_READ or NDCACHE_WRITE respectively. After finishing the read or write, the program then decrements the lock flag to release the lock on the range by indicating it has completed the read/write and returns.

FIG. 71 is the implementation of the eviction algorithm of the NDCACHE kernel module (the NDCACHE_DRIVER). In prior art operating systems, the eviction algorithm is called when the OS needs more physical memory—it then calls the eviction calls of the various drivers handling memory for them to clear out selected portions of the memory. Some of these drivers are programmed to copy segments of the memory in to other storage devices (such as a hard drive) and then to clear the physical memory for other uses, while other drivers may choose other forms of action. The eviction algorithm for the NDCACHE_DRIVER is described in block 67802. Upon being called, it removes all associated memory ranges associated with LOCK_FLAG that is 0 (which means that the memory range is not in use). If more memory needs to be freed, then it can also remove the ranges who's LOCK_FLAG is 1, since they are in use but not locked. It does not remove memory ranges who's LOCK_FLAG is greater than 1, since they are currently locked by a read or write operation. As an example, there may be several NDCACHES in use, each of them of various sizes. When the eviction algorithm is called, it removes those NDCACHES associated with a lock flag that is 0 or 1, but not greater than one. Further implementations of this may choose to not remove all the NDCACHEs possible, but only enough NDCACHEs so that the OS has enough free memory (e.g. 50 MB) to continue normal operation.

Block 67804 describes how the swapping out of memory ranges by an NDCACHE_DRIVER is done: Once the eviction algorithm of the NDCACHE_DRIVER decided to free a range, it maps the virtual memory pointers to an "all zero" range in 'read only' mode (for example by mapping to devzero. This quickly sets the memory and the LOCK_FLAG to zero, thus freeing the physical memory for the OS to use, and marking it as empty towards the applications using the NDCACHE.

Figure 72:
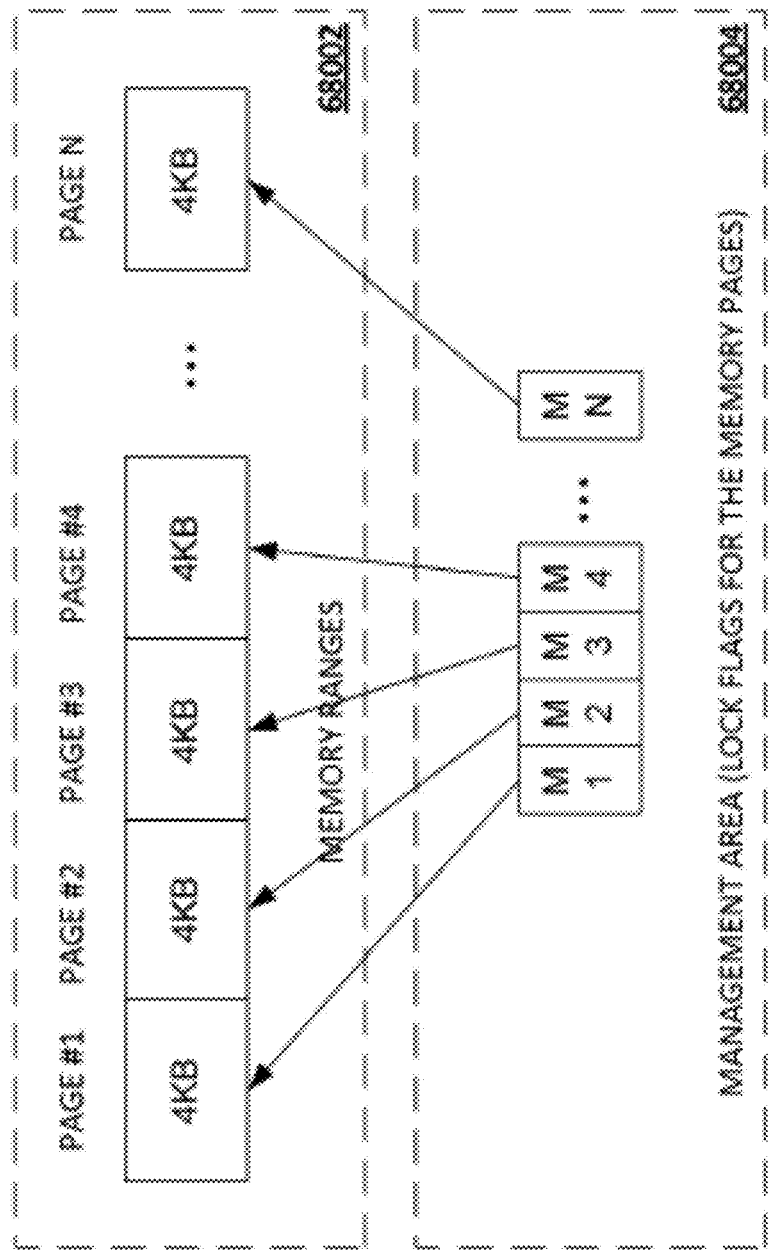
FIG. 72 depicts schematically an arrangement in a memory of NDCACHE pages using multiple segments in the cache.

FIG. 72 is a diagram that shows the system for the fourth method of implementation for the NDCACHE, which allows for parts of the NDCACHE to be removed while keeping other parts in the memory. For example, where not all the memory ranges handled by the NDCACHE driver are attempted to be freed, but only a certain amount that will enable the OS to have more free space to operate (e.g., freeing ranges until 200 MB are free).

In the previous implementation methods, an NDCACHE element in the previous implementations is assigned in one block. The problem is that this whole block is swapped out even if only a certain part needs to be swapped out by the OS (all or nothing type of approach). It is desirable to have an implementation where only portions of the allocation may be swapped out (for example, the NDCACHE element could be a whole file, and it may be useful if parts of it are swapped out). In block 68002 there are a group of pages in the physical memory of a computer (page #1, Page #2, . . . Page #N), in this example each of the pages is a range of 4 KB. In block 68004, there is a group of flags in an area of the physical memory allocated to be the management area of the NDCACHE, where there is one such flag for every page in the memory, that is allocated to the NDCACHE. Each flag in the management area in block 68004 is actually a 'lock flag' from the previous implementation of the NDCACHE and is used in the same way, but is done per page, so that each lock flag correlates with one page in the memory. Thus, the NDCACHE may allocate a large file from Page #1 to Page #N, and when the OS needs more free memory then the NDCACHE's eviction algorithm may choose to free a certain memory size for the OS (e.g. 4 MB), and only remove the first 1,000 pages from this NDCACHE, instead of removing the whole cache.

Hence, an NDCACHE system is disclosed, where each NDCACHE is mapped to a multitude of physical memory pages, and where there is one lock flag associated with each such physical memory page, so that when the operating system of the computing device needs more physical memory, it can release only some of the physical pages associated with this NDCACHE.

Figure 73:
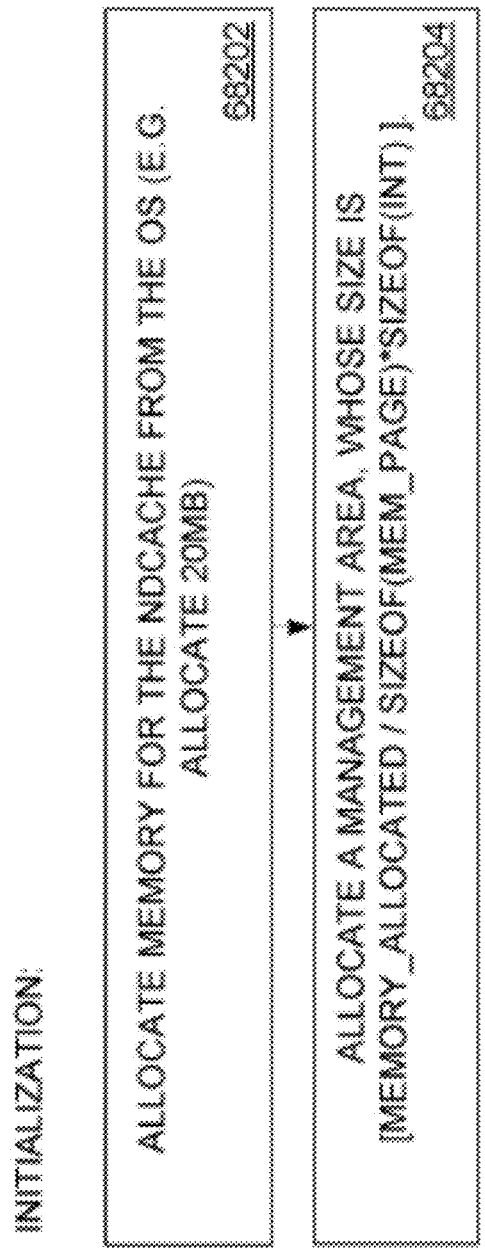
FIG. 73 illustrates schematically a simplified flowchart of an improved NDCACHE operation.

FIG. 73 is a flowchart for implementing the fourth implementation of an NDCACHE. When an NDCACHE is requested by an application, the application calls the initialization function and specifies the size of the requested NDCACHE. In a step 68202, physical memory is allocated for the NDCACHE as was requested by the calling application (e.g. 20 MB). The prior art OS responds by allocating such a memory segment (if available), where this memory segment is provided as series of blocks of physical pages, of a certain size as determined by the OS (e.g. 4 MB per page). In a step 68204, a management area is allocated, where in this area there is one LOCK_FLAG for every physical page that is allocated in the step 68202. Thus this memory size is equal to [MEM ALLOCATED]/[SIZEOF(MEMORY_PAGE)]*[SIZEOF(INT)]. For example, on an OS where a page size is 4 KB, the memory allocated for the NDCACHE is 20 MB, and an integer is 4 Bytes, the size for allocating a management area is =20 MB/4 KB*4B=5 k*4B=20 kB (for storing 5,000 flags of 4 bytes each).

The normal operation (read/write) of the NDCACHE in the fourth implementation is similar to the earlier implementations, but where the memory for the NDCACHE is the series of memory pages allocated to the NDCACHE, and the LOCK_FLAG is not for the whole memory range allocated to the NDCACHE, but for each of the pages in that memory range, and when the eviction algorithm needs to free memory for the OS, it can evict a portion of the memory ranges, freeing up the memory range and its corresponding LOCK_FLAG from the management area.

Figure 74:
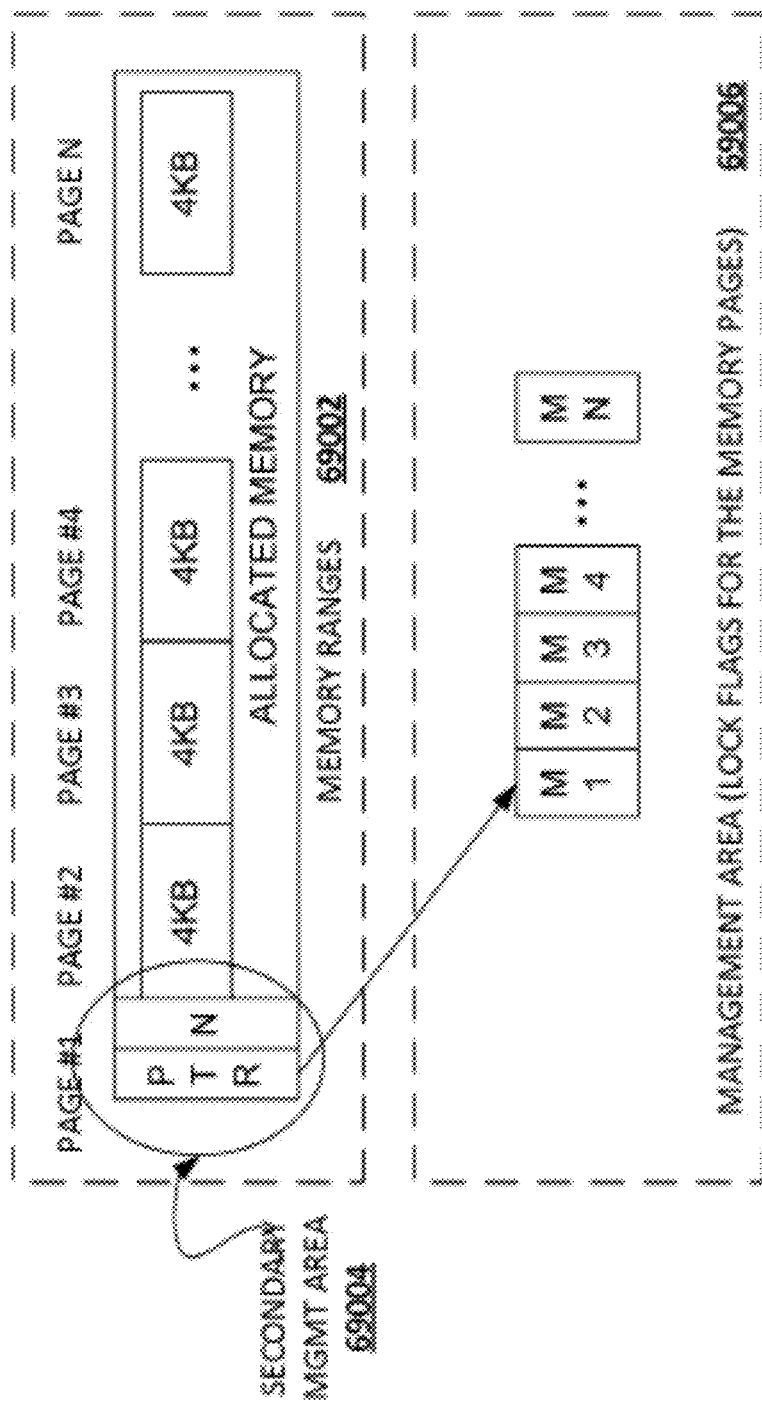
FIG. 74 depicts schematically an arrangement in a memory of NDCACHE pages.

FIG. 74 describes an improvement in the fourth method of implementation of an NDCACHE. The following are three problems with the fourth method of implementation that may be improved:

1. When an NDCACHE that is smaller than the OS's memory page size (typically 4 kB) is requested, a full page (e.g. 4 kB) is allocated and thus there is waste in allocating more than is needed.

2. When an NDCACHE that is larger than the page size is requested, the allocation needs to be done in multiple parts (once for each page), thus degrading performance and degrading the ease of use of the API.

3. The fourth implementation does not conform to the 'malloc'/'free' paradigm, which makes it more difficult to integrate in to existing and new solutions In this improvement, when a new NDCACHE is allocated, when allocating the pages in memory 69002 for the NDCACHE, a secondary management area 69004 is allocated at the first page, such that it includes a pointer to the first LOCK_FLAG in the management area 69006, and a counter of how many pages are allocated to this NDCACHE ("N") is maintained. Thus, when allocating multiple pages for an NDCACHE, the secondary management area 69004 includes all the information needed to use all pages and lock flags.

FIG. 75 is a flowchart of the initialization process for the improvement on the fourth method. In a step 69202 when the NDCACHE is requested by the application, a memory range (P) is allocated for the NDCACHE. Its size is the size of the memory requested+sizeof(T) where T is the area required for the secondary management area. Then in a step 69204 space is allocated for the management area to hold the LOCK_FLAGs for each of the memory pages required by the new NDCACHE. Then, a secondary management area (T) is defined in a step 69206, and into it is inserted a pointer (T→PTR) to the management area and an integer (T→N) that represents the number of pages in this NDCACHE's memory range. In a step 69208 the pointer P is changed such that P=P+SIZEOF(T). This is so that P now points to the start of the main memory range (right after the secondary management area). Lastly, in a step 69210 the program returns the pointer (P+SIZEOF(T)) to the calling application, which is a pointer to the place in the memory where the NDCACHE memory itself starts (right after the secondary management section).

Note that the allocations for these memory ranges can use any of the existing malloc/free implementation algorithms to allocate memory from the main NDCACHE pool to this allocation. The malloc and free can be done over mmap with the implementation of NDCACHE shown in the fourth implementation, which makes this a non-deterministic cache. Also note that if the allocation is less than one page size, T→N could still span more than one page, if for example this page already contains part of a previous allocation and this this new allocation causes the allocation to overrun to the next page.

FIG. 76 is a flowchart of the actions of reading from or writing to the NDCACHE for the improvement on the fourth method of implementation. In a step 69602, the read/write is described. The read/write is done in the same way as in the fourth implementation with two exceptions: Lock(P)/unlock (P): First evaluates that T→N is not zero. If it is zero, then the NDCACHE was swapped and needs to return mem_not_found. If T→N is not zero, lock all pages that this NDCACHE element spans by locking the N LOCK_FLAGS starting at the T→PTR LOCK_FLAG. When reading/writing from/to the NDCACHE, not limited to one page of memory (can use the complete allocated size). In a step 69606 the deleting of the allocation—NDCACHE_CLOSE (P)—is described. The NDCACHE is freed by calling the OS free( ) function and providing to it the pointer of (P-SIZEOF(T)) where P is the pointer to the main memory range, and T is the secondary management area, so that the memory freed is both the secondary management area as well as the main memory area.

A further note about NDCACHE: There is an advantage to being able to use named objects for NDCACHE—i.e., for the NDCACHE objects to be named so that they can be used by multiple processes, and also lets the virtual memory related to these named objects to be freed on swap. This can be implemented over the systems described previously by adding a hash table where in the open/create of the object, this name is looked up in the hash table, and if found provides back a pointer to an existing object.

There are applications that may benefit from understanding when the computer's resources are idle. For example, a screensaver monitors the mouse and keyboard movements for idleness, and after a preset amount of idle time, it activates its display program. Further, the idling period may be utilized for performing non-time sensitive activities, such as upodating and maintenance. For example, idling is detected as part of the 'Idle ?' step 495*a* in the flowchart 490*b*. Other cases are for a web site to monitor inactivity of a keyboard or mouse input, and to log out as a consequence.

Figure 77:
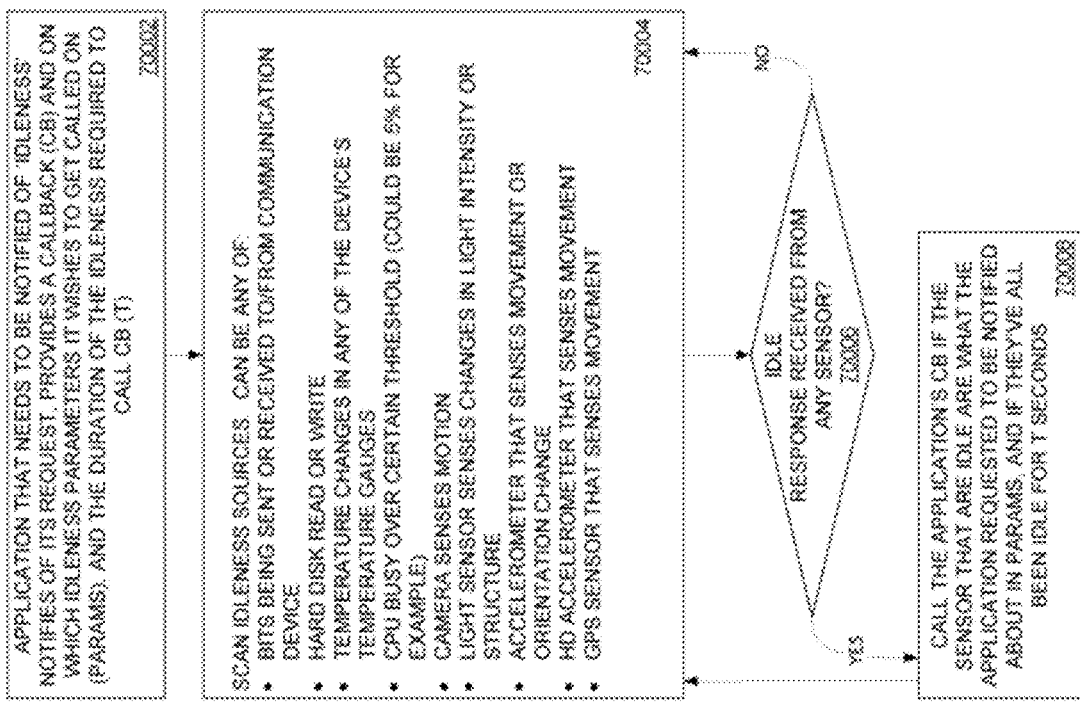
FIG. 77 illustrates schematically a simplified flowchart of an idle monitor.

FIG. 77 is a flowchart of an idle monitor that uses new inputs to define idleness of a computing device or its operator. Such a flowchart may be executed by any network element herein. In a step 70002, an application wishes to be notified of when idleness has occurred, and so notifies the idle monitor program, provides a CallBack function (CB)—a function to call when the idleness occurs—and defines the type of idleness on which to call this function (PARAMS) and the duration of time they should be idle for the CB to be called. The program then scans in a step 70004 'idleness' resources and tracks for how long each has been idle. These resources include the following: Bits being sent or received to/from communication device—i.e. idleness of communication. Storage device read or write—i.e. idleness of the IO with storage devices. Temperature changes in any of the device's temperature gauges—i.e., idleness of the environment. Non-idleness of the environment could signal that there is movement in the environment of this computing device, or that the temperature around is shifting. CPU busy over certain threshold (could be 5% for example)—i.e. idleness to a degree of the computing resources. Camera senses motion—i.e. idleness of the physical surrounding of the computing device (movement of persons for example can trigger this to not be idle)

Light sensor senses changes in light intensity or structure—i.e., idleness of the physical surrounding of the computing device (movement of persons, for example, can trigger this to not be idle):

Accelerometer that senses movement or orientation change

HD accelerometer that senses movement

GPS sensor that senses movement

If any of the above sensors is idle in a step 70006, then check in a step 70008 whether all sensors included in PARAMS are idle and have been idle for the amount of time as described in T. If they have all been idle for this time, call the CB.

Hence, in a system monitoring the idleness of a computing device, the following sensors may be included in a list of devices to be monitored for idleness: Bits being sent or received to/from communication device, storage device read or write, temperature changes in any of the device's temperature gauges, CPU busy over certain threshold, camera senses motion, light sensor senses changes in light intensity or structure, Accelerometer that senses movement or orientation change, HD accelerometer that senses movement, GPS sensor that senses movement in location or hight In storage devices with moving media, physical seek times are typically long relative to the read or write times because of the read/write head movement, and thus should be avoided where possible. Also in storage devices, writing to the storage device is typically less urgent as reading from it, since the writing is typically to archive existing information, whereas reading data is used for actionable results (such as displaying data on the screen) and thus may be blocking.

In prior art systems, reading and writing occur randomly, and thus when the typically higher priority reading is occurring, it could possibly be after a write has occurred, and thus the reading head is typically not close to the place where the information should be read from. Delaying the writing of data until storage device read/write is idle can speed up the read time, since there's then no need to wait for write to end before reading and also eliminates many seek cycles.

Figure 78:
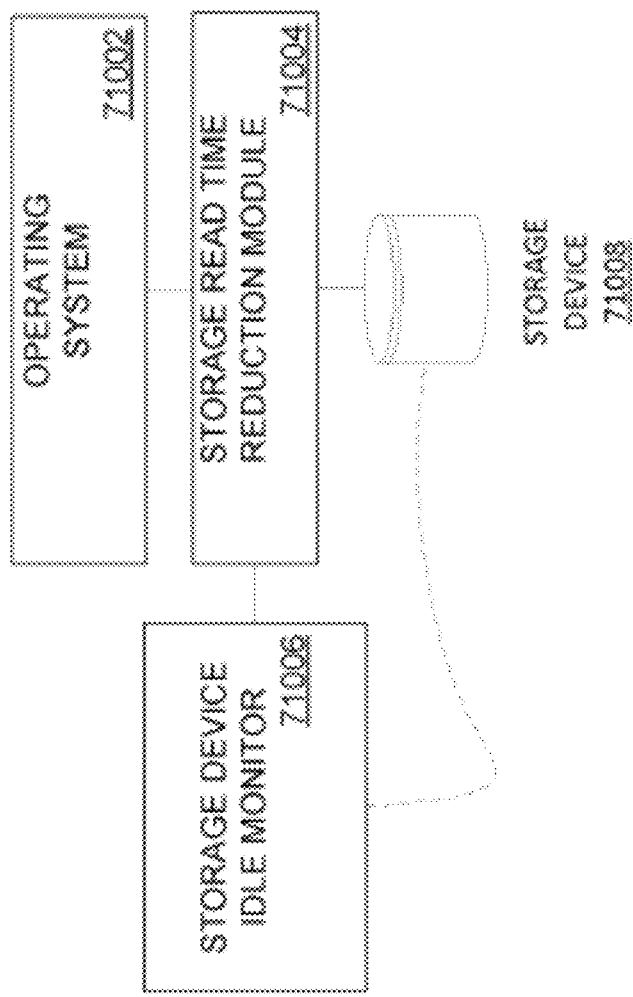
FIG. 78 illustrates schematically a simplified block diagram of an idle monitor for reducing a storage read time.

FIG. 78 is a diagram of a system to reduce the read times from a storage device 71008. It includes the OS 71002, which calls the storage read time reduction module 71004 when accessing the disk. This module uses the storage device idle monitor 71006 to determine when the storage device is idle. When the storage read time reduction module 71004 wishes to write to disk, it first ensures that the disk has been idle for a pre-determined amount of time (eg. 30 ms) before writing to the storage device. If the storage device is busy, it increases the chance that while the OS is writing data to the disk, a disk read will occur, which will be slowed down by the read time and seek time back to the place to read from. Thus, with the system described by the diagram in FIG. 78, such conflicts (of having a read while a write is in action) are reduced. Thus, when the storage device idle monitor reports non-idleness, then the data to be written to the disk is written to the write queue 71010 instead of to the disk.

This concept may be broadened by looking not only at the idleness of the storage device 71008 by the storage device idle monitor 71006, but by incorporating an idleness monitor that checks for a much broader set of idleness parameters such as keyboard inputs, mouse inputs, network communication, etc., since any kind of non-idleness on the computing device typically correlates to reads from the storage device, and thus storage writes should be avoided during such periods of non-idleness.

Hence, in a computing system comprised of a storage device and a processor, a method for reducing the average time to read data from such storage device is disclosed, by which storage writes are only performed when the storage device has been idle for a certain amount of time (eg. 30 ms). Other parameters may be checked for idleness, such as the keyboard input, the mouse input, the network communication, etc.

Figure 79:
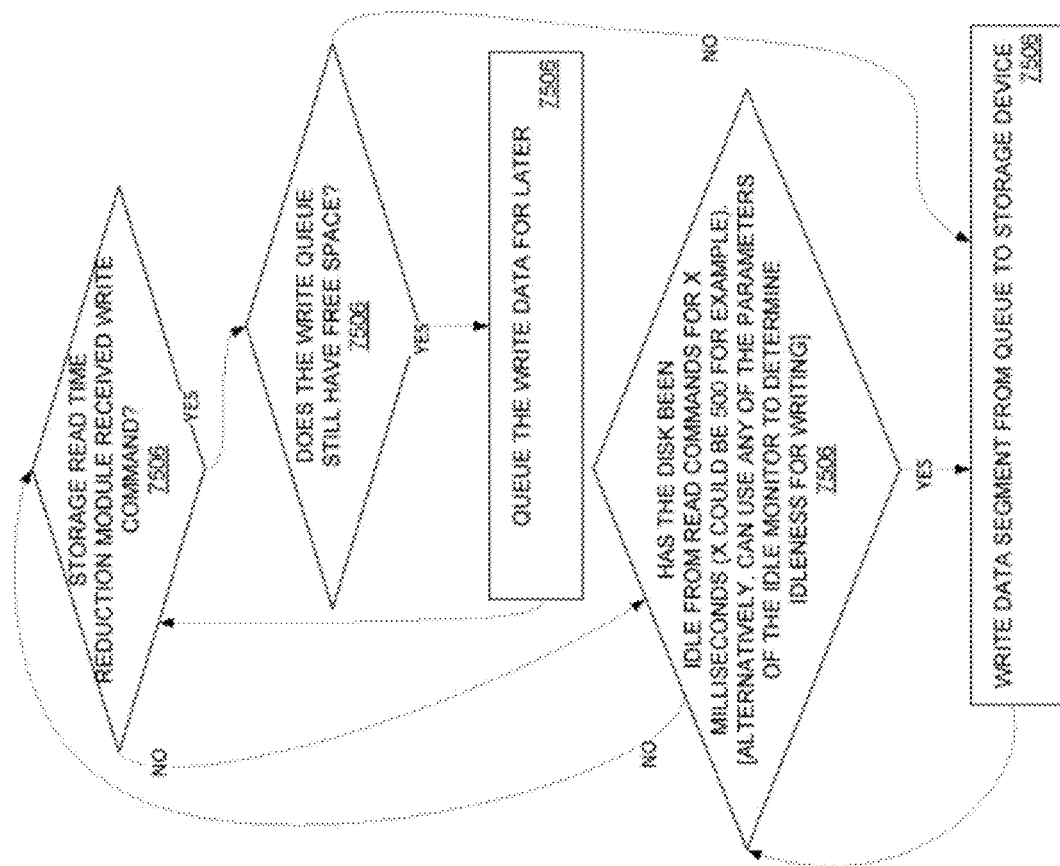
FIG. 79 illustrates schematically a simplified flowchart of selecting WAP.

FIG. 79 is a flowchart of an implementation of a storage read time reduction module SRTRM. If the SRTRM received a write command in a step 71202 then it checks in a step 71204 whether the write queue has enough free space for queuing this request. If it does, then the request is queued in a step 71206 until the storage device is idle at which time it will be written to it. If the write queue does not have enough space to queue the new write data, then the program writes in a step 71205 the new request data to the storage device. If the SRTRM has not received a write command, then it checks in a step 71208 whether the disk been idle from read commands for x milliseconds (x could be 30 for example). Alternatively or in addition, can use other parameters for idleness to determine idleness for the purpose of writing, such as mouse movement, etc.). If idleness for x milliseconds is determined, then a segment of the write queue (e.g., 500 KB) is written from the queue to the storage device.

Figure 81:
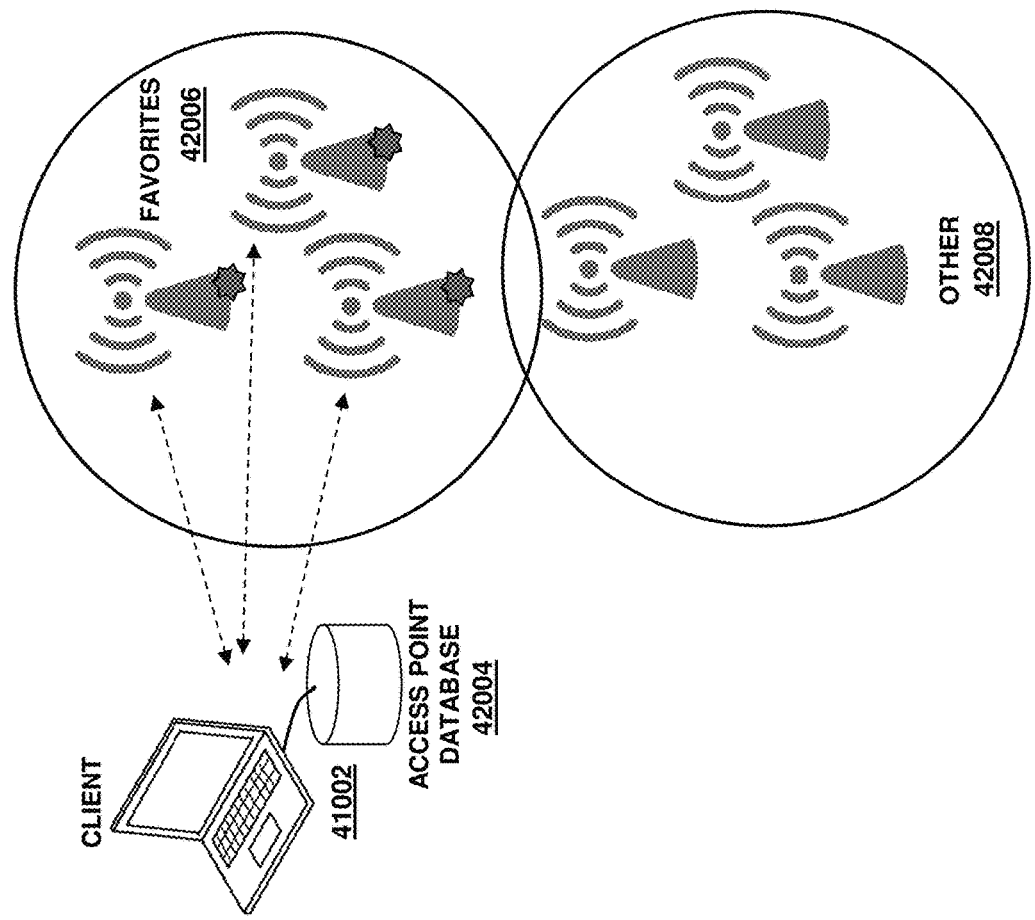
FIG. 81 depicts schematically a network element selecting a WAP from two groups of WAPs.

When a network element is connected to a WAP, it sometimes shortly disconnects and then reconnects. This short disconnection (sometimes referred to as 'cutoff') may occur due to an 'explicit user disconnect' reason, where the user explicitly requests to disconnect from the WAP, such as due to poor service from the WAP, or because other reasons, such as turning off the network element, and disconnecting from the network (for example by turning off the WiFi switch). When the network element tries to re-connect to the WAP, it is typically preferred to first try to connect to 'favorite' WAPs, which are commonly WAPs that the network element has already successfully previously connected to. In one example, a WAP is determined as a 'favorite' WAP when providing high signal strength. FIG. 81 shows a prior art diagram of a network element 41002 that is trying to connect to WAPs defined as part of a 'favorite' group 42006. The network element 41002 may disconnect explicitly from one of these 'favorite' devices 42006, for example due to poor connection or otherwise poor service, and afterwards, when the network element 41002 software tries to re-connect to a WAP, it may try to re-connect again to that problematic WAP, resulting in again a poor service. It is therefore beneficial to distinguish between 'explicit user disconnect' reasons and 'other' reasons associated with each WAP in the favorite group 42006, and to first try to connect to the WAPs associated with disconnection due to 'other' reasons.

Figure 82:
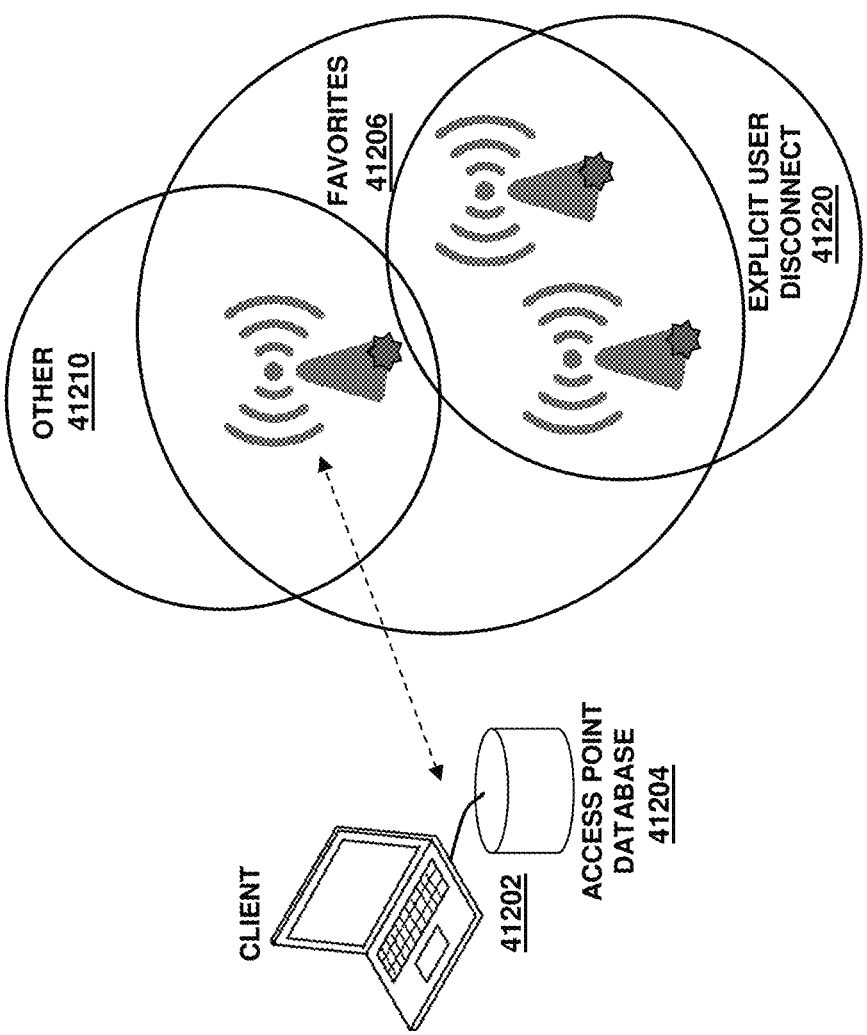
FIG. 82 depicts schematically a network element selecting a WAP based on the WAP performance.

FIG. 82 shows such a system, where the favorites group 41206 is subdivided to two sub-groups: an "explicit user disconnect" group 41220, which is the group of WAPs which the user chose to disconnect from, and an "other" group 41210, which is a group of the favorite WAPs (shown to include only a single WAP) that were disconnected due to 'other' reasons, and a WAP will preferably and firstly be selected from the latter group.

Figure 83:
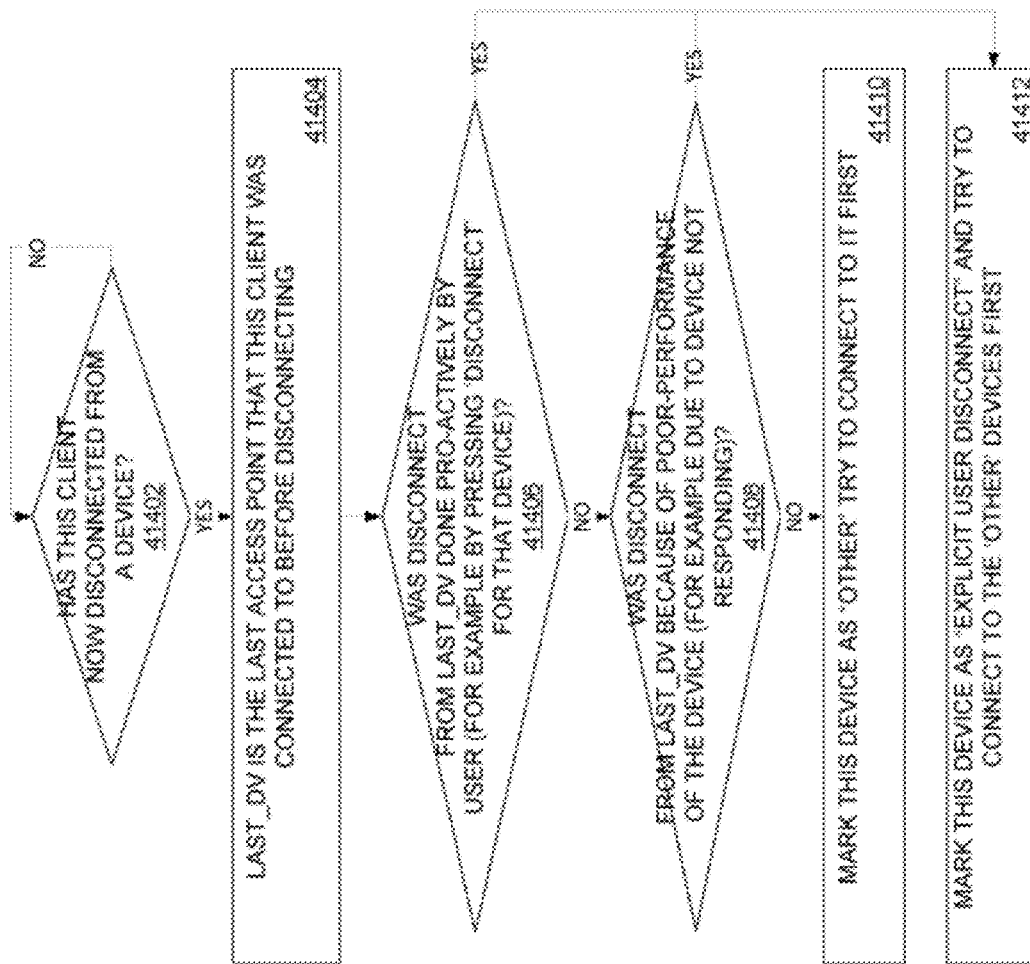
FIG. 83 illustrates schematically a simplified flowchart for selecting a WAP based on the WAP prior performance.

FIG. 83 shows a flowchart relating to implementing such a system. In a step 41402, it is checked if the client has just disconnected from a WAP, and then in a step 41404 a variable designated as last_dv is set to the recently disconnected WAP. A proactive disconnection by the user, such as by user pressing 'disconnect', is checked in a step 41406. A poor performance disconnection is checked in a step 41408, and as part of this step the WAP is checked to be not responding, or responding slowly. In a case the WAP was found to be disconnected not because of poor performance, then the last_dv is set as "other" in a step 41410, and thus this WAP is highly prioritized, and will be first to be selected, followed by the rest of the "Other" WAPs, and the "explicit user disconnect" related WAPs are the last to be selected. If the WAP was found to be disconnected due to poor performance, then the last_dv is marked as "explicit user disconnect" in a step 41412. FIG. 80 shows a flowchart of an algorithm that describes how network elements may attempt to connect to multiple WAPs, allowing for a quick connection to a selected one of the WAPs. While exampled herein regarding connection to a WAP, any other communication device, such as a switch, router, or a gateway, using a wireless or wired connection, may be equally applied.

Figure 84:
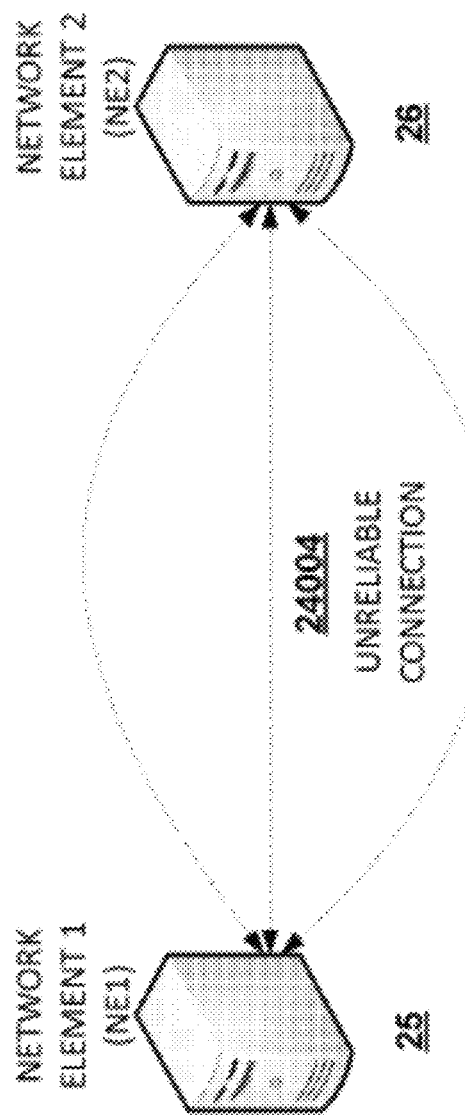
FIG. 84 illustrates schematically two network elements connected over an unreliable connection.

Typical connections (including data paths and communication links) via a network, and in particular via a packet-based network such as the Internet 113, are associated with a reliability that is less than 100%. The reliability is typically measured as the number of packets that do not reach their destination intact, but can also be measured by their latency, bandwidth, and other factors. FIG. 84 is a diagram of a common arrangement, where a Network Element 1 (NE1) 25 communicates with another Network Element 2 (NE2) 26, where there are only multiple unreliable connections available between the two elements. Typically, a connection for fetching by the NE1 25 of a part of, or all of, a content from the NE2 26, is established using only a single connection 24004, out of these available unreliable connections. For example, in a case where Voice over IP (VoIP) call is carried between the NE1 25 and the NE2 26 over one of these unreliable connections, that drops, for example, 1% of the packets, then 1 out of every 100 packets of the call will be lost, resulting in a low quality call. The other available unreliable connections between the two network elements may be used to increase the reliability, as shown schematically in FIGS. 85, 86, and 87, illustrating the utilizing of additional connections for increased connection reliability.

Figure 85:
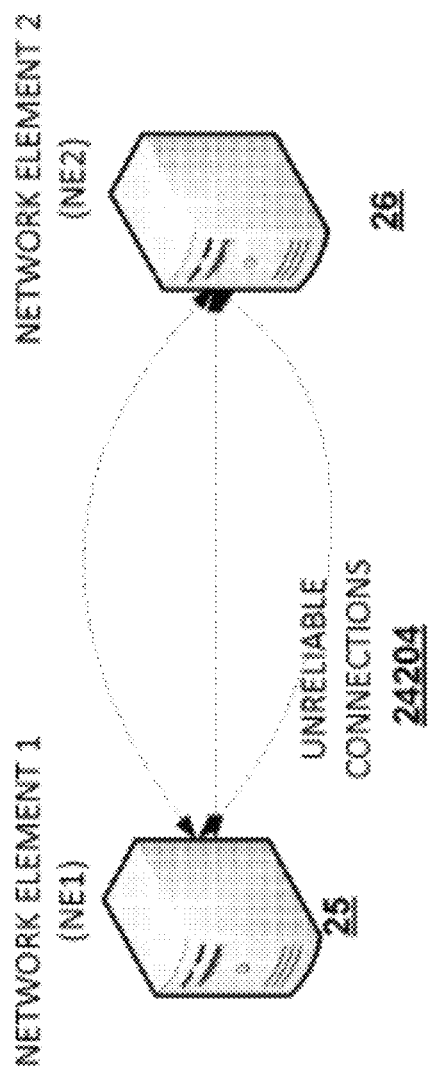
Figure 86:
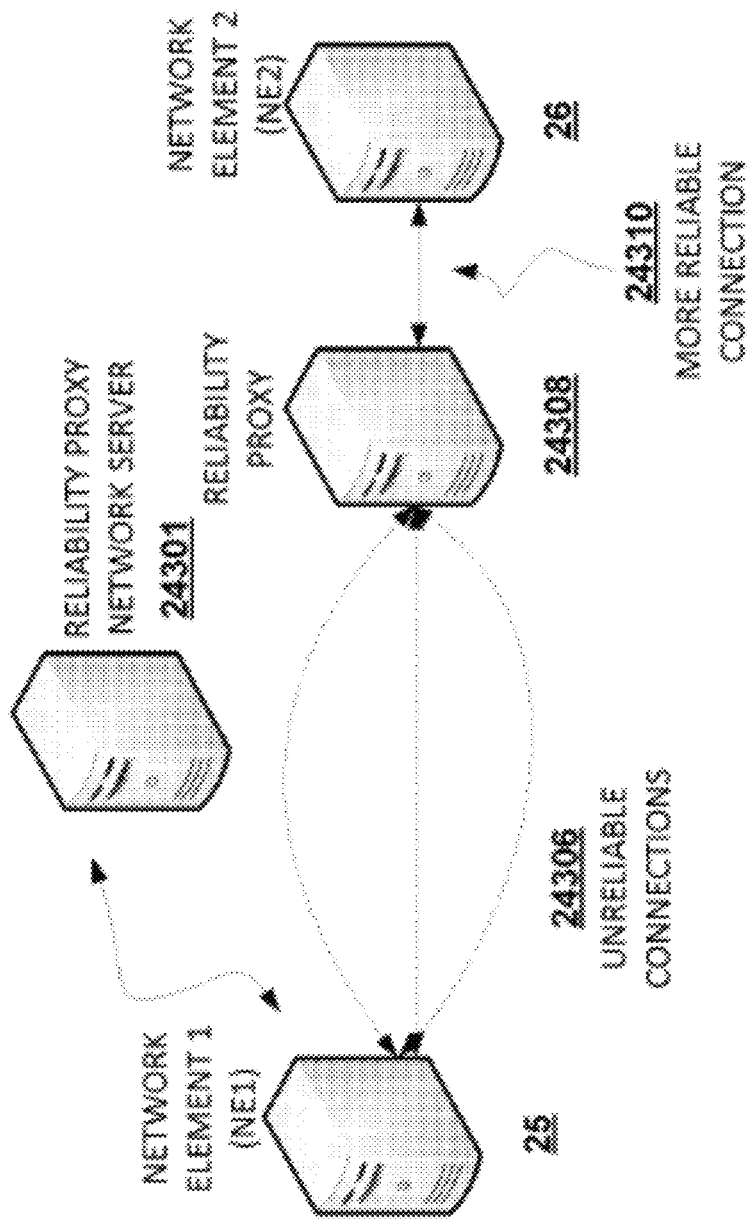

FIG. 85 shows a using of the multiple unreliable connections 24204 for communication between the NE1 25 and the NE2 26, implemented by a special program that is installed on both the NE1 25 and the NE2 26. This program transmits each packet from the NE1 25 to the NE2 26, or vice versa, over two or more data routes. Thus, the resulted unreliability is decreased by a factor received by multiplying the unreliability of the routes, and the used bandwidth is increased by a factor corresponding to the number of routes used. In one example, 3 (three) data routes are used, and assuming each data route reliability 99% (i.e., 99 out of 100 packets typically reach their destination intact) whereby the unreliability of a single connection is 1%, then the resulted unreliability of the new scheme is 1% (unreliability)^3 (number of routes)=0.0001%, and the available bandwidth is triple the bandwidth available when using a single data path. Multiple routes may be implemented by using a program that uses available multiple network interfaces of the network elements, where packets are sent the packet over two or more of the available interfaces, or alternatively by using peer devices (such as the peer device #1 102*a* and the peer device #2 102*b*) as described herein or in the '604 Patent.

In one example, the program may be installed on only one of the network elements. In such a scheme, a network element designated as a reliability proxy may be used, on which the program is installed. Preferably, the reliability proxy may use multiple connections to the other network element. A scheme using a reliability proxy is shown in FIG. 86, used for communication between the NE1 25 and the NE2 26, and the program is installed on the NE1 25 but not on the NE2 26. The NE1 25 queries a reliability proxy network server 24301 and provides the server the identifier (e.g., IP address) of the NE2 26. The server 24301 responds by providing the NE1 25 the identifier (e.g., IP address) of a Reliability Proxy (RP) 24308 to be used. The RP 24308 is a network element on which the program is installed, and which has a connection 24310 to NE2 26, which is preferably more reliable than the direct connection between the NE1 25 and the NE2 26. The NE1 25 then communicates with the RP 24308 via multiple routes 24306, and the RP 24308 communicates with NE2 26 through the reliable connection 24310. Thus, the information is reliably carried over the routes 24306, providing a more reliable connection than the single route that may be used, since the original route 24004 is included in 24306, and using additional routes improves the reliability, and since route 24310 is more reliable by selection, the total obtained reliability is higher than a single direct connection between the two devices.

Figure 87:
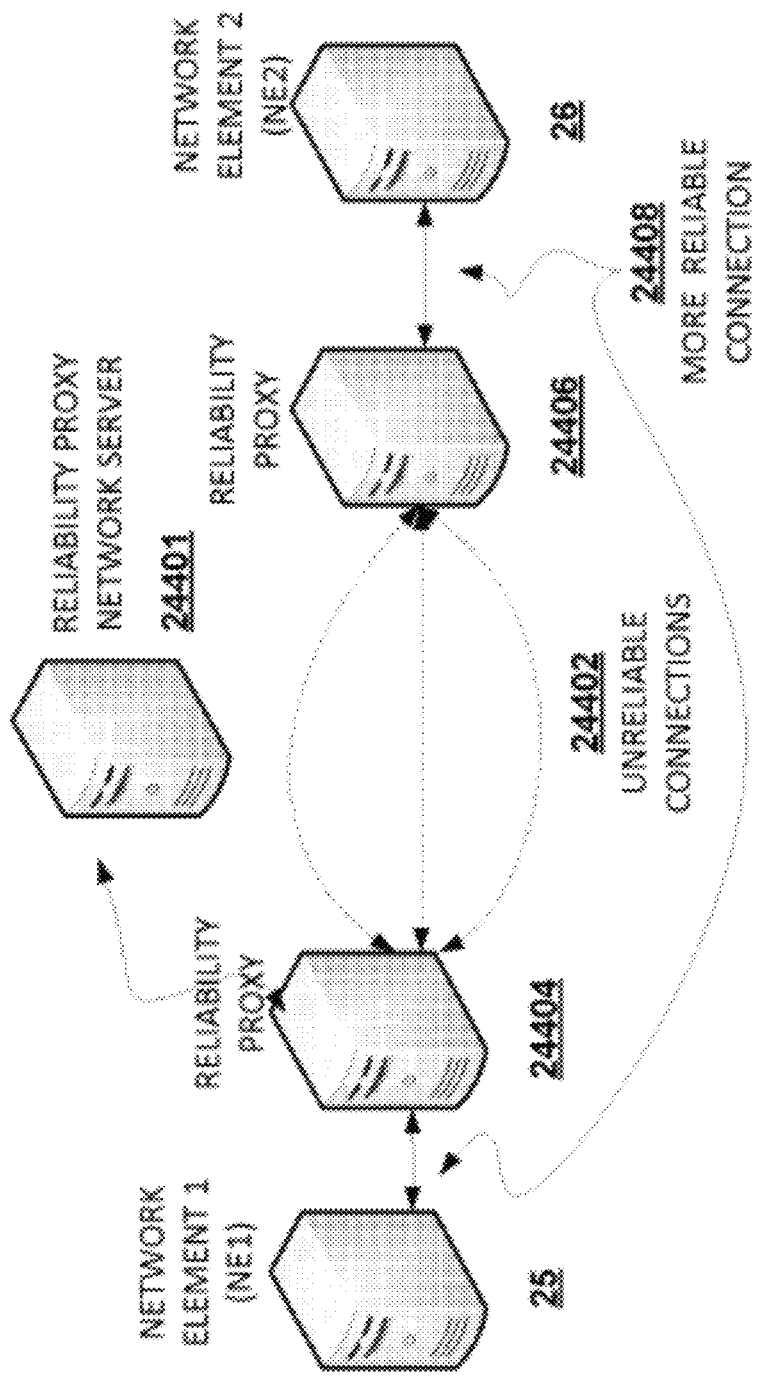

It is also possible to use this method in a configuration where neither the NE1 25 nor the NE2 26 includes the program installed, as shown in FIG. 87. In this scheme, the NE1 25 is manually configured to use the reliability proxy 24404 as a reliability proxy, and that reliability proxy then uses a reliability proxy network server 24401 to find a reliability proxy 24406 that can be used to communicate with the NE2 26.

Figure 88:
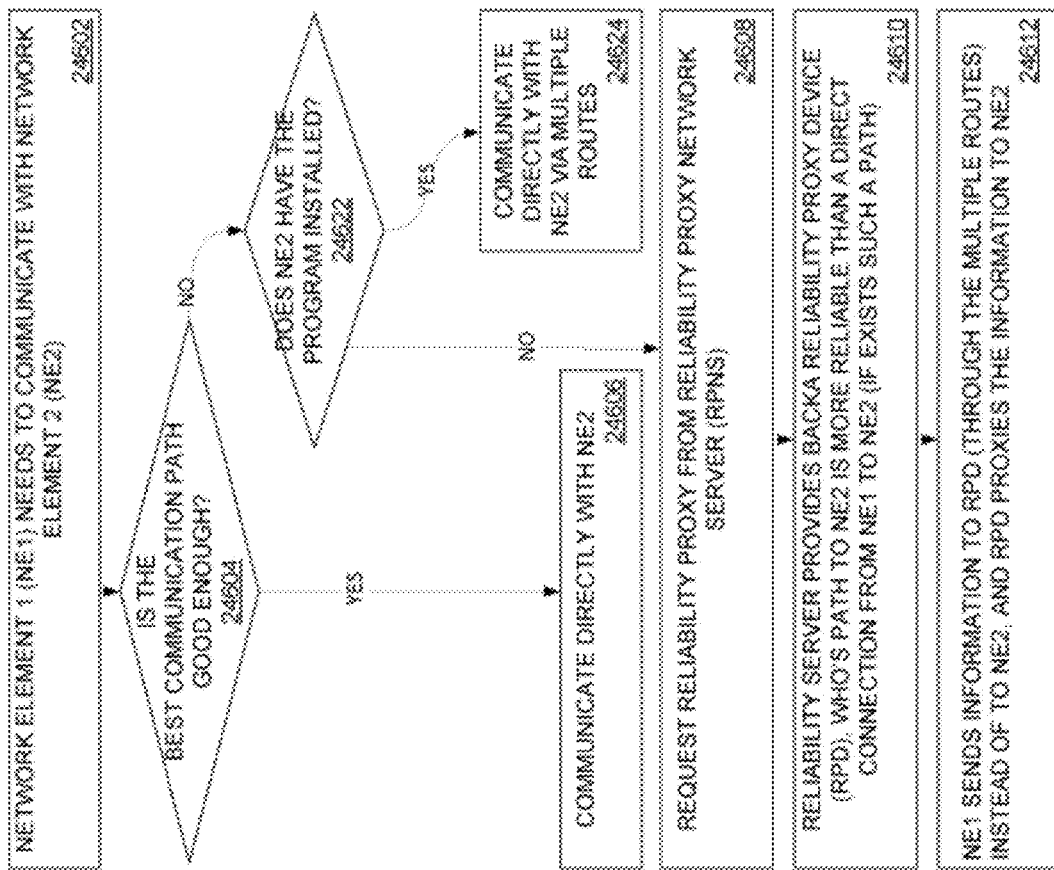

A flowchart of the program is shown in FIG. 88. The program is activated in a step 24602 when the NE1 25 requests to communicate with the NE2 26. The program then checks in a step 24604 whether the existing direct connection between the two network elements is good enough, such as by using the RTT and BW of the direct connection route. If the existing route is good enough, then a direct communication is initiated in the step 24606, as known in the art. However, if the existing route is not good enough, then in a step 24622 the program checks whether the NE2 26 has the program installed. The network elements on which the program is installed report to the server upon being online, and the server logs this information in a reliability database This can be done by sending a query to the NE2 26, so that if the program exists, the device so acknowledges, or by requesting such information from the reliability proxy network server by using the server reliability database. If the NE2 26 does have the program installed, then a direct communication is used between the NE1 25 and NE2 26, using multiple routes (as in FIG. 85), as described in FIG. 89. If the NE2 26 does not have the program installed, then a request is sent in a step 24608 to the Reliability Proxy Network Server (RPNS) for a proxy to use for the communication. The response received in a step 25610 from the RPNS provides an identifier of a Reliability Proxy Device (RPD) that may use a data path to the NE2 26 that is more reliable than a direct connection from the NE1 25 to the NE2 26, if such a path exists. The NE1 25 then sends in a step 24612 the information to the RPD via the multiple routes between them as described in FIG. 89. If there is no such data path, then a direct communication is established, such as in the step 24606.

Figure 89:
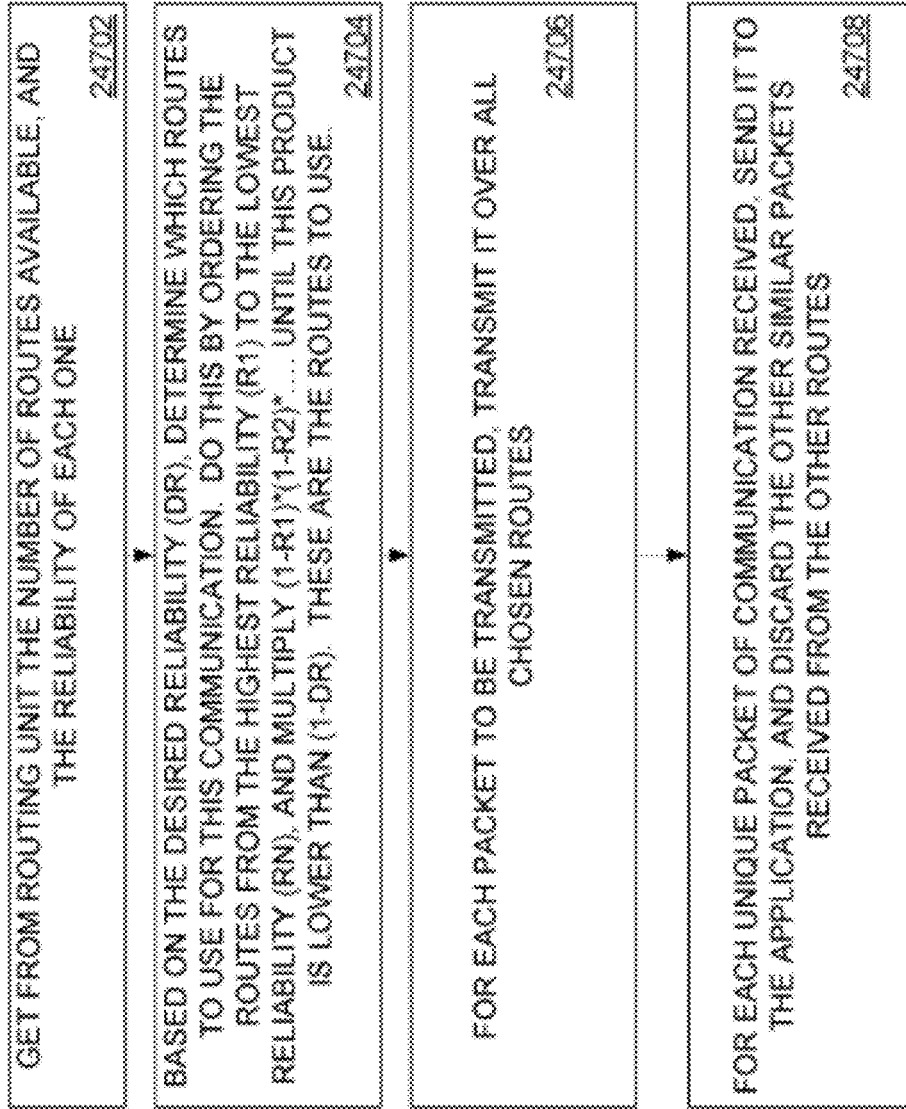

A method of transmitting packets in parallel over multiple routes, between the NE1 25 and the NE2 26, is described in FIG. 89. In a step 24702 NE1 25 receives from a routing unit the number of routes available to the NE2 26, and the reliability associated with each one of the routes. In a step 24704, the routes to be uses are selected as follows: A Desired Reliability (DR) is first set, and the available routes are ranked based on their reliability, where the highest reliability is listed first as Route #1, assuming to be associated with a reliability of R1, the second reliable route is listed second as Route #2, assuming to be associated with a reliability of R2, and so on, until the less reliable route is Route #N with an associated reliability of the RN. The routes to use are determined by multiplying $(1-R1)*(1-R2)*(1-R3)$ . . . , until the product is lower than DR. Note that $(1-Rn)$ is the "unreliability" of a route n whose reliability is Rn, and thus the product of the 'unreliability' of the routes is the un-reliability of the parallel use of the multiple routes, assuming that the routes R1, R2, . . . Rx are used for this particular communication between the NE1 25 and the NE2 26. During the communication session between the NE1 25 and the NE2 26, each packet to be transmitted is carried in a step 24706 over all the selected routes. On the receiving side, each unique packet received is passed in a step 24708 to the application, and other similar packets received from the other routes are discarded. In the case of a missing packet over the fastest connection, that packet is expected to be received via the second fastest connection.

Figure 90:
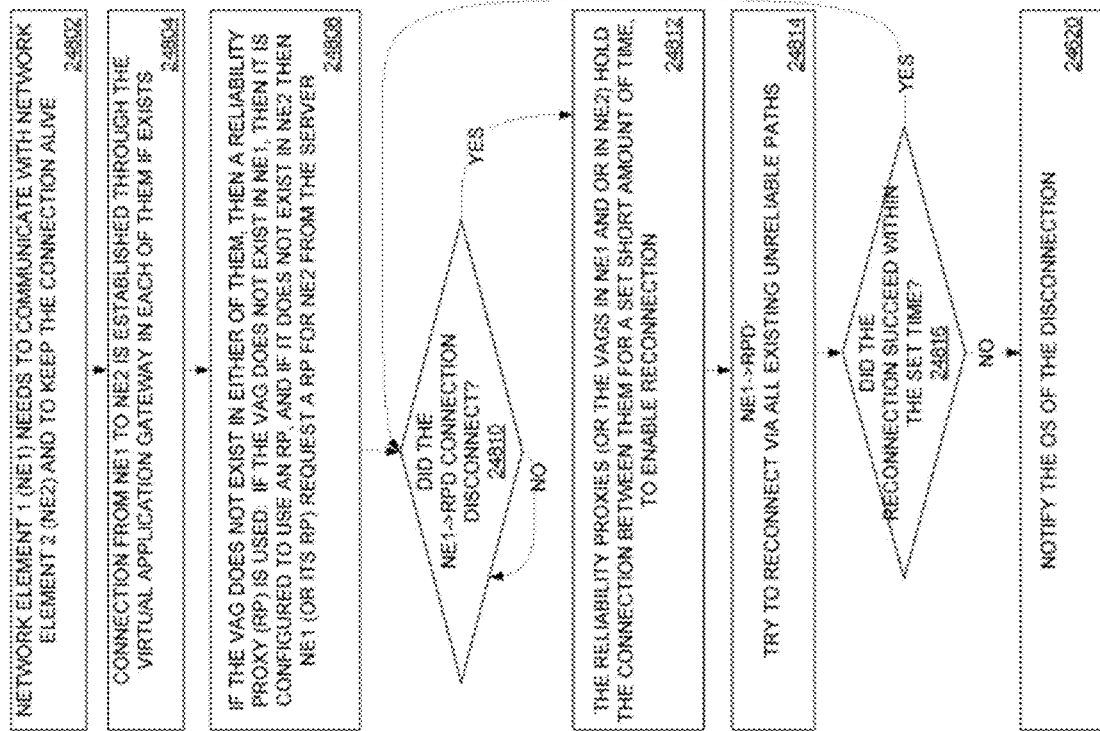

In addition to packet loss, unreliable connections typically frequently disconnect. In such a case, the communicating devices try to reconnect, and often succeed. However, such a disconnection may create discontinuity that may be detected by the communicating applications, and may impact their performance, such as a producing a "404 page not found" message in a web browser. However, if the disconnection is not detected by the applications until the re-connection is established, the discontinuity could be avoided. Thus, it is desirable to delay for a short time the signaling to the applications, until the connection is re-established, as described in a flowchart in FIG. 90.

In a step 24802 the NE1 25 initiates a communication with other network element, such as the NE2 26. The connection from the NE1 25 to the NE2 26 is established in a step 24804 through a Reliability Proxy program (RP) in each of the NE1 25 and the NE2 26 (if such an RP exists). If the RP does not exist in the NE1 25, then it can be configured to use an external device as a Reliability Proxy (RP). If the RP does not exist in the NE2 26, then the NE1 25 requests an RP from the reliability proxy network server, and communicates with it, instead of communicating directly with the NE2 26, where the RP will proxy the messages to the NE2 26 so that effectively the NE1 25 is communicating with the NE2 26.

The connection between the RPs may be disconnected as determined in a step 24810 (whether the RPs are within the NE1 25 and the NE2 26, or external to them). If the connection was disconnected, then in a step 24812 the reliability proxies hold the connection between them and the operating system that they are acting as a proxy for, for a set short amount of time that it would take to re-connect the broken connection in a reasonable scenario (e.g., 200 ms). Holding the connection may be performed in a way similar to the virtual application gateway described in FIG. 51. During the period that the connection to the operating system is held, the RPs try to reconnect with each other in a step 24814. If the re-connection succeeds within the set time, then communication resumes without a break from the operating system perspective. However, if the re-connection did not succeed in the set amount of time, then the OS is notified of the disconnection.

The systems and methods herein may use redundant communication routes (or data paths), that may be based on standby redundancy, (a.k.a. Backup Redundancy), where one of the data paths or the associated hardware is considered as a primary unit, and the other data path (or the associated hardware) is considered as the secondary unit, serving as back up to the primary unit. The secondary unit typically does not monitor the system, but is there just as a spare. The standby unit is not usually kept in sync with the primary unit, so it must reconcile its input and output signals on the takeover of the communication. This approach does lend itself to give a "bump" on transfer, meaning the secondary operation may not be coordinated with the last system state of the primary unit. Such mechanism may require a watchdog, which monitors the system to decide when a switchover condition is met, and command the system to switch control to the standby unit. Standby redundancy configurations commonly employ two basic types, namely 'Cold Standby' and 'Hot Standby'.

In a cold standby scheme, the secondary unit is either powered off or otherwise non-active in the system operation, thus preserving the reliability of the unit. The drawback of this design is that the downtime is greater than in hot standby, because the standby unit needs to be powered up or activated, and brought online into a known state.

In a hot standby scheme, the secondary unit is powered up or otherwise kept operational, and can optionally monitor the system. The secondary unit may serve as the watchdog and/or voter to decide when to switch over, thus eliminating the need for an additional hardware for this job. This design does not preserve the reliability of the standby unit as well as the cold standby design. However, it shortens the downtime, which in turn increases the availability of the system. Some flavors of Hot Standby are similar to Dual Modular Redundancy (DMR) or Parallel Redundancy. The main difference between Hot Standby and DMR is how tightly the primary and the secondary are synchronized. DMR completely synchronizes the primary and secondary units.

While a redundancy of two was exampled above, where two data paths and two hardware devices were used, a redundancy involving three or more data paths or systems may be equally used. The term 'N' Modular Redundancy, (a.k.a. Parallel Redundancy) refers to the approach of having multiply units or data paths running in parallel. All units are highly synchronized and receive the same input information at the same time. Their output values are then compared and a voter decides which output values should be used. This model easily provides bumpless switchovers. This model typically has faster switchover times than Hot Standby models, thus the system availability is very high, but because all the units are powered up and actively engaged with the system operation, the system is at more risk of encountering a common mode failure across all the units.

Deciding which unit is correct can be challenging if only two units are used. If more than two units are used, the problem is simpler, usually the majority wins or the two that agree win. In N Modular Redundancy, there are three main typologies: Dual Modular Redundancy, Triple Modular Redundancy, and Quadruple Redundancy. The Quadruple Modular Redundancy (QMR) is fundamentally similar to the TMR but using four units instead of three to increase the reliability. The obvious drawback is the 4X increase in system cost.

Dual Modular Redundancy (DMR) uses two functional equivalent units, thus either can control or support the system operation. The most challenging aspect of DMR is determining when to switch over to the secondary unit. Because both units are monitoring the application, a mechanism is needed to decide what to do if they disagree. Either a tiebreaker vote or simply the secondary unit may be designated as the default winner, assuming it is more trustworthy than the primary unit. Triple Modular Redundancy (TMR) uses three functionally equivalent units to provide a redundant backup. This approach is very common in aerospace applications where the cost of failure is extremely high. TMR is more reliable than DMR due to two main aspects. The most obvious reason is that two "standby" units are used instead of just one. The other reason is that in a technique called diversity platforms or diversity programming may be applied. In this technique, different software or hardware platforms are used on the redundant systems to prevent common mode failure. The voter decides which unit will actively control the application. With TMR, the decision of which system to trust is made democratically and the majority rules. If three different answers are obtained, the voter must decide which system to trust or shut down the entire system, thus the switchover decision is straightforward and fast.

Another redundancy topology is 1:N Redundancy, where a single backup is used for multiple systems, and this backup is able to function in the place of any single one of the active systems. This technique offers redundancy at a much lower cost than the other models by using one standby unit for several primary units. This approach only works well when the primary units all have very similar functions, thus allowing the standby to back up any of the primary units if one of them fails. While the redundant data paths have been exampled with regard to the added reliability and availability, redundant data paths may as well be used in order to provide higher aggregated data rate, allowing for faster response and faster transfer of data over the multiple data paths.

A client device may connect to one of multiple sources for fetching data therefrom. The client device may estimate in advance the Bandwidth (BW) and Round Trip Time (RTT) relating to a connection to each of the sources, in order to estimate the best source to use. Further, a client device may use several available peer devices for loading chunks therefrom. A chunk may, include, for example, 16 KB of data. Assuming that there are two peers devices, designated as P1 and P2, respectively associated with the following BW/RTT times: P1_BW=2,000 Kb/s P1_RTT=30 ms and P2_BW=4,000 Kb/s P2_RTT=70 ms, then the estimated time for a transaction using P1 would be 30 ms+16,000*8/2,000,000=30 ms+64 ms=94 ms, whereas a transaction using P2 would be 60 ms+16,000*8/4,000,000=70 ms+32 ms=102 ms. In such a case, it would be beneficial for the client device to select and use P1. Other examples of such networks include an HTTP client that may access two different web servers for obtaining a certain URL, such as the original web server, and a CDN storing the URL content. However, the client device may not have previously (or lately) communicated with a source, and thus may not possess the BW and the RTT data needed for the evaluation. In such a case, it would be beneficial to have an algorithm for estimating BT/RTT with the source.

Figure 91:
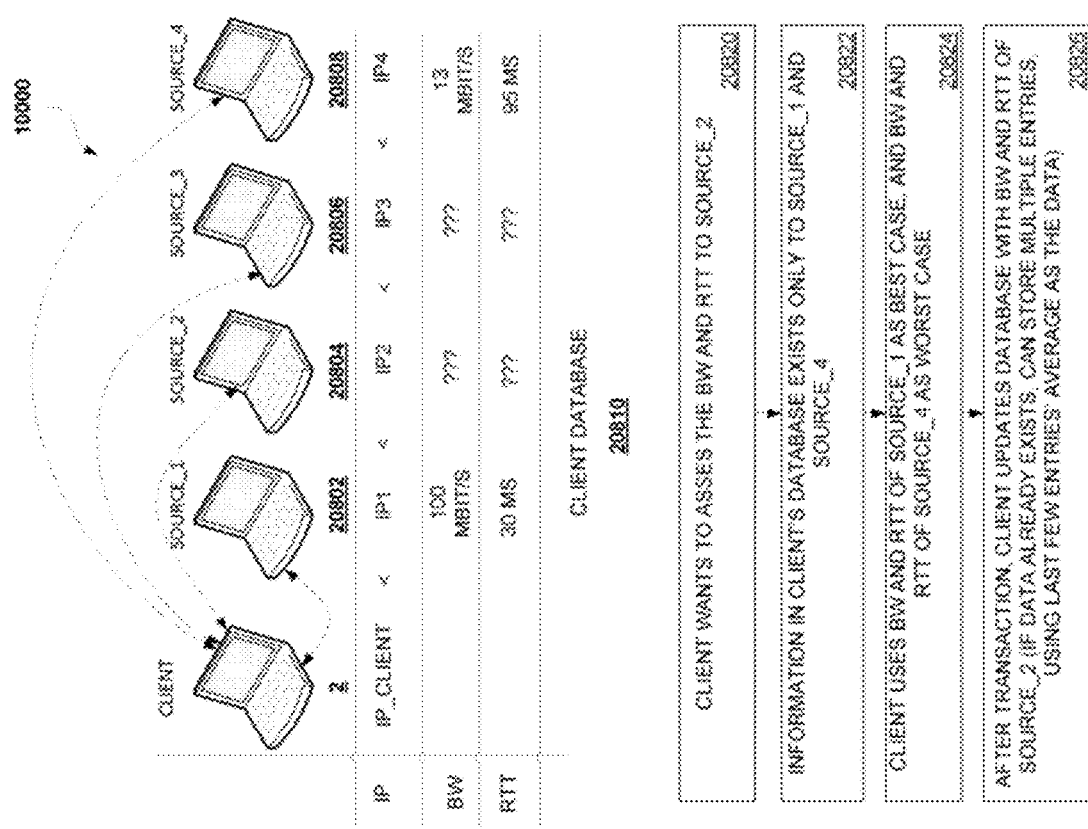

FIG. 91 shows a network that includes a client device 2 and four available sources 20802, 20804, 20806, and 20808, as well as a database 20810 in the client device 2 that keeps track of the IPs, BW and RTTs of the various sources that were previously communicated with. This database 20810 may also include the time of the last connection, as well as other data. The database 20810 may sort the sources according to their respective IPs, such that if a source_1 is shown in the table (representing the database 20810) in a column that is left to a source_2 related column, then necessarily the IP of source_1 is smaller than the IP of source_2.

In the example shown in FIG. 91, the Client 2 has previously connected with the source_1 20802 and with the source_4 20808, and hence stores in the database 20810 the BW and RTT for these two sources. The Client 2 may require evaluating the BW and RTT to source_2 20804, in order to determine whether to use it, or to seek for an alternative source (or not to communicate at all).

In such a case, the client needs to assess the BW and RTT of the source_2. A good estimation (or a guess) may assume that the values of the BW and RTT of the source_2 are between the values of BW and RTT of source_1 and source 4, which are the sources of either side of the source_2 (in terms of IP address), based on the information stored in the database 20810. The estimated values of the source_2 related BW and RTT might be derived in various ways. For example, using proportional estimation, so that when the BW and RTT of source 1 are respectively BW1 and RTT1, for source 4 they are respectively BW4 and RTT4, and for source 2 they are respectively BW2 and RTT2, then BW2 and RTT2 can be calculated by their relative IP distance from BW1 and BW4 and between RTT1 and RTT4. Other ways to calculate can be a regular average, such as BW2=(BW1+BW4)/2.

Alternatively or in addition, the database 20810 may reside on a server on the network, and thus a client device may request and fetch therefrom information about connecting to various sources, even those that it has not previously or lately connected with, based on connections with other client devices that have communicated with it and logged their results to this networked database.

Figure 92:
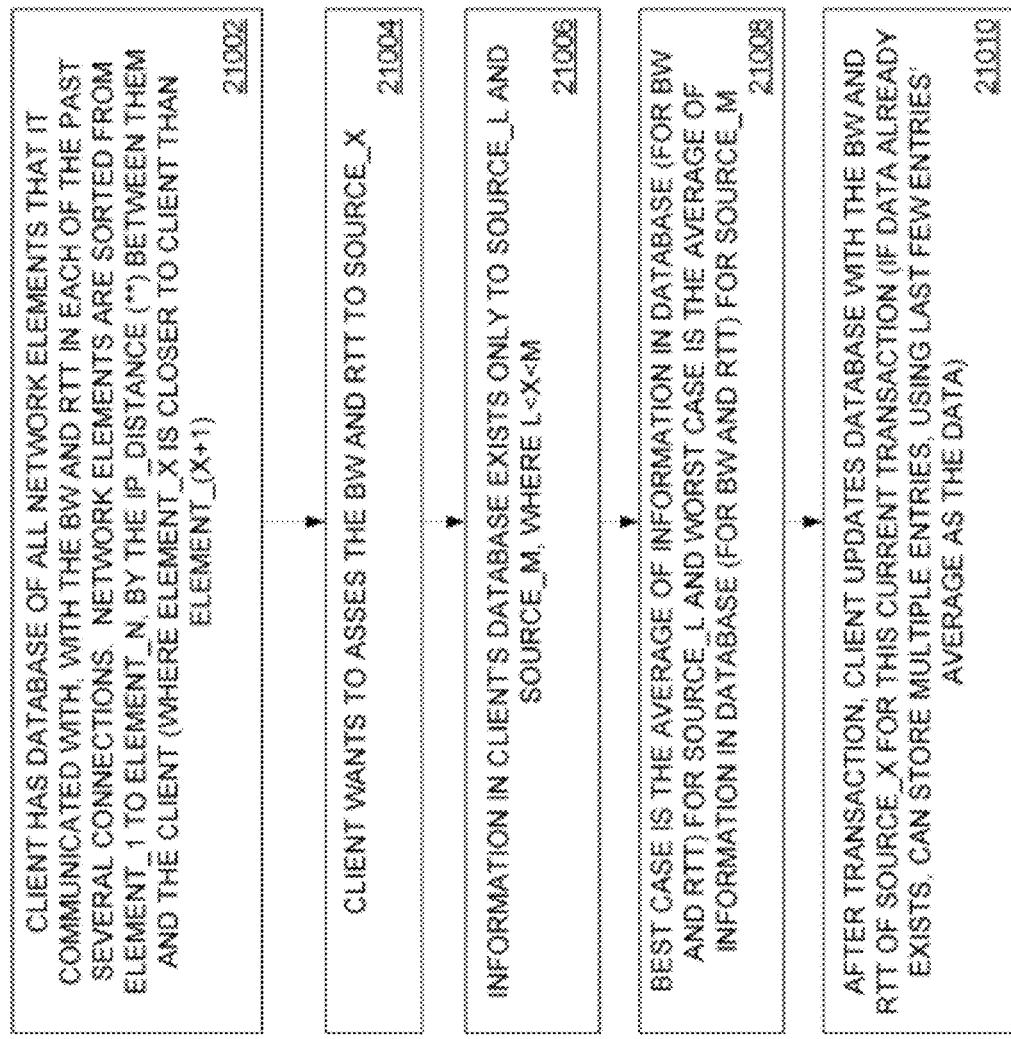

FIG. 92 shows a flowchart for estimating a source related BW and RTT. In a step 21002, the client device is maintaining a database 20810 of network elements that it has communicated with, where for each of these network elements the associated BW and RTT of the connection, and optionally the time of a connection for each, is stored. In the database 20810, the network elements are sorted by their IP distance from the client device, where the IP distance is the difference between the IP of the source and the IP of the client. The client device is requesting in a step 21004 to communicate with a source (source x), and thus first assesses the BW and RTT that relates to the source_x. In a step 21012, it is checked whether relevant information about the BW and RTT to source_x already exists in the database 20810. It is noted that this database may be local—in the client device, or available via a network and thus accessible by multiple clients. If the source x entry exists in the database, then these stored values of the BW and the RTT are assumed for the source_x. If not, then the client gets information from the database about the BW and RTT for the two sources that are associated with IP addresses on either side, such as a lower one and a higher one, of the source x (in terms of IP distance). The client device uses these two data points to assess the BW and RTT, using any of a variety of methods, such as using a regular average or a weighted average.

Figure 93:
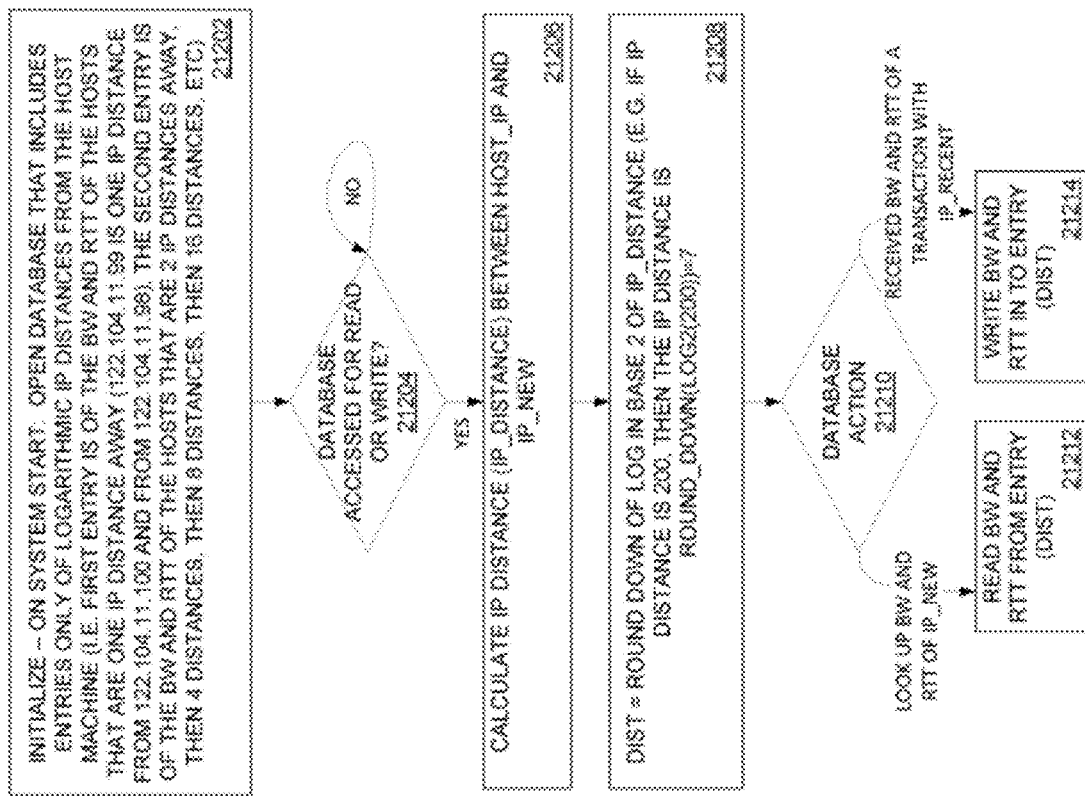

A large database may be used to store data relating to the connections characteristics (such as BW and RTT) to various network elements. Over time this data accumulates, and may be reduced by storing only valuable information, as shown in a flowchart FIG. 93, describing a method for storing only the data pertaining to certain network elements, which are indicative of other network elements in their vicinity.

The system initializes in a step 21202, when the system starts for the first time, before the database is initialized. As part of an initialization process, a database is created, with entries that signify logarithmic IP distances from the local network element. Thus, a first entry will be for an IP dist=1, a second for an IP dist=2, a third for an IP_dist=4, a fourth for an IP dist=8, etc., until the farthest IP distance possible in the network that the local network element is operating in (for an IPv4 network example, the smallest IP address is 0.0.0.0 and the largest address is 255.255.255.255, the largest IP distance is half of the difference between these two addresses).

In a step 21204, it is checked whether the database is accessed for reading or writing. The database is accessed for reading when a program requests the estimated BW & RTT between the local network element (associated with IP that is designated as a HOST_IP), and a certain network element to which this local network element is considering to communicate with (associated with IP that is designated as IP_NEW). The database is accessed for writing when the local network element has completed a communication session to another network element, or otherwise found out information about the BW & RTT to that network element in other ways, and requests to write the newly learned data (NEW_BW, NEW_RTT) to the database so that the system can make later better assessments of the BW & RTT.

Next, the IP distance (TP_DISTANCE) is calculated in a step 21206 between the HOST_IP to the IP_NEW by finding the number of IPs that are between the HOST_TP and the IP_NEW. Note that in the case of using IP distance, this method considers that the IP addresses are 'connected at the edges', meaning that the first address (0.0.0.0 in IPv4) is 1 IP address away from the last address (255.255.255.255 in IPv4), and thus there are two different IP distances between each 2 points. The IP_DISTANCE is calculated as the minimum between these two distances. In a step 21208, the logarithmic distance (DIST) from HOST_IP to the NEW_IP is calculated. The DIST is calculated as the Round_down (log_b2(IP_DISTANCE)—where the rounding down the log (in base 2) of the IP_DISTANCE between HOST_IP and IP_NEW. If the database action was for a READ action, then in a step 21212 the BW & RTT are read from the entry [DIST] of the database. If the database action was for a WRITE action, then in a step 21214 the NEW_BW & NEW_RTT are written to the entry [DIST]. Note that the NEW_BW & NEW_RTT may also be written to the database in other methods, in order to keep track also of historical data. For example, the NEW_BW & NEW_RTT may be averaged in with the other data samples (by keeping the latest average and the number of samples in the database), or in any other similar methods.

Figure 94:
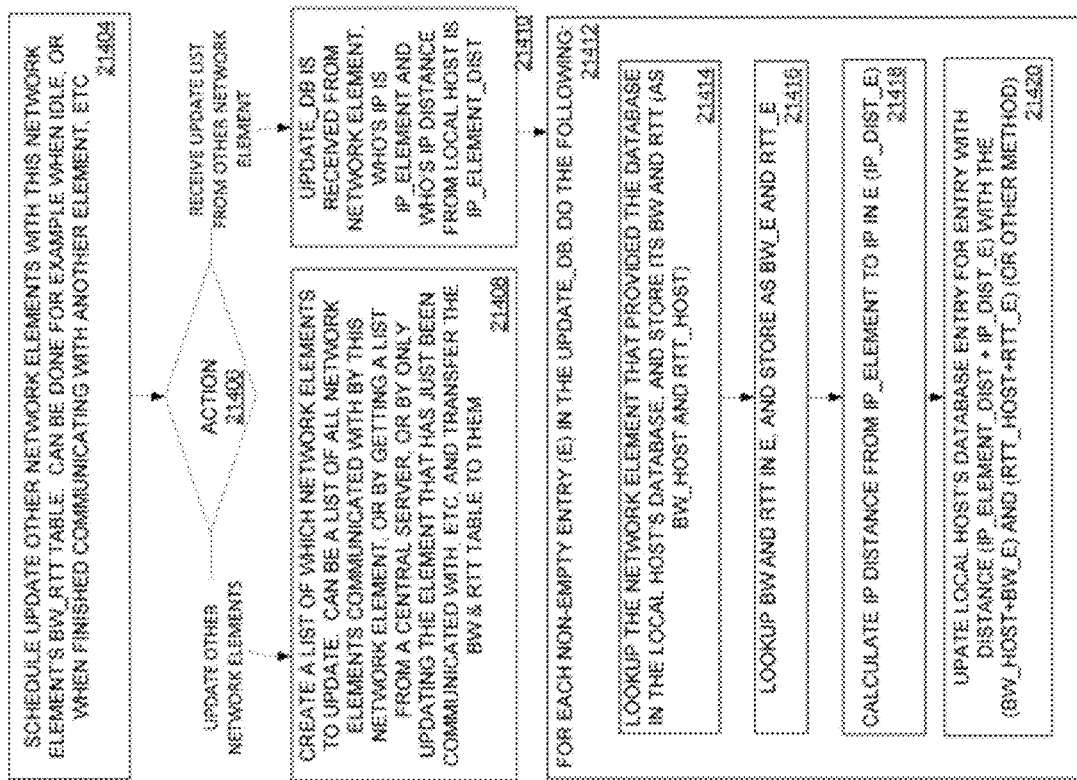

When network elements use BW & RTT values from the tables, they could benefit from 'teaching' each other about the information they already have about BW & RTT between them and other network elements. FIG. 94 is a flowchart showing a method where network elements can share BW & RTT information so that a network element that wishes to communicate with a network element that it has not recently communicate with, may assess the BW & RTT to it by learning from the experience of other network elements that have recently communicated with that network element. The method starts with scheduling an update of other network elements in a step 21404. The scheduling can be set to either happen at constant time intervals, when the local host is idle, when both the local host and other network element to be updated are idle, or when finished communicating with other network element. If the scheduled event of updating other network elements with the table from the local network element, then a list is created in a step 21408 of which of the network elements to update. This can be all the network elements that have been recently communicated with, or a central server that will be updated and update other network elements, or by getting a list from such a central server. The BW & RTT of this local host are then communicated to the elements in this list.

In a step 21410 the local host receives a BW & RTT table (UPDATE DB) from a different network element associated with an IP that is IP_ELEMENT. Then, for each non-empty entry in the UPDATE_DB (entry marked as 'E'), the following set of actions is performed: First, in a step 21414 the IP of the network element that provided the UPDATE_DB (IP_ELEMENT) is looked up in the local network element database, and the resulting BW and RTT are stored in memory as BW_ELEMENT and RTT_ELEMENT (these are the BW and RTT between the local network element and the network element that is providing the UPDATE_DB). Then, in a step 21416, the BW & RTT in entry 'E' are stored in memory as BW_E and RTT_E. In a step 21418, the IP distance from the network element to the 'E' associated IP is calculated and stored in the data base as IP_DIST_E. In a step 21420, the local database entry for the IP distance of (IP_ELEMENT_DIST+IP_DIST_E) is updated where the BW value receives the value of BW_HOST+BW_E and the RTT value receives the value of RTT_HOST+RTT_E.

The term 'network element' (or 'element') is used herein to include, but not limited to, a tunnel-based client device (such as the client device #1 31a), a tunnel-based acceleration server (such as the acceleration server 32), a tunnel device (such as the tunnel device #1 33a), a peer-based client device (such as the client device #1 31a), an agent device (such as the agent device #1 103a), a peer device (such as the peer device #1 102a), a peer-based acceleration server (such as the acceleration server 202), or a data server (such as the data server #1 22a). The terms 'chunk' and 'slice' are interchangeably used herein to include, but not limited to, a part of, or the entire of, a content. Any memory, storage, database, or cache mentioned herein may consist of, comprise, use, or be included in, the local cache as described in U.S. Pat. No. 8,135,912 to the Shribman et al., entitled: "System and Method of Increasing Cache Size".

The steps described herein may be sequential, and performed in the described order. For example, in a case where a step is performed in response to another step, or upon completion of another step, the steps are executed one after the other. However, in case where two or more steps are not explicitly described as being sequentially executed, these steps may be executed in any order, or may be simultaneously performed. Two or more steps may be executed by two different network elements, or in the same network element, and may be executed in parallel using multiprocessing or multitasking.

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions causes the processor to perform the one or more of the methods or steps described herein.

Any device or network element herein may comprise, consists of, or include a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or a non-portable device. Further, any device or network element herein may comprise, consist of, or include a major appliance (white goods) and may be an air conditioner, dishwasher, clothes dryer, drying cabinet, freezer, refrigerator, kitchen stove, water heater, washing machine, trash compactor, microwave oven and induction cooker. The appliance may similarly be a 'small' appliance such as TV set, CD or DVD player, camcorder, still camera, clock, alarm clock, video game console, HiFi or home cinema, telephone or answering machine.

The term 'host' or 'network host' is used herein to include, but not limited to, a computer or other device connected to a computer network, such as the Internet. A network host may offer information resources, services, and applications to users or other nodes on the network, and is typically assigned a network layer host address. Computers participating in networks that use the Internet Protocol Suite may also be called IP hosts, and computers participating in the Internet are called Internet hosts, or Internet nodes. Internet hosts and other IP hosts have one or more IP addresses assigned to their network interfaces. The addresses are configured either manually by an administrator, automatically at start-up by means of the Dynamic Host Configuration Protocol (DHCP), or by stateless address autoconfiguration methods. Network hosts that participate in applications that use the client-server model of computing, are classified as server or client systems. Network hosts may also function as nodes in peer-to-peer applications, in which all nodes share and consume resources in an equipotent manner.

The arrangements and methods described herein may be implemented using hardware, software or a combination of both. The term "software integration" or any other reference to the integration of two programs or processes herein, is used herein to include, but not limited to, software components (e.g., programs, modules, functions, processes, etc.) that are (directly or via another component) combined, working or functioning together or form a whole, commonly for sharing a common purpose or set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "hardware integration" or integration of hardware components is used herein to include, but not limited to, hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled with the same software or hardware. The term "integration" herein is used herein to include as applicable, but not limited to, a software integration, a hardware integration, or any combination thereof.

Any networking protocol may be utilized for exchanging information between the network elements (e.g., clients, tunnels, peers, servers) within the network (such as the Internet). For example, it is contemplated that communications can be performed using TCP/IP. Generally, HTTP and HTTPS are utilized on top of TCP/IP as the message transport envelope. These two protocols are able to deal with firewall technology better than other message management techniques. However, partners may choose to use a message-queuing system instead of HTTP and HTTPS if greater communications reliability is needed. A non-limiting example of a message queuing system is IBM's MQ-Series or the Microsoft Message Queue (MSMQ). The system described hereinafter is suited for both HTTP/HTTPS, message-queuing systems, and other communications transport protocol technologies. Furthermore, depending on the differing business and technical requirements of the various partners within the network, the physical network may embrace and utilize multiple communication protocol technologies.

The term "port" refers to a place of access to a device, electrical circuit or network, where energy or signal may be supplied or withdrawn. The term "interface" of a networked device refers to a physical interface, a logical interface (e.g., a portion of a physical interface or sometimes referred to in the industry as a sub-interface—for example, such as, but not limited to a particular VLAN associated with a network interface), and/or a virtual interface (e.g., traffic grouped together based on some characteristic—for example, such as, but not limited to, a tunnel interface). As used herein, the term "independent" relating to two (or more) elements, processes, or functionalities, refers to a scenario where one does not affect nor preclude the other. For example, independent communication such as over a pair of independent data routes means that communication over one data route does not affect nor preclude the communication over the other data routes.

Some embodiments may be used in conjunction with various devices, network elements, and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

As used herein, the terms "program", "programmable", and "computer program" are meant to include any sequence or human or machine cognizable steps which perform a function. Such programs are not inherently related to any particular computer or other apparatus, and may be rendered in virtually any programming language or environment including, for example, C/C++, Fortran, COBOL, PASCAL, assembly language, markup languages (e.g., HTML, SGML, XML, VoXML), and the likes, as well as object-oriented environments such as the Common Object Request Broker Architecture (CORBA), Java™ (including J2ME, Java Beans, etc.) and the likes, as well as in firmware or other implementations. Generally, program modules include routines, programs, objects, components, data structures, etc., that performs particular tasks or implement particular abstract data types. The term "application program" (also referred to as 'application', 'software application', or 'application software') is used herein to include, but not limited to, a computer program designed to perform a specific function directly for a user, or for another application program. Application software is typically a set of one or more programs designed to carry out operations for a specific application. Commonly, an application software is dependent on system software that manages and integrates computer capabilities, but does not directly perform tasks that benefit the user, such as an operating system, to execute. Examples of types of application software may include accounting software, media players, and office suites. Applications may be bundled with the computer and its system software, or may be published separately, and further may be developed and coded as a proprietary, or as an open-source, software. Most applications are designed to help people perform an activity.

The terms "task" and "process" are used generically herein to describe any type of running programs, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing the value—the value must be obtained prior to processing it, although some of the associated processing may be performed prior to, concurrently with, and/or after the read operation). Where certain process steps are described in a particular order or where alphabetic and/or alphanumeric labels are used to identify certain steps, the embodiments are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. They may also be practiced in distributed computing environments where tasks are performed by remote processing devices that are linked through a communications network. In a distributed computing environment, program modules may be located in both local and remote memory storage devices.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure.

All publications, standards, patents, and patent applications cited in this specification are incorporated herein by reference as if each individual publication, patent, or patent application were specifically and individually indicated to be incorporated by reference and set forth in its entirety herein.

The invention claimed is:

1. A method for use by a client device that utilizes a resource, the method comprising:

initiating, by the client device over the Internet, a communication with a first server;

measuring, by the client device, a utilization level of the resource;

sending, by the client device to the first server, a message that is indicative of the measured utilization level;

receiving, by the client device over the Internet, a first request from the first server;

obtaining, by the client device, a first content in response to the received first request, by utilizing the resource; and sending, by the client device to the first server over the Internet, the obtained first content, wherein the first content comprises a part or whole of audio data, voice data, multimedia data, video data, an image, or any combination thereof, and wherein the resource comprises, or consists of, a processor or Central Processing Unit (CPU) operation in the client device, an amount of used or unused location or space of a memory, or any combination thereof;

wherein the client device is configured to be in distinct first and second states, the method further comprising:

responsive to a determining that the utilization level of the resource is above or below a threshold level, shifting to, or staying in, the first state; and responsive to the determining that the utilization level of the resource is respectively not above or below the threshold level, shifting to, or staying in, the second state;

wherein the sending of the message is in response to being in, or shifting to, the first or second state.

2. The method according to claim 1, wherein the message comprises the measured utilization level.

3. The method according to claim 1, for use with a threshold level, wherein the sending of the message is in response to the measured utilization level being below the threshold level.

4. The method according to claim 1, wherein the first content is publicly-accessed, is identified in the Internet by a first identifier, and is stored in a web server, and wherein the first request comprises the first identifier.

5. The method according to claim 4, wherein the first identifier comprises, or consists of, an Internet Protocol (IP) address in IPv4 or IPv6 form or a Uniform Resource Locator (URL), and wherein the first content comprises a part of, or a whole of, a web-site page.

6. The method according to claim 4, wherein the obtaining of the first content comprises sending, by the client device to the web server over the Internet, the first identifier, and receiving, by the client device from the web server over the Internet, the first content, in response to the sending of the first identifier.

7. The method according to claim 6, wherein the first request comprises a HyperText Transfer Protocol (HTTP) or a HyperText Transfer Protocol Secure (HTTPS) request, or wherein the sending of the first identifier comprises sending of a HyperText Transfer Protocol (HTTP) or a HyperText Transfer Protocol Secure (HTTPS) request.

8. The method according to claim 1, wherein the receiving of the first request is in response to the sending of the message.

9. The method according to claim 1, wherein the measuring of the utilization level comprises periodically measuring of the utilization level.

10. The method according to claim 9, wherein the sending of the message comprises periodically sending of the message.

11. The method according to claim 10, wherein the sending of the message is performed at least every 10, 20, 30, 50, or 100 milliseconds, every 1, 2, 3, 5, or 10 seconds, or every 1, 2, 3, 5, or 10 minutes.

12. The method according to claim 1, wherein the measuring of the utilization level comprises continuously measuring of the utilization level.

13. The method according to claim 1, further comprising determining, by the client device, whether the measured utilization level is above or below a threshold level.

14. The method according to claim 13, wherein the sending of the message is in response to determining that the measured utilization level is above or below the threshold level.

15. The method according to claim 1, wherein the resource utilization is based on, or comprises, the processor or CPU time of executing one or more threads or processes, wherein the resource utilization is based on, or comprises, the processor or CPU idling time, or wherein the resource utilization is based on, or comprises, the processor or CPU executing a system idle process.

16. The method according to claim 1, wherein the resource further comprises a hardware component in the client device.

17. The method according to claim 1, wherein the resource further comprises an input or output capability.

18. The method according to claim 17, wherein the resource comprises, or consists of, communication bandwidth for communication with another device over the Internet.

19. The method according to claim 18, wherein the resource comprises, or consists of, communication bandwidth of communication with the first server over the Internet, or wherein the resource utilization is based on, or according to, IETF RFC 2914.

20. The method according to claim 1, wherein the receiving of the first request comprises receiving of the first request from a second server that is distinct from the first server, and wherein the sending of the received first content comprises sending of the first received content to the second server.

21. The method according to claim 1, further comprising:
receiving, by the client device over the Internet, a second request;
obtaining, by the client device, a second content in response to the received second request, by utilizing the resource; and
sending, by the client device over the Internet, the obtained second content.

22. The method according to claim 21, wherein the second content is publicly-accessed, is identified in the Internet by a first identifier, and is stored in a web server, wherein the second request comprises the first identifier, and wherein the obtaining of the second content comprises sending, by the client device to the web server over the Internet, the first identifier, and receiving, by the client device from the web server over the Internet, the second content, in response to the sending of the first identifier.

23. The method according to claim 1, further comprising establishing a connection between the client device and the first server, and wherein any communication with the first server and the client device is over the established connection.

24. The method according to claim 23, wherein the established connection is a Transmission Control Protocol (TCP) connection that is established by performing 'Active OPEN' or 'Passive OPEN', wherein the communication between the client device with the first server is based on, or is according to, Transmission Control Protocol over Internet Protocol (TCP/IP) protocol or connection, wherein the established connection uses a tunneling protocol or a Virtual Private Network (VPN), or wherein the established connection uses HTTP or HTTPS persistent connection.

25. The method according to claim 1, further comprising:
receiving, by the first server from the client device, the message; and
sending, by the first server to the client device over the Internet, the first request in response to the received message.

26. The method according to claim 1, wherein the client device comprises a vehicular device configured to be used or installable in a vehicle.

27. The method according to claim 1, wherein the client device is further storing, operating, or using, a client operating system.

28. The method according to claim 27, wherein the client operating system comprises Microsoft Windows 7, Microsoft Windows XP, Microsoft Windows 8, Microsoft Windows 8.1, Linux, or Google Chrome OS.

29. The method according to claim 27, wherein the client operating system comprises Android version 2.2 (Froyo), Android version 2.3 (Gingerbread), Android version 4.0 (Ice Cream Sandwich), Android Version 4.2 (Jelly Bean), Android version 4.4 (KitKat), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system.

30. The method according to claim 27, wherein the client operating system consists of, comprise, or is based on, Android TV, Android Auto, or Android Wear.

31. The method according to claim 27, wherein the client operating system comprises a mobile operating system.

32. The method according to claim 31, wherein the mobile operating system comprises Android version 2.2 (Froyo), Android version 2.3 (Gingerbread), Android version 4.0 (Ice Cream Sandwich), Android Version 4.2 (Jelly Bean), Android version 4.4 (KitKat), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system.

33. The method according to claim 1, further comprising executing, by the client device, a web browser.

34. The method according to claim 33, wherein the web browser comprises of Microsoft Internet Explorer, Google Chrome, Opera™, or Mozilla Firefox®.

35. The method according to claim 33, wherein the web browser comprises a mobile web browser.

36. The method according to claim 35, wherein the mobile web browser comprises Safari, Opera Mini™, or Android web browser.

37. The method according to claim 1, further comprising periodically sending, by the client device to the first server over the Internet, an 'heartbeat' message that comprises a status of the client device, or is in response to the status of the client device.

38. The method according to claim 37, wherein the status is based on the measured utilization level.

39. The method according to claim 37, wherein a time period between sent multiple 'heartbeat' messages is at least 10 milliseconds, 20 milliseconds, 30 milliseconds, 50 milliseconds, 100 milliseconds, 1 second, 2 seconds, 3 seconds, 5 seconds, 10 seconds, 20 seconds, 30 seconds, 50 seconds, or 100 seconds, 1 minute, 2 minutes, 3 minutes, minutes 5, or 10 minutes.

40. The method according to claim 1, wherein the client device comprises, or consists of, a portable or mobile device.

41. The method according to claim 40, wherein the mobile device comprises a smartphone.

42. The method according to claim 1, wherein the client device comprises, or is part of, a household appliance.

43. The method according to claim 42, wherein the appliance comprises, or is part of, a major appliance that is an air conditioner, a dishwasher, a clothes dryer, a drying cabinet, a kitchen stove, a water heater, a washing machine, a trash compactor, a microwave oven, or an induction cooker.

44. The method according to claim 43, wherein the appliance comprises, or is part of, a major appliance that is a freezer or a refrigerator.

45. The method according to claim 43, wherein the appliance comprises, or is part of, a small appliance that is a television (TV) set.

46. The method according to claim 42, wherein the appliance comprises, or is part of, a small appliance that is a CD or DVD player, a camcorder, a still camera, a clock, an alarm clock, a video game console, a HiFi or home cinema, a telephone, or an answering machine.

47. The method according to claim 1, further comprising sending, by the client device to the first server over the Internet, a physical geographical location.

48. The method according to claim 47, wherein the physical geographical location corresponds to the actual physical geographical location of the client device.

49. The method according to claim 47, wherein the physical geographical location comprises a country, a state or province, a city, a street, a ZIP code, a longitude, a latitude, or any combination thereof.

* * * * *